US012586043B2

(12) United States Patent
Chevalier et al.

(10) Patent No.: US 12,586,043 B2
(45) Date of Patent: Mar. 24, 2026

(54) SOCIAL MATCH PLATFORM APPARATUS, METHOD, AND SYSTEM

(71) Applicant: MCB Bermuda Ltd., Hamilton (BM)

(72) Inventors: Thomas J. Chevalier, New York, NY (US); Matthew Mund, New, NY (US); Kristi Ince, New York, NY (US); Dee Dellovo, North Andover, MA (US)

(73) Assignee: MCB Bermuda Ltd., Hamilton (BM)

( * ) Notice: Subject to any disclaimer, the term of this patent is extended or adjusted under 35 U.S.C. 154(b) by 0 days.

(21) Appl. No.: 17/872,062

(22) Filed: Jul. 25, 2022

(65) Prior Publication Data

US 2023/0214941 A1     Jul. 6, 2023

Related U.S. Application Data

(63) Continuation of application No. 13/982,950, filed as application No. PCT/US2012/043905 on Jun. 23, 2012, now Pat. No. 11,397,996.

(60) Provisional application No. 61/501,095, filed on Jun. 24, 2011.

(51) Int. Cl.
| | |
|---|---|
| *G06Q 10/10* | (2023.01) |
| *G06Q 10/00* | (2023.01) |
| *G06Q 10/06* | (2023.01) |
| *G06Q 10/1053* | (2023.01) |
| *G06Q 30/00* | (2023.01) |
| *G06Q 30/02* | (2023.01) |
| *G06Q 30/08* | (2012.01) |
| *G06Q 50/00* | (2012.01) |
| *H04W 4/21* | (2018.01) |

(52) U.S. Cl.
CPC ............. *G06Q 50/01* (2013.01); *G06Q 10/00* (2013.01); *G06Q 10/1053* (2013.01); *G06Q 30/00* (2013.01); *H04W 4/21* (2018.02)

(58) Field of Classification Search
CPC .... G06Q 50/01; G06Q 10/00; G06Q 10/1053; G06Q 30/00; H04W 4/21
USPC .......................... 705/1.1–912, 319, 320, 321
See application file for complete search history.

(56) References Cited

U.S. PATENT DOCUMENTS

| | | | | |
|---|---|---|---|---|
| 7,673,327 | B1* | 3/2010 | Polis ..................... | G06F 16/958 |
| | | | | 713/153 |
| 8,504,559 | B1* | 8/2013 | Elman ................... | H04L 67/306 |
| | | | | 705/321 |
| 2008/0005072 | A1* | 1/2008 | Meek .................. | G06F 16/9535 |
| 2011/0276376 | A1* | 11/2011 | Schmitt ................. | G06Q 50/01 |
| | | | | 705/14.16 |
| 2012/0226749 | A1* | 9/2012 | Dale ..................... | H04L 65/403 |
| | | | | 709/204 |

* cited by examiner

*Primary Examiner* — Jonathan P Ouellette
(74) *Attorney, Agent, or Firm* — Dinsmore & Shohl LLP

(57) ABSTRACT

The SOCIAL MATCH PLATFORM APPARATUSES, METHODS AND SYSTEMS ("SMP") transforms platform join requests, social network info, and SMP network info inputs via SMP components NJ, JIP, CIP, OP, CN-SGU and CN-UPSOG into job info, candidate info, offer info, and social meetup info outputs. A job information request for a candidate may be obtained. Social data associated with the candidate may be determined. A social job relevancy rating for various jobs may be calculated using the social data. A job may be selected using the social job relevancy rating for the job, and information regarding the selected job may be provided.

56 Claims, 167 Drawing Sheets

EXEMPLARY SOCIAL MATCH PLATFORM USAGE SCENARIO

EXEMPLARY SOCIAL MATCH PLATFORM USAGE SCENARIO

I know of a good candidate

Contact
2 25

I have an open position

Recruiter
2 15

Social Match Platform
2 05

I know of a good job

Contact
2 20

I need a job

Candidate
2 10

EXEMPLARY SOCIAL MATCH PLATFORM USAGE SCENARIO

EXEMPLARY SOCIAL MATCH PLATFORM USAGE SCENARIO

EXEMPLARY SOCIAL MATCH PLATFORM DATA FLOW

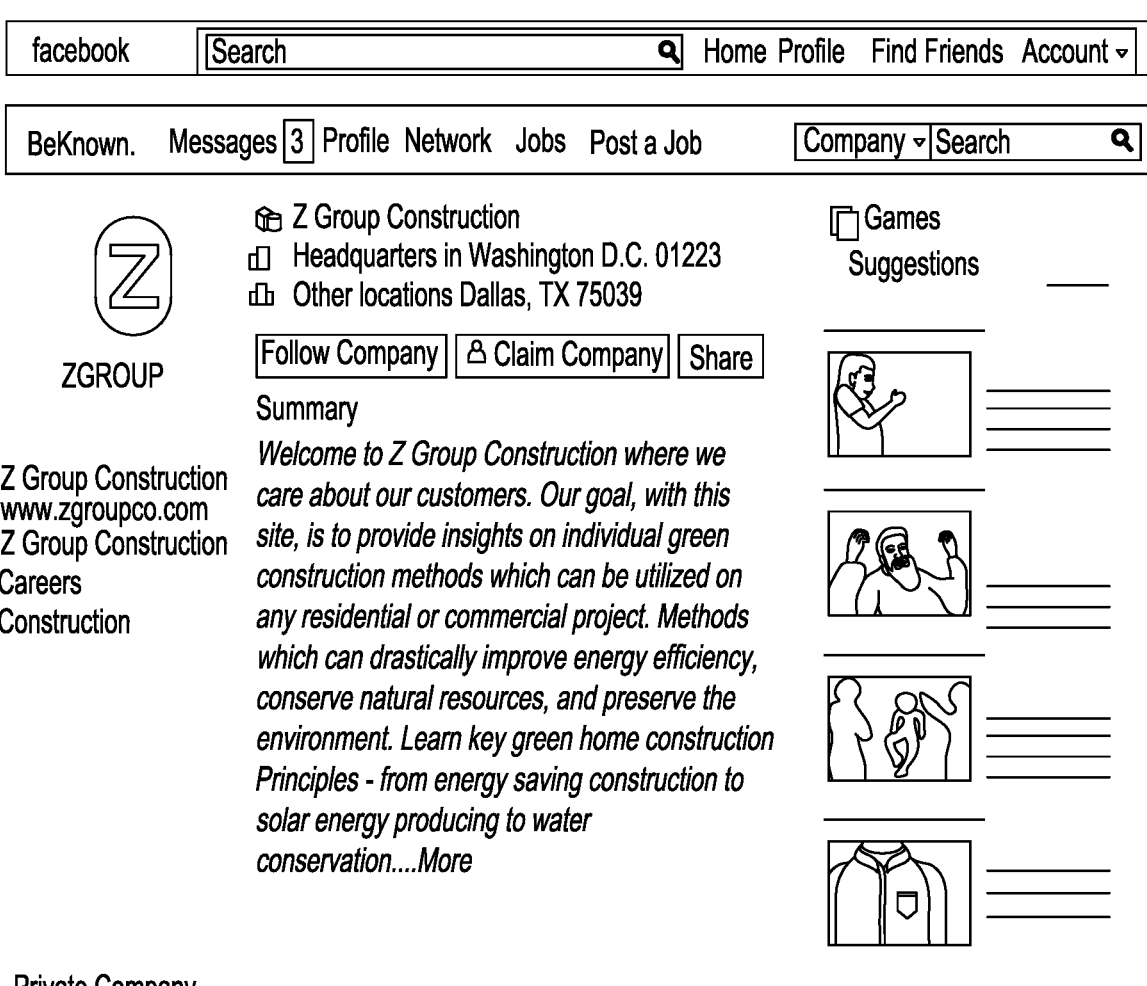

facebook | Search 🔍 | Home  Profile  Find Friends  Account ▾

BeKnown.    Messages [3] Profile  Network  Jobs  Post a Job     | Company ▾ | Search 🔍

ZGROUP

Z Group Construction
www.zgroupco.com
Z Group Construction
Careers
Construction

🏢 Z Group Construction
🏬 Headquarters in Washington D.C. 01223
🏬 Other locations Dallas, TX 75039

| Follow Company | 🔒 Claim Company | Share |

Summary

*Welcome to Z Group Construction where we care about our customers. Our goal, with this site, is to provide insights on individual green construction methods which can be utilized on any residential or commercial project. Methods which can drastically improve energy efficiency, conserve natural resources, and preserve the environment. Learn key green home construction Principles - from energy saving construction to solar energy producing to water conservation....More*

🗂 Games
   Suggestions ____

Private Company
Founded: 1985
Size: 15+ employees

Network stats

56 Followers
   13 Employees
    1 in Your Network

Flag company

Your Connections at Z Group Construction
Rick Steele
General Contractor:
April 1999 - Present (12 Years)
   ✉ Send Message 💬 Updates
Electrician
Z Group Constructions . Washington. D.C. 01223
Z Group Constructions its an environmental friendly Construction Company.
We are looking for a highly Experienced electrician who has a positive can-do attitude, can work closely with the....

Rick Steele posted this job
General Contractor

💼 May 12 at 6:15pm - Share

Jobs

FIG. 3F

EXEMPLARY JOIN REQUEST DATA FLOW

EXEMPLARY SEARCH DATA FLOW

EXEMPLARY UPDATE DATA FLOW

EXEMPLARY SOCIAL MATCH PLATFORM NETWORK JOIN (NJ) COMPONENT

EXEMPLARY SOCIAL MATCH PLATFORM JOB INFO PROVIDING (JIP) COMPONENT

EXEMPLARY SOCIAL MATCH PLATFORM CANDIDATE INFO PROVIDING (CIP) COMPONENT

Receive request to provide an offer to a group 6 05

Determine the group's members 6 10

Determine common characteristics of the group's members 6 15

Determine the group's affiliations 6 20

Analyze data to determine a relevant offer 6 25

Provide info regarding the relevant offer to the target group 6 30

End 6 35

EXEMPLARY SOCIAL MATCH PLATFORM OFFER PROVIDING (OP) COMPONENT

Fig. 10                    1000

Figure 18A:
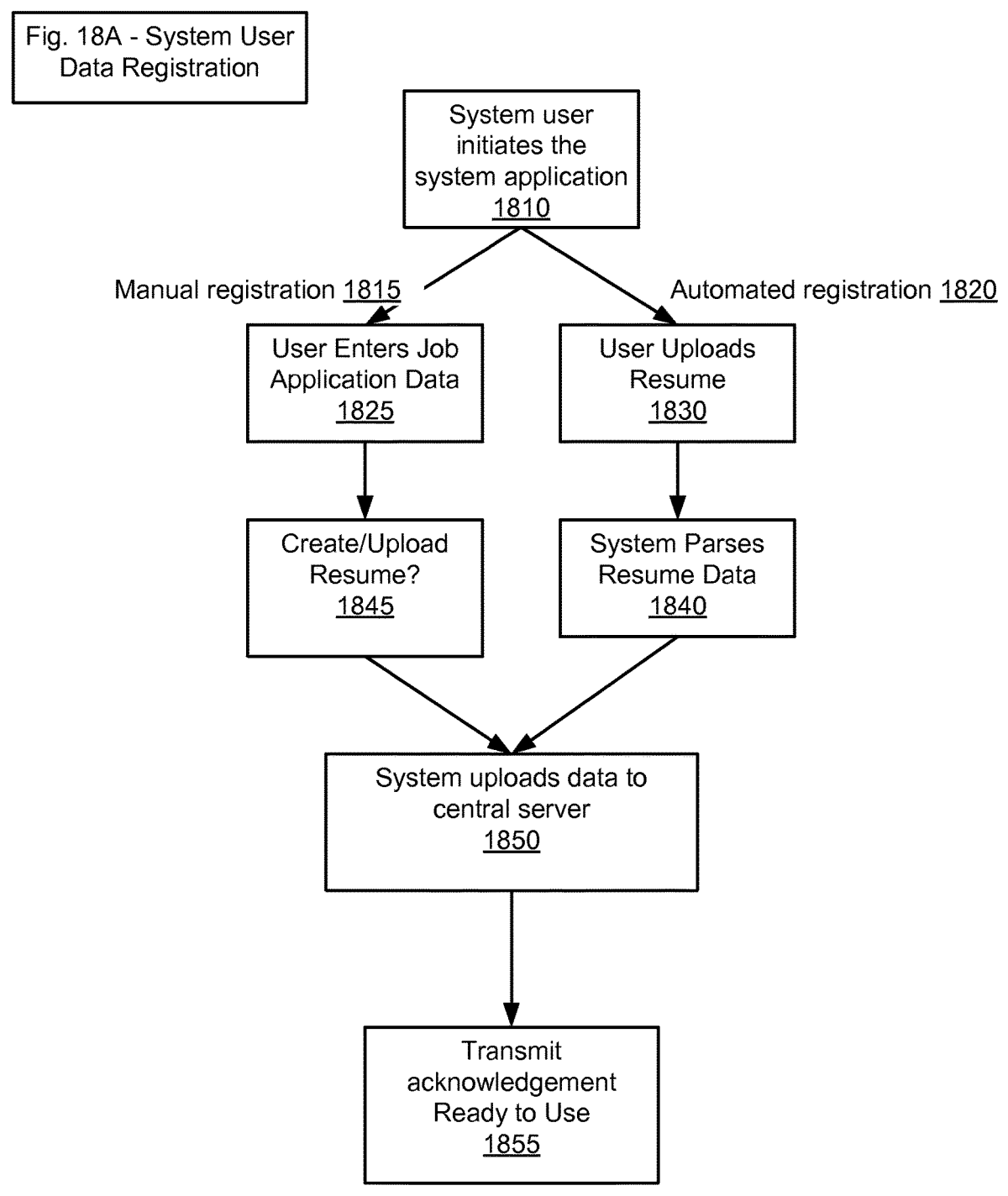

Fig. 18A - System User Data Registration

System user initiates the system application
1810

Manual registration 1815

Automated registration 1820

User Enters Job Application Data
1825

User Uploads Resume
1830

Create/Upload Resume?
1845

System Parses Resume Data
1840

System uploads data to central server
1850

Transmit acknowledgement Ready to Use
1855

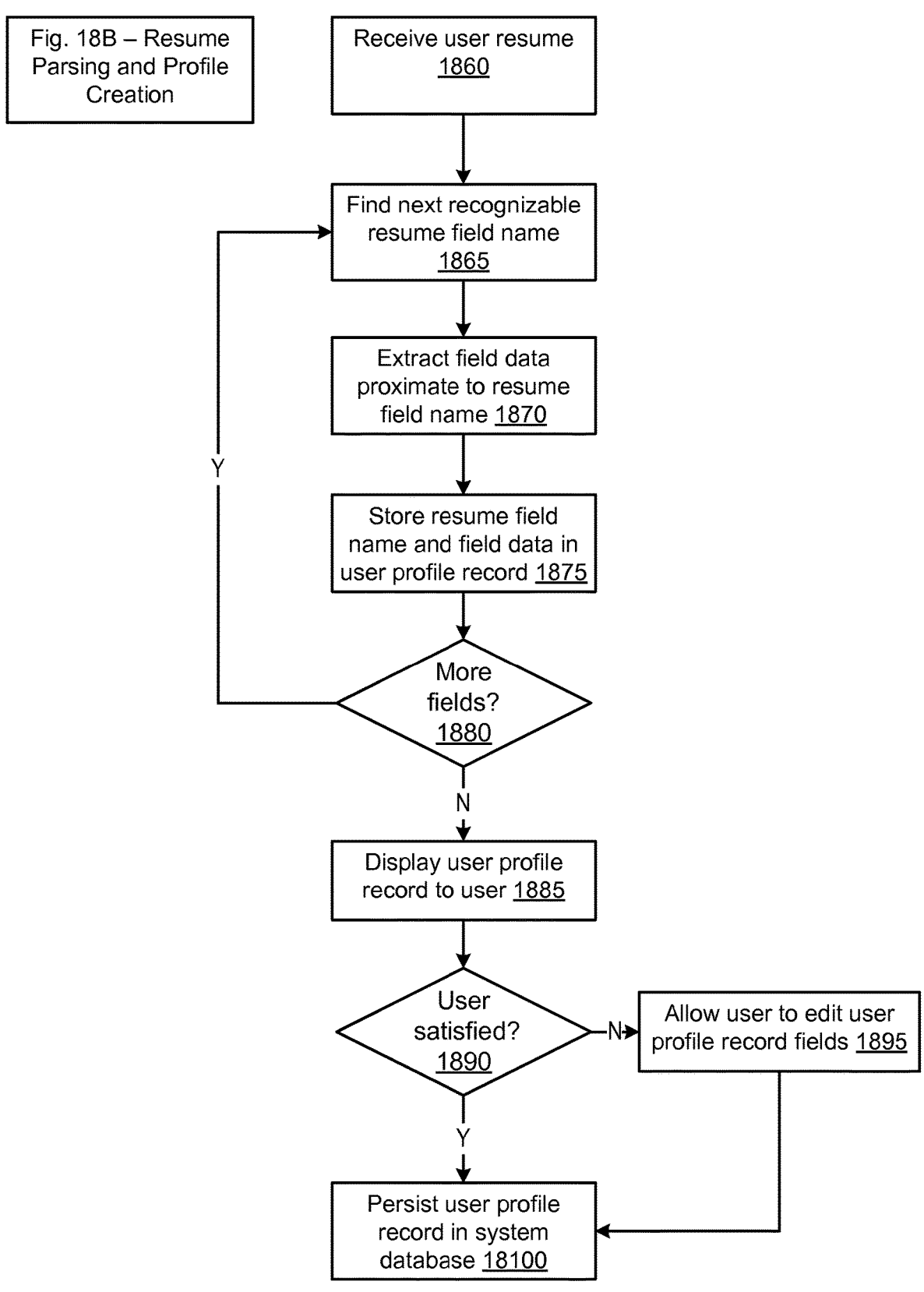

Fig. 18B – Resume Parsing and Profile Creation

Receive user resume 1860

Find next recognizable resume field name 1865

Extract field data proximate to resume field name 1870

Store resume field name and field data in user profile record 1875

More fields? 1880

N

Display user profile record to user 1885

User satisfied? 1890

N → Allow user to edit user profile record fields 1895

Y

Persist user profile record in system database 18100

Y

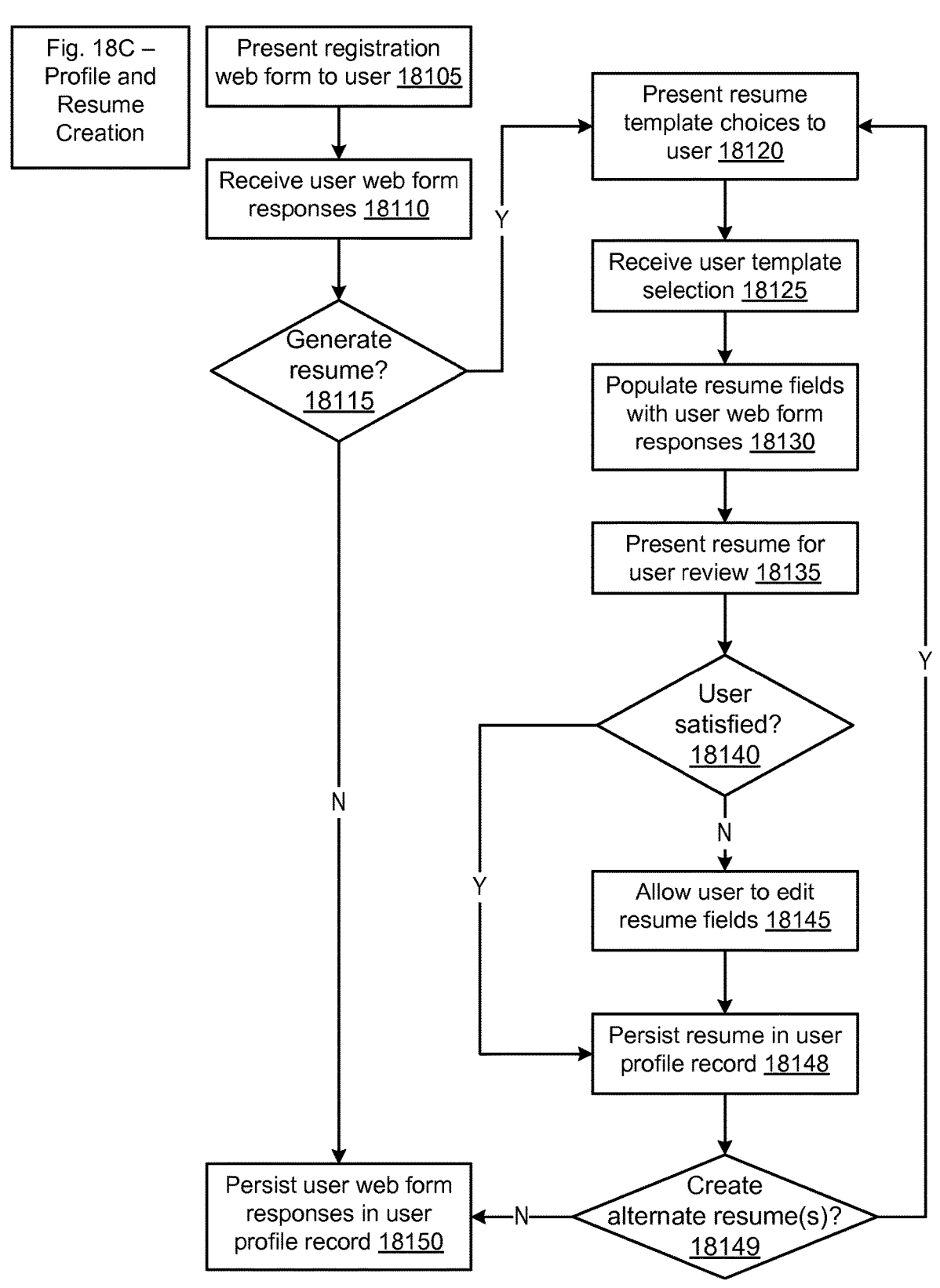

Fig. 18C – Profile and Resume Creation

Present registration web form to user 18105

Receive user web form responses 18110

Generate resume? 18115

Present resume template choices to user 18120

Receive user template selection 18125

Populate resume fields with user web form responses 18130

Present resume for user review 18135

User satisfied? 18140

Allow user to edit resume fields 18145

Persist resume in user profile record 18148

Create alternate resume(s)? 18149

Persist user web form responses in user profile record 18150

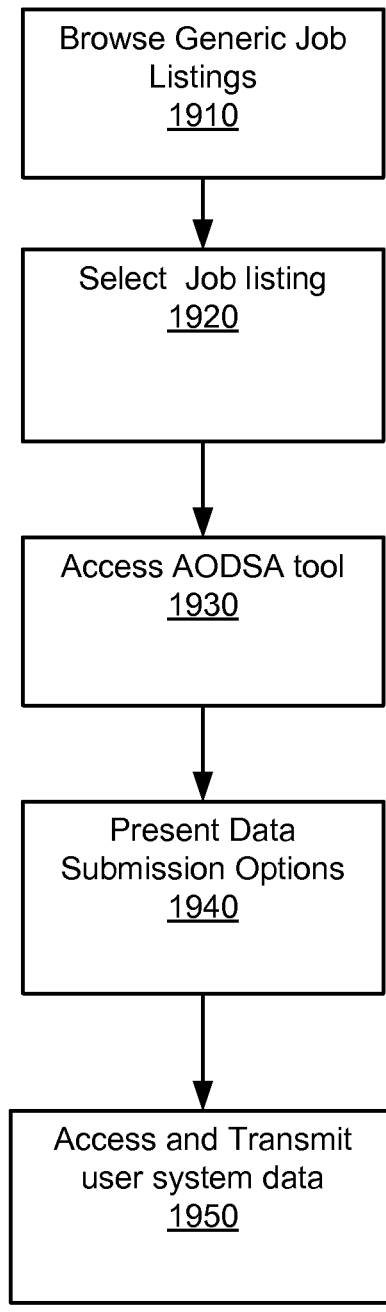
Fig. 19A – Autonomous Automated Data Submission
Browse Generic Job Listings
1910
Select  Job listing
1920
Access AODSA tool
1930
Present Data Submission Options
1940
Access and Transmit user system data
1950

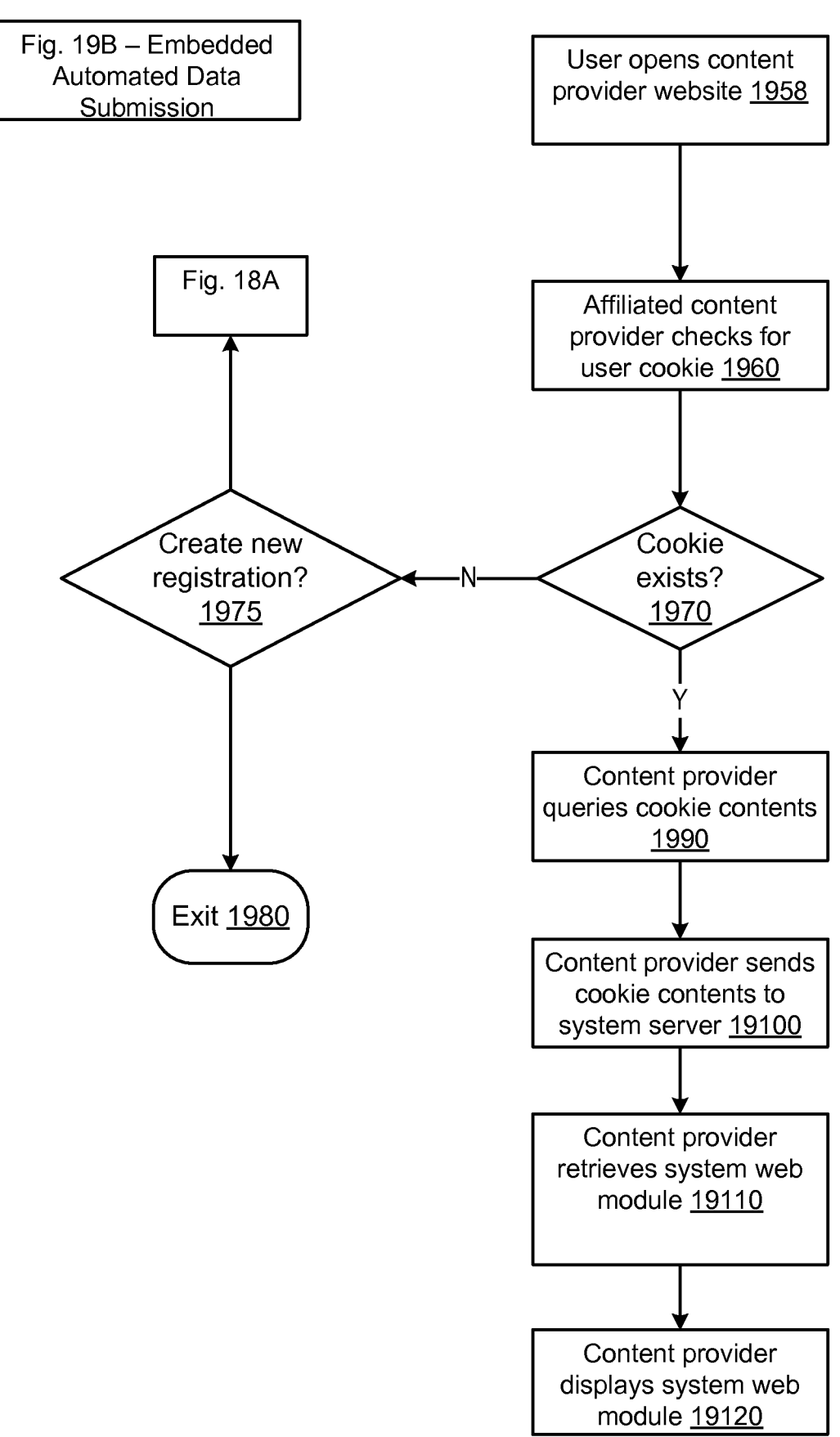

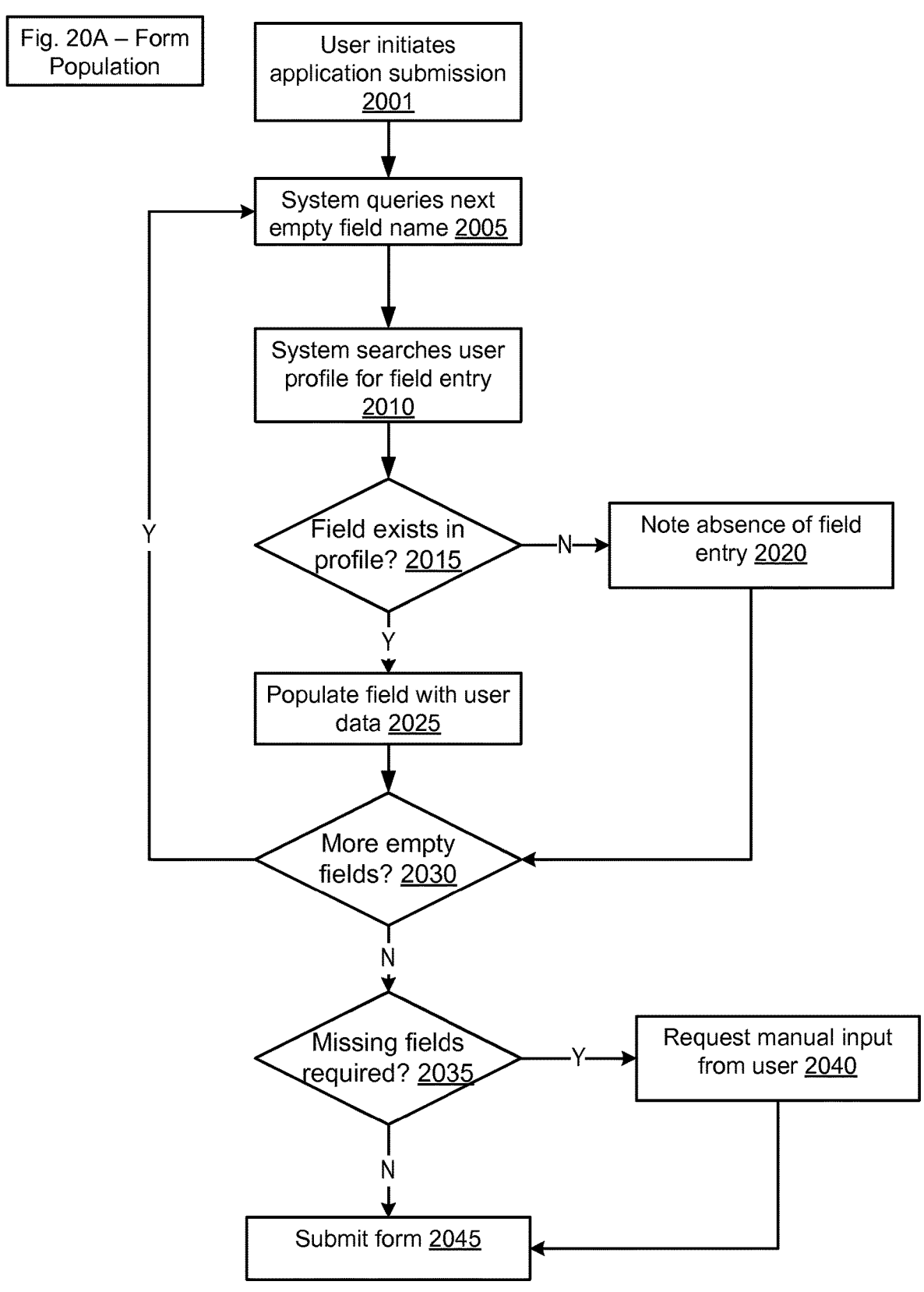
Fig. 20A – Form Population

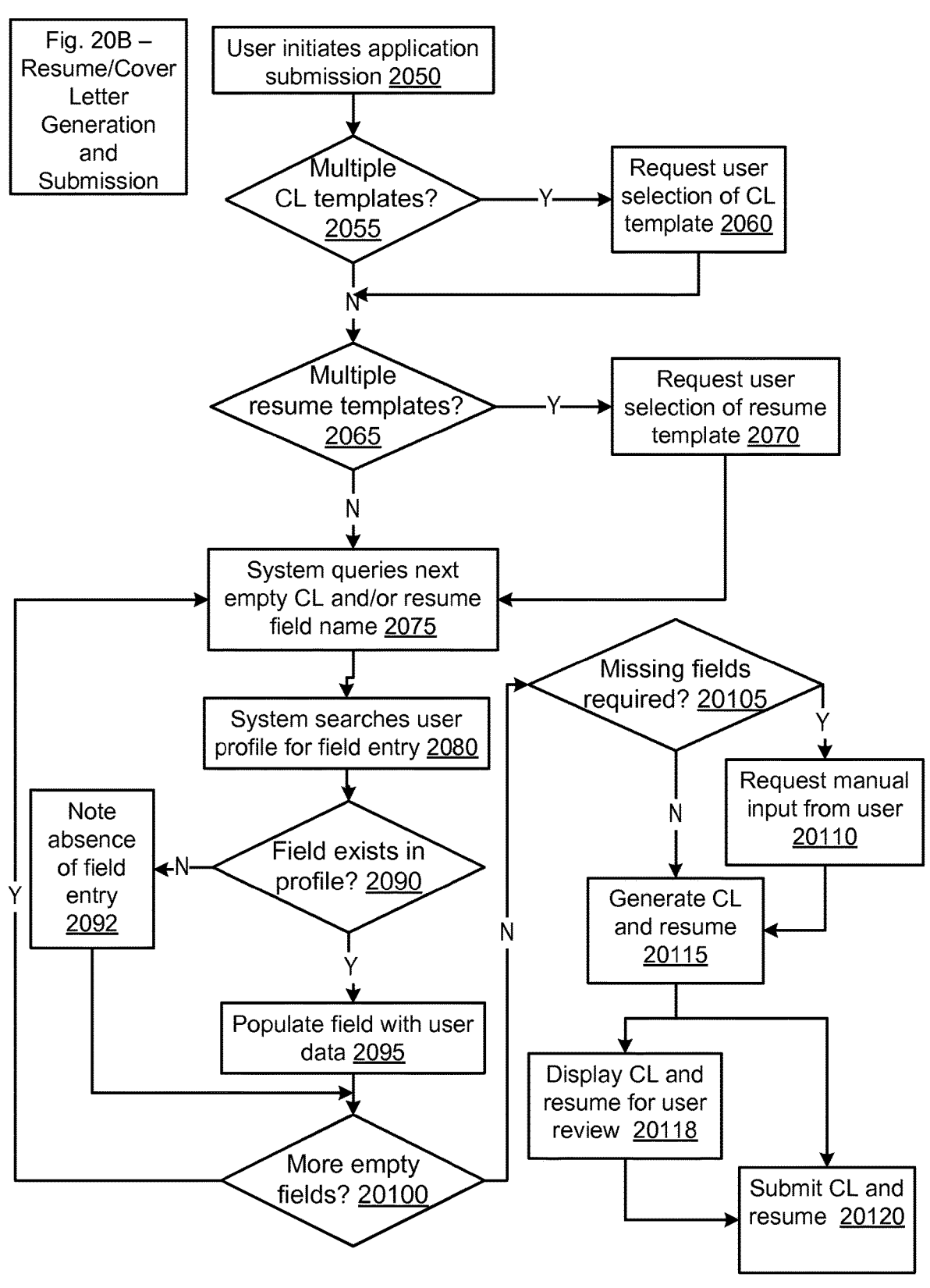

Fig. 20B – Resume/Cover Letter Generation and Submission

User initiates application submission 2050

Multiple CL templates? 2055

Request user selection of CL template 2060

Multiple resume templates? 2065

Request user selection of resume template 2070

System queries next empty CL and/or resume field name 2075

System searches user profile for field entry 2080

Note absence of field entry 2092

Field exists in profile? 2090

Populate field with user data 2095

More empty fields? 20100

Missing fields required? 20105

Request manual input from user 20110

Generate CL and resume 20115

Display CL and resume for user review 20118

Submit CL and resume 20120

Fig. 21A

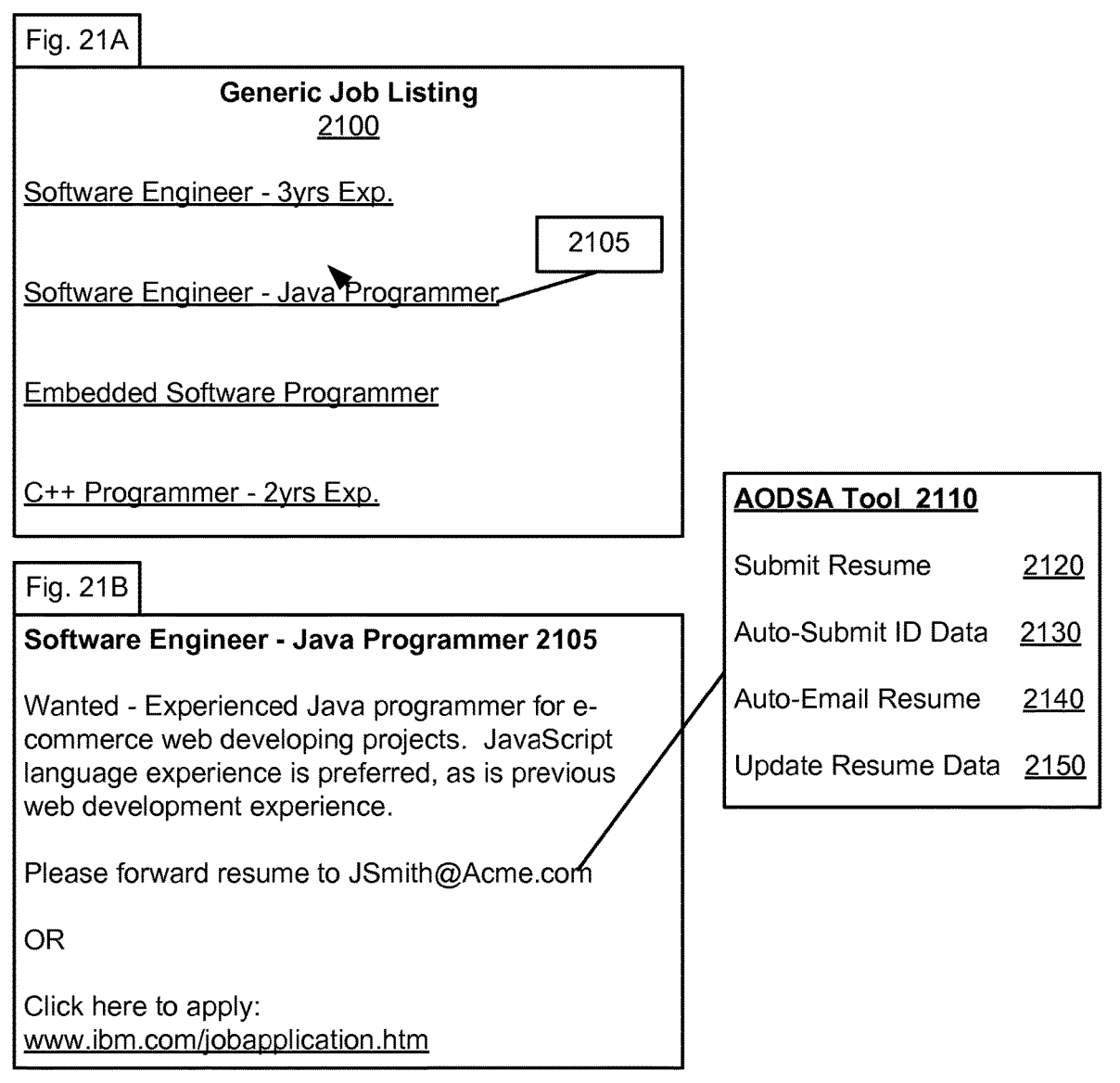

Generic Job Listing
2100

Software Engineer - 3yrs Exp.

2105

Software Engineer - Java Programmer

Embedded Software Programmer

C++ Programmer - 2yrs Exp.

AODSA Tool 2110

Submit Resume     2120

Auto-Submit ID Data    2130

Auto-Email Resume    2140

Update Resume Data   2150

Fig. 21B

Software Engineer - Java Programmer 2105

Wanted - Experienced Java programmer for e-commerce web developing projects.  JavaScript language experience is preferred, as is previous web development experience.

Please forward resume to JSmith@Acme.com

OR

Click here to apply:
www.ibm.com/jobapplication.htm

Fig. 23

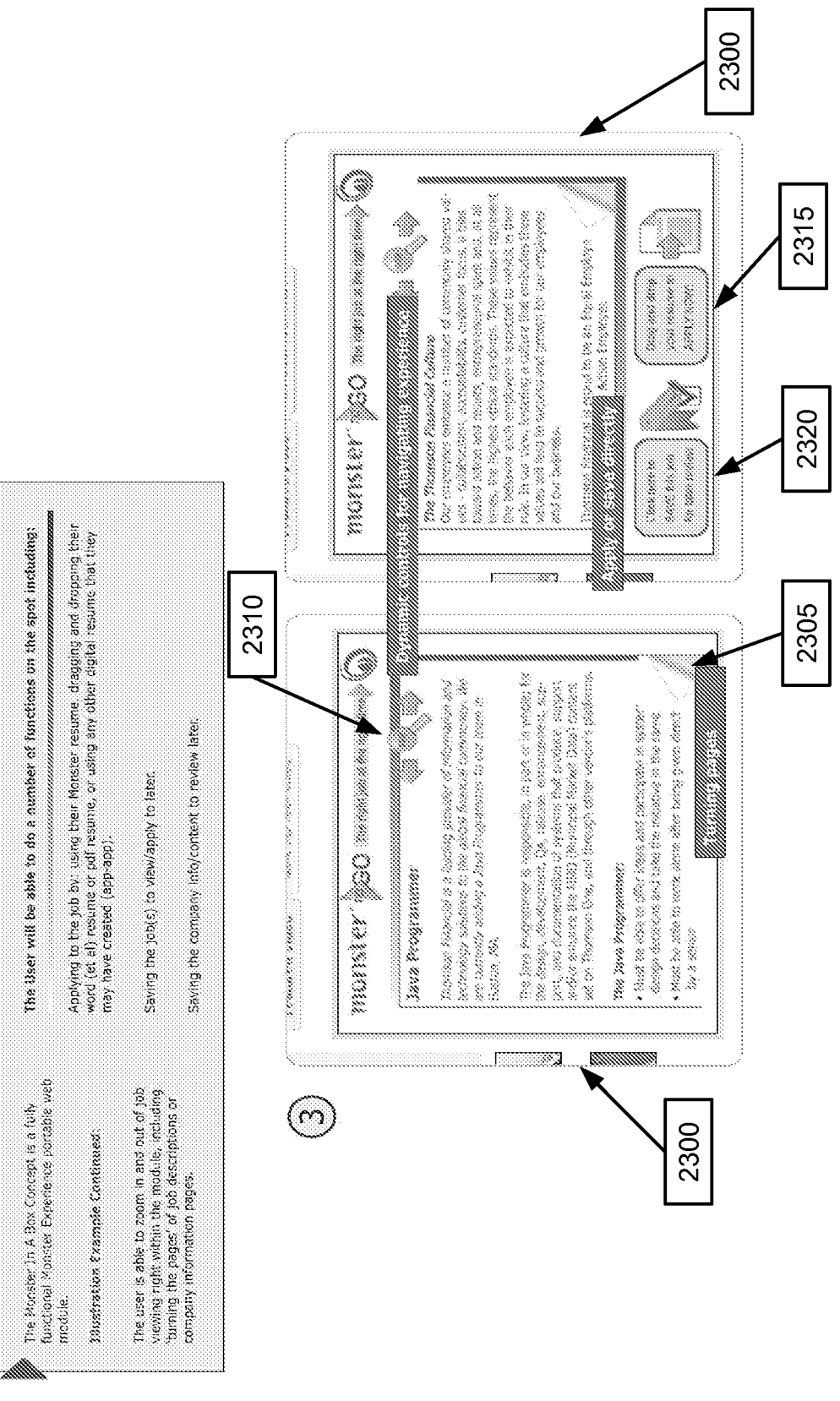

The Monster in A Box Concept is a fully functional Monster Experience portable web module.

*Illustration Example Continued:*

The user is able to zoom in and out of job viewing right within the module, including turning the pages' of job descriptions or company information pages.

The User will be able to do a number of functions on the spot including:

Applying to the job by: using their Monster resume, dragging and dropping their word (et al) resume or pdf resume, or using any other digital resume that they may have created (app-app).

Saving the job(s), to view/apply to later.

Saving the company info/content to review later.

Receive work experience query  28 01

Process work experience query to determine matching states  28 02

Rank retrieved states 28 03

Auto-choose? 28 04

N

Y

Present results for display (e.g., in ranked order)  28 06

Choose highest ranked state and associate work experience query 28 05

Receive state selection and associate work experience query 28 07

FIGURE 37B

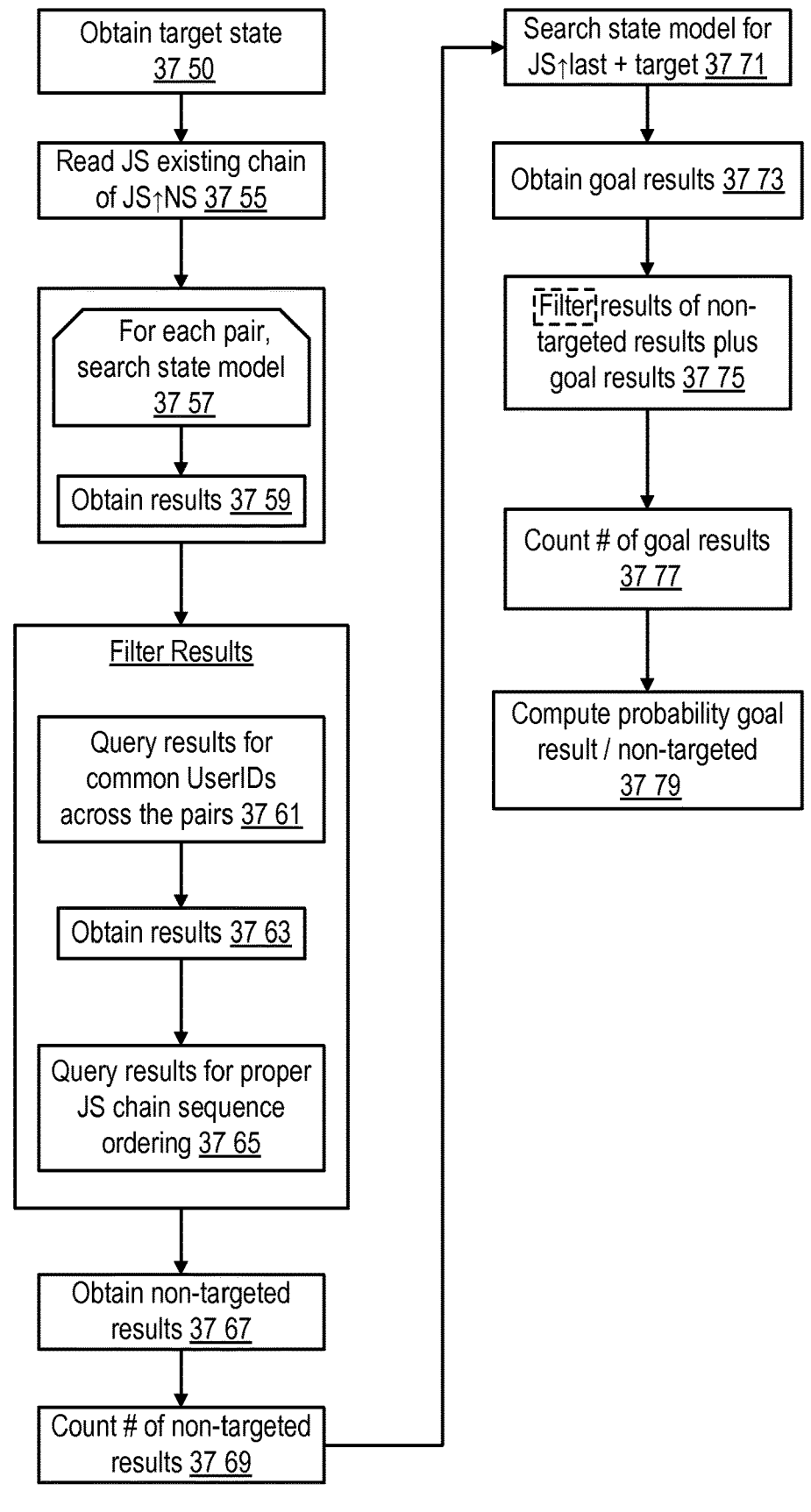

Obtain target state
37 50

Read JS existing chain
of JS↑NS 37 55

For each pair,
search state model
37 57

Obtain results 37 59

Filter Results

Query results for
common UserIDs
across the pairs 37 61

Obtain results 37 63

Query results for proper
JS chain sequence
ordering 37 65

Obtain non-targeted
results 37 67

Count # of non-targeted
results 37 69

Search state model for
JS↑last + target 37 71

Obtain goal results 37 73

Filter results of non-
targeted results plus
goal results 37 75

Count # of goal results
37 77

Compute probability goal
result / non-targeted
37 79

Career Path structuring (CPS) Overall Flow

Path-Independent Stepwise CPS

Path-Independent N-Step Open-Ended CPS

Path-Dependent N-Step Open-Ended CPS

Gap Analysis $$G_{i(A \to B)} = B_F - A_F + AB_i \quad \underline{4699}$$

$$G_{i(B \to C)} = C_F - B_F + BC_i \quad \underline{4698}$$

$$G_{i(B \to C)} = C_F - B_F - A_F + AB_i + BC_i \quad \underline{4697}$$

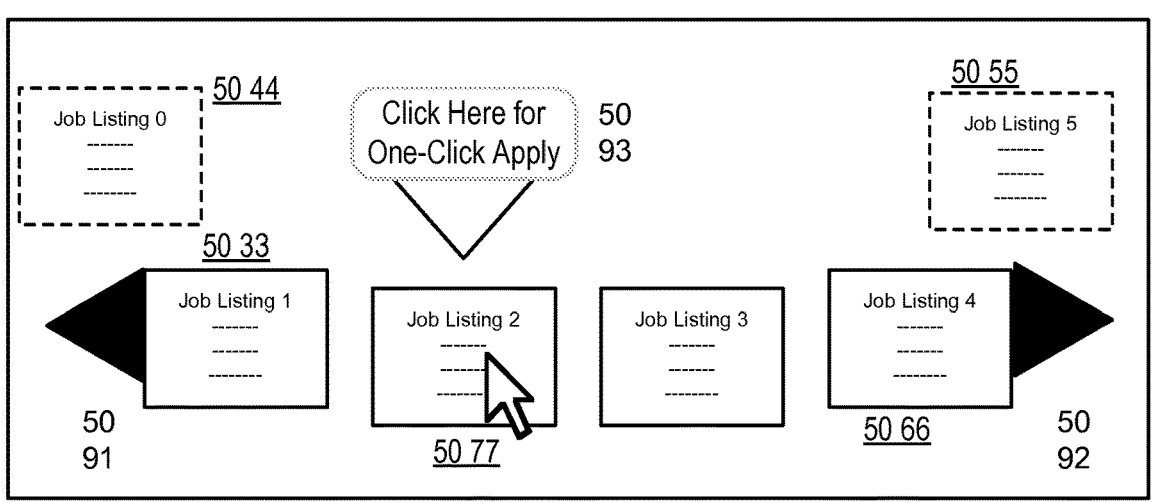
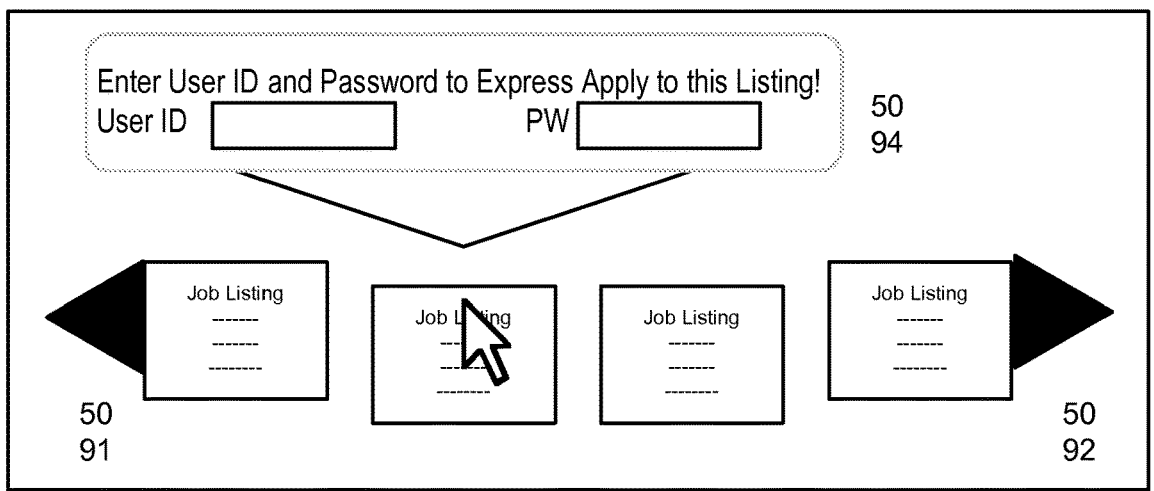
Figure 50

Fig. 61B

| Campaign | Impressions Served | CTR |
|----------|--------------------|----|
| FedEx | FedEx | FedEx |
| Boston Jobs | Boston Jobs | Boston Jobs |
| Smith's Software | Smith's Software | Smith's |
| Boston Clerk / Boston Manager | Boston Manager | Boston |
| File   Settings | | |

JDN — 6125

6130

6120

6122

6128

6126

6124

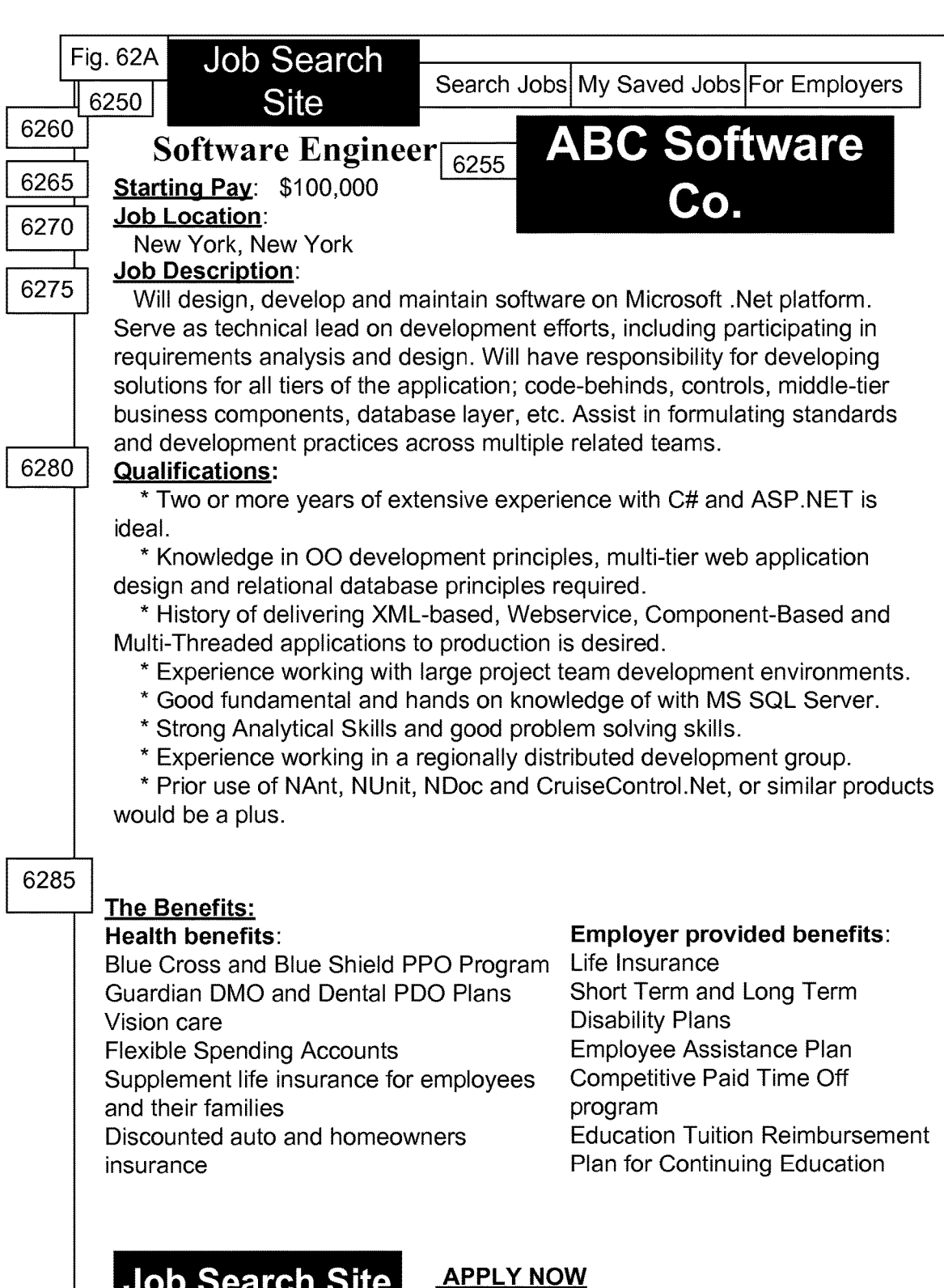

Job Search Site

Search Jobs | My Saved Jobs | For Employers

Software Engineer   6255   ABC Software Co.

Starting Pay: $100,000

Job Location:
New York, New York

Job Description:
Will design, develop and maintain software on Microsoft .Net platform. Serve as technical lead on development efforts, including participating in requirements analysis and design. Will have responsibility for developing solutions for all tiers of the application; code-behinds, controls, middle-tier business components, database layer, etc. Assist in formulating standards and development practices across multiple related teams.

Qualifications:
* Two or more years of extensive experience with C# and ASP.NET is ideal.
* Knowledge in OO development principles, multi-tier web application design and relational database principles required.
* History of delivering XML-based, Webservice, Component-Based and Multi-Threaded applications to production is desired.
* Experience working with large project team development environments.
* Good fundamental and hands on knowledge of with MS SQL Server.
* Strong Analytical Skills and good problem solving skills.
* Experience working in a regionally distributed development group.
* Prior use of NAnt, NUnit, NDoc and CruiseControl.Net, or similar products would be a plus.

The Benefits:

Health benefits:
Blue Cross and Blue Shield PPO Program
Guardian DMO and Dental PDO Plans
Vision care
Flexible Spending Accounts
Supplement life insurance for employees and their families
Discounted auto and homeowners insurance

Employer provided benefits:
Life Insurance
Short Term and Long Term Disability Plans
Employee Assistance Plan
Competitive Paid Time Off program
Education Tuition Reimbursement Plan for Continuing Education

Job Search Site    APPLY NOW

6290

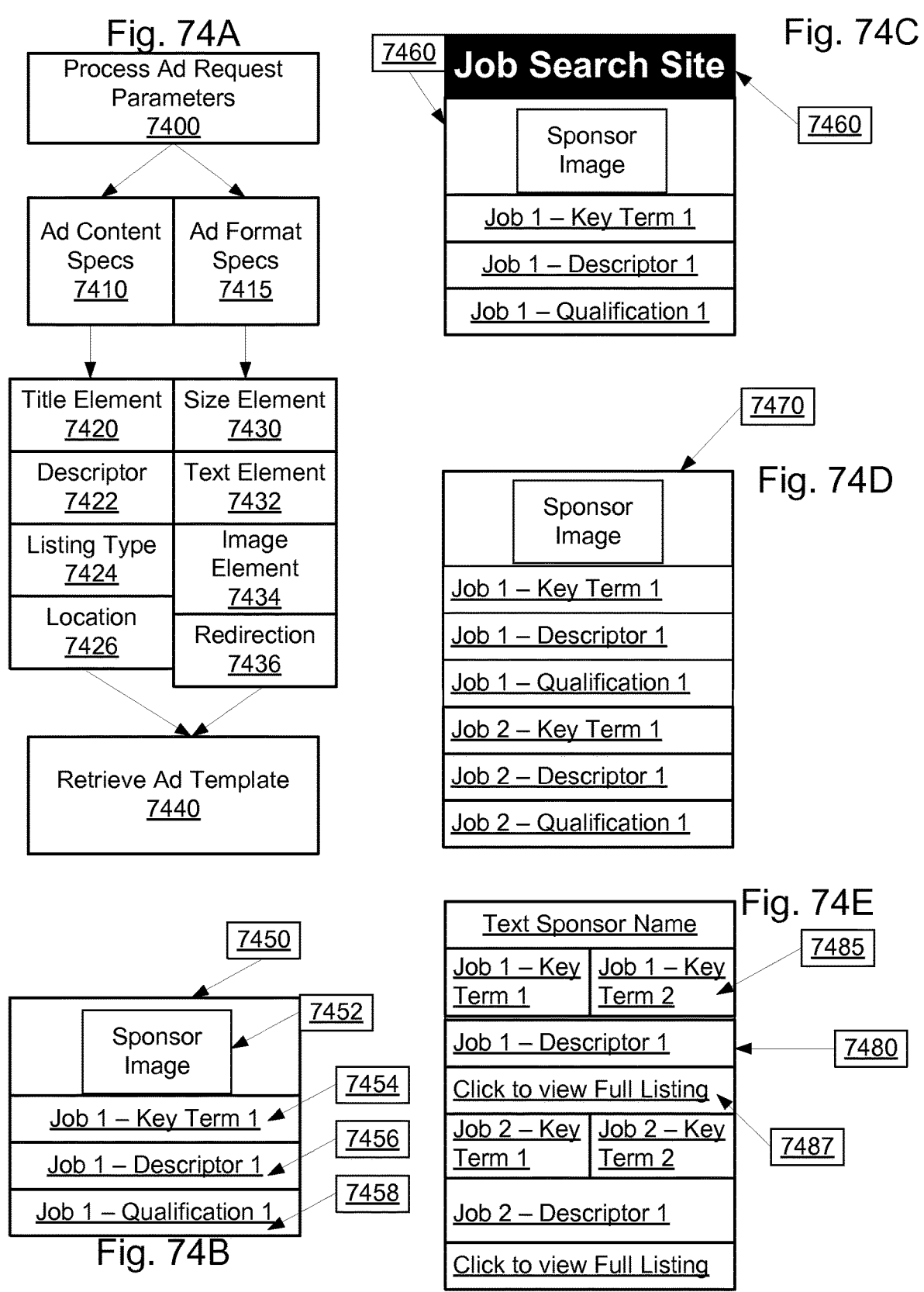

Fig. 74A

Process Ad Request Parameters
7400

Ad Content Specs
7410

Ad Format Specs
7415

Title Element 7420
Descriptor 7422
Listing Type 7424
Location 7426

Size Element 7430
Text Element 7432
Image Element 7434
Redirection 7436

Retrieve Ad Template
7440

Job Search Site

7460

Sponsor Image

Job 1 – Key Term 1

Job 1 – Descriptor 1

Job 1 – Qualification 1

Sponsor Image

Job 1 – Key Term 1

Job 1 – Descriptor 1

Job 1 – Qualification 1

Job 2 – Key Term 1

Job 2 – Descriptor 1

Job 2 – Qualification 1

Fig. 74E

Text Sponsor Name

7485

Job 1 – Key Term 1     Job 1 – Key Term 2

Job 1 – Descriptor 1     7480

Click to view Full Listing

Job 2 – Key Term 1     Job 2 – Key Term 2     7487

Job 2 – Descriptor 1

Click to view Full Listing

7450

Sponsor Image     7452

Job 1 – Key Term 1     7454

Job 1 – Descriptor 1     7456

Job 1 – Qualification 1     7458

Job Search Site

| Search Jobs | My Monster | For Employers |

Software Engineer

Starting Pay:
$100,000

Job Location:
New York, New York

ABC Software Co.

Job Description:
   Will design, develop and maintain software on Microsoft .Net platform. Serve as technical lead on development efforts, including participating in requirements analysis and design.

Qualifications:
   * Two or more years of extensive experience with C# and ASP.NET is ideal.
   * Knowledge in OO development principles, multi-tier web application design and relational database principles required.
* Strong Analytical Skills and good problem solving skills.
   * Experience working in a regionally distributed development group.
   * Prior use of NAnt, NUnit, NDoc and CruiseControl.Net, or similar products would be a plus.

The Benefits:
Health care:
Vision care;
Flex Spending Account

Life Insurance
Short Term and Long
Term Disability Plan

Job Search Site

APPLY NOW

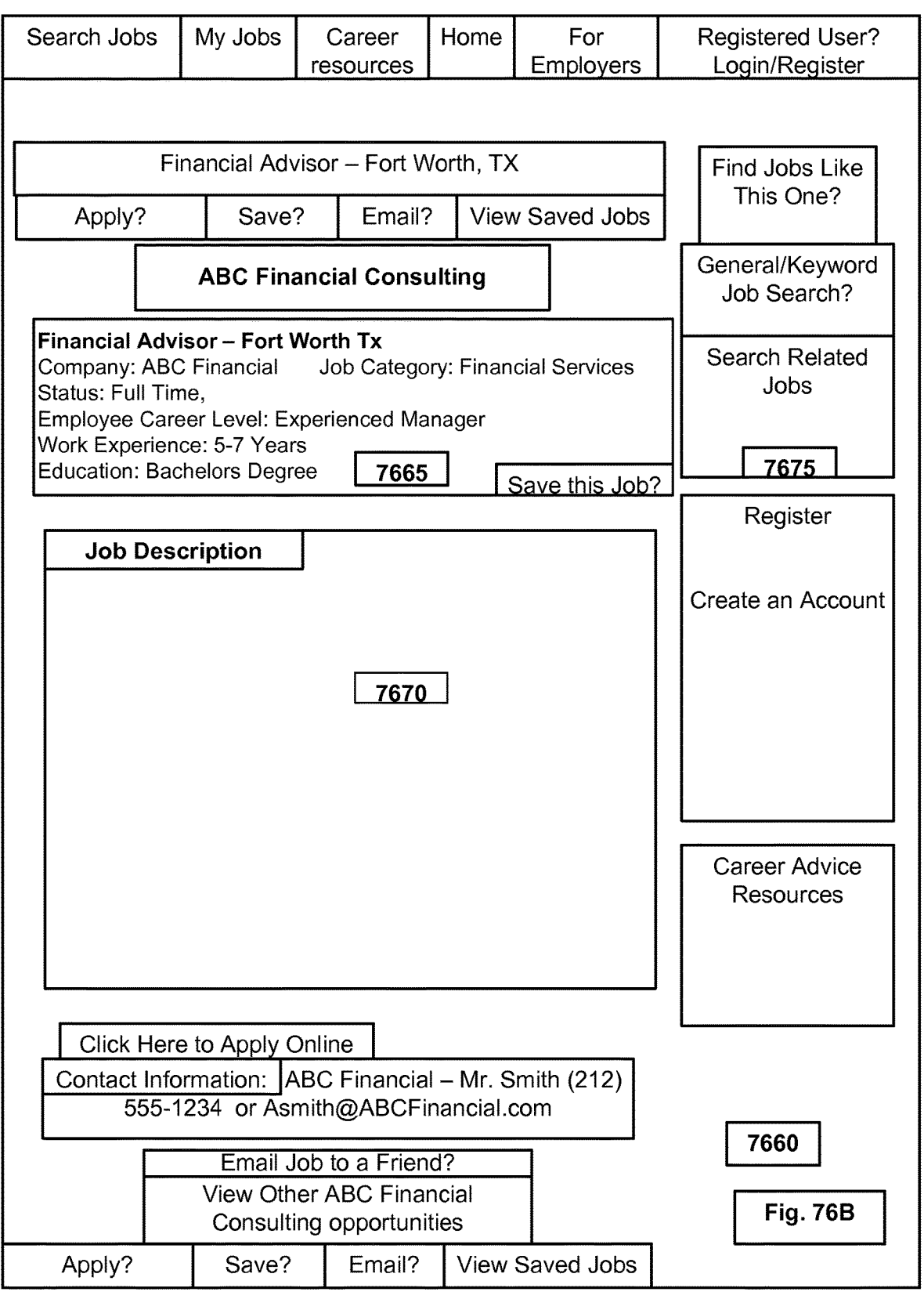

| Search Jobs | My Jobs | Career resources | Home | For Employers | Registered User? Login/Register |

Financial Advisor – Fort Worth, TX

| Apply? | Save? | Email? | View Saved Jobs |

ABC Financial Consulting

Financial Advisor – Fort Worth Tx
Company: ABC Financial     Job Category: Financial Services
Status: Full Time,
Employee Career Level: Experienced Manager
Work Experience: 5-7 Years
Education: Bachelors Degree     7665

Save this Job?

Find Jobs Like This One?

General/Keyword Job Search?

Search Related Jobs

7675

Job Description

7670

Register

Create an Account

Career Advice Resources

Click Here to Apply Online

Contact Information: ABC Financial – Mr. Smith (212) 555-1234  or Asmith@ABCFinancial.com Email Job to a Friend?
View Other ABC Financial Consulting opportunities

| Apply? | Save? | Email? | View Saved Jobs |

Fig. 77 - Management Dashboard

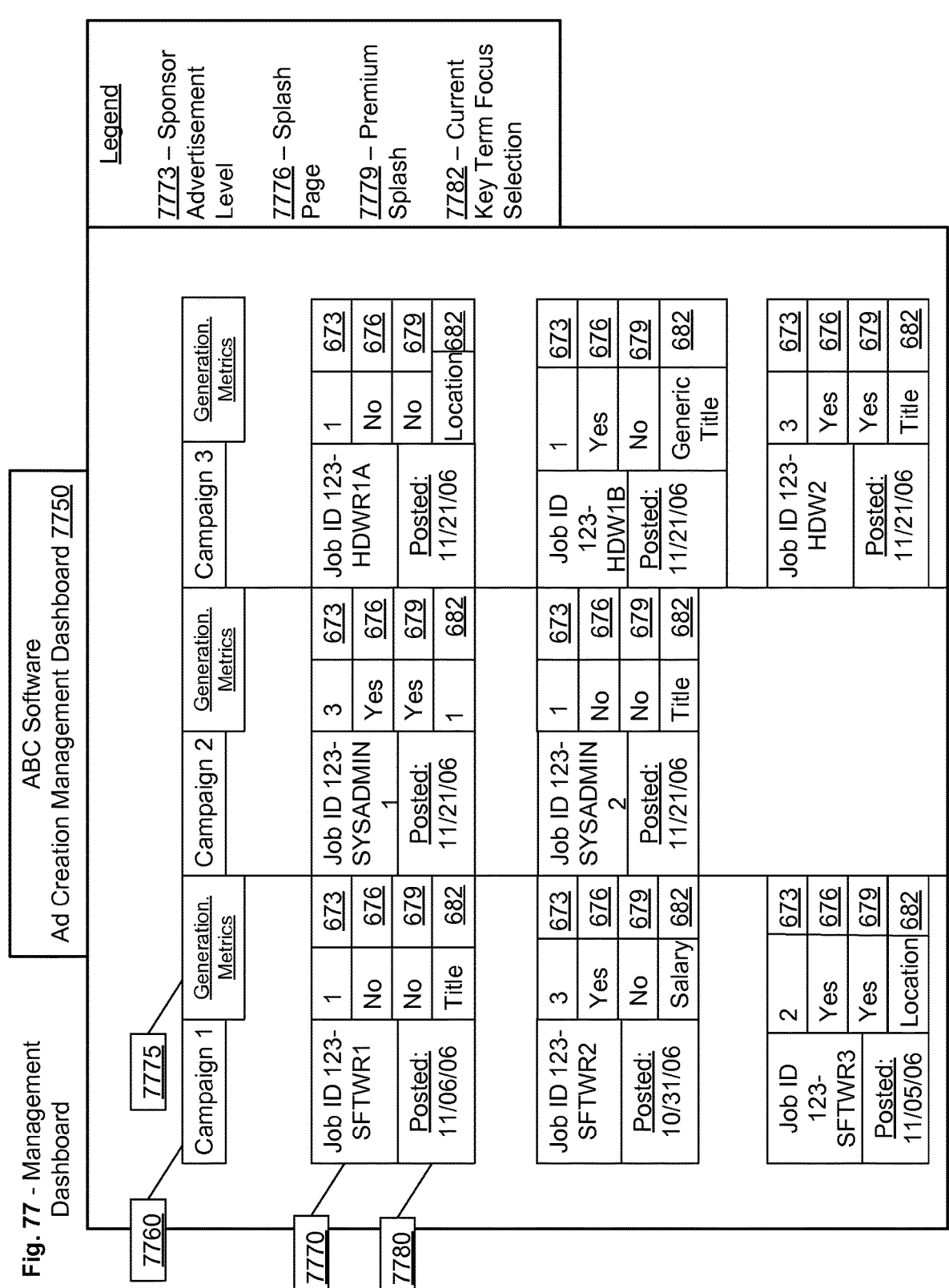

ABC Software
Ad Creation Management Dashboard 7750

Legend

7773 – Sponsor Advertisement Level

7776 – Splash Page

7779 – Premium Splash

7782 – Current Key Term Focus Selection

| Campaign 1 | Generation. Metrics | | Campaign 2 | Generation. Metrics | | Campaign 3 | Generation. Metrics | |
|---|---|---|---|---|---|---|---|---|
| Job ID 123-SFTWR1 | 1 | 673 | Job ID 123-SYSADMIN 1 | 3 | 673 | Job ID 123-HDWR1A | 1 | 673 |
| | No | 676 | | Yes | 676 | | No | 676 |
| | No | 679 | | Yes | 679 | | No | 679 |
| | Title | 682 | | 1 | 682 | | Location | 682 |
| Posted: 11/06/06 | | | Posted: 11/21/06 | | | Posted: 11/21/06 | | |
| Job ID 123-SFTWR2 | 3 | 673 | Job ID 123-SYSADMIN 2 | 1 | 673 | Job ID 123-HDW1B | 1 | 673 |
| | Yes | 676 | | No | 676 | | Yes | 676 |
| | No | 679 | | No | 679 | | No | 679 |
| | Salary | 682 | | Title | 682 | | Generic Title | 682 |
| Posted: 10/31/06 | | | Posted: 11/21/06 | | | Posted: 11/21/06 | | |
| Job ID 123-SFTWR3 | 2 | 673 | | | | Job ID 123-HDW2 | 3 | 673 |
| | Yes | 676 | | | | | Yes | 676 |
| | Yes | 679 | | | | | Yes | 679 |
| | Location | 682 | | | | | Title | 682 |
| Posted: 11/05/06 | | | | | | Posted: 11/21/06 | | |

7775

7760

7770

7780

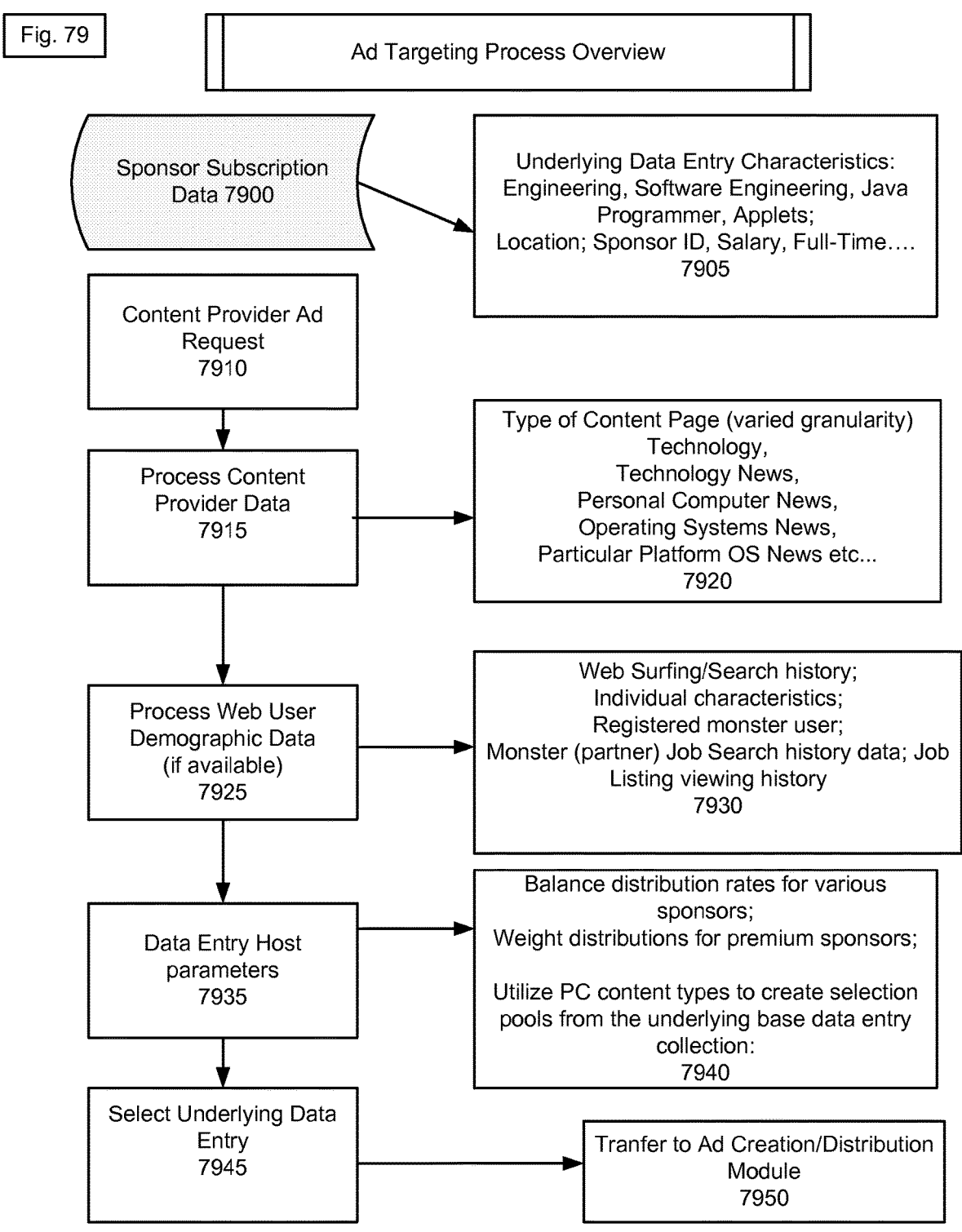

Fig. 79

Ad Targeting Process Overview

Sponsor Subscription Data 7900

Underlying Data Entry Characteristics:
Engineering, Software Engineering, Java Programmer, Applets;
Location; Sponsor ID, Salary, Full-Time....
7905

Content Provider Ad Request
7910

Process Content Provider Data
7915

Type of Content Page (varied granularity)
Technology,
Technology News,
Personal Computer News,
Operating Systems News,
Particular Platform OS News etc...
7920

Process Web User Demographic Data (if available)
7925

Web Surfing/Search history;
Individual characteristics;
Registered monster user;
Monster (partner) Job Search history data; Job Listing viewing history
7930

Data Entry Host parameters
7935

Balance distribution rates for various sponsors;
Weight distributions for premium sponsors;

Utilize PC content types to create selection pools from the underlying base data entry collection:
7940

Select Underlying Data Entry
7945

Tranfer to Ad Creation/Distribution Module
7950

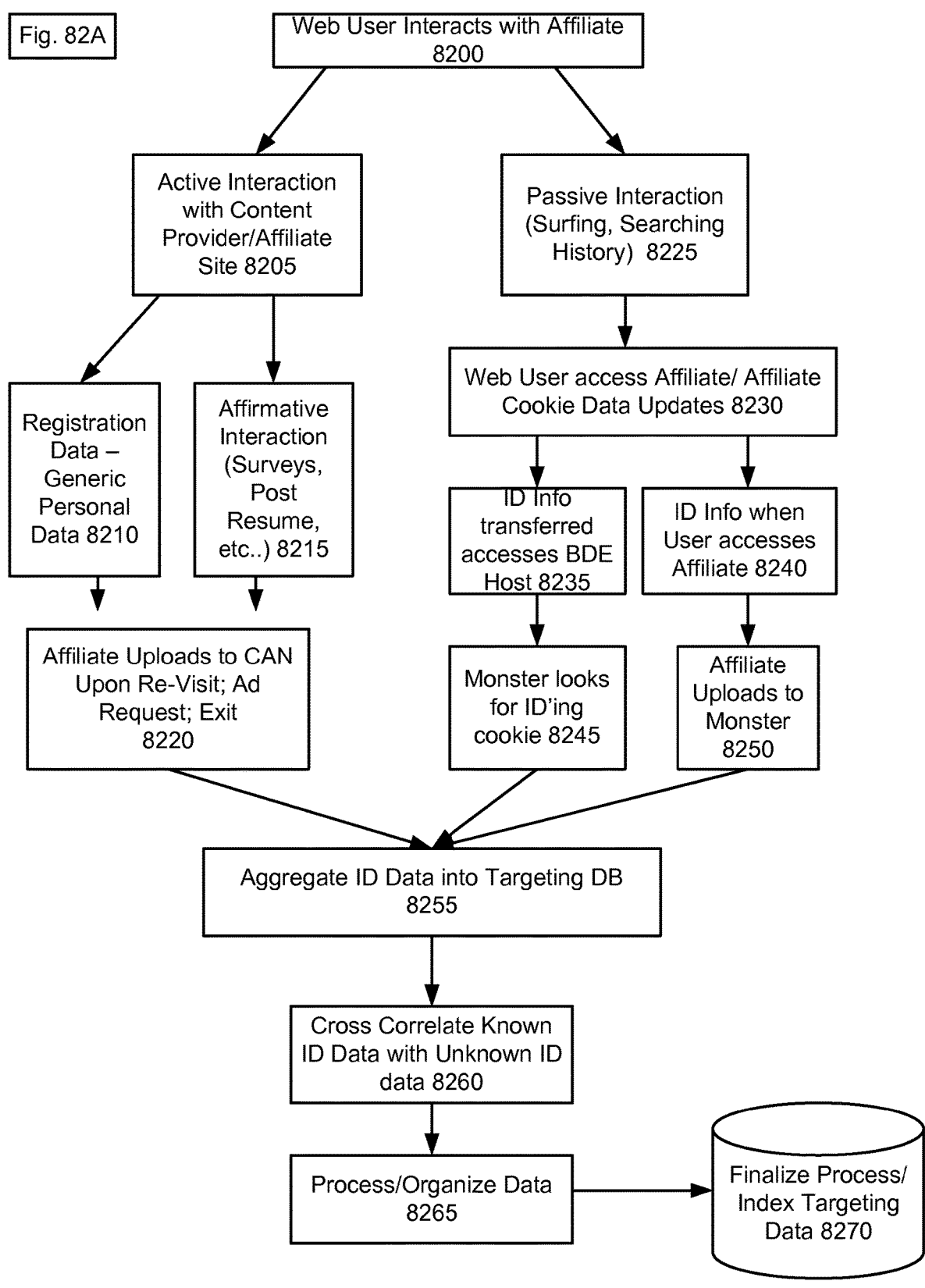

Fig. 82A

Web User Interacts with Affiliate 8200

Active Interaction with Content Provider/Affiliate Site 8205

Passive Interaction (Surfing, Searching History) 8225

Registration Data – Generic Personal Data 8210

Affirmative Interaction (Surveys, Post Resume, etc..) 8215

Web User access Affiliate/ Affiliate Cookie Data Updates 8230

ID Info transferred accesses BDE Host 8235

ID Info when User accesses Affiliate 8240

Affiliate Uploads to CAN Upon Re-Visit; Ad Request; Exit 8220

Monster looks for ID'ing cookie 8245

Affiliate Uploads to Monster 8250

Aggregate ID Data into Targeting DB 8255

Cross Correlate Known ID Data with Unknown ID data 8260

Process/Organize Data 8265

Finalize Process/ Index Targeting Data 8270

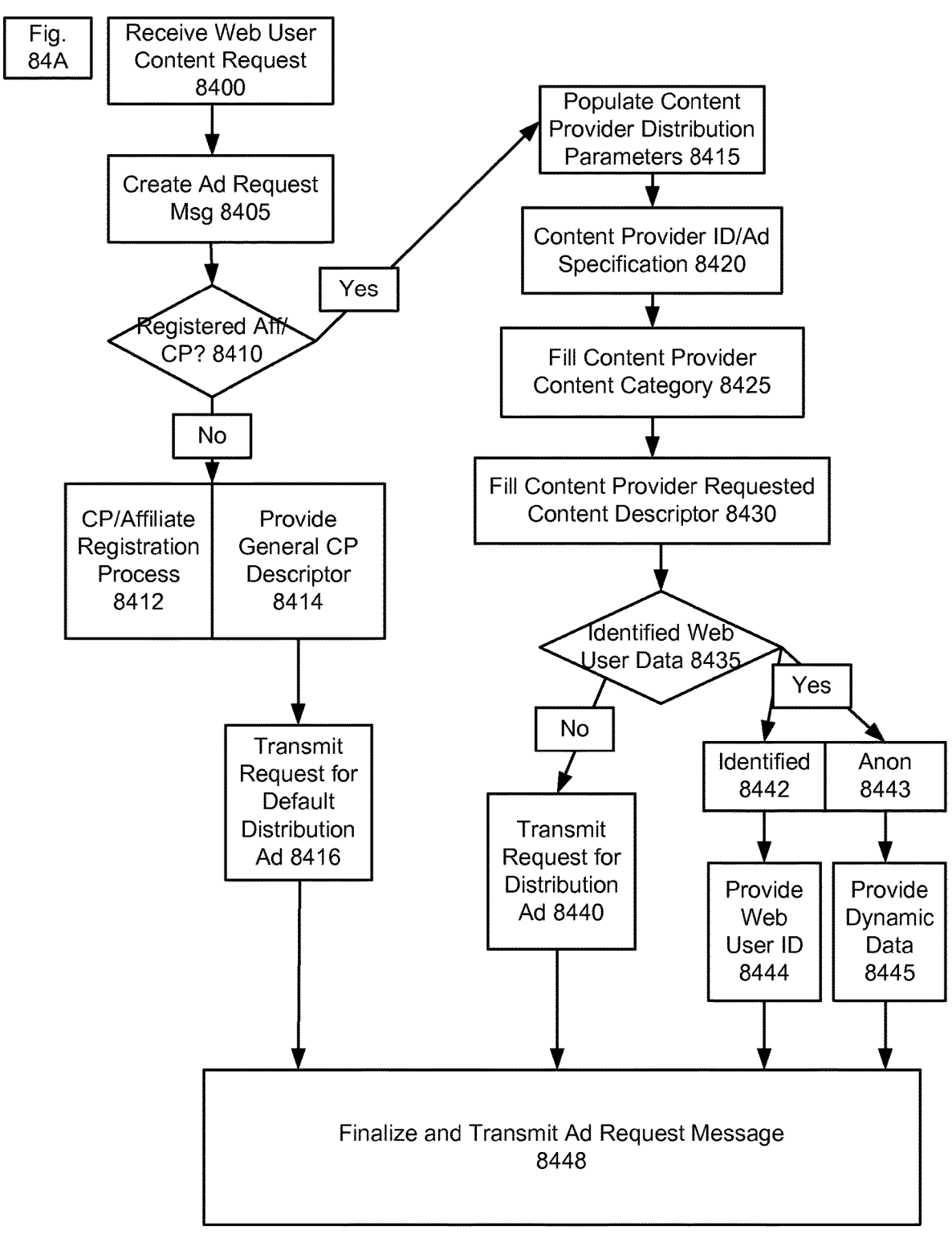

Fig. 84A

Receive Web User Content Request 8400

Create Ad Request Msg 8405

Registered Aff/ CP? 8410

Yes

Populate Content Provider Distribution Parameters 8415

Content Provider ID/Ad Specification 8420

Fill Content Provider Content Category 8425

Fill Content Provider Requested Content Descriptor 8430

Identified Web User Data 8435

No

CP/Affiliate Registration Process 8412

Provide General CP Descriptor 8414

Transmit Request for Default Distribution Ad 8416

No

Yes

Transmit Request for Distribution Ad 8440

Identified 8442

Anon 8443

Provide Web User ID 8444

Provide Dynamic Data 8445

Finalize and Transmit Ad Request Message 8448

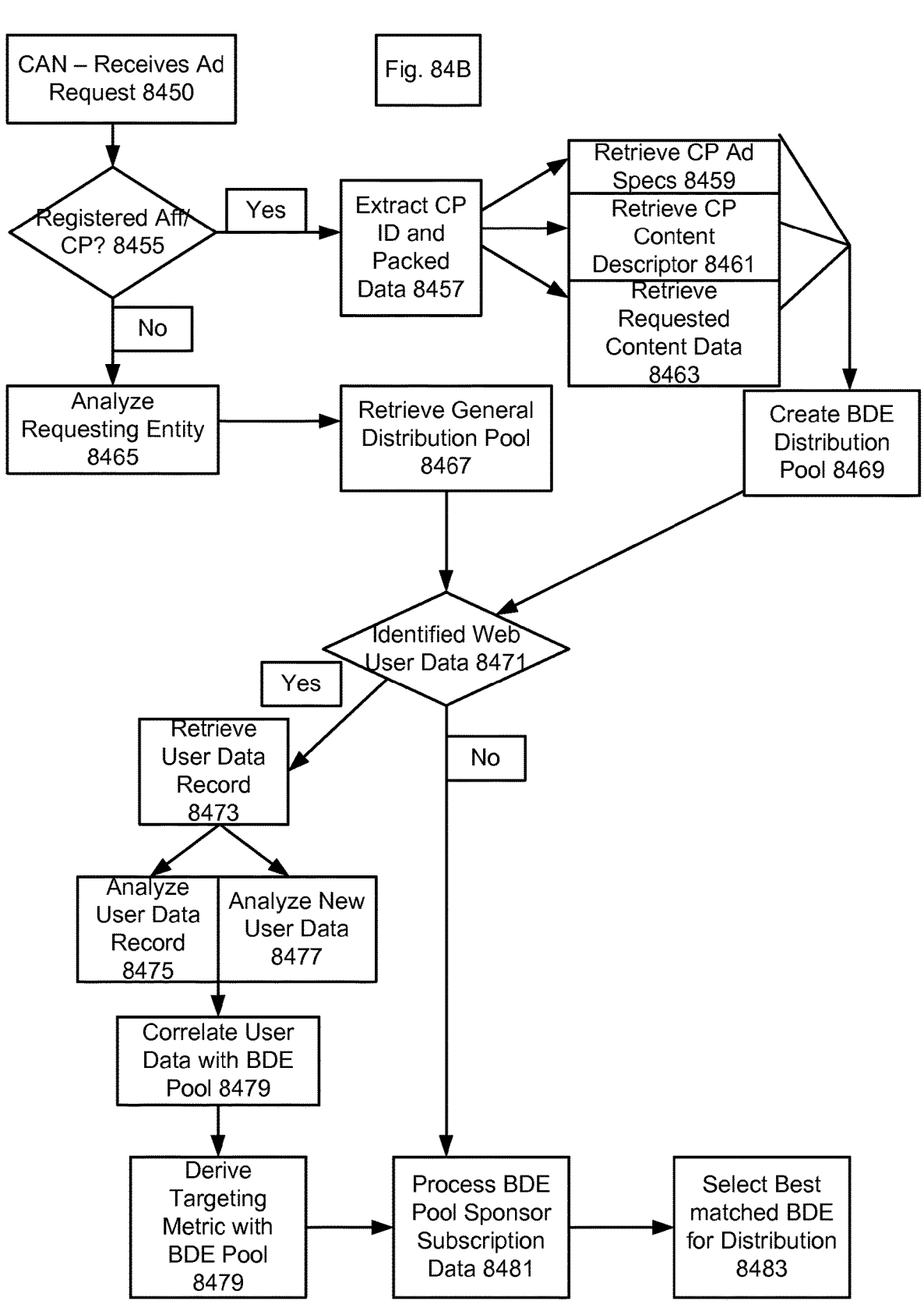

CAN – Receives Ad Request 8450

Fig. 84B

Registered Aff/ CP? 8455

Yes

Extract CP ID and Packed Data 8457

Retrieve CP Ad Specs 8459

Retrieve CP Content Descriptor 8461

Retrieve Requested Content Data 8463

No

Analyze Requesting Entity 8465

Retrieve General Distribution Pool 8467

Create BDE Distribution Pool 8469

Identified Web User Data 8471

Yes

Retrieve User Data Record 8473

No

Analyze User Data Record 8475

Analyze New User Data 8477

Correlate User Data with BDE Pool 8479

Derive Targeting Metric with BDE Pool 8479

Process BDE Pool Sponsor Subscription Data 8481

Select Best matched BDE for Distribution 8483

DISTRIBUTION/
INCORPORATION WITH CONTENT PROVIDER

8606

8622

8630
Affiliate Content
Servers

8620
Advertisement
Server

8625
Advertisement
Distributer
Server

FIGURE 90

Base Data Entry (BDE) 90 01

Job Title: Associate Director Climate Physics 90 05
Company: National Climate Labs (NCL) 90 10
Location: Miami, FL 90 15
Status: Full-time, Employee 90 20
Job Category: Science 90 25
Experience: 8+ Years 90 30
Career Level: Manager 90 35
Education Level: Doctorate 90 40
Salary: $200,000/yr 90 45
Tag: Leadership Opportunity in Climate Physics 90 50

Description: NCL is seeking an individual with proven scientific accomplishments and leadership qualities to guide its Climate Physics Group. This group is comprised of nationally recognized atmospheric research scientists and engineers working toward measurable improvements in climate change prediction. 90 55

Ad template 90 60

```
<Ad_DNA>
    <theme> stars </theme>
    <top> Job Title </top>
    <top_font>
        underlined Times
        New Roman
    </top_font>
    <top_font_size>
        190 pt.
    </top_font_size>
    <mid1> Company </mid1>
    <mid1_font>
        Times New Roman
    </mid1_font>
    <mid1_font_size>
        12 pt.
    </mid1_font_size>
    <bottom> Salary </bottom>
    <bottom_font>
        italics Times New
        Roman
    </bottom_font>
    <bottom_font_size>
        12 pt.
    </bottom_font_size>
</Ad_DNA>
```
90 65

Ad 90 70

<u>Associate Director Climate Physics</u>

National Climate Labs

Associate Director Climate

Physics

Hate it!                    Love it!

○  ○  ●  ○  ○    92 40

☆ ☆ ☆ ☆ ☆

Hate it!                    Love it!

○  ○  ●  ○  ○    92 45

Education: Doctorate or equivalent

Hate it!                    Love it!

○  ○  ●  ○  ○    92 50

$200,000/yr.

Hate it!                    Love it!

Associate Director Climate

Physics

☆ ☆ ☆ ☆ ☆

Education: Doctorate or equivalent $200,000/yr.

*Rate me! 92 35*

Hate it!                    Love it!

○  ○  ●  ○  ○

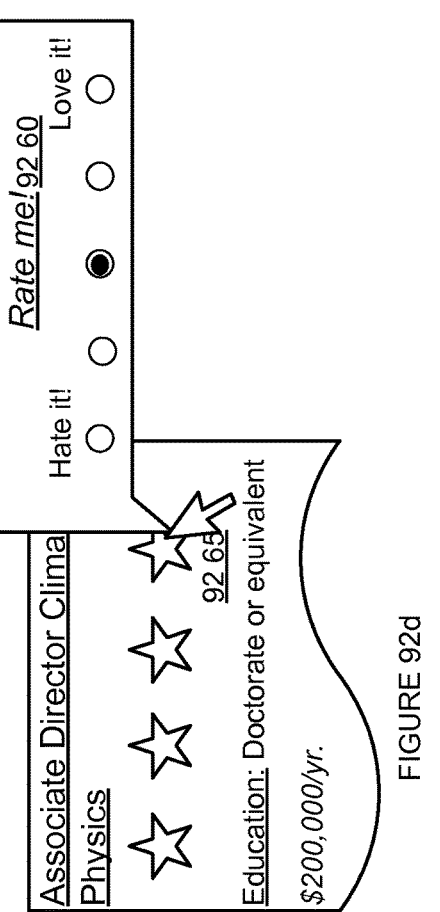

*Rate me! 92 60*

Hate it!                    Love it!

○  ○  ●  ○  ○

Associate Director Clima

Physics

☆ ☆ ☆ ☆ ☆

92 65

Education: Doctorate or equivalent $200,000/yr.

FIGURE 92d

| Job Title | Company | Location | Date Applied | Corres. | Status | Score |
|-----------|---------|----------|--------------|---------|--------|-------|
| 10701 | 10702 | 10703 | 10704 | 10705 | 10706 | 10707 |
| Web Developer | Monster | Maynard, Ma | 1/9 | 10 | Offer | 95 |
| Web Developer | Monster | Maynard, Ma | 1/10 | 7 | HR Rev. | 95 |
| Web Developer | Monster | Maynard, Ma | 1/12 | 3 | 2nd Int. | 95 |
| Web Developer | Monster | Maynard, Ma | 2/15 | 2 | Opened | 95 |
| Web Developer | Monster | Maynard, Ma | 3/15 | 1 | Received | 95 |
| Web Developer | Monster | Maynard, Ma | ------- | 0 | --------- | 95 |
| Web Developer | Monster | Maynard, Ma | ------- | 0 | --------- | 95 |
| Web Developer | Monster | Maynard, Ma | ------- | 0 | --------- | 95 |
| Web Developer | Monster | Maynard, Ma | ------- | 0 | --------- | 95 |
| Web Developer | Monster | Maynard, Ma | ------- | 0 | --------- | 95 |
| Web Developer | Monster | Maynard, Ma | ------- | 0 | --------- | 95 |

FIG. 107A

| User Rating | Job Title | Company | Location | Date Applied | Corres. | Status | Score |
|-------------|-----------|---------|----------|--------------|---------|--------|-------|
| 10715 | 10701 | 10702 | 10703 | 10704 | 10705 | 10706 | 10707 |
| ☆★★★★ | Web Developer | Monster | Maynard, Ma | 1/9 | 10 | Offer | 95 |
| ☆☆★★★ | Web Developer | Monster | Maynard, Ma | 1/10 | 7 | HR Rev. | 95 |
| ★★★★★ | Web Developer | Monster | Maynard, Ma | 1/12 | 3 | 2nd Int. | 95 |
| ☆☆☆★★ | Web Developer | Monster | Maynard, Ma | 2/15 | 2 | Opened | 95 |
| ☆★★★★ | Web Developer | Monster | Maynard, Ma | 3/15 | 1 | Received | 95 |
| ☆★★★★ | Web Developer | Monster | Maynard, Ma | ------- | 0 | --------- | 95 |
| ☆☆★★★ | Web Developer | Monster | Maynard, Ma | ------- | 0 | --------- | 95 |
| ☆★★★★ | Web Developer | Monster | Maynard, Ma | ------- | 0 | --------- | 95 |
| ☆☆☆★★ | Web Developer | Monster | Maynard, Ma | ------- | 0 | --------- | 95 |
| ☆☆★★★ | Web Developer | Monster | Maynard, Ma | ------- | 0 | --------- | 95 |
| ☆☆★★★ | Web Developer | Monster | Maynard, Ma | ------- | 0 | --------- | 95 |

FIG. 107C

Software Engineer

Search Jobs | My Monster | For Employers

ABC Software Co.

10812

10804

10802

10807

10808

10813

Starting Pay: $100,000
Job Location:
New York, New York

Job Description:
Will design, develop and maintain software on Microsoft .Net platform. Serve as technical lead on development efforts, including participating in requirements analysis and design. Will have responsibility for developing solutions for all tiers of the application; code-behinds, controls, middle-tier business components, database layer, etc. Assist in formulating standards and development practices across multiple related teams.

Qualifications:
* Two or more years of extensive experience with C# and ASP.NET is ideal.
* Knowledge in OO development principles, multi-tier web application design and relational database principles required.
* History of delivering XML-based, Webservice, Component-Based and Multi-Threaded applications to production is desired.
* Experience working with large project team development environments.
* Good fundamental and hands on knowledge of with MS SQL Server.
* Strong Analytical Skills and good problem solving skills.
* Experience working in a regionally distributed development group.
* Prior use of NAnt, NUnit, NDoc and CruiseControl.Net, or similar products would be a plus.

The Benefits:
Health benefits:
Blue Cross and Blue Shield PPO Program
Guardian DMO and Dental PDO Plans
Vision care
Flexible Spending Accounts
Supplement life insurance for employees and their families
Discounted auto and homeowners insurance

Employer provided benefits:
Life Insurance
Short Term and Long Term Disability Plans
Employee Assistance Plan
Competitive Paid Time Off program
Education Tuition Reimbursement Plan for Continuing Education

APPLY NOW

Example Logic Flow: Cross-Network Social Graph Updating (CN-SGU) component

Example Logic Flow: Cross-Network Social Graph Updating (CN-SGU) component

Example Logic Flow: Cross-Network User Profile Sensitive Query Generation (CN-UPSQG) component

SOCIAL MATCH PLATFORM APPARATUS, METHOD, AND SYSTEM

PRIORITY CLAIM

Applicant hereby claims benefit to priority under 35 USC § 120 as a continuation of Ser. No. 13/982,950, filed Dec. 18, 2014, entitled "Social Match Platform Apparatuses, Methods and Systems", which in turn claims priority under 35 USC, §§ 371, 365 as a national stage as a national stage entry of: PCT application serial no. PCT/US12/43905, filed Jun. 23, 2012 and entitled "Social Match Platform Apparatuses, Methods and Systems", which in turn claims priority under 35 USC § 119 to U.S. Provisional application Ser. No. 61/501,095, filed Jun. 24, 2011, entitled "Social Match Platform Apparatuses, Methods and Systems,". The entire contents of the aforementioned applications are herein expressly incorporated by reference.

The entire contents of the aforementioned application(s) are expressly incorporated by reference herein.

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations are directed generally to matching people, companies, organizations, and/or the like that may benefit from being connected (e.g., job candidates and recruiters, donors and charitable organizations, advertisers and target audiences, self forming groups, and/or the like) using a social platform, and more particularly, to SOCIAL MATCH PLATFORM APPARATUSES, METHODS AND SYSTEMS (hereinafter "SMP").

BACKGROUND

Multiple social networking websites have been created over the last few years. Some examples include Facebook, Linkedin, MySpace, Orkut, Friendster, and Twitter. Some social networking websites provide Application Programming Interfaces (APIs) to allow others to programmatically access data collected by these social networking websites.

BRIEF DESCRIPTION OF THE DRAWINGS

The accompanying appendices and/or drawings illustrate various non-limiting, example, innovative aspects in accordance with the present descriptions:

FIG. 3B-3F show various screen shots of implementations of the SMP;

FIGS. 18A, 18B, and 18C illustrate flow diagrams of resume data registration and user profile creation processes associated with embodiments of the invention;

FIGS. 19A and 19B illustrate flow diagrams associated with resume data submission processes;

FIGS. 20A and 20B illustrate flow diagrams associated with form population and resume/cover letter generation processes;

FIGS. 21A, 21B, and 21C illustrate examples of invocation of the AODSA tool according to embodiments of the invention;

FIG. 23 illustrates additional aspects of the ad server AODSA tool illustrated in FIG. 22;

FIGS. 37A-B show an implementation of logic flow for development and of a path-dependent statistical model in another embodiment of CSE operation.

FIG. 50 is a block diagram illustrating job carousel embodiments of the APT;

FIG. 61A-61B illustrate aspects of a system user ad management tool, according to an embodiment of the invention;

FIG. 62A illustrates aspects of a base data entry, according to an embodiment of the invention;

FIGS. 74A-74E illustrate a flow diagram of the advertisement template retrieval process, as well as examples of advertisement templates, according to an embodiment of the system;

FIG. 75B illustrates an example of a base data entry according to an embodiment of the system;

FIG. 76B illustrates an example of a landing page generated by an embodiment of the system;

FIG. 77 is an ad creation management dashboard, according an embodiment of the system;

FIG. 79 is a high-level diagram illustrating aspects of the advertisement targeting/distribution process;

FIGS. 82A-82B illustrates aspects of web user identification;

FIGS. 84A-84B illustrates aspects of creating advertisement request message and processing the advertisement request message, respectively, according to an implementation of the system;

FIG. 90 illustrates Ad generation in according to a system embodiment;

FIGS. 92*a-d* show embodiments of Ads administering passive and active performance metric registration;

FIG. 107A discloses an embodiment of an application history screen in accordance with the present disclosure;

Figure 107B:
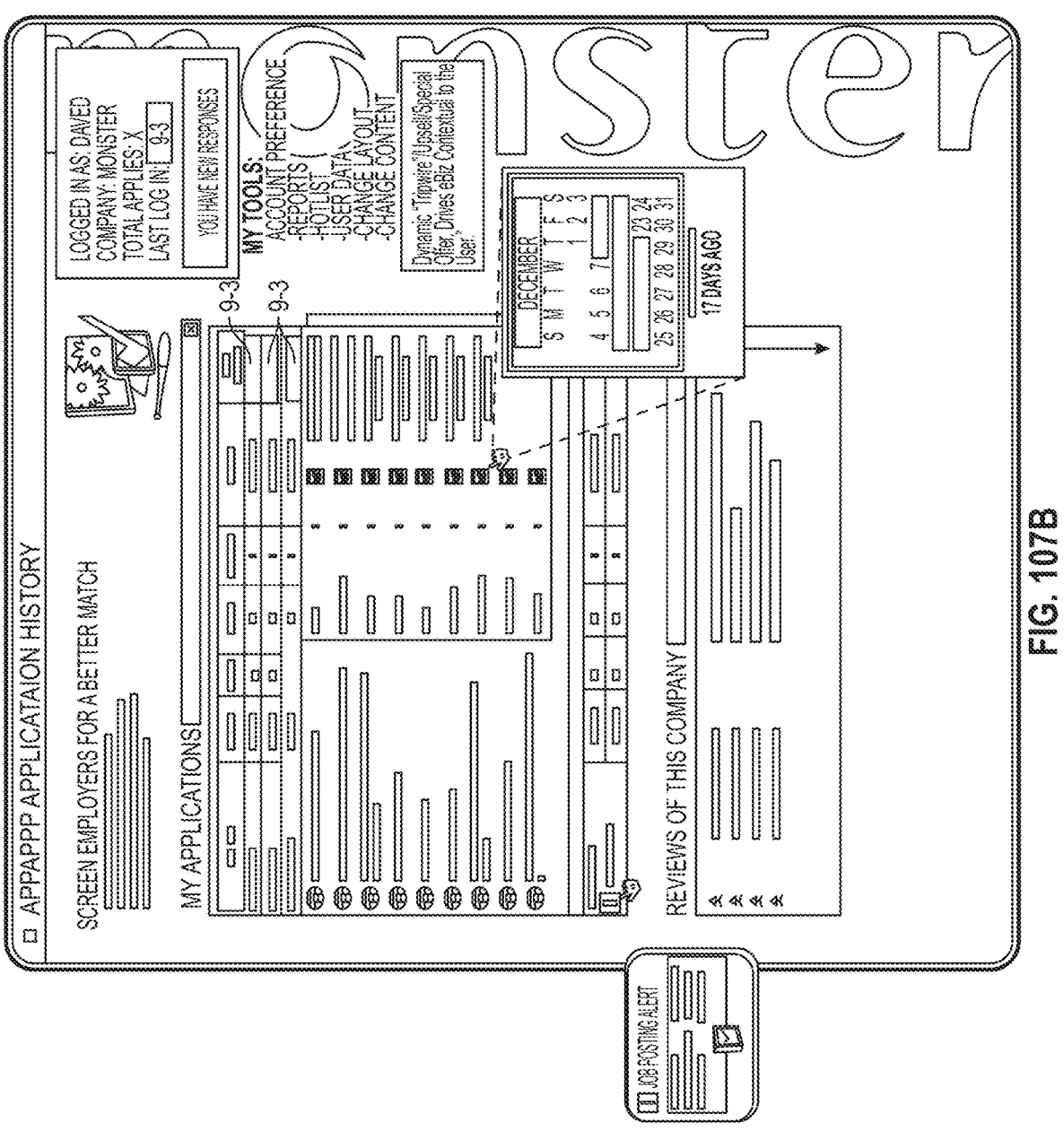
FIG. 107B discloses a particular implementation of an application history screen.
Figure 108A:
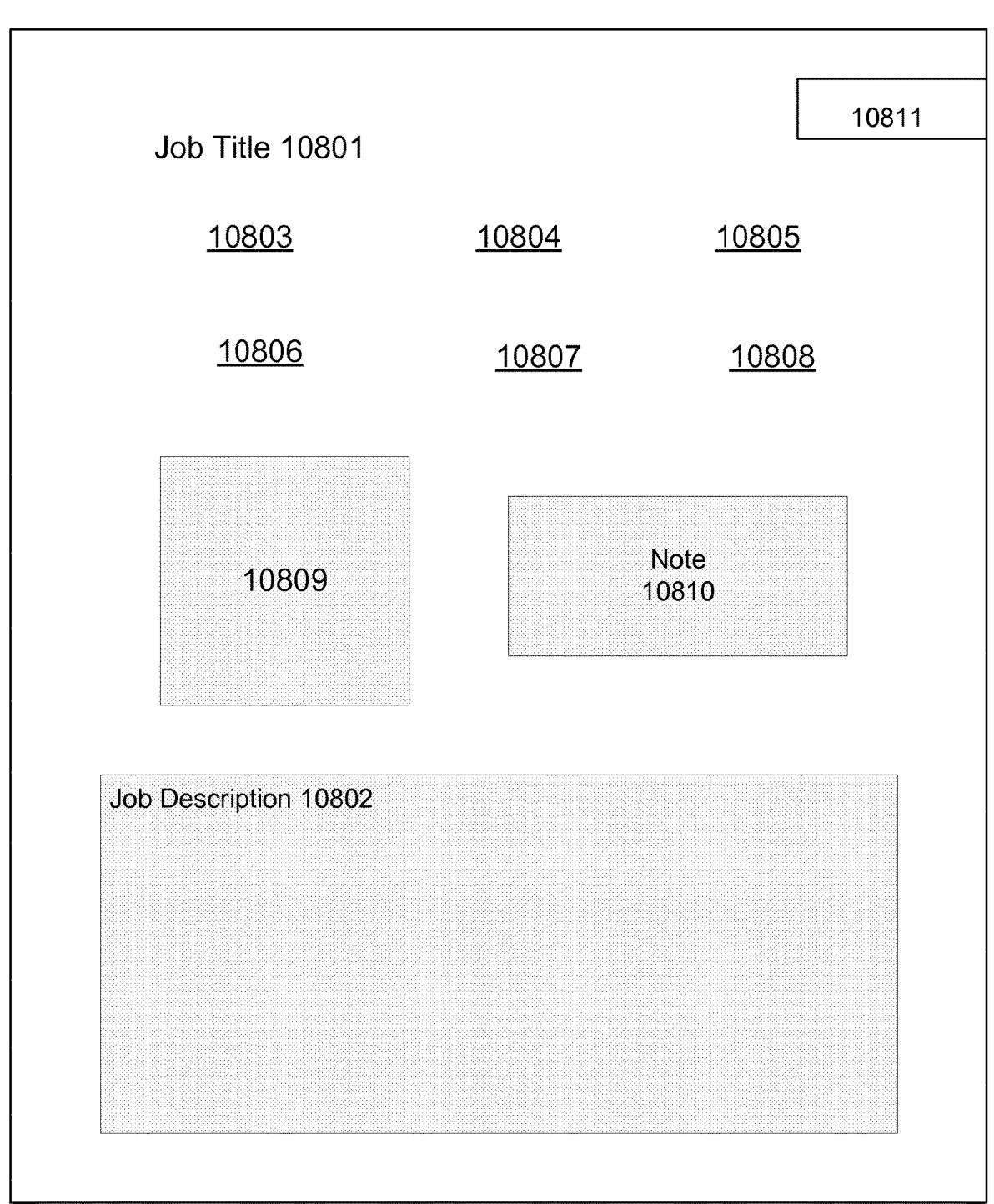
Figure 108B:
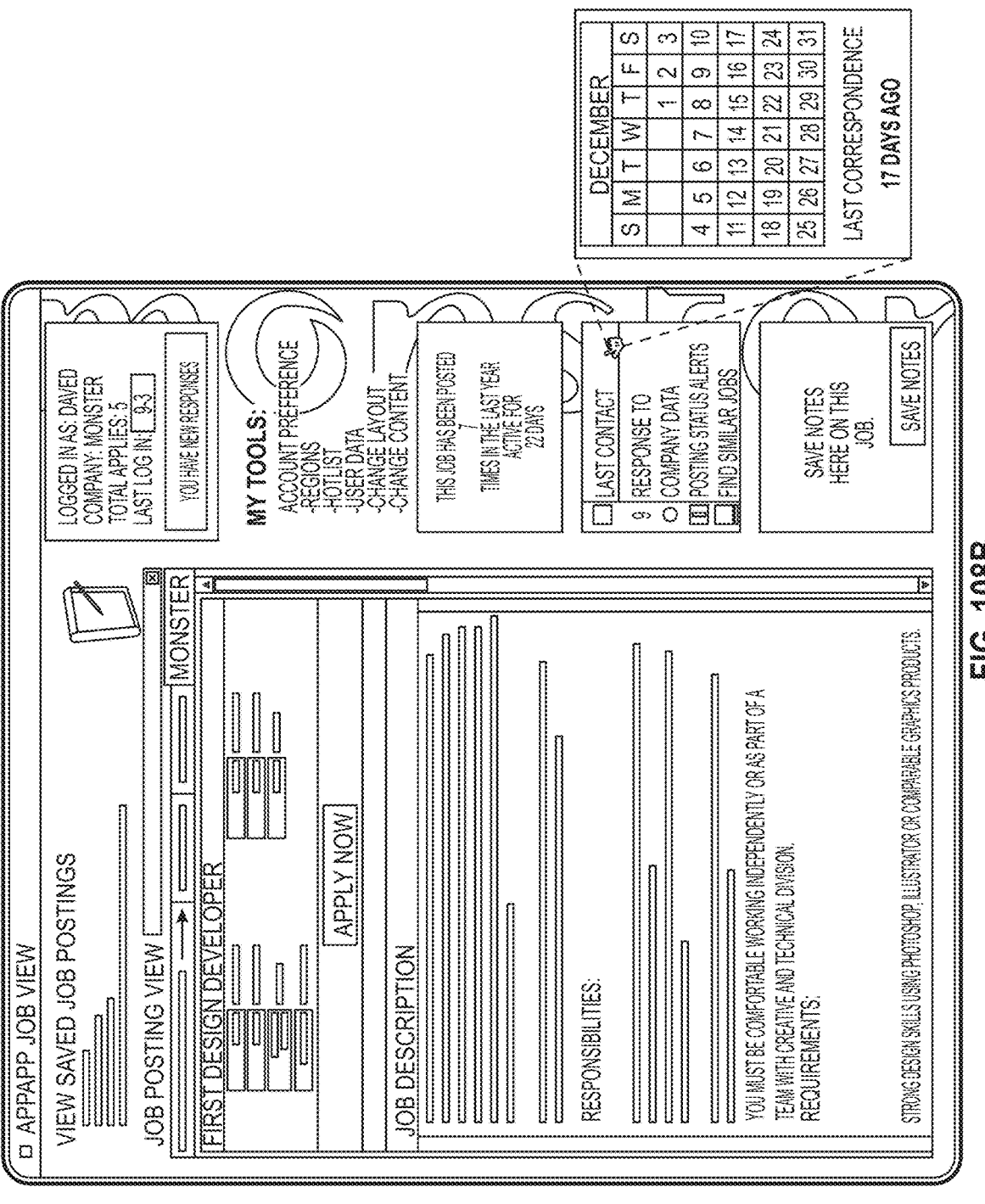
Figure 109A:
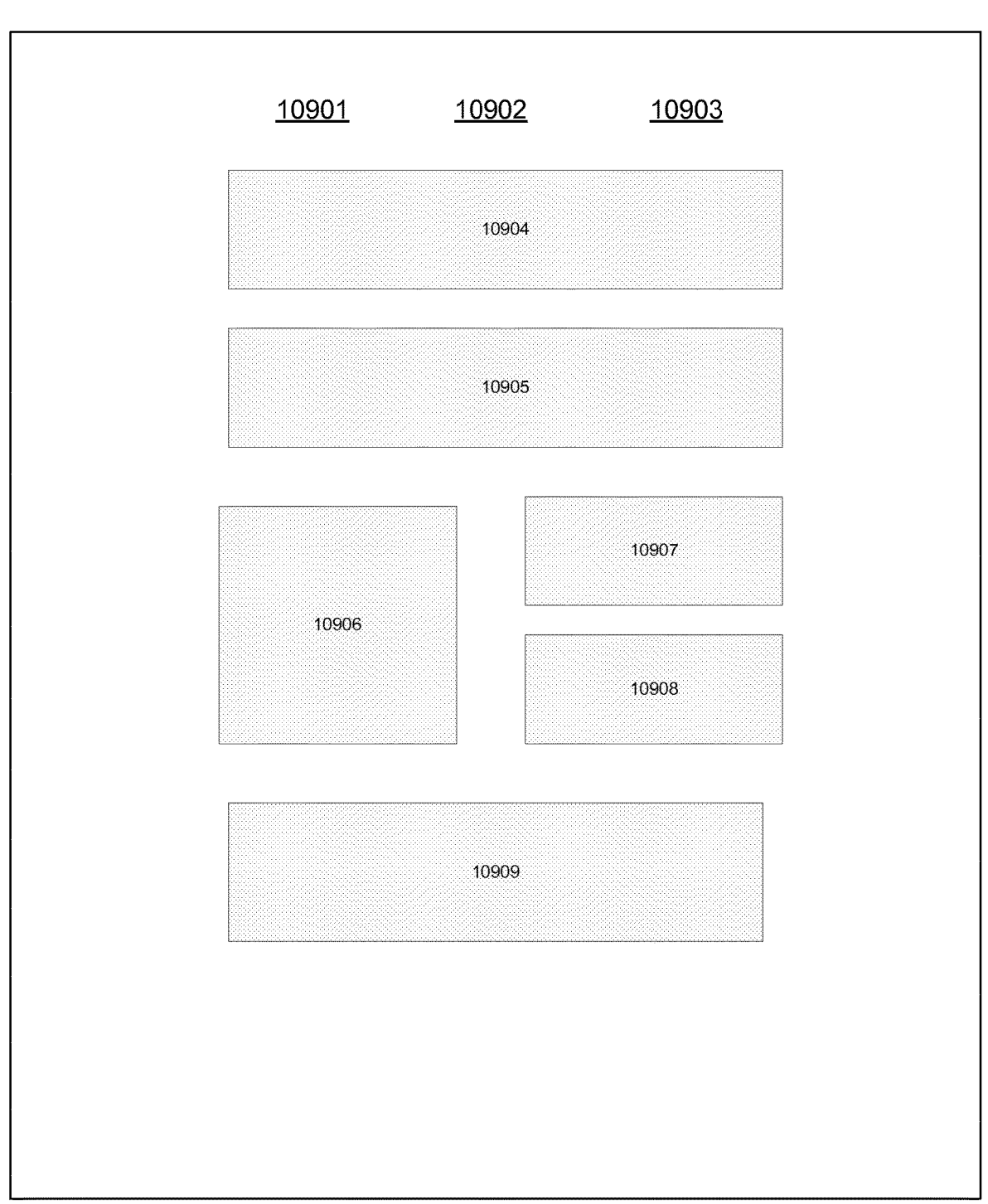
Figure 109B:
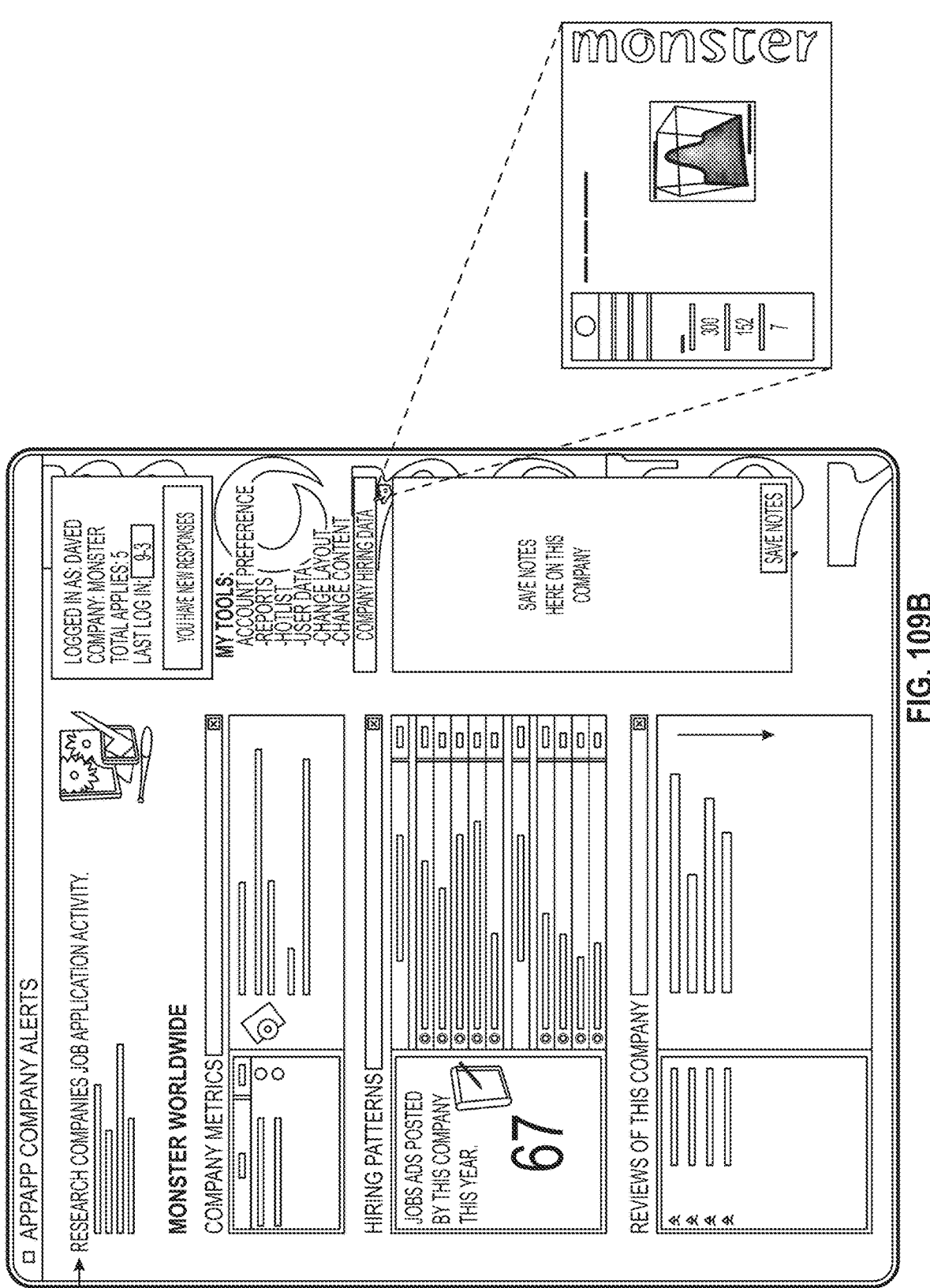
Figure 111:
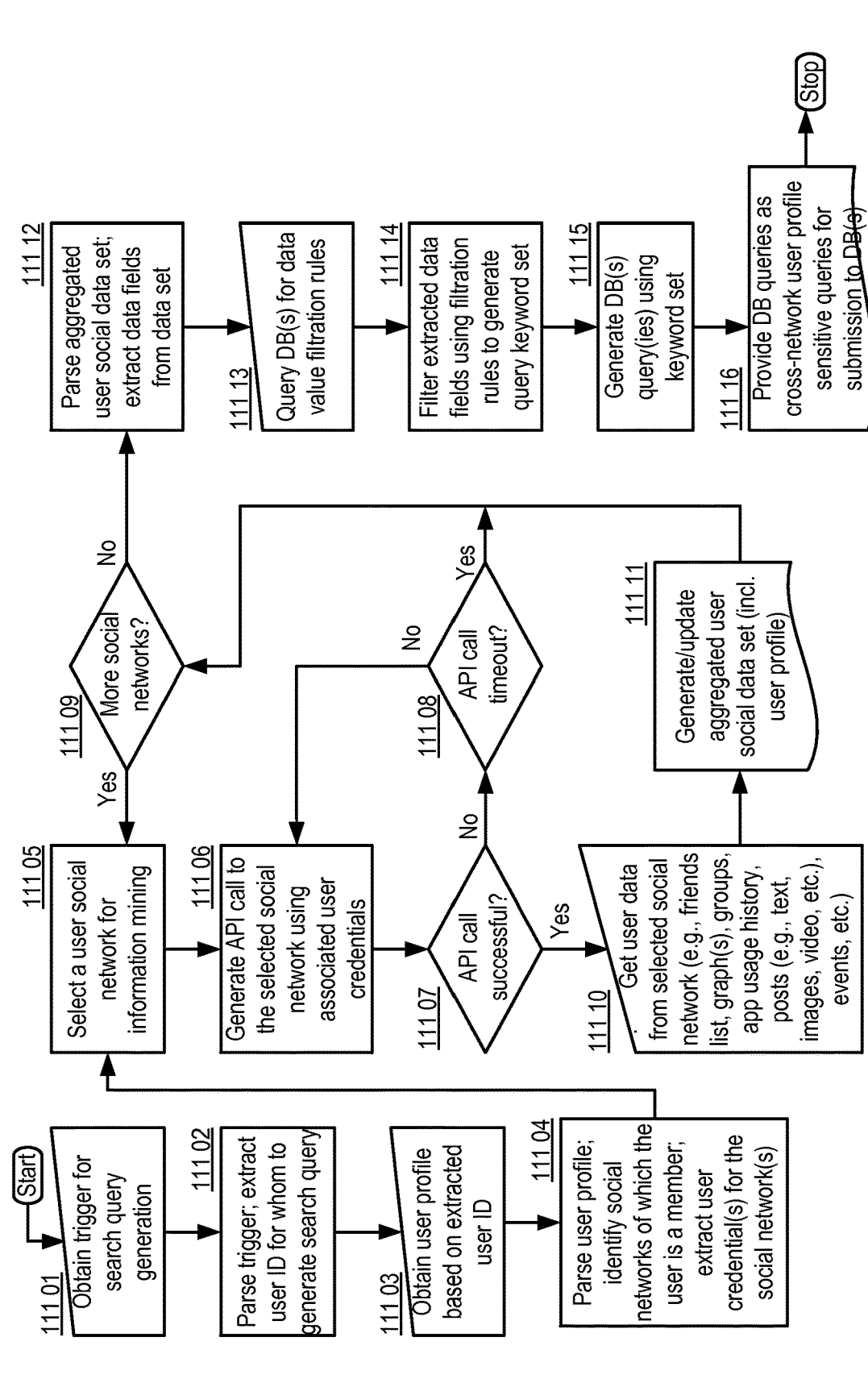
Figure 112:
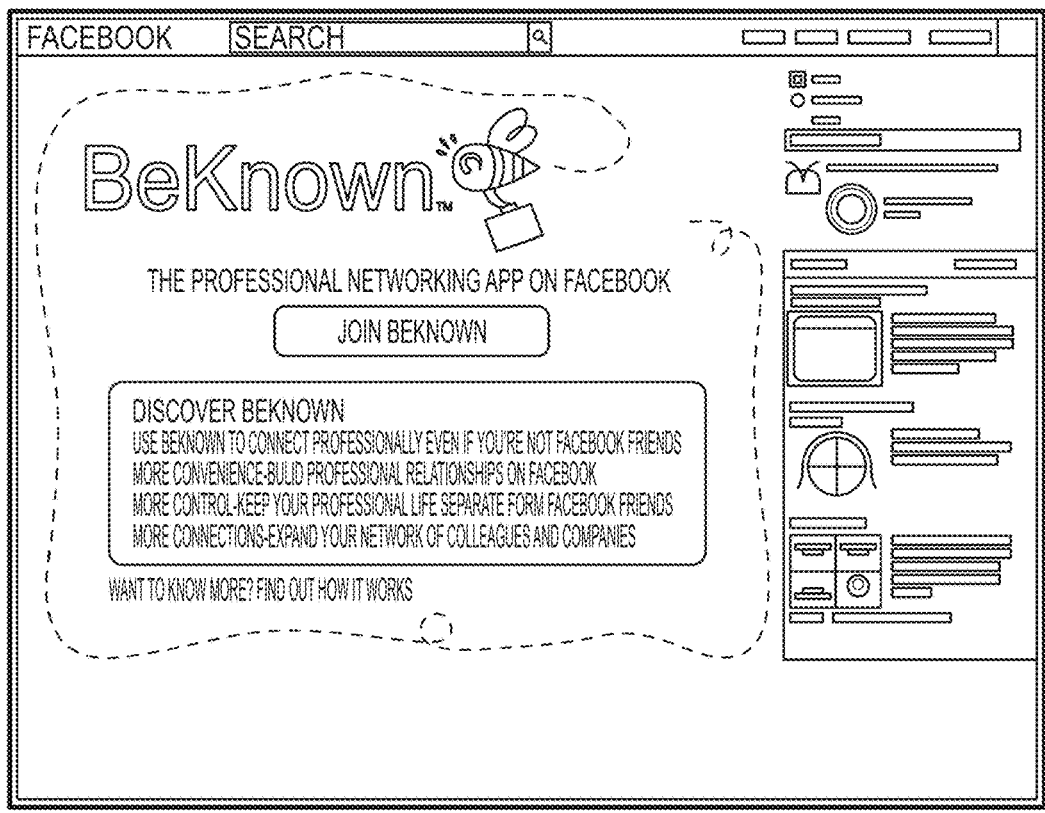
Figure 113:
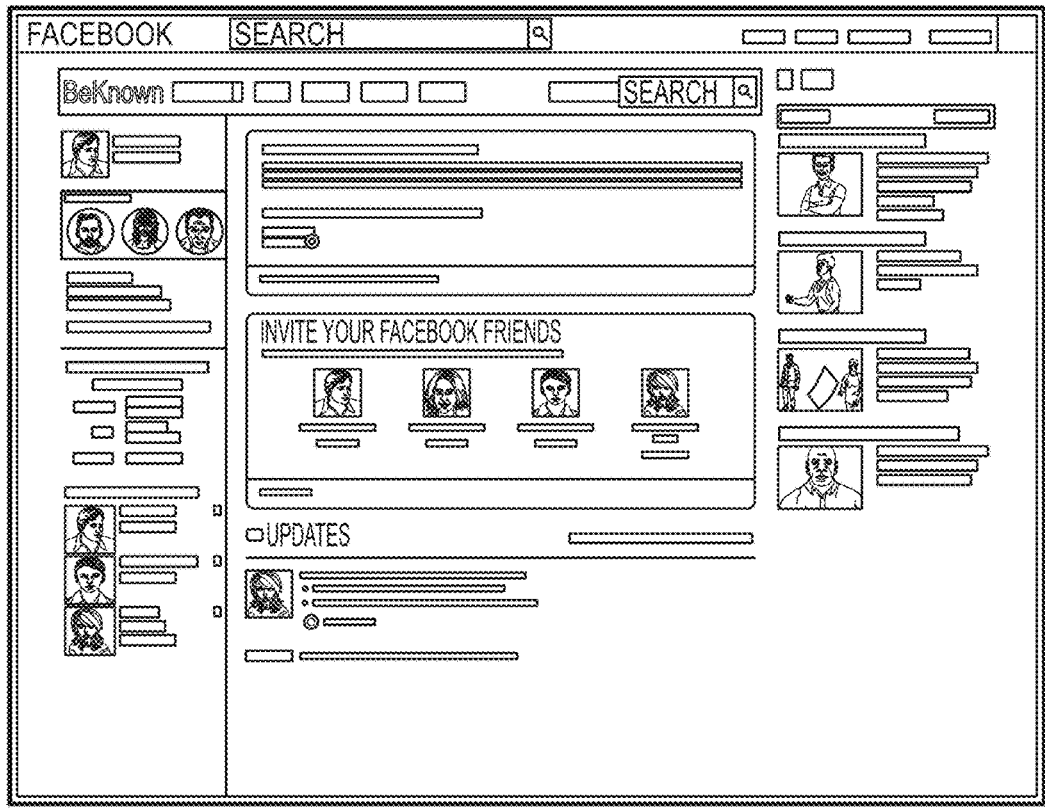
Figure 114:
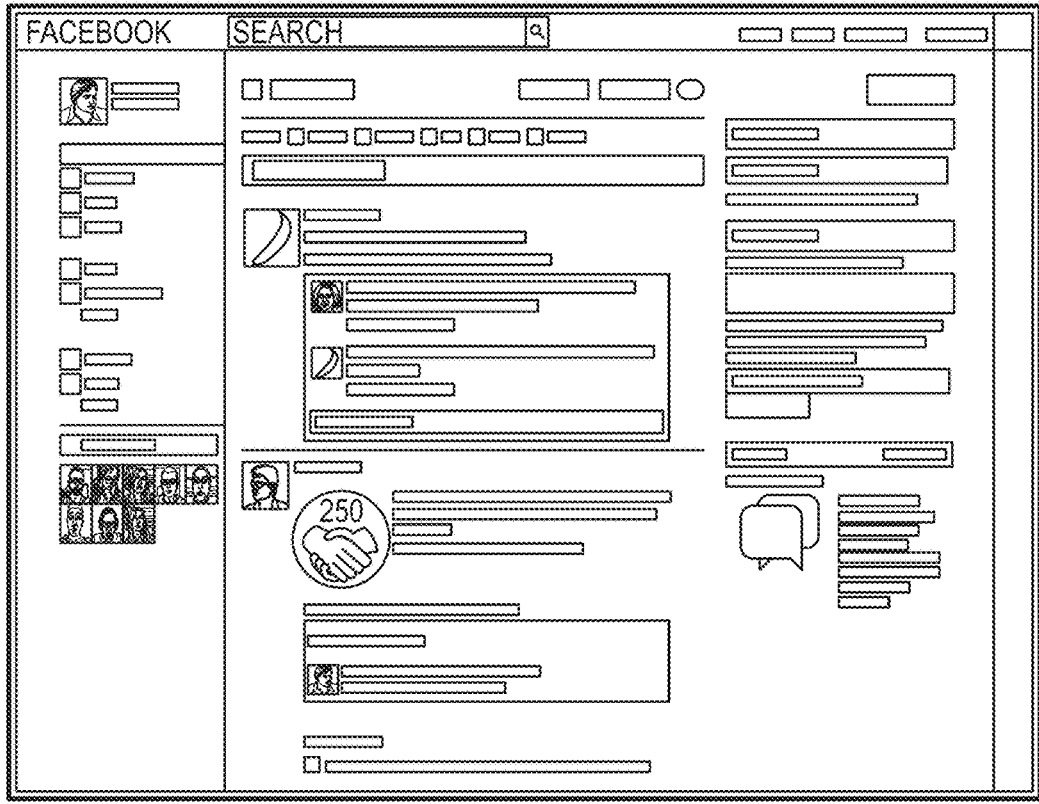
Figure 115:
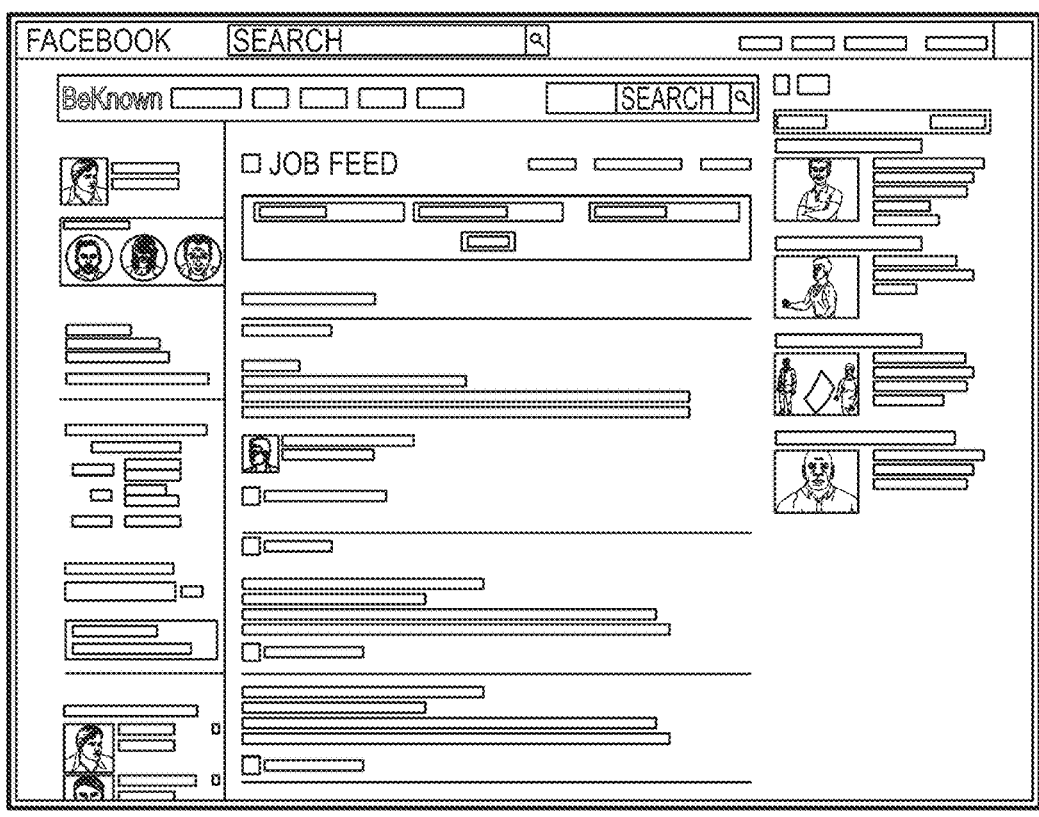
Figure 116:
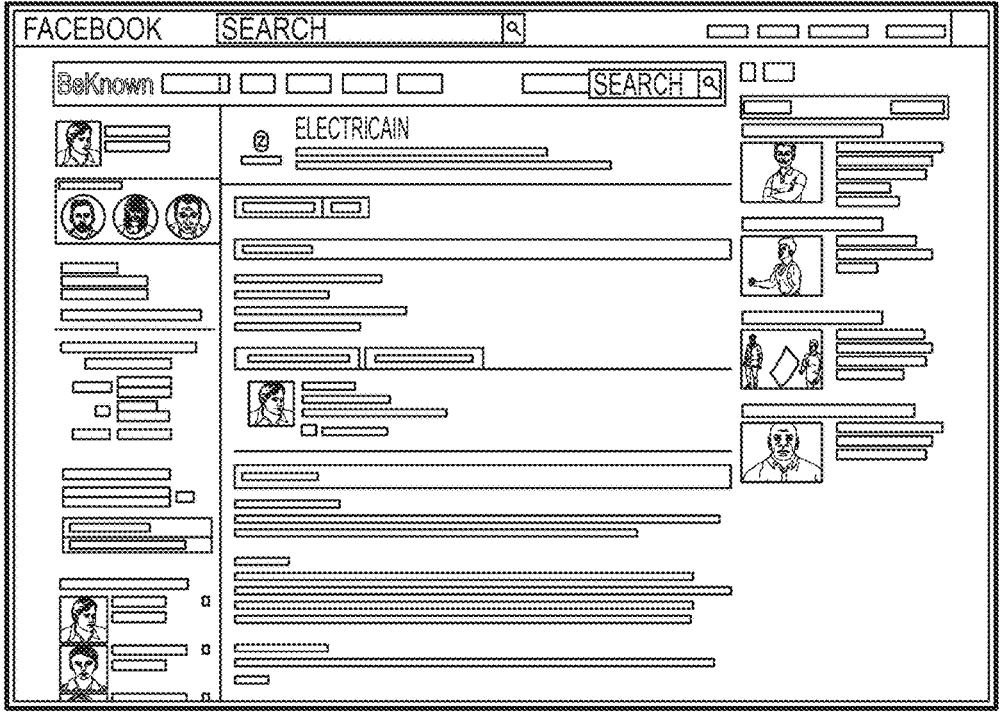
Figure 117:
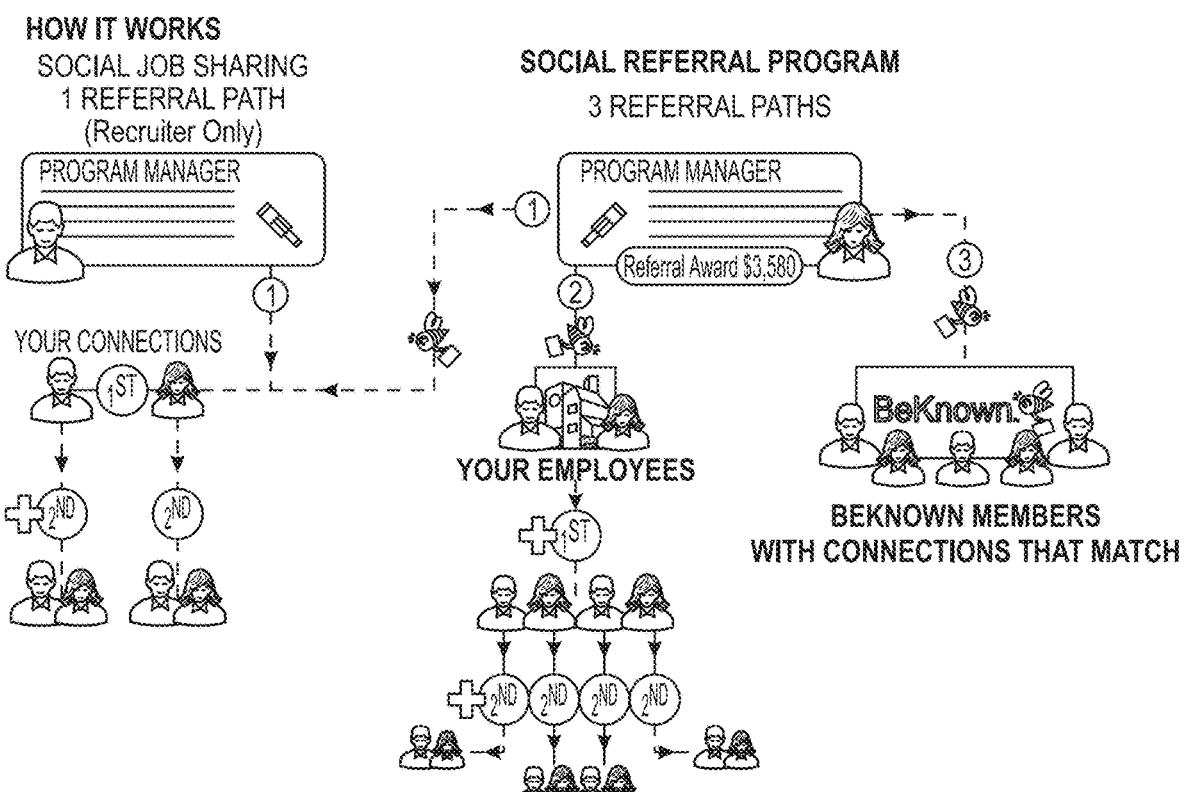
Figure 118:
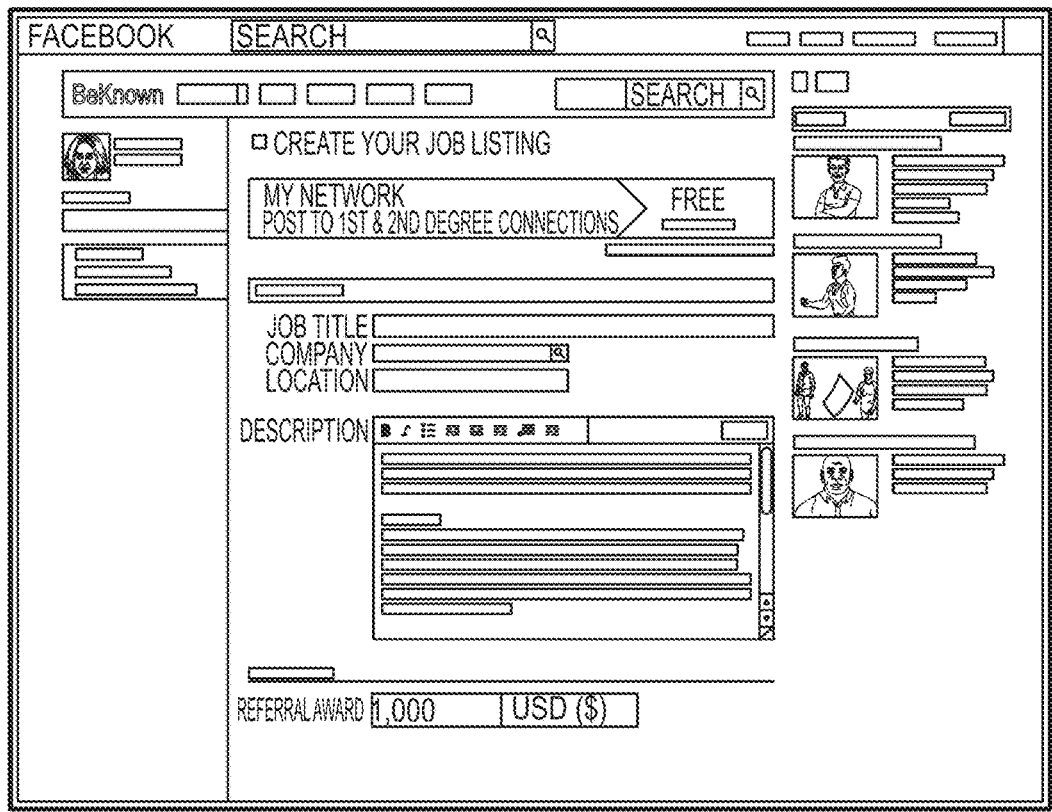
Figure 119:
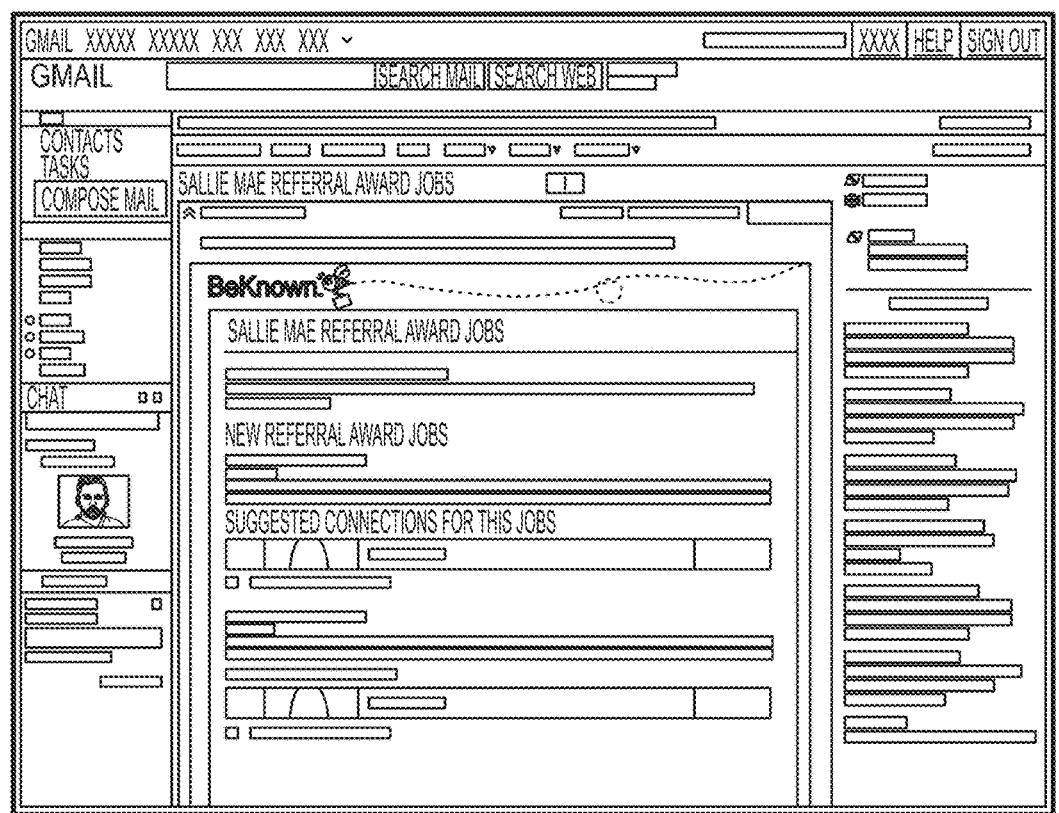
Figure 120:
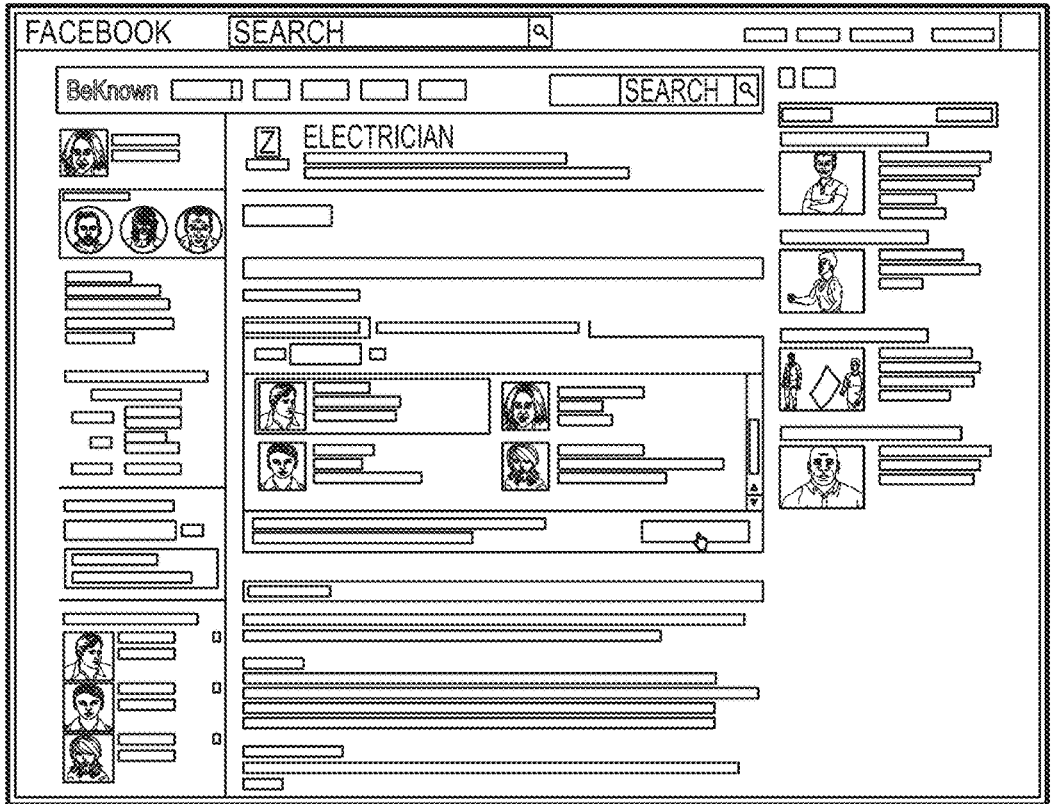
Figure 121:
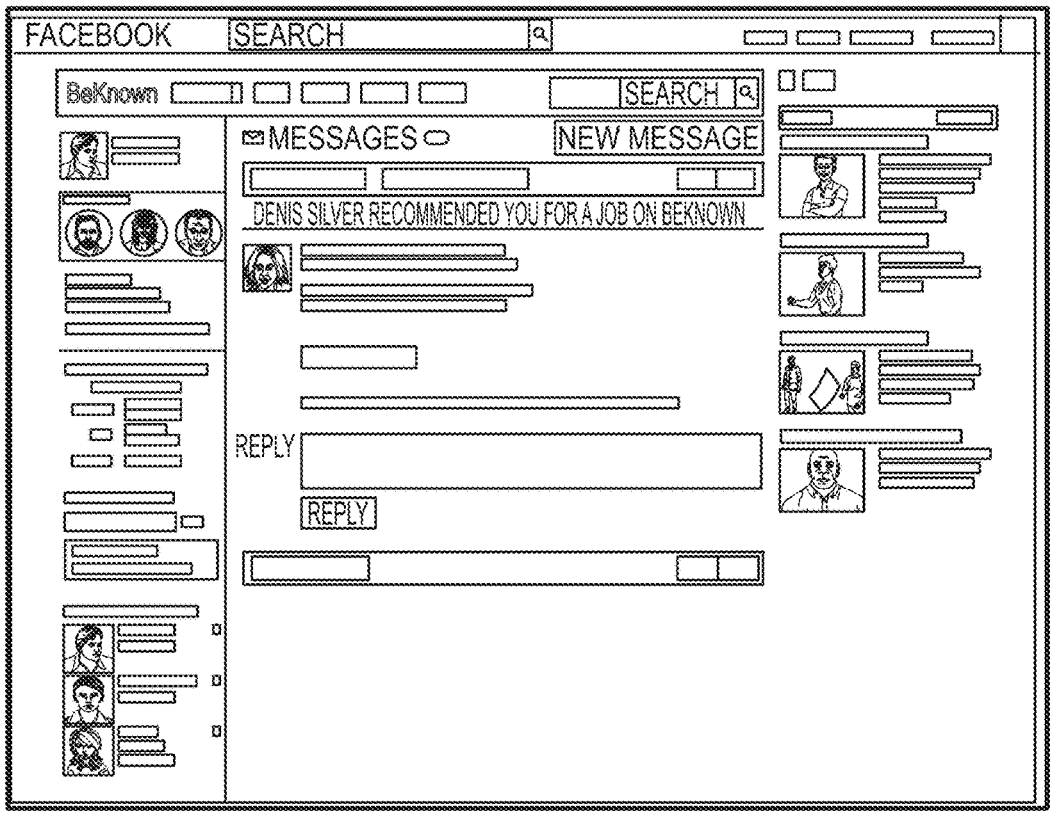
Figure 122:
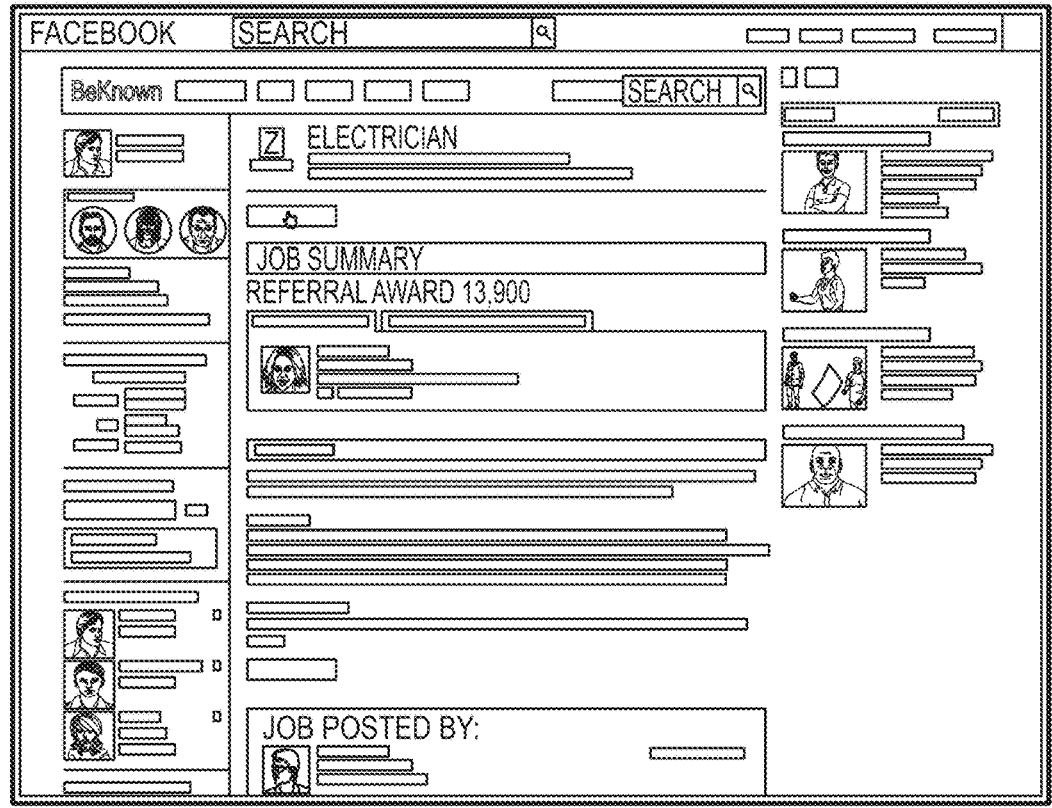
Figure 123:
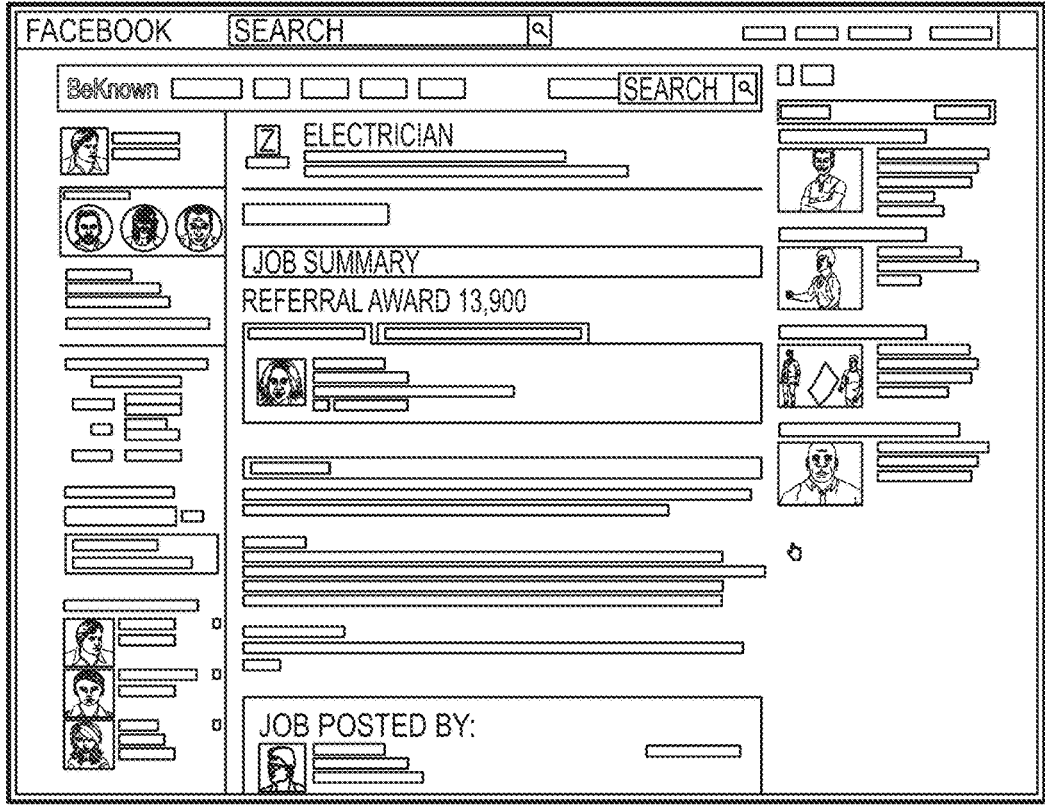
Figure 124:
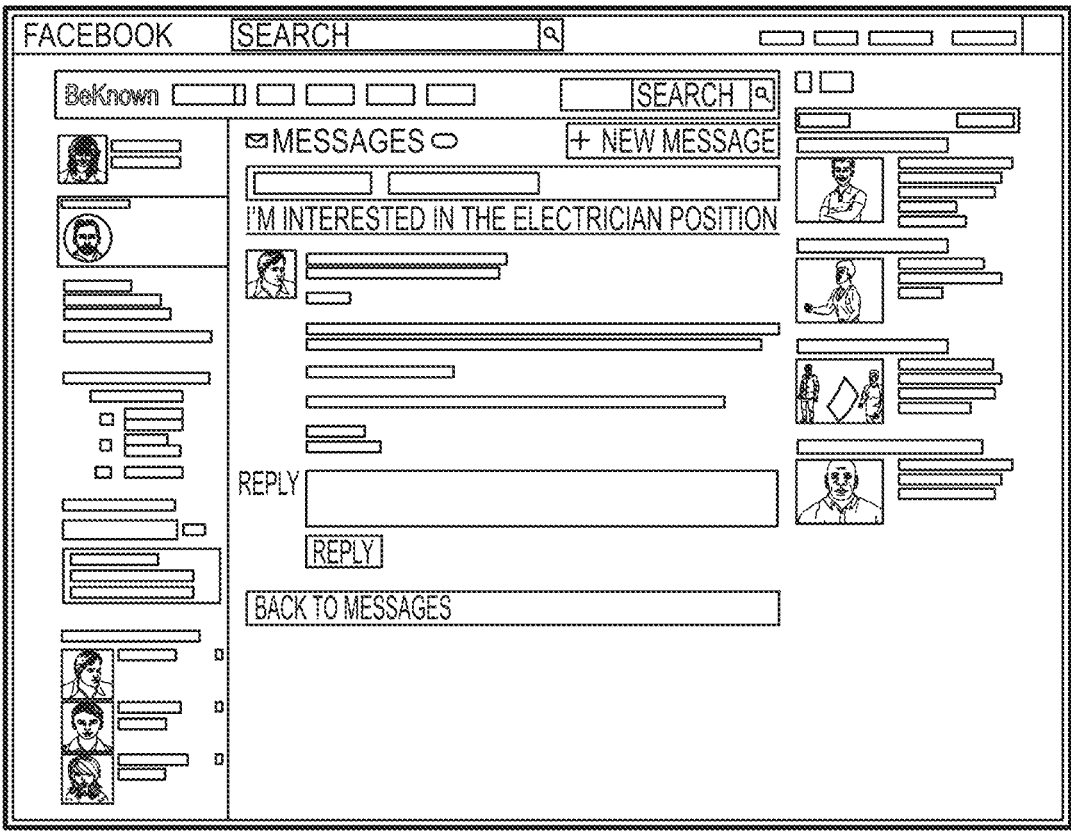

FIG. 107C discloses a further embodiment of an application history screen in accordance with the present disclosure;

FIG. 108A discloses an embodiment of a job view screen in accordance with the present disclosure;

FIG. 108B discloses a particular implementation of a job view screen;

FIG. 108C discloses a further embodiment of a job view screen in accordance with the present disclosure;

FIG. 109A discloses an embodiment of a company metrics screen in accordance with the present disclosure;

FIG. 109B discloses a particular implementation of a company metrics screen;

FIG. 110 A-B disclose a logic flow diagram for cross-network social graph updating in an embodiment of the SMP;

FIG. 111 discloses a logic flow diagram for cross-network user profile sensitive query generation in one embodiment of the SMP;

FIGS. 112-124 disclose additional examples of SMP embodiments.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Introduction

The SMP facilitates matching of people, companies, organizations, and/or the like that may benefit from being connected using information such as who you are, what you do, where you are located, what you are interested in, and/or the like using information sources such as social network data, location data, news and social media data, and/or the like. For example, a job candidate seeking a position at a company may benefit from having a contact at the company. The contact may be able to put the candidate in touch with a recruiter, recommend the candidate, help expedite processing of the candidate's job application, and/or the like. The SMP may facilitate these actions utilizing information regarding the candidate's social network and/or affiliation with companies and/or organizations, location, profile preferences, skills, experiences, education, and/or the like, and may also utilize such information to recommend relevant jobs to the candidate. Similarly, a recruiter seeking job candidates may benefit from having access to relevant contacts. Such contacts may facilitate finding a candidate, verifying the candidate's suitability and/or abilities, putting the recruiter in touch with the candidate, and/or the like. The SMP may facilitate these actions utilizing information regarding the recruiter's social network and/or affiliation with companies and/or organizations, location, profile preferences, skills, experiences, education, and/or the like, and may also utilize such information to recommend relevant candidates to the recruiter. Furthermore, a candidate and a recruiter may benefit from interacting with each other, and the SMP may facilitate such interaction via social meetup components (e.g., provided as part of the SMP and/or via a third party).

The SMP may be integrated into a social network or may be a stand alone application. In one embodiment, the SMP may be integrated into Facebook and be used as a Facebook application. In this instance, a user may be able to keep contacts on the SMP separate from their social contacts on the social network, thereby creating separation between personal or social contacts and professional contacts. Additionally, by integrating the SMP with a social networking site such as Facebook, users are able to build professional relationships in a convenient location—in this case, a website they likely visit frequently. This may also be integrated into a mobile application for the social networking site and/or it may be a standalone mobile application capable of sourcing information from one or more social networking sites.

In some implementations, the SMP may have access to a user's social network sites (regardless of whether or not the SMP is integrated as an application into a particular social networking site. This allows the SMP to use the information posted on these sites and contacts with whom the user communicates to enhance the SMP content. For example, the SMP may be able to incorporate information in a user's post about moving to serve ads to the user in a new city. Additionally, if a user is communicating frequently with users in a different city than that in which the user resides, the SMP may recognize that the user may want to move in an area closer to his/her friends and therefore may incorporate this information and present the user 1s jobs in that city.

Because the SMP has access to a user's information on a social networking site, the SMP may be able to provide ads for jobs within a user's social networking site. For example, if a user is browsing Facebook, the user may see ads for jobs in which they may be interested. These may be actively updated based on a user's recent searches, recent conversations with other users, and/or the like. This is described in further detail below in the section titled "Automated Online Data Submission." In some implementations, the SMP ads may be hidden from the social network servers so as to prevent integration between the social and professional networks.

Some implementations of the SMP may track job postings in which a user shows interest. In some embodiments, the SMP may track the jobs viewed by a user, and other implementations may allow a user to indicate that (s)he is interested in a particular type of job (e.g., by hitting an "I'm interested" button, by saving the job to a saved job list of jobs that the user may want to apply to at a later time, and/or the like). This interest may be used by the SMP to compile a list of similar jobs to present to the candidate. The SMP may also create a search profile for the user based on various types of jobs in which a user has shown interest. The search profile may be used as a secondary tool when a user searches for jobs. That is, if a user enters certain search terms, the SMP may also use the profile as a way to prioritize certain job listings over others when returning the search results to the user.

The SMP may prioritize certain listings over others for other reasons, as well. For example, if a user has contacts at a particular company, these job listings may be displayed above the postings by other companies where the user has no contacts. In some implementations, the these contacts may be only the user's SMP contacts, but in other implementations, the SMP may determine that a user has a social network contact at a certain company with whom the user is not contacts on the SMP. In this scenario, the SMP may suggest that the user connect with this contact on the SMP and/or prioritize the listing into a second tier (below a first tier of companies where a user has an SMP contact) and indicate to the user that (s)he has a contact through a social networking site that (s)he may wish to contact if (s)he may consider and/or apply to the job.

In some implementations of the SMP, the user may post a job listing to the SMP. The SMP may automatically push this job listing to the user's first degree contacts (that is, contacts with whom the user is connected directly). Other implementations may allow pushing the job to the user's second degree contacts (that is, the user's contacts' contacts). In this implemenation, the second degree contacts who are interested in the posted job listing may request an introduction to the user who posted the job through their direct contact (the user's first degree contact). In additional implementations, the SMP may display all jobs posted at contacts' employers to a user, so a user would see all jobs posted by companies where their contacts are employed. Some embodiments of this implementation may filter these employer jobs to those in which a user may be interested. That is, if a user is a computer programmer and a contact is employed by Microsoft, the user would see all jobs posted by Microsoft. In a scenario in which these jobs are filtered, entry level positions at Microsoft may not be displayed to a senior programmer.

Additional implementations of the SMP may serve a user job postings in which his/her contacts may have shown interest. In some scenarios, a programmer may have many contacts who are also programmers. If one of the programmers in the user's network shows interest in a particular job, this may be an indication that that particular job may be of interest to his/her contacts who are also programmers. In this implementation, it may be hidden from the user that the jobs displayed have been seen or applied to by his/her contacts, or it may be anonymous as to which contact viewed that job, but the user may know that one of his/her contacts viewed that job.

In some implementations, a user may view a home page when (s)he logs into the SMP. This home page may display jobs a user might be interested in and/or jobs that his/her contacts may have posted. These may be displayed in the order of potential relevancy for the user, the most recent postings and/or the like.

In some scenarios, the user may be able to view a page of jobs in which the user's contacts may be interested. In some embodiments of the SMP, the user may be rewarded for recommending jobs to his/her contacts. For example, if a user has a contact who is an electrician and a company posts a job for an electrician, the user may recommend the job to his/her electrician contact. In some implementations, the reward is monetary and is awarded if the connection is hired by the company. In alternative embodiments, the user may receive an award if the contact shows interest in the recommended job, if the user receives an interview, and/or the like. In some implementations, the monetary award is paid by the company who posted the job and the SMP facilitates contact and payment of the reward. Alternative embodiments may reward the user within the SMP, for example, with a badge. Badges may be awarded to users in several scenarios, such as when a user reaches a certain threshold of contacts, has posted a certain number of jobs, has successfully recommended a certain number of contacts, and/or the like.

SMP

Figure 1:
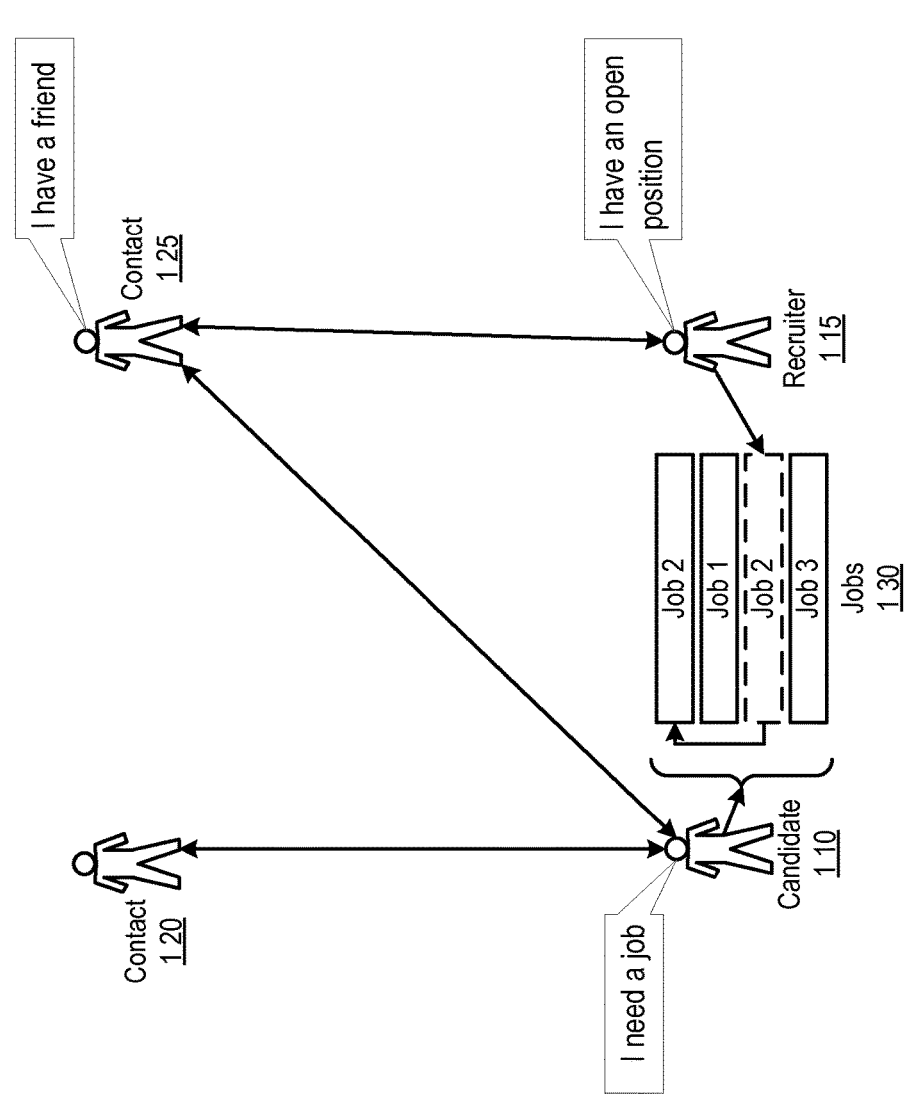
FIG. 1 shows a block diagram illustrating an exemplary SMP usage scenario in one embodiment of the SMP.

FIG. 1 shows a block diagram illustrating an exemplary SMP usage scenario in one embodiment of the SMP. FIG. 1 illustrates how a candidate 110 may utilize the SMP to find a job based on contacts 120, 125. In FIG. 1, a recruiter 115 may post a job "Job 2" to the SMP. The candidate 110 may utilize the SMP to search for a job, and, if there were no contact information, would be presented with jobs "Job 1", "Job 2", and "Job 3", in that order (e.g., based on relevance matching of candidate skills to job prerequisites). However, the SMP may utilize social information (e.g., including social network data, location data, news and social media data, and/or the like) regarding the candidate and the recruiter to adjust relevance ranking of the presented jobs. In this example, the candidate and the recruiter have a contact 125 in common, and the SMP may utilize this information to increase the relevance of the recruiter's posted job. That is, the common contact between the recruiter and candidate elevates "Job 2" to be the most relevant for the candidate. Accordingly, the candidate would be presented with jobs "Job 2", "Job 1", and "Job 3", in that order. In some implementations, the SMP may determine that a common contact exists by using a social networking site.

Figure 2A:
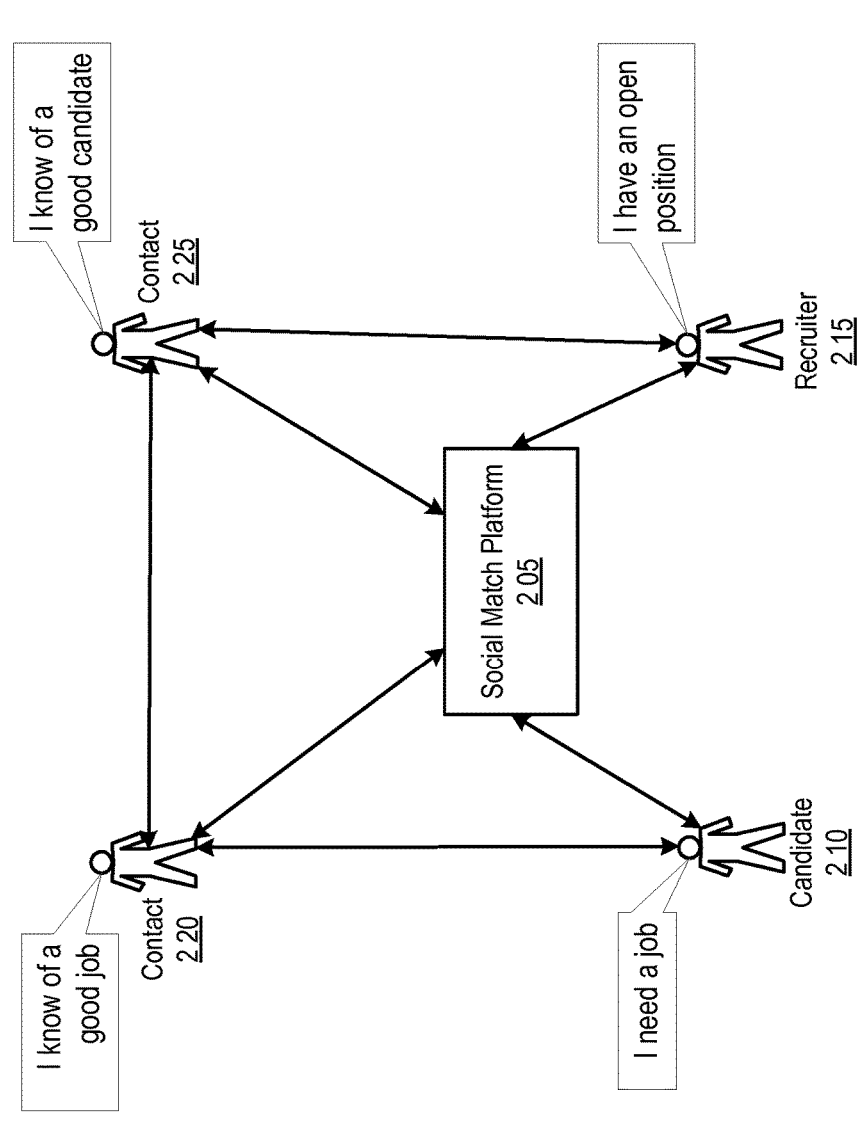
FIG. 2A shows a block diagram illustrating another exemplary SMP usage scenario in one embodiment of the SMP.

FIG. 2A shows a block diagram illustrating another exemplary SMP usage scenario in one embodiment of the SMP. FIG. 2A illustrates how a candidate 210 and a recruiter 215 may utilize the SMP 205 based on social network contacts 220, 225 to find a job and a job candidate, respectively. In FIG. 2A, the candidate 210 may be looking for a job. The candidate may have a contact 220 that may know of a job that would be of interest to the candidate. For example, the contact 220 may be connected to another contact 225, who may be connected to a recruiter 215, who may be looking for a job candidate. In other examples, the contact 220 may be connected to a recruiter directly or separated from the recruiter by some number of degrees of separation, may be a recruiter himself, may be connected to a recruiter through multiple connections, and/or the like. The SMP 205 may analyze information regarding the social networks of the various parties 210, 215, 220, 225 and other information (e.g., match between candidate's skills and job prerequisites, affiliations with companies and/or organizations, location, profile preferences, experiences, education, and/or the like) and determine that a job offered by the recruiter 215 may be relevant to the candidate 210. Accordingly, the SMP 205 may recommend the job to the candidate and/or facilitate social meetup with the recruiter (e.g., via a chat or messaging application).

Similarly, the recruiter 215 may be looking for a job candidate. The recruiter may have a contact 225 that may know of a candidate that would be of interest to the recruiter. For example, the contact 225 may be connected to another contact 220, who may be connected to the candidate 210, who may be looking for a job. The SMP 205 may analyze information regarding the social networks of the various parties 210, 215, 220, 225 and other information and determine that the candidate 210 may be relevant to the recruiter 215. Accordingly, the SMP 205 may recommend the job seeker to the recruiter and/or facilitate social meetup with the job seeker.

In some embodiments, the contact 220 is connected to both the recruiter 215 and the candidate 210. Similar to the above examples, in this implementation, the SMP 205 may recommend the job to the candidate and/or facilitate a social meetup with the job seeker, but alternatively or additionally, the SMP 205 may suggest to common contact 220 that (s)he recommend the recruiter's job listing to the candidate 210. Some implementations may provide a reward to the contact 220 for creating contact between the candidate 210 and the recruiter 215. The SMP may provide the link between the job seeker and the recruiter and may facilitate social meetup with the job seeker.

Figure 2B:
FIG. 2B shows a block diagram illustrating another exemplary SMP usage scenario in one embodiment of the SMP.

FIG. 2B shows a block diagram illustrating another exemplary SMP usage scenario in one embodiment of the SMP. FIG. 2B illustrates how an applicant 240 to a college 230 may utilize the SMP 235 to interact with other SMP members 245, 250, 255 to determine whether this college would be a good place to attend. In FIG. 2B, the applicant 240 may be trying to apply to various colleges and may wish to determine whether the college 230 would be a good place to apply. The SMP 235 may determine that a student 245, a professor 250, and an alum 255 may be helpful to the applicant 240 in making this determination. For example, the SMP 235 may determine that the student 245 is connected with both the college 230 and with the applicant 240, which may make the student's description of the college (e.g., condition of the dormitories) helpful to the applicant. In another example, the SMP 235 may determine that the professor 245, who recently published a well renowned research article, teaches a class at the college 230, which may make the professor's description of the college (e.g., classes, research environment) helpful to the applicant. In another example, the SMP 235 may determine that the alum 255 had the same major in college as the likely major for the applicant 240 (e.g., based on the analysis of the applicant's interests), which may make the alum's description of the college 230 (e.g., quality of classes) helpful to the applicant. Accordingly, the SMP 235 may facilitate social meetup between the applicant 240 and other SMP members 245, 250, 255 (e.g., between the applicant and one other member, as a group with all four members, and/or the like).

FIG. 3 shows a data flow diagram in one embodiment of the SMP. In FIG. 3, various entities (e.g., people, companies, organizations, groups, and/or the like) may wish to become SMP members. For example, a candidate 320 may wish to join the SMP 305 and become part of a people network 312. The candidate may be represented in the people network by a white circle. The candidate may request to join the SMP 305 via a candidate platform join request 353. In one embodiment, such a candidate platform join request may be received via a website (e.g., via the Monster.com website, such as when a user clicks a "Sign Up" button). In another embodiment, the SMP may be integrated into a social networking site, such as Facebook, as an SMP app. In this scenario, a candidate platform join request may be received via the SMP app (e.g., in the case of a Facebook app, when a user requests to use the app). The candidate platform join request 353 may include various pieces of information regarding the candidate including personal information, contact information, previous and/or current professional experience, previous and/or current education information, login information for social networking websites and/or applications, social meetup preference information, and/or the like. For example, the candidate platform join request 353 may be in XML format substantially in the following form:

```
<XML>
  <CandidatePlatformJoinRequest>
    <PersonalInfo>
      <Name>John Doe</Name>
      <ScreenName>ScreenName1</ScreenName>
    </PersonalInfo>
    <ContactInfo>
      <StreetAddress>123 Main Street, New York,
        NY</StreetAddress>
      <Phone> (333)333-3333</Phone>
    </ContactInfo>
    <Experience>
      <Position1>Job Title1, Experience1</Position1>
      <Position2>Job Title2, Experience2</Position2>
    </Experience>
    <Education>
      <Education1>University1, Degree1<Education1>
      <Education2>University2, Degree2<Education2>
    </Education>
    <SocialNetworks>
      <SocialNetwork1>LoginInfo1</SocialNet-
        work1>
      <SocialNetwork2>LoginInfo2</SocialNet-
        work2>
    </SocialNetworks>
    <SocialMeetupPreferences>
      <Preference>Allow all to request social meetup</
        Preference>
    </SocialMeetupPreferences>
  </CandidatePlatformJoinRequest>
</XML>
```

In one embodiment, the candidate may provide such information via the candidate platform join request 353 upon signing up to use the SMP 305. In another embodiment, the candidate may provide such information via a series of screens and/or over time and the candidate platform join request 353 may comprise a plurality of candidate platform join requests. In yet another embodiment, this information may be sourced from a candidate profile that already exists, for example, from an existing candidate profile on the Monster.com website, from a candidate's social networking website profile, and/or the like.

Figure 3A:
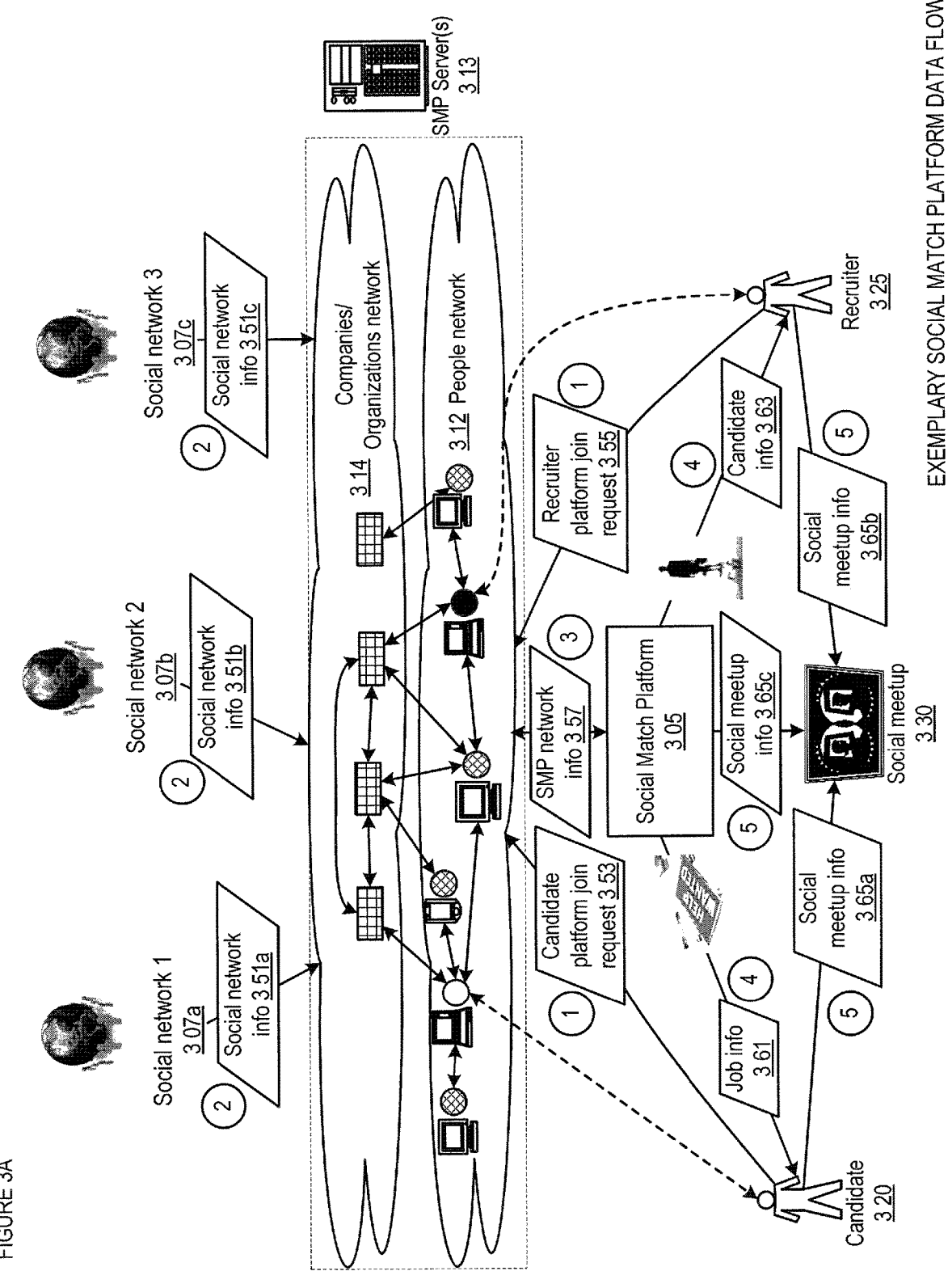
FIG. 3A shows a data flow diagram in one embodiment of the SMP.
Figure 3B:
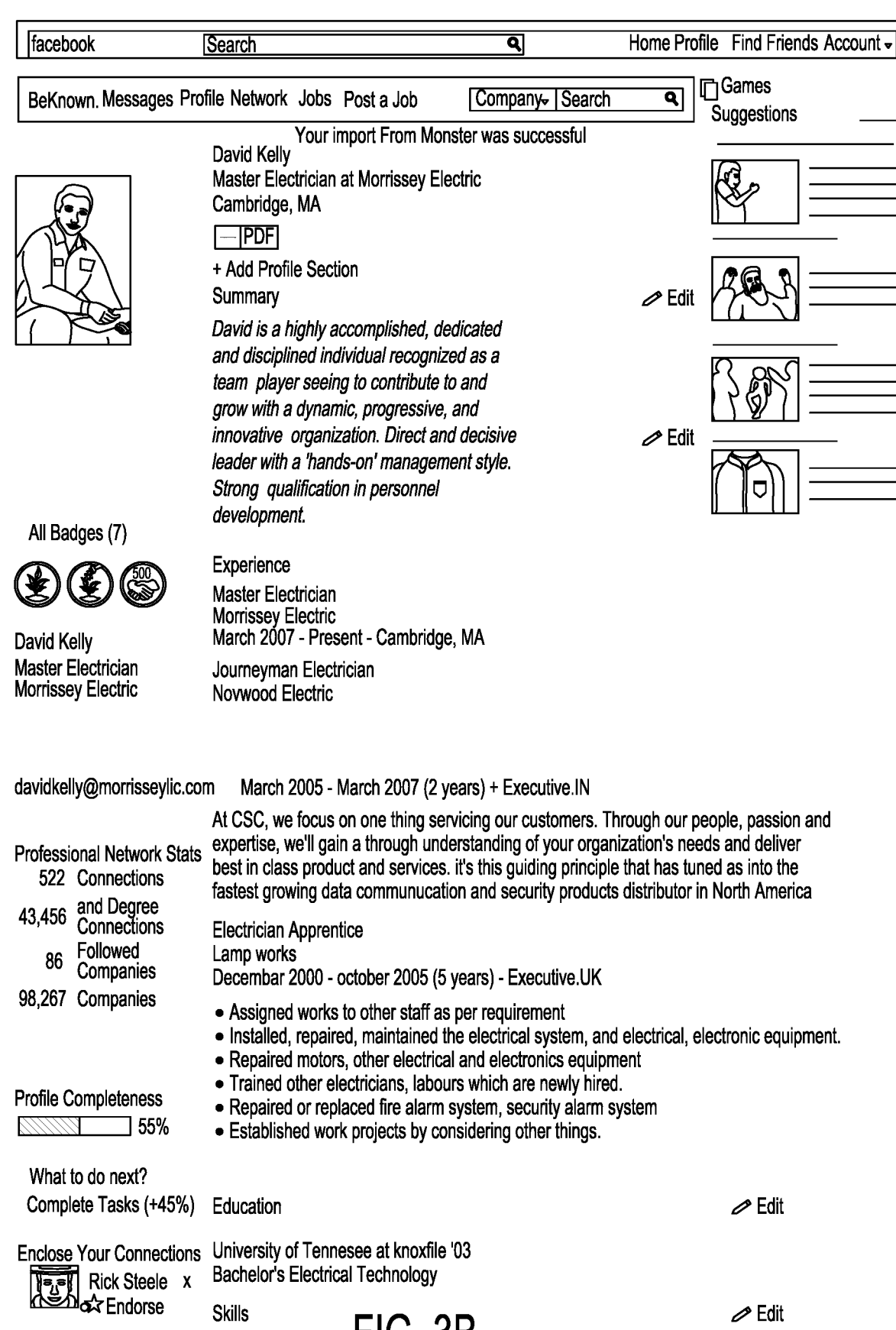

In the example of an SMP Facebook app, this information may be used to build and/or populate a user profile (example screen shot shown in FIG. 3B). The app may be able to incorporate information that the user has already provided in his/her Facebook profile to save the user time and avoid redundancy. In alternative SMP Facebook app implementations, the user may opt not to include any information from his/her Facebook page, and may instead opt to enter the information directly into the app. Similarly, in some implementations, a user may opt to select friends with whom (s)he wishes to connect professionally (i.e., on the SMP Facebook app), thereby keeping the user's Facebook friends and social contacts separate from his/her professional network. In some embodiments, the app may suggest Facebook friends and/or other known user contacts with whom the user may wish to connect professionally to assist the user in growing his/her professional network. An example screenshot may be seen in FIG. 3C. In some embodiments, as a user builds his/her professional network, (s)he may receive badges. In one embodiment, badges may be awarded for reaching a certain specified number of connections (e.g., "First-Class Connector" badge for reaching 25 contacts, "Graduate Connector" for reaching 100 contacts, "Super Connector" for as reaching 250 contacts, and "Epic Connector" for reaching 500 contacts). In some implementations, other badges may be awarded for various achievements, including, for example an "Established" badge for working at one place for over 5 years, a "Loyal" badge for working at one place for over 2 years, a badge for receiving a master's degree, and/or the like. Sample badges are shown in the screenshot in FIG. 3D.

In another example, a recruiter 325 may wish to join the SMP 305 and become part of the people network 312. The recruiter may be represented in the people network by a black circle. The recruiter may request to join the SMP 305 via a recruiter platform join request 355. In one embodiment, such a recruiter platform join request may be received via a website. In another embodiment, such a recruiter platform join request may be received via an app. The recruiter platform join request 355 may include various pieces of information regarding the recruiter including personal information, contact information, jobs info (i.e., info regarding available positions at the recruiter's company), previous and/or current professional experience, previous and/or current education information, login information for social networking websites and/or applications, social meetup preference information, and/or the like. For example, the recruiter platform join request 355 may be in XML format substantially in the following form:

```
<XML>
  <CandidatePlatformJoinRequest>
    <PersonalInfo>
      <Name>John Doe</Name>
      <ScreenName>ScreenName1</ScreenName>
    </PersonalInfo>
    <ContactInfo>
      <StreetAddress>123 Main Street, New York,
        NY</StreetAddress>
      <Phone>(333)333-3333</Phone>
    </Contact Info>
    <JobsInfo>
      <Job1>Title1, prerequisites1, salary info1</Job1>
      <Job2>Title2, prerequisites2, salary info2</Job2>
    </JobsInfo>
    <Experience>
      <Position1>Job Title1, Experience1</Position1>
      <Position2>Job Title2, Experience2</Position2>
    </Experience>
    <Education>
      <Education1>University1, Degree1<Education1>
      <Education2>University2, Degree2<Education2>
    </Education>
    <SocialNetworks>
      <SocialNetwork1>LoginInfo1</SocialNet-
        work1>
      <SocialNetwork2>LoginInfo2</SocialNet-
        work2>
    </SocialNetworks>
    <SocialMeetupPreferences>
```

```
    <Preference>
        Allow friends (1st degree) and friends of friends
        (2nd degree) to request social meetup
        </Preference>
    </SocialMeetupPreferences>
    </CandidatePlatformJoinRequest>
</XML>
```

In one embodiment, the recruiter may provide such information via the recruiter platform join request 355 upon signing up to use the SMP 305. In another embodiment, the recruiter may provide such information via a series of screens and/or over time and the recruiter platform join request 355 may comprise a plurality of recruiter platform join requests. Alternative embodiments may allow the recruiter to import job details into the SMP from a job listing previously posted on a jobs website, e.g. Monster.com. In other implementations, the information posted on the SMP may be used to populate job listings on a jobs website.

In one embodiment, the information received from the recruiter may be used to create a recruiter profile, which may include various job postings the recruiter is looking to fill. In some implementations, the recruiter may be looking to fill job postings for a particular company and may create a company profile. Company profiles may include a summary about the company and/or a listing of available jobs at the company. Some implementations may also indicate if a user viewing the company profile has any connections who work (or, in some embodiments, have worked) for the company. A sample screen shot may be seen in FIG. 3E.

In other examples, donors, charitable organizations, advertisers, target audiences, self forming groups, education providers, and/or the like may wish to join the people network 312 and/or the companies/organizations network 314. In one implementation, a user may provide a platform join request associated with the user's classification. For example, a user classified as a candidate may provide the candidate platform join request 353 and a user that is classified as a recruiter may provide the recruiter platform join request 355. In another implementation, a user may provide a platform join request that is independent of the user's classification. For example, the as candidate platform join request 353 and the recruiter platform join request 355 may be the same type of request, and whether a user is a candidate, a recruiter, or both, may depend on the provided information (e.g., if the user is currently seeking employment the user may be classified as a candidate, if the user posts any jobs and/or if the user's company has available positions the user may be classified as a recruiter).

The SMP 305 may obtain social network information 35*ia*-35*ic* from social networks 307*a*-307*c*. Social network information may include data regarding a user's contacts at various social networking websites (e.g., Facebook, LinkedIn, MySpace, Orkut, Friendster, Twitter, and/or the like), data regarding a user's contacts at various messaging application (e.g., AIM, Skype, Yahoo!Messenger, Google Talk, Facetime, and/or the like), data regarding a user's email contacts, data regarding a user's phone contacts, and/or the like. Social network information may also include data regarding a user's affiliations with companies (e.g., previous and/or current employers, company groups, and/or the like) and/or organizations (e.g., previous and/or current universities, clubs, charities, and/or the like), a user's geographic location, a user's likes and/or dislikes, endorsements of a user and/or of the user's work, languages a user knows, news and/or social media information regarding a user and/or a company and/or organization associated with the user, and/ or the like. For example, social network information 35*ia*-35*ic* may be in XML format substantially in the following form:

```
<XML>
    <Contacts>List of user's contacts</Contacts>
    <Affiliations>
        <Affiliation1>Company1</Affiliation1>
        <Affiliation2>University1</Affiliation2>
        <Affiliation3>Club1</Affiliation3>
    </Affiliations>
    <Location>New York, NY</Location>
    <Endorsements>
        <Endorsement1>Endorsement  of  user</Endorse-
            ment1>
        <Endorsement2>Endorsement of user's work</En-
            dorsement2>
    </Endorsements>
    <Languages>
        <Language1>Language1—fluent</Language1>
        <Language2>Language2—proficient</Language2>
    </Languages>
</XML>
```

In one embodiment, information regarding users and/or regarding the users' social networks, may be obtained via API calls to social networks 307*a*-307*c* and used as a people network 312 and/or a companies/organizations network 314. In another embodiment, the SMP 305 may use information regarding the users and/or regarding the users' social networks to generate a people network 312 and/or a companies/organizations network 314. Information regarding the users and/or regarding the users' social networks may include information regarding how people are connected to each other and/or to companies and/or organizations, profile information associated with the users, profile information associated with companies and/or organizations, and/or the like. In some implementations, this information may be used to gather additional information about candidates and suggest profile updates for users if the user has not updated his or her information or if additional information indicates that some information is missing from his/her profile. For example, information regarding the people network 312 and/or the companies/organizations network 314, SMP network info 357, may include consolidated explicit and/or implicit information from a variety of sources (e.g., user provided information, information from various social networks, and/or the like). Explicit information may include profile information, location information, preference information, and/or the like. Implicit information may include user classification (e.g., a college applicant) inferred from user provided information, skill level rating inferred from news and/or social media information regarding the user, group membership inferred from provided data (e.g., NY Doctors group for a user who finished medical school and is located in NY), and/or the like. For example, the SMP network info 357 may be in XML format substantially in the following form:

```
<UserProfile>
    <PersonalInfo>
        <Name>John Doe</Name>
        <ScreenName>ScreenName1</ScreenName>
    </PersonalInfo>
    <ContactInfo>
        <StreetAddress>123 Main Street, New York, NY</
            StreetAddress>
        <Phone>(333)333-3333</Phone>
    </ContactInfo>
    <JobsInfo>
```

```
<Job1>Title1, prerequisites1, salary info1</Job1>
<Job2>Title2, prerequisites2, salary info2</Job2>
</Jobsinfo>
<Experience>
    <Position1>Job Title1, Experience1</Position1>
    <Position2>Job Title2, Experience2</Position2>
    <Position3>Job Title3, Experience3</Position3>
</Experience>
<Education>
    <Education1>University1, Degree1<Education1>
    <Education2>University2, Degree2<Education2>
</Education>
<SocialMeetupPreferences>
    <Preference>Allow all to request social meetup</
        Preference>
</SocialMeetupPreferences>
<Contacts>
    Consolidated list of user's contacts from various
        social networks
</Contacts>
<Affiliations>
    <Affiliation1>Company1</Affiliation1>
    <Affiliation2>University1</Affiliation2>
    <Affiliation3>Club1</Affiliation3>
</Affiliations>
<Location>New York, NY</Location>
<Endorsements>
    <Endorsement1>Endorsement of user</Endorse-
        ment1>
    <Endorsement2>Endorsement of user's work</En-
        dorsement2>
</Endorsements>
<Languages>
    <Language1>Language1—fluent</Language1>
    <Language2>Language2—proficient</Language2>
</Languages>
</UserProfile>
<CompanyOrganizationProfile>
    <Name>Company1</Name>
    <Location>New York, NY</Location>
    <Industry>Software</Industry>—e.g., companies may
        be related by industry
    <Members>List of members</Members>
    <Media>Photos and videos regarding the company</
        Media>
</CompanyOrganizationProfile>
```

The SMP 305 may provide various types of information including job information, candidate information, education information, offer information, information regarding companies, organizations and/or groups, relevant contacts information, and/or the like to a user. For example, the SMP 305 may provide job information 361 (e.g., as a result of a search, as an advertisement, and/or the like) to the candidate 320. Such information may include a job recommendation, identification of contacts that may be helpful to the candidate in obtaining the job, and/or the like, and may be based on the SMP network info 357. In one embodiment, a recruiter may limit who can see a job posted by the recruiter (e.g., friends (1st degree) and friends of friends (2nd degree)), and job recommendations regarding the job may be limited accordingly. In another embodiment, a job may be recommended to any candidate determined by the SMP 305 to be relevant. For example, the job information 361 may be in XML format substantially in the following form:

```
<XML>
    <PositionInfo>
        <Title>JobTitle1</Title>
        <Company>company name</Company>
        <Prerequisites>Skills, Education</Prerequisites>
        <Location>job location</Location>
        <Link>job page link</Link>
        <Contacts>List of relevant contacts</Contacts>
    </PositionInfo>
</XML>
```

In another example, the SMP 305 may provide candidate information 363 to the recruiter 325. Such information may include a candidate recommendation, identification of contacts that may be helpful to the recruiter in obtaining additional information regarding the candidate, and/or the like, and may be based on the SMP network info 357. In one embodiment, a candidate may limit who (e.g., only 1st degree contacts) and/or what kinds of information (e.g., experience and education, but not current location) may be viewed by a recruiter, and candidate recommendations and/or candidate information may be limited accordingly. In some implementations, the candidate may specify how (s)he would like to be contacted by a recruiter, and this may be based on degrees of separation from a recruiter. For example, a first degree contact may be able to ping the candidate via a instant messaging service over the SMP, whereas instant messaging may be disabled for a second (or higher) degree contact. In another embodiment, any candidate may be recommended if determined by the SMP 305 to be relevant. For example, the candidate information 363 may be in XML format substantially in the following form:

```
<XML>
    <CandidateInfo>
        <Name>candidate name</Name>
        <Title>current job title</Title>
        <Experience>Job Title1, Experience1</Experience>
        <Education>University1, Degree1</Education>
        <Contacts>List of relevant contacts</Contacts>
    </CandidateInfo>
</XML>
```

If SMP members may be helpful to each other, and if their social meetup preference settings allow this, the SMP 305 may facilitate a social meetup 330 via social meetup info 36_sa-c_. For example, a representative of a company that provides ergonomic keyboards may use a social meetup to interact with a target group of software developers (e.g., database engineers of company X) interested in ergonomic products and/or other software developer groups (e.g., application engineers of company X) associated (e.g., both groups are at company X) with the target group. In another example, a recruiter that has a job for which a candidate may be a good match may interact with the candidate. Another example may provide a recruiter with information of a common contact for a candidate of interest. That is, if the recruiter finds a second degree contact (s)he believes to be a good candidate for a job posting, the SMP may provide the recruiter with the contact information for the recruiter's first degree contact such that the first degree contact assists in connecting the recruiter with the candidate.

In some SMP embodiments, professionally connected users may be able to assist other users by recommending a job posting to a candidate or a candidate to a job posting. For example, if a first user, who is professionally connected to a second user via the SMP, sees a job posting that the second user may be interested in, the first user may recommend the job posting to the second user. In some implementations, the job posting may be for a job at the first user's company. In one embodiment, the first user may receive a reward (e.g., award money) for referring the second user if the second user applies and/or gets an offer for the recommended job listing. In some embodiments, the SMP may provide a link comprising jobs for which the first user's friends may wish to apply. This list of jobs for friends may list the job posting, its location, suggested connections for a particular job, and the award amount if the suggested user gets the job. An example screenshot is shown in FIG. 3F.

In one embodiment, social meetup info 36*sa-c* may include names (e.g., of the candidate and/or of the recruiter), venue preferences (e.g., face-to-face, phone conference, chat room, and/or the like), length preferences (e.g., meet for half an hour), offer details, product description, candidate resume, additional job description, and/or the like.

Figure 3C:
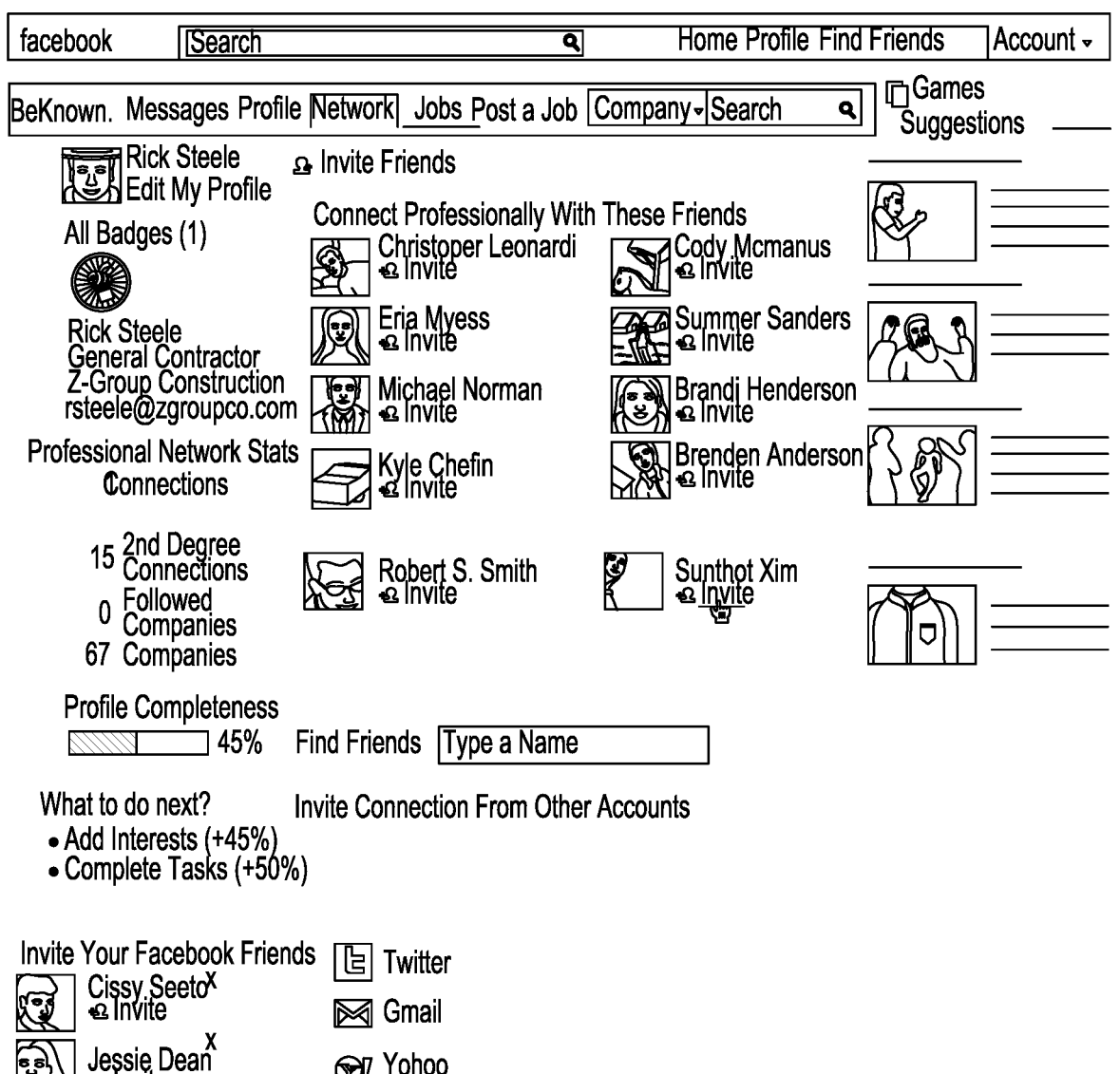
Figure 3D:
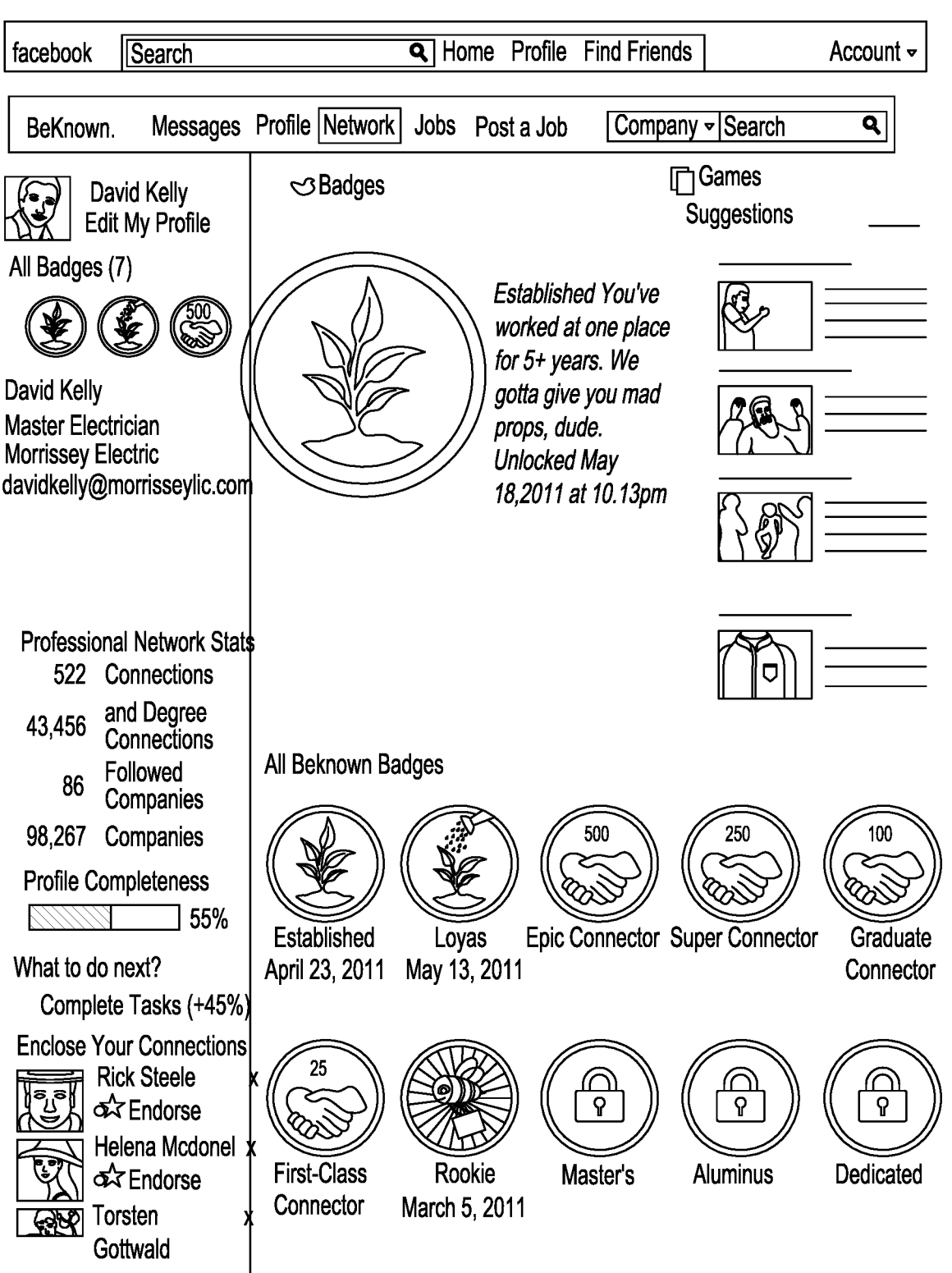
Figure 3E:
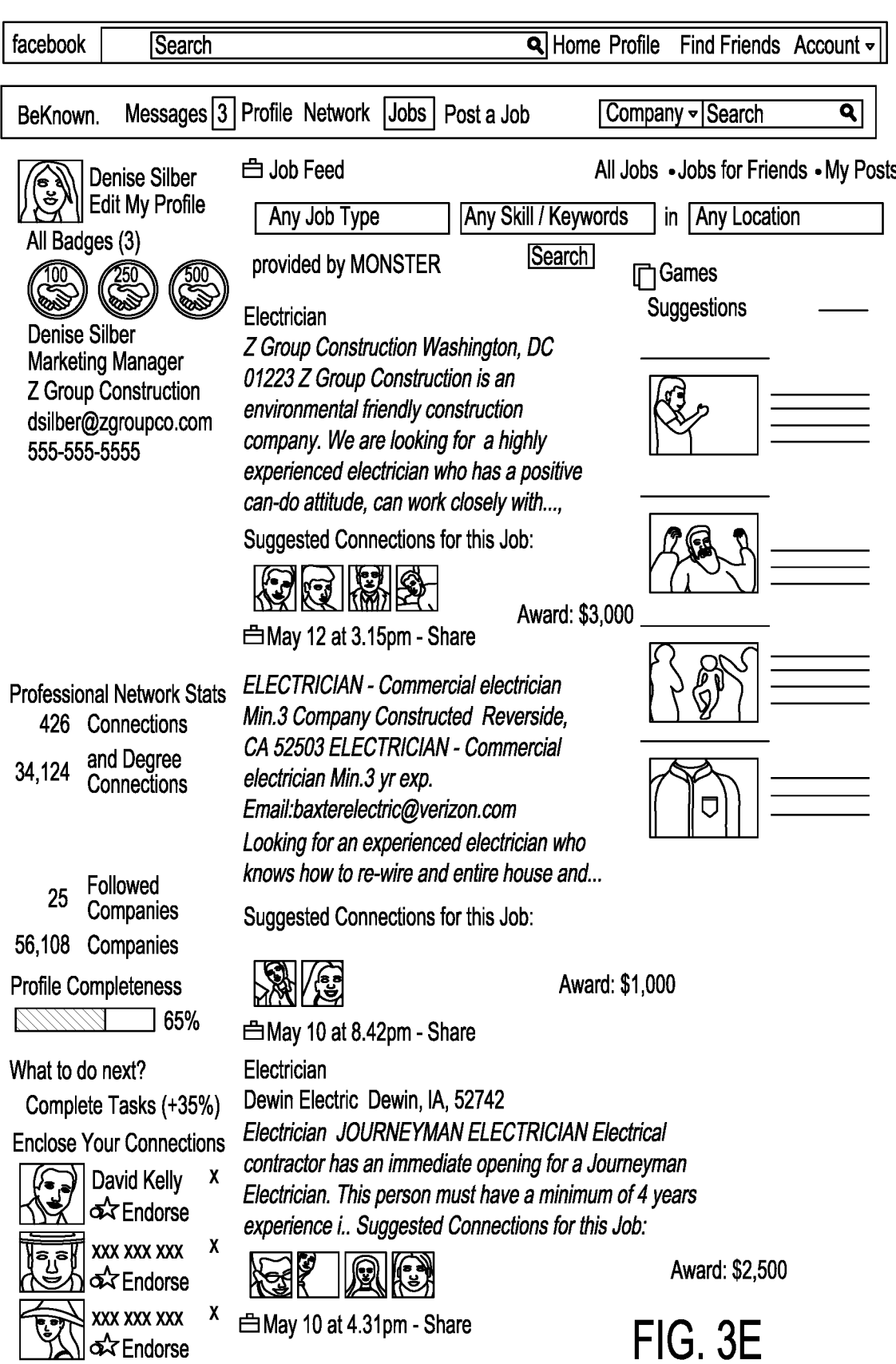
Figure 3G:
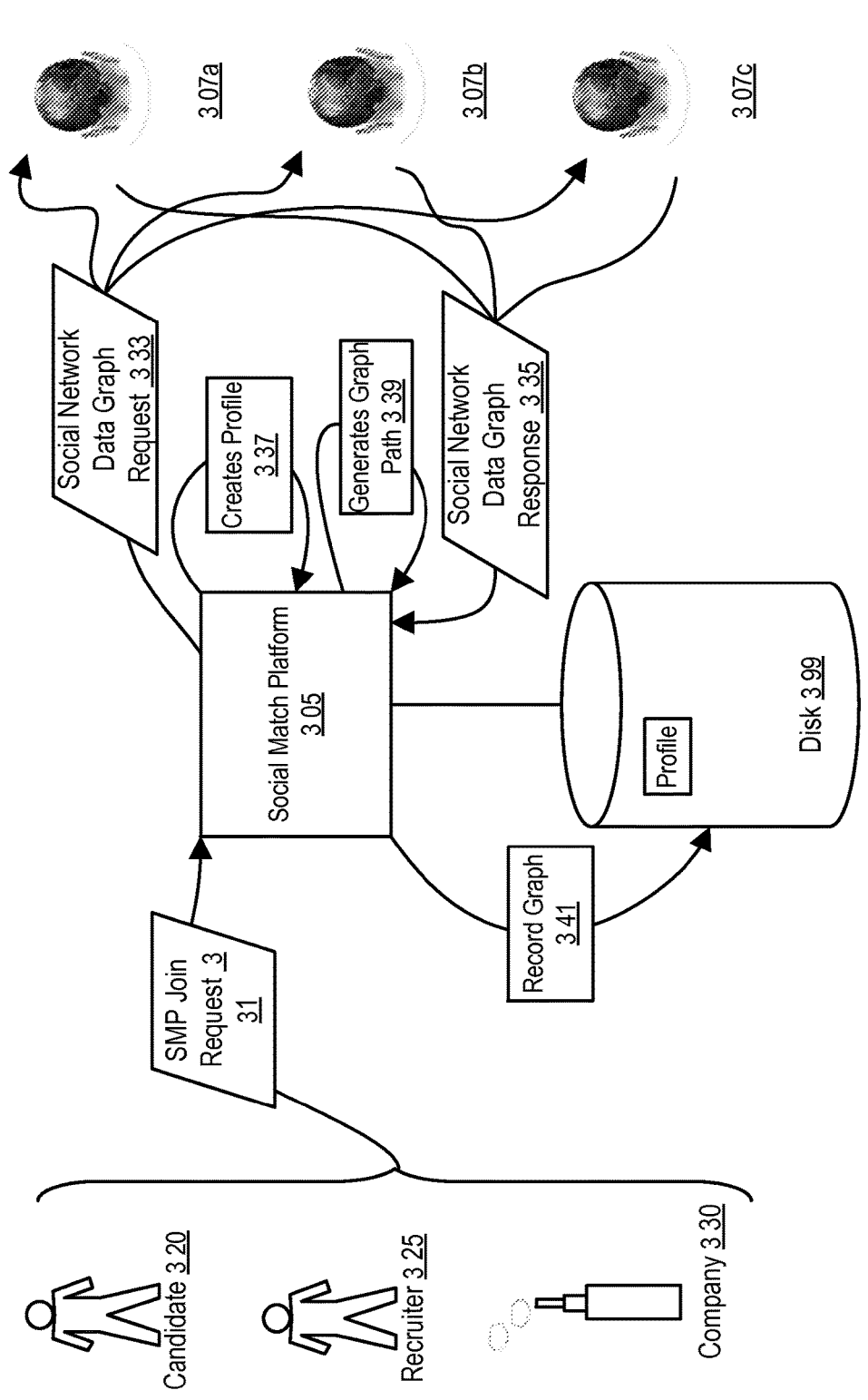
FIGS. 3G-3I show various flow diagrams according to certain aspects of the SMP described herein.

FIG. 3G shows an exemplary join request data flow in one embodiment of the SMP. A candidate 320, recruiter 325 or a company 330 may request 331 to join the SMP. In some embodiments, this may be a request to join the SMP Facebook app and may be instantiated by clicking a "join now" button on Facebook. The join request may include a user name and password for the SMP, as well as user names and passwords for each social network the user wishes to associate with his/her SMP account, and/or the like. The join request may also include the user's user name and password for various social networking websites. This information is received by the Social Match Platform 305, which then may send a social network data graph request 333 to the user's social networking sites 307*a*, 307*b* and 307*c*. The data graph response 335 may then be sent back to the SMP, which in turn may use the response to create a profile or user page for the user 337. This profile may be stored in the disk 399. In some embodiments, the SMP may create a graph path for the user 339. This is explained in greater detail in the "Advancement Path Taxonomy" section below. This graph may also be stored 341 in the disk 399. Some implementations may use the graph path to determine next potential career moves for a candidate and this information may be used to serve the candidate potential jobs. For a recruiter or a company seeking candidates, this graph path may be generated to determine what type of jobs potential candidates may be coming from, and therefore the SMP may suggest candidates most likely to be seeking the jobs the recruiter and/or company are offering.

Figure 3H:
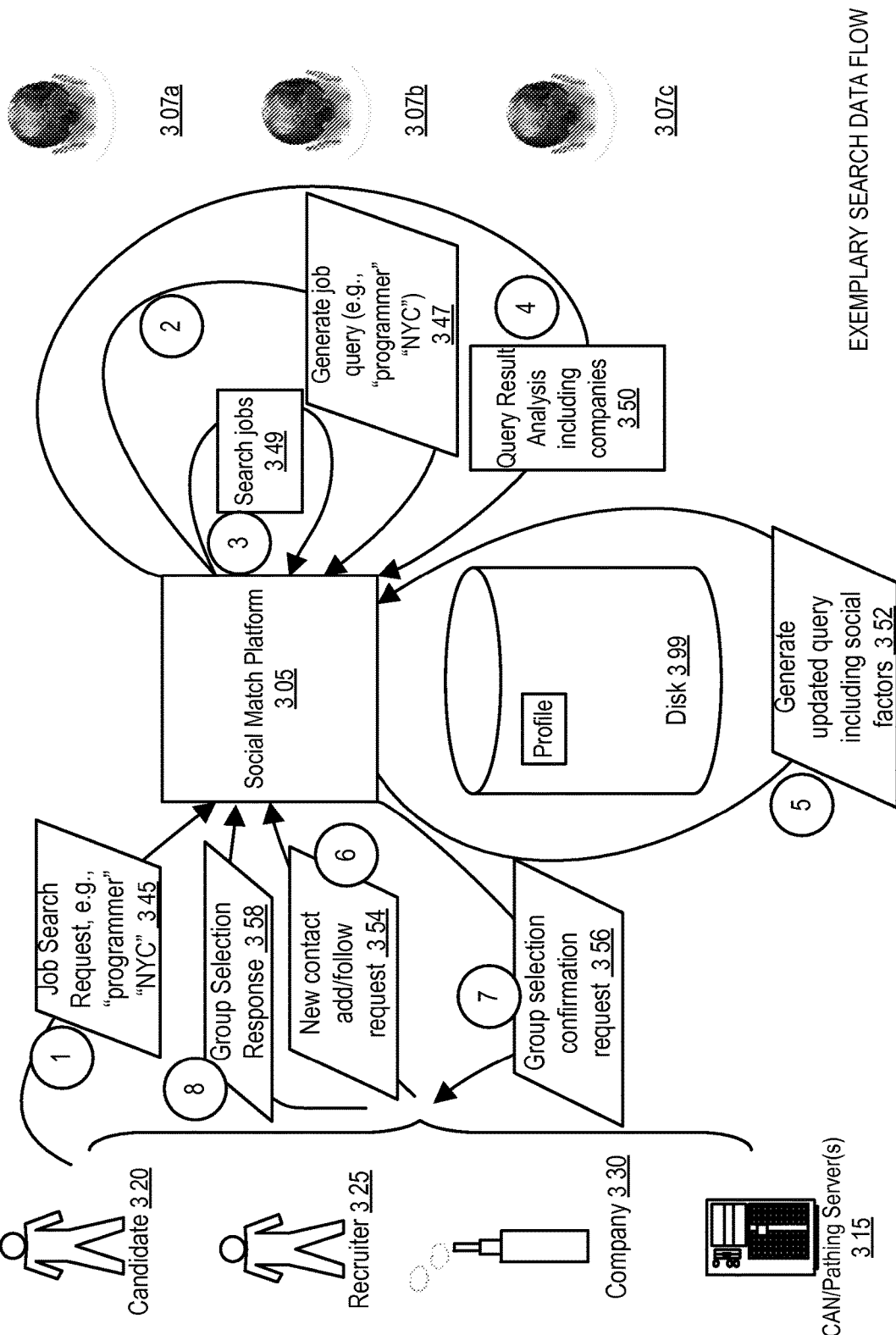
Figure 3I:
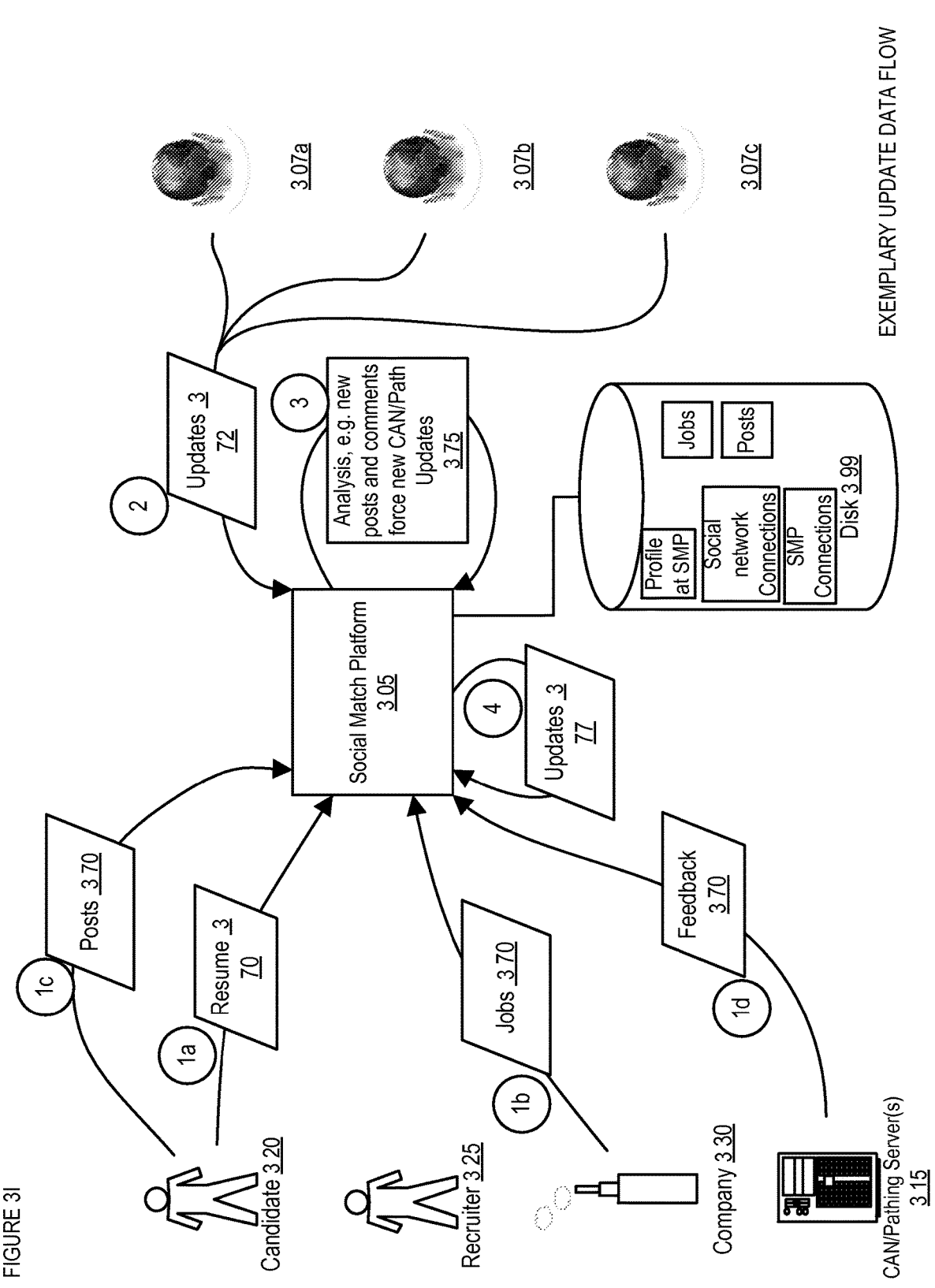

FIG. 3H shows an exemplary search data flow embodiment of the SMP. In one example, a candidate 320 may submit a job search request 345 to the SMP 305, for example, by searching for "programmer" "NYC." The SMP may then generate a job query 347 and search jobs 349. The query results are analyzed 350 to determine which jobs may be most relevant to the user. This determination may include information such as whether the user has contacts at the company offering the job, and this may be weighted in determining the list of search results and/or the order of the search results to display to the user. This is explained in more detail below in the description for FIG. 5A, as a Job Relevancy value may be calculated. The query results analysis 350 may also utilize information such as the location of the user's contacts to determine where a user may be interested in looking for jobs. For example, a user living in Washington, D.C., may have several contacts living in San Francisco, CA, and the query result analysis may determine that the user may be interested in jobs located in San Francisco, CA, even if the user has not specified this in the query. In other implementations, the SMP may determine that job query results included jobs at a of a particular sort or at a particular company (for example, a programmer at Microsoft), e and while the user may not have contacts at that particular company, there are other job postings for similar jobs (e.g., a programmer at IBM) where the user does have contacts. Once the SMP performs the analysis 350, the SMP may generate an updated query 352 based on social factors that may have been analyzed at 350. In the last example, for instance, the SMP may update the query results to include the jobs at IBM.

During this process, the SMP may also determine other users that the contact may know. In one implementation, the user may be connected to a second user on a social networking site and the user may be seeking a job where the second user is employed or the second user may be employed in a similar field as the user. In some implementations, the SMP may be able to determine how much interaction the user has with the second user on the other social networking sites. For example, if the user is connected to the second user on the social networking site and communicates with the second user regularly, this may be a strong recommendation, whereas if the user is connected to the second user but there has been limited communication between them, the SMP may provide a weaker recommendation. In some embodiments, this may be determined by examining the contact between the users on several social networking sites.

The user may determine that (s)he wishes to add and/or follow a new contact. In some implementations, this may be a contact the SMP recommended; in other implementations, the user may have found the contact via other means, e.g., a name search. The user may request to add and/or follow the new contact 354. The SMP may receive this request and send a group selection confirmation request 356 to the contact with whom the user is looking to connect. The contact may then determine whether (s)he wishes to connect with the user and send a group selection response 358 to the SMP. In some implementations, in order for the connection to be made between the user and the contact, the contact may need to approve the connection. In alternative embodiments, the user may be able to view the actions of the contact without contact approval, essentially creating a one-way connection.

Figure 31:
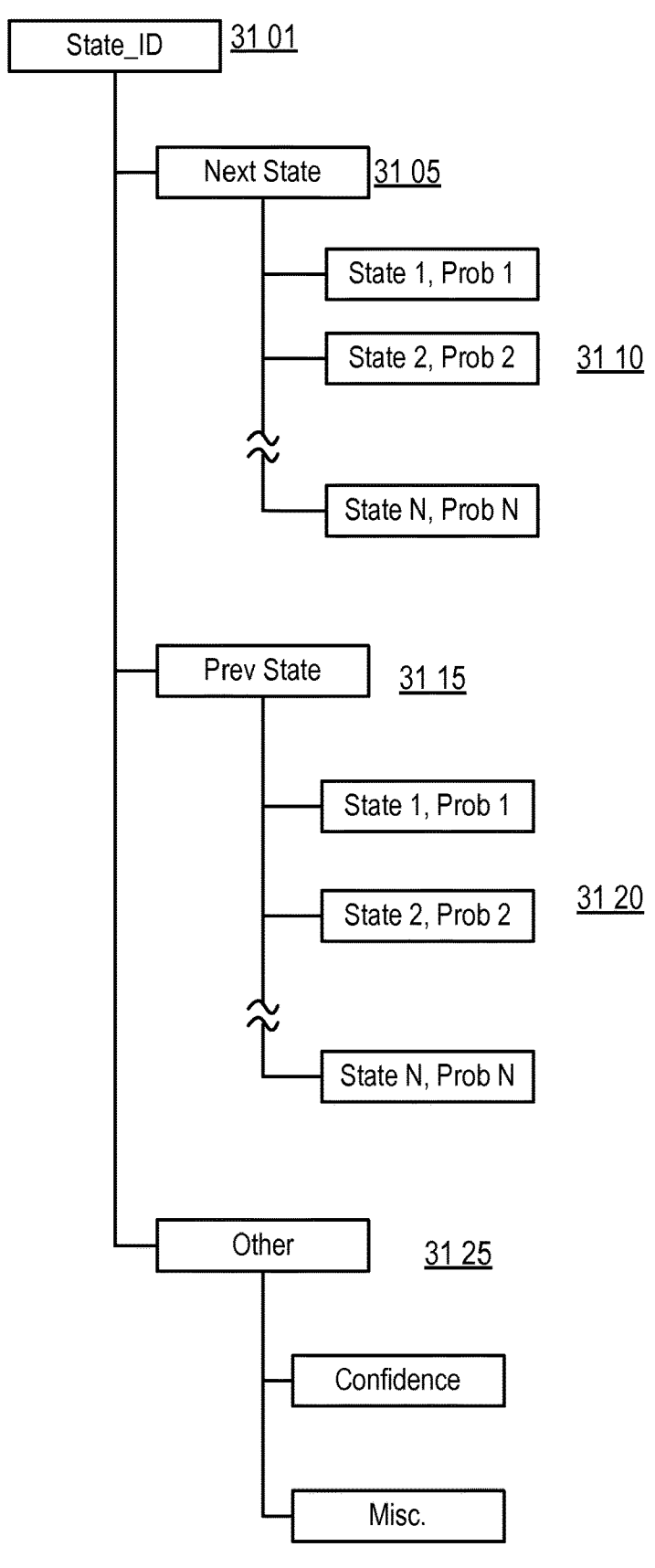
FIG. 31 shows an implementation of a path-independent state model data record in one embodiment of CSE operation.

FIG. 31 shows a data flow diagram illustrating various updating embodiments of the SMP. The SMP may receive various inputs 370 from users of the SMP. For example, a candidate 320 may provide a resume to the SMP and/or may post information on his/her profile page. A recruiter or a company may post jobs to the SMP. Yet another source of input to the SMP may be the Career Advertisement Network ("CAN") or Career Pathing server(s) 315. The Career Advertisement Network is described in more detail below in the section titled "Advertisement Generation, Selection And Distribution System Registration" and Career Pathing is discussed in more detail in the section titled "Advancement Path Taxonomy." These servers may provide input relevant to the relationship between the candidates and the job postings. The SMP also may receive input 372 from user postings and user activity on various social networks 307*a-c*. The SMP may use these inputs to perform an analysis of the updates 375 and may determine that based on the new information, the SMP may need to utilize the CAN/Pathing Server(s) 315 to update job postings being served to a particular user. In one example, a candidate may post on a social networking site that (s)he is moving to a new city. The SMP may then use this information to serve the candidate job postings in the new city. In another example, a user may post that (s)he is being promoted. This may be used by the Pathing server to determine a potential new career path for the candidate, and the SMP may then serve different job postings to the candidate based on the new information. This new information may be updated and stored in the SMP 377.

Figure 110A:
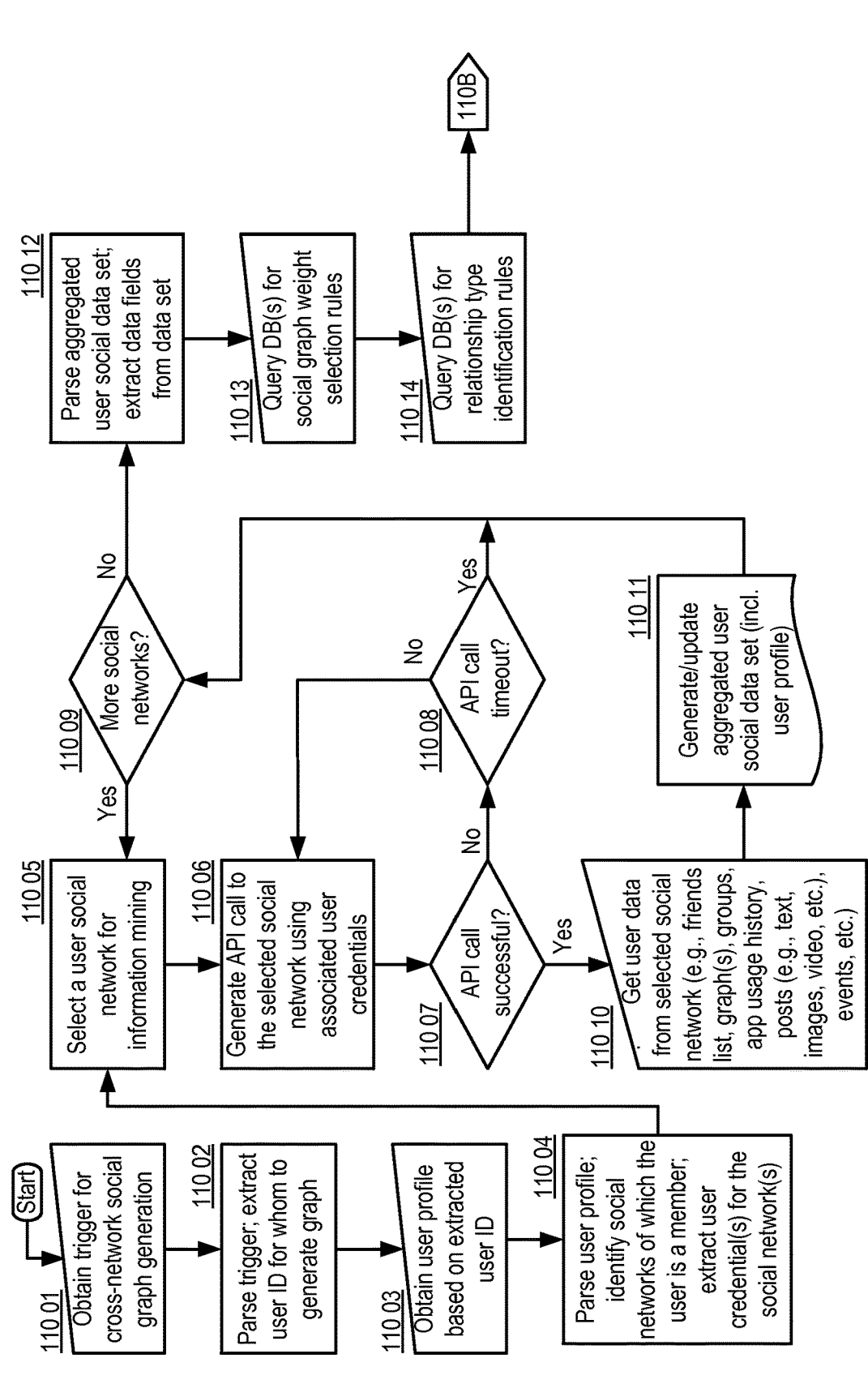
Figure 110B:
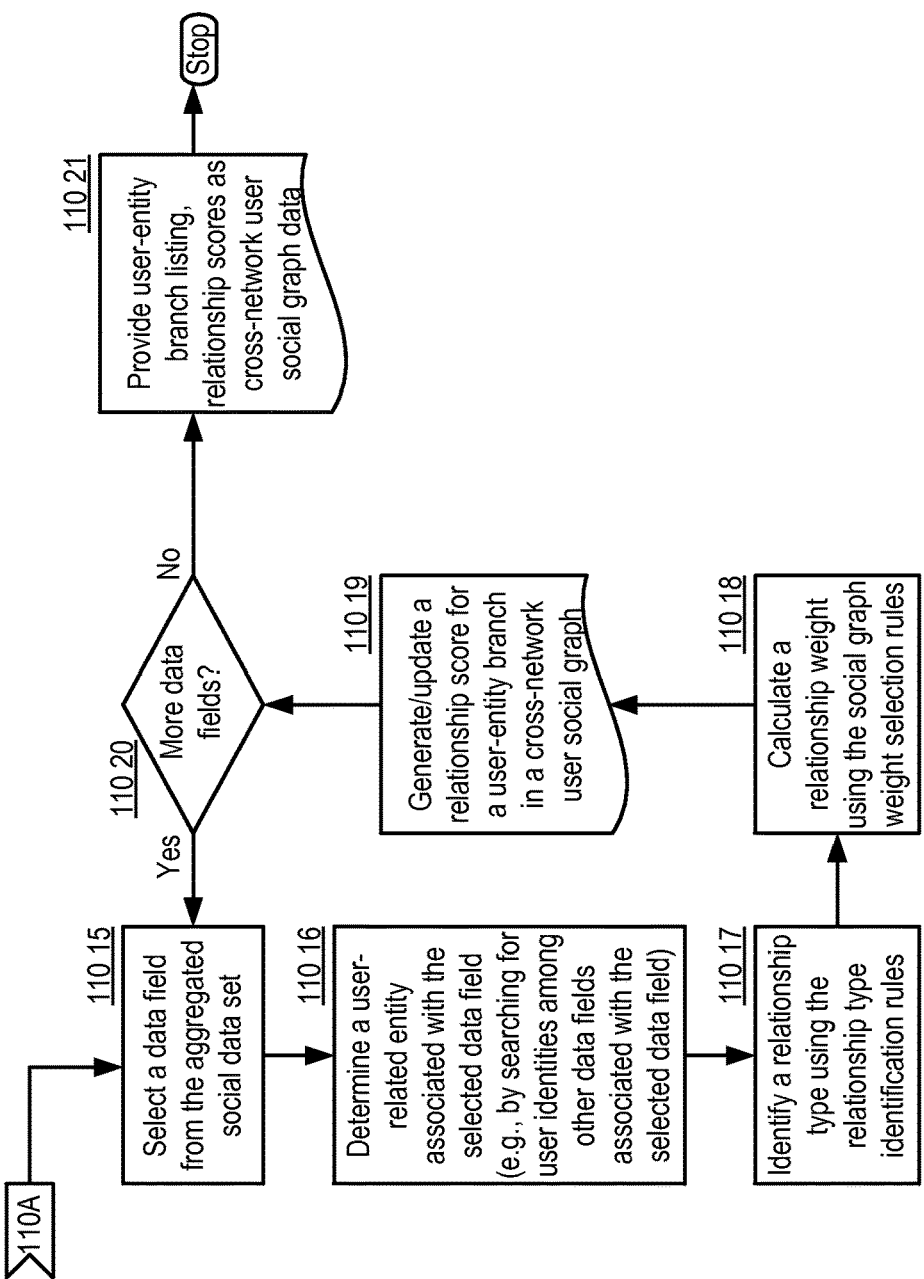

FIGS. 110A-B show logic flow diagrams illustrating examples of transforming user identification and profile data via a Cross-Network Social Graph Updating (CN-SGU) component into cross-network user social graph data. With reference to FIG. 110A, in some embodiments, a server within the SMP may obtain a trigger for cross-network social graph generation, e.g., 11001. The server may parse the trigger, and extract an identifier of a user for whom the cross-network social graph is to be generated, e.g., 11002. The server may query a database for a profile of the user, based on the extracted user ID, e.g., 11003. For example, the server may issue PHP/SQL commands to query a database table (such as FIG. 99, Users 9919*a*) for user profile data. An example user profile data query 11003, substantially in the form of PHP/SQL commands, is provided below:

```
<?PHP
header('Content-Type: text/plain');
mysql_connect("254.93.179.112",$DBserver,$pass-
    word); // access database server
mysql_select_db("SMP__PB.SQL"); // select database
    table to search
//create query
$query="SELECT network_id_list network_name_list
    login_secure_list FROM
UsersTable WHERE userID LIKE '%' $user_id";
$result=mysql_query($query); // perform the search
    query
mysql_close("SMP__PB.SQL"); // close database
    access
?>
```

In some embodiments, the server may parse the results of the query, and may extract the identity of the social networks of which the user is a member; and may obtain the user's credential(s) for those social network(s), e.g., 11004. For example, the server may utilize parsers such as the example parser discussed below in the description with respect to computer systemization FIG. 99. The server may select a social network for information mining, e.g., 11005. The server may generate an application programming interface ("API") call to the social networking server, e.g., 11006. In some embodiments, where the server does not have access to the user's login credentials, the server may submit a request to a user of the SMP to login to the social networking service to provide the server access to the user's social data. For example, the server may provide an HTML page to a client of the user including authentication commands similar to the exemplary illustrative listing provided below:

```
<html>
<div id="fb-root"x/div>
<script src="http://connect.facebook.net/en_US/all.js"x/
    script>
<script>
    FB.init({appld:'A3BFE5', status: true, cookie: true,
        xfbml: true));
    FB.Event.subscribe('auth.sessionChange', function
        (response) {
        if (response, session) {
            // A user has logged in, and a new cookie has been
                saved
```

```
    } else {
        // The user has logged out, and the cookie has been
            cleared
    }
});
</script>
</html>
```

The server may then generate and provide a request for social data including, but not limited to: user ID, friend ID(s), friend relationship strength(s), social activity time-stamp(s), message ID(s), message(s), and/or the like. For example, the load balancing server may execute PHP commands similar to those in the exemplary illustrative listing provided below:

```
<?PHP
header('Content-Type: text/plain');
// Obtain user ID(s) of friends of the logged-in user
$friends=json_decode(file_get_contents(
    'https://graph.facebook.com/me/
        friends?access_token='.
    $cookie['oauth_access_token']), true);
    $friend_ids=array_keys($friends);
// Obtain message feed associated with the profile of the
    logged-in user
$feed=json_decode(file_get_contents(
    'https://graph.facebook.com/me/feed?access_token='.
    $cookie['oauth_access_token']), true);
// Obtain messages by the logged-in user's friends
$result=mysql_query('SELECT*FROM          content
    WHERE uid IN ('.
    implode($friend_ids, ','). ')');
$friend_content=arrayO;
while ($row=mysql_fetch_assoc($result)) {
    $friend_content[ ]=$row;
}
```

If the API call is successful, e.g., 11007, option "Yes," in response, a social networking server may provide the requested information, e.g., 11010. For example, the social networking server may provide a JavaScript Object Notation format ("JSON")-encoded data structure embodying the requested information. An exemplary JSON-encoded data structure embodying social data (e.g., user ID(s) of friends of the logged-in user) is provided below:

```
{"data": [
    {"name": "Tabatha Orloff",
        "id": "483722"),
    {"name": "Darren Kinnaman",
        "id": "865743"),
    {"name": "Sharron Jutras",
        "id": "091274")
]}
```

If the API call was not successful (e.g., 11007, option "No"), and the API call has been tried a timeout threshold number of times (see 11008), the server may cease attempting to obtain user social data from the selected social network (see 11009). In some embodiments, the server may aggregate social data from each accessible social networking service into an aggregated cross-network user social data set, 11011, (e.g., including the user's original user profile from which the user's social networks were identified at 11004).

In some embodiments, the server may parse the aggregated user social data set, and extract the data fields (and, e.g., their associated data values), from the cross-network aggregated social data set, e.g., 11012. For example, the server may utilize parsers such as the example parser discussed below in the description with respect to computer systemization FIG. 99. The server may query a database for social graph weight selection rules, e.g., 11013, and relationship type identification rules, e.g., 11014, for user cross-network social graph generation/updating. For example, the server may issue PHP/SQL commands to query a database table (such as FIG. 99, Social Graph Generation Rules Table 9919I) for social graph weight selection and relationship type identification rules ("social graph generation rules"). An example social graph generation rules query, substantially in the form of PHP/SQL commands, is provided below:

```
<?PHP
header('Content-Type: text/plain');
mysql_connect    ("254.93.179.112",$DBserver,$pass-
    word); // access database server
mysql_select_db("SMP_DB.SQL"); // select database
    table to search
//create query
$query="SELECT   rule_id   rule_listing   rule_expiry
    rule_input_params_list
rule_output_params_list, API_call_list FROM Social
    Graph GenRulesTable WHERE
rule_type="Social Graph Gen";
$result=mysql_query($query); // perform the search
    query
mysql_close("SMP_DB.SQL"); // close database access
?>
```

In some embodiments, the database may provide the selected rules. Examples of such rules are illustrated below in XML form:

```
<social_graph_weight_selection_rule>
    <IF>field_source=OpenSocial graph JSON</IF>
    <THEN> weight=1</THEN>
    <ELSE> continue </ELSE>
</social_graph_weight_selection_rule>
<relationship_type_identification_rule>
    <IF>field_source=OpenSocial GRAPH JSON</IF>
    <THEN> type=OpenSocial TYPE </THEN>
    <ELSE> continue </ELSE>
</relationship_type_identification_rule>
```

With reference to FIG. 110B, in some embodiments, the server may select a data field from the aggregated social data set, e.g., 11015. The server may determine a user-related entity associated with the selected data field (e.g., by searching for user identities among other data fields associated with the selected data field), e.g., 11016. The server may identify a relationship type using the relationship type identification rules, e.g., 11017. For example, the server may apply each rule, and for each rule that is satisfied, a new entity may be created as being related to the user, and provided with an entity ID. For each identified entity ID, the server may calculate a relationship weight using the social graph weight selection rules, e.g., 11018. The server may generate (an updated) relationship score for each user-entity relationship as a branch weight for a branch in a cross-network user social graph, e.g., 11019. For example, if via two separate rules, scores are generated for the same user-entity branch in the cross-network user social graph, those scores may be added to provide a total branch strength. The server may perform such a branch identification, relationship type identification and score calculation for each branch in the cross-network user social graph (see 11020). The server may then provide the user-entity branch listing, and relationship scores as cross-network user social graph data, e.g., 11021.

FIG. 111 shows a logic flow diagram illustrating examples of transforming user identification and profile data via a Cross-Network User Profile Sensitive Query Generation (CN-UPSQG) component into cross-network user profile sensitive search results. In some embodiments, a server within the SMP may obtain a trigger for search query generation, e.g., 11101. The server may parse the trigger, and extract an identifier of a user for whom to generate the query, e.g., 11102. The server may query a database for a profile of the user, based on the extracted user ID, e.g., 11103. For example, the server may issue PHP/SQL commands to query a database table (such as FIG. 99, Users 9919a) for user profile data. An example user profile data query 11103, substantially in the form of PHP/SQL commands, is provided below:

```
<?PHP
header('Content-Type: text/plain');
mysql_connect("254.93.179.112",$DBserver,$pass-
    word); // access database server
mysql_select_db("SMP__PB.SQL"); // select database
    table to search
//create query
$query="SELECT   network_id_list   network_name_list
    login_secure_list FROM
UsersTable WHERE userID LIKE '%' $user_id";
$result=mysql_query($query); // perform the search
    query
mysql_close("SMP__PB.SQL");    //    close    database
    access
?>
```

In some embodiments, the server may parse the results of the query, and may extract the identity of the social networks of which the user is a member; and may obtain the user's credential(s) for those social network(s), e.g., 11104. For example, the server may utilize parsers such as the example parser discussed below in the description with respect to computer systemization FIG. 99. The server may select a social network for information mining, e.g., 11105. The server may generate an application programming interface ("API") call to the social networking server, e.g., 11106. In some embodiments, where the server does not have access to the user's login credentials, the server may submit a request to a user of the SMP to login to the social networking service to provide the server access to the user's social data. For example, the server may provide an HTML page to a client of the user including authentication commands similar to the exemplary illustrative listing provided below:

```
<html>
<div id="fb-root"x/div>
<script arc-"http: //connect, facebook.net/en_US/all.js"x/
    script>
<script>
    FB.init({appId: 'A3BFE5', status: true, cookie: true,
        xfbml: true});
    FB.Event.subscribe('auth.sessionChange',    function
        (response) {
        if (response, session) {
            // A user has logged in, and a new cookie has been
                saved
        }else {
            // The user has logged out, and the cookie has been
                cleared
        }
    });
</script>
</html>
```

The server may then generate and provide a request for social data including, but not limited to: user ID, friend ID(s), friend relationship strength(s), social activity time-stamp(s), message ID(s), message(s), and/or the like. For example, the load balancing server may execute PHP commands similar to those in the exemplary illustrative listing provided below:

```
<?PHP
header('Content-Type: text/plain');
// Obtain user ID(s) of friends of the logged-in user
$friends=json_decode(file_get_contents(
    'https://graph.facebook.com/me/
        friends?access_token='
    $cookie['oauth_access_token'), true);
$friend_ids=array_keys($friends);
// Obtain message feed associated with the profile of the
    logged-in user
$feed=json_decode(file_get_contents(
    'https://graph.facebook.com/me/feed?access_token='
    $cookie [oauth_access_token]), true);
// obtain messages by the logged-in user's friends
$result=mysql_query('SELECT*FROM        content
    WHERE uid IN ('. implode ($friend,ids, ',') ')');
$friend_content=arrayO;
while ($row=mysql_fetch_assoc($result)) {
$friend_content[ ]=$row;
}
```

If the API call is successful, e.g., 11107, option "Yes," in response, a social networking server may provide the requested information, e.g., 11110. For example, the social networking server may provide a JavaScript Object Notation format ("JSON")-encoded data structure embodying the requested information. An exemplary JSON-encoded data structure embodying social data (e.g., user ID(s) of friends of the logged-in user) is provided below:

```
{"data": [
    {"name": "Tabatha Orloff",
        "id": "483722"),
    {"name": "Darren Kinnaman",
        "id": "865743"),
    {"name": "Sharron Jutras",
        "id": "091274")
]}
```

If the API call was not successful (e.g., 11107, option "No"), and the API call has been tried a timeout threshold number of times (see 11108), the server may cease attempting to obtain user social data from the selected social network (see 11109). In some embodiments, the server may aggregate social data from each accessible social networking service into an aggregated cross-network user social data set, 11111, (e.g., including the user's original user profile from which the user's social networks were identified at 11104).

In some embodiments, the server may parse the aggregated user social data set, and extract the data fields (and, e.g., their associated data values), from the cross-network aggregated social data set, e.g., 11112. For example, the server may utilize parsers such as the example parser discussed below in the description with respect to computer systemization FIG. 99. The server may query a database for data value filtration rules, e.g., 11113, for query keyword set generation. For example, the server may issue PHP/SQL commands to query a database table (such as FIG. 99, Keyword Generation Rules Table 9919I) for data value filtration rules. An example data value filtration rules query, substantially in the form of PHP/SQL commands, is provided below:

```
<?PHP
header('Content-Type: text/plain');
mysql_connect("254.93.179.112",$DBserver,$pass-
    word); // access database server
```

```
mysql_select_db("SMP_DB.SQL"); // select database
    table to search
//create query
$query="SELECT    rule_id    rule_listing    rule_expiry
    rule_input_params_list
    rule_output_params_list, API_call_list FROM Key-
        wordGenRulesTable WHERE
    rule_type="KeywordGen";
$result=mysql_query($query); // perform the search
    query
mysql_close("SMP_DB.SQL"); // close database
    access
?>
```

In some embodiments, the database may provide the selected rules. Examples of such rules are illustrated below in XML form:

```
<data_value_filtration_rule>
    <IF>field_source=OpenSocial graph JSON</IF>
    <THEN>include; stop other rules </THEN>
    <ELSE>continue </ELSE>
</data_value_filtration_rule>
```

The server may filter the extracted data fields using filtration rules to generate the query keyword set, e.g., 11114. The server may then generate a database query (or queries, e.g., depending on the number and/or relatedness of keywords), using the generated query keyword set, e.g., 11115. The server may provide the generated database queries as cross-network user profile sensitive queries for submission to database(s) for cross-network user social data-relevant search results.

Figure 4:
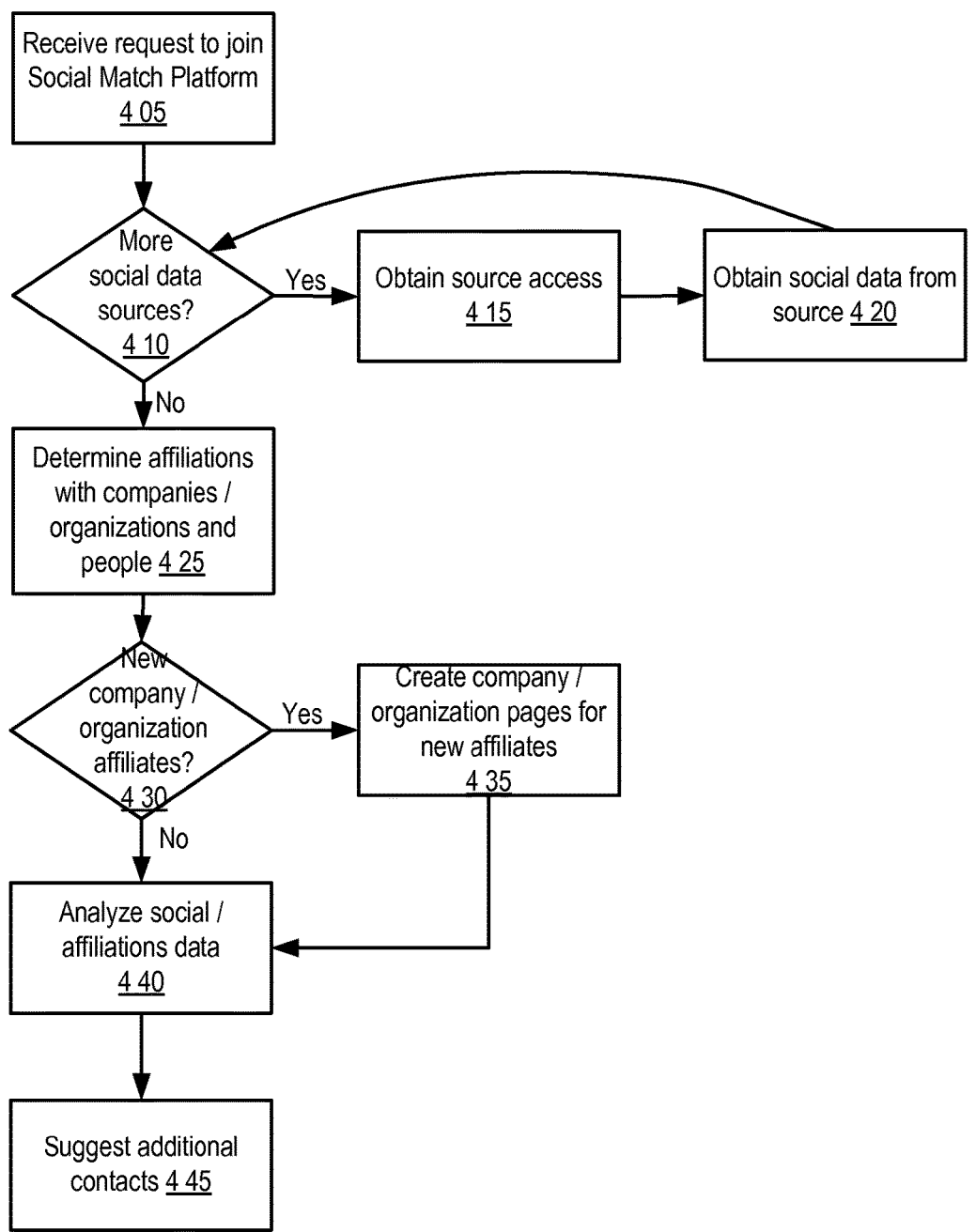
FIG. 4 shows a logic flow diagram illustrating a Network Join (NJ) component in one embodiment of the SMP.

FIG. 4 shows a logic flow diagram illustrating a Network Join (NJ) component in one embodiment of the SMP. In FIG. 4, a request to join the SMP may be received at 405. As described with regard to FIG. 3, such a request 353, 355 may be received from a user (e.g., from a candidate, a recruiter, an applicant, a company, an organization, a group, and/or the like).

A determination may be made at 410 whether there are social data sources from which the SMP should obtain social data, location data, news and social media data, and/or the like. For example, upon joining a user may specify that the SMP should obtain information from one or more social networking sites, such as Facebook and Linkedin. If there is a target social data source, the SMP may obtain access to such social data source at 415. In one embodiment, the user may provide login credentials to the SMP that may be used to access the social data source (e.g., Linkedin username and password). In another embodiment, installing an application on a social network (e.g., a Facebook application) may also result in the user authorizing the SMP to access their data on the social network (e.g., Facebook data).

The SMP may obtain social data, location data, news and social media data, and/or the like from the social data source at 420. In one embodiment, such data may be obtained (e.g., via a Facebook API call) upon use. In another embodiment, such data may be obtained (e.g., via a Facebook API call) and stored by the SMP. In yet another embodiment, the SMP may obtain such data and consolidate it with data from other social sources. For example, the SMP may obtain education data from Facebook, work experience data from Linkedin, and create a profile for the user that includes both types of data (e.g., as described with regard to SMP network info 357). In some implementations, this may be used to compile a SMP profile for the candidate.

The user's affiliations with companies/organizations and/ or people may be determined at 425. Affiliations may include companies, organizations, universities, groups, clubs, people, and/or the like with which the user was previously and/or is currently associated. In one implementation, affiliations may be determined by examining the Affiliations field of the UserProfile data structure described with regard to SMP network info 357. In another implementation, affiliates may be inferred based on analysis of information regarding the user. For example, affiliates may include other users that are members of a group in which the user is a member, users that have similar education, skills, location, preferences, career paths, and/or the like as the user, and/or the like.

In some implementations, affiliations may be determined 425 by examining relationships between users. For example, a first user may indicate that (s)he went to school with (or worked with, etc.) a second user. For instances where the second user education information is not available, the SMP may associate the education information from the first user with that of the second user. The second user may then approve, claim or edit the education information provided by the first user, thereby incorporating the information into their (the second user's) SMP profile.

A determination may be made at 430 whether the user's affiliations include company/organization affiliates that have not previously been presented to the SMP (e.g., based on the names of the affiliates). If such new affiliates are included, information regarding these affiliates may be stored at 435 (e.g., as described with regard to the CompanyOrganizationProfile data structure described with regard to SMP network info 357), and company/organization pages may be created for the new affiliates. For example, if the user works at Microsoft and is the first user to indicate an affiliation with Microsoft, a new page for Microsoft may be created by the SMP. Such pages may provide information regarding the company/organization (e.g., name, number of affiliated users on the SMP), media information (e.g., user provided photos, videos, and/or the like), a listing of affiliated users on the SMP, and/or the like. Furthermore, such pages may be linked to other pages (e.g., groups within a company may be linked to the company) and/or consolidated (e.g., Microsoft and Microsoft Inc. may be consolidated under one page) by a company/organization representative and/or by the SMP (e.g., based on a similarity analysis of names).

The user's social information (e.g., including social network data, location data, news and social media data, and/or the like) and/or affiliations data may be analyzed at 440. For example, social data of the user's contacts may be analyzed to discern other users that are contacts of a significant number (e.g., 5 contacts, 20% of contacts) of the user's contacts and that share similar location, education, skills, and/or the like. Such other users may be suggested to the user at 445 as potential new contacts. In another example, the user's affiliations may be analyzed to discern other users that share a significant number (e.g., 5 affiliations, 20% of affiliations) of the user's affiliations. In some embodiments, users may classify their contacts by, for example, providing an indication of how they know other users of the SMP. For example, a first user may indicate that (s)he went to school with a second user at a certain educational institution, and the second user has indicated that (s)he attended school with a third user, the third user may be suggested to the first user as a potential new contact. As such, a list of "people you may know" may be provided to each user. In this light, other users (e.g., people, companies/organizations, and/or the like) may be suggested to the user at 445 as potential new contacts.

Figure 5A:
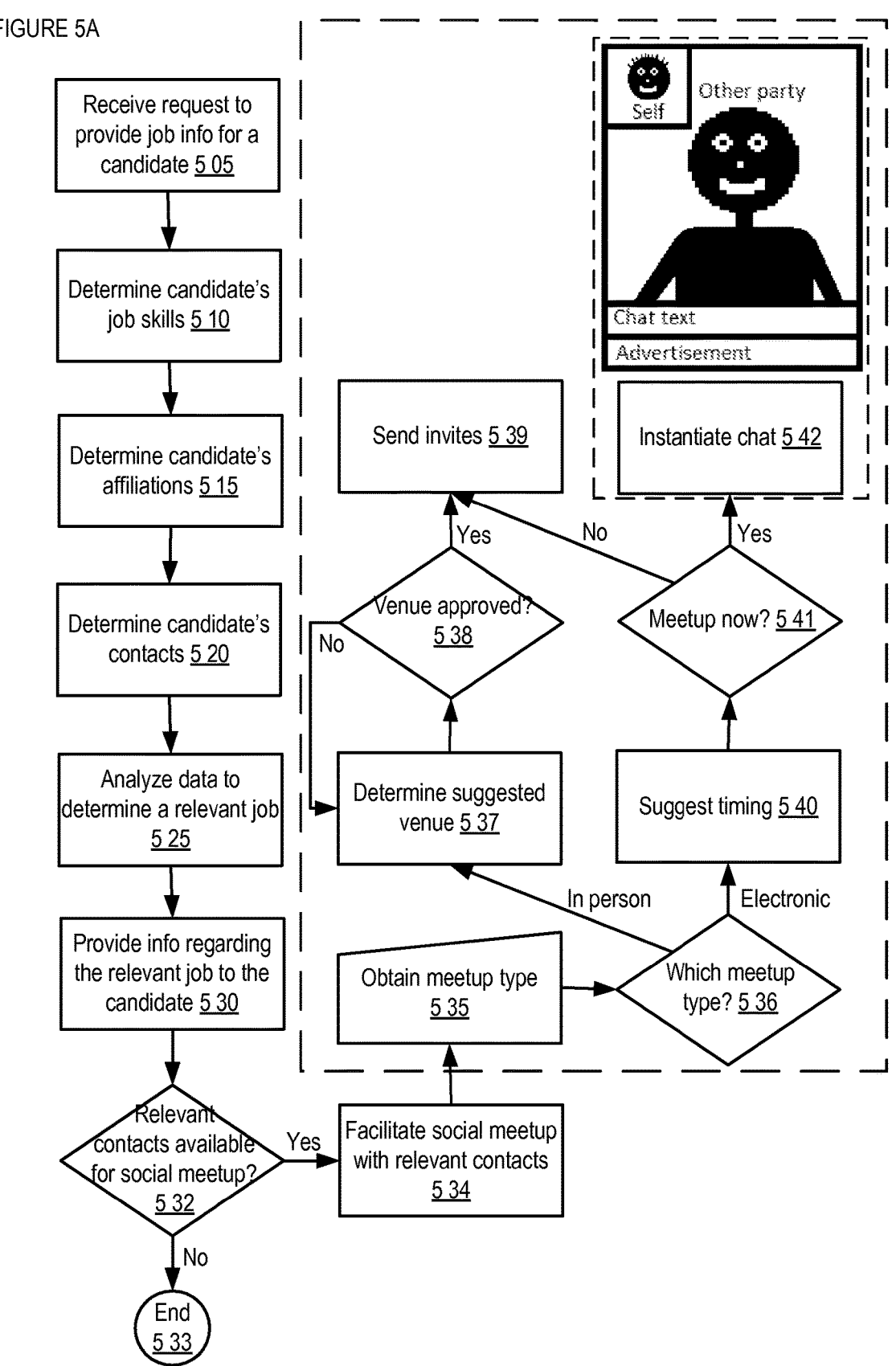
FIG. 5A shows a logic flow diagram illustrating a Job Info Providing (JIP) component in one embodiment of the SMP.

FIG. 5A shows a logic flow diagram illustrating a Job Info Providing (JIP) component in one embodiment of the SMP.

The JIP component may be used to provide job information to a candidate and/or to facilitate social meetup with the candidate. In FIG. 5A, a request to provide job information may be received at 505. In one embodiment, such a job information request may be received as a result of a job search query initiated by a candidate. In another embodiment, such a job information request may be a result of determining which job to present to a candidate in an advertisement. For example, the job information request may include information such as the candidate's unique ID, a job title of a desired job (e.g., based on the candidate's last job title), job location, and/or the like, and may be in XML format substantially in the following form:

```
<XML>
    <JobInfoRequest>
        <UserID>Candidate's unique ID</UserID>
        <Title>JobTitle1</Title>
        <Location>New York, NY</Location>
    </JobInfoRequest>
</XML>
```

The candidate's job skills, affiliations and contacts may be determined at 510, 515, and 520, respectively. In one embodiment, such information may be retrieved 3, based on the candidate's unique ID (UID) via an API call to a social data source (e.g., via Facebook API calls). For example, an API call to determine the candidate's contacts from Facebook may be written in JavaScript substantially in the following form:

FB.Data.query ('SELECT flid FROM friendlist WHERE ovine r-FacebookUniqueID');

In another embodiment, such information may be retrieved from the data stored by the SMP. For example, the candidate's affiliations may be determined via a SQL query substantially in the following form:

SELECT affiliations FROM UserInfo WHERE uid='Candidate's Unique ID'

The candidate's job skills, affiliations, contacts, endorsements, recommendations, and/or the like may be analyzed to determine relevant jobs at 525. In one embodiment, relevant jobs may be determined based on the number of the candidate's connections (e.g., 1st degree contacts, 2nd degree contacts, and/or the like) with the recruiter posting the job and/or other users affiliated with the company offering the job, and/or based on the candidate's skills. For example, job relevancy may determined according to a formula substantially in the following form:

Job Relevancy=(10*# of recruiters)+(3*# of 1st degree contacts at company)+(0.5*# of 2nd degree contacts)+(10*% of desired job skills that the candidate has)

Accordingly, the job relevancy in this example is determined as the sum of: (1) ten multiplied by the number of recruiters who posted the job who are 1st degree contacts of the candidate, (2) three multiplied by the number of first degree contacts affiliated with the company offering the job (3) one half multiplied by the number of second degree contacts who are affiliated with the company, and (4) ten multiplied by the percentage of desired skills listed for the job that the candidate has. In another embodiment, relevant jobs may be determined based on the match between candidate's skills and/or education and/or location and job prerequisites, and ordered for presentation to the candidate based on the job relevancy determined using social data (e.g., using the job relevancy formula above). In additional embodiments, social interactions and opinion makers, as described in the Connecting Internet Users section, may affect job relevancy. For example, contacts who are identified as connectors may be weighted higher than other contacts when calculating the job relevancy value. In alternative embodiments, social data may affect the choice of paths determined by CSE and/or APT, as described in the Advancement Path Taxonomy section. In yet other embodiments, the candidate's career path to date may affect job relevancy.

Information regarding relevant jobs may be provided to the candidate at 530. For example, in response to a search query, the candidate may be presented with ten most relevant jobs as determined by the job relevancy formula. In another example, a job advertisement presented to the candidate may be the most relevant job as determined by the job relevancy formula (e.g., social data may affect the choice of advertisements to present to the candidate using the Career Advertisement Network, as described in Advertisement Generation, Selection And Distribution System Registration section, Advertisement Generation section, Advertisement Targeting/Distribution section, and Advertisement Evolution section). In some embodiments, such information may be presented to the candidate using an interactive display box 2300 illustrated in FIG. 23, as described in the Automated Online Data Submission section.

A determination may be made at 532 whether relevant contacts (e.g., a recruiter, a recruiter's direct or indirect contacts, employees of the company posting the job, and/or the like) for a relevant job are available for social meetup. For example, interacting with the recruiter may improve the candidate's chances of getting the job and may provide the recruiter with additional information regarding the candidate. In another example, interacting with company employees may help the candidate assess the culture of the company. In one implementation, such determination may be made by examining the SocialMeetupPreferences field of the UserProfile data structure described with regard to SMP network info 357. If one or more relevant contacts are available for social meetup and the candidate desires to do so, the SMP may facilitate social meetup with such relevant contacts at 534, as described in further detail in 535-542.

The SMP may obtain a meetup type from the candidate at 535. For example, the candidate may select a meetup type (e.g., in-person, text chat, audio chat, video chat, and/or the like) via a select box. If the candidate selects in-person meetup, a suggested venue (e.g., a restaurant, a coffee shop) may be determined at 537. In one embodiment, the suggested venue may be determined based on geographic proximity to meetup participants (e.g., if the meetup participants are located in Manhattan, the venue may be a restaurant in Manhattan). In another embodiment, the suggested venue may be based on sponsorship (e.g., a venue may pay a fee to be on the list of venues that may be suggested to the meetup participants). If the venue is not approved by the meetup participants at 538, the next preferred venue may be selected and suggested to the user. If the venue is approved, invites to schedule a meetup at a specified time (e.g., after 3 days) may be sent to the meetup participants at 539. For example, invites may be sent via email, via Facebook events, via Google calendar, and/or the like. If the candidate selects electronic meetup, a meetup time may be suggested at 540. For example, the SMP may suggest a meetup right away (e.g., if the participants are available), after a predetermined time (e.g., in half an hour or the following day), and/or the like. If a determination is made at 541 that the meetup is not going to happen right away, invites to schedule a meetup at a specified time may be sent to the meetup participants at 539. If the meetup is going to happen right away (or the scheduled meetup time has arrived), a chat client (e.g., text, audio, video and/or the like) may be instantiated at 542 (as illustrated with regard to

542). In one embodiment, the chat client may be instantiated by the SMP (e.g., on a webpage via a SMP chat application written in Flash). In another embodiment, the chat client may be a third party application (e.g., Skype, AIM, Facebook Chat, and/or the like) launched by the SMP.

In some implementations, if the candidate's preferred meetup type is an in-person meetup, the SMP may determine the feasibility of an in-person meetup by, for example, determining if the candidate and recruiter live in the same city or within a certain mile radius. If the SMP detects that the candidate and recruiter are located in distant cities, the SMP may suggest that an electronic meetup may be more feasible than an in-person meetup. In this scenario, an option may be presented to both the candidate and the recruiter and one or both parties may select to proceed either with the in-person meet up or the suggested electronic meetup.

Figure 5B:
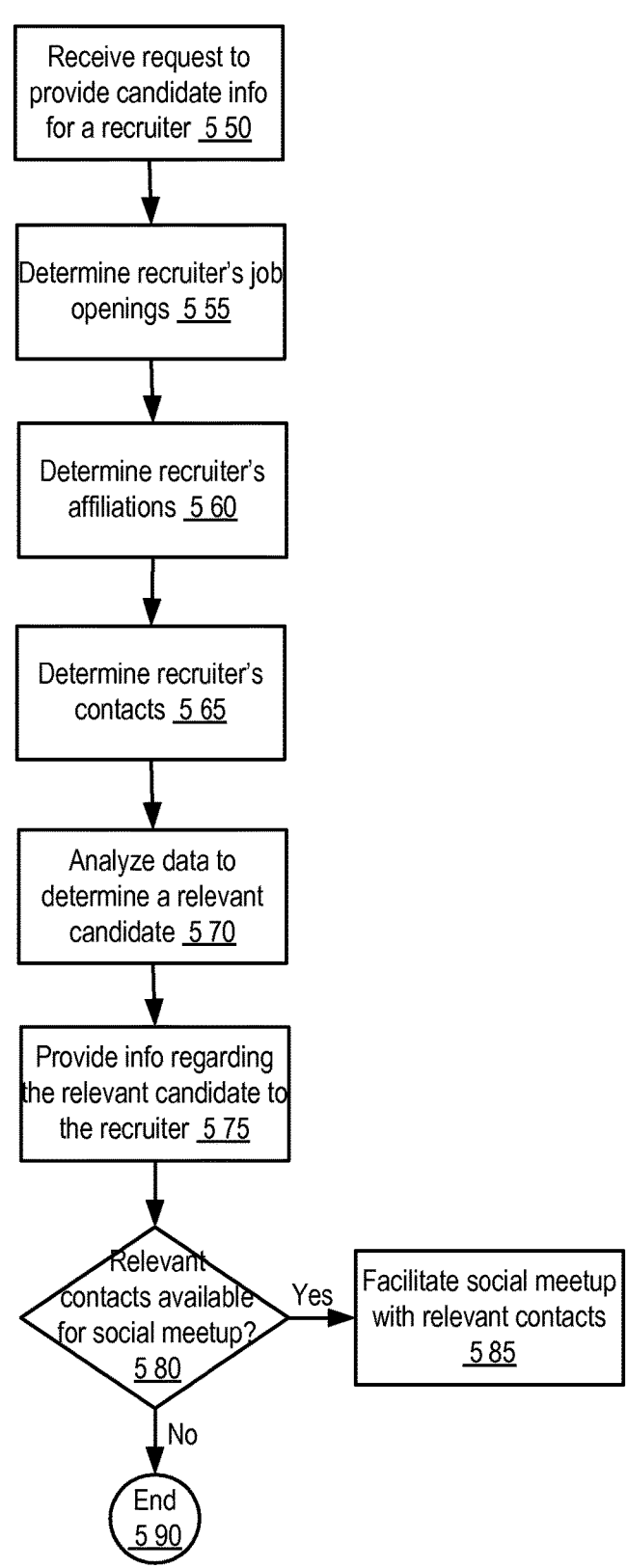
FIG. 5B shows a logic flow diagram illustrating a Candidate Info Providing (CIP) component in one embodiment of the SM.

FIG. 5B shows a logic flow diagram illustrating a Candidate Info Providing (CIP) component in one embodiment of the SMP. The CIP component may be used to provide candidate information to a recruiter and/or to facilitate social meetup with the recruiter. In FIG. 5B, a request to provide candidate information may be received at 550. In one embodiment, such a candidate information request may be received as a result of a candidate search query initiated by a recruiter. In another embodiment, such a candidate information request may be a result of determining which candidate to present to a recruiter in an advertisement. For example, the candidate information request may include information such as the recruiter's unique ID, a job title (e.g., based on the job title of a job posted by the recruiter), job location, and/or the like, and may be in XML format substantially in the following form:

```
<XML>
    <CandidateInfoRequest>
        <UserID>Recruiter's unique ID</UserID>
        <Title>JobTitle1</Title>
        <Location>New York, NY</Location>
    </CandidateInfoRequest>
</XML>
```

The recruiter's posted jobs, affiliations and contacts may be determined at 555, 560, and 565, respectively. In one embodiment, such information may be retrieved based on the recruiter's unique ID (UID) via an API call to a social data source (e.g., via Facebook API calls). For example, an API call to determine the recruiter's contacts from Facebook may be written in JavaScript substantially in the following form:

```
FB.Data.query ('SELECT flid FROM friendlist WHERE
    ovine r=FacebookUniqueID');
```

In another embodiment, the recruiter's posted jobs may be retrieved via an API call to a social data source (e.g., via an API call to a data source associated with the Monster.com website).

In yet another embodiment, such information may be retrieved from the data stored by the SMP. For example, the recruiter's affiliations may be determined via a SQL query substantially in the following form:

```
SELECT    affiliations    FROM    UserInfo    WHERE
    uid='Recruiter's Unique ID'
```

The recruiter's posted jobs, affiliations, contacts, information regarding members of a group at a company seeking an employee, and/or the like may be analyzed to determine relevant candidates at 570. In one embodiment, relevant candidates may be determined based on the closeness of the recruiter's connection (e.g., 1st degree contact, 2nd degree contact, and/or the like) with a candidate and/or the number of connections that a candidate has with members of the group seeking an employee, and/or based on the candidate's skills. For example, candidate relevancy may be determined according to a formula substantially in the following form:

Candidate Relevancy=(5/closeness of connection)+(10*# of 1st degree contacts at the group)+(2*# of 1st degree contacts at the company)+(0.5*# of 2nd degree contacts)+(10*% of desired job skills that the candidate has)

Accordingly, the candidate relevancy in this example is determined as the sum of: (1) five divided by the closeness of the candidate's connection with the recruiter (1st degree contact: 1, 2nd degree contact: 2, and/or the like), (2) ten multiplied by the number of the candidate's first degree contacts affiliated with the group at the company offering the job, (3) two multiplied by the number of first degree contacts affiliated with the recruiter's company, (4) one half multiplied by the number of second degree contacts who are affiliated with the company, and (5) ten multiplied by the percentage of desired skills listed for the job that the candidate has. In another embodiment, relevant candidates may be determined based on the match between candidate's skills and/or education and/or location and job prerequisites, and ordered for presentation to the recruiter based on the candidate relevancy determined using social data (e.g., using the candidate relevancy formula above). In additional embodiments, social interactions and opinion makers, as described in the Connecting Internet Users section, may affect candidate relevancy. For example, contacts who are identified as connectors may be weighted higher than other contacts when calculating the candidate relevancy value.

Information regarding relevant candidates may be provided to the recruiter at 575. For example, in response to a search query, the recruiter may be presented with ten most relevant candidates as determined by the candidate relevancy formula. In another example, a candidate advertisement presented to the recruiter may be the most relevant candidate as determined by the candidate relevancy formula (e.g., social data may affect the choice of advertisements to present to the recruiter using the Career Advertisement Network, as described in Advertisement Generation, Selection And Distribution System Registration section, Advertisement Generation section, Advertisement Targeting/Distribution section, and Advertisement Evolution section). In some embodiments, such information may be presented to the recruiter using an interactive display box 2300 illustrated in FIG. 23, as described in the Automated Online Data Submission section.

A determination may be made at 580 whether relevant contacts (e.g., a relevant candidate, the relevant candidate's direct or indirect contacts, employees of the company where the relevant candidate currently works, alums of an educational institution where the relevant candidate studied, and/or the like) are available for social meetup. For example, interacting with a candidate may provide the recruiter with additional information regarding the candidate. In another example, interacting with alums of an educational institution where a candidate studied may help the recruiter assess the quality of education provided by the educational institution. In one implementation, such determination may be made by examining the SocialMeetupPreferences field of the User-Profile data structure described with regard to SMP network info 357. If one or more relevant contacts are available for social meetup and the recruiter desires to do so, the SMP may facilitate social meetup with such relevant contacts at 585. In one embodiment, the SMP may provide names (e.g., of the candidate, of the recruiter, of alums, and/or the like), venue preferences (e.g., face-to-face, group meeting, phone conference, chat room, and/or the like), length preferences (e.g., meet for half an hour), candidate resume, additional job description, common interests, and/or the like to the recruiter and/or relevant contacts. In another embodiment, the SMP may also manage the venue for the social meetup (e.g., the SMP may provide video, audio, text and/or the like connectivity applications for the social meetup participants).

Figure 6:
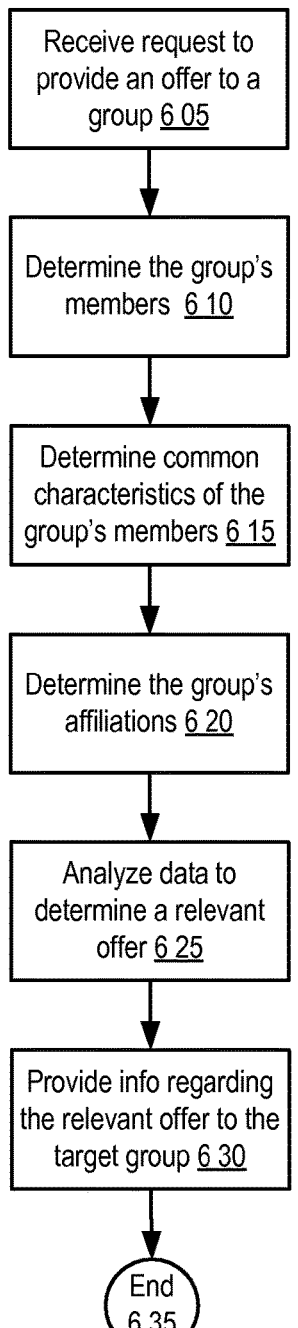
FIG. 6 shows a logic flow diagram illustrating an Offer Providing (OP) component in one embodiment of the SMP.

FIG. 6 shows a logic flow diagram illustrating an Offer Providing (OP) component in one embodiment of the SMP. The OP component may be used to provide offer information to a group and/or to facilitate social meetup with the offer provider. In FIG. 6, a request to provide an offer to a group may be received at 605. Such an offer request may be received as a result of a group member providing information regarding the group's interests with regard to various offers. For example, a group member (e.g., the group leader, any authorized group member, and/or the like) may provide information regarding offer types, locations, and/or the like that interest the group via the SMP user interface (e.g., via an input box of a web page). In one implementation, the offer request may include information such as a group ID, an offer type, an offer location, and/or the like, and may be in XML format substantially in the following form:

```
<XML>
  <OfferRequest>
    <GroupID>Group's unique ID</GroupID>
    <OfferType>Ergonomic Products</OfferType>
    <OfferLocation>New York, NY</OfferLocation>
  </Offe rRequest>
</XML>
```

The group's members may be determined at 610 (e.g., by examining a members database table associated with the group ID), and common characteristics of the group's members may be determined at 615. For example, the group's members may be software developers (e.g., database engineers of company X) working in New York. The group's affiliations may be determined at 620. For example, such affiliations may include the company X, another group within the company (e.g., application engineers of company X), companies in the same industry, and/or the like. In one embodiment, such information may be determined via an API call to a social data source (e.g., via Facebook API calls). In another embodiment, such information may be retrieved from the data stored by the SMP.

Data regarding the group may be analyzed to determine a relevant offer at 625. For example, the SMP may determine that software developer groups interested in ergonomic products tend (e.g., based on statistics collected over time, based on data provided by a third party, and/or the like) to be interested in ergonomic office furniture (e.g., ergonomic chairs). In another example, the SMP may determine that similar groups in other companies in the same industry tend to be interested in ergonomic office furniture. In another example, the SMP may determine that a representative of a company that provides ergonomic office furniture has contacts in the group (e.g., first degree contacts, second degree contacts, and/or the like). For example, offer relevancy score may be determined according to a formula substantially in the following form:

Offer Relevancy=(10*% of groups in the industry interested in this offer)+(2*# of 1 st degree contacts in the group)+(0.5*# of 2nd degree contacts in the group)

Accordingly, the offer relevancy in this example is determined as the sum of: (1) ten multiplied by the percentage of the groups in this industry that showed interest in this offer, (2) two multiplied by the number of the first degree contacts that a as representative of a company providing the offer has in the group, and (3) one half multiplied by the number of the second degree contacts that a representative of a company providing the offer has in the group. In additional embodiments, social interactions and opinion makers, as described in the Connecting Internet Users section, may affect offer relevancy. For example, contacts identified as connectors may be weighted higher than other contacts when calculating the offer relevancy value.

Information regarding a relevant offer (e.g., an offer having the highest value calculated using the offer relevancy formula above), such as an offer to purchase ergonomic office furniture, may be provided to the group (e.g., posted to the wall of the group) and/or to group members (e.g., via an email message) at 630. For example, the offer may be provided via a Facebook API call.

Connecting Internet Users

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 7:
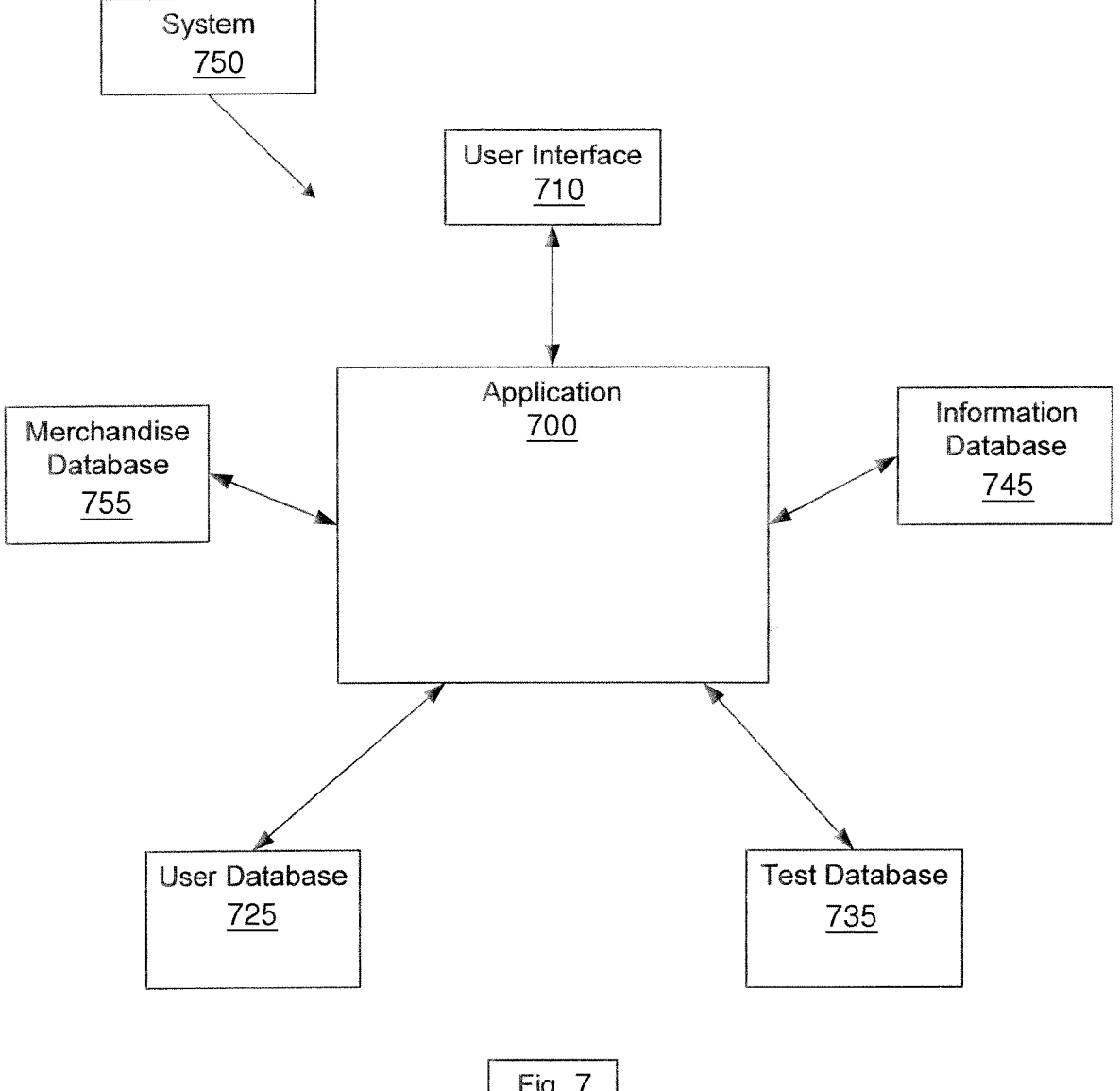
FIG. 7 illustrates relationships between an embodiment of an application for user interaction and various other modules or data stores, such as may be embodied in a medium or in media.

FIG. 7 illustrates relationships between an embodiment of an application and various other modules or data stores, such as may be embodied in a medium or in media. The application communicates with users through a user interface and accesses data in various databases or data stores. Note that the term databases is used for any collection of information, whether organized as a relational database (for example) or stored in some other manner.

Within system 750, application 700 communicates with users through user interface 710, which may be a website user interface or other graphical user interface for example. Based on its communication with a user, application 700 accesses data in each of user database 725, test database 735, information database 745 and merchandise database 755. The databases described may be well defined or may represent a collection of data such as may be found in a directory structure accessible through a file system for example.

In one embodiment, the user database 725 includes user profiles which encompass user login information, user history with the application 700, personal user information, and results of user interaction with test database 735, information database 745 and merchandise database 755 for example. In such an embodiment, test database 735 includes tests of various types which may be administered, along with information indicating how to analyze results of responses to the tests and information indicating relationships between the various tests.

Moreover, in such an embodiment, information database 745 includes reference or instructional information on a variety of topics, such as how to interpret test results, self-help information, relationship information, career information, or other information topics which may be of interest to a user or users. Also, in such an embodiment, merchandise database 755 includes information about goods or services for sale, and about merchants offering goods or services for example. Merchandise refers to that which may be offered (such as services or goods for example), rather than strictly to material goods in this context.

In response to a user query through user interface 710, application 700 may present information from information database 745, administer a test from test database 735, lookup user information in user database 725 or lookup desired goods and/or services in merchandise database 755. Similarly, application 700 may update profile information in user database 725 responsive to user requests or actions, or inventory information in merchandise database 755 for example. Other modifications may be appropriate, depending on the form and availability of the various databases.

Figure 8:
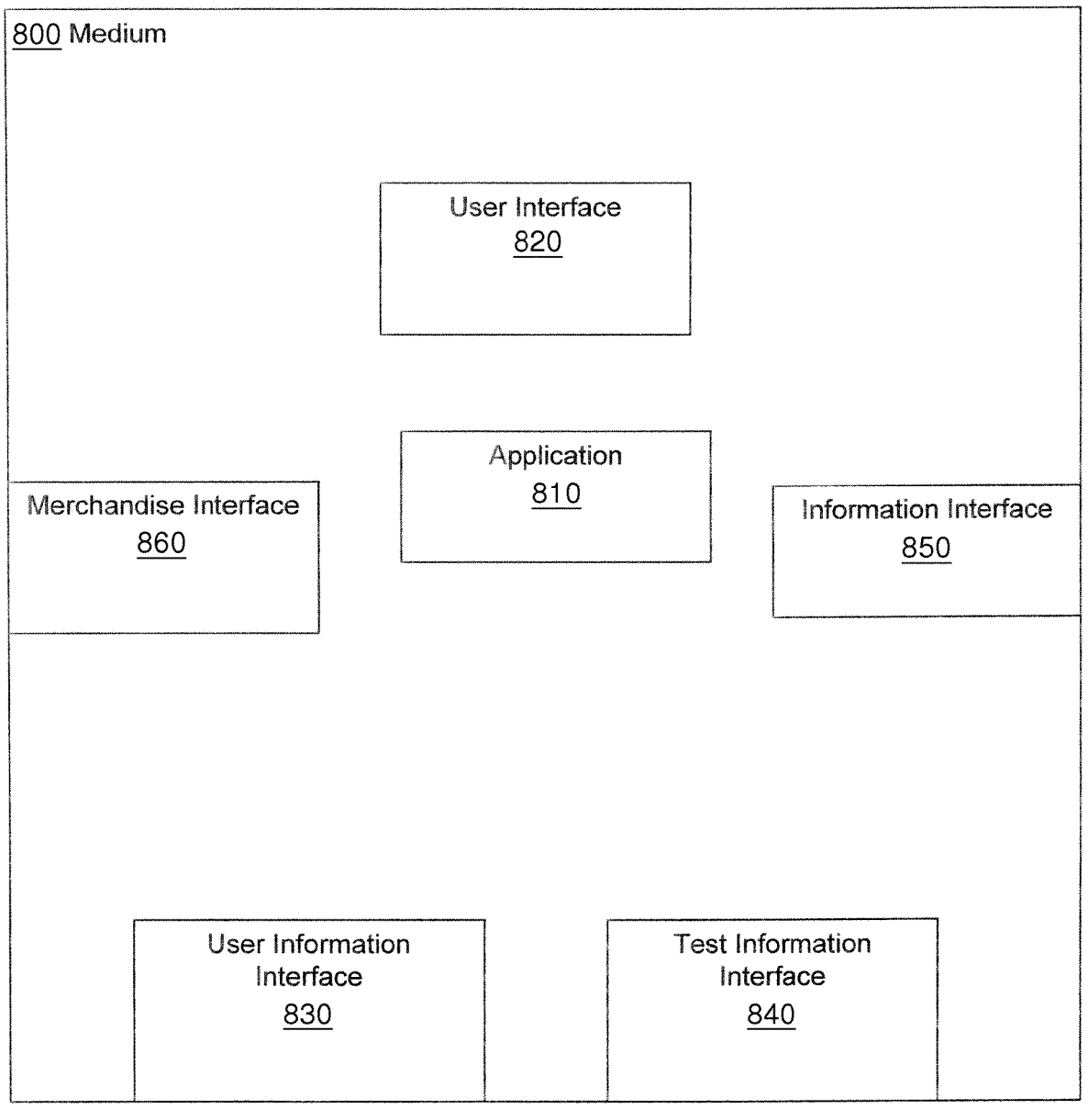
FIG. 8 illustrates an embodiment of a user interaction application as it may be embodied in a medium or in media.

The application of FIG. 7 may be embodied in a variety of ways, either as an apparatus or as a method. FIG. 8 illustrates an embodiment of an application as it may be embodied in a medium or in media. Machine-readable media may embody instructions, which, when executed by a processor, cause the processor to act, thereby carrying out a method or uniquely configuring an apparatus. In one embodiment, a medium includes an application and a variety of interfaces allowing the application to communicate with a user and access (for both read and write purposes) data in various data stores.

As illustrated, medium 800 includes application 810, the application which receives commands or otherwise interacts with a user and manipulates data responsive to interaction with the user and a host processor or system. Medium 800 also includes a user interface 820, which may be executed or operated to communicate with the user. Note that medium 800 is depicted as a single, integrated or unitary medium. However, medium 800 may actually be a collection of media of the same or different types as appropriate in a particular embodiment or implementation. Medium 800 further includes user information interface 830, test information interface 840, information interface 850, and merchandise interface 860.

User information interface 830 may be executed or operated to obtain information (such as personal information or login information for example) from a user information database such as user database 725. Test information interface 840 may be executed or operated to obtain information from a test database such as test database 735 (such as tests or relationships between tests for example). Information interface 850 may be executed or operated to obtain information from an information database such as information database 745 (such as web pages or documents from a directory structure for example). Merchandise interface 860 may be executed or operated to obtain data (such as merchandise characteristics or availability for example) from a merchandise information database such as merchandise database 755.

Tests used by an application may have a variety of relationships and a variety of storage methodologies. All of these relationships may be maintained within a relational database of test for example, along with numerous other relationships not shown. Alternatively, tests may be stored as individual files within a file system, and the file system may include various forms of links to other tests (files) within the file system. The links between various tests may be used to determine a progression of tests, or select among various progressions of tests. Similarly, when several tests are linked, the various links may provide a basis for presenting a set of tests, one of which is administered as a progressive test. Moreover, tests that are not directly linked may be correlated through use of links to intermediate tests, potentially resulting in a suggestion to administer an intermediate test to collect additional information.

Similarly, users of an application may be related in a variety of ways. FIG. illustrates an embodiment of a process of interaction between a group and a vendor. This interaction depends on the relationships between members of the group. The method illustrated includes a number of modules that may be executed or operated in a serial or parallel fashion, for example. At module 1510, an offer is provided to a connector or set of connectors. These connectors are expected to propagate the offer through the Internet. At module 1520, the connectors receive the offer. At module 1530, the connectors propagate the offer to directly and indirectly connected or coupled people through the Internet or a similar network, such as a network designed around a progressive testing facility. At module 1540, responses to the offer arrive with the connector(s). At module 1550, the connector(s) pass the responses along to the vendor. At module 1560, the vendor completes the transaction.

In some embodiments, variations of the method may be used. For example, responses need not flow through the connectors, they may be sent directly to the vendor. Similarly, offers of various forms may be used, such as circulating coupons, group offers, progressive coupons, sponsored offers (wherein a connector or third-party contributes to the vendor's offer), or other forms of offers. In some such circumstances, a threshold level of responses (acceptances) may need to be met, either as a percentage of responses or as a predetermined quantity of responses for example.

Figure 16:
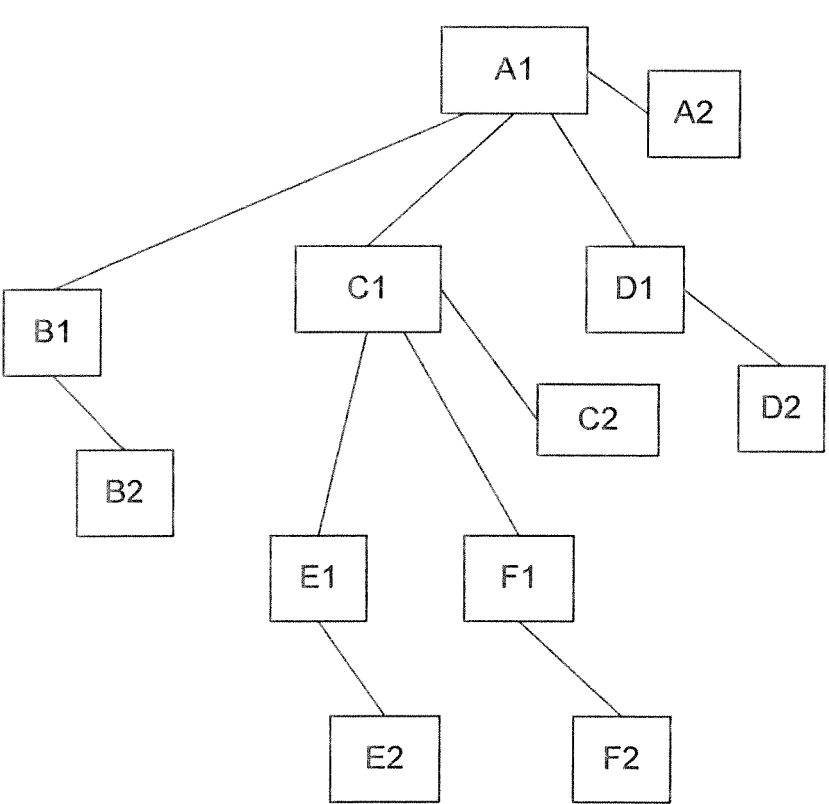
FIG. 16 illustrates relationships between users with coupons or offers in one embodiment.

A number of different mechanisms connecting buyers to sellers may be understood with reference to FIG. 16. For example, various embodiments may be understood from FIG. 16, including embodiments using circulating coupons, group offers, progressive coupons, connectors circulating coupons, and connectors forming groups. Each of these embodiments, along with other embodiments, may use a structure as illustrated in FIG. 16 under various circumstances.

As illustrated in FIG. 16, user Al has associated therewith data A2. User Al propagates data A2 or data derived from data A2 to user Bi, user CI and user Dl. Such propagation may occur simultaneously, concurrently, serially, sequentially, or otherwise. Consequently, user Bi has associated therewith data B2, user CI has associated therewith data C2, and user Di has associated therewith data D2. Additionally, user Cl may further propagate data, such that user El has associated therewith data E2 and user Fi has associated therewith data F2. This basic model may apply to a variety of embodiments.

In a first embodiment, each of data A2-F2 represent an electronic coupon. Such an electronic coupon may take the form of a code to be entered at a website, data that may be provided as a paper coupon, or a pointer to a restricted-access website, among other forms. Such a coupon may not be active until a predetermined number of people have received it (a group coupon), it has been sent to a predetermined number of people (a circulating coupon), or it has been used by a predetermined number of people (a progressive coupon). Alternatively, the coupon may have an initial value that may increase based on usage threshold(s) or reception threshold(s). Note that reception/circulation/forwarding may be tracked using embedded code or by tracking access to an URL where data referenced by the coupon may be found. Moreover, rather than increasing value, reaching thresholds may result in initial or increasing rewards (e.g., points, miles, rebates, etc.) related to the coupon. In the connector context, user Al may be a connector circulating a coupon A2. Users Bl, Cl and Di may be directly connected to or coupled to connector Al Users Bl and Fl may automatically receive instances of the coupon or may receive them responsive to action by user Cl. Again, these instances of coupons may be progressive, circulating, or result in group discounts and/or benefits. Moreover, the coupons may also be stable, with a predetermined and unchanging value or benefit. Additionally, other rewards or benefits may accrue to the connector because of coupon use attributable to the connector.

In the context of group offers, users Al-Fi may be previously identified as sharing a common interest. Data A2-F2 may represent an offer to the group to purchase a good or service. The offer may provide a static or progressive discount or special price. Alternatively, the offer may require a predetermined number of acceptances, percentage of acceptances, or volume of orders to activate the offered discount or price. Acceptances may be conditioned on activation of the offer. Note that an offer in this context may be an offer to bargain rather than a legally binding offer.

In yet another embodiment, a connector may be provided an opportunity to form a purchasing group. The connector Al may distribute instances of an offer A2 to potential members of a group of purchasers Bi-Fl as instances B2-F2. Offer A2 may provide for a static or dynamic discount on purchase of a good or service. Alternatively, offer A2 may relate to a reward such as points, miles, rebates or other inducements for purchase of a good or service. The inducement or discount may require a predetermined number of purchases to reach an activation threshold or may have tiers of acceptances which correspond to progressively higher levels of inducements or discounts. Moreover, acceptance of offers within the group and/or distribution of the offer to the group may reward the connector.

Research has shown that nearly 80% of Internet messages are generated by approximately 5% of Internet users. Identifying these 5%, who may be referred to as connectors, provides an opportunity for a form of direct or viral marketing. By convincing these connectors to disseminate advertising and offers to purchase or for discounts, a new marketing avenue may be opened. Using rebates, commissions, points, miles or other rewards, some of these connectors may be enticed to participate.

Figure 14:
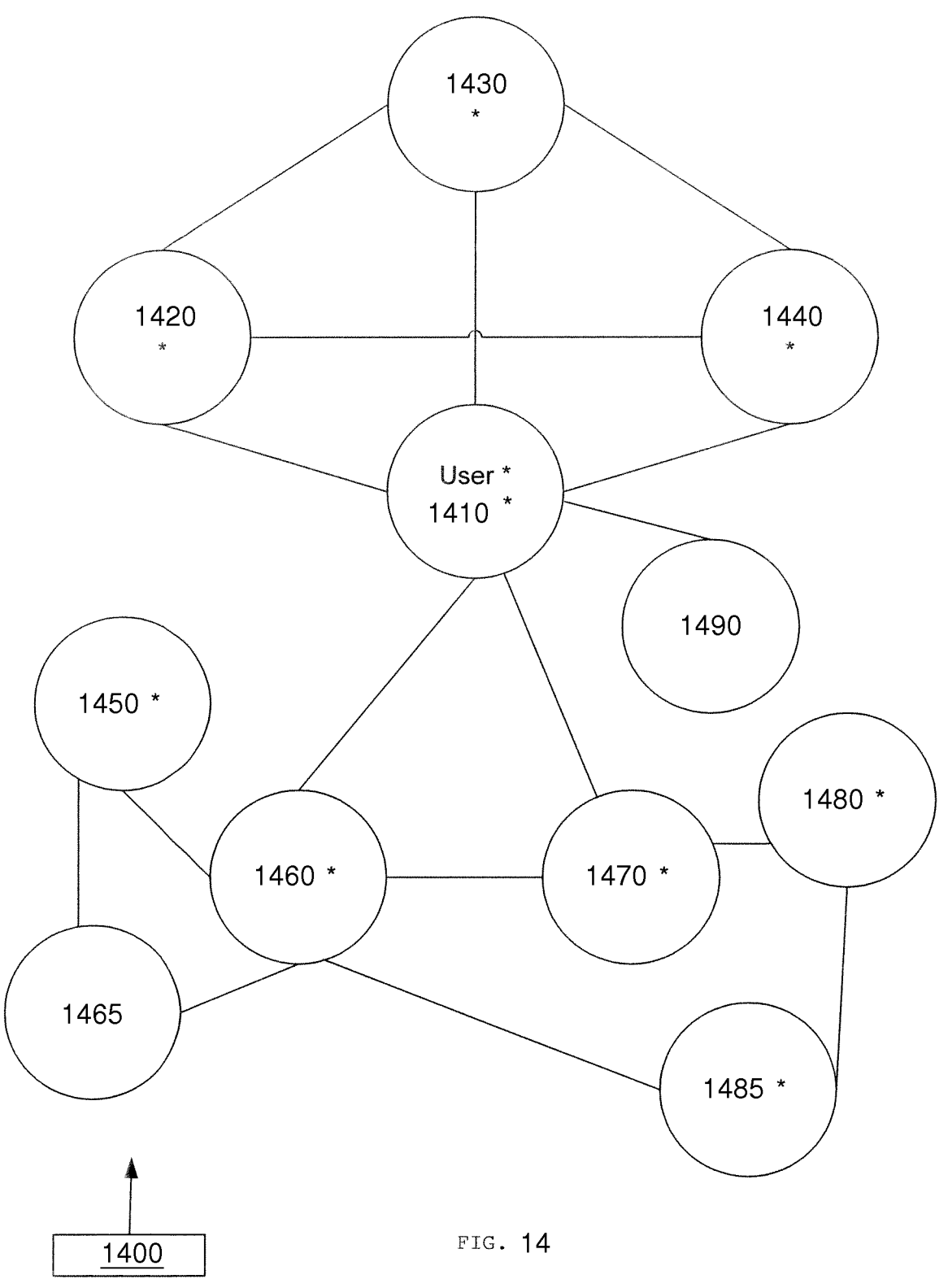
FIG. 14 illustrates relationships between users in one embodiment.
Figure 15:
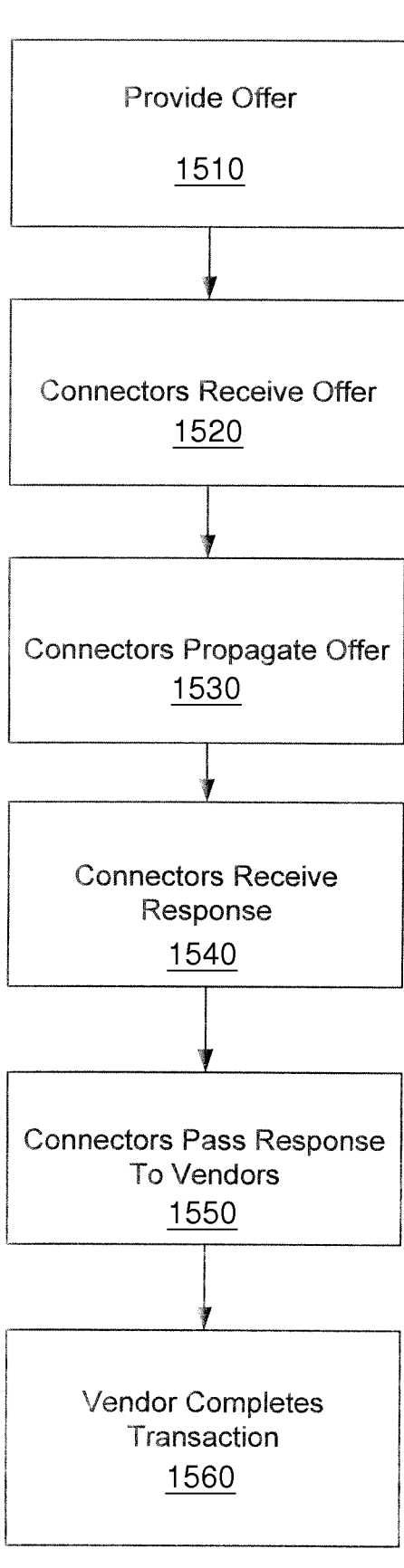
FIG. 15 illustrates an embodiment of a process of interaction between a group and a vendor.

Other relationships between users may also be present. FIG. 14 illustrates relationships between users in one embodiment. Users 1400 are a collection of related users. Alternatively, users 1400 is a database including information related to a number of different users, and representations of similarities or affirmative links between individual users. The database may also be used in an anonymous manner for extracting common data or statistical models based on a statistically significant sample of a population. Correlation within the model may be instructive as to what products or services users are interested in, what common interests various users have, what underlying relationships between users exist, and many other correlated variables.

User 1410 is the user in question (such as a user currently logged in for example). Logically related to user 1410 are users 1420, 1430 and 1440. The illustrated links between users 1410, 1420, 1430 and 1440 are links deduced by the system which have not been affirmed or requested by user 1410 or by some combination of users 1410, 1420, 1430 and 1440. For example, user 1410 may be a sibling of user 1430 and a child of users 1420 and 1440, with users 1420 and 1440 being either spouses or ex-spouses for example. Such relationships within the set of users may be formalized or recognized as necessary or as requested. However, the relationships may also be utilized for their effects on a profile of user 1410 without formal recognition. Similarly, user 1490 may be a co-worker of user 1410, thus allowing for a deduced link which need not be formalized.

In contrast, users 1460 and 1470 are positively linked to user 1410, such as by request of user 1410 for example. This may be a result of friendship, other social bonds, or a result of referral to the system by one of the users. User 1460 is also positively linked to each of users 1450 and 1465, each being linked to each other. Moreover, user 1460 is positively linked to each of users 1470 and 1485, each positively linked to user 1480.

In one embodiment, these positive links allow for communication between users within the system (for example, email may only be sent to users accessible through a direct positive link, or through traversal of a series of positive links). Thus, user 1410 may be able to send email only to 1460 and 1470, or only to 1450, 1460, 1465, 1470, 1480 and 1485 for example. Additionally, user 1410 may have well-defined connections only to users 1460 and 1470 within the system 1400.

Also illustrated are common characteristics, shown by symbols within the users. For example, users 1410, 1450 and 1470 each have a 'X' indicating a common characteristic. This may be due to an affirmative indication from each of the users in question, or from deduction through statistical profiling of the users in question. For example, this common characteristic may be interest in a form of art of a specific athletic endeavor. Similarly, users 1410, 1430, 1460, 1480 and 1485 each have a P*$^1$ indicating a different common characteristic. Again, the common characteristic may be deduced or affirmatively selected, and may have a variety of different forms.

Note that the user database 1400 may be correlated to the test database 1300, such that test results from tests of test database 1300 may be analyzed based on relationships between users in user database 1400. Moreover, history of individual test-taking by a user 1410 may be analyzed by reference to test database 1300, with such analysis updated based on changes in test database 1300 (such as revised relationships for example). Additionally, correlation of test analysis based on test database 1300 and user profile analysis or statistical analysis from user database 1400 may lead to suggestions about purchases, information to browse, or groups to join for example.

Figure 9:
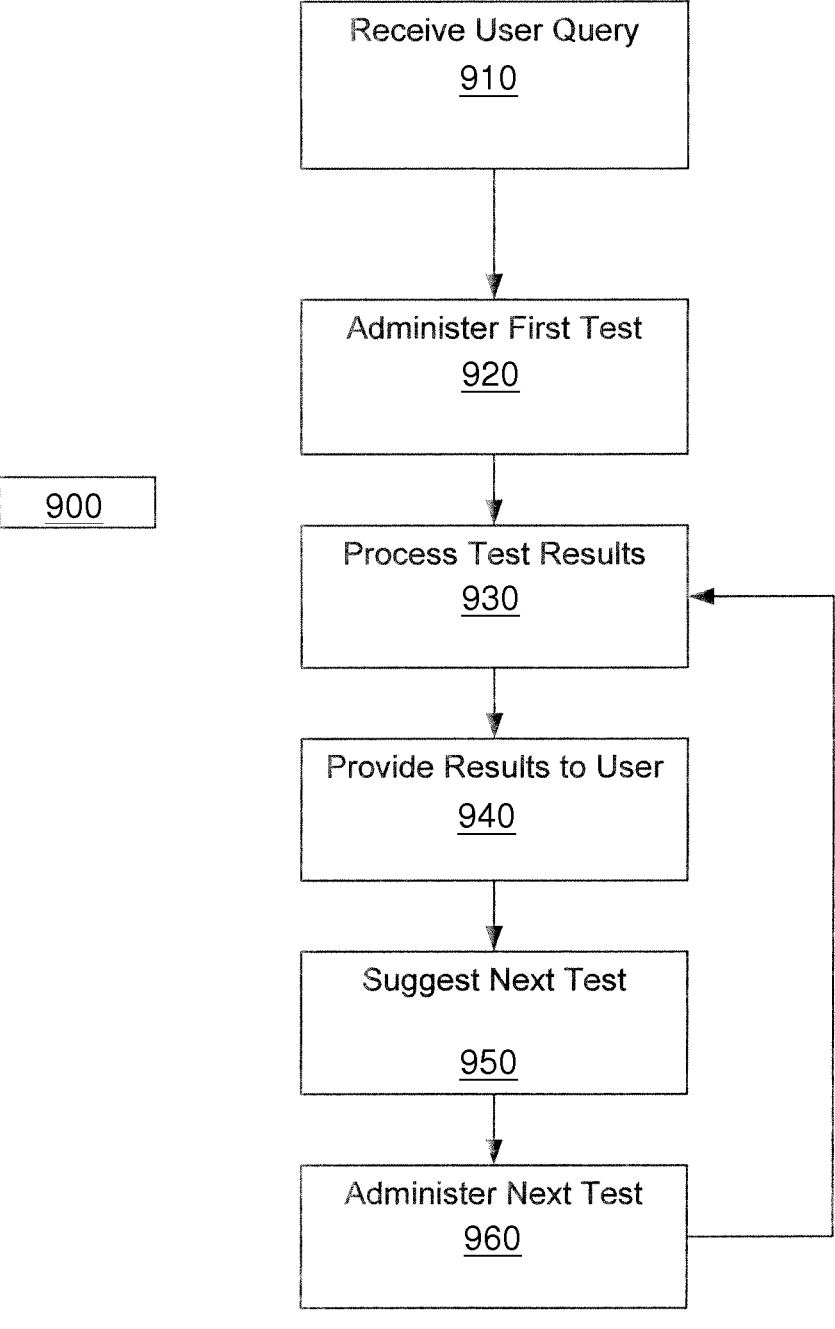
FIG. 9 illustrates an embodiment of an application for data analysis and various other modules or data stores, such as may be embodied in a medium or in media.

Applications may implement a variety of methods. In one embodiment, only tests are progressively administered. FIG. 9 illustrates an embodiment of a method of progressively administering tests 900. The process, in one embodiment, involves administering a first test to a user, processing the results of a test, providing the results (feedback) to the user, and suggesting either a next test, a next set of tests, or a set of potential next tests, whereupon the user may then take the next test and repeat the process of processing and feedback.

Figure 13:
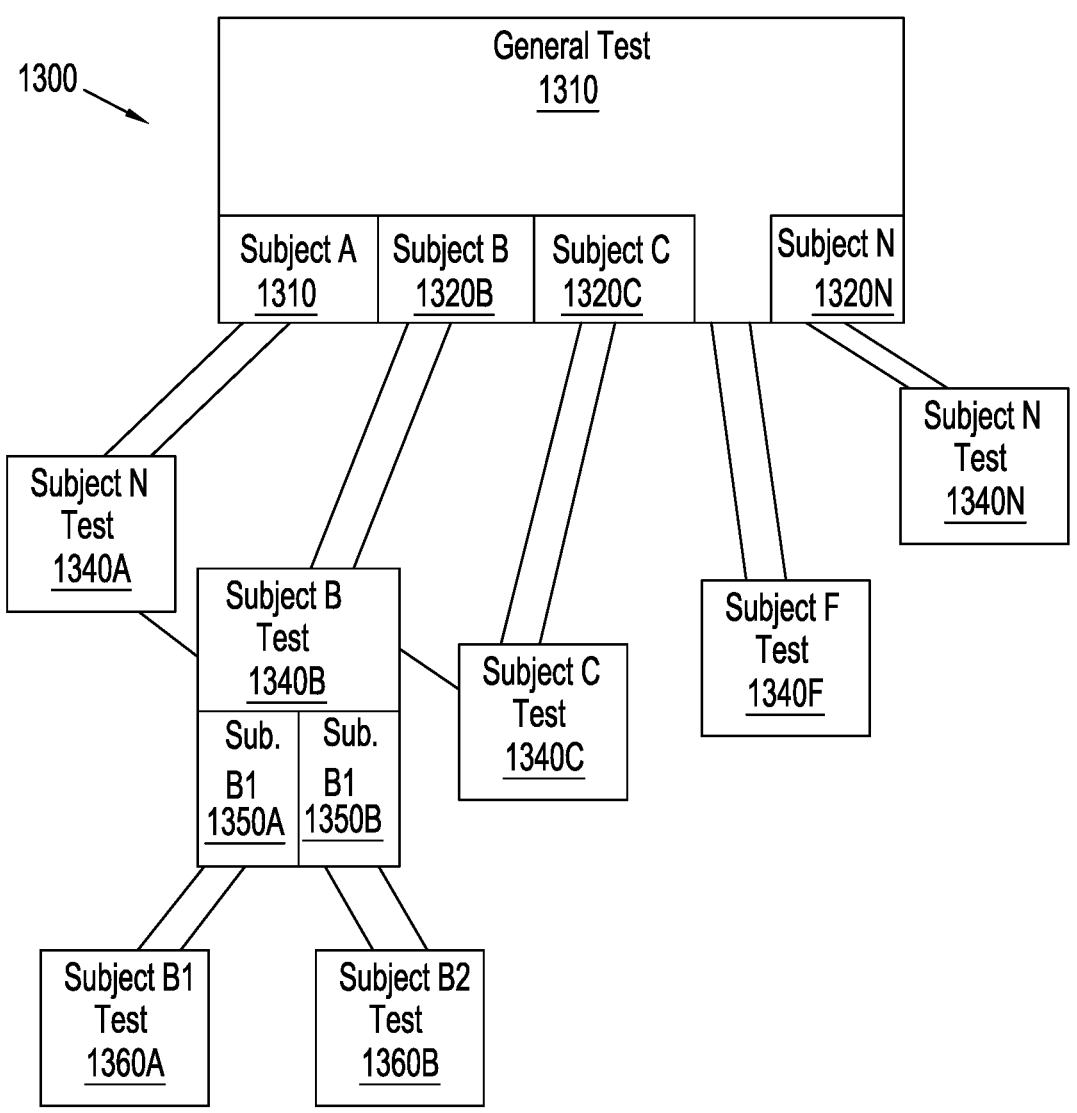
FIG. 13 illustrates relationships between a connector and other users in one embodiment.

As illustrated with respect to FIG. 13, the tests may be progressive in nature, such that a second test, next test, or first progressive test may drill-down or otherwise focus on a single subject from a variety of subjects in a first test or general test. The progressive nature allows for more refined, sophisticated or nuanced analysis of information from the tests collectively, and historical tracking of test results allows for gradual and progressive updating of an analytical picture or profile of a user.

At module 910, a query arrives from a user, indicating interest from the user in taking a first test. This query may represent a more involved process of enrolling a user into a membership group for example, and/or obtaining financial information allowing for monetization of the transaction in which the first test (or future tests) is administered. The query may also be as simple as clicking on a link on a website which leads to administration of the first test.

At module 920, the first test is administered. The first test may be a predetermined test, or a test selected from a predetermined set of tests. In some embodiments, the first test is a personality test designed to provide information about the preferences and personality of the user, assuming a reasonable attempt to faithfully take the test (rather than answering questions outrageously for example).

At module 930, the results of the test (such as the first test) are processed, thereby analyzing some aspect of the user (such as IQ or intelligence quotient, personality, knowledge of financial principles, for example). At module 940, feedback is provided to the user in the form of test results, either as a score, an analysis of correct and incorrect answers, an analysis of trends in answers, some combination of all of these, or some other form of feedback. The feedback may be separate from other interactions with the user, or may be combined with the suggestion of module 950 for example.

At module 950, a next test is suggested, based in part on the results of the test(s) already administered and processed for the user. The next test may be a single identified test, a set of tests from which a choice may be made, or a series of several tests (some or all of which may ultimately be administered). At module 960, the next test is administered, and the process then moves to module 930 for processing of the results of the next test. In this manner, the loop may be iterated several times, to refine results of tests and explore additional facets of a person. Furthermore, the tests may each be monetized, and feedback may be monetized, allowing for fees for administering the tests or for providing either any analysis, or in-depth analysis beyond free superficial analysis.

Figure 10:
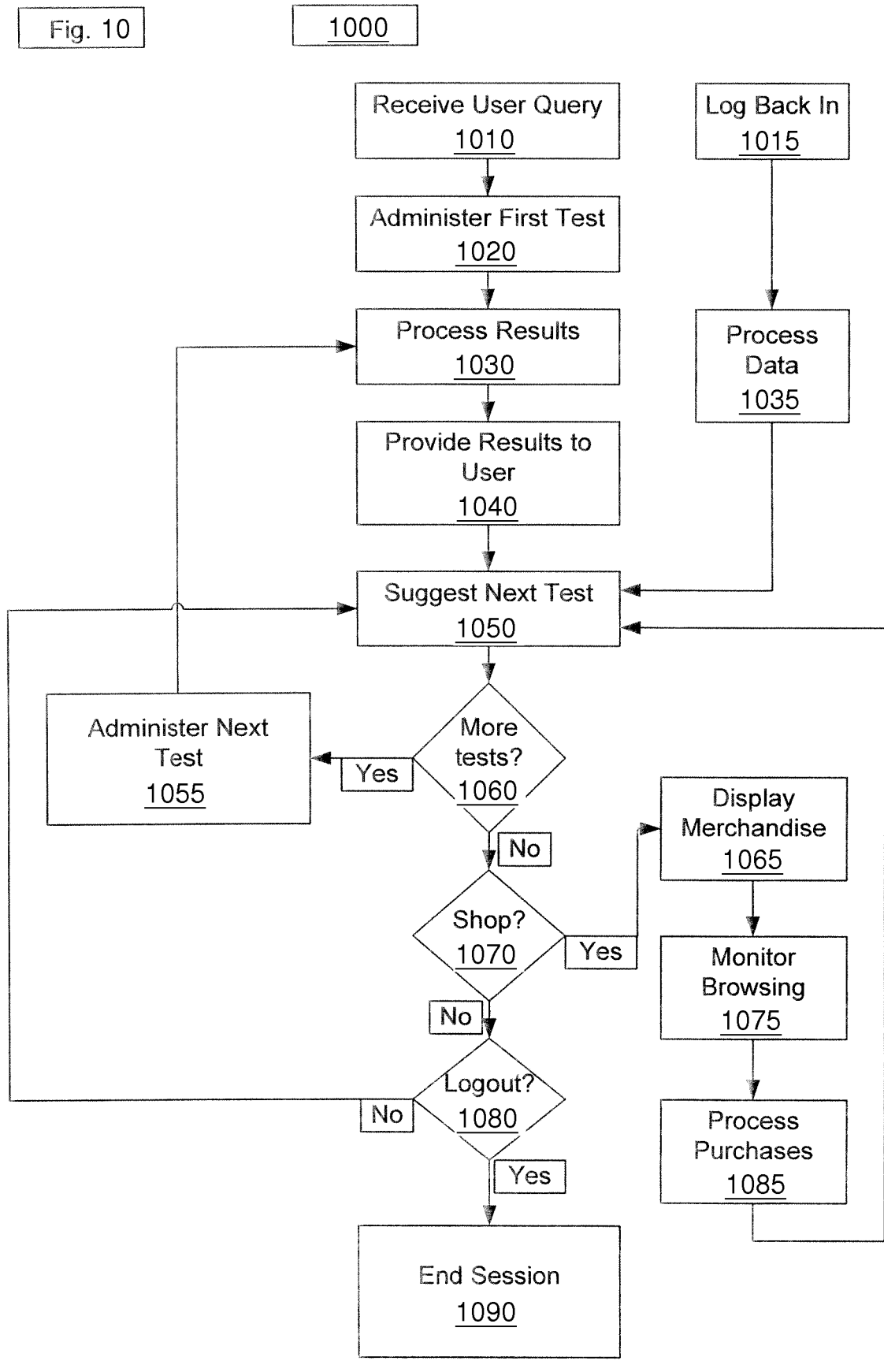
FIG. 10 illustrates an embodiment of an analysis application as it may be embodied in a medium or in media.

A more complex embodiment of a method may progressively administer tests and sell goods or services. FIG. 10 illustrates an embodiment of a method of progressively administering tests and selling merchandise 1000. The process, in one embodiment, involves administering a first test to a user, processing the results of a test, providing the results or feedback to the user, suggesting a next test or assortment of tests. Then, the process includes either administering the next test or monitoring shopping of the user, and revising the proposed next test based on user activity.

At module 1010, a user query is received, initiating a session. At module 1020, a first test is administered. At module 1030, results of a test are e processed, analyzing the answers given by the user. At module 1040, results of the test are provided as feedback in one form or another to the user. At module 1050, a next test is suggested. Note that the modules 1010, 1020, 1030, 1040 and 1050 may be implemented in a manner similar to that of modules 910, 920, 930, 940 and 950 of FIG. 9 for example.

At module 1060, a decision is made as to whether the user will take further tests at this time. If yes, the next test is administered at module 1055, and the process returns to module 1030. If no (at module 1060), a decision is made at module 1070 as to whether the user will shop for goods and/or services.

If, at module 1070, the decision is yes (to shop), then the process moves to module 1065, and merchandise (goods and/or services) is displayed for perusal by the user. As the user browses, and as goods or services are chosen for purchase, this is monitored at module 1075. Upon termination of shopping, at module 1085, purchases are processed (such as checking out and arranging payment for example), and information from browsing and purchasing is fed back into a profile for the user. Based on the user profile, at module 1050, a next test is suggested. This next test may be the same test suggested after analysis of the first test, or may be a different test, reflecting new information gleaned from shopping activities.

If, at module 1070, the decision is no (not to shop), the process moves to module 1080, and a decision is made by the user as to whether to log out or not. If the user does not log out, the process moves to module 1050 and a next test is suggested. If the user logs out, the process ends the session at module 1090. The user may then log back in at module 1015, avoiding the original first test. At module 1035, data that the system has received since the last session for the user is processed. This data may be statistical modeling data, or information from other users, either linked to the user through a network, or related to the user in some way, such as by family relation, social or professional relationship. The process then moves to module 1050, and a next test is suggested based on this updated profile of the user.

Note that administering tests and providing results may be monetized as discussed with respect to FIG. 9. Moreover, this monetization may be linked to shopping; leading to discount programs, free tests in response to shopping at affiliated merchants, and running accounts of credits or debits in a user's account. The initial user query may involve arranging for payment for services, either through credit or debit processes, or through periodic billing for example. Such credit or debit processes may involve interaction with credit accounts, deposit accounts of a bank, credit union or similar financial institution, cash deposits or other deposits at a point-of-sale terminal, or maintenance of an internal balance within a system using the methods and/or apparatuses described herein. Furthermore, note that monetization may permeate the system, as an option in every module of a process for example, and may relate to payments by a sponsor to allow a user to utilize the system. When a sponsor is involved, identification of the sponsor in the process may occur, or perception of an advertisement from the sponsor may be involved, with perception including visual, audio, or other forms of perception.

Figure 11:
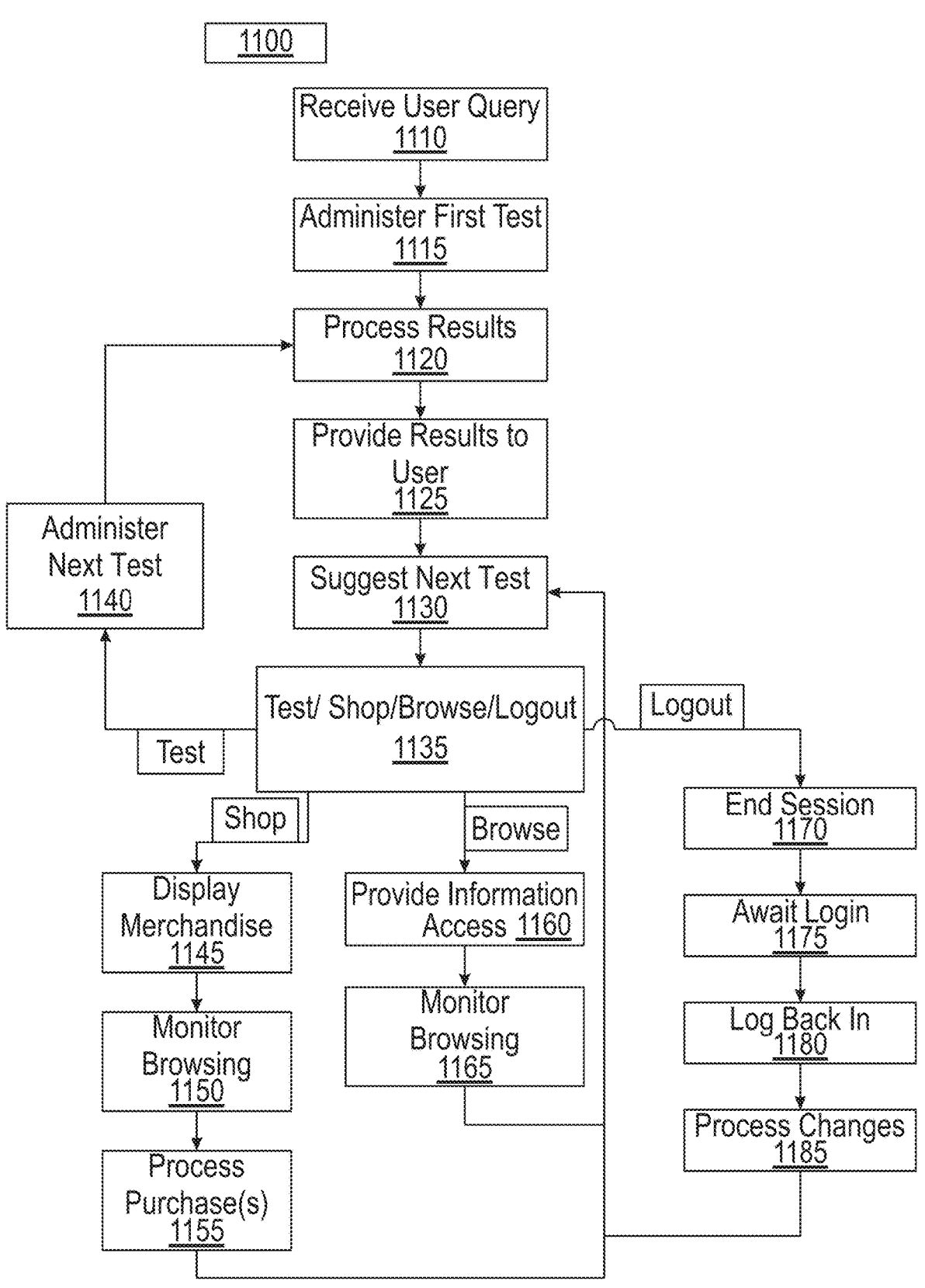
FIG. 11 illustrates an embodiment of a method of progressively administering tests, providing information and selling merchandise.

Yet another complex embodiment may be used to progressively administer tests, sell goods and services, and provide information. FIG. 11 illustrates an embodiment of a method of progressively administering tests, providing information and selling merchandise 1100. The process, in one embodiment, includes administering a first test, processing and providing results of a test, and suggesting a next test or assortment of tests. Then, the user may either take the next test, shop, or browse for information (or logout and come back later). Based on the user's activities, the proposed next test is revised, and content (information, possibly merchandise) presented to the user is adjusted. At module 1110, a user query is received, initiating a session. At module 1115, a first test is administered. At module 1120, results of a test are processed, analyzing the answers given by the user. At module 1125, results of the test are provided as feedback in one form or another to the user. At module 1130, a next test is suggested. Note that the modules 1110, 1115, 1120, 1125 and 1130 may be implemented in a manner similar to that of modules 910, 920, 930, 940 and 950 of FIG. 9 for example.

At module 1135, a determination is made as to what the user will do next. The options include taking a test, shopping, browsing information, and logging out. If the decision is to take a test, then at module 1140, the next test is administered, and the process returns to module 1120 for processing.

If the decision is to shop, at module 1145, merchandise is displayed, potentially in a manner responsive to aspects of the user profile already established. At module 1150, browsing and choices for purchases are monitored, both for accounting purposes and for profile building. At module 1155, purchases are processed, such as by finalizing a transaction and arranging for delivery or appointments for example. The process then proceeds to module 1130, at which point a next test is suggested based on the current contents of the user profile, including information from the shopping session.

If the decision is to browse information, information access is provided at module 1160. Such information access may be shaped based on profile contents, either by emphasizing potential topics, or by presenting a group of topics expected to be of interest to the user for example. At module 1165, actual browsing by the user is monitored, adding further information to the user profile. When browsing terminates, the process moves to module 1130, at which point a next test is suggested based on the current contents of the user profile, including information from the information browsing session.

If the decision is to log out, at module 1170 the session is ended. At module 1175, the process awaits a login by the user. At module 1180, the user logs back in. At module 1185, changes to a user profile occurring while the user was not logged in are processed, such as information submitted by people solicited to evaluate the user or information from evolving statistical models for example. The process then moves to module 1130, at which point a next test is suggested based on the current contents of the user profile, including information from the changes or data processed.

Note that opportunities for monetization abound within the method of FIG. 11. For example, a test may be sponsored by a sponsor, with the test subject matter related to the sponsor's products and/or services. Similarly, browsing information may be monetized based on what information is accessed or the time and/or bandwidth taken to access the information. Such monetization may be based on a user paying a subscription fee or on a user viewing or otherwise perceiving an advertisement or information from a sponsor, with the sponsor paying the sum involved in monetization. Monetization in each of the methods or embodiments may also be related to levels of feedback for results from a test or set of tests. Moreover, monetization may be involved in soliciting input from external sources of data such as friends, relatives or co-workers. Additionally, joining groups or setting up matches between users may be accomplished based on apparent compatibility within respective profiles, and monetization may be involved therein.

Figure 12:
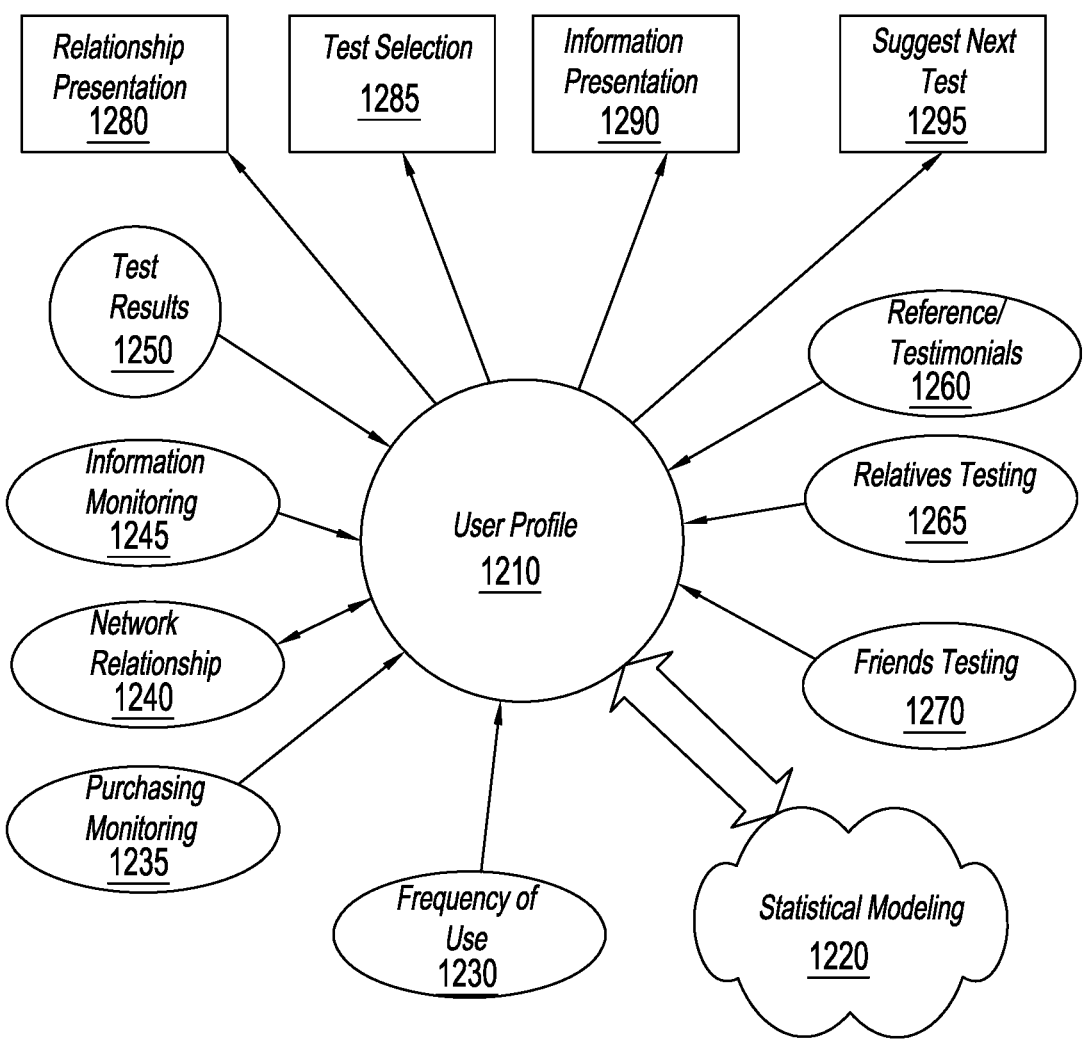
FIG. 12 illustrates relationships between an individual profile and various sources of data or data stores in one embodiment.

A progressive system for managing an interface with a user may utilize a variety of relationships between the user and various sources of data. FIG. 12 illustrates relationships between an individual profile and various sources of data or data stores in one embodiment. The relationships with a user (and conduits for the user profile) fall into four broad categories (user activated, related user activated, statistical modeling, and presentation to the user) in one embodiment. User profile 1210 represents a collection of data about a user. This may include attribute-value pairs, histories of browsing and testing, pointers to related members in the network, and other representations of data. This data may correspond to test results, personal characteristics, histories as mentioned, connections to people related by family, social, occupational and other links, and other forms of information.

Sources of information can be grouped into three categories: user-created information, related-user information, and statistical information. User-created information includes frequency of use 1230 (how often a user logs in, how long sessions last for example), purchase monitoring 1235, network relationships 1240 (who the user is connected to within a network of users), information monitoring 1245 (indications of what a user browses within a website for example), and test results 1250. Each of these sources of information comes directly from user actions, and relates specifically to the user in question.

Related-user information includes references or testimonials 1260, testing of relatives 1265, and testing of friends 1270. References or testimonials 1260 may be solicited directly by the user or indirectly through a website implementing a network of members or users. Such references or testimonials 1260 may include standardized evaluations of users or freeform evaluations of users, and may be monetized, such as by a fee for obtaining and/or processing the information. Relatives and friends may be determined based on membership within a network of members or users, in which the friends or relatives are pointed to by the user profile 1210. Such relatives or friends may be identified by the user, or may be deduced by user activity (email exchanges for example) and characteristics (same address for example). Results of relatives testing 1265 and friends testing 1270 may reflect on the user based on whom the user is related to or associates with.

Statistical modeling 1220 involves aggregating information from a (preferably) statistically significant number of users and extracting trends or 1, correlations between variables therein. Data from user-created information and related-user information sources in a user profile 1210 may be aggregated, allowing for prediction of unknown information within a user profile 1210. For example, if most people in San Francisco with library cards tend to buy books, a user in San Francisco with a library card may be predicted to be interested in books.

Such predictions may be used in conjunction with the process of selecting tests to present, information to present, merchandise to present and potential relationships to present. Relationship presentation 1280 may be a module of an application (such as application 700 for example) which suggests people who would be good matches as friends, potential spouses, or other forms of acquaintances. Test selection 1285 may be a module of an application (such as application 700 for example) which selects a next test based on information in the user profile 1210, both to help the user become more self-aware and to collect more data for the user profile 1210.

Information presentation 1290 may be a module of an application (such as application 700 for example) which determines what topics of information should be presented or emphasized when a user browses an informational website, based on user profile information and potentially statistical modeling information. Merchandise presentation 1295 may be a module of an application (such as application 700 for example) which indicates what merchandise (goods and/or services) should be presented or emphasized when a user browses a sales portion of a website.

Automated Online Data Submission

Figure 17:
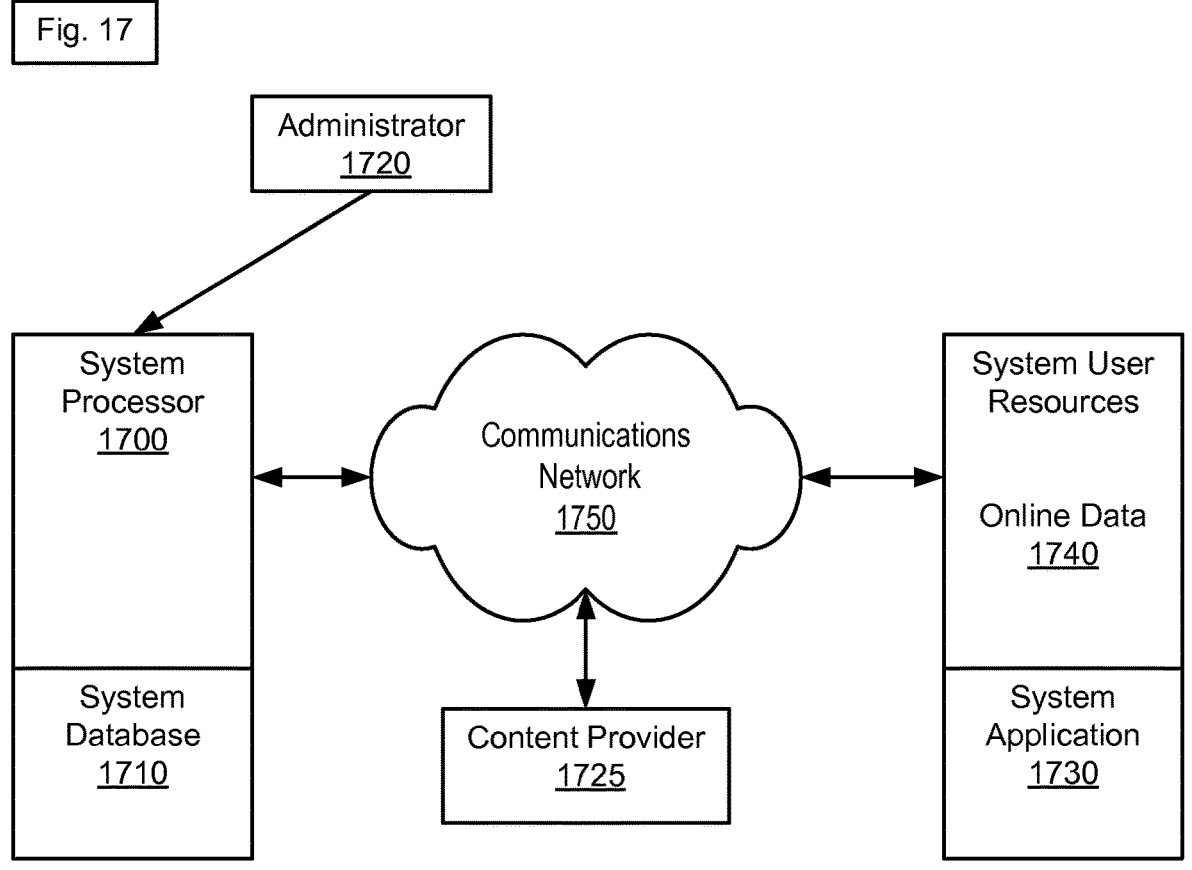
FIG. 17 illustrates a high-level data flow diagram associated with an embodiment of the invention.

FIG. 17 illustrates a high-level flow diagram of an embodiment of the present invention. The flow diagram illustrates the entities involved with managing, storing, configuring and transmitting the data exchanged by the system between entities using the AODSA tool. By way of example only, the system includes a system processor 1700 and a system database 1710 configured to store and manage user data (e.g., job applicant's data including resumes). As illustrated in FIG. 17, the system processor 1700 and the system database 1710 are situated remotely (e.g., on a remote server). However, it is to be understood that although these elements are implemented remotely, alternate embodiments may utilize a user's local resources (e.g., desktop CPU and/or hard drive) in coordination with a locally stored system application 1730.

It is to be understood, that the invention will be discussed in the job application data submission context and that the invention may be configured for other implementations such as mortgage applications, bidding on real estate or other goods or services, applying for admission to schools or organizations, applying for internships or volunteer positions, applying for scholarships or grants, and/or the like. As illustrated in FIG. 17, the systemization 1700/1710 may include server-side functionality/processing that is accessed by a system user through system application 1730 (e.g., a java-enabled applet running locally on a user's desktop). Alternately, the applet may run as a background task and is accessed when a system user (e.g., a job applicant) wants to submit application information in response to a job posting.

Alternately, system application 1730 may be bundled as a software application that is situated locally and utilizes a computer's central processing unit as system processor 1700 and a computer's hard drive as the system database 1710. As will be described in greater detail below, online data content 1740 may be viewable on a system user's computer through the use of a system application 1730, such as a web browser. Such online data content 1740 may, in one implementation, be presented to a user within the context of a content provider 1725 website, such as in the form of a banner ad situated on a content provider's news web site.

On a high level, a user interacting with system application 1730 browses online content 1740 via communications network 1750. When the user wants to submit job application data, system application 1730 interacts with the system processor 1700 and system database 1710 over communications network 1750 to access and forward the requested job application data associated with the system user.

FIGS. 18A, 18B, and 18C illustrate flow diagrams of the user data registration and profile creation processes. According to an embodiment of the invention, represented in FIG. 18A, the system user initiates the system application in step 1810. The user selects either a manual registration 1815 procedure or an automated registration 1820 procedure. In the manual registration 1815, the user manually enters job application data in step 1825 including name, contact information, employment history and/or other identifying information. In step 1845, the user may be presented with an option for assistance in creating a resume based on the entered data. According to one implementation, the system user may select a system resume template and an interactive data entry module. As part of the interactive data entry module, the system data entry application presents the user with a series a questions designed to extract certain user information that would appear on a resume or could be used to populate online employment application forms.

In some implementations, the system may present the user with an option to upload an electronic copy of a resume in step 1845. The system application uploads and stores the information in the centralized system database in step 1850. In some implementations, the system may be configured to transmit an acknowledgment message indicating the AODSA tool is ready for use, as in step 1855.

Alternately, the user may select the automated registration process 1820. The automated process starts with the user uploading an electronic copy of a resume and/or submission cover letter and indicating the corresponding file format in step 1830. The system parses the resume and extracts data corresponding to database fields such as contact information, employment history, or education history in step 1840. The system uploads the data to the system database in step 1850 and in some implementations transmits an acknowledgment message in step 1855 that the AODSA tool is ready for use.

FIG. 18B shows a logic flow in one embodiment of resume parsing and profile creation. At i860, the system receives a user resume, which is parsed at 1865 for recognizable resume elements, such as but not limited to name, social security number, e-mail address, postal address, education, work experience, honors and awards, skills, and/or the like. In one implementation, the system may employ optical character recognition techniques in order to convert a resume submitted in an image format into a text format that may be manipulated and/or analyzed more conveniently. In an implementation, the converted resume may serve as the basis for creating a user portfolio of one or more customized resumes.

The system provides a great deal of flexibility and may be tailored to meet the needs of any number of system users. For example, the resume element recognition process may be implemented in a variety of different ways. In an implementation, terms extracted from the user resume may be compared against a database of known resume terms in order to identify resume elements or data field identifiers. In another implementation, only those terms from the user resume that appear in a special font (e.g., bold, underlined, italics, large font, etc.) are considered as possible resume field names. When a resume field name is detected, the system extracts field data associated with and/or proximate to that field name at 1870. In one implementation, the system may detect a special character (e.g., a colon) after the field name and extract as field data any text after that character and before a carriage return, the next field name, and/or the like. Each detected field name is stored with its associated field data in a user profile record at 1875. At 1880, the system determines whether there are additional resume field names to consider and, if so, the flow returns to 1865. Otherwise, the system proceeds to 1885 where the user profile record is displayed to the user for approval 1890. If the user is not satisfied, he or she is given the opportunity to edit user profile record fields at 1895. Otherwise, the user profile record is persisted in a system database at 18100 for future use.

FIG. 18C shows detailed logic flow in another embodiment of profile and resume creation. At 18105, the system presents a user with a registration web form that may contain a plurality of questions and/or blank fields by which the user may enter personal information. At 18110, the system receives the user responses entered into the web form. A choice is presented to the user at 18115 as to whether or not he or she would like to generate a resume based on the information submitted at 18110. If not, the flow proceeds directly to 18150, wherein the entered user web form responses are persisted in a user profile record stored in a system database.

If a resume is desired, on the other hand, then the system may present the user with a plurality of resume template choices at 18120. These may, in one implementation, be in the form of example resumes and/or contain descriptions of the resume styles along with recommendations for appropriate situations in which to employ the various templates. The system receives a user selection of a particular resume template at 18125, populates resume fields in the template with user web form responses at 18130, and presents the resume for user inspection at 18135. The user indicates at 18140 whether or not he or she is satisfied with the resume in its current form and, if not, may be given the opportunity to edit resume fields at 18145. The completed resume is persisted as part of the user profile record at 18148, and the user is given the option to create new and/or alternate resumes at 18149. The user web form responses may be separately incorporated into the user profile record at 18150.

FIG. 19A illustrates a high level flow diagram of an autonomous automated data submission process associated with an embodiment of the invention. The system user browses online generic job listings in step 1910. The user identifies a particular job listing that they want to pursue in step 1920. The system user can then access the AODSA tool in step 1930. Depending on the particular implementation, the AODSA tool may present the system user with a range of application data submission options (as discussed in greater detail in FIGS. 20A, 20B, 21A-21C and 22) in step 1940. In step 1950, after the system user selects a AODSA data submission component is selected, the AODSA tool accesses the user data on the centralized system and transmits the user data to the corresponding posting entity.

FIG. 19B illustrates a high level flow diagram of an embedded automated data submission process associated with an embodiment of the invention. The system user accesses a content provider website at 1958. The content provider may be a system affiliated entity or otherwise provider with an agreement to display system tools to appropriate users. At i960, the content provider checks the user's computer for a cookie or other indication of user identity and/or system affiliation, based on which the content provider may determine eligibility or appropriateness of system tool distribution and/or display.

A determination is made at 1970 whether or not an appropriate cookie exists and, if not, the automated data submission process may offer the user an opportunity to register for system participation 1975. Should the user decide to do so, the system proceeds to a registration process such as that outlined in FIG. 18A. Otherwise, the system exits at 1980 and no system tool is provided to the user. Otherwise, the content provider queries cookie contents at 1990, such as user identifying information, user system identifying information, and/or the like. At 19100, the content provider forwards extracted cookie information to a system server, which processes that information in order to select system data for inclusion in a system web module. Depending on the implementation, the system may be configured to provides a wide variety of content/functionality to an identified system user. For example, the content provider may act as a gateway and provide access to a system user's full user account/functionality on the system (discussed in greater detail below in FIGS. 22 and 23). The content provider retrieves the system web module from the system 19110 and displays it to the user at 19120.

FIGS. 20A and 20B illustrate flow diagrams associated with form population and resume/cover letter generation processes, respectively. The system undertakes the steps shown in FIG. 20A when a user initiates application submission 2001 involving an online data entry form. At 2005, the system queries the name of the next empty web form field (e.g., name, social security number, work experience, education, etc.) and subsequently searches stored user profile information for a matching field entry 2010. In one implementation, this is accomplished by scanning user profile information for character strings matching web form field names that have proximate, non-empty data entries.

At 2015, a determination is made as to whether the current web form field exists in the user profile and, if not, that field is noted in a temporary record of empty web form fields. Otherwise, the data entry from the user profile that corresponds to the web form field is used to populate that field at 2025. A determination is made at 2030 if there are remaining empty web form fields to be filled and, if so, the system returns to 2005. Otherwise, the system checks at 2035 whether any of the missing web form fields noted at 2020 are required for form submission. If so, the system may prompt the user for manual entry of data pertaining to those fields at 2040. Alternately, in some implementations, the scan may include alternate field matching if a match is not identified (e.g., searching and entering address information in a field titled, "residence", if a field for "mailing address" is not matched). The completed form is submitted by the system at 2045.

The system undertakes the steps shown in FIG. 20B when a user initiates application submission 2050 involving resume and cover letter submission/generation. The system determines at 2055 and 2065 whether multiple cover letter and/or resume templates are available for the user to choose from and, if so, requests the user's selections at 2060 and 2070. Once unique cover letter and resume templates are selected, the system queries the name of an empty cover letter or resume field at 2075. The system searches stored user profile information for a matching field entry 2080 and, a determination is made at 2090 whether a matching entry exists in the user profile. If not, the missing field is noted at 2092, and if so, then the field is populated with the corresponding user profile information at 2095.

The system determines whether additional empty resume/cover letter fields exist at 20100 and, if so, the system returns to 2075. Otherwise, the system determines at 20105 whether the missing fields are required for generation of the resume or cover letter. If so, the system requests the user to enter data for those fields at 20110. Finally, the system generates the cover letter and resume based on the collected user profile information 20115, and submits them to the desired location at 20120. In an optional step 20118, the system may present the generated resume and/or cover letter for display to the user, who may then decide whether one or both are acceptable, or may choose to manually modify or supplement data included therein. At any point during this process, the user may save a current/modified resume to user at a future point as a template. Furthermore, the user may create a portfolio of these saved resumes for future user. This may be useful in creating a variety of resumes each with customized objectives (e.g., a general resume tailored for a software engineering position, a more specific resume highlighting certain experiences for a Java programming position, etc.).

In an alternative embodiment, instead of generating new cover letters and/or resumes in response to a user request for application submission, the system may store a selection of pre-made resumes and/or cover letters. The user may access, customize and save the pre-made resumes/cover letters and incorporate them into an application submission package.

Figure 21C:
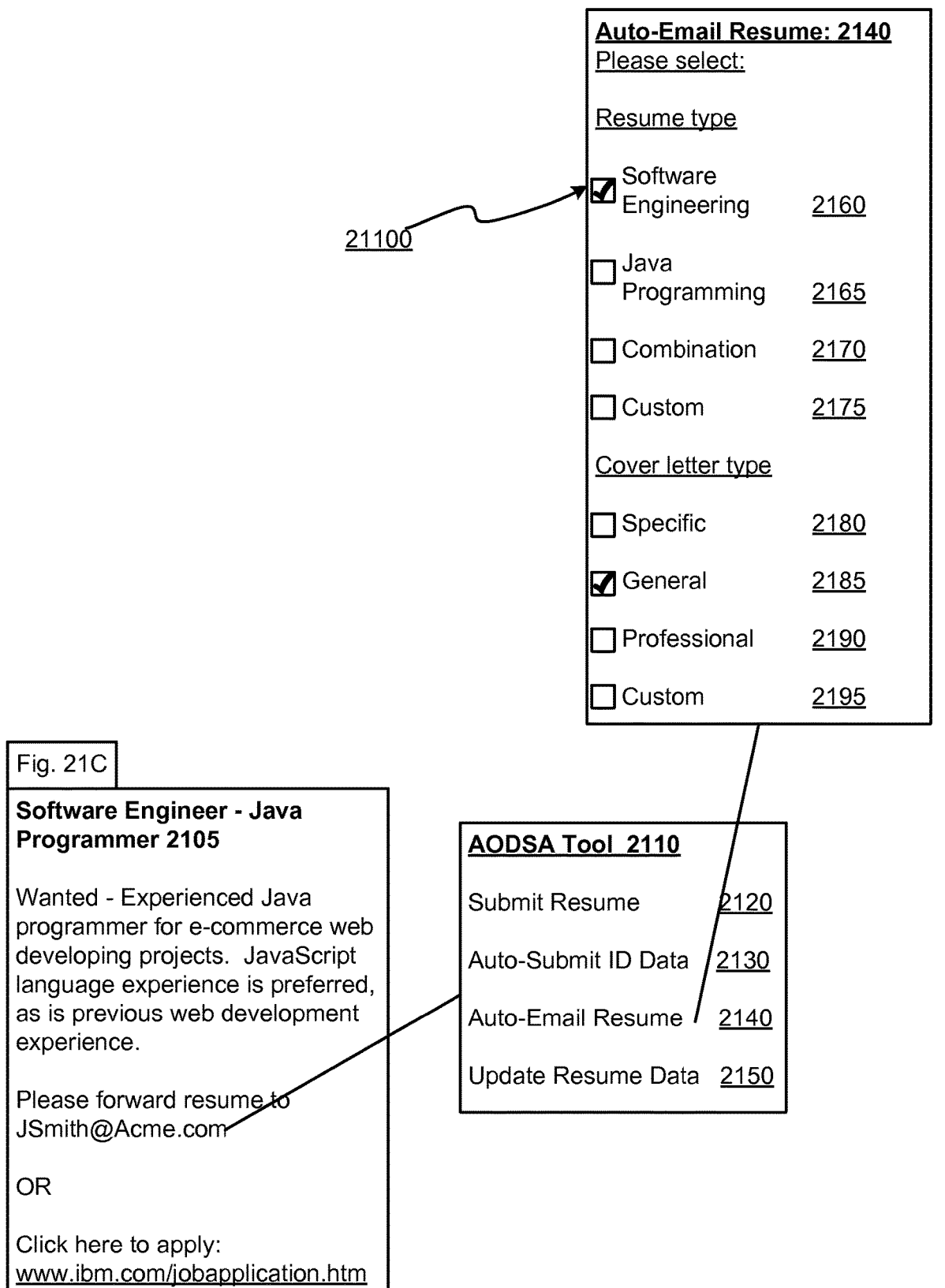

FIGS. 21A, 21B, and 21C illustrate examples of user invocations of the AODSA tool according to implementations of system application 130 (from FIG. 17). FIG. 21A illustrates an example generic data posting. By way of example only, FIG. 21A implements a generic job listing 2100 that lists a series of current software engineering job opportunities 2100. The generic job listing may be configured as a listing on a generic job listing repository, such as a web-based classified listing. Alternately, the generic job listing may be hosted by a particular company, and detail the current opportunities available within the company or a particular industry (e.g. jobs within IBM or within the Computer Programming Industry).

In FIG. 21B, the job applicant selects an internet hyperlink corresponding to a posted job 2105 from job listing 2100 in FIG. 21A. The user is then transferred to the corresponding web page (FIG. 21B) associated with the particular job description and can invoke the AODSA tool 2110. The AODSA tool 2110 provides a job applicant (or other system user) with a wide range of application data submission options, including an upload additional/redacted resume 2110; auto-fill a form with identifying information option 2120; auto-forward an email requesting additional information/forwarding a standardized job application cover letter with a resume attached 2130; or an option to update/edit stored resume data 2140.

After reviewing the opportunities detailed on the web page, the user may select the appropriate data submission and the user's data is retrieved from the AODSA centralized system and forwarded accordingly. According to the implementation illustrated in FIG. 21B, there are two primary user data transmission procedures (a) an online job application form auto-fill procedure 2130; and (b) emailing a cover letter with a resume to an email recipient extracted from the data posting 2140.

If AODSA component 2130 is selected, in coordination with the "click here to apply" link, the AODSA tool may spawn a new browser window with the online form. The AODSA tool may be configured to retrieve the user's identifying information and attempt to auto-fill the elements of the form based on the user's data retrieved from the system database.

If AODSA component 2140 is selected—the auto-email procedure—the AODSA tool may be configured to automatically email a user-selected resume and cover letter to a particular email address. Further, it is to be understood that in addition to submitting/updating resume data in AODSA components 2120/2150, the AODSA tool may be configured to assist the user in creating a number of stored cover letters to accompany the resume. Alternately, the AODSA tool may create an email with standardized employment application language with blanks that users can customize before the cover letter sending to the posting entity.

An embodiment of the auto-email interface is exhibited in FIG. 21C, wherein the user is requested to select from a portfolio of saved resumes and cover letters or pre-configured resume/cover letter templates. In this example, the resume selections are Software Engineering 2160, Java Programming 2165, combination 2170, or custom 2175, and the cover letter selections are specific 2180, general 2185, professional 2190, or custom 2195. Selection is made in this implementation by means of checkbox widgets 21100, though a variety of other interactive interface widgets are possible in other implementations. In one implementation, the user selects templates that are to be populated on the fly to generate cover letters and/or resumes, while in another embodiment, the user selects actual saved resumes and/or cover letters to be directly incorporated into application packages.

Figure 22:
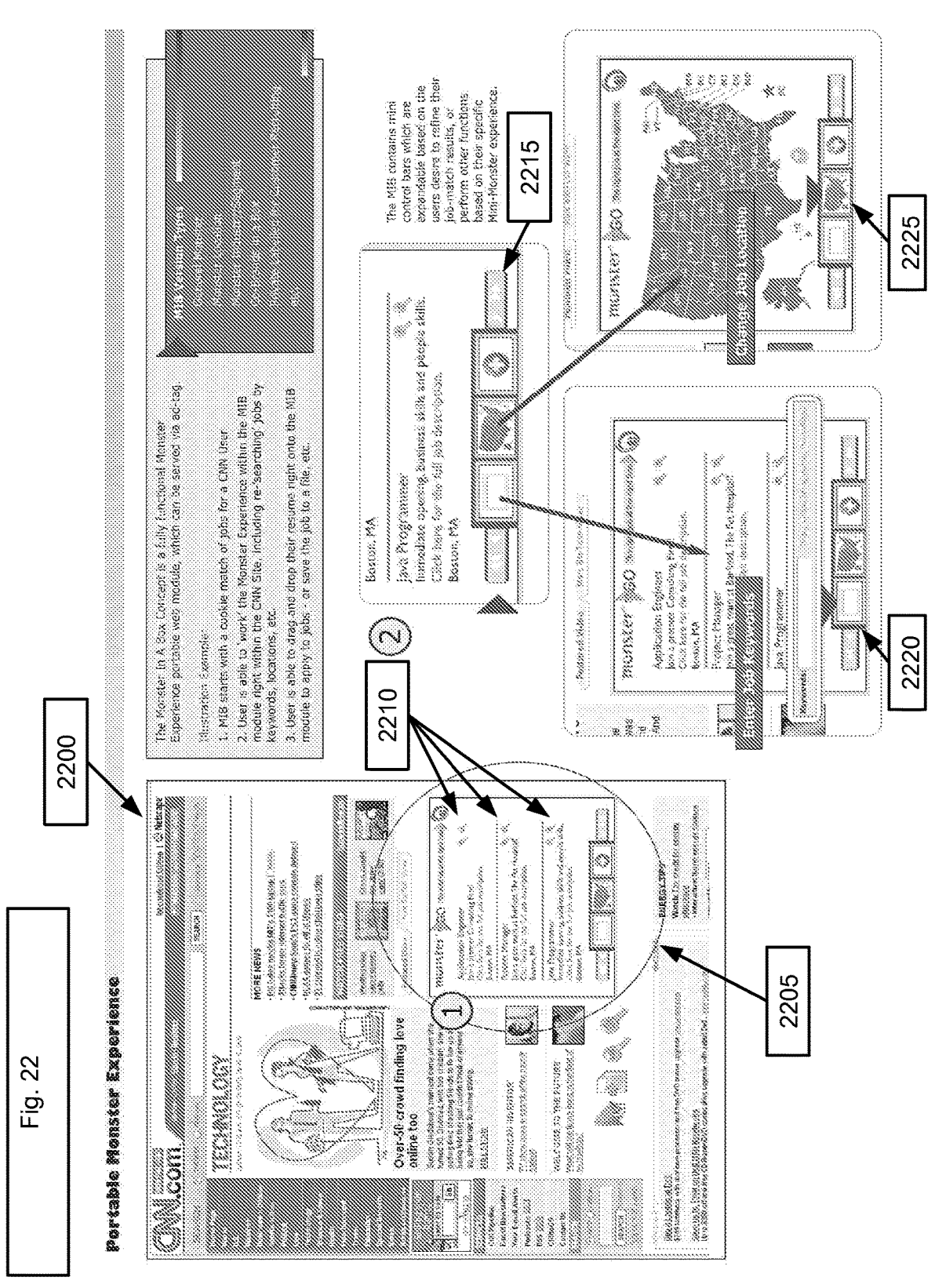
FIG. 22 illustrates an example of AODSA tool based on data served by an ad server protocol.

FIG. 22 illustrates an embodiment of the invention directed to serving AODSA functionality via an ad server as a portable web module embedded within a browser application. As illustrated, the user may surf the internet and access a particular website, for example a content providing 2200. The AODSA tool may be incorporated into a partner's website, in an area of the website that has been set aside for advertisements 2205.

In an implementation, the web module identifies the system user and access their full user data profile on an affiliate web site. The system user may be provided with full access to their user data profile and/or all of the functionality associated with the affiliate web site while using the content provider as an intermediary. For example, a web user registered with Monster.com accesses Content Provider CNN.com. The web user is identified by CNN.com as a registered Monster user and is provided access to their Monster.com account and/or Monster.com functionality (e.g., conducting job searches) without leaving the content provider's web site.

The AODSA tool is a fully functional portable web module, in which content can be served via as an online advertisement (e.g., via ad-tag). Accordingly, the portable web module may be configured to recognize a system user through a matching user data stored locally such as via a cookie. The system may then generate a customized list of jobs for a particular system user, which are then displayed for the system user as content within the portable web module. This process is illustrated in greater detail in FIG. 19B. The portable web module may be configured with a control bar 2215 to facilitate system user interaction with the AODSA tool set.

Depending on the particular implementation, the control bar 2215 may be configured with additional job listing data presentation components. By way of example only, the control bar 2215 may be configured to facilitate additional system user driven keyword searching within a designated system database. In some implementations, the user can change the geographic focus 2225 of a key word search. In such implementation additional data entry windows 2220, 2225 may be spawned in order to facilitate user interaction.

Although FIG. 22 illustrates an embodiment directed to presenting certain job listings selected from a general jobs database, it is to be understood that this discussion is simply for purposes of illustration. The actual implementation may be further adapted to meet the needs of a particular application.

By way of example only, the portable web module AODSA implementation may be configured to facilitate general job listing search functionality, based on key words, search terms, company names, industries, geographical areas, experience and/or educational levels, skills, salary range, and/or the like. Alternately, the displayed content may be customized according to settings established by a particular system user to display certain categories of jobs within a particular location, associated with a particular industry/job segment, user-defined salary range or other user-defined display parameter. It is to be understood that in additional embodiments of the invention, the portable web module may be further customized to illustrate listings associated with a co-brand and/or partner posting entity. Moreover, the portable web module may be adapted for private labeled postings to conduct customer recruiting.

The portable web module AODSA tool 2300 also may be configured to provide functionality similar to that described in FIGS. 21A, 21B, and 21C. By way of example only, FIG. 23 illustrates the AODSA tool portable web module 2300 adapted to interact with the system user.

In an implementation, the user may select a particular listing 2210 from FIG. 22. As illustrated, upon selection of a listing 2210, the portable web module 2300 retrieves and displays additional data associated with the listing 2210. Depending on the amount of detail for the listing, the portable web module may be configured to facilitate page browsing, wherein the user clicks an "advance" portion of the display 2305 to "turn the pages" of the displayed data associated with the posting 2210. The portable web module may include a listing browsing functionality button 2310 that enables a system user to navigate between detailed descriptions of the job listings 2210 at a granular level (i.e., where detailed listing data associated with a single listing is displayed to a system user).

In some embodiments, the portable web module may also be configured with auto resume submission 2315, listing auto-fill functionality (similar to the functionality discussed above in FIGS. 21B and 21C), and/or a listing bookmark feature 2320 that saves the selected job listing/company information/content to a system user data profile for review at a later time.

In an embodiment, the portable web module is configured to facilitate resume submission for a displayed job listing 2210. Depending on the implementation, the user may simply drag and drop an electronic resume 2315 (e.g., resume formatted as a Microsoft word document, a .PDF file, or any other number of formats of digital resume data) from a desktop or a file folder to the portable web module in order to facilitate the application process. Alternately, the portable web module may be adapted for the data submission processes and/or resume/cover letter creation processes associated with FIGS. 21B and 21C and discussed above.

Advancement Path Taxonomy

Career Statistical Engine

FIGS. 24-37B detail a career statistical engine (hereinafter, "CSE) component of the APPARATUSES, METHODS AND SYSTEMS FOR ADVANCEMENT PATH TAXONOMY (hereinafter "APT"), which is detailed in FIGS. 38-58. The CSE allows for the generation and statistical mapping of an advancement state structure, which furthers analysis associated with job market analysis, job search strategies, career counseling, educational advancement, financial advancement, and/or the like. It is to be understood that depending on the particular needs and/or characteristics of a job seeker, employer, career counselor, system operator, hardware implementation, network environment, and/or the like, various embodiments of the APT may include a career statistical engine component, which may include implementations allowing a great deal of flexibility and customization. The instant disclosure discusses an embodiment of the CSE within the context of job market analysis, career path modeling, job search strategies/recommendations, and/or the like. However, it is to be understood that the CSE may be readily configured/customized for a wide range of other applications or implementations. For example, aspects of the CSE may be adapted for operation within a single computer system or over a network, for use in educational path modeling and/or recommendations, task management, skill development; and/or the like. It is to be understood that the CSE may be further adapted to other implementations or experience analysis and management applications.

Figure 24:
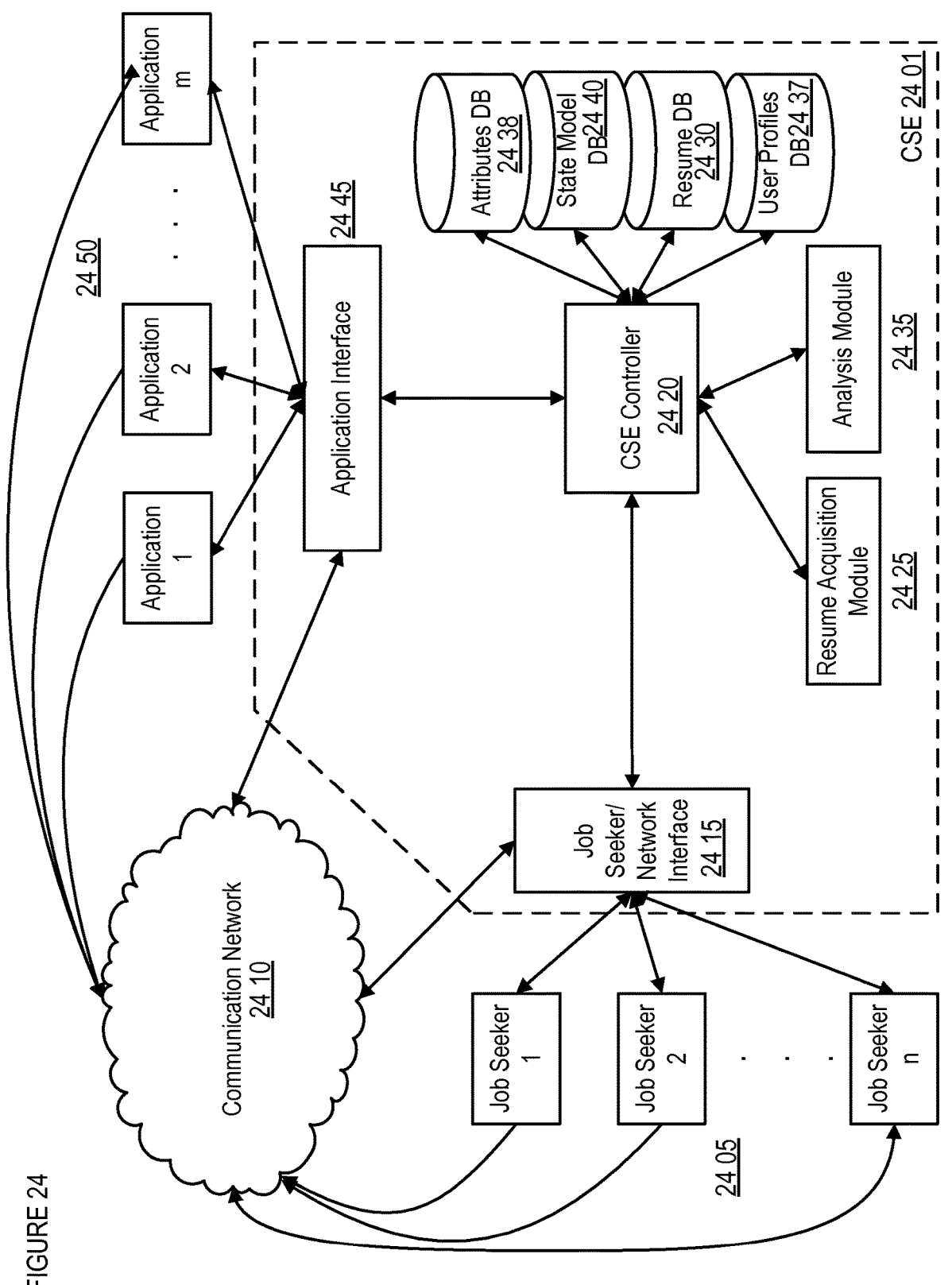
FIG. 24 shows an overview of entities and data flow in one embodiment of CSE operation.

FIG. 24 shows an overview of entities and data flow in one embodiment of CSE operation. The CSE 2401 may be configured to allow a plurality of job seekers (Job Seeker 1, Job Seeker 2, . . . , Job Seeker N) 2405 to interact with the CSE and/or engage CSE functionality. A job seeker may communicate with the CSE, such as via a communications network 2410, and/or directly via a job seeker/network interface 2415. The job seeker/network interface 2415 may be coupled to a CSE controller 2420, which may serve a central role in facilitating CSE functionality and mediating a communications and/or data exchanges between CSE modules, databases, and/or the like. The CSE controller 2420 may be further coupled to a resume acquisition module 2425, configured to receive and process resumes from job seekers 2405. In alternative embodiments, the CSE may be configured to receive and/or process one or more of a variety of different experiential sequences, such as educational transcripts, task lists, award histories, military records, and/or the like. The CSE Controller 2420 may further be coupled to an analysis module 2435, configured to analyze received resumes and to determine statistical relationships between and among experiences, job tides, education levels, accomplishments, and/or the like listed therein. The CSE Controller 2420 may further be coupled to a plurality of databases storing data received and/or processed by the CSE. Such databases may include, for example, an attributes database 2438, storing attributes data derived from submitted resumes; a state model database 2440, storing elements of the state model; a resume database 2430, storing received resumes and/or resume-derived information; and a user profiles database 2437, storing user accounts, user information, and/or the like. The CSE controller 2420 may further be coupled to an application interface 2445 configured to process for and/or relay CSE processed data to one or more external applications (Application 1, Application 2, . . . , Application m) 2450.

Figure 25:
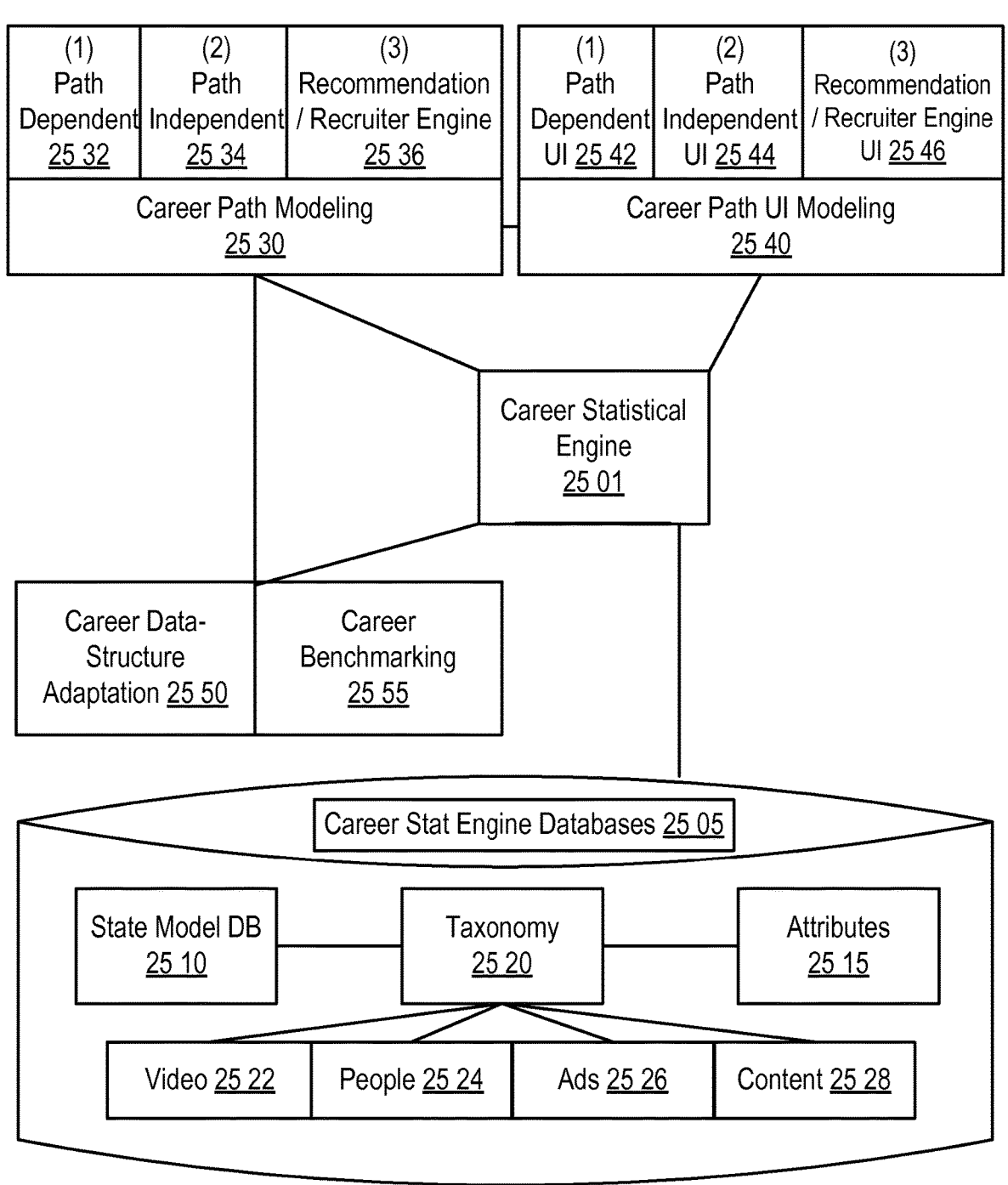
FIG. 25 shows an implementation of application modules and databases communicatively coupled to the CSE in one embodiment of CSE operation.

FIG. 25 shows an implementation of application modules and databases communicatively coupled to the CSE 2501 in one embodiment of CSE operation. The illustrated CSE Application overview includes Career Path Modeling 2530, as well as Career Path User Interface system 2540 features driven data processed, analyzed and coordinated by the underlying CSE 2501 and/or associated Databases 2505. In various embodiments, Career Path Modeling 2530 may be based on path-dependent 2532 and/or path independent 2534 state model implementations and/or may further couple to a recommendation/recruiter engine 2536. Similarly, in various embodiments, Career Path UI Modeling 2540 may be based on path-dependent 2542 and/or path independent 2544 state model implementations and/or may further couple to a recommendation/recruiter engine 2546 The CSE 2501 may also coordinate Career Data Structure Adaptation 2550 and Career Benchmarking 2555 features. The CSE manages data associated with various system processes in CSE Databases 2505 that include State Model database 2510, Taxonomy database 2520 and Attribute Database 2515 information, as well as the underlying Video 2522, People 2524, Ads 2526, and other content 2528 that may be incorporated into various implementations of the system. Further, in some implementations, the CSE Databases also coordinates the relationships/associations between these modules, as well.

Figure 26A:
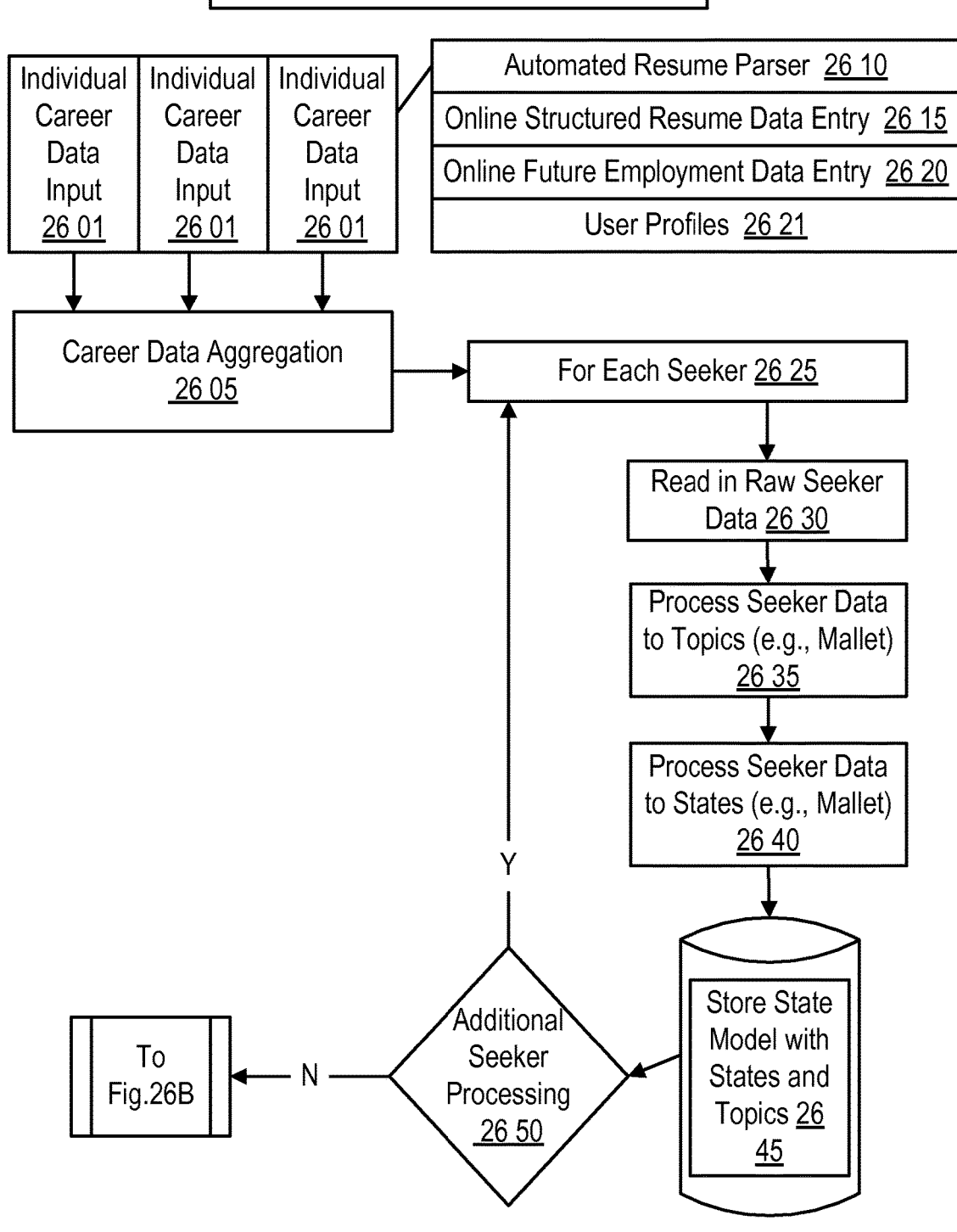
FIG. 26A shows an implementation of combined logic and data flow for acquiring and processing career data inputs in one embodiment of CSE operation.

FIG. 26A shows an implementation of combined logic and data flow for acquiring and processing career data inputs in one embodiment of CSE operational. A plurality of individual career data inputs 2601, such as resume data, profile data, and/or the like may be input to a career data aggregation module 2605. In one implementation, free-form resume data may be parsed by an automated resume parses 2610, such as may be based on resume templates. In another implementation, resume data may be input as structured inputs in an online structured resume data entry module 2615, such as a web form interface admitting experiential, educational, and/or the like resume data inputs from users.

In another implementation, future or prospective employment information may be entered via an online future employment data entry module 2620. In another implementation, user profile information may be entered 2621, such as may be received from a user profile database. In one implementation, a seed set of raw seeker data (e.g., of structured resume data) may be processed initially by the CSE to yield an initial state model, topic model, and/or the like. For each job seeker 2625, the CSE may read in raw seeker data 2630, such as resume data, profile data, and/or the like. Elements of the raw seeker data, such as job titles, start and/or end dates of employment experiences, and/or the like may then be processed to discern a plurality of job state classifications, job states, states, and/or the like 2635. In one implementation, statistical analysis of raw seeker job titles and/or other work experience data may be undertaken by a statistical analysis toolkit, such as by the Mallet toolkit available at http://mallet.cs.umass.edu, to discern job states and/or other classifications. Elements of the raw seeker data, such as work experience descriptions, may further be processed to discern a plurality of topics and associated terms and/or phrases 2640. For example, in one implementation, job seeker work experience description data may be processed by elements of the Mallet toolkit to discern a plurality of topics comprising common terms and/o phases appearing in those descriptions. Discerned states and/or topics may then be coalesced into a state model, and the state model may be stored in a database 2645. A determination may then be made as to whether there is additional seeker processing to undertake 2650. If so, then the CSE may return to 2625. Otherwise, the CSE may proceed to determining and assigning topic weights to states in the state model, as shown in one implementation in FIG. 26B.

Figure 26B:
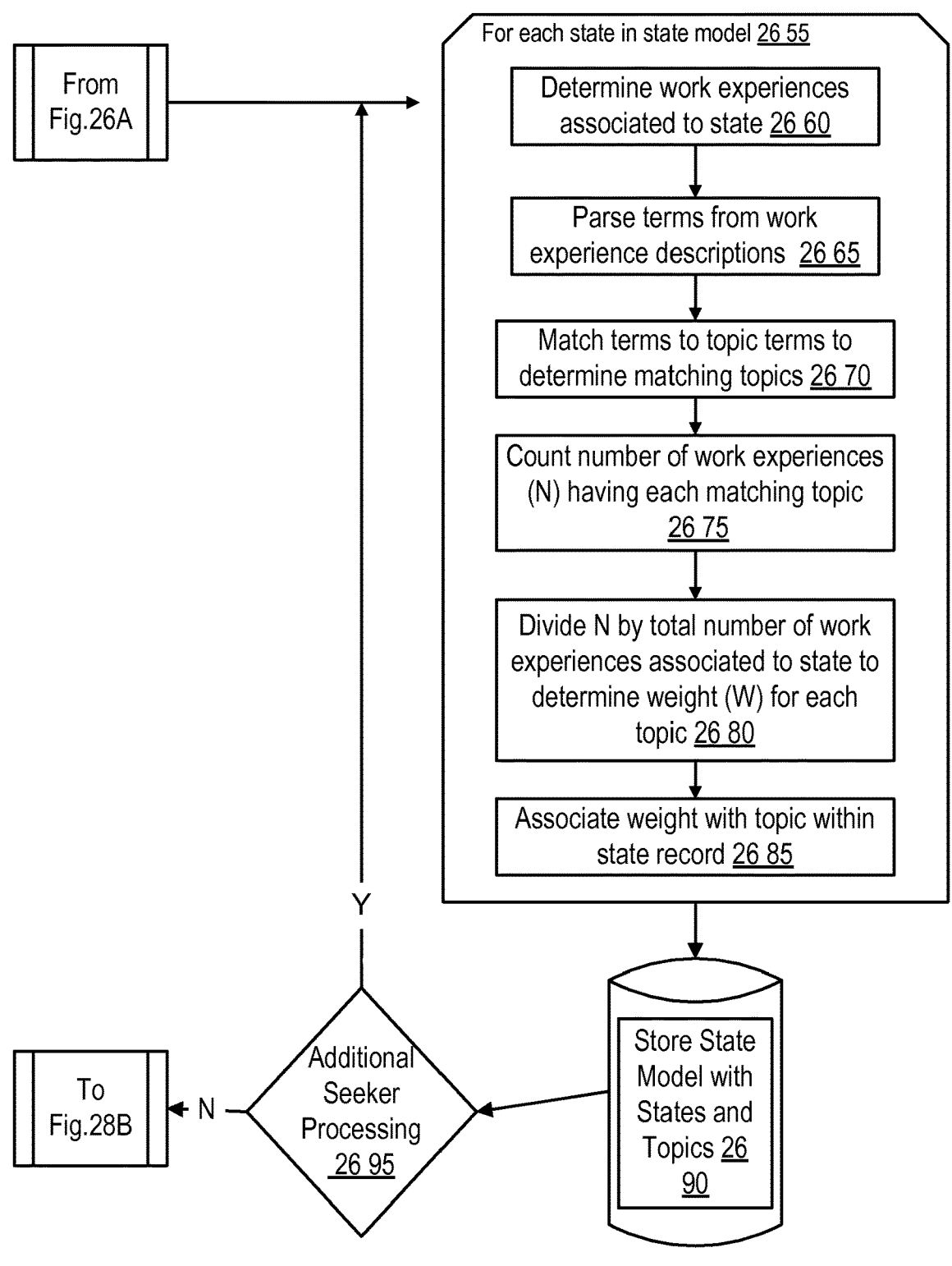
FIG. 26B shows an implementation of combined logic and data flow for processing career data inputs in one embodiment of CSE operation.

FIG. 26B shows an implementation of combined logic and data flow for processing career data inputs, in one embodiment of CSE operation, to determine and assign topic weights to states in a state model. For each state of the plurality of states discerned by the statistical analysis toolkit in FIG. 26A, a weight may be assigned to each topic of the plurality of topics also discerned by the toolkit in FIG. 26A. Weights may, in one implementation, be based on the frequency with which terms associated with topics appear in descriptions for resume work experiences associated with states. For each state in the state model 2655, the CSE may determine work experiences, work experience data structures, and/or the like associated to the state 2660. In one implementation, such a determination may be made based on information stored in or by the statistical analysis toolkit from FIG. 26A, the information being generated as part of the classification of work experiences and the discernment of states at 2635. The CSE may then parse terms from descriptions associated with the work descriptions 2665 in order to match those terms against terms associated with topics 2670. In this manner, the CSE may determine which work experiences corresponding to a given state also correspond to a given topic or set of topics. The CSE may then count the number of work experiences for a given state that match a given topic 2675 and divide by the total number of work experiences associated with the state to determine the frequency, and accordingly the weight, to assign to that given topic in association with that given state 2680. The determined weights may then be associated with their corresponding topics within the state record for the given state 2685. The CSE may then store the state model with states and topics, including weights assigned to topics in association with each state, in a database 2690. A determination may then be made as to whether additional processing of job seeker data is warranted 2695. If so, the CSE may return to 2655 and update topic weights. Otherwise, the CSE may proceed to building a state data record, such as shown in one implementation in FIG. 28.

Figure 27A:
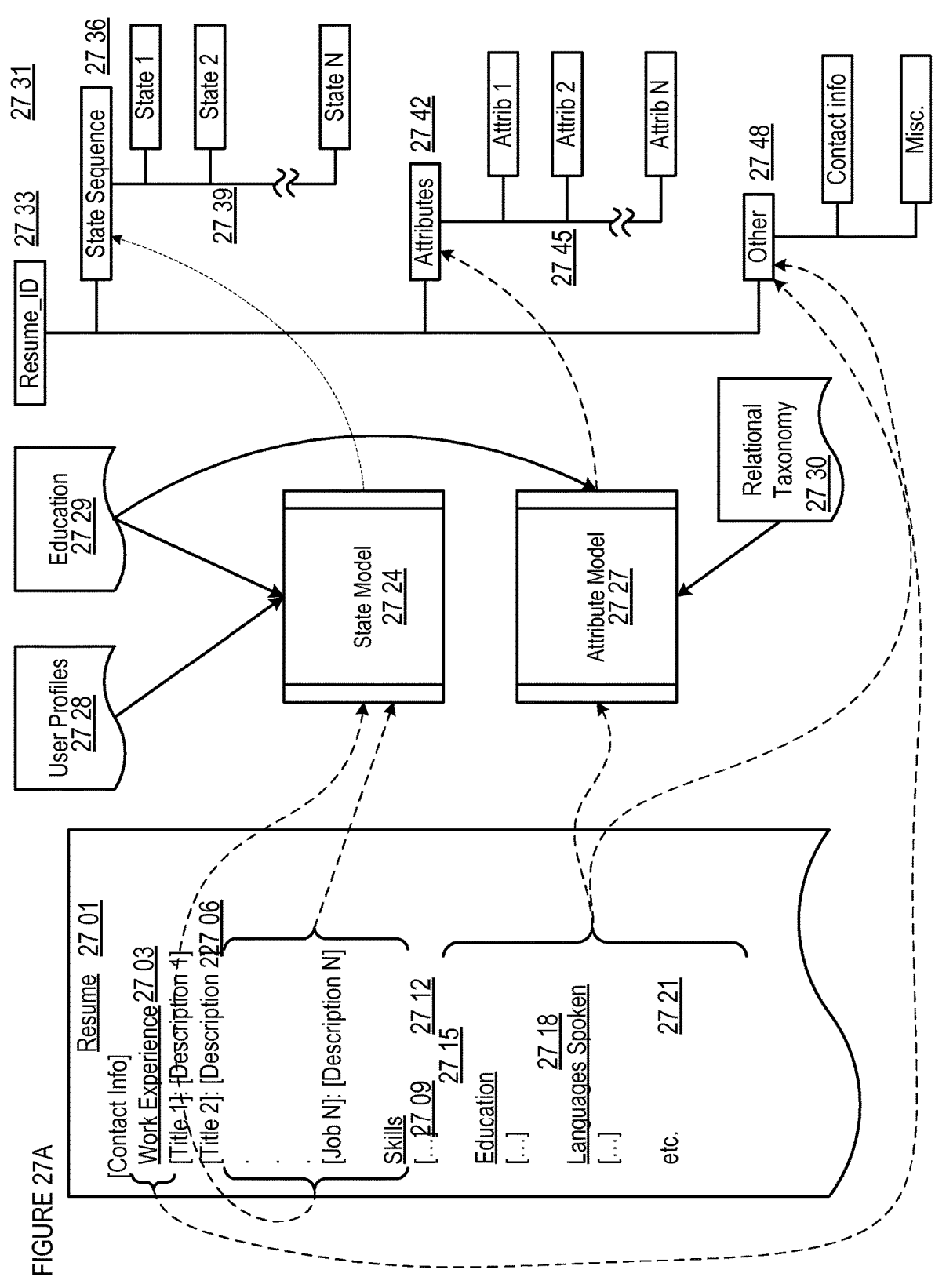
FIG. 27A shows a schematic illustration of resume data record generation in one embodiment of CSE operation.

FIG. 27A shows a schematic illustration of resume data record generation in one embodiment of CSE operation, whereby a submitted resume may be mapped to states, topics, and/or the like using the state model generated according to FIGS. 26A-26B. A submitted resume 2701 may contain a variety of information describing experiences, attributes, and/or the like associated with a job seeker. The resume 2701 in the illustrated implementation includes user contact information 2703 (e.g., postal address, e-mail address, phone numbers, and/or the like), a work experience sequence 2706 comprising job titles 2709 and description 2712, a list of skills 2715, a list and/or description of education experiences (e.g., schools attended, degrees received, grades, courses, and/or the like) 2718, a section listing and/or describing languages spoken 2721, and/or the like. A state model 2724 may serve to process resume 2701 data into one or more data records 2731 configured for analysis and/or processing by CSE modules. In one implementation, the state model 2724 may process resume 2701 information in conjunction with user profile information 2728 and/or education information 2729 to generate the one or more data records 2731. The state model 2724 may, for example, analyze job titles 2709 and/or descriptions 2712 in order to map them to a pre-set listing of job "states". The work experience listing 2706, thus, may be converted into a state sequence 2736 comprising a plurality of states 2739 associated with the job titles 2709 and/or descriptions 2712 from the resume 2701.

Furthermore, an attributes model 2727 may receive and/or process other resume information, such as that external to the work experience listing 2706, to generate elements of a data record configured to analysis and/or use by other CSE components. The attribute model 2727 may further be configured to consider education 2718 and/or relational taxonomy 2730 inputs, in addition to the other resume information, in generating those elements. In one implementation, the attribute model may map resume information to elements of a pre-set listing of attributes. Thus, the skills 2715, education 2718, languages spoken 2721, and/or the like extracted from the resume 2701 may be converted into an attributes listing 2742 comprising a plurality of attributes 2745 corresponding to various elements of the resume information. Other resume information may also be included in a resume data record 2731, such as may be collected in an "Other" category 2748 for subsequent reference and/or use. The resume data record 2731 may be associated with a unique resume identifier (ID) 2733, based on which the record may be queried and/or otherwise targeted.

Figure 27B:
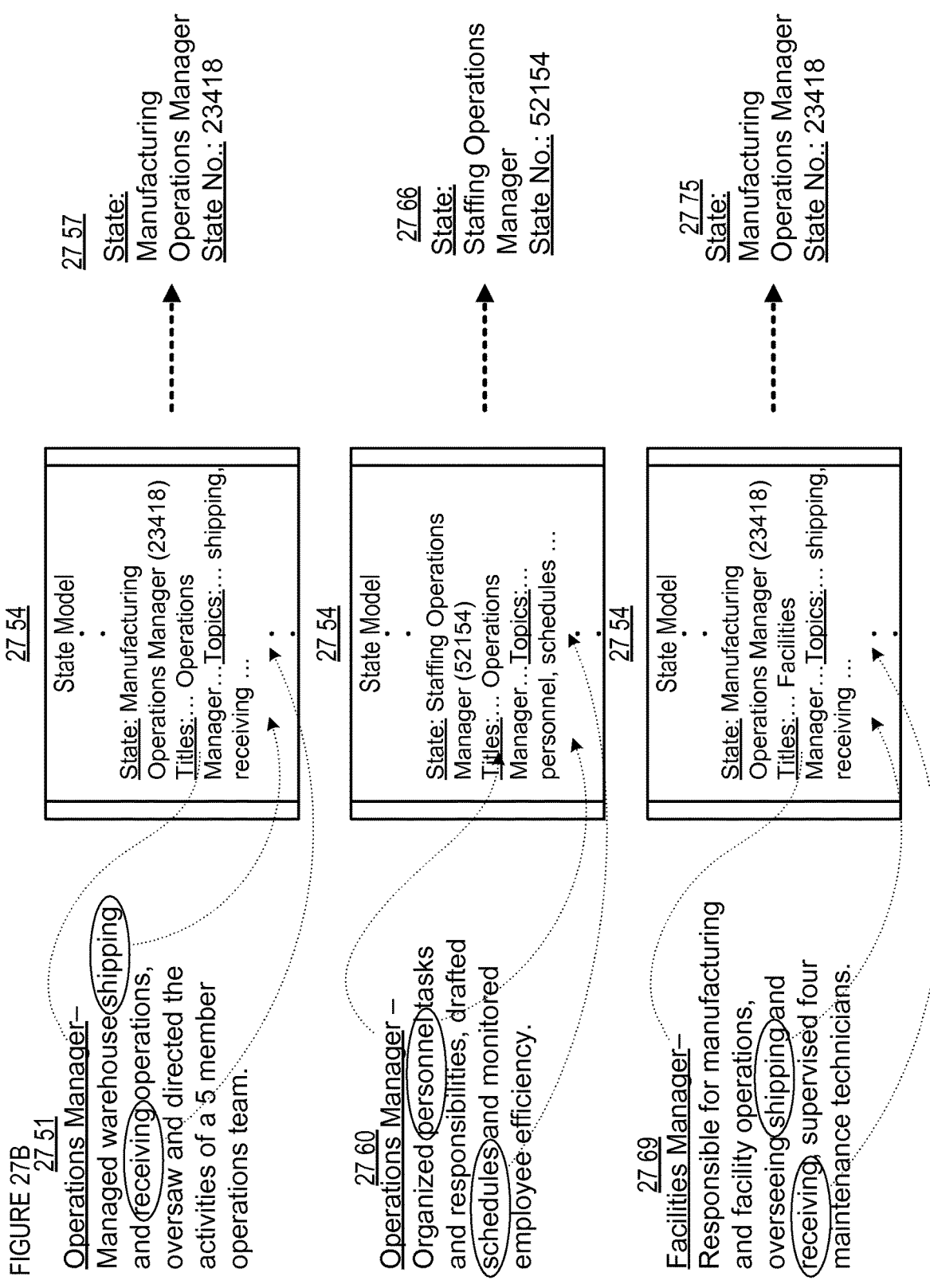
FIG. 27B shows a schematic illustration of experience to state conversion in one embodiment of CSE operation.

FIG. 27B shows a schematic illustration of experience to state conversion in one embodiment of CSE operation, whereby an input resume may be converted and/or otherwise mapped to states, topics, and/or the like using the state model generated according to FIGS. 26A-26B. Experiences listed in a resume may be processed by one or more CSE state models to convert those experiences to at least one of a list of pre-defined states. In some cases, job seekers may use the same or similar job titles and/or descriptions to refer to jobs that may be very different and/or that may correspond to different states within the CSE state model. FIG. 27B provides an illustration of CSE state resolution for similar resume work experience listings. Experience listings at 2751 and 2760 each comprise the job title "Operations Manager", but have different job descriptions. The CSE state model

2754 may include a plurality of states, each having a plurality of corresponding job titles, and the CSE may employ the model to determine which, if any, of the states have titles matching the titles supplied at 2751 and/or 2760. In one implementation, different states may have common corresponding job titles. To resolve the appropriate state corresponding to each of the work experience listings 2751 and 2760, the CSE may analyze the listings' job description field for comparison with "topics" associated to each state. The job description in the listing at 2751 includes keywords "shipping" and "receiving" that match topics in the state model 2754 entry corresponding to the state "Manufacturing Operations Manager" with state number 23418, so the listing 2751 is mapped to this unique state 2757. The job description in the listing at 2760, on the other hand, includes the keywords "personnel" and "schedules", matching topics in the state model 2754 entry for the state entitled "Staffing Operations Manager" with state number 52154, so the listing 2760 is mapped to this unique state 2766. In one embodiment, a state structure may be represented by way of database tables. In another embodiment, a state structure, or limited subset thereof, may be represented as XML information, which may be used for advancement pathing. In one embodiment, the XML structure may take the following form:

```
<states>
    <state id="0" njobs="3712" ntokens="90708">
        <title>cna, certified nursing assistant, caregiver</
            title>
        <jobtitles>
            <jobtitle count="260" pct="7.0">cna</jobtitle>
            <jobtitle count="142" pct="3.8">certified nursing
                assistant</jobtitle>
            <jobtitle count="104" pct="2.8">[no title]</job-
                title>
            <jobtitle count="83" pct="2. 2">caregiver</job-
                title>
            <jobtitle count="67" pct="1.8">home health
                aide</jobtitle>
        . . .
            <jobtitle count="15" pct="0.4">residential coun-
                selor</jobtitle>
        </jobtitles>
        <topics>
            <topic id="494" n="32601" words-"care residents
                home daily living patients personal nursing aide
                activities "/>
            <topic id="696" n="1719" words-"patients
                patient medical insurance appointments charts
                doctors doctor procedures care "/>
        . . .
            <topic id="205" n="544" words-"daily basis
                needed reports activity log assist interacted
                complete schedule "/>
        </topics>
        <next>
            <state id="0" pct="10.5" titles="cna, certified
                nursing assistant, caregiver" topics="care
                patients treatment career care unit medical
                activities children daily"/>
            <state Id="268" pct="4.6" titles="cna, certified
                nursing assistant, caregiver" topics="care
                cleaning job job assist helped shift duties clean
                food"/>
        . . .
            <state id="45" pct="1. 1 "titles="medical records
                clerk, medical transcriptionist, file clerk"
```

```
topics="medical records answered phones
office answer office patients data data"/>
</next>
<prev>
<state d="999" pct="23.0" titles=" [First job]"
topics=" [First job]"/>
<state Id="0" pct="10.2" titles="cna, certified
nursing assistant, caregiver" topics="cna, certi-
fied nursing assistant, caregiver"/>
. . .
<state d="243" pct="0.9" titles="administrator, execu-
tive director, director of nursing"
topics="administrator, executive director, director of
nursing"/></prev>
</state>
<state id="1" njobs="3570" ntokens="113569">
. . .
</state>
<states>
```

The XML form including a title, other analogue job titles and related frequency counts and likelihood percentages, topics, next states and previous states with frequency occurrences, and/or the like.

Job listings with different job titles may also be mapped to the same state by a CSE state model 2754. The listing at 2769 includes a job title of "Facilities Manager", which matches one of the titles for the state "Manufacturing Operations Manager" (though possibly other states as well) in the CSE state model 2754. The listing 2769 further includes a job description comprising the keywords "shipping" and "receiving", which match topics associated with the state "Manufacturing Operations Manager", so the listing 2769 is mapped to the unique state 2775, which is the same as the state at 2757 despite the different job title in the original listing.

Figure 27C:
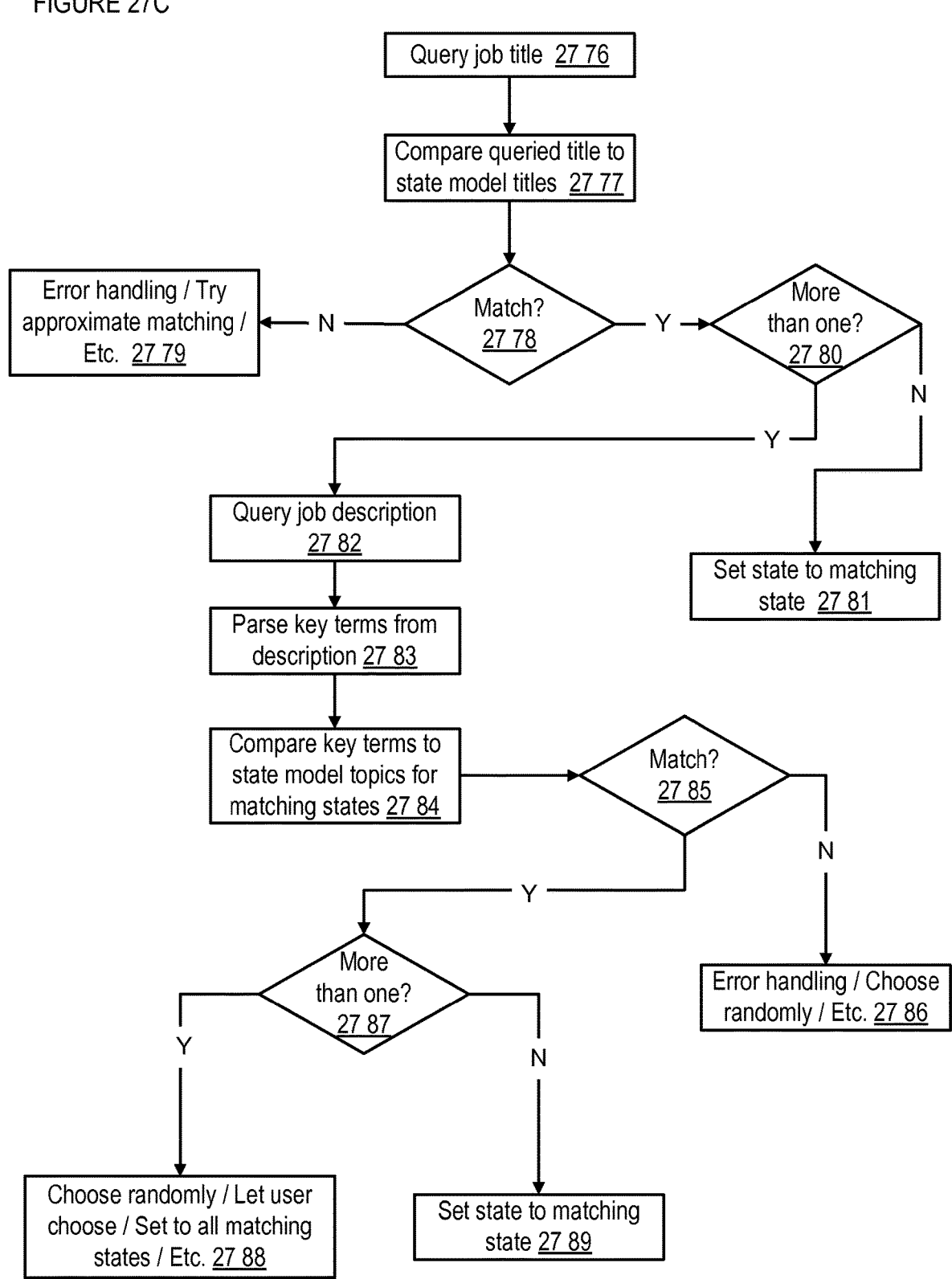
FIG. 27C shows an implementation of logic flow for experience to state conversion in one embodiment of CSE operation.

FIG. 27C shows an implementation of logic flow for experience to state conversion in one embodiment of CSE operation. The logic in FIG. 27C may be as applied, for example, to a work experience listing extracted from a resume or curriculum vitae (CV). In alternative implementations, the logic in FIG. 27C could be applied to job listings from other sources, such as career development resources, school and/or corporate websites, and/or the like. A job title may be queried and/or extracted from the listing 2776 and compared with a plurality of job titles corresponding to states in the state model 2777 in order to determine whether there exist any states having matching job titles 2778. If there are no matches, then the CSE may engage an error handling procedure, try approximate matching of the job titles, and/or the like 2779. For example, in one implementation, the CSE may perform a search based on a subset of the complete job listing job title to find approximate matches. In another implementation, the CSE may seek states having job titles with subsets matching the job title extracted from the job listing (e.g., a state model job title of "Manufacturing Operations Manager" may be deemed a match for an input job title of "Manufacturing Manager"). In still another implementation, an error message may be returned for the input job title and/or the job title may be set to a null state.

If one or more matches are established at 2778, a determination may be made as to whether there are multiple matching states 2780. If there is only one matching state, then the CSE may immediately map the input listing to matching state 2781. Otherwise, the CSE may query and/or extract a job description from the input listing 2782 and parse key terms from that description 2783. Parsing of key terms may be accomplished by a variety of different methods in different implementations and/or embodiments of CSE operation. For example, in one implementation, the CSE may parse all terms from the description having more than a minimum threshold number of characters. In another implementation, the CSE may filter all words in the description that match elements of a listing of common words/phrases and extract the remaining words from the description. The parsed key terms may then be compared at 2784 to state model topics corresponding to the matching states determined at 2777-2778. A determination is made as to whether there exist any matches between the job description terms and the state topics 2785 and, if not, then one or more error handling procedures may be undertaken to distinguish between the matching states 2786. For example, in one implementation, the CSE may choose a state randomly from the matching job states and map the input listing thereto. In another implementation, the CSE may present a job seeker, system administrator, and/or the like with a message providing a selectable option of the various matching states, to allow for the selection of a desired match.

If a match exists at 2785 between description key terms and state topics in the CSE state model, then a determination may be made as to whether there exists more than one matching state 2787. In one implementation, this determination may only find that multiple matches exist if the number of key terms matching state topics is the same for more than one state (i.e., if one state has more matching topics than another, then the former may be deemed the unique matching state). If there are not multiple matching states, then the input listing may be matched to the unique matching state 2789. If, on the other hand, multiple matches still exist, then the CSE may, in various implementations, undertake any of a variety of different methods of further discerning a unique matching state for the input listing. For example, in one implementation, the CSE may choose randomly between the remaining states. In another implementation, the CSE may provide a list of remaining states in a message to a job seeker, system administrator, and/or the like to permit selection of a desired, unique state. In another implementation, the CSE may map the job listing to all of the multiple matching states.

In one implementation, logic flow similar to that described in FIG. 27C may be employed to map other resume information, such as education experiences, skills, languages spoken, honors and/or awards, travel, and/or the like to one or more attribute states stored in and/or managed by the CSE, a CSE state model, a CSE attribute model, and/or the like.

Figure 27D:
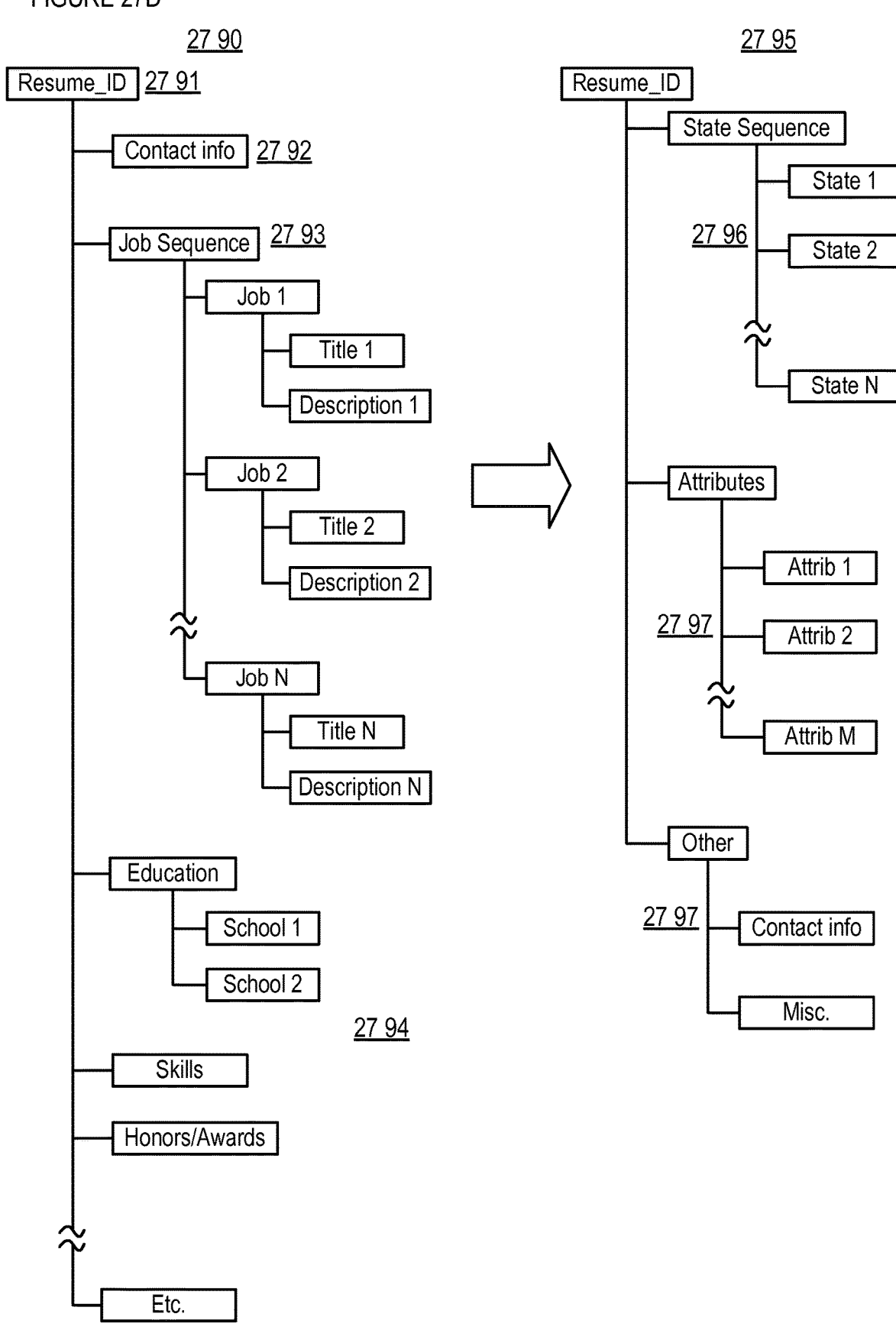
FIG. 27D shows an implementation of a raw resume data record and a state converted resume data record in one embodiment of CSE operation.

FIG. 27D shows an implementation of a raw resume data record and a state converted resume data record in one embodiment of CSE operation. The raw resume data record 2790 is indexed by a resume ID 2791, and includes a variety of resume data, including contact information 2792, a job sequence listing 2793, and other information 2793 such as education, skills, honors/awards, and/or the like. The corresponding state converted resume data record is shown at 2795, and includes a state sequence 2796 corresponding to the job sequence 2793, as well as a series of attributes 2797 that are based on the other resume information. The state converted resume data record also may incorporate other resume data 2797.

Figure 28A:
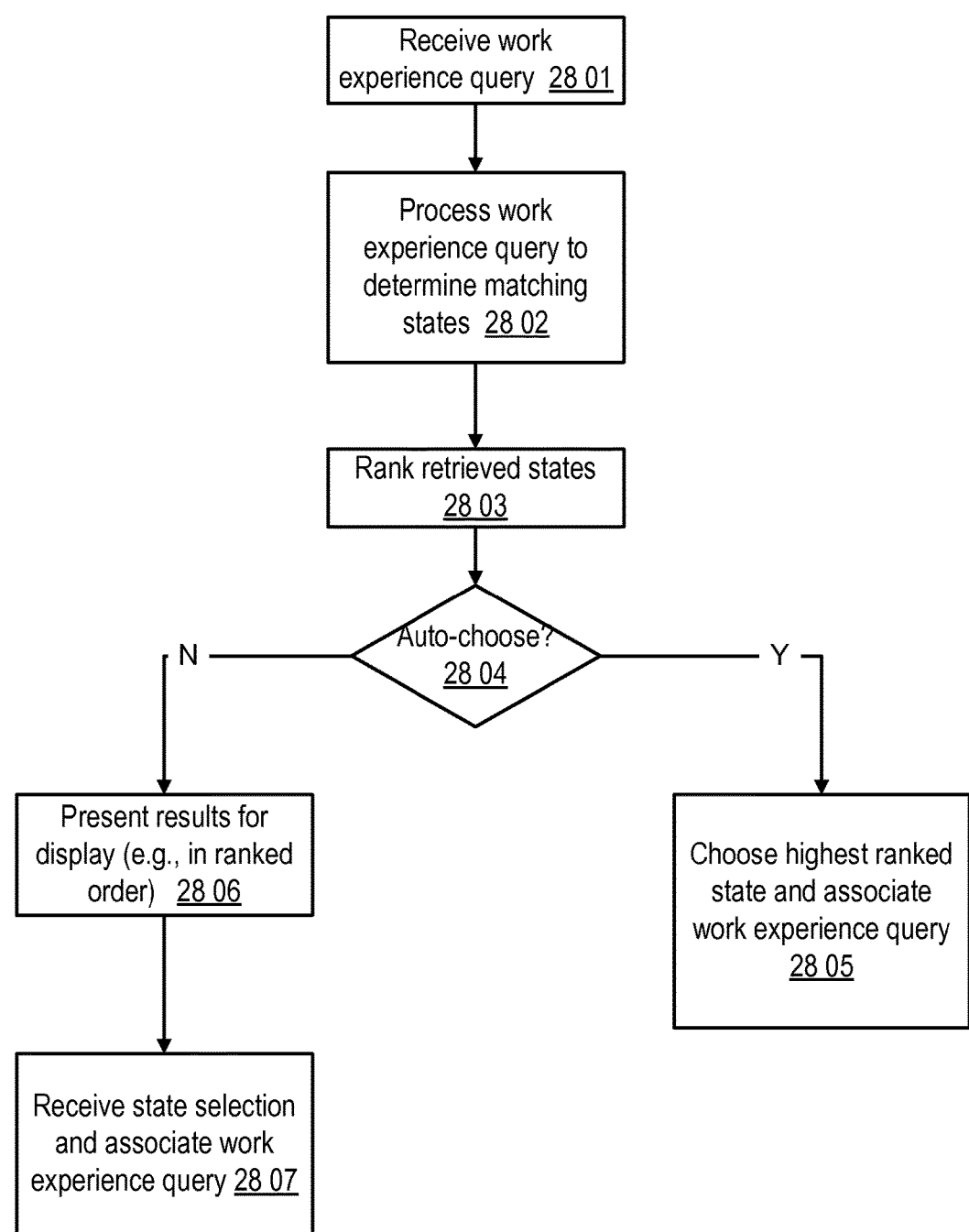
FIG. 28 shows an implementation of combined logic and data flow for building a state data record in one embodiment of CSE operation.
Figure 28B:
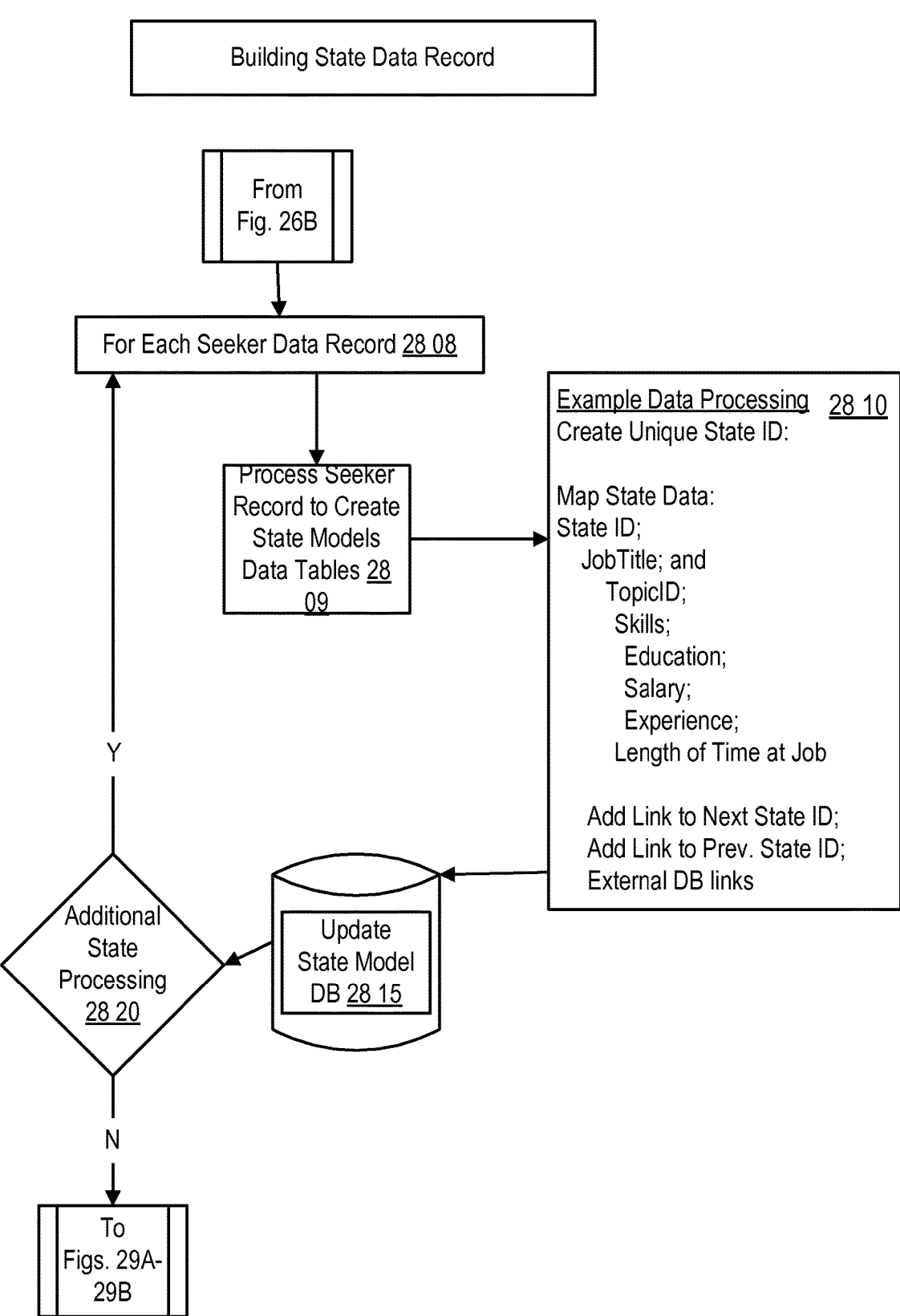

FIG. 28 shows an implementation of combined logic and data flow for building a state data record in one embodiment of CSE operation. For each job seeker data record 2801, such as may correspond to resume and/or profile data submitted by the job seeker, the CSE may process the seeker record to create and/or update one or more state models and/or data tables 2805. An example of such data processing in one implementation is shown at 2810, wherein a unique state ID is created and state data is mapped thereto. Associated with the state ID may be one or more job titles, topics and/or topic IDs, skills, education information, salary information, experience information, length and/or time at a job, and/or the like. The state record may further include links to next state IDs, previous state IDs, and/or external database links, such as to associated videos, people and/or profiles, ads, and/or other content. The state record may be stored in and/or used to update the state model for storage in a state model database 2815. A determination may then be made as to whether additional state processing is to be undertaken 2820. If so, then the CSE may return to 2801 and draw on the next seeker data record. Otherwise, the CSE may move to processing state data to develop the statistical database and/or perform incremental state discovery, such as by the embodiments shown in FIGS. 29A-29B.

Figure 29A:
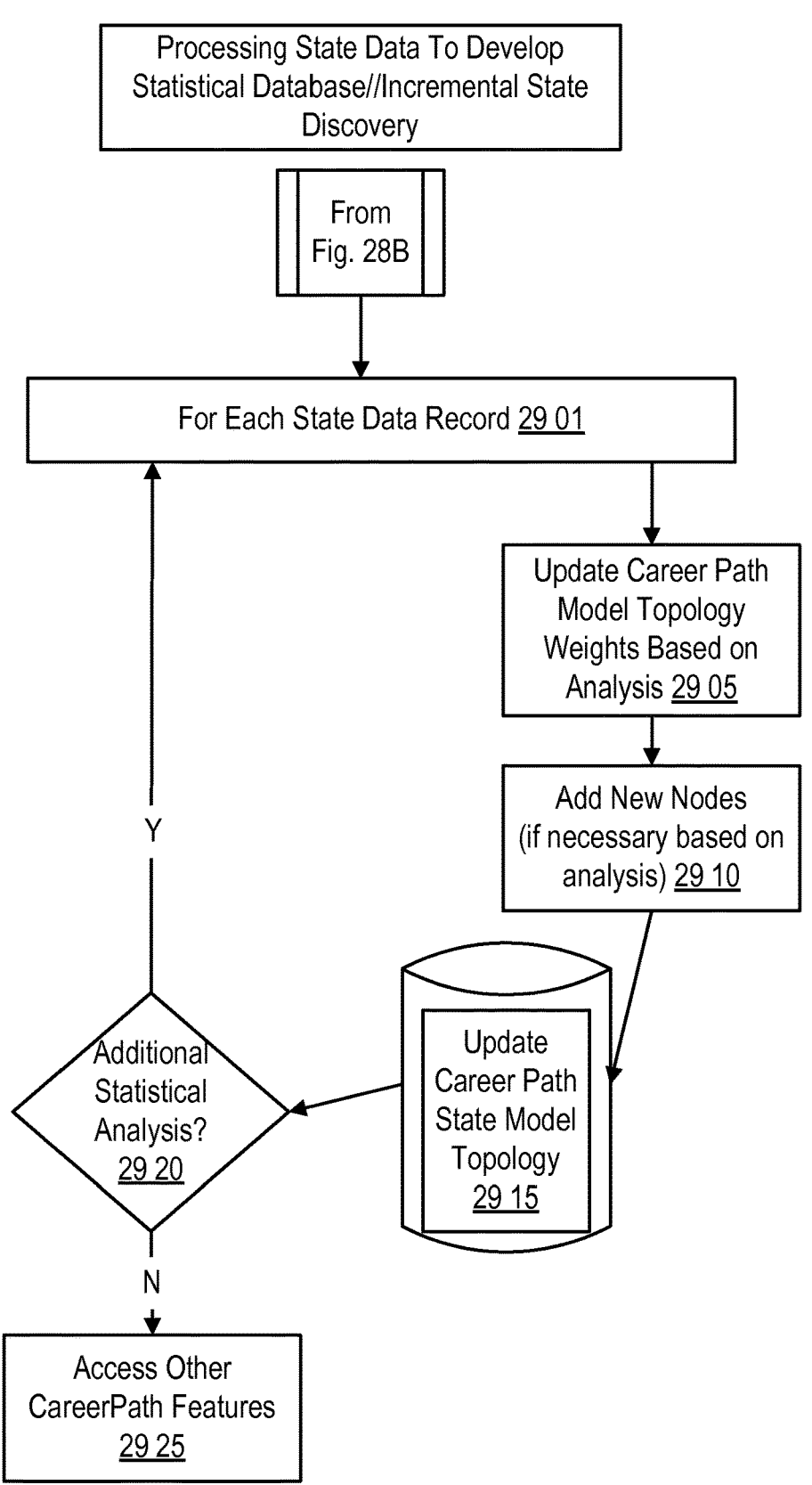
FIG. 29A shows an implementation of combined logic and data flow for processing state data to develop the statistical model in one embodiment of CSE operation.

FIG. 29A shows an implementation of combined logic and data flow for processing state data to develop the statistical model in one embodiment of CSE operation. For each state data record 2901, the CSE may update a career path and/or state model topology and/or topology weights based on analysis of the data record 2905. In one implementation, a career path and/or state model topology may comprise a plurality of relationships between job states established based on the frequency of occurrence of such relationships in the work experience sections of analyzed resumes. The CSE may also be configured to add new nodes to the career path and/or state model topologies as necessary 2910, such as if a newly analyzed resume introduces a relationship between job states that had not been seen in previously analyzed resumes. The updated career path and/or state model topology may be stored in a database 2915 and a determination made as to whether additional statistical analysis is required 2920. If so, then the CSE returns to 2901 and proceeds with additional statistical analysis of the state data record and/or moves to a next state data record. Otherwise, the career path and/or state model topology may be provided for access and/or use by other career path features and/or functions 2925.

Figure 29B:
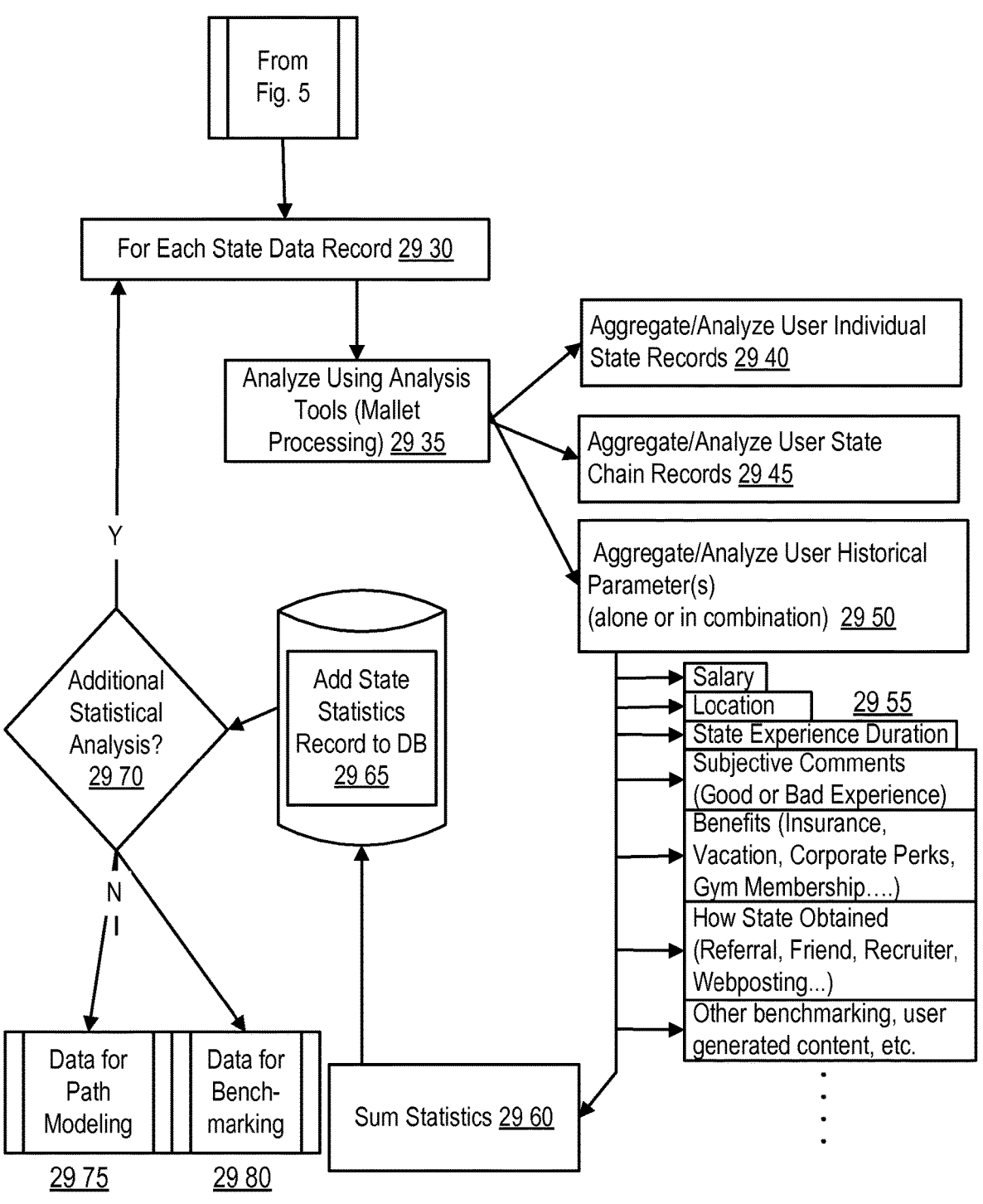
FIG. 29B shows an implementation of combined logic and data flow for processing state data to develop the statistical model in another embodiment of CSE operation.

FIG. 29B shows an implementation of combined logic and data flow for processing state data to develop the statistical model in another embodiment of CSE operation.

For each state data record 2930, the CSE may analyze the record using any of a variety of statistical analysis tools. Numerous methods of topic modeling may be employed as discussed in: "Latent Dirichlet Allocation," D. Blei, A. Ng, M. Jordan, "The Journal of Machine Learning Research", 4303. Markov models may also be employed as discussed in: "A tutorial on hidden Markov models and selected applications in speech recognition," L. Rabiner, Proceedings of the IEEE, 1989. In one embodiment, Mallet Processing tools 2935 may also be employed, such as may be found at http://mallet.cs.umass.edu. The analysis may include aggregation and/or analysis of user individual state records 2940, aggregation and/or analysis of user state chain records 2945, and/or aggregation and/or analysis of user historical parameter(s) 2950. User historical parameters 2955 may, for example, comprise salary, location, state experience duration, subjective experiences associated with job states, benefits, how the job was obtained, other benchmarking and/or user generated content, and/or the like. The statistics associated with the state record may be summed 2960 and added to the state statistical records in one or more state models stored in a state model database 2965. A determination may be made as to whether additional statistical analysis of state data records is to be undertaken 2970. If so, then the CSE may return to 2930 to proceed with additional analysis of the state data record and/or to move to the next state data record. Otherwise, the state model may be provided for path modeling 2975, benchmarking 2980, and/or the like applications.

Figure 30:
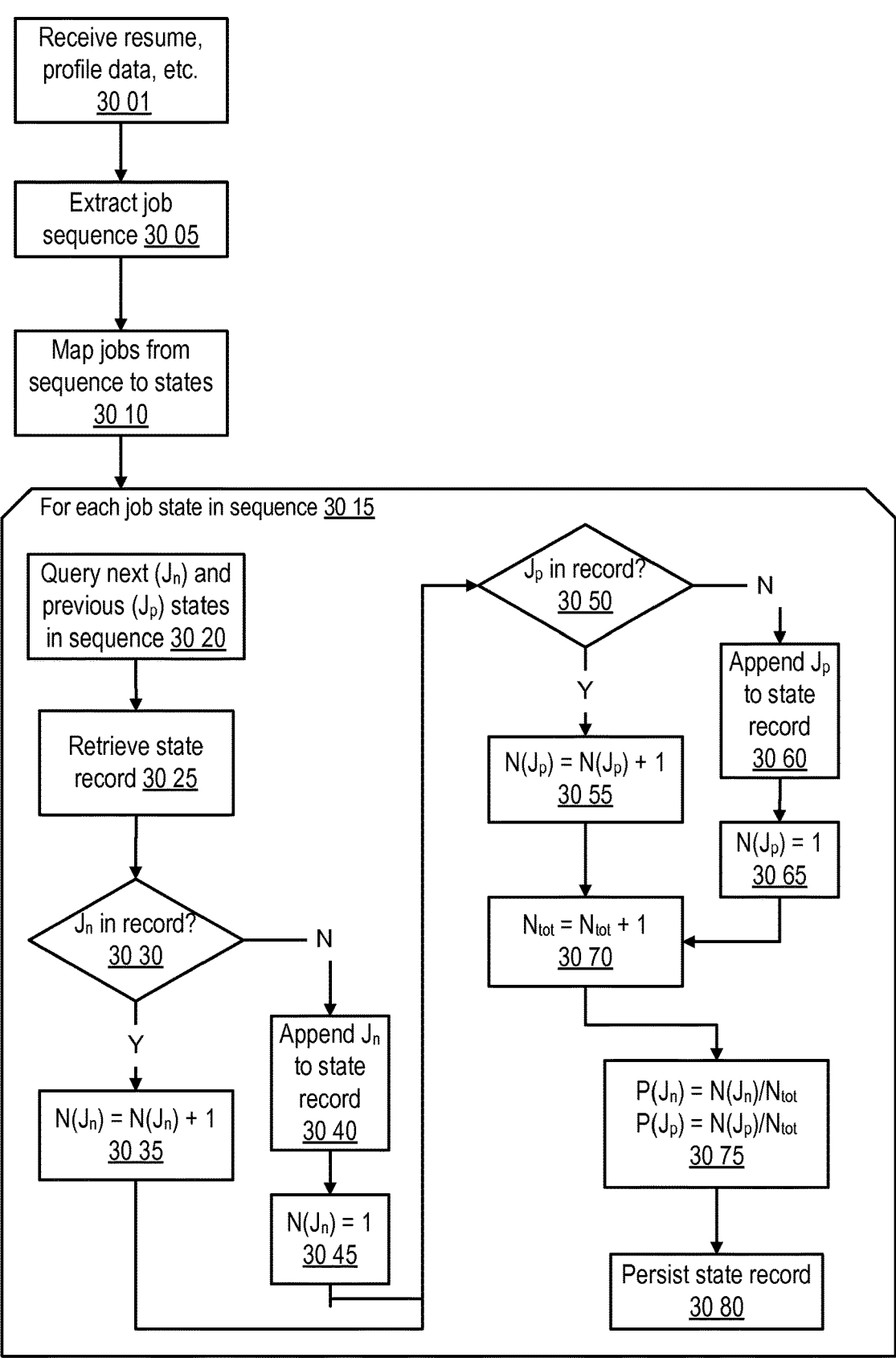
FIG. 30 shows an implementation of logic flow for development of a path-independent statistical model in one embodiment of CSE operation.

FIG. 30 shows an implementation of logic flow for development of a path-independent statistical model in one embodiment of CSE operation. In one embodiment, a path-independent statistical model may comprise a collection of job states, each having corresponding probabilities for most likely next and previous job states, wherein the probabilities depend only on the job state itself and not on any prior history of job states. A resume, profile data, and/or the like may be received at 3001, such as from a resume database, and a job and/or other work experience sequence extracted therefrom 3005. Jobs from that sequence may be mapped to corresponding states in a CSE state model 3010, such as according to the embodiments described in FIGS. 27A-D. Then, for each job state in the sequence 3015, the CSE may query a next job state ($J_n$) and a previous job state ($J_p$) in the sequence 3020, where a null state may be set to $J_p$ for the first state in the sequence and to $J_n$ for the last state in the sequence. A state record corresponding to the current state under consideration (3015) may be retrieved 3025, such as from a CSE state model, and a determination may be made as to whether $J_n$ exists in the state record 3030. For example, the CSE may seek $J_n$ in a listing of common next job states corresponding to the given job state. If $J_n$ does exist in the record, then a number of occurrences, $N(J_n)$, of $J_n$ as a next state for the state under consideration may be incremented 3035. Otherwise, $J_n$ may be appended to the listing of next states for the state under consideration 3040 and a value for the number of occurrences of $J_n$ initialized 3045.

The CSE may also determine whether $J_p$ exists in the state record, such as in a listing of common previous job states corresponding to the state under consideration 3050. If so, then a number of occurrences, $N(J_p)$, of $J_p$ as a previous state for the state under consideration may be incremented 3055. Otherwise, $J_p$ may be appended to the listing of previous states for the state under consideration 3060 and a value for the number of occurrences of $J_p$ initialized 3065. The CSE may then increment a total number, $N_{tot}$, associated with the number of resumes used to update the particular state entry of the path-independent statistical model 3070. The CSE may then determine probabilities corresponding to $J_p$ and $J_n$ by dividing $N(J_p)$ and $N(J_n)$ each respectively by $N_{tot}$ 3075. These probabilities may, for example, provide an indication to job seekers of the likelihood of changing to or from a job from another job, based on the accumulated resume records of other job seekers who have held those jobs. The state record with the updated probability values may be persisted at 3080, such as by being stored in a database.

FIG. 31 shows an implementation of a path-independent state model data record in one embodiment of CSE operation. The data record in FIG. 31 may, for example be generated and/or updated by the logic flow shown in FIG. 30. The data record may, in one implementation, correspond to a unique job state in the CSE state model, indexed by a state ID 801. A listing of next states 3105 may include a plurality of states and corresponding probabilities 3110, such as may be determined according to the logic in FIG. 30. Similarly, the data record may include a listing of previous states 3115 comprising states and corresponding probabilities 3120. Additional data associated with the state may be stored in the state record 3125, such as but not limited to a total number of resumes analyzed for the state in question, a confidence metric describing confidence in and/or reliability of the probabilities in 3110 and/or 3120, state job titles, state topics, and/or the like.

Figure 32:
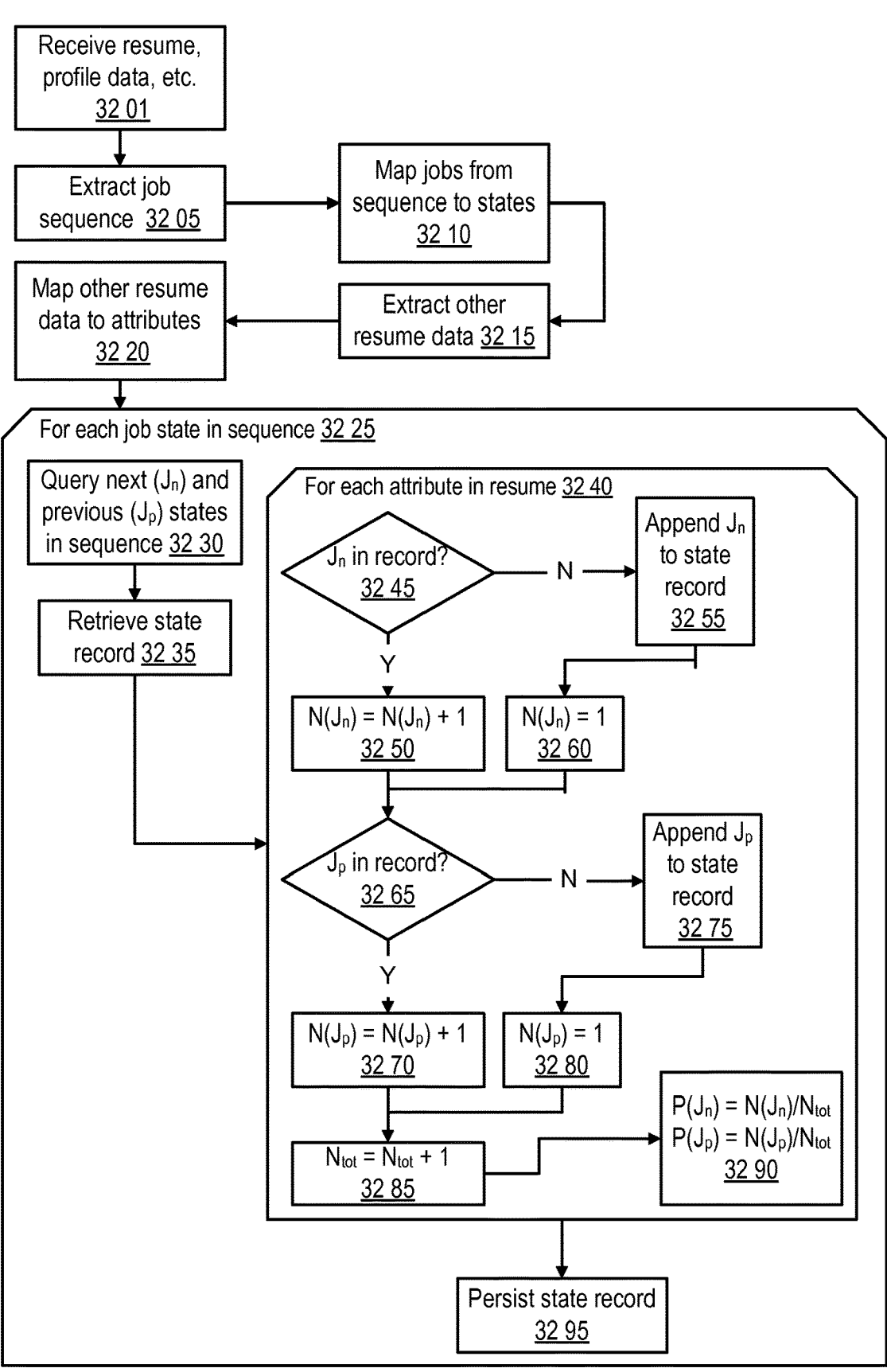
FIG. 32 shows an implementation of logic flow for development of a path-independent statistical model with attributes in one embodiment of CSE operation.

FIG. 32 shows an implementation of logic flow for development of a path-independent statistical model with attributes in one embodiment of CSE operation. In one embodiment, a path-independent statistical model with attributes may comprise a collection of job states, each having corresponding probabilities for most likely next and previous job states, wherein the probabilities depend on the job state itself and on the identity of one or more associated attributes, but not on any prior history of job states. Resume and/or profile data may be received at 3201, and a job experience sequence may be extracted therefrom 3205. Jobs from the job sequence may then be mapped to CSE state model job states at 3210, such as according to the embodiments described in FIGS. 27A-D. The CSE may also extract additional resume data 3215, such as but not limited to education levels, schools attended, awards and/or honors, skills, languages spoken, number of years of experience, salary levels, certifications and/or licenses possessed, and/or the like. The additional resume data may be mapped to attribute states in the CSE state and/or attribute model 3220, such as in a manner similar to mapping of job sequence listings to job states. Then, for each state in the sequence of job states 3225, the CSE may query the next job state ($J_n$) and previous job state ($J_p$) in the sequence 3230, with a null state assigned to $J_n$ for the last state of the sequence and to $J_p$ for the first state of the sequence. The CSE may also retrieve the state record for the current state 3235.

Then, for each attribute in the resume 3240, the CSE may determine whether $J_n$ exists in the state record in correspondence with that attribute 3245, such as in a listing of common next job states corresponding to the state and attribute under consideration. If so, then a number of occurrences, $N(J_n)$, of $J_n$ as a next state for the state and attribute under consideration may be incremented 3250. Otherwise, $J_n$ may be appended to the state record in association with the particular attribute 3255 and a value for the number of occurrences of $J_n$ initialized 3260. A determination may then be made as to whether $J_p$ exists in the state record in correspondence with the attribute under consideration 3265. If so, then the number of occurrences, $N(J_P)$, of $J_p$ as a previous state for the state and attribute under consideration may be incremented 3270. Otherwise, $J_p$ may be appended to the state record in association with the particular attribute 3275 and a value for the number of occurrences of $J_p$ initialized 3280. A total number of instances may then be incremented 3285, and probabilities for $J_n$ and $J_p$, corresponding to the proportion of resumes having the attribute under consideration and those job states respectively before and after the job state under consideration, may be determined as the ratio of each of $N(J_n)$ and $N(J_P)$ with $N_{tot}$ 3290. The state record, with updated probability values, may then be persisted at 3295, such as by storing the record as part of a CSE state model in a database.

Figure 33:
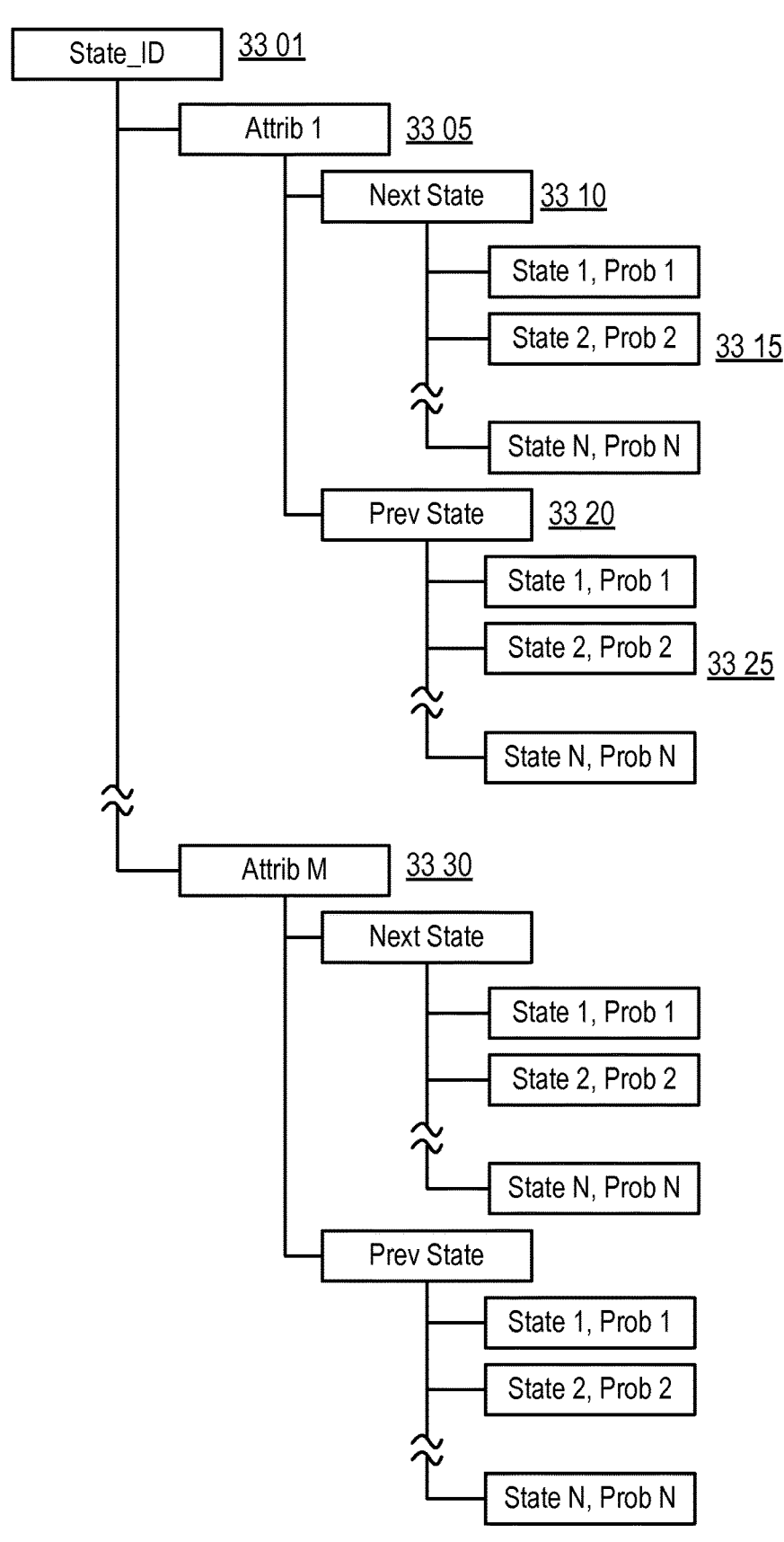
FIG. 33 shows an implementation of a path-independent model with attributes data record in one embodiment of CSE operation.

FIG. 33 shows an implementation of a path-independent model with attributes data record in one embodiment of CSE operation. The data record in FIG. 33 may, in one implementation, be generated by a method similar to that shown in FIG. 32. The record, corresponding to a particular job state, may be identified by a unique state ID 3301, and may further include a plurality of attributes (3305, 3330). Each attribute, in turn, may include listings of next states 3310 and of previous states 3320, states comprising states and associated probabilities (3315, 3325), such as may be determined by the method described in FIG. 32. In one embodiment, a hierarchy of states may be generated by traversal of interconnected state structures.

Figure 34:
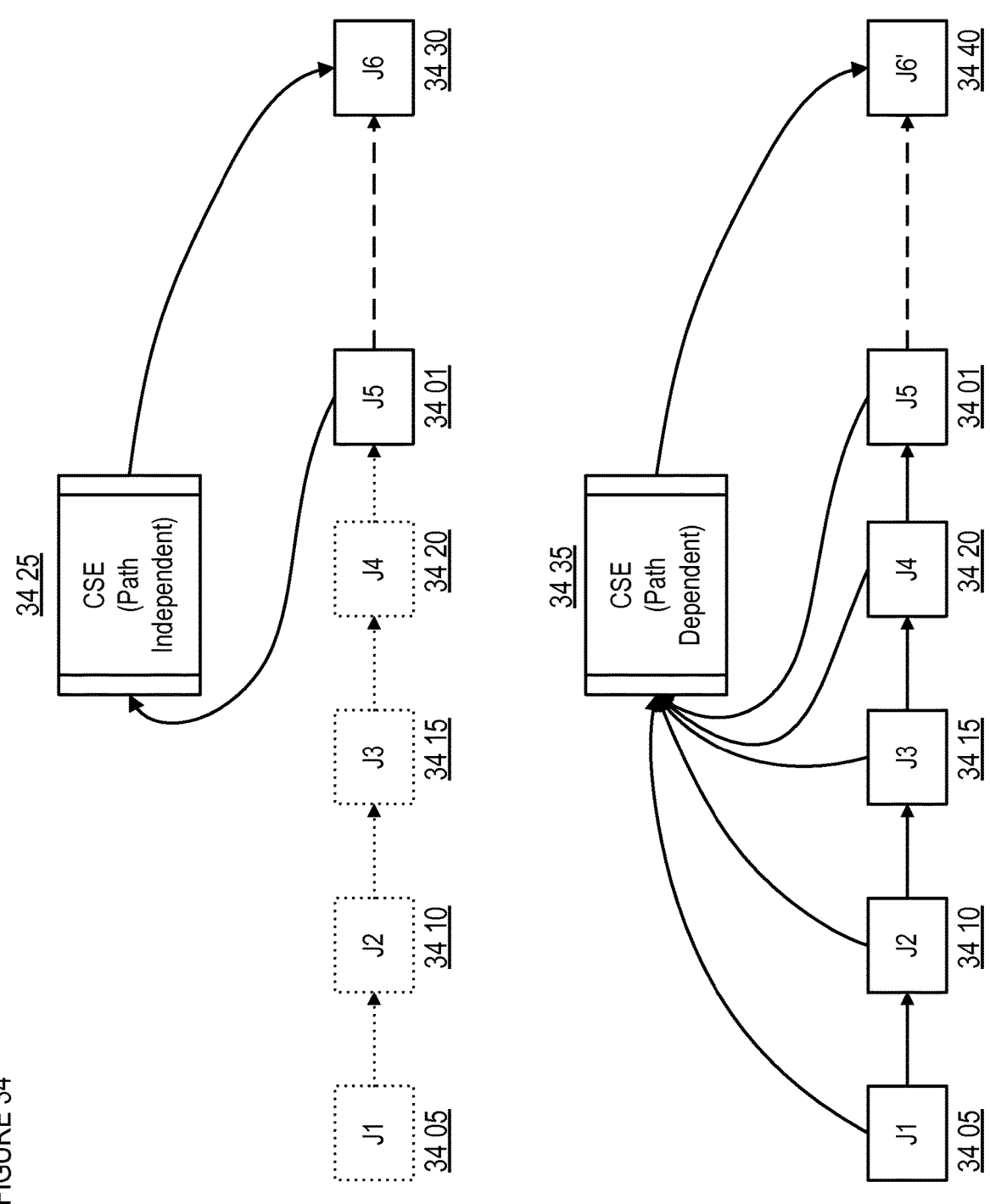
FIG. 34 shows an illustration of career path modeling using path-independent and path-dependent statistical models in one embodiment of CSE operation.

FIG. 34 shows an illustration of career path modeling using path-independent and path-dependent statistical models in one embodiment of CSE operation. The CSE may, in some embodiments, operate to take one or more job inputs and return a job output, wherein the job output comprises a prediction of a most likely next job and/or otherwise statistically noteworthy result based on the inputs. In FIG. 34, a user may provide an experience sequence comprising five jobs (Ji 3405, J2, 3410, J3 3415, J4 3420, J5 3401) as inputs to the CSE. In one embodiment, the CSE comprises a path-independent model 3425 that may generate an output job state J6 3430 based only on a single job state (e.g., J5 3401). In an alternative embodiment, the CSE comprises a path-dependent model 3435 that takes multiple jobs as inputs (J1 3405, J2, 3410, J3 3415, J4 3420, J5 3401) to generate and return an output job state J6 3440. The embodiments described in FIGS. 30-33 are directed to generation of the path-independent CSE state model.

Figure 35:
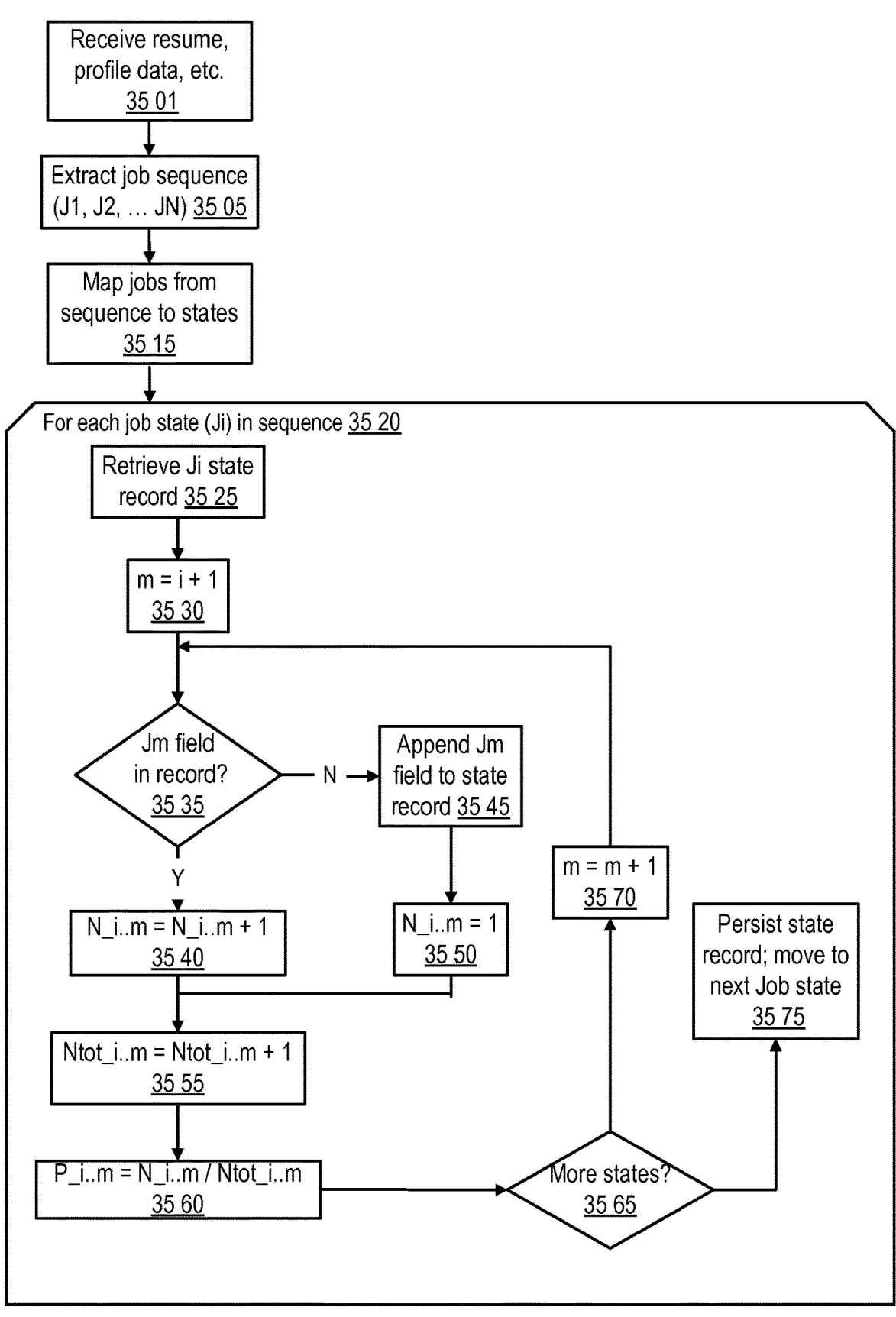
FIG. 35 shows an implementation of logic flow for development of a path-dependent statistical model in one embodiment of CSE operation.

FIG. 35 shows an implementation of logic flow for development of a path-dependent statistical model in one embodiment of CSE operation. In one embodiment, a path-dependent statistical model may comprise a collection of job states, each having corresponding probabilities for most likely next and previous job states, wherein the probabilities depend on the history of jobs leading up to the most recent job state. Though FIG. 35 is directed to an implementation bereft of attribute consideration, it should be recognized that aspects of FIGS. 32-33 could be incorporated to yield an attribute-sensitive, path-dependent state model. The CSE may receive resume data, profile data, and/or the like, such as from a resume database, at 3501, and extract a job sequence comprising a plurality of jobs (Ji, J2, . . . , JN) therefrom 3505 which may subsequently be mapped to a sequence of job states. Then, for each state (Ji) in the sequence 3520, the CSE may retrieve a state record corresponding to state Ji 3525 and set an indexing variable, m, equal to i+i 3530. A determination may then be made as to whether a field corresponding to the state $J_m$ exists in the Ji state record 3535. If so, then a number of occurrences, Ni . . . $_m$ of that sequence of job states (Ji to $J_m$), is incremented 3540. Otherwise, the $J_m$ field is appended to the state record 3545, and the value of a number of occurrences corresponding to the job sequence is initialized 3550. A total number, Ntoti . . . $_m$, of instances (e.g., the number of resumes analyzed) may then be incremented 3555, and a probability for the sequence determined by dividing the number of occurrences of the job sequence by the total number of instances 3560. A determination may then be made as to whether there are more states to analyze in the job sequence 3565. If so, the indexing variable m is incremented 3570, and the CSE returns to 3535. Otherwise, when all states in the sequence are exhausted, the Ji state record is persisted, and the CSE moves to the next job state at 3520 (e.g., by incrementing i) 3575.

To further illustrate the embodiment described in FIG. 35, the following example may be considered. A resume may include a work experience history comprising a sequence of three jobs: Ji, J2 and J3. The logic in FIG. 35 would first update a CSE state model based on the job sequence Ji to J2, specifically updating the probability associated with J2 in a Ji state record. Next, the CSE state model would update a probability associated with J2 to J3 in the Ji state record. Then, the CSE state model would retrieve the J2 state model and update a probability associated with J3 therein. In this manner, the CSE state model will contain information pertaining to probabilities of all the sequences and sub-sequences of the work experience listings in the resumes that it analyzes (in this exemplary case, those sequences and sub-sequences are: Ji, J2; Ji, J2, J3; and J2, J3).

Figure 36:
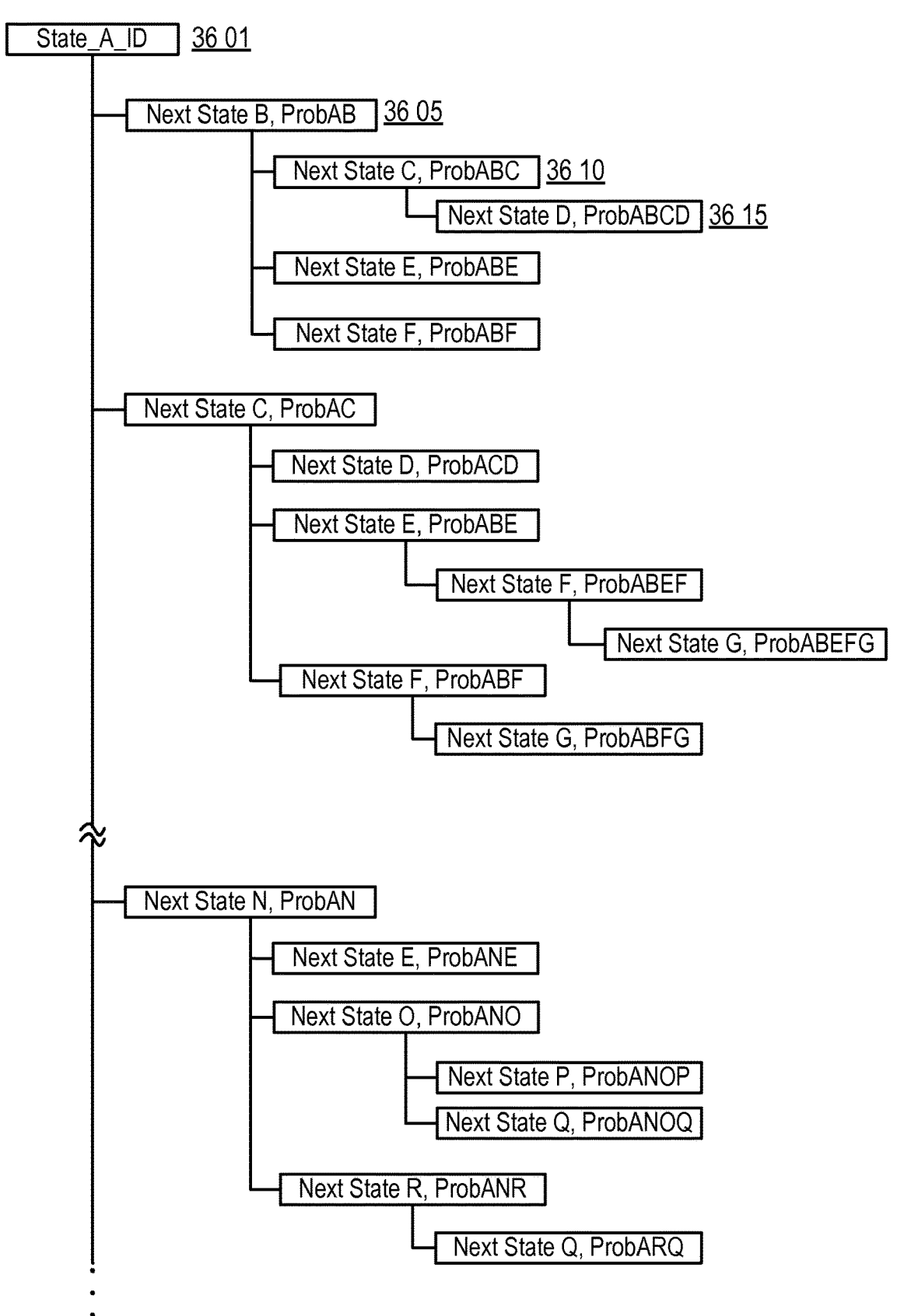
FIG. 36 shows an implementation of a path-dependent statistical model data record in one embodiment of CSE operation.

FIG. 36 shows an implementation of a path-dependent statistical model data record in one embodiment of CSE operation. The state data record shown in FIG. 36 may, in one implementation, be generated by a logic flow similar to that shown in FIG. 35. The state, here labeled A, to which the data record corresponds may be identified by a state record identifier 3601. The state record may further include a second tier of "next job" states, each characterized by at least a state identifier and a probability 3605. For example, in FIG. 36, a next state is labeled B and has a probability labeled AB corresponding to the proportion of resumes analyzed wherein an individual having job A moved to job B. Under each of the second tier states, there may further exist third tier states 3610, fourth tier states 3615, etc., each including at least a state identifier and a probability associated with the sequence leading to the current state from each state in the higher tiers. For example, in FIG. 36, the state labeled D at the fourth tier shown at 3615 is associated with a probability labeled ABCD that characterizes the proportion of resumes wherein an individual had the sequence of jobs A, B, Cand D.

Figure 37A:
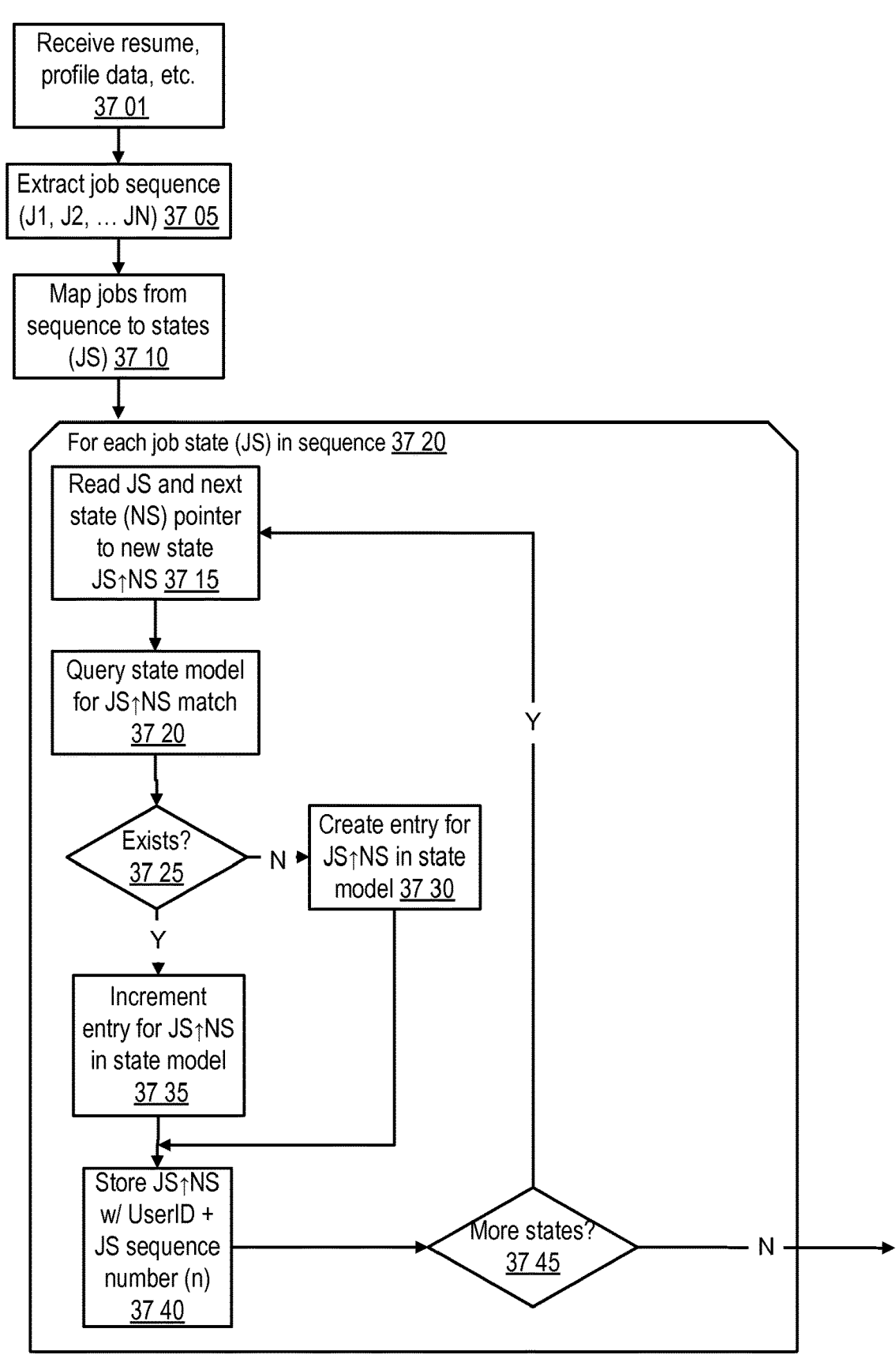

FIGS. 37A-B show an implementation of logic flow for development and of a path-dependent statistical model in another embodiment of CSE operation. Models similar to that shown in FIGS. 37A-B may, in some implementations, include a two-stage method, the first comprising a setup stage wherein the model is established as a collection of job state couplets (FIG. 37A), and the second comprising an application of the model to a specific job sequence and/or target job state to yield a target job state probability (FIG. 37B). Resume data, profile data, and/or the like is received at 3701 and a job sequence (Ji, J2, . . . , JN) is extracted 3705. The job sequence may then be converted into corresponding job states (JS) 3710, such as according to the embodiments described in FIGS. 27A-D. Then, for each JS in the sequence 3720, the CSE may read the JS and the next state (NS) in the sequence to establish a couplet comprising a pointer between JS and NS 3715. The state model may then be queried 3720 to determine whether a match exists to the JS/NS couplet 3725. If not, then an entry may be created in the state model corresponding to the couplet 3730 or, if so, then the number of instances for that couplet's may be incremented 3735. The couplet entry may be stored 3740 in association with a user ID, resume ID, and/or other identifier associated with the resume from 3701, as well as with a JS sequence number (n), associated with the position of JS in the job sequence from 3705. A determination may then be made as to whether additional states exist in the sequence 3745 and, if so, the CSE may return to 3715 to analyze the next sequence state.

FIG. 37B illustrates an implementation of logic flow for application of the state model to obtain a probability associated with a given target job state given a sequence of past job states, in one embodiment of CSE operation. The target job state is obtained at 3750, and the sequence of past job states, comprising a plurality of couplets $1s$ of job state and next state, is entered 3755. Then, for each couplet or pair, the state model may be searched 3757 to obtain matching pairs 3759. The CSE may then apply a filter to extract desired and/or relevant matches. For example, the CSE may query the CSE 3761 to obtain results 3763 out of the matching pairs from 3759 that have common associated User IDs across pairs. For example, the CSE may have found pairs (A, B) and (B, C) at 3757-3759, corresponding to jobs A, B and C. To establish that the sequence A to B to C exists for any specific users, the CSE could then seek common user IDs existing in both the (A, B) and (B, C) records.

The CSE may also want to ensure that the sequence exists in the proper order. For example, if a common user ID exists in the (A, B) and (B, C) records, this does not necessarily imply that a user has the specific job sequence A to B to C in their resume and/or profile data. The user may, instead, have a sequence such as B to C to A to B. The CSE may, therefore, query results for proper JS chain sequence ordering 3765, such as may be based on the JS sequence number (n) stored at 3740.

The CSE may thus obtain 3767 and count 3769 the non-targeted results, that is the single-resume job sequence matches to the JS existing chain from 3755, but not including the target state from 3750. The CSE may then search the state model 3771 to obtain "goal results" 3773 comprising couplets of the last state in the JS existing chain with the target state. A filter process similar to that shown at 3761-3765 may then be applied to the sequence comprising the non-targeted results plus the goal results 3775. The number of filtered goal results are counted 3777 and the ratio of the number of goal results to the number of targeted results may be computed 3779, stored, and/or the like. This ratio may be interpreted as the proportion of analyzed resumes having the sequence of jobs corresponding to the JS existing chain from 3755 leading into the target job state from 3750.

APT

Figure 38:
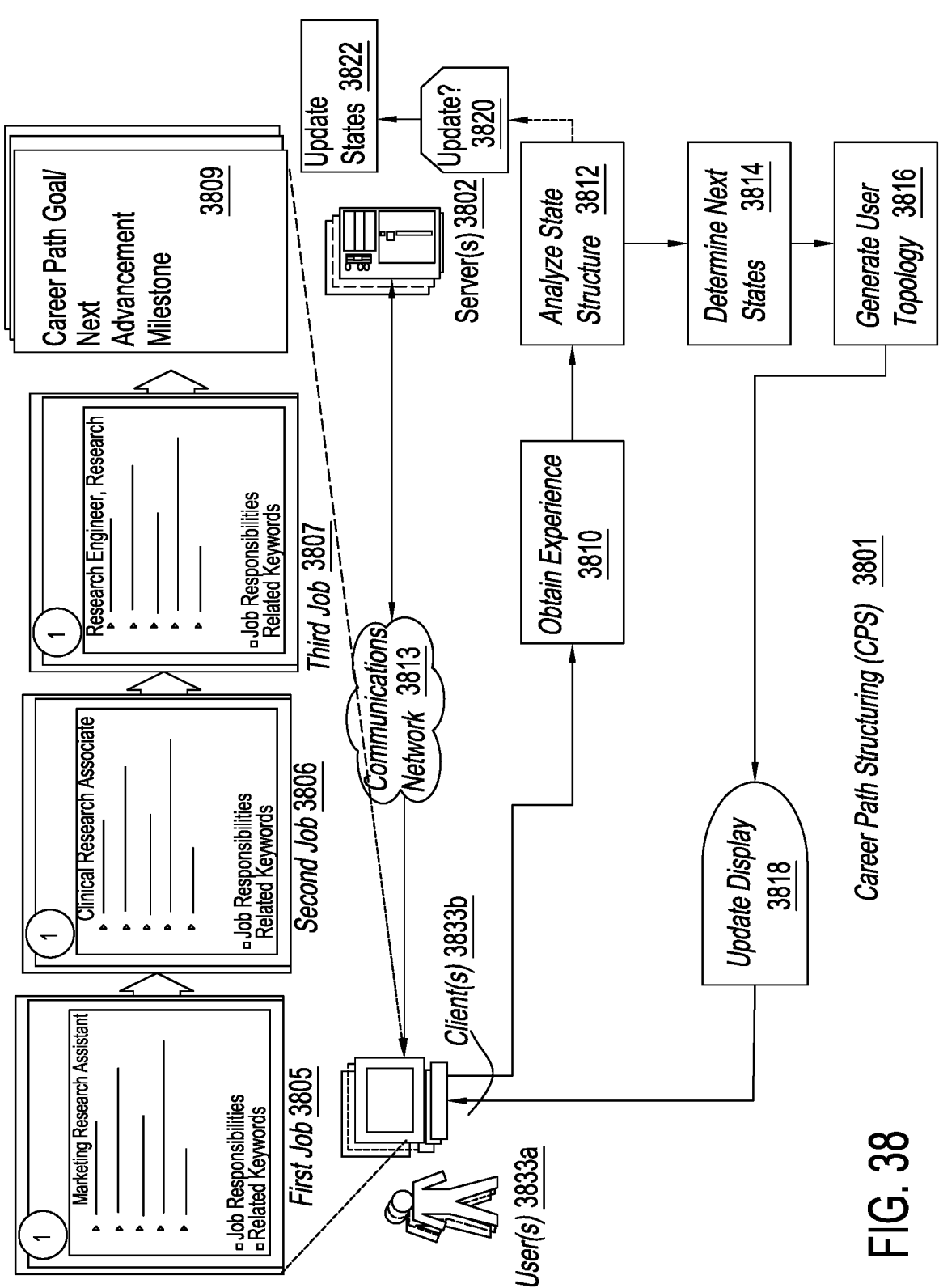
FIG. 38 is of a mixed block, data and logic flow diagram illustrating embodiments of the APPARATUSES, METHODS AND SYSTEMS FOR ADVANCEMENTPATH TAXONOMY (hereinafter "APT")

FIG. 38 is of a mixed block, data and logic flow diagram illustrating embodiments of APPARATUSES, METHODS AND SYSTEMS FOR ADVANCEMENT PATH TAXONOMY (hereinafter "APT"). From a high level, the APT 3801 allows users (e.g., advancement "seekers") 3833a to interact with APT servers 3802 through interfaces on their client(s) 3833b across a communications network 3813. Although the following discussion will frequently use examples of seekers wishing to advance their careers, it should be noted, that such seekers may similarly use the APT to advance their educational achievement, their financial goals, and/or the like. To that end, seekers 3833a may provide 3833b relevant (e.g., job) experiences they have had leading up to their current desire to seek advancement beyond their past and current experiences 3805, 3806, 3807 (hereinafter "experience information") to the APT. Similarly, seekers 3833a may provide 3833b targeted advancement milestones, objectives and/or goals (hereinafter "advancement information" or "target information") to the APT. In turn, the APT 3801 may obtain that advancement experience information 3810 and use that information 3802 to provide the seeker with next states in their advancement goals 3809.

Upon obtaining the user advancement experience information 3810, the APT may analyze the experience information (e.g., and perhaps other information associated with the user found in the user's profile) against a state structure 3812. By analyzing the advancement seeker's experiences and goals against a statistical state structure, the APT may determine what next states 3814 may form the advancement seeker's next advancement milestone(s) and/or paths to their desired milestones and/or advancement goals 3809. It should be noted that in one embodiment, the state structure may take the form of generated by the CSE. In one embodiment, the state structure is stored in APT state structure database table(s); as such, the state structure may be queried with advancement experience information, advancement information, experience information, state identifier (e.g., state_ID), proximate state identifier (e.g., next_state_ID), topics/terms, topic_ID, and/or the like. When queried, the state structure may return state records (i.e., states) that best match the query select commands, and those states may themselves further refer to other proximate states; where the proximate sates are related advancement states (hereinafter "adjacent state," "advancement state," "next state," "proximate state," "related state," and/or the like) that may include likelihoods of moving from the state to the related advancement state. Upon determining what next states may form the advancement path and/or milestone for the seeker 3814, the APT may generate a user path topology showing the user their advancement path. This topology may be used to update the seeker's client 3833b display 3818 with an interactive (e.g., career) advancement path.

Figure 39:
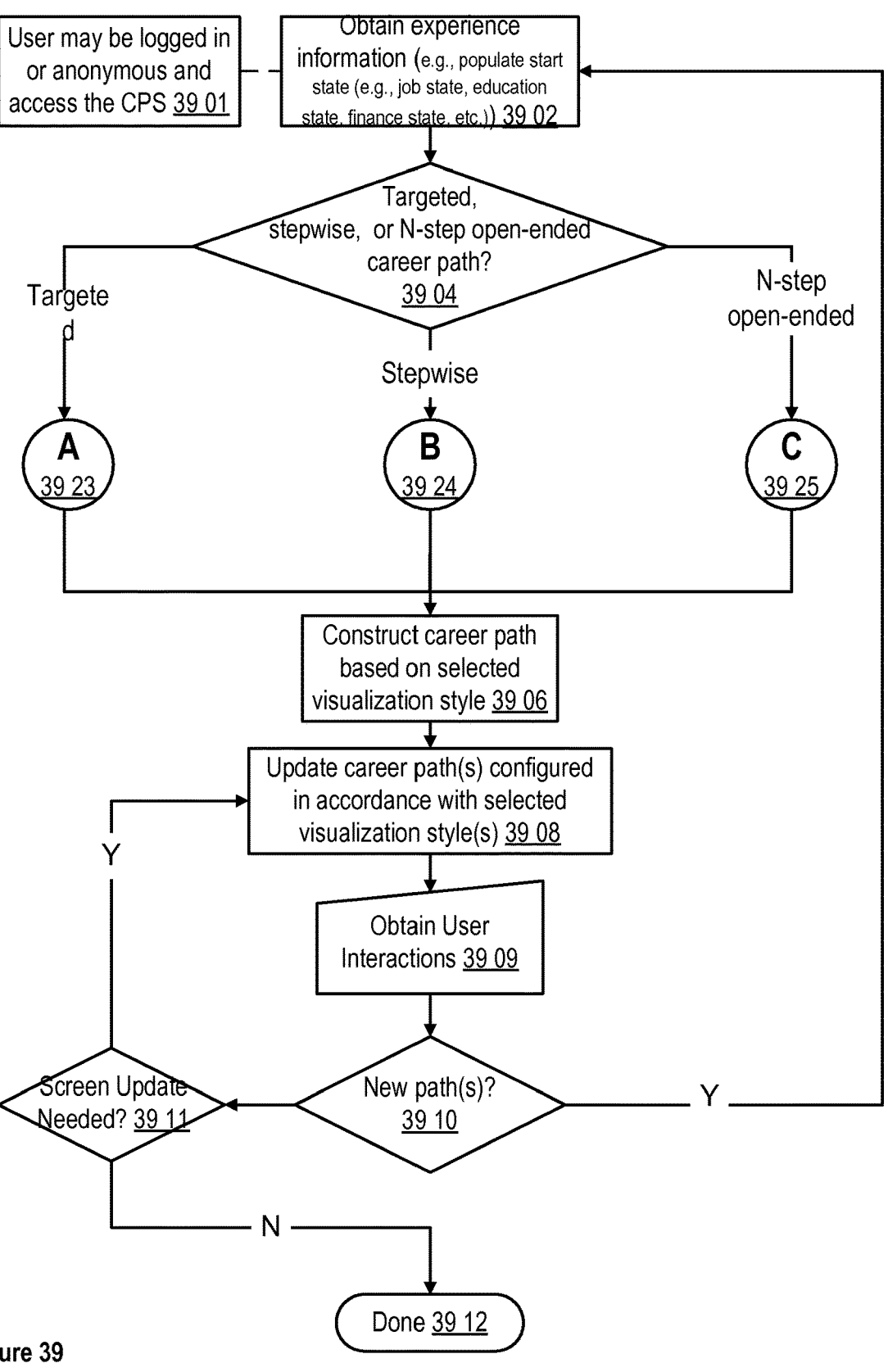
FIG. 39 is of a logic flow diagram illustrating embodiments of the APT.

FIG. 39 is of a logic flow diagram illustrating embodiments of the APT. A user need not be, but may be, logged in to an existing account to the APT to make use of its advancement pathing abilities 3901. In either case the user will engage the APT (for example, in a web embodiment of the APT); a user may engage the APT by navigating their web browser to an address referencing the APT's information server, which will act as an interface/gateway between the seeker and APT. It should be noted that a web interface is one of many interface and/or mechanisms by which the APT may be deployed and/or implemented; for example, in alternative embodiments the APT may be a stand alone application, a server messaging system that accepts inputs and provides outputs to disparate clients, etc. In accessing the APT 3901, the seeker may start to provide experience advancement information. The experience advancement information may include both desired advancement milestones and/or goals (although this is not required) and experience information, which includes experience the seeker already has. The experience information may be provided by way of submission of structured information via a web form, parsing submitted resume's (e.g., via attachment and/or uploading of a resume file), aggregating experience information in a profile over time, allowing the user to select a pre-existing state matching their own (e.g., letting them find a job/title/occupation matching their current occupation) in graph topology representing an hierarchical interconnected state structure (e.g., see 4705 of FIG. 47), and/or the like. In one example embodiment, the user may submit current work experience via web form, which may include: the dates of employment, the employer's name (e.g., employing company), seeker title/position, descriptive resume information about their employment, and/or the like 3902. In another embodiment, the seeker may submit experience information beyond their instant post that includes: previous positions, their educational background, and/or the like 3902. In addition, the seeker may similarly provide their advancement information. For example, the seeker may provide that they currently have the title of Retail Administrator, without more, and see what are the next most likely career path opportunities from that role, without having any explicit advancement goal. However, should the seeker also provide a milestone and/or goal, e.g., Manager of a retail chain, then the APT will construct paths and experiential states that show the seeker's the different routes by which the seeker may advance to their desired milestone/goal. It should be noted that build/find path facilities that are described are not exclusive mechanisms for building paths, and browsing through the topology is also supported as will be detailed in further figures.

Figure 41:
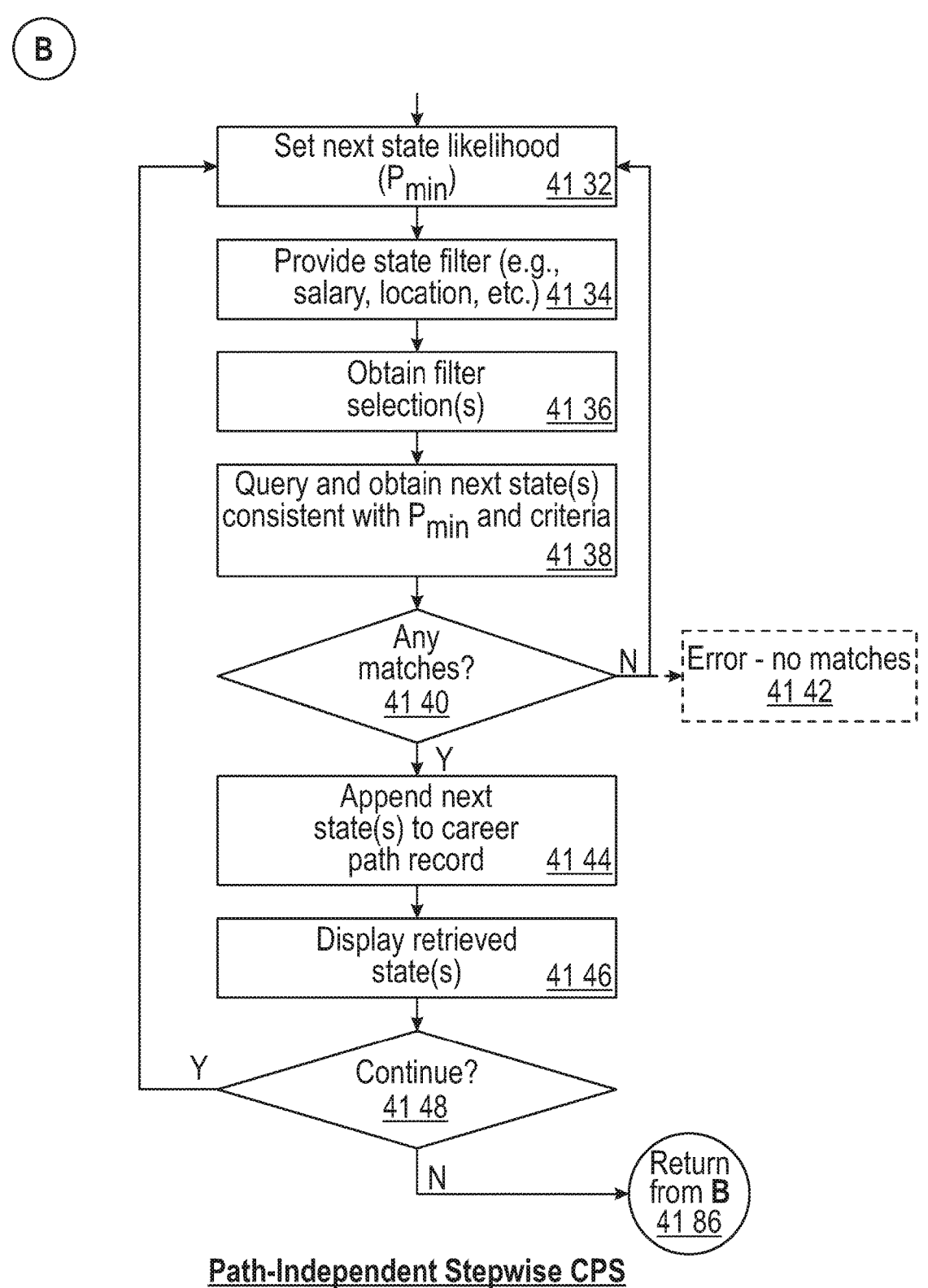
FIG. 41 is of a logic flow diagram illustrating iteration-wise path-independent path construction embodiments of the APT.
Figure 42:
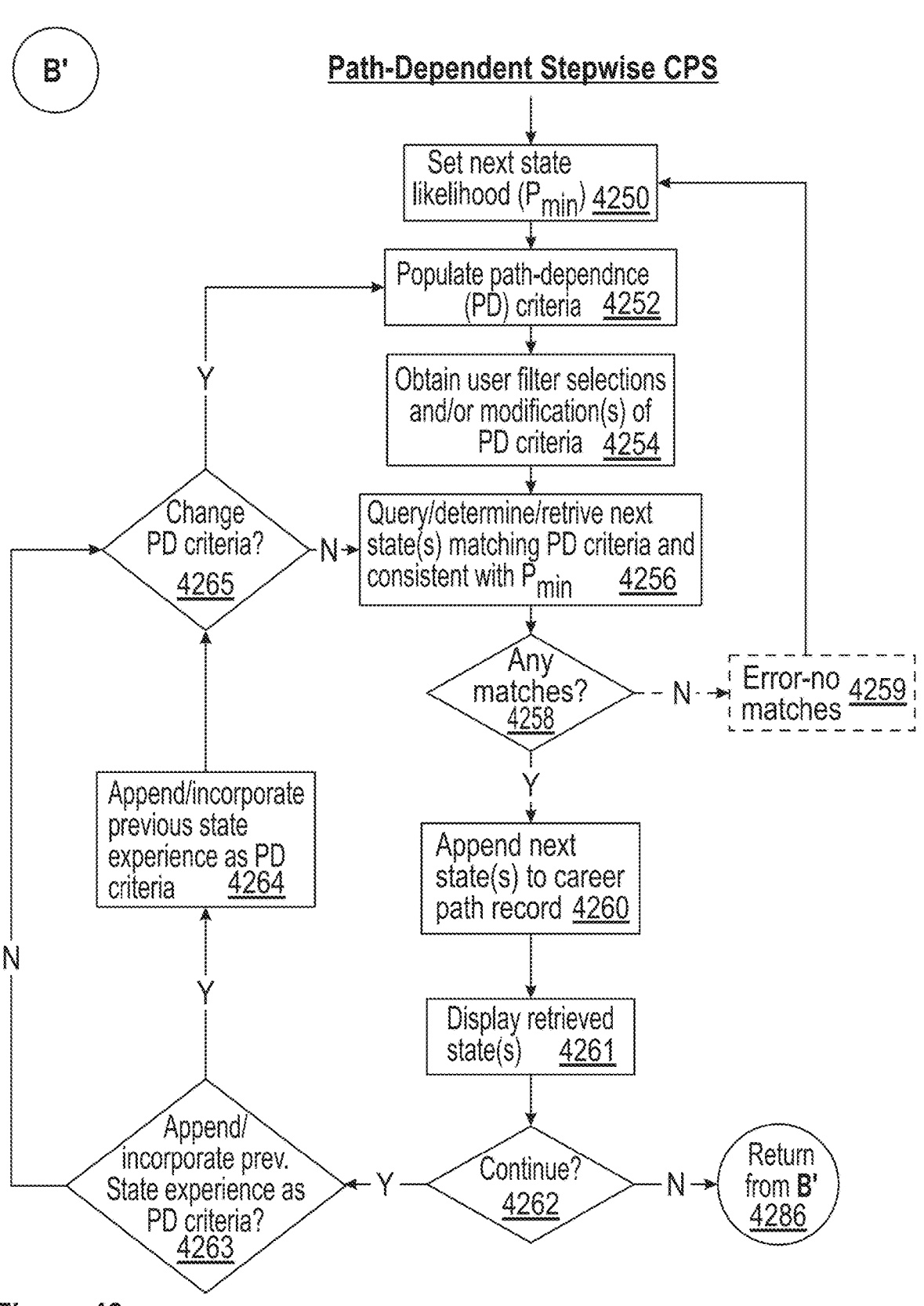
FIG. 42 is of a logic flow diagram illustrating iteration-wise path-dependent path construction embodiments of the APT.

Depending on the information supplied by the seeker and the seeker's desire to see advancement path variations, the APT may provide at least three different types of advancement path analysis 3904: targeted paths 3923 (see FIG. 40 for examples), iteration-wise paths 3924 (see FIG. 41 for examples), and N-part open-ended paths 3925 (see FIG. 42 for examples). Upon obtaining selections from a seeker for one of the types of analysis 3904, or upon making a determination that the seeker provided advancement experience information best suitable for only one of the types of analysis 3904, and upon performing the respective analysis 3923, 3924, 3925, the APT will construct an advancement path based on the seeker's advancement experience information and present it based on a selected visualization style 3906. The visual style may be selected by the seeker from a set of visualization template styles, or selected by the APT and/or administrator.

Upon applying the visualization style to the determined advancement path 3906, this visualization of the advancement path is provided to the client for display 3908. It should be noted that, e.g., career, advancement paths may be stored and shared as between users. In one embodiment, regardless of how the path is determined. The seeker may then interact with the visualized path and the APT may obtain the user interactions 3909. The APT may then determine if any of the user interactions provided new experience information, advancement information, or modifications to the constructed path such that new paths need to be generated 3910. If the interactions are such that require providing more information 3910 then the seeker is allowed to again provide more advancement experience information or otherwise modify factors affecting the generated path 3902. Otherwise 3910, the APT will determine if the user interactions 3909 require that the display is updated 3911. If the user modified or provided inputs, indicia and/or otherwise operated on path objects or values that require that the path visualization and/or screen is updated, the data obtained from the user interactions 3909 is then used by the APT to effect updates the career path display 3908. Otherwise, the APT may conclude 3912 and/or wait for further interactions.

Path-Independent Targeted APT

Figure 40:
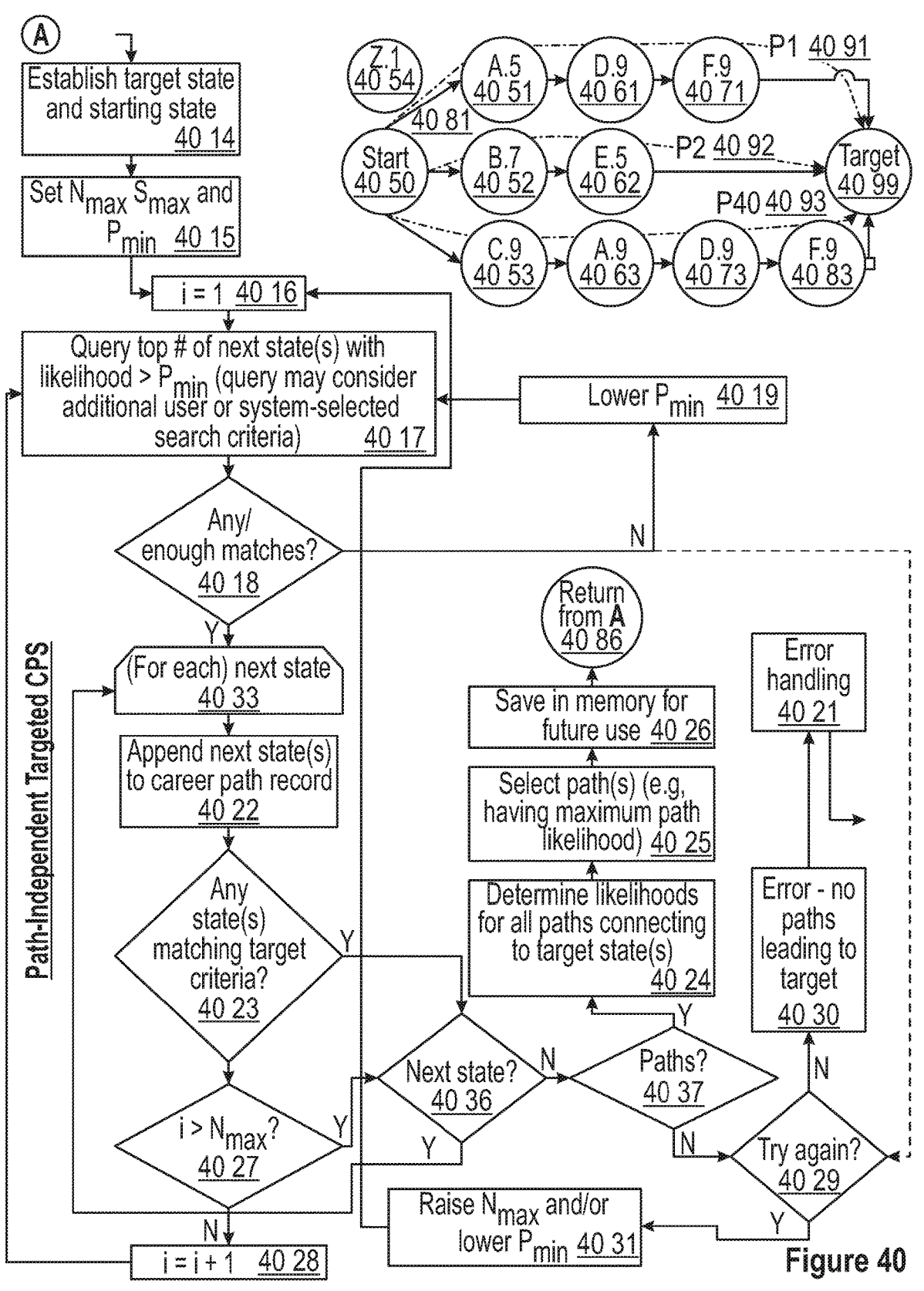
FIG. 40 is of a logic flow diagram illustrating path-independent (i.e., targeted) path construction embodiments of the APT.

FIG. 40 is of a logic flow diagram illustrating path-independent (i.e., targeted) path construction embodiments for the APT. It should be noted that FIGS. 41, 42, 43 and 44 offer mechanisms that may supplement, alter, and/or otherwise provide embodiments alternative to FIG. 40. Upon obtaining seeker experience advancement information 3902 and determining that a targeted independent advancement path is desired 3904 of FIG. 39, the APT will use advancement experience information to establish a start state and a target state 4014.

Figure 47:
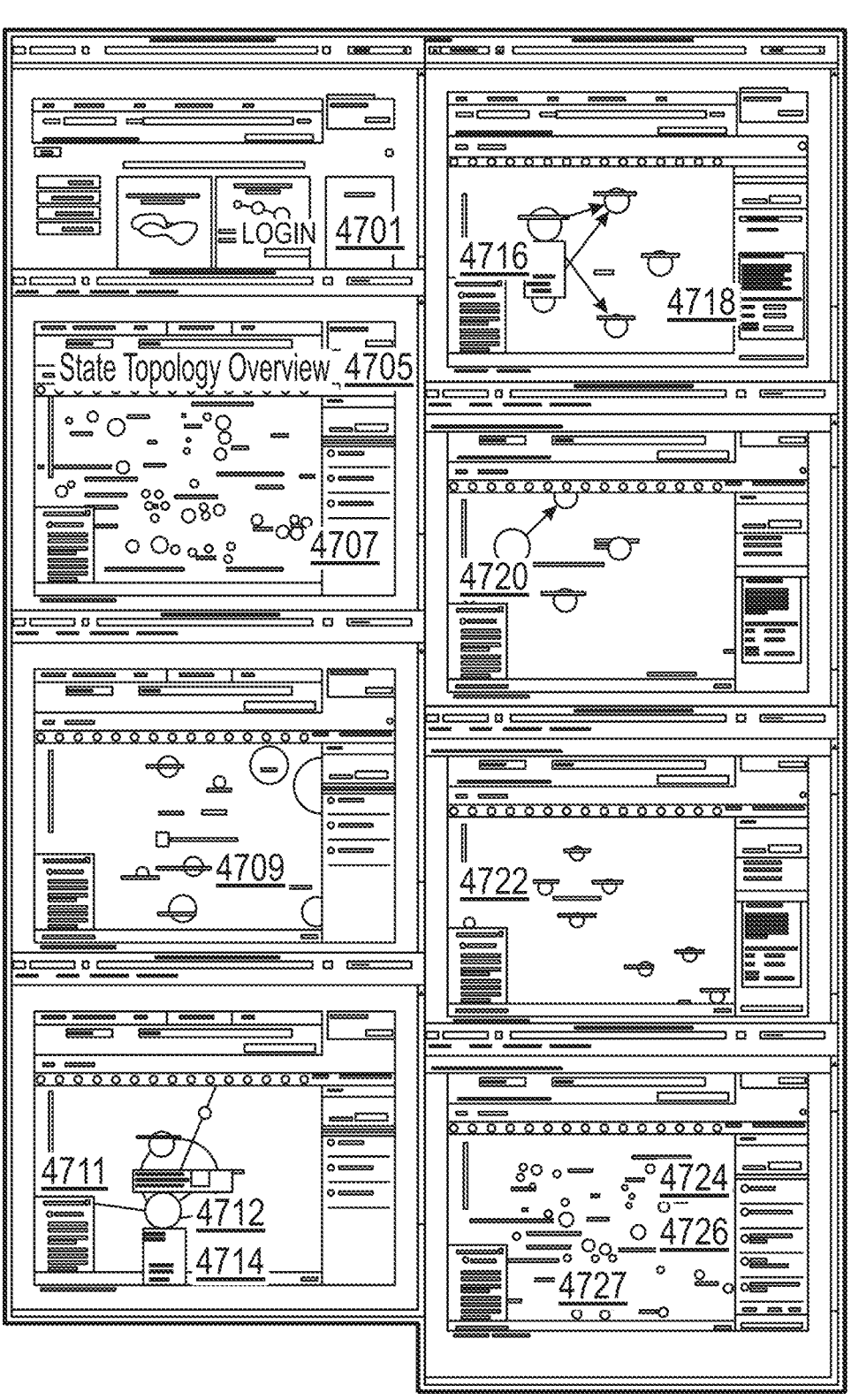
FIGS. 47, 48, 49 are of a screen shot diagram illustrating embodiments of the APT.
Figure 48:
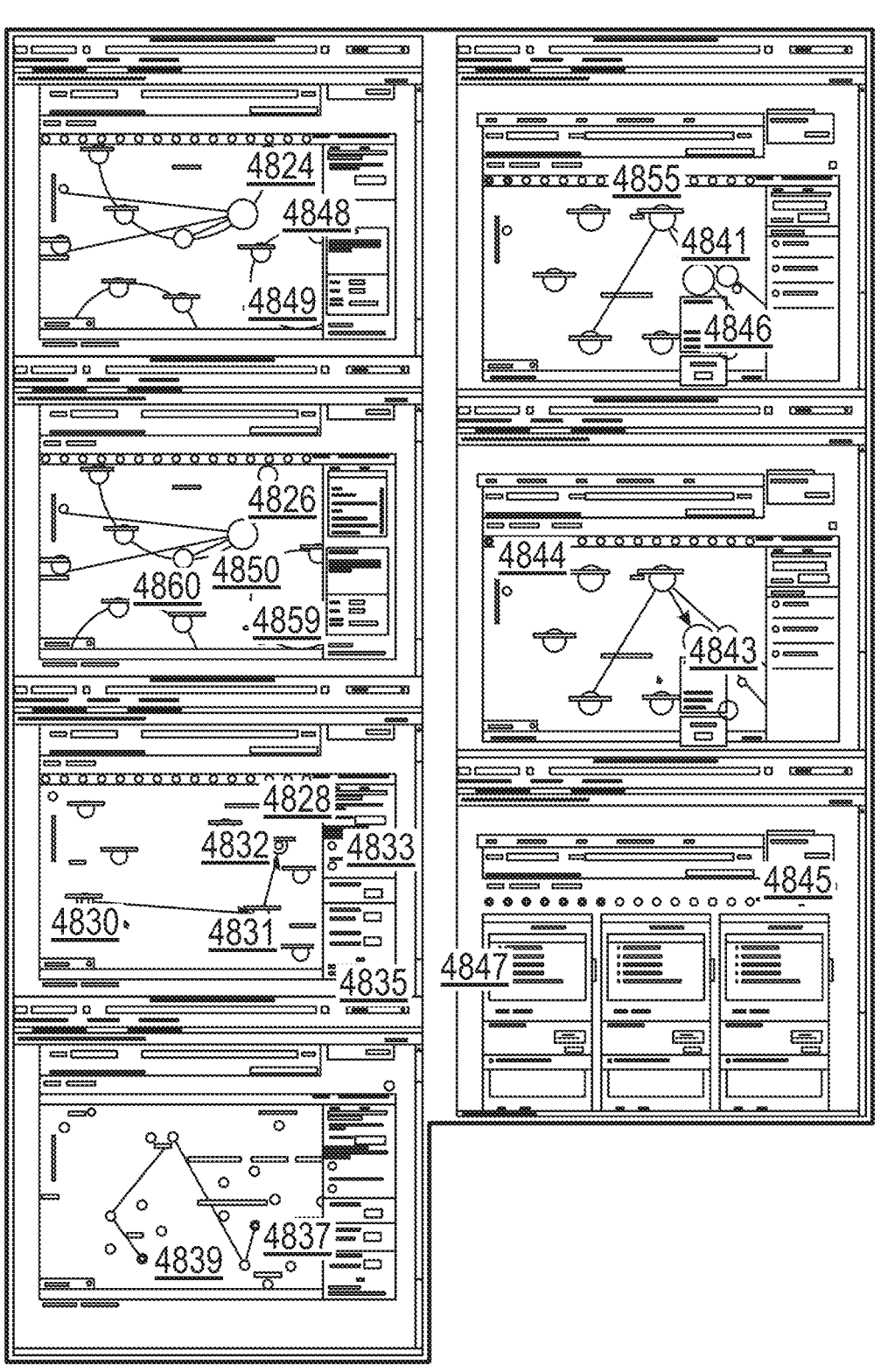
Figure 49:
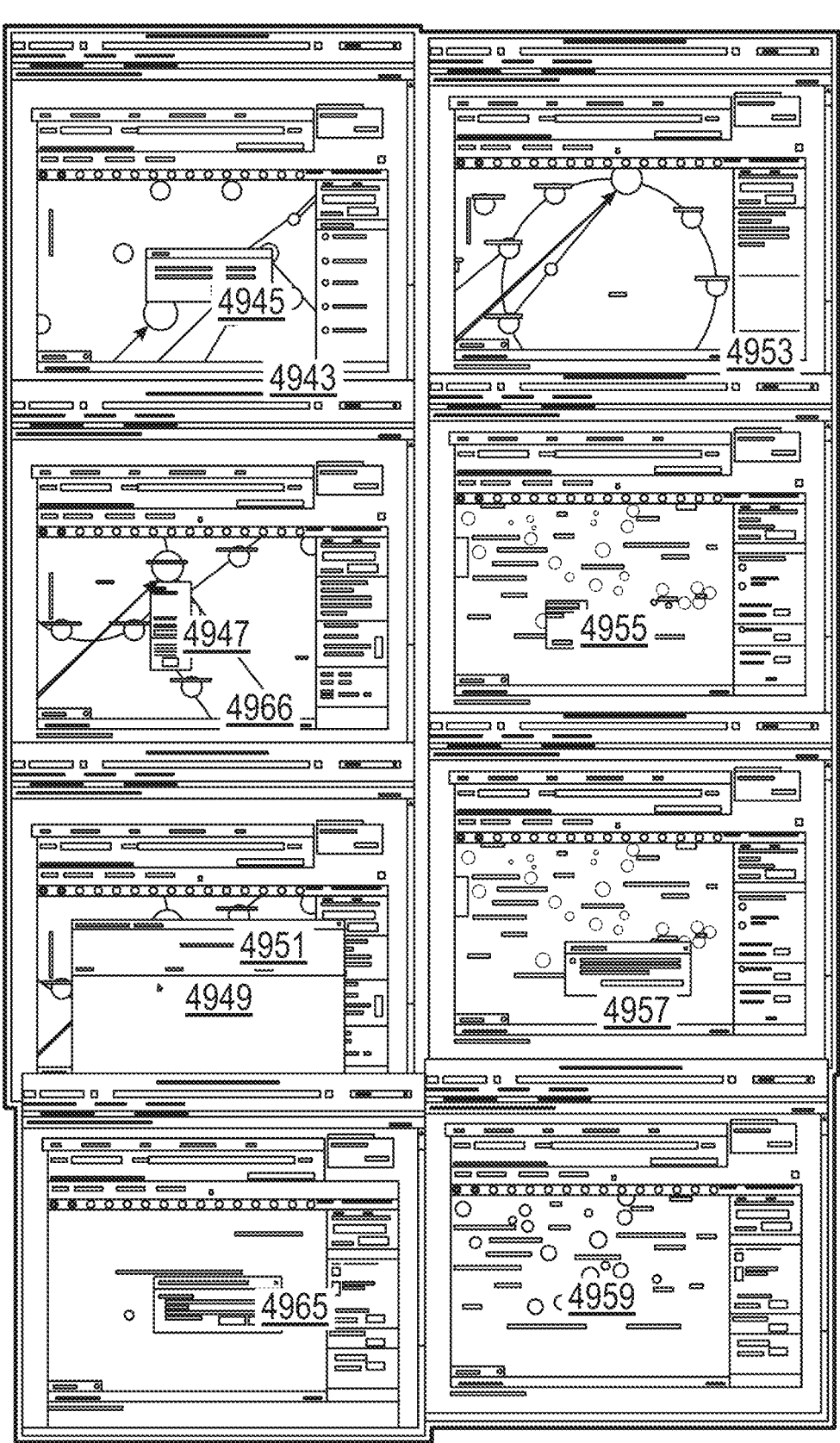

In one embodiment, the seeker experience advancement information may be provided by the seeker by way of a web form as shown in FIGS. 47, 48, 49. The web form may be served by an information server, and the web form fields may serve as a vessel into which the seeker may provide structure information, attach a resume, specify advancement experience information, or otherwise provide both experience information and specify the desired advancement milestone and/or goal. In one embodiment, this information is submitted to the APT and is stored as field entries in the APT database table for the seeker, e.g., in a seeker profile record. In another embodiment, this information is provided in XML message format such as the following:

Advancement Experience Information ID="experience12345">
   Experience Information>

```
<Job 1>
    <Title 1> Assistant to the Management Consultant
        </Title 1>
    <Start_-Pate> 03/14/89 </Start_Date>
    <End_Date> 5/15/03 </End_Date>
    <DescriptionTerms>
        <Term1> training </Term1>
        <Term2> process </Term2>
        <Term3> development </Term3>
        <Term4> costs </Term4>
        <Term5> coffee </Term5>
    </DescriptionTerms>
</Job 1>
<Job 2>
    <Title 1> Assistant Management Consultant
        </Title 1>
    <Start_-Pate> 05/16/03 </Start_Date>
    <End_Date> 6/15/09 </End_Date>
    <DescriptionTerms>
        <Term1> training </Term1>
        <Term2> process </Term2>
        <Term3> development </Term3>
        <Term4> costs </Term4>
    </DescriptionTerms>
</Job 2>
<Job 3> </Job 3>
</Experience Information>
<Advancement Information>
    <DescriptionTerms>
        <Term1> Executive </Term1>
        <Term2> Consultant </Term2>
    </DescriptionTerms>
</Advancement Information>
<Filter Information>
    <DescriptionTerms>
        <Filter1> Salary > $100,000 </Filter1>
        <Filter2> Region Zipcode [e.g., 10112]<25 miles
            </Filter2>
        <Filter3> Degree <Masters </Filter3>
        <Filter4> Growth >20% </Filter4>
        <Filter5> Relocation Expenses=TRUE </Filter5>
        <Filter6> Expected Next Year Occupation
            Demand Level >20,000 jobs </Filter6>
        <Filter7> Signing Bonus > $10,000 </Filter7>
        <Filter8> Annual Technology Stipend > $5,000
            </Filter8>
        <Filter9> Annual Health Insurance Stipend > $25,
            000 </Filter9>
        <Filter10> Regular Travel=False </Filter10>
        <Filter11> Salary Level >[Top] 10% [in field]
            </Filter11>
    </DescriptionTerms>
</ Advancement Experience Information ID >
```

Turning for a moment to FIGS. 47 and 48, the Figures show alternative example embodiments of how start states and target states may be selected. In another embodiment, the seeker may navigate a state structure topology such as may be seen in 4705 of FIG. 47. This may be achieved by clicking on advancement topics 4709 that will zoom in to show various advancement states 4712, which the user may specify as being start state, intermediate state, and end state 4714 of FIG. 33. In yet another embodiment, the seeker may enter a topic, career choice, title or other information indicative of a desired state 4724 in a field, which will be submitted as a query to the state structure; the state structure in return will return states that most closely match the supplied search term 4726, which the user in turn may select

4726 and which may be displayed, zoomed in on, and further manipulated in a topology display area 4727 of FIG. 47. In yet another embodiment, the user may similarly supply terms to identify both a start state and target state 4824, 4826, 4828, which will form the basis of a path between start state and target state 4833 of FIG. 48; in this embodiment, the APT similarly identify potential matching states for each of the supplied terms 4828 and constructed various paths that match the results from those terms 4837 of FIG. 48. The seeker may then select from the list of paths 4837 and the path topology display area 4839 will be updated to reflect the selected path 4839 of FIG. 34. So for example, the seeker may specify their current position an Assistant Administrator in a retail hardware store and that they have a goal of becoming a Regional Manager of a chain of hardware stores. In such an embodiment, the APT may use the provided seeker advancement information as a basis with which to query the state structure to identify as the current advancement state, and the target advancement state. For example, for the starting state, the APT may use the most current job information, e.g., the employer name, the title, and description describing the current job, and query the state structure for states that most closely match current job information; for example, a select command may be performed on the state structure for stats that most closely match all the supplied terms, and use the highest ranking match as the selected current state. Similarly, the target job information may be used to find a target state.

Turning back to FIG. 40, upon establishing a start state and a target state 4014, the APT prepares to search for paths connecting the start and target states 4015, 2616.

It should be noted that no target state need be selected, and in such an instance, the APT will use the start state to query the state structure for potential states that may be of interest to a seeker with no particular target as will be discussed later in FIGS. 41-43 regarding iteration-wise implementations. Such iteration-wise implementations allow a seeker to gauge and possibly forge their own pathways after being presented with the various likelihoods of those adjacent and potential advancement states.

Continuing with the description of a targeted implementation, it should be noted that while the APT may make use of a start and target state, specification of intermediate states are also contemplated. However, it should be noted that intermediate paths may be constructed by pair-wise re-processing of paths as discussed in FIG. 40; for example, if a seeker initially chooses a start state of Janitor and target state of CEO, the APT may construct a path of Janitor state→Manager state→CEO. However, seekers may themselves change and/or specify an intermediate state of Regional Administrator. This intermediate state of Regional Administrator may be used by the APT as a target state with Janitor state being the starting state; from which a first path may be constructed as between the two states, e.g., Janitor state→Facilities Administrator state→Regional Administrator state. In turn, the APT will then use the target Regional Administrator state as a starting state and CEO as target state to construct a second path, e.g., Regional Administrator state→Regional Manager state->CEO state. Thereafter, the APT may join the first resulting path together with the second resulting path, as the intermediate Regional Administrator state is the same for both paths, and result in a new seeker directed path, e.g., Janitor state→Facilities Administrator state→Regional Administrator state→Regional Manager state→CEO state. A practically limitless number of pair-wise re-processing operations may be employed as a seeker seeks out and selects intermediate states for a path.

In preparing to search for connecting paths as between a start state and target state, the APT may use specified minimum likelihood thresholds, $P_m$in, and a maximum number of path state nodes $N_{ma}x$ 4015. In one embodiment, an administrator sets these values. In an alternative embodiment, a seeker may be presented with a user interface where they are allowed to specify these values; such an embodiment allows the seeker to tighten and/or loosen search constraints that will allow them to explore more "what if advancement (e.g., career) advancement path scenarios. The APT may then establish an iteration counter, "i", and initially set it to equal "1" 4016. Using the start state, the APT may query the state structure for the next most likely states 4017. In an alternative path-dependent embodiment, the APT may use the seeker's provided experience information, i.e., the entire state path, as a starting point and query the state structure for next most likely states following the seeker's last experience state (more information about path-dependant traversal may be seen in FIGS. 42 and 44).

As the state structure maintains the likelihood of moving from any one state to another state, the APT may query for the top most likely next states having likelihoods greater than the specified minimum probability $P_m$in. For example, if a $P_{min}$ is set to be 50% probability, i.e., 0.5, and the start state 4050 has the following partial list of related next states: state A with P=0.5 4051, state B with P=0.7 4052, state C with P=0.9, and state Z with P=0.1 4054; then of next states A, B, C and Z, only states A, B, and C have likelihoods above the $P_{min}$ threshold, and as such, only those states will be provided to the APT 4017. In an alternative embodiment, instead of specifying a likelihood threshold, $P_{min}$ instead may specify the minimum number of results for the state structure to return (e.g., $P_{min}$ may be set to 10, such that the top 10 next states are returned, regardless of likelihood/probability). The APT may then determine if any and/or enough matches resulted 4018 from the query 4017. If there are not enough (or any) matches that result 4018, then the APT may decrease the $P_m$in threshold by a specified amount (e.g., from 0.5 to 0.25, from 10 to 5, etc.); alternatively, the APT (or a seeker) may want to try again 4029 by loosening constraints 4031, or otherwise an error may be generated 4030 and provided to the APT error handling component 4021.

If there are matching 4018 next states (e.g., A 4051, B 4052, C 4053) proximate to the start state 4050, then the APT may pursue the following logic, in turn, as to each of the matched next states (i.e., whereby each of the next states (e.g., A 4051, B 4052, C 4053) will form the basis for alternative advancement paths (e.g., Path 1, 4091, Path 2, 4092, Path 3 4093, respectively) 4033.

Upon identifying matching next states 4017, 4018, the APT may append 4081 a next state (e.g., A 4051) 4022 to the start state. Upon appending a next state to the start state 4022, the APT will then determine if appended next state (e.g., A 4051) matches any of the target state (e.g., 4099) criteria 4023. In one embodiment this may be achieved by determining if the next state has the same state_ID as the target state. In u an alternative embodiment, the state structure provides the state record of the target state to the APT, and the APT uses terms from the target state as query terms to match to the state record of the next state; when enough term commonality exists, the APT may establish that the next state is equivalent to, and/or close enough to the target state to be considered a match.

If the appended next state 4022 does not match the target state 4023, then the APT will continue to seek out additional intermediate 4027 state path nodes (e.g., D 4061 and F 4071)

until it reaches the target state (e.g., 4099). In so doing, the APT will determine if the current state node path length "i" has exceeded the maximum specified state node path length $N_{ma}x$ 4027. If not 4027, the current state node path length "i" is incremented by one 4028. Thereafter the last appended state (e.g., A 4051) will become the basis for which the query logic 4017 may recur (i.e., the appended state effectively becomes the starting state from which proximate nodes may be found by querying the state structure as has already been discussed 4017) For example, in this way next state A 4051 becomes appended to the start state 4050, and then the appended 4022 state A 4051 becomes a starting point for querying 4017, where the state structure, may in turn, identify a state node proximate to the appended state, e.g., state D 4061; in this manner state D 4061 becomes the next state to state A 4051. By this recurrence 4022, 4027, 4028, 4017, the APT grows the current path (e.g., Path 14091).

If the current state node path length "i" has exceeded the maximum specified state path length, $N_{ma}x$ 4027, then the APT may check to see if there is another next state for which a path may be determined 4036. For example, if the maximum allowable state path length is set to $N_{ma}x$=2, and the APT has iterated 4028, 4017 to reach state F 4071 along Path 14091, then the current state path length (i.e., totaling 3 for each of states A 4051, D 4061, and F 4071) would exceed the specified $N_{ma}x$; in such a scenario where $N_{ma}x$ has been exceeded 4027, if the APT determines there are additional states next to the start state 4036 (e.g., B 4052, C 4053), then the APT will pursue and build, in turn, a path stretching from each of the remaining next states (e.g., Path 2 4092 from next state B 4052, and Path 3 4093 from next state C 4053). If there is no next state 4036 (e.g., each of stats A 4051, B 4052, and C 4053 have been appended to the start state 4050), the APT may then move on to determine if any paths have been constructed that reached the target state 4037. If no paths reaching the target have been constructed 4037, then the APT (e.g., and/or the seeker) may wish to try again 4029 by loosening some of its constraints 4031. In one embodiment, the maximum state path length $N_{ma}x$ may be increased, or minimum likelihoods $P_m$in may be lowered 4031 and the APT may once again attempt to find an advancement path 4016. If there is no attempt to try again 4029, the APT may generate an error 4030 that may be passed to a APT error handling component 4021, which in one embodiment may report that no paths leading to a target have been found.

However, if paths have been constructed 4037, then the APT may determine the likelihoods of traversing each of the resulting paths 4024. For example, if we have a start state 4050 and a target state of 4099, the APT may have found three states next to the start state with a sufficient $P_{min}$in (e.g., over 0.5); e.g., next states including: state A with P=0.5 4051, B with P=0.7 4052, and state C with P=0.9 4053. Continuing this example, if the APT continues to search for states proximate to each next state (as has already been discussed), it may result three different state paths: Path 1 4091, Path 2 4092, and Path 3 4093, all arriving at the target state 4099. Each of the paths may have a probability or likelihood of being reached from the start state 4050; in one embodiment, the likelihood may be calculated as the product of the likelihood of reaching each of the states along the path. For example, the Path 1 4091 calculation would be $P_A*P_D*P_F$, (i.e., 0.5*0.9*0.9=0.405). Similarly, for Path 2 4092, the calculation would be PB*PE (i.e., 0.7*0.5=0.35). Similarly, for Path 3 4093, the calculation would be $P_c$*PA*PD*PF, (i.e., 0.9*0.9*0.9*0.9=0.6561).

As such, the APT may determine the likelihoods for each of the paths connecting to the target state(s) 4024. Upon determining the path likelihoods 4024, the APT may then select path(s) in a number of manners 4025. In the example three paths 4091, 4092, 4093, the most likely path is Path 3 having a likelihood of 0.6561, the next most likely path is Path 1 having a likelihood of 0.405, and the least likely path is Path 2 having a likelihood of 0.35. In one embodiment, the APT may select the path having the greatest likelihood, e.g., Path 3 4091. In another embodiment, a threshold may be specified, such that the APT will provide/present only the top paths over the threshold (e.g., if we used $P_{m}in$ as the threshold and set it to 0.5, only Path 3 would be selected with its likelihood of 0.6561 exceeding that threshold). In another embodiment, all paths are presented to the user (e.g., in ranked order) so that the seeker may explore each of the paths. Upon selecting 4025 determined paths 4024, the APT may store the paths in memory, and/or otherwise return 4086 the resulting paths 4026 for further use by the APT, e.g., provide the resulting paths for visualization to the seeker 3906, 3911 of FIG. 39.

Path-Independent Iteration-Wise APT

FIG. 41 is of a logic flow diagram illustrating iteration-wise path-independent path construction embodiments for the APT. Upon obtaining seeker experience advancement information 3902 and determining that a iteration-wise independent advancement path is desired 3904 of FIG. 39, the APT may use experience information to establish a start state and identify suitable subsequent states for advancement consideration 4132.

As has already been discussed in FIG. 40, in one embodiment, the seeker experience information may be provided by the seeker by way of a web form as shown in FIGS. 47, 48, 49. Unlike in the targeted embodiments discussed in FIG. 40 where a seeker may supply both a start state and target state 4828 of FIG. 48, a iteration-wise approach allows a seeker to identify a starting state in any number of ways as has already been discussed in FIG. 26 (e.g., identifying a category 4709, and zooming into a related state 4712, and making selections 4714 of FIG. 47 to add a selected state to a path 4841, 4846 of FIG. 34; typing in a search term 4724 to find matching states from a state structure 4726 of FIG. 47, and selecting those matching states to act as a starting state for a path; and/or the like).

In preparing to search for states proximate to a starting state, the APT may obtain a starting state (e.g., from experience information, from selection/indication obtained form a seeker via a user interface, and/or the like) and use a specified minimum likelihood thresholds for considering proximate states $P_{m}in$ 4132, as has already been discussed above. Upon obtaining a start state and a minimum likelihood 4132, a seeker may also provide state filter information 4134. In one embodiment, state filter information may comprise: salary requirements, geographic region and/or location requirements, education requirements, relocation expense requirements, minimum occupational growth rates, expected demand levels for a state, and/or the like. This information may be supplied to the web interfaces discussed in FIGS. 47, 48, 49 and used as has already been discussed in FIG. 26. For example, additional criteria 14848 may be specified and supplied into text fields 4849. In one embodiment, these attributes may stored in an attributes database table, that table may have a state_ID field that makes those attributes associated with a particular state; as such the attributes may selected by a state, and may be used as criteria for filtering. Although in one embodiment, when selecting a state 4850 will show additional information associated with that state 4859, in an alternative embodiment, upon indicating that filtering should be used 4848, a user is able to place filtering criteria into fields 4849 of FIG. 48 that will be made part of the query to the state structure, which may have an associated attributes database, and such filtering criteria will be used to filter out unwanted states. These filter criteria may be part of the XML query structure as has already been described in FIG. 26. Upon obtaining a start state and minimum threshold 4132 and filter information 4136, a query is provided to the state structure and any associated attribute database 4138. The APT then obtains states next states proximate to the starting state having a minimum likelihood threshold and whose associated attribute information also satisfies the requirements of the supplied filter selections 4138. In another embodiment, a threshold may be based upon minimum likelihood and maximum number of results. If there are no matches 4140, the seeker may adjust the starting point and minimum thresholds and attempt to identify next states again 4132. In another embodiment, an error may be generated indicating no matches 4142. If there are matching states 4140, in one embodiment, those matching states 4140 may be appended to the starting state and made a part of the advancement path 4144. Those matching next states 4140 may then be displayed 4146. It should be noted that when making a selection of a state 4850, and supplying any filter criteria 4859, the APT may obtain matching 4140 states that may be tenuously appended as potential next states 4860 of FIG. 48. Seekers may make such appending more permanent by indicting they would like to add a state to a path they are constructing 4846, 4843 of FIG. 48, which may result in the updating and/or modification of the path depiction that is displayed 4146. Upon updating the display 4146, the APT may allow a seeker to continue on from the last selected/added state and iterate and continue to build a desired path further 4132; otherwise operations may return to FIG. 39 3986. It should be noted in one embodiment, this path-dependant iteration-wise mechanism may be use to select intermediate states in the targeted path-dependant mechanism described in FIG. 40.

Path-Dependent Iteration-Wise APT

FIG. 42 is of a logic flow diagram illustrating iteration-wise path-dependent path construction embodiments for the APT. This is an alternative path-dependant embodiment of FIG. 45. Upon obtaining seeker experience advancement information 3902 and determining that a iteration-wise independent advancement path is desired 3904 of FIG. 39, the APT may use experience information to establish a start state and identify suitable subsequent states for advancement consideration 4132.

As has already been discussed in FIGS. 40 and 41, in one embodiment, the seeker experience information may be provided by the seeker by way of a web interfaces as shown in FIGS. 47, 48, 49. Unlike in the targeted embodiments discussed in FIG. 40 where a seeker may supply both a start state and target state 4828 of FIG. 48, a iteration-wise approach allows a seeker to identify a starting state in any number of ways as has already been discussed in FIG. 40. In an alternative embodiment, the APT take into account all the seeker's experience information. While in FIG. 41, examples were provided where a single experience state was provided and/or otherwise selected by the seeker, however, in this path-dependant embodiment, a seeker's full experience information may used as a basis of path discovery. Some seekers may have no experience history or a single entry, and in such instances, this path-dependant embodiment will look much like that path-independent embodiment. In one embodiment, a seeker may supply this experience information into structured web forms, which may be stored as structured data in a seeker profile associated with the seeker (e.g., a seeker may enter their resume job experiences into a web form). In an alternative embodiment, a seeker may provide their resume, which in turn may be parsed into structured data, the resulting structured data serving as experience information.

In preparing to search for states proximate to a path-dependent starting state, the APT may use a specified minimum likelihood threshold for considering a state proximate to the latest state in their experience information $P_{min}$ 4250. In one embodiment, a seeker may supply experience information, which will serve as path-dependant ("PD") criteria 4252, which as described in FIG. 40 (for example a state structure as may be represented, in one embodiment, by way of the XML structure), may include a temporal sequence and description of advancement progression (e.g., jobs 1, jobs 2, etc.). The APT may determine a state for each of these advancement progression entries and crate a path describing the seeker's past state path progression and use that path as a basis to search the state structure (e.g., as has been described above and in greater detail in patent application Ser. No. 12/427,736, the last progression entry (e.g., the latest job held by a seeker) may be used as a basis from which the seeker will further build out their advancement (e.g., career) path. In one embodiment, the state structure may return state, which may be used by the APT as state advancement experience information. For example, the job entries (e.g., Job 1, Job 2, etc.) from the structured (e.g., XML) advancement experience information in FIG. 40 may be supplied to the state structure, which in turn may return equivalent job states. Instead of using the FIG. 40 advancement experience information, a state version of that information may be used by the APT, for example:

```
<State    Advancement    Experience    Information
    ID="experience12345">
    Experience Information>
        <State ID 1>111111 </State ID 1>
        <State ID 2>222222 </State ID 2>
        <State ID 3>333333 </State ID 3>
    </Experience Information>
    <Advancement Information>
        <DescriptionTerms>
            <Term1> Executive </Term1>
            <Term2> Consultant </Term2>
        </DescriptionTerms>
    </Advancement Information>
    <Filter Information>
        <DescriptionTerms>
            <Filter1> Salary >$100,000 </Filter1>
            <Filter2> Region Zipcode [e.g., 10112]<25 miles
                </Filter2>
            <Filter3> Degree <Masters </Filter3>
            <Filter4> Growth >20%</Filter4>
            <Filter5> Relocation Expenses=TRUE</Filter5>
            <Filter6> Expected Next Year Occupation
                Demand Level >20,000 jobs </Filter6>
            <Filter7> Signing Bonus >$10,000</Filter7>
            <Filter8> Annual Technology Stipend >$5,000</
                Filter8>
            <Filter9> Annual Health Insurance Stipend >$25,
                000</Filter9>
            <Filter10> Regular Travel=False</Filter10>
            <Filter11>Salary Level >[Top]10% [in field]</
                Filter11>
        </DescriptionTerms>
```

</State Advancement Experience Information ID>

In the above state version of advancement experience, the state structure provided state equivalents of the job entries in the FIG. 40 experience information, and this state experience information may be supplied to the state structure as a path comprising State ID 1, State ID 2, and State ID 3 representing Job 1, Job 2 and Job 3 from the XML description in FIG. 40. Results from querying the state structure with an existing state progression path will provide the APT and use the latest advancement progression entry as a starting point; e.g., from the above state advancement experience information, State ID 3 would be the state from which a further advancement path would be build by the APT, i.e., State ID 3 would be the path-dependant start state to which additional path advancement states would be appended 4252.

Upon populating the APT with path-dependant criteria (e.g., with experience advancement experience information, state advancement experience information, and/or the like) 4252 and obtaining a minimum likelihood threshold 4250, a seeker may also provide state filter information 4254, which may be used to modify the path-dependent criteria 4254 (as has already been discussed in FIG. 41). In one embodiment, state filter information may comprise: salary requirements, geographic region and/or location requirements, education requirements, relocation expense requirements, minimum occupational growth rates, expected demand levels for a state, and/or the like. These filter criteria may be part of the XML query structure as has already been described in FIG. 40.

Upon obtaining a minimum threshold 4250, populating the APT with path-dependant criteria 4252 and filter information 4254, a query may be provided to the state structure and any associated attribute database 4256. For example, the state advancement experience information (or subset thereof) may be provided to the state structure as a query. Upon obtaining query results from the state structure, the APT may determine which of the returned states to use that satisfy the filter selections 4254 and minimum thresholds specified and retrieve the state records (and any associated attributes) related to the determined state(s) 4256. The APT may then determine if any a, state results match 4258; if not, the seeker may adjust the parameters of the search by starting over 4250, or alternatively an error is generated 4259.

If there are matching states 4258, in one embodiment, those matching states 4258 may be appended to the path-dependant starting state and made a part of the advancement path 4260. Those matching next states 4258 may then be displayed 4261. It should be noted that when making a selection of a state 4850, and supplying any filter criteria 4859, the APT may obtain matching 4258 states that may be visually appended as potential next states 4860 of FIG. 48, providing highlighting to show potential path connections. Seekers may make such appending appear more permanent 4263 by indicting they would like to add a state to a path they are constructing 4846, 4843 of FIG. 48, which may result in the updating and/or modification of the associations between states and generation of a path depiction that is displayed 4261. Upon updating the display 4261, the APT may allow a seeker to continue 4262 on from the last selected/added state 4260. If no continuation is desired or needed, operations may return to FIG. 39 4286. Otherwise, if continuation is desired 4262, the APT may allow a user to update their previous experience information 4263, 4264. If a user wishes to append or add states representing past experience (e.g., if the seeker did not initially supply all of their experience information as path dependent criteria 4252) 4264 and specifies such, the APT will allow them to append such experience states as path-dependence criteria 4252. In one non-limiting example, a seeker may build up 4846, 4843 of FIG. 48 states representing their experiences in this manner. Alternatively, the seeker may not wish to append experience states 4263, yet the APT may determine if any changes to any of the path-dependence criteria was affected by the seeker (e.g., a seeker may have changed an originally supplied experience state to another, the other perhaps showing a promotion in their most current work employment) 4265. If no changes to path-dependant criteria were determined 4265, the APT may continue to iterate and build a path based on the last appended state 4260, 4256. However, if there has been a change in the path dependant criteria 4265, this changed criteria will form the basis of iterated path dependent criteria 4252.

Path-Independent N-Part Open-Ended APT

Figure 43:
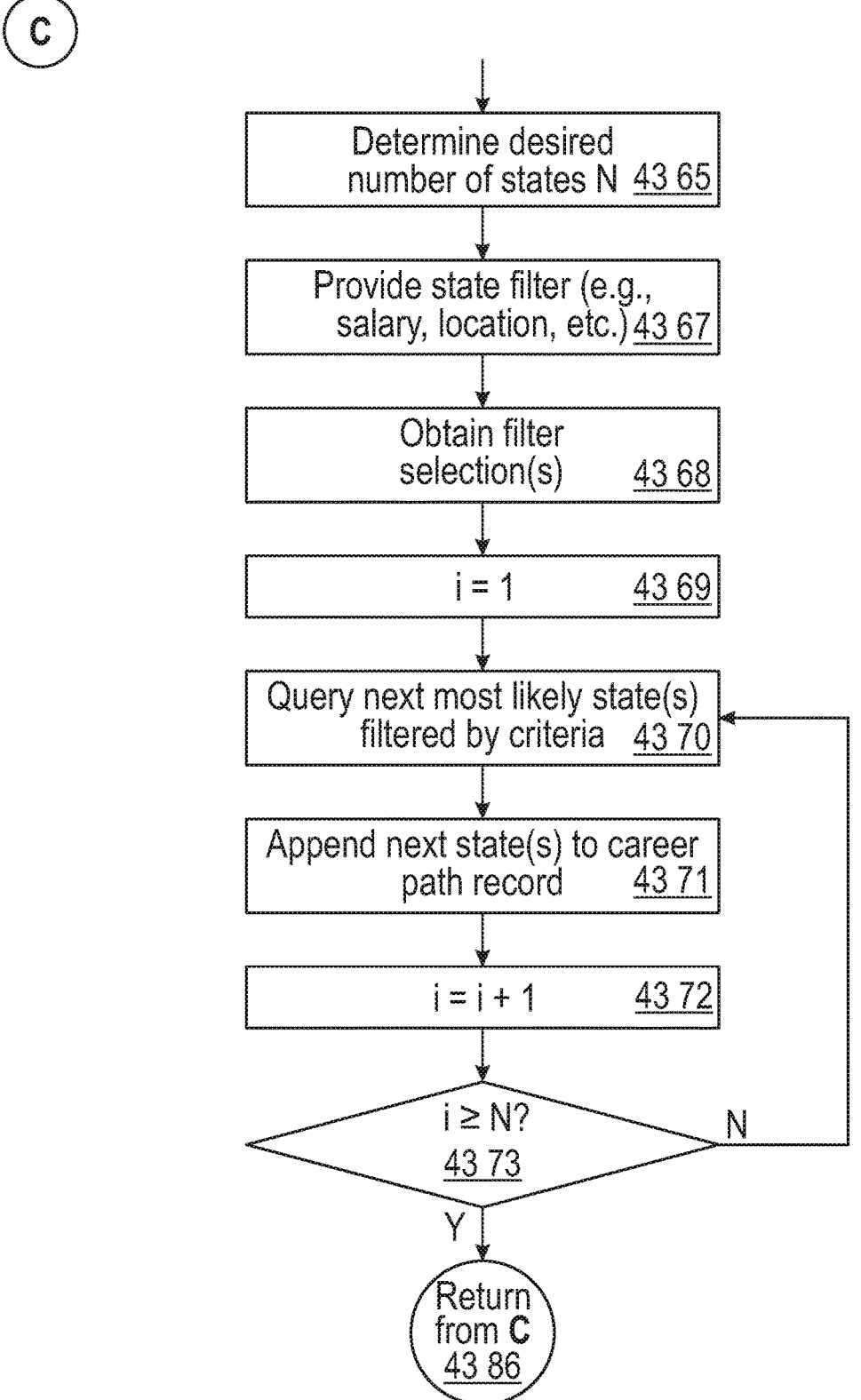
FIG. 43 is of a logic flow diagram illustrating N-part path-independent path construction embodiments of the APT.

FIG. 43 is of a logic flow diagram illustrating N-part path-independent path construction embodiments for the APT. This is an alternative path-independent open-ended embodiment of FIG. 41. Upon obtaining seeker experience advancement information 2502 and determining that a iteration-wise independent advancement path is desired 2504 of FIG. 25, the APT may use experience information to establish a start state and identify suitable subsequent states for advancement consideration 4365.

As has already been discussed in FIGS. 40, 41 and 42, in one embodiment, the seeker experience information may be provided by the seeker by way of a web form as shown in FIGS. 47, 48, 49. Unlike in the iteration-wise embodiments discussed in FIG. 27, an open-ended approach allows a seeker to identify a starting state in any number of ways as has already been discussed in FIG. 40; it also allows the seeker to specify desired path length N. As such, the APT, an administrator, another system, or the seeker may specify the desired number of states to comprise an advancement path, that length being "N" 4365.

In preparing to search for states proximate to a starting state, the APT may obtain a starting state (e.g., from experience information, from selection/indication obtained form a seeker via a user interface, and/or the like) and use the specified path length limit N, as has already been discussed above. Upon obtaining a start state and limit 4365, a seeker may also provide state filter information 4367. In one embodiment, state filter information may comprise: salary requirements, geographic region and/or location requirements, education requirements, relocation expense requirements, minimum occupational growth rates, expected demand levels for a state, and/or the like. This information may be supplied to the web interface discussed in FIGS. 47, 48, 49 and used as has already been discussed in FIG. 40. For example, additional criteria 4848 may be specified and supplied into text fields 4849. Although in one embodiment, when selecting a state 4850 will show additional information associated with that state 4859, in an alternative embodiment, upon indicating that filtering should be used 4848, a user is able to place filtering criteria into fields 4849 of FIG. 48 that will be made part of the query to the state structure, which may have an associated attributes database, and such filtering criteria will be used to filter out unwanted states. In another embodiment, browsing an associated hierarchy through nested pop-up menus 5330 of FIG. 53 or traversal and selection of nodes in a topography 4722, 4727 of FIG. 47 provide another mechanism for identifying states and building paths. These filter criteria may be part of the XML query structure as has already been described in FIG. 40.

Upon obtaining a path limit and filter information 4368, the APT may set the current path length "i" to equal "1" 4369. The APT may then provide a query to the state structure and any associated attribute database 4370, including filter criteria, as has already been discussed. The APT then obtains states next states proximate to the starting state having a minimum likelihood threshold and whose associated attribute information also satisfies the requirements of the supplied filter selections, and may append those next states to the current advancement path 4371. I an alternative embodiment, a seeker may traverse by categorical hierarchy selections as show in 5335 of FIG. 53, whereby a seeker can iteratively make state selections by identifying states through hierarchical selections. Thereafter, the APT may increment the path length counter "i" by one 4371 to track the growth of the path length resulting from the appending 4370. If the maximum path length N has not been reached 4373, the APT may iterate and similarly conduct queries on the appended next states, to extend the path 4370. If the path length has been reached 4373, operations may return to FIG. 39 4386.

Path-Independent N-Part Open-Ended APT

Figure 44:
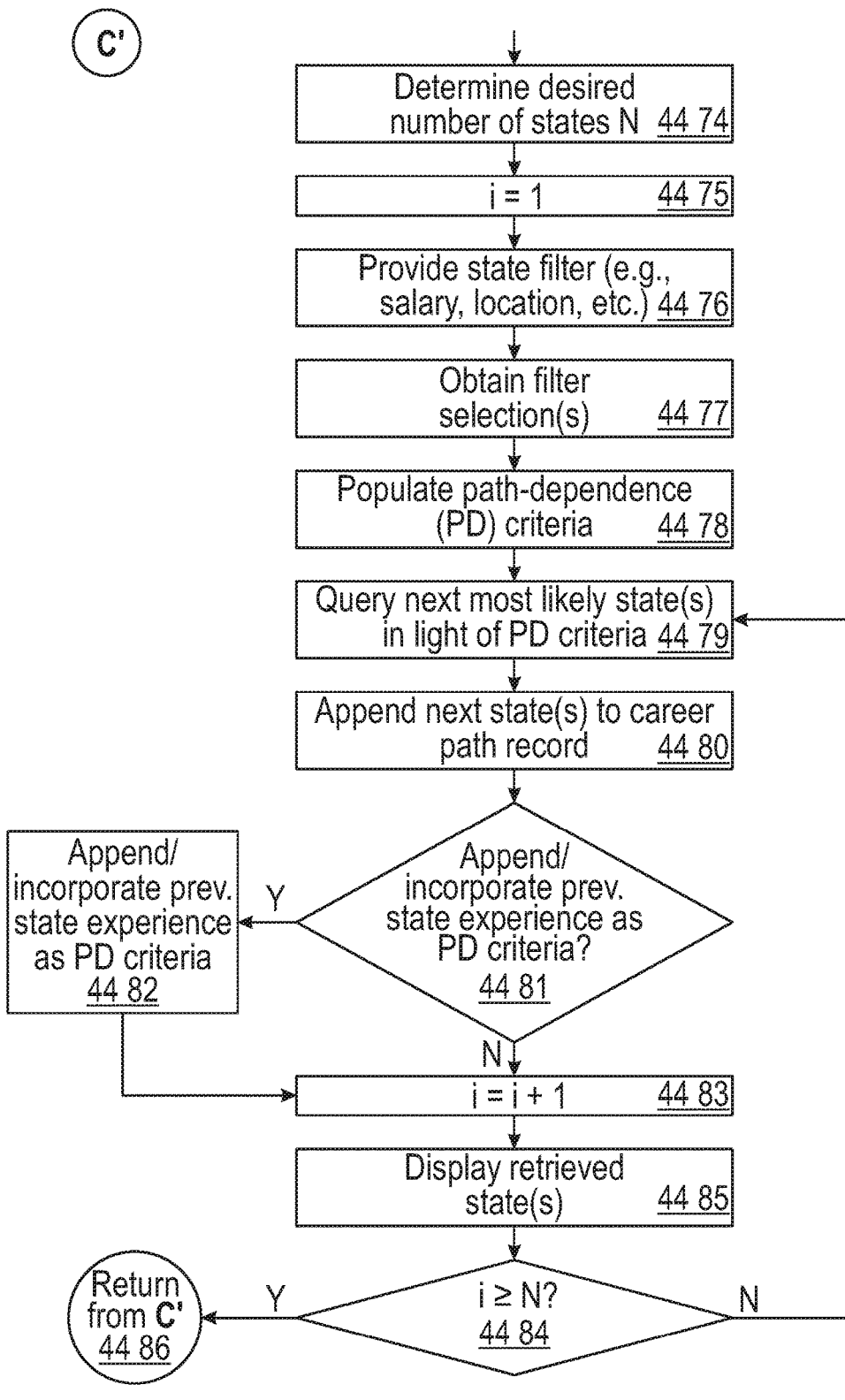
FIG. 44 is of a logic flow diagram illustrating N-part path-dependent path construction embodiments of the APT.

FIG. 44 is of a logic flow diagram illustrating N-part path-dependent path construction embodiments for the APT. This is an alternative path-dependent open-ended embodiment of FIG. 42. Upon obtaining seeker experience advancement information 3902 and determining that an iteration-wise independent advancement path is desired 3904 of FIG. 39, the APT may use experience information to establish a start state and identify suitable subsequent states for advancement consideration 4474.

As has already been discussed in FIGS. 40, 41, 42 and 43, in one embodiment, the seeker experience information may be provided by the seeker by way of a web form as shown in FIGS. 47, 48, 49. Unlike in the iteration-wise embodiments discussed in FIG. 42, an open-ended approach allows a seeker to identify a starting state in any number of ways as has already been discussed in FIG. 40; it also allows the seeker to specify desired path length N. As such, the APT, an administrator, another system, or the seeker may specify the desired number of states to comprise an advancement path, that length being "N" 4474. While in FIG. 43, examples were provided where a single experience state was provided and/or otherwise selected by the seeker, however, in this path-dependant embodiment, a seeker's full experience information may used as a basis of path discovery. Some seekers may have no experience history or a single entry, and in such instances, this path-dependant embodiment will look much like that path-independent embodiment. In one embodiment, a seeker may supply this experience information into web structured web forms, which may be stored as structured data in a seeker profile associated with the seeker (e.g., a seeker may enter their resume job experiences into a web form). In an alternative embodiment, a seeker may provide their resume, which in turn may be parsed into structured data, the resulting structured data serving as experience information.

In preparing to search for states proximate to a path-dependent starting state, the APT may discern a path-dependent starting state as has already been discussed in FIG. 28, and use the specified path length limit N 4474, as has already been discussed above. Upon obtaining a path limit N, the APT may set the current path length "i" to equal "1" 4475. A seeker may then provide state filter information 4476, which may be used to obtain resulting states matching the filter criteria 4477. In one embodiment, state filter information may comprise: salary requirements, geographic region and/or location requirements, education requirements, relocation expense requirements, minimum occupational growth rates, expected demand levels for a state, and/or the like. This information may be supplied to the web forms discussed in FIGS. 47, 48, 49 and used as has already been discussed in FIG. 40. For example, additional criteria 4848 may be specified and supplied into text fields 4849. Although in one embodiment, when selecting a state 4850 will show additional information associated with that state 4859, in an alternative embodiment, upon indicating that filtering should be used 4848, a user is able to place filtering criteria into fields 4849 of FIG. 48 that will be made part of the query to the state structure, which may have an associated attributes database, and such filtering criteria will be used to filter out unwanted states. These filter criteria may be part of the XML query structure as has already been described in FIG. 40. Upon obtaining a path limit 4474 and filter information 4476 and obtaining the filtered states 4477, a seeker may supply experience information, which will serve as path-dependant criteria 4478 as has already been described in 4252 of FIG. 42, and in FIG. 40. The APT will then return states matching the aforementioned criteria and may then create associations between states that appear to append those matching next states the path-dependant starting state, which are thereby made a part of the associated states representing the advancement path 4480.

Seekers may make such appending 4480 more permanent by indicting 4481 they would like to add a state to a path they are constructing 4846, 4843 of FIG. 48. As such, the APT may allow a user to update their previous experience information 4481, 4482. If a user wishes to append or add states representing past experience (e.g., if the seeker did not initially supply all of their experience information as path dependent 4478) 4482 and specifies such, the APT will allow them to append such experience states as path-dependence criteria 4482. In one non-limiting example, a seeker may build up 4846, 4843 of FIG. 48 states representing their experiences in this manner. Alternatively, the seeker may not wish to append experience states 4481, and then the APT may increment the path length by one 4483 to indicate that the current path has grown by one. Upon incrementing the current state, it may result in the updating and/or modification of the path depiction that is displayed 4485. Upon updating the display 4485, the APT may determine if the maximum path length N is less than the current path length i; if the current length of "i" is longer, then operations may return 4486 to FIG. 39 4286. Otherwise 4484, the APT may continue to grow to set lengths N by iterating 4479.

Path Gap Analysis

Figure 45:
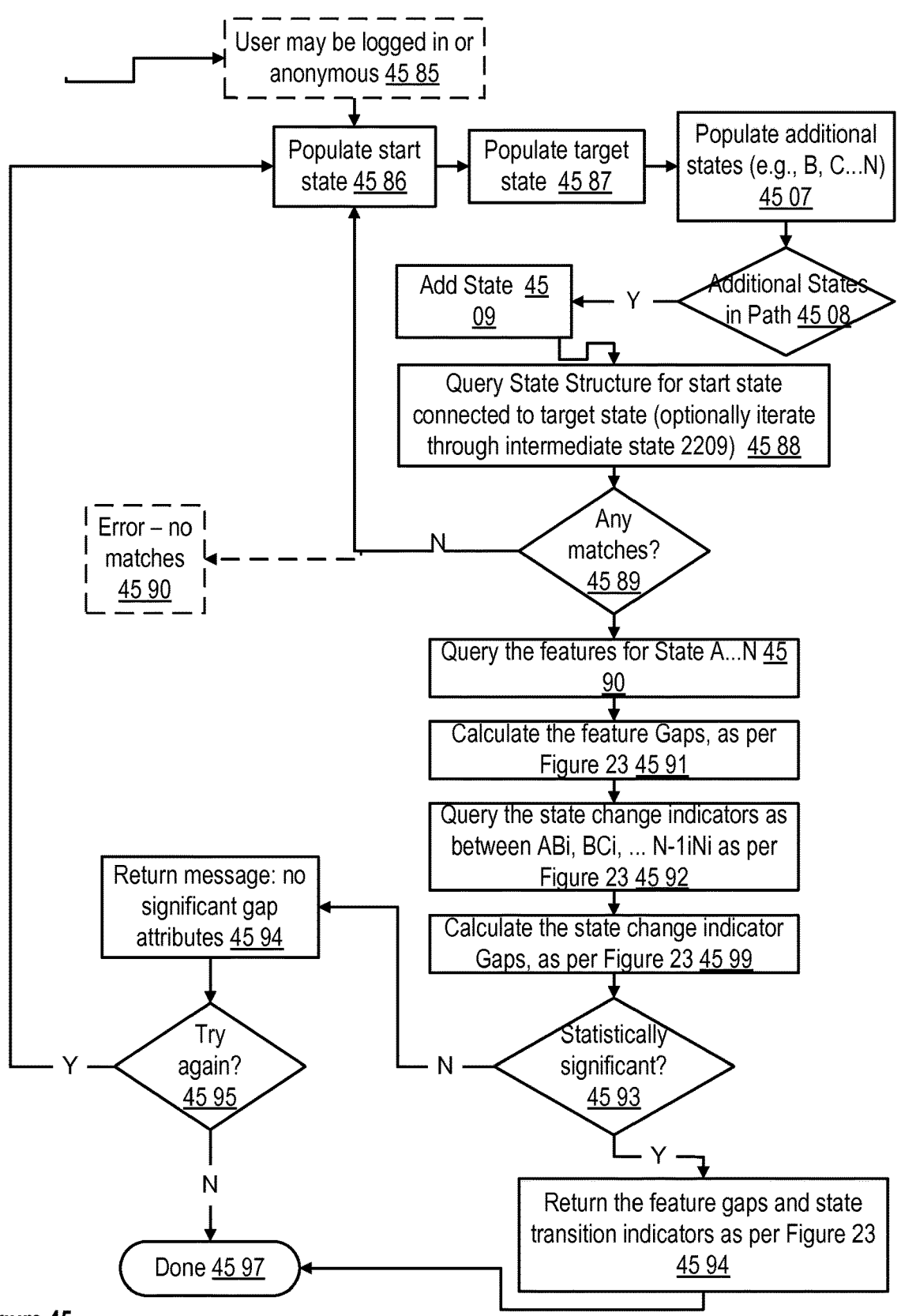
FIGS. 45 and 46 is of a logic flow diagram illustrating gap analysis embodiments of the APT.

FIG. 45 is of a logic flow diagram illustrating gap analysis embodiments for the APT. In one embodiment, a seeker may access the APT (e.g., either anonymously, be logged into the system, and/or the like) 4585. In so doing, the seeker may provide the APT with a start state 4586 and target state 4587, as has already been discussed in FIG. 44. The APT may also populate additional states (e.g., B, C . . . N) in an embodiment that allows for multi-segment gap analysis. As such, the APT will determine if it needs to analyze across multiple pat states 4508, and if so, it will add those states for analysis and subsequent iteration 4509, otherwise 4508, the APT will continue by initiating querying 4588. The APT may use the start and target states as a basis to query the target state structure to discern states proximate to the target state 4588. In an alternative embodiment, the APT may supply an intermediate target state; this may be achieved by first specifying a start state and an intermediate target state and generating a path therebetween as already discussed; there-after another path is generated as between the intermediate target state being supplied as a starting state and specifying a final target state, and once again determining a path therebetween; the two paths being connected. If the APT does not obtain any matches 4589, the seeker will be afforded an opportunity to restart 4586, and/or alternatively an error message may be generated 4590. If the APT does identify matches 4589, then the APT may query the feature attributes and transition values as stored in an attributes table occurring in time between the start and next state (e.g., as between A and B, then B and C, and N-i and N; N being the target state) 4590; when there are only two states, there is just a start state and target state. For example, the APT may query an attributes database with attributes associated with states from the state structure (e.g., as in the advancement taxonomy), wherein the attributes maintain information differences in salary as between different individuals having the same employment state. As such, the APT examines the attributes database record entries associated with each state and determine the common gap attributes; in another embodiment, an administrator specifies which attribute types have the most common gap attributes. Thereafter, the APT may calculate the feature gaps 4591 as discussed in greater detail in FIG. 45. Similarly to the previous query for features 4590, the APT may query for state change indicators as between states (e.g., as between ABi, BCi . . . N-iNi) 4592. Similarly to the feature gap calculation, the APT may calculate the state change indicators 4599 as discussed in greater detail in FIG. 46. In one embodiment, the APT may determine if these calculated gaps are statistically significant 4593 (e.g., by determining comparing it the value exceeds a common standard deviation for the gap type). If these are statistically significant, then the APT may return these gap feature attributes and transition indicators (e.g., as discussed in greater detail in FIG. 46), which may be provided to the seekers (e.g., to see how their salary compares to others living in the same region and having the same vocational post) 4596; in one embodiment, this gap analysis may be employed by APT for benchmarking. If there is no statistical significance 4593, then an error message may be returned, noting that no significant gap attributes exist 4594 and the APT will allow a user to try 4595 and recurse 4586 if the seeker so whishes 4595, otherwise gap analysis operations cease. In one embodiment, such gap analysis may be instantiated when user selects additional options 4947, 4966 of FIG. 49 after having selected start and target states.

Figure 46:
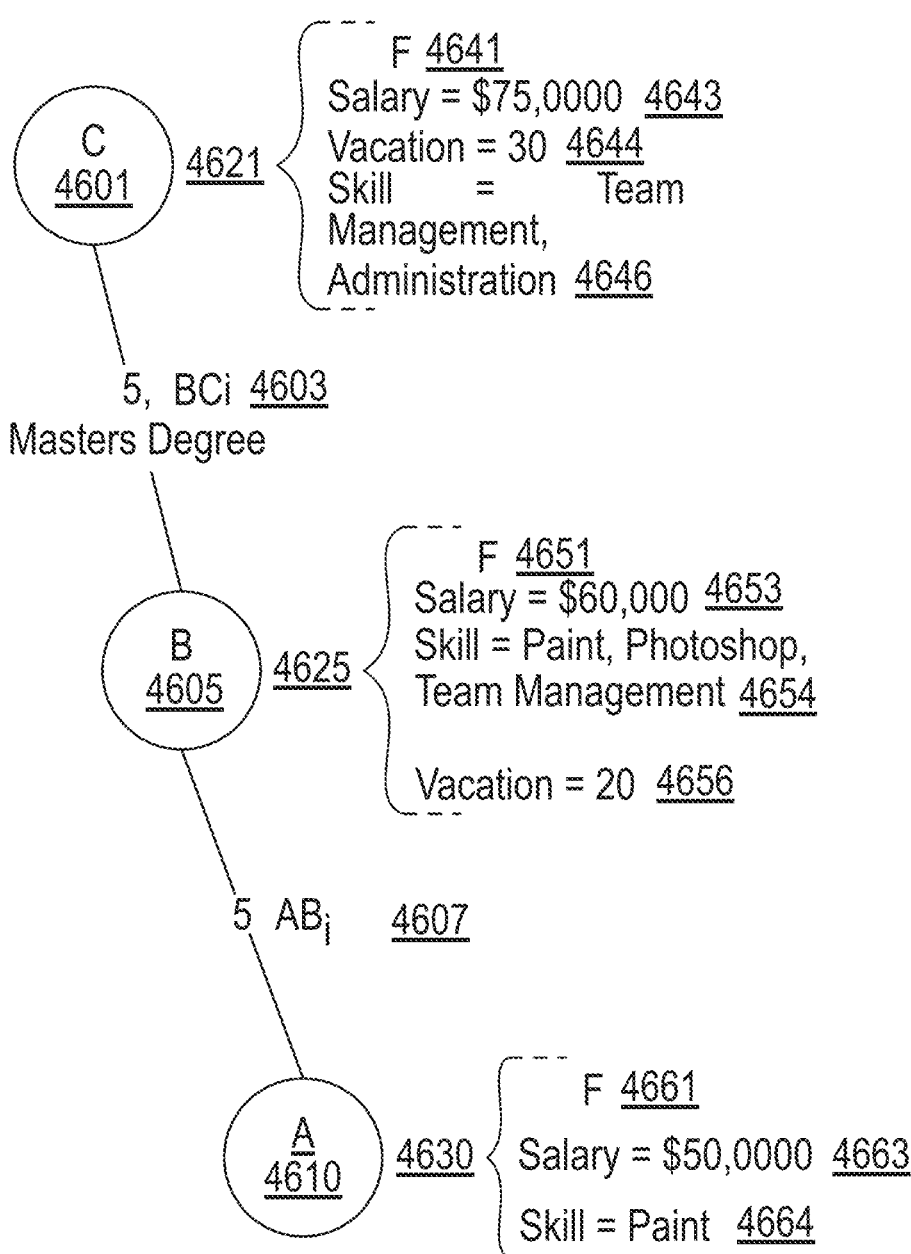

FIG. 46 is of a state path topography transition diagram illustrating gap analysis embodiments for the APT. In one embodiment, a gap analysis may be determined as between start state A 4610 and target state C 4601, having one intermediate state B 4605. In such an example, each state has a gap measurable attributes represented by F 4641, 4651, 4661, which may be float, integer, textual, and/or functions that represent stored attributes in an attributes database table. The features may be qualitative and/or quantitative. Features may include skills topics, terms, attributes (e.g., salary, vacation, etc.) and/or the like. Gap transition indicators may also represent part of a transition from one state to another. Transition indicators may include years of experience, obtainment of education (e.g., obtaining a new degree), attributes, and/or the like. In one example, state A (e.g., a state representing an assistant graphics designer position) have a set 4620 of attributes F 4661 having a salary of $50,000 4663 and a skill of using Microsoft Paint 4664. State B (e.g., a state representing a graphics designer position) may have a set of attributes F 4651, having a salary of $60,000 4653, a skill set of Microsoft Paint, Photoshop, and Team Management skills 4654, and provide 20 days of vacation time 4656. Also, in this example, state C (e.g., a state representing a managing graphics designer position) may have a set of attributes F 4641 having a salary of $75,000 4643, and skill requirements of Team Management, Administration 2546.

A state may have a certain set of attributes associated with it that is exclusive to that state. The difference between state A and B, in one embodiment, may be represented as the features of B subtract out the same duplicative features of A. For example, there is a $10,000 difference in salary as between state A 4610, 4663 and state B 4605, 4653. There also are indicators driving people from state A to B, e.g., like years of experience, the obtainment of a specific degree, and or the like. In one example it make take 5 years of experience for a transition to occur on average, e.g., ABi=5 4607, BCi=5 4603; these are indicators of change between states. As such, in one embodiment gap indicators as between states A and B may be calculated as follows:

$$Gi_{(A \rightarrow B)} = B_F - A_F + ABi \ \textbf{4699}, \text{ or}$$

Salary: $10,000; Skill: Photoshop, Team Management; 5 years transition,

As such, gap indicators as between states B 4605 and C 4601 may be calculated as follows:

$Gi(B \rightarrow o = C_F - B_F + BCi$ 4698, or

Salary: $15,000; Skill: Administration, -Paint, -Photoshop; 5 years transition and a Masters Degree.

The gap analysis may work as an additive between any two states. So the state change drivers takes drivers of change between two states and identifies them as subtractive features as well as indicators. As a consequence, gap indicators as between state A 4610 and C 4601 may be calculated as follows:

$$Gi(A \rightarrow o = CF - BF - A_F + ABi + BCi \ \textbf{4697}, \text{ or}$$

Salary: $25,000; Skill: Team Management, Administration, -Paint; 10 years transition and a Masters Degree.

Interaction Displays

FIGS. 47-49 are of a screen shot diagram illustrating embodiments for the APT. In FIG. 47, the entry screen to the APT is shown 4701; however it should be noted that the APT may be used without having a user profile or account. In one embodiment, a seeker may initially interact with a state topology overview 4705, which may also have panels for accepting inputs from the seeker to search out states, and an area to show information and results from inputs provided to the APT 4707. In one is embodiment, a seeker may move their cursor to an advancement (e.g., career) category displayed in the state topology overview and make a selection 4709. Upon selecting the category and/or state, the display area 4709 will focus in on the item selected 4712 and may provide the seeker with options (e.g., start/add to my path, get details about this state, find a job based on this state) 4714. It should also be noted that state paths may be represented in numerous ways; e.g., while in some figures the state paths are depicted as interconnected nodes on a graph topography 4855, 4844 of FIG. 48, in another embodiment the path may be represented as a series of numbered boxes 4847 of FIG. 48 having information relative to each state displayed within. A seeker may select to view the state path 4845 of FIG. 48 by providing indications that they wish to visualize the state path differently. In one embodiment, a template architecture is contemplated where numerous visual depictions are available and use the underlying state path and state structure topology as data constructs onto which the templates may be mapped. Further, the APT may provide a key showing what the various weight lines 4711 signify as connectors between (e.g., circular) nodes. For example, if a seeker selected an option to "get details" 4716, the APT may display attribute detail information about the selected state in a information display panel 4718, which may include the number of people in this job (both current and projected), expected rate of growth for the state, and other associated attribute information. The seeker may navigate about the topology by selecting a scale slider 4720 which will allow the seeker to zoom out and see more of the topology 4722 (or conversely, to zoom in and see more detail; panning and other arrangement options may also be employed).

In another embodiment, a seeker may enter a search term they believe relates to a (e.g., career) state they have an interest in 4724, which will result in the APT showing its top matches 4726 in the information panel as well as highlighting relevant identified experience states in the topology itself 4727. It should be noted that in one embodiment, the topography will adjust its overall view (e.g., zoom level) to show the path results, and when making selections of states, the topography will traverse and provide a fly-by depiction of the topography on to selected states.

In FIG. 48, the APT allows a seeker to provide both start and target query terms 3424 (as well as additional options 4848 that would allow the seeker to provide additional attribute filter criteria). In one embodiment, the additional filter criteria may be entered in the APT information panel 4849 and be used as part of the basis of a query to find matches in a state structure. As a seeker types 4826, suggested terms and topics are displayed 4826. If a state is selected 4850, other related states are pointed to and highlighted 4860. In an alternative embodiment, upon providing and determining start and target states 4828, 4830, 4832, the APT may determining a path with intermediary states (e.g., 4831) as between the start and target states 4833; and provide the seeker with the ability to choose as between multiple paths that have differing numbers of intermediary states and likelihoods of attainment by the seeker 4835. For example, in one embodiment a seeker may make selections 4837 as among the various available paths between the start and target states, and the topology display area will be updated to reflect the different paths 4839. It should be noted that the APT allows a seeker to either build up or modify a path. In one embodiment this may be achieved by selecting adjacent states 4846 to states in a path 4855 and making selections to add the selected state to the path 4843. In one embodiment, a path list 4844 may show the current set of states that comprises the current path such that a seeker may be apprised of the current path even if it is not fully visible in the topography display area.

In FIG. 49, the APT allows a seeker to vary visualizations in numerous ways. For example, a user may elect to vary the visual depiction of the display topology by engaging an option widget 4943, which may in turn show a dialogue box that allows the user to turn on/off the ability to show, e.g., common next states, show most common paths, show tips, show trace, and/or the like 4945. For example, selecting the show tips option will highlight potential and/or likely next states for consideration for a seeker. In another embodiment, if the seeker selects show trace, a breadcrumb trail of their path is highlighted. Another option is "find jobs in path," which when selected will allow a seeker to apply for one or more jobs that are identified along a constructed path. In another view upon selecting a state, the user may be presented with options to find a job and inform the user that the state is a common path state 4947, 4966. Another embodiment shows that upon selecting a "find a job" option 4947, the user may be presented with job listings 4949 and sponsored ads 4951. In one embodiment, occupational profile tags may be used with sponsored ads. In one embodiment, profile ad tags may be called as follows:

```
http://ads.monster.com/html.ng/
    site=mons&affiliate=mons&app=op&size=
    728x90&pp=l
&opid=****&path=(DynamicPathValue)&dcpc=
    f####&qe=f&dcel=f&moc=f#####&dccl=f#&^i
l=&state=44&tile=
http://ads.monster.com/html.ng/site=mons&aff
    iliate=mons&app=op&size=300x250&pp=
    l&opid=****&path=(DynamicPath
    Value)&dcpc=f####&qe=
    f&dcel=f&moc=f#####&dccl=f#&mil=4&
    state=4 #&tile=
http://ads.monster.com/html.ng/site=mons&aff
    iliate=mons&app=op&size=(TBD)&pp=l&
opid=****&path=(DynamicPathValue)
    &dcpc=f####&qe=f&dcel=f&moc=f
    #####&dccl=##&mil
=4&state=4#&tile=
```

: These values are set by the user's cookie.

Figure 51:
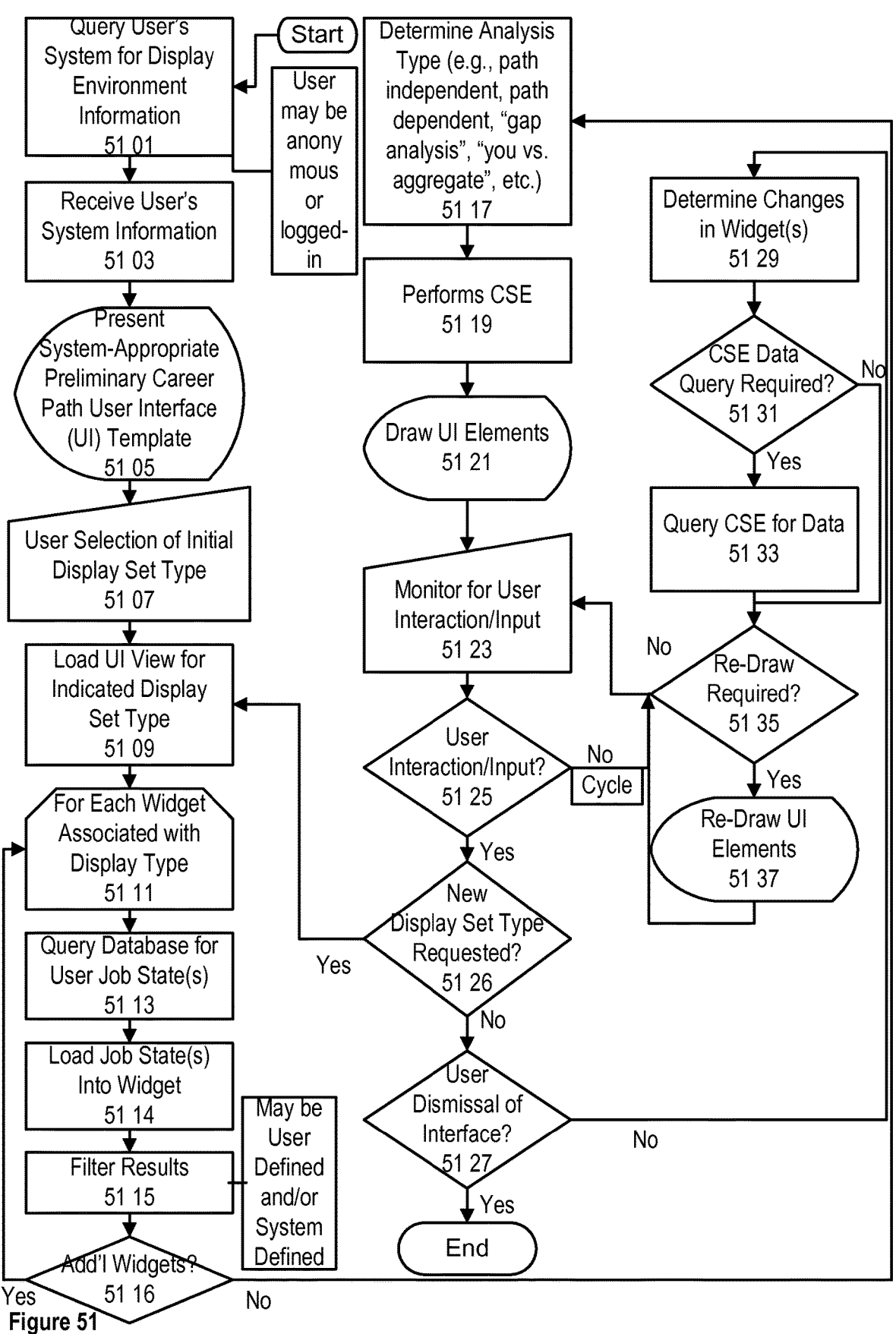
FIG. 51 is a logic flow diagram illustrating embodiments for invoking and displaying a APT.

In another example embodiment, in FIG. 50, job listings may be presented as part of a job carousel, as illustrated, where a user may view job listings 5033 in a "lazy susan" format 5093; the user may spin job widgets 5033 to the left 5091 or right 5092 by click-dragging or selecting "spin" arrows 5091, 5092 and rotating jobs out of view 5044, 5055. For example, if a user clicks on the left spin arrow 5091, job listing o 5244 will spin into view and job listing 4 5066 will spin out of view. It should also be noted that the job carousel may also be used for job ads outside the context of the APT; in one embodiment, a user may click on a job listing 5077 and an apply for job menu/button/widget may appear 5093, which would allow a user to move on to apply for the job. In an alternative embodiment, the APT may prompt or otherwise request user identifying information 5094 (e.g., a unique identifier, a user name and password, a cookie having same, and/or the like), which may be used to obtain a seeker's experience information and begin a job application process. Moving back to FIG. 49, it should be noted that a seeker may engage and save a desired path to their profile 4965. Also, it should be noted that a user may select a tab pane that provides information to help a seeker advance/continue their education, including educational listings and ad space 4953. The APT also provides the opportunity for the seeker to select path segments 4955, which in turn will provide the seeker with opportunity to select a path, overwrite the path, modify the path, and/or the like 4957, 4959. Interaction Interface Component FIG. 51 is a logic flow diagram illustrating embodiments for invoking and displaying an APT. In one embodiment, the APT may be manifested in a web environment as discussed throughout in FIGS. 47-49. In one such embodiment, the APT may be supplied, in one example embodiment, as Flex-based Shockwave Flash (SWFs) that interact with the CSM via a web services layer and with the parent through Javascript-based callbacks, which may be delivered via a web page served by an information server for use by seeker clients. Once the web page is loaded in a web client, the interface may be instantiated and connect with the APT, its database, its component collection, and in one embodiment, through the information server. Upon instantiation of the web page, presentation and operation of the interface may start by querying the seeker's web client to obtain display environment and browser capabilities information: this may include the type of browser, cookies (with account information, if any), plug-in capabilities (if any), Javascript support, Java support, version numbers thereof, screen resolution and dimensions, window sizes, and/or the like. In one embodiment, this may be done with an HTTPBrowserCapablities Request. Browser inquiry via a Microsoft .Net object call. The query may occur, and the seeker may access the APT by logging into an account (or by determining that a cookie contains identifying information allowing for login) or anonymously. Thereafter, the seeker's client may provide and the APT may obtain a user's system information, and if logged in and otherwise unsaved, this information may be stored in a profile database table 5103. The APT may then provide an interface appropriate to the seeker's client. In one embodiment, templates such as cascading style sheets, HTML templates, and/or the like may be supplied providing the seeker with a preliminary career path interaction interface 5105. In another embodiment, Flash-based content rendering may be used. In one embodiment, a seeker may select an initial display type 5107; for example, a seeker may select a topography based interface 4844 of FIG. 48, linear information view 4847, a straight-line list view 4844, a nodal path view 4833, and/or other views 5107. Upon providing such indication, the appropriate and selected view may be provided to and loaded by the seeker's web client and set 5109; in loading the template the appropriate interaction interface widgets are loaded.

Upon loading the template interface view 5109, the APT may then begin generating a representation of a given path for display in accordance with a given APT interaction interface template. For each node representing a state to be rendered to display 5111, the APT may query a APT database for seeker advancement states 5113. In one embodiment, this may be a seeker's advancement experience information. In another embodiment, it may be a clean state with no state topography, where a seeker may begin searches for job states, as has already been discussed earlier in FIGS. 47-49. Upon obtaining states from the APT, the state may be loaded into the interface element representing the state 5114. For example, in a topography map, a user's start state may be loaded as starting node in that topography. In one embodiment, a user may filter results 5115; the filters may be defined by the APT or the seeker. In one embodiment, a user may, for example, specify likelihood thresholds, salary levels, and/or the like. So for example, if a user starts with a blank topography and performs a search for a starting state, the user may specify filter attributes, which may be supplied as SQL query selects, and which will act to narrow the returned states. The APT may continue to iterate if there are additional interface widgets that need to be put into effect 5116, 5111, otherwise, the APT may then move on to determine the type of analysis to be used for path determination 5117. In one embodiment, the APT may allow a seeker to examine paths independent of their own advancement experiences in a path-independent approach, in a path dependant approach, perform gap analysis, examine seeker's status at a given state relative to the aggregate (e.g., comparing the aggregate salary for a state to the seeker's salary at a given state), and/or the like 5117. Upon having obtained an initial set of seeker states 5111, and selecting an analysis type 5117, the APT may perform a next-state and/or path determination analysis by using selected states as starting and/or target states and using that to query the state structure 5119. Upon obtaining analysis results 5119, the APT may provide user interface elements along with widgets representing states for display on the seeker's client 5112. Upon displaying the pathing interface 5121, the APT may monitor for seeker interaction with the pathing interface and/or for further information 5123, as has already been discussed with regard to FIGS. 47-49. If there is no interaction 5125, then the APT may continue to cycle looking for additional input 5123. If there is seeker interaction 5125, then the APT may check if a new display set type has been requested 5126; for example, if a user selects to view a path linearly 4845 instead of as a topography 4843 of FIG. 48. If a seeker elects to change the display set type 5126, then the APT will load in a corresponding template through which reimaging of the display may continue. If there is no indication of changing the display type 5126, then the APT may determine if the interaction interface is being dismissed and/or terminated; if so, termination will ensue and execution will come to an end. Otherwise, the APT will go on to determine if what changes need to take place 5129 as a result of user interaction 5125. For example, if a widget node is right-clicked upon, or other selection indicia is provided where a selection indicator (e.g., a cursor) intersects with a widget (e.g., a node representing an experience state), then the APT may determine if it needs to query its CSE component 5131. For example, if a user decides to change an experience path by adding a state to the path, changing one, and/or the like 4841, 4843 of FIG. 48, then the APT would need to obtain updated state and/or path information by querying the CSE component for updated data 5133. If no query is required 5131 or upon obtaining the results form the query, the APT will determine if re-drawing the display is required 5135. If no re-draw is required, the APT may continue to monitor for user input. If updates are required, e.g., to account for updated state information obtained from the state structure 5131, then the interface may be re-drawn to account for the update 5137, and then the APT may continue to monitor for interactions 5123.

Figure 52:
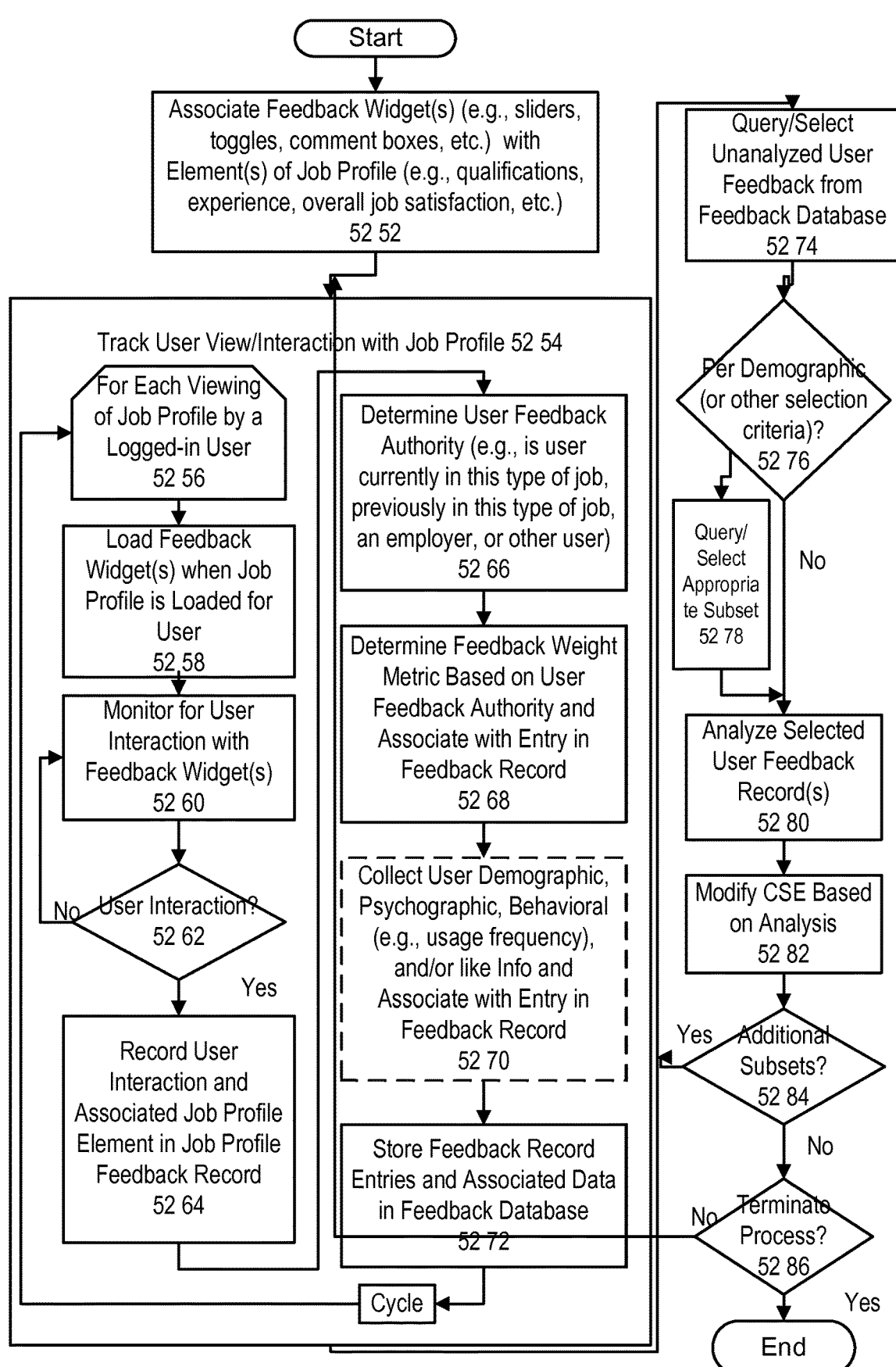
FIG. 52 is a logic flow diagram illustrating embodiments for invoking and displaying an APT.
Figure 53:
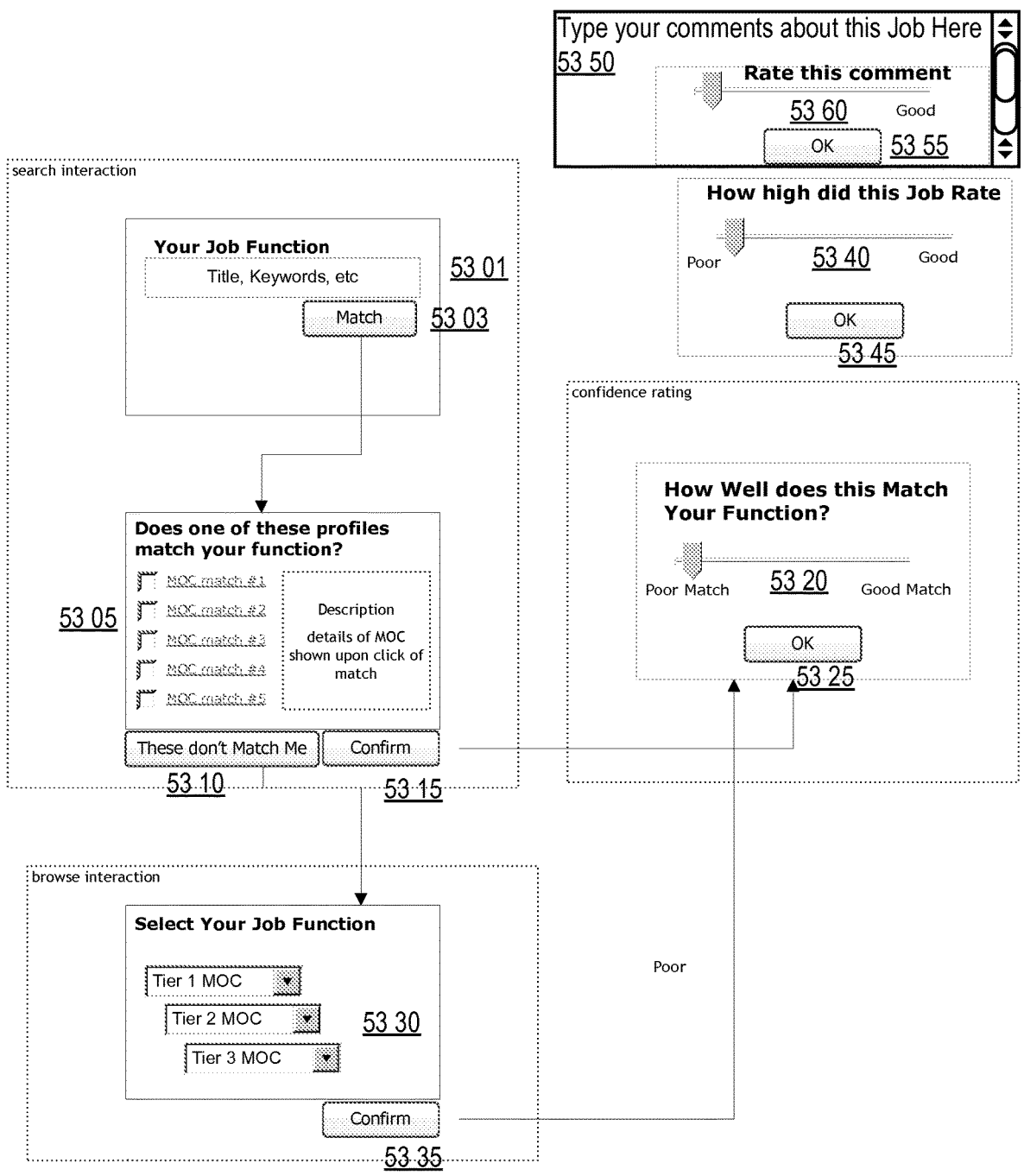
FIG. 53 is a block diagram illustrating feedback interactions with a AP.

FIG. 52 is a logic flow diagram illustrating embodiments for tracking seeker interactions with a APT. In one embodiment, upon initiating interactions with the APT, e.g., as in FIG. 52, the APT may track seeker interactions by associating feedback widgets with elements of advancement experience information 5252. Momentarily moving to FIG. 53, it is of a block diagram illustrating feed back widgets for interactions with a APT. As has already been discussed, in one embodiment u a seeker may provide a title, keywords, and/or the like to the APT 5301 and look for a match 5303. Such a search will result in search results that may be displayed and/or highlighted by the APT in a number of ways, including a list 5305, 4724, 4726, 4727 of FIG. 47. In one embodiment, seekers may provide feedback in a number of ways. In one embodiment, the seeker may inform the APT that search results are not appropriate matches 5310, in which case the seeker may specify a job state manually 5330. In one embodiment this may be achieved by allowing a seeker to navigate a hierarchical topic structure wherein various tiers represent top level topics and related nested topics. In one such embodiment, a seeker may make such selections by using pop-up menus that are populated from the structure model's topic tables. In one embodiment, the XML topic model structure may be used. Once selecting an appropriate advancement, e.g., job identifier, 5330 or selecting matches 5305 and asking to confirm either setting 5315, 5335, a feedback widget may be presented 5320 in the information inspection area of a APT interface, e.g., 4707, 4718 of FIG. 47. In one embodiment, a slider widget 5320 may be employed, wherein the seeker may move the slider to represent a range of a good match 1.0 to a poor match 0.0 by position of a slider 5320; that value may then be selected 5325 and stored in the APT. The ratings may be for all kinds of attributes, for example, instead of a confidence rating for the search results, a user may opt to "rate this job" 4843 of FIG. 48 by right-clicking on an experienced state and be presented with a rating widget 5340 where they may confirm how bad or good an experience was 5340, 5345—Similarly, a user may decide to provide comments about a job or experience through a text box 5350, the contents of which may be saved to the APT database. In addition, users may rate 5360 the comments and submit those 5355 to the APT. Moving back to FIG. 52, various other feed back attributes may be employed and/or stored, such as: text boxes to allow seekers to provide comments regarding a selected state, job satisfaction ratings for experienced states (e.g., using sliders), experience requirements (e.g., using toggles and/or text boxes to obtain additional requirements), and/or the like 5252.

Upon associating feedback with topic and/or job related information 5252, the APT may then track the users view and interaction with any given job profile 5254. In one embodiment, tracking may take place by doing the following for each viewing of a job/advancement profile by a seeker 5256. For each such interaction by a seeker with a job profile 5256, the APT may load in an appropriate feedback widget when a job profile is loaded for the user 5258. For example, when a job profile is loaded to represent a state in the path topology, various feedback widgets may be loaded; for example, a database table may contain various attributes that are associated with a given state and/or job and also are associated with various user interface templates and/or widgets, which may be loaded by the APT. Once the feedback widgets are loaded for an associated job profile 5258, the APT may then monitor for interaction with the feedback widgets 5260 (for example, as already discussed in FIG. 51). If no interaction is detected, the APT may continue to monitor 5260 until the interface is terminated. If the user does interact with the feedback widget(s) 5262, the values obtained from that interaction are stored in the APT database record associated with job profile 5264. The APT then determines if the user supplying the feedback has authority to do so 5266; for example, if the user is not currently employed for the selected type of job for which the feedback is proffered, and it was not previously an experience of the user, then such feedback may be deprecated (e.g., given low weight, may not be stored, and/or the like). The APT may then determine the weight to be given based on the user authority; for example, feedback from users whose most current employment is the same state for which they are offering feedback will have higher weight than for feedback from users who had such experience further back in their career; which in turn may have higher weight than feedback from a user who has no such experience and/or less related equivalent job state experience. In one embodiment, users with current experience in the equivalent state receive a weight of 1.0, while users having experience in the past receive a weight of 0.5, while users having no experience receive a weight of 0.1. Optionally, the APT may then collect behavioral (e.g., usage frequency), demographic, psychographic, and/or the like information and store it as associated attribute information 5270. For example, a user's profile may include their geographic region, and as such, feedback from users in one region may be analyzed distinctly from users in differing regions. The APT may then store the feedback as records entered as attributes in a APT database, which is associated with job information, state information, and/or the like and the APT may continue to cycle for any selected job profiles 5272, 5256.

In one embodiment, as the APT continues to track feedback information relating to job profiles 5254, it may periodically query its database for the feedback for purposes of analysis 5274. In one embodiment, a cron job may be executed at specified periods to perform an SQL select for unanalyzed feedback from the APT database. The APT may determine if any filter (e.g., demographic and/or other selection criteria) should be used for the analysis 5276. If so, such modifying selectors may be supplied as part of the query 5278. The returned feedback records are analyzed 5280, in one embodiment, using statistical frequency. For example, if a substantial number of seeker provide low confidence ratings for search results of a particular state, e.g., Systems Programmer, resulting from a particular query term, e.g., programmer; then this information may be used to demote state structure associations. In one example embodiment, each demotion may act to subtract the occurrence of a state traversal link. The APT may then allow a user to make additional subset selections 5284, which result in further results narrowing through more queries 5274. Otherwise the APT may determine if there is any indication to terminate 5286 and end, or otherwise continue on tracking user interactions with the job profile 5254.

Benchmarking

Figure 54:
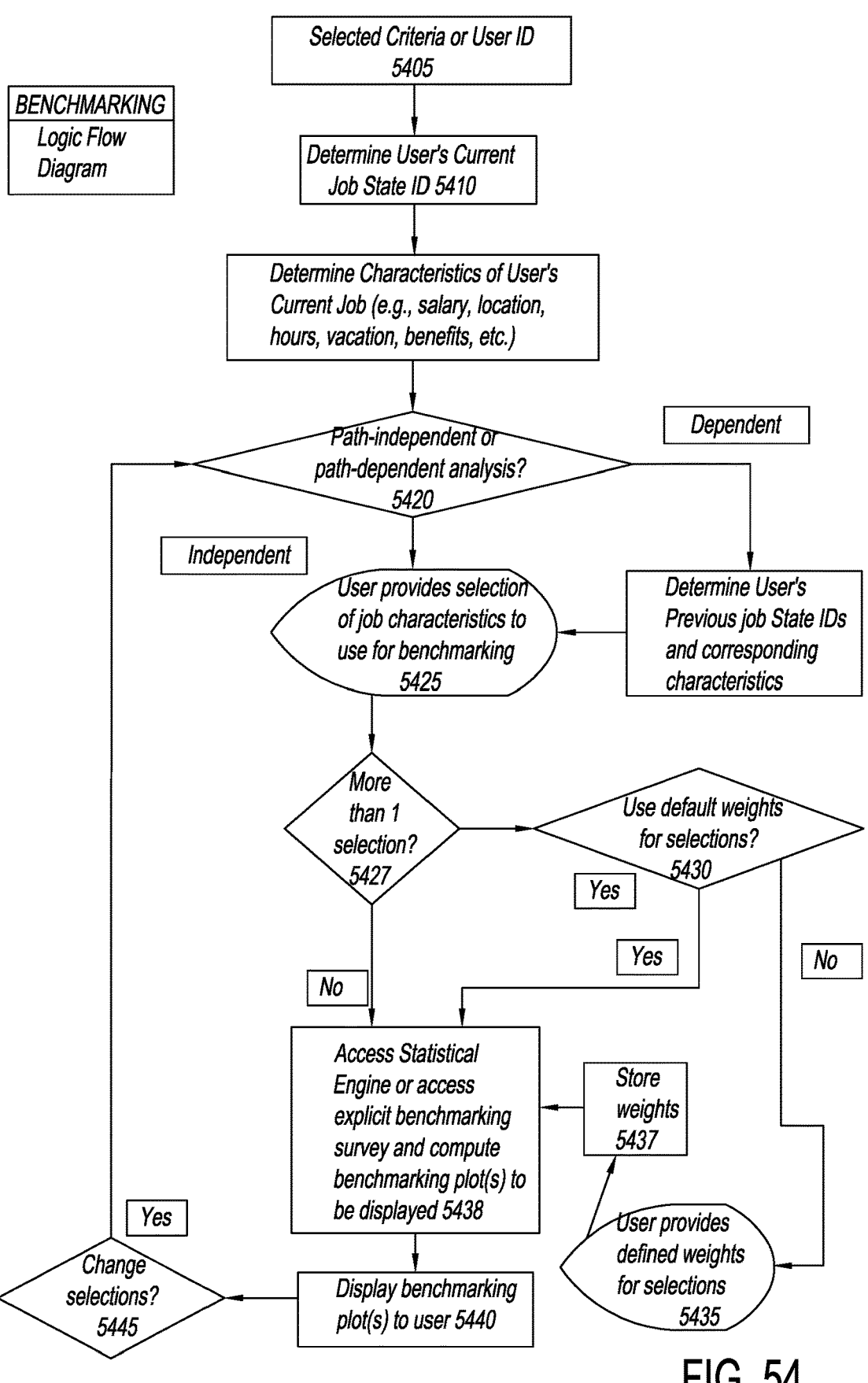
FIG. 54 is of a logic flow diagram illustrating benchmarking embodiments for the APT.

FIG. 54 is of a logic flow diagram illustrating benchmarking embodiments for the APT. In one embodiment, the APT allows one to select criteria such as a user identifier as a target of benchmarking 5405. In one embodiment, an APT interface may allow a logged in user to make a benchmark selection for any given piece of advancement experience information by right clicking on a desired target; e.g., right clicking on the target state in a path 4843 of FIG. 48, which brings up an option to perform benchmark analytics on the user and/or the target state. The APT may determine the seeker's current job state identifier 5410. For example, if the user makes a specific selection of a state representing advancement experience information in a state graph topology as in 4843 of FIG. 48, then the selected item's state ID will be the seeker's current job state 5410. Such a scenario allows the seeker to perform "what if analytics on any state in the topography, and on any state in their experience path, or on any state in a career path. However, if no specific state is selected, in another embodiment, the seeker's most current experience information, e.g., there most current employment position, may be used as the current job state 5410. The APT may then look up the seeker's current experience characteristics. In one embodiment, a seeker may populate their user profile with characteristics of their advancement experience information. For example, for any given historical employment position, the seeker may also supply characteristic attributes regarding that employment positions, attributes that may include salary, geographic location, hours of work (e.g., total number of hours worked per year), vacation duration, benefits, and/or the like. With this information stored in the seeker's user profile, it may determine these values by finding the seeker's profile record by the seeker ID and retrieving the relevant attributes stored therein 5415. In an alternative embodiment, the APT may make an inquiry to companies connected to the APT that the seeker claims as elements of past advancement experiences, and the APT may query those employer records through a gateway to automatically retrieve the attribute information. Upon obtaining the characteristics of the seeker's current job 5415, the APT determines if path dependant analysis is desired, and if so, the APT will determine the seeker's previous job states and corresponding characteristics, iterating, 5422 until all such information for each, e.g., career, experience is determined 5422. Or if independent path analysis is required or upon determining the path dependant information 5422, then the APT may provide a list of relevant job characteristics to the seeker for selection 5425. For example, after making a selection of a single or multiple states in the state path graph topology and selecting "benchmark" as in 4843 of FIG. 48, the APT may present the user with a list of available benchmarking attributes in a dialogue box as shown in 5550 of FIG. 55, which provides check box selectors for one or more characteristics. The APT will then determine if the seeker selected one or more criteria for benchmarking purposes 5427. If there is more than one selection 5427, then APT may determine if default weights for each of the criteria are to be used 5430. In one embodiment, an attribute database table may maintain weights for each of the attributes. In an alternative embodiment, each of the selected weights may be equal. If there is indication that the seeker does not want to use default weights, the seeker may then provide weights 5435. In one embodiment, weights may be entered into a text box $555^2$, by making selections on a slider 5554, by making selections of weights from a pop-up menu 5556 of FIG. 55, and/or the like interface widget. Once the weights are obtained, they may be stored 5437 in a user profile as weights associated with the current job state, and/or otherwise persisted for use by the APT 5437. Once weights are established 5430, 5437, or no weights are used 5427, the APT may then query the CSE for the selected state and attribute data table for associated attributes to provide statistical surveys and benchmarking information 5438. For example, in one embodiment, the CSE may be queried with the user's current job state for all other instances of that job state encountered by other job seekers that were used to make up the advancement state structure in the CSE, and each of those returned query states having a state_ID may be used as a basis to query an attribute table with such state_IDs for associated attribute information. The returned attribute search selection results may be averaged, aggregated, and or run through statistical packages such as SAS (e.g., via API, pipe, messages, and/or the like) to generate covariance and other statistical information and/or plots. Such analyses may include statistical processing and evaluation (e.g., the calculation of means, medians, variances, standard deviations, covariances, correlations, and/or the like). For example, the salary attributes from the select may be aggregated, summed and averaged and as such provide a benchmark against the user's current job state. In an alternative embodiment, the user may provide filter information which may be supplied as query select attribute as well 5415; for example, a user may wish to have the average salary for a geographic region. Upon obtaining the statistical attribute information 5438, the APT may use the returned information to generate visualization plots for display 5440. Thereafter the seeker may make changes to the weights and job state selections so as to vary the benchmark results 5445, and if so, benchmarking may recurse 5420. In another embodiment, gap analysis maybe performed 5438 and displayed 5440.

Figure 55:
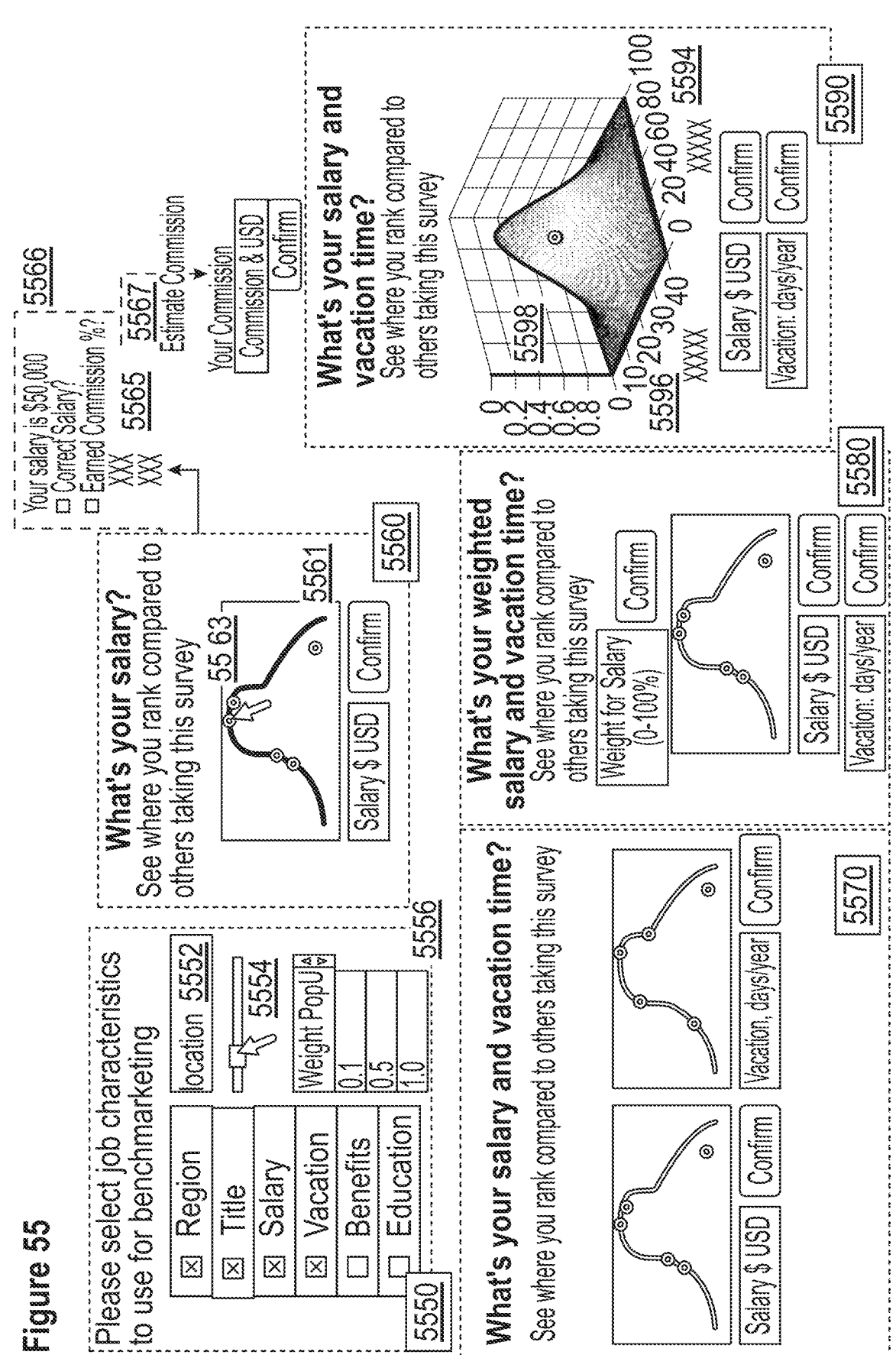
FIG. 55 is of a block diagram illustrating benchmarking interface embodiments for the APT.

FIG. 55 is of a block diagram illustrating benchmarking interface embodiments for the APT. In one embodiment, for the specification of attributes to be benched marked 5550, the APT may use an interface selection mechanism that allows a seeker to specify which characteristics are to be benchmarked, locations, settings and weights for each selected attribute 5552, 5554, 5556, as has already been discussed. Upon selecting an attribute, e.g., salary, the APT may generate a curve showing where a curve representing a plot of other states with attribute values. For example, for salaries, a curve representing the distribution of salaries for states in the state structure may be plotted with 5560, 5561 and the curve allows a user to plot an orange dot along a curve 5563 that auto-populates a text box 5566 with format validated salary information by querying the attribute database. The user may then confirm that the value is correct, if the salary is monthly, annual, and if commissions are included 5567. In one embodiment, orange dots will show if there are at least 4 or 5 other relevant user records that exist with the specified attribute for that sate. Similar benchmark plots may be achieved for salary and vacation time 5570. Also, plots employing attribute weights may also be employed 5580. In yet another embodiment, multi-dimensional 5590 plots may show state attribute distributions across, e.g., vacation days 5596, salary 5594, and likelihood 5598 distributions.

Cloning

Figure 56:
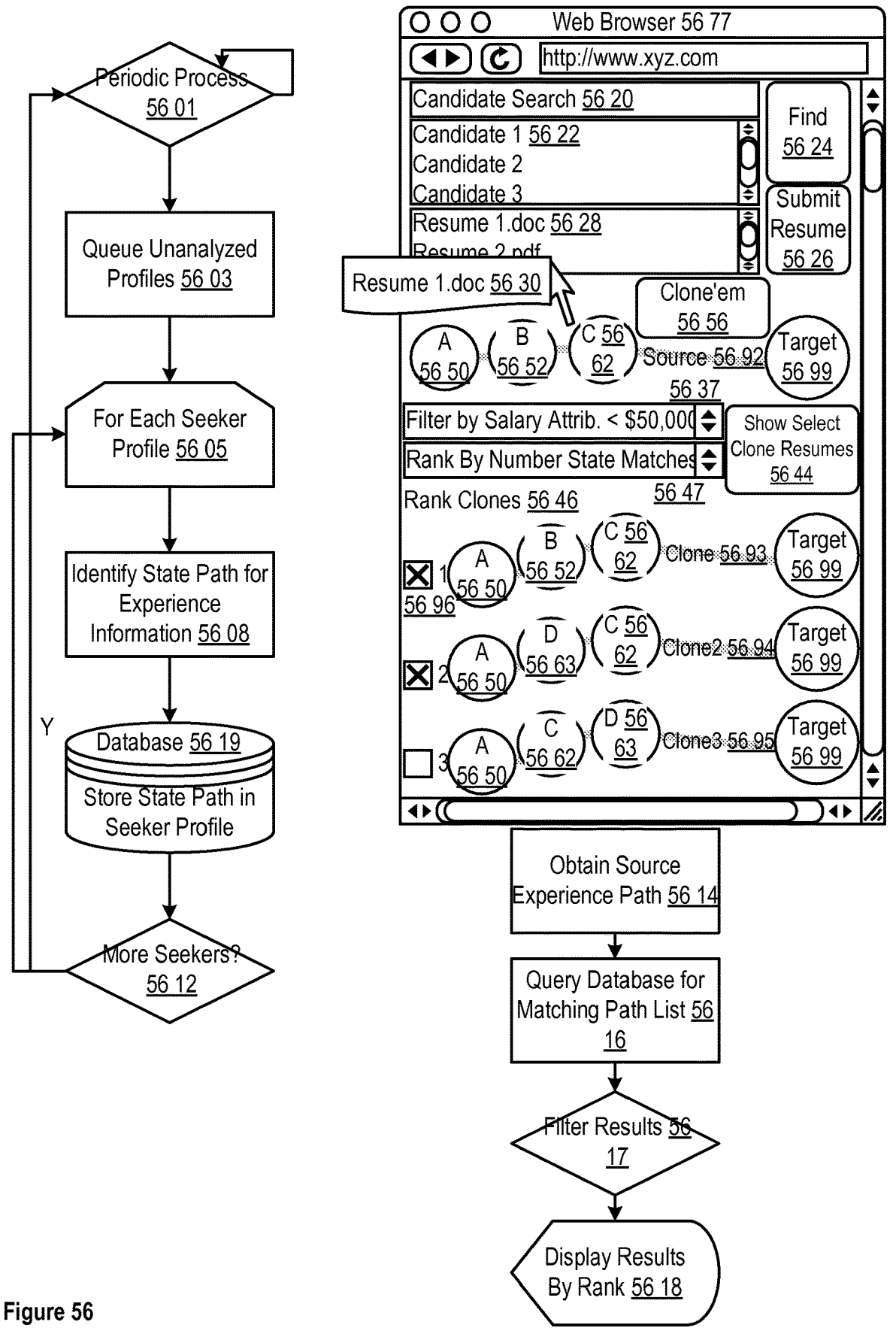
FIG. 56 is of a mixed logic and block diagram illustrating path cloning embodiments for the APT.

FIG. 56 is of a mixed logic and block diagram illustrating path cloning embodiments for the APT. In one embodiment, the APT may determine to periodically engage and process unanalyzed seeker profiles 5601. In one embodiment, a batch process may be engaged by cron at specified intervals. If the interval quantum has not occurred, then the APT will continue to wait until the occurrence of the period 5601. Upon occurrence and/or passage of the quantum 5601, the APT may queue all analyzed profiles 5603. In one embodiment, this may be achieved by querying the APT database for seeker's profiles without stored, e.g., career, state paths representing the seeker's experience information. Upon returning the query results, for each such seeker profile, the APT will iterate 5605. The APT will identify a, e.g., career, state path representing the seeker's experience information. As has already been discussed in earlier figures, the APT may map each, e.g., career, experience item (e.g., job experience) to a state and by querying the state structure for a states matching each of the seeker's experience items (See FIGS. 38, 39, et al.). As such, upon identifying all the associated states for each seeker experience item, the APT may build and thereby identify a state path for each seeker's experience information 5608. The APT may then store this state path in the seeker profile 5619 and set a flag in the profile indicating that the path has been constructed and date when that path was constructed. The APT may determine if there are more profiles in the queue and if it must continue to iterate for other unanalyzed profiles 5612. If there are more unanalyzed profile, the APT may continue to generate career paths for each 5605, otherwise the APT may continue on and wait to repeat the process upon the occurrence of the next specified quantum 5601. In this embodiment, the APT continues to update state paths for every seeker's experience information.

In so doing, all seeker's paths become available for analysis. In one embodiment, the APT provides an interface and a mechanism to identify and "clone" a specified seeker, by finding another seeker with identical and/or similar, e.g., career, state path. In one embodiment, the APT provides a web interface 5677 where an interested party, e.g., an employer, may provide the experience information of a source candidate to be cloned. The APT may allow the interested party to enter a search for a specific candidate 5620, where results to the search terms may be listed 5622 for selection by the interested party 5622. In one embodiment the interested party enters terms into a search field 5620, engages a "find" button 5624, and the APT will query for matching candidates and list the closest matching results 5622 from which the interested party may make selections 5622. In another embodiment, the interested party may search their file system for a source candidates experience information (e.g., a resume) or provide such 5630. In one embodiment, the APT allows the interested party to search their computer's file structure and list files for selections by engaging a "submit resume" button 5626, which will bring up the a file browser window through which the interested party may specify (e.g., drag-n-drop a resume document 5630) the source experience information. After the interested party selects what experience information it wishes to be the source 5628, the interested party may ask the APT to "make a clone," i.e., to identify another seeker having similar background and/or experiences.

As such, the APT may analyze the source's experience information and generate an experience path as has already been discussed. In one embodiment, upon obtaining a source experience path 5614, the APT may display the source's path 5692. The APT may then query its database for other seekers having the same experience information 5616. In one embodiment this may be achieved by using the source's state_IDs for each entry comprising its experience state path as a basis to select from its database. Then for the query results, for each candidate having all the matched states, the APT may further filter and rank the results 5617. It should be noted that an interested party may also apply attributes as a filter 5617, 5637; for example, by searching for other candidates with the same career path, but that have a set salary expectation (e.g., less than $50,000); one embodiment, the filter attributes may be provided in a popup menu 5637, a text field, a slider widget, and/or the like mechanism. In one embodiment, the APT may provide higher ranks for matches from the same regions, having experiences in the same order, and having other associated attributes (e.g., salary) that are most similar to the source seeker. In one embodiment, the APT may provide a pop-up menu interface to select the manner in which results are ranked 5647. In one embodiment, the rank clones 5646 may be displayed showing their matching paths 5693, 5694, 5695. The APT may rank the results by listing the paths that have the greatest number of states in common with the source more prominently than those having less matching states. The APT may then display the next closet "clone" or list of clones 5618, 5693, 5694, 5695 for review by the interested party. In one embodiment, the interested party may send offers, propositions, solicitations, and/or otherwise provide a clone with information about advancement opportunities. In one embodiment, a user may make checkbox selections 5696 of the desired clones and request to see the resumes of those selected clones 5644, upon which the APT will provide access to those clones. In another embodiment, an offer may be made by selecting the button 5644. In this way, interested parties may identify qualified individuals for advancement. It should be noted that a seeker's experience information may also include a state experience path comprising their education history. As such, in one embodiment, the APT may clone not only a seeker's, e.g., career, path experience, but also their education path experience.

Advancement Taxonomy

Figure 57:
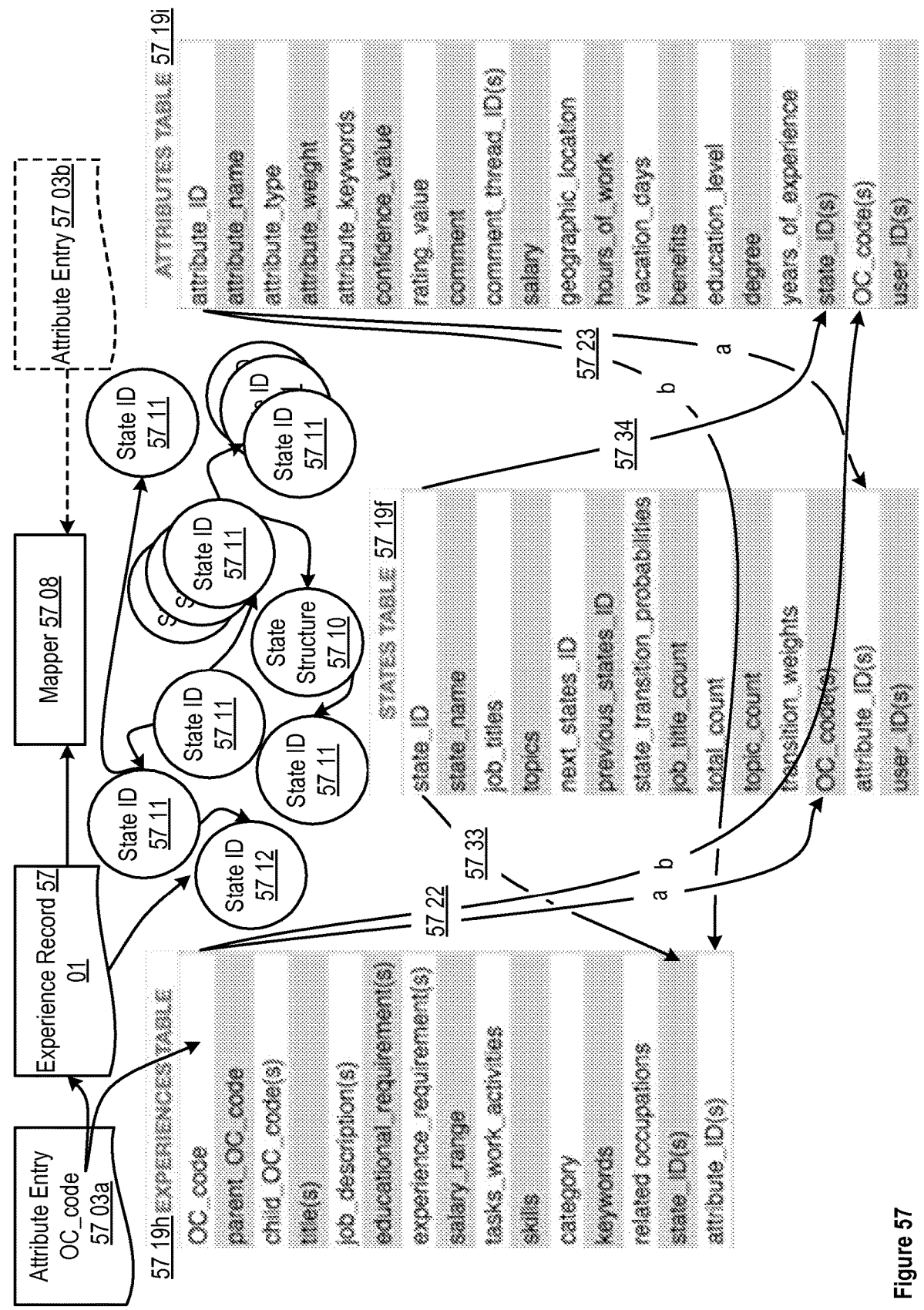
FIG. 57 is of a mixed block and data flow diagram illustrating advancement taxonomy embodiments for the APT.

FIG. 57 is of a mixed block and data flow diagram illustrating advancement taxonomy embodiments for the APT. In one embodiment, the APT may g act as a "rosetta stone" as between a state structure (e.g., a states table) 57*i*9*f*, 5710, attribute information (e.g., an attributes table) 57*i*9*j*, and an experience structure 571911. In one embodiment, the APT may take process experience structure records 5701 from the experiences table 571911 and map them to the appropriate state. Similarly, in one optional embodiment, the APT may take attribute records 5703*b* from the attributes table 57*i*9*j* and map them to the appropriate state. As a consequence, the state structure and its states 57*i*9*f* will be associated with both the experience structure and its Occupational Classification codes (hereinafter "OC_code") and with attribute information and its attribute_ID. An example of an OC_code is an Occupational Information Network (ONet) Standard Occupational Classification (SOC) code. Similarly, once an association is made for either experience structure 5722a or attribute information 5723a into a state 57i9f, 5711, the APT may push (i.e., cause a database write of a value in a record field) a unique state_ID into the experience table 5733 and attribute table 5734. As such, with an experience table having a state_ID, it may use that state_ID to access the appropriate state in a state structure, and in turn, look up an associated attributes table entry; and vice versa for the attributes table being able to map to the experience structure. In another embodiment, the APT may push its own state_ID 5733 and an attributes_ID 5723b into the experience table, and its own state_ID 5734 and an OC_code 5722b into the attributes information 5719f' so as to minimize database traversal. In another embodiment, simultaneous writes 5722, 5723, 5733, 5734 may take place.

In one embodiment, the APT 5708 may use the experience table's title, job description, skills, category, keyword and other field values as basis to discern and map to a matching state in the state structure, as has already been discussed in FIG. 38 et seq. In one embodiment, the CSE 5708 may similarly use values stored in the attributes table 57i¾'. However, in an alternative embodiment, attribute information 5719b and experience information 5719f' may be related by being assigned by administrators who will fine tune said associations.

In another embodiment, attributes 5719f' that are related to experience information 5719 h assume a relationship that is discerned as between the experience information 5719b and a state 57i9f. For example, a career system, such as Monster.com, may track attributes for various job listings that may be stored in a job listing table. Such job listings often have numerous attributes and many other attributes may be discerned through statistical analysis of seekers that interacted with job listings. These job listings often have an OC_code, and as such may already be related to experiences. As has already been discussed, the APT may associate unmapped experiences 570l, 5719b to states 5710, 57i9f, and when so doing, it may relate attribute information 5719f' that has already been associated to the unmapped experience 5719b to states in the same process. In another embodiment, structured resume information, i.e., experiences 5719b may be mapped to an OC_codes as described in patent applications: Ser. No. 11/615,765 filed Dec. 22, 2006, entitled "APPARATUSES, METHODS AND SYSTEMS FOR AN INTERACTIVE EMPLOYMENT SEARCH PLATFORM,"; and Ser. No. 11/615,768 filed Dec. 22, 2006, entitled "A METHOD FOR INTERACTIVE EMPLOYMENT SEARCHING AND SKILLS SPECIFICATION,"; the entire contents of both applications is hereby expressly incorporated by reference.

Figure 58:
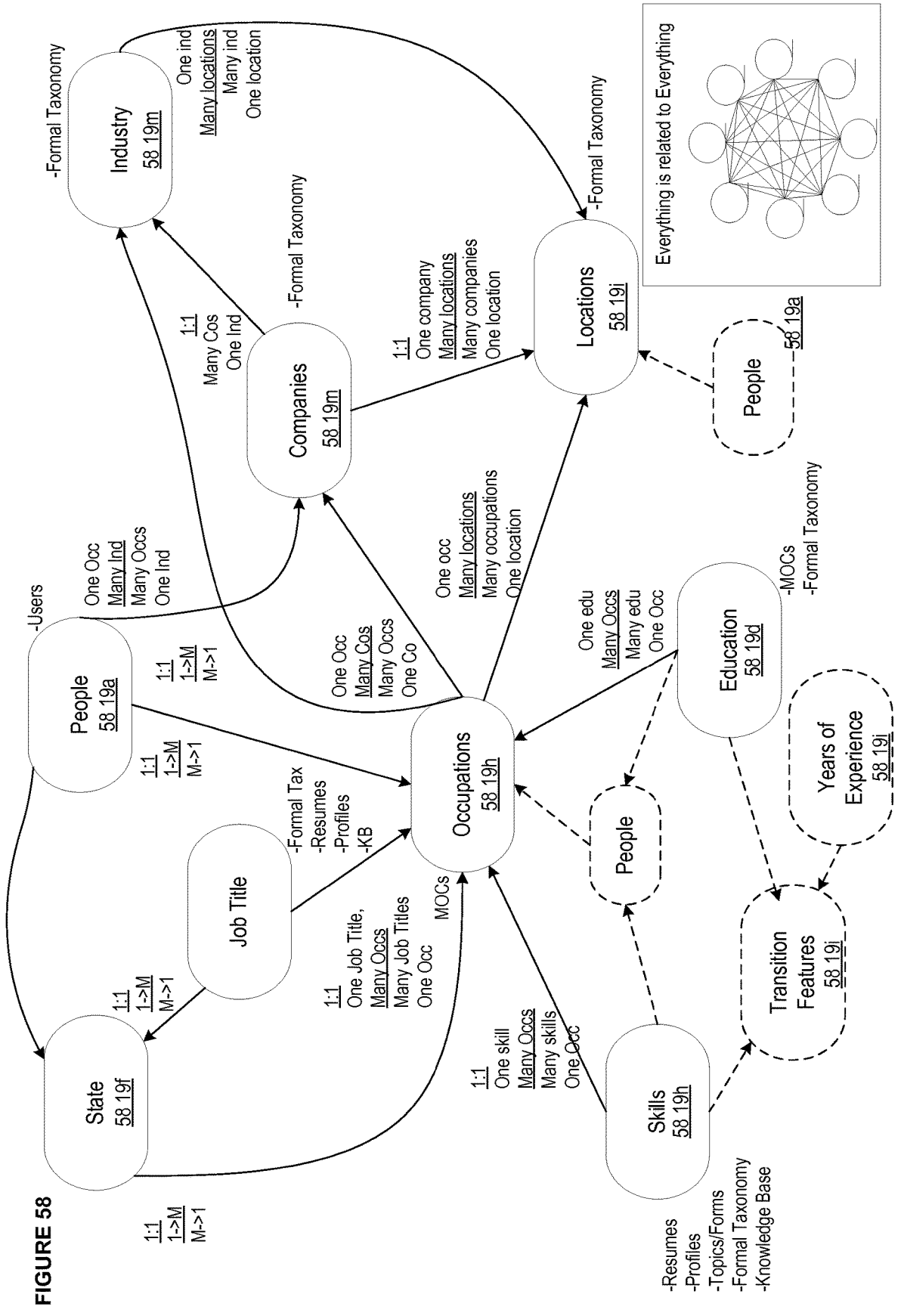
FIG. 58 is of a block diagram illustrating advancement taxonomy relationships and embodiments for the APT.

FIG. 58 is of a block diagram illustrating advancement taxonomy relationships and embodiments for the APT. Further to the base taxonomy introduced in FIG. 57, the APT may similarly forge relationships of various information bases through the state structure as shown in FIG. 58. FIG. 58 shows one embodiment of some of the APT Controller's database component's tables cast into numerous types of connections and relationships (one to one, 1:1; one to many, 1→M, many to many, M→M; many to one, M→i) as between various structures and supporting database tables. It should be noted that in one embodiment, the APT database tables are all interconnected in a manner where every table is related to every other table.

Advertisement Generation, Selection and Distribution System Registration

Figure 59:
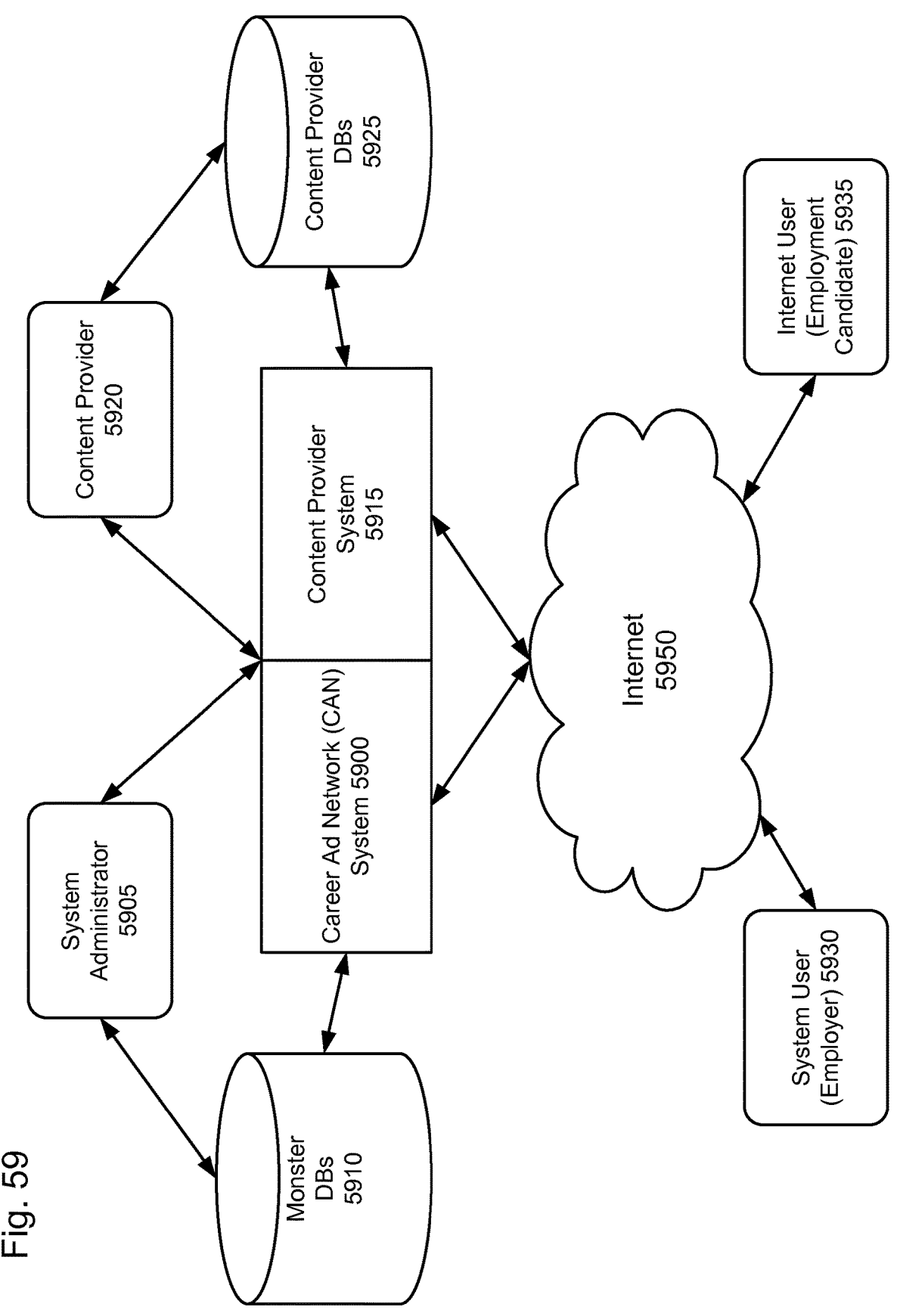
FIG. 59 is a diagram illustrating the entities that interact with the system according to an embodiment of the invention.

The present disclosure includes a discussion of systems, methods, and apparatuses for generating, managing and distributing advertisements. The disclosed system is particularly suited for use with a system user's (sponsor's) one or more or narrow listing offers (base data entries), where traditional passive advertising would be ineffective. The disclosed examples are discussed in the context of job placement advertisements, which may be considered as narrow listing offers because they generally are only relevant to a small audience of qualified applicants. Furthermore, job placement advertisements are usually directed to attracting applicants for a limited pool of available positions. It is to be understood that while the system is described in the context of job placement advertisements, the system provides an administrator with significant flexibility and freedom to configure the system for any other number of narrow listing offer or advertisement applications, such as classified product listings including automobiles, personals, real estate, etc. Overview FIG. 59 provides an overview of various entities that may interact with the system at various points during system utilization. According to an embodiment of the invention, the Career Advertisement Network ("CAN") 5900 is a central element in the system facilitating the functionality described herein. A system user (e.g., an employer) 5930 connects with the CAN 5900 over the internet 5950. The system user may either create a new advertising campaign or manage an existing advertising campaign. According to an embodiment, the advertisements created and distributed by the CAN 5900 are based on corresponding narrow listings, configured in this example as job opportunity listings stored within a job listing web site's job listing database (e.g., Monster DB) 5910.

The system user 5930 uses the CAN 5900 to create advertisements based on selected job listings (based data entries) stored within the job listing DB 5910. Advantageously, the CAN 5900 incorporates a flexible system user interface, wherein a system user (e.g., employer or sponsor) 5930 may determine how much interaction/input they wish to have in the advertisement creation process. Depending on the needs of a particular user, most of functionality associated with the CAN 5900 can be implemented based on system-driven processes. Alternately, some system functionality may be may configured so that a system user 5930 can work with a system administrator 5905 to create/manage an advertisement campaign.

As illustrated in FIG. 59, the CAN 5900 coordinates creating and distributing advertisements with content provider system 5915. In an embodiment, the content provider system 5915 creates and distributes online content from the content provider databases 5925 or other sources. The CAN system creates and distributes advertisements that are incorporated into the content as it is presented to an internet user 5935. Generally, the content provider may be configured as a web site that provides an internet user 5935 with online content such as news, entertainment, sports, online media or other types of online content. Furthermore, depending on the actual implementation, the content provider may be an affiliate web site, a partner web site or even hired as an advertisement placement provider.

For example, the content provider 5920 may be configured as a sports news web site. The content provider 5920 distributes various sports news content from the content providers database 5925. The CAN 5900 may be configured to coordinate incorporating CAN generated advertisements into the content distributed by the content provider's system 5915. The CAN 5900 is configured to create the advertisement based on a variety of factors, some of which may include: a content provider's content, a content provider's advertisement system configuration, web user 5935 characteristics, and/or any variety of other distribution metrics established by the system user 5930 or system administrator 5905. In some embodiments, the CAN 5900 may be configured with an advertisement tracking module configured to track and record data associated with a web user's interaction with the displayed advertisement.

Figure 60A:
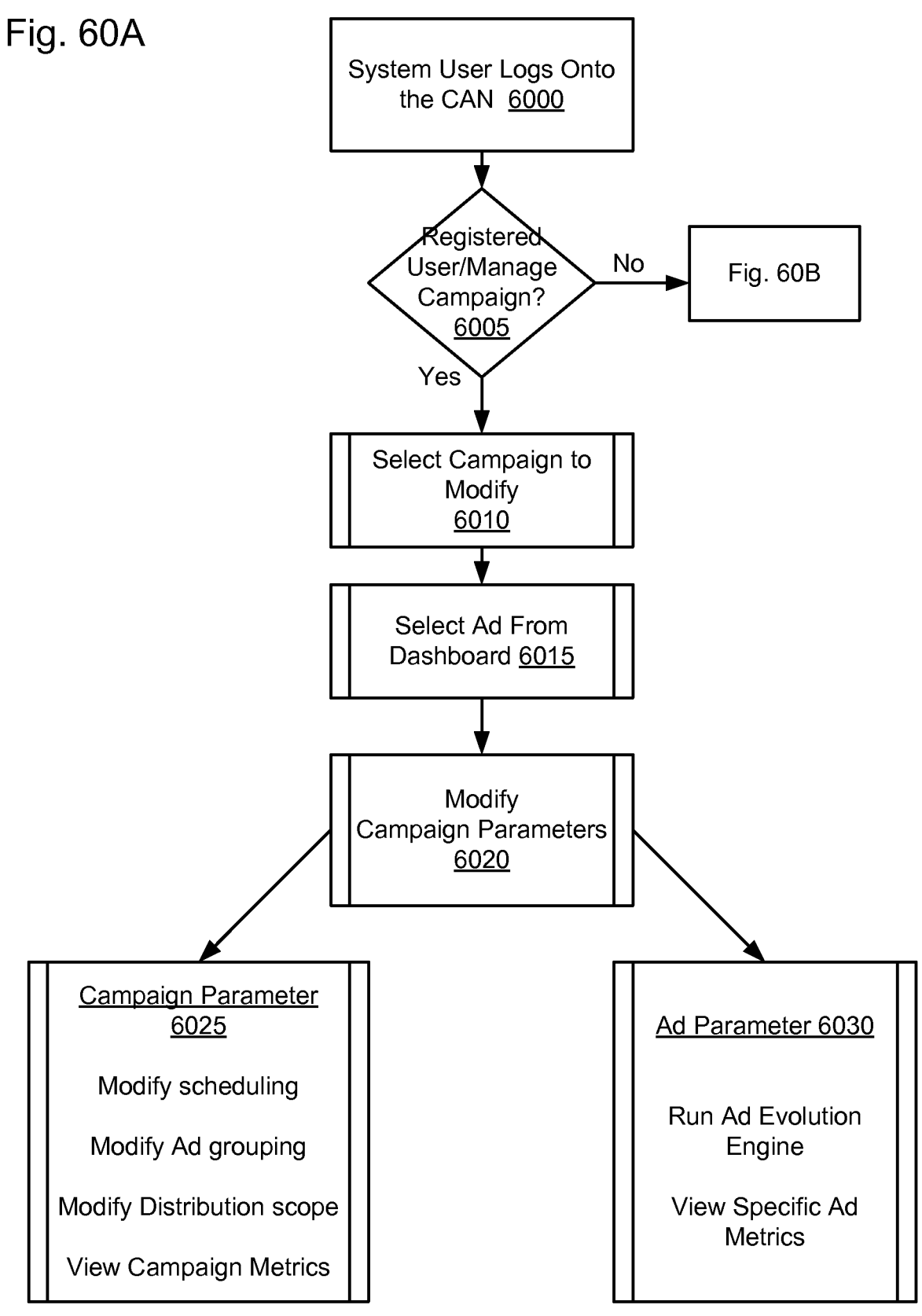
FIGS. 60A-60B are flow diagrams illustrating aspects of the interaction between a system user and the system according to an embodiment of the invention.
Figure 60B:
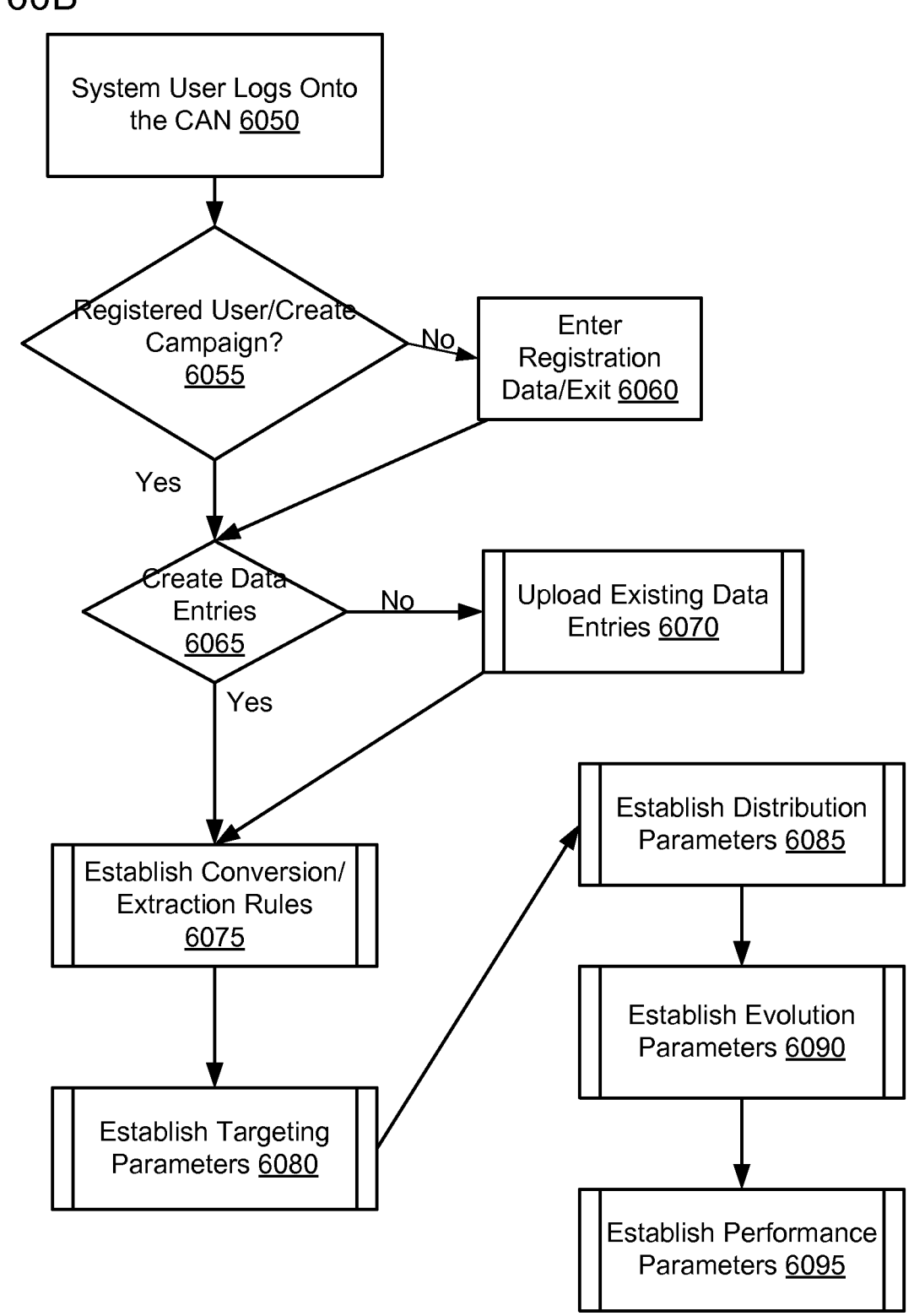

FIGS. 60A-60B are high-level flow diagrams illustrating a system user campaign management functionality associated with the system: campaign creation and campaign management. The system user attempts to log onto the CAN in step 6000. If the user is not a registered user, the system user must go through a registration process. However, at this point (step 6005) the system branches between campaign management (6010-6030) and campaign creation (in FIG. 60B).

If the system user selects the campaign creation branch in step 6005, the system user moves into a campaign selection module 6010. In one embodiment, after the system user's campaign has been selected, the system user can then choose an ad from a management dashboard (shown in FIG. 61A) in step 6015. In an alternate embodiment, the system maintains a CAN widget (shown in FIG. 61B) instead of the management dashboard. Step 6020 involves modifying the parameters of the campaign in step 6030 or the advertisements that make up a campaign in step 6030. By way example only, the system user can modify campaign scheduling parameters, add or drop advertisements from a campaign, modify the advertisement distribution scope; or view campaign performance metrics. Furthermore, the system user can modify single advertisement parameters, designate a particular advertisement for evolution engine optimization or view specific advertisement performance metrics.

FIG. 60B illustrates aspects of the system user campaign creation process. The system user logs onto the system in step 6050 and enters the campaign creation module in step 6055. The system user registers with the system and then is directed to the create new data entry module in step 6065. The system is configured so that the system user can upload existing data entries to the system in step 6070. Alternately, the system user may interact with a listing creation module to create data entries for incorporating into a campaign. Once the system user designates the particular data entries for conversion to advertisements, the system user works with the CAN system to step through the ad creation and distribution process (6075-6095). More specifically, the system user establishes conversion/extraction rules in step 6075 that the system users to extract the key terms from a base data entry. The key terms are then used to populate an empty advertisement template.

In step 6080, the system user selects either basic or premium targeting parameters. The system identifies advertisement distribution opportunities based on a limited data pool. In contrast, if the user establishes premium targeting parameters, the system uses an expansive data pool to determine when to incorporate an advertisement into distributed content. The expansive data pool may be derived from a web user's surfing characteristics obtained through the system or system partners/affiliates. After establishing the targeting parameters, the system user establishes distribution parameters in step 6085. The distribution parameters are user driven parameters, (e.g., a user can determine the distribution scope for an advertisement—whether the advertisement should be incorporated with news content, multiple sports news sites content or a single sports news site's content, or a single sports news site's football content, etc.). In some embodiments of the invention, the user establishes advertisement evolution parameters in step 6090 and performance metrics in step 6095.

Figure 61A:
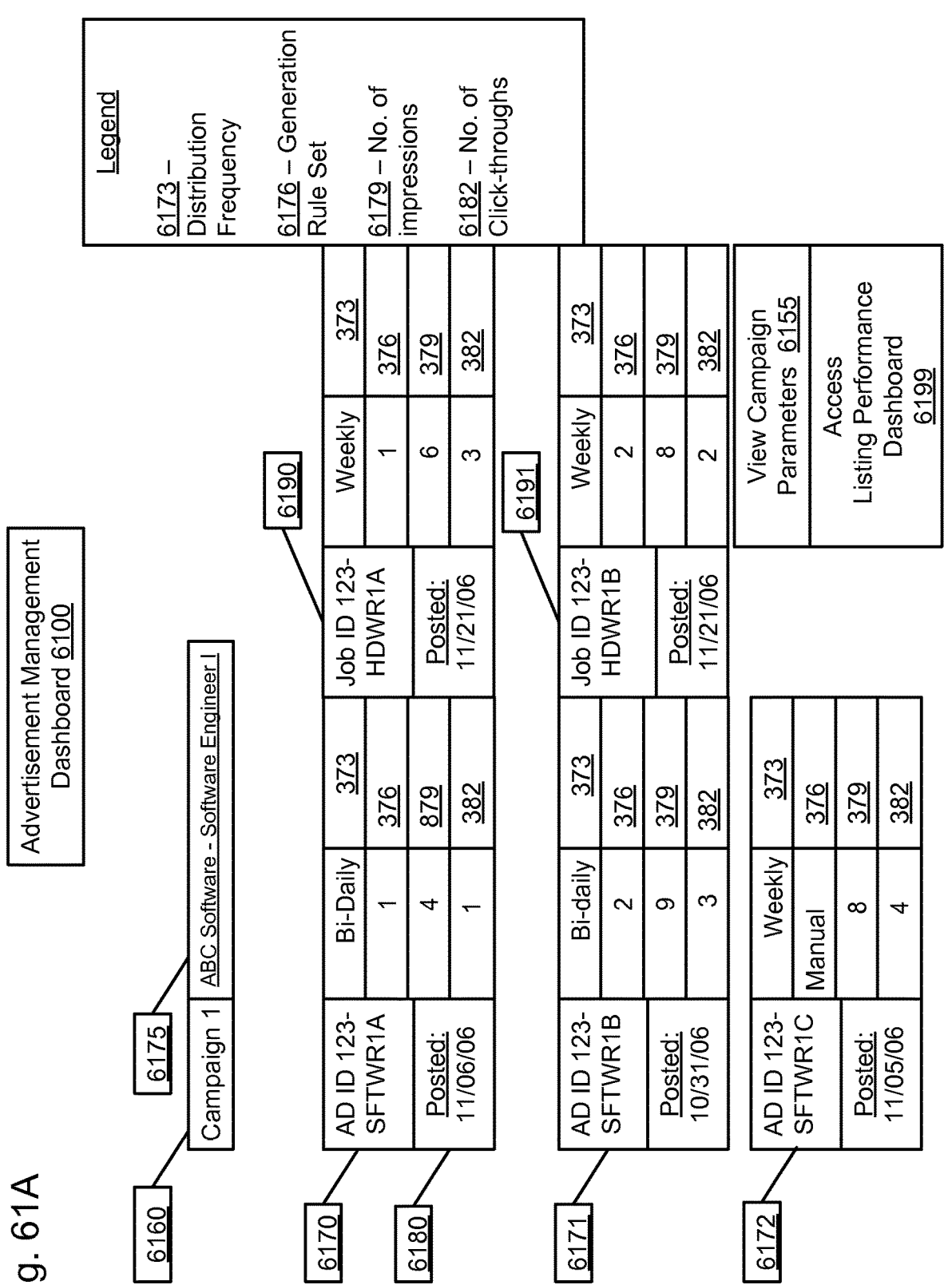

FIGS. 61A and 61B illustrate an campaign management dashboard and a campaign management widget, respectively. In FIG. 61A, the management dashboard 6100 can be configured to display distribution parameters, performance metrics and/or a variety of other parameters associated with a particular campaign 6160. In FIG. 59, the dashboard is configured to display advertisement parameters including the distribution frequency 6173, the advertisement generation rule set user to create the advertisement 6176, the number of impressions 6179 or the number of click-throughs 6182 associated with a particular advertisement 6170, 6171, 6172, 6190, 6191. Advantageously, through the management dashboard, the system user can easily evaluate the performance/generation/distribution metrics associated with an advertisement. In some implementations, the dashboard may be configured to display campaign overview parameters 6155 (e.g. the total number of qualified resumes that can be correlated to the advertisements within a campaign, the setting campaign specific distribution parameters, etc.). Also, in some embodiments the dashboard may be configured to display the advertisement in a popup window when the system user mouses over the advertisement identifier. In FIG. 61B, the advertisement management widget 6125 is illustrated displaying campaign-level parameters (including sponsor name 6120 and campaign name 6122). However, it is to be understood that the widget can also be configured with display functionality similar to that described above with regard to the management dashboard. The system user may change the displayed parameters/metrics on the widget by selecting the desired setting from the file menu 6124 and/or the settings menu 6126.

FIG. 62A is an example of a base data entry (narrow listing) directed to a software engineering job opportunity hosted by an employment opportunity host web site (e.g., Monster.com). By way of example only, the CAN may be configured to identify and extract certain key parameters from the full data entry during the advertisement generation process. It is to be understood that the CAN may be configured to coordinate with a variety of data entry host web sites beyond the employment opportunity context. For example, the key term identification and extraction process may be keyed to a variety of shopping web sites, real estate listing web sites, and/or travel web sites. In the example illustrated in FIG. 62A, directed to an employment opportunity example, the CAN extracts key terms such as the name of the data entry sponsor 6255. Alternately, depending on the characteristics of an employment opportunity, the key terms may be based on parameters such as: opportunity tide 6260, offered salary 6265, geographic location, 6270, job description 6275, required qualifications 6280, and/or key benefits 6285. Depending on the established generation rule set, different combinations of key terms may be used to generate the advertisement.

Ad Generation

Figure 62B:
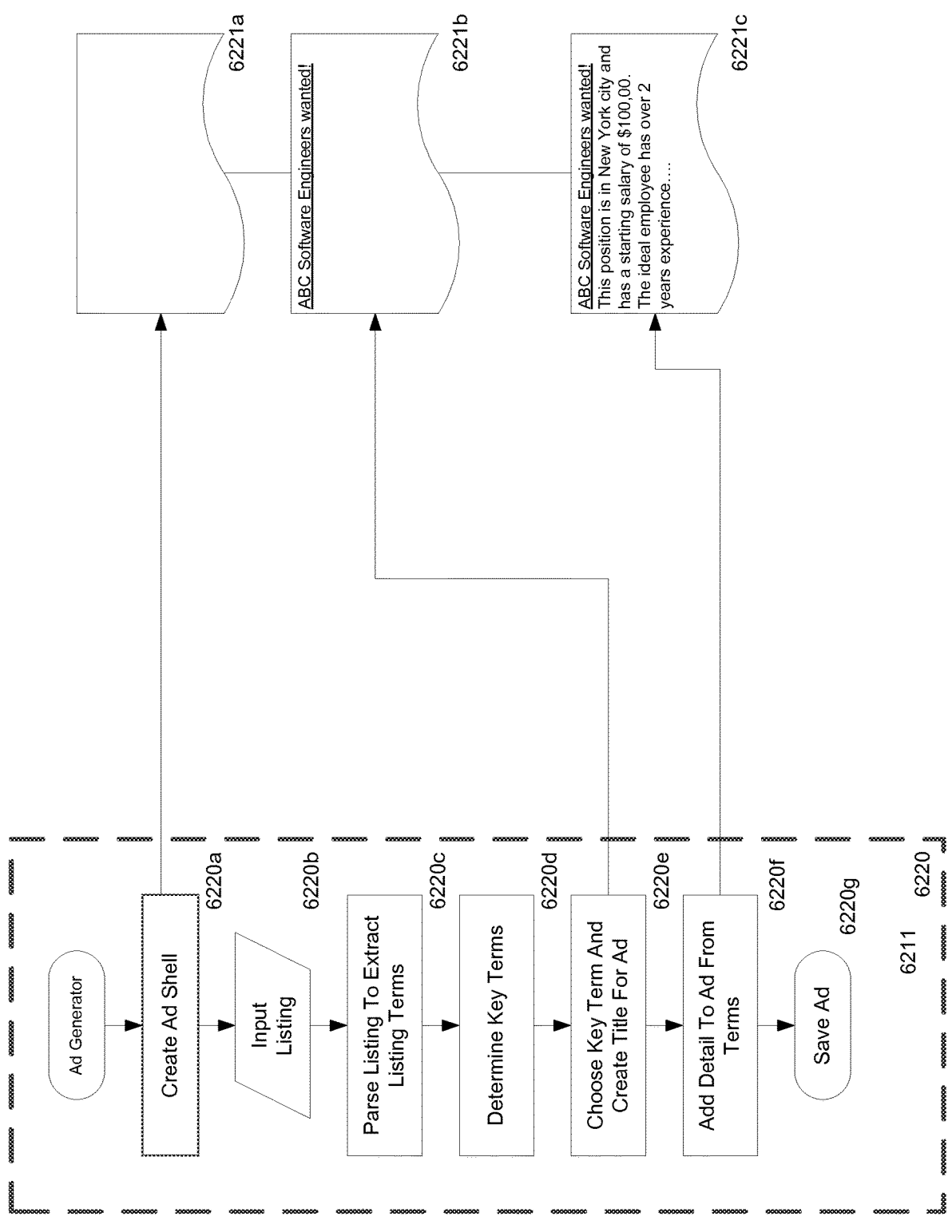
FIG. 62B illustrates aspects of the base data entry conversion process for creating an advertisement, according to an embodiment of the invention.

FIG. 62B shows an exemplary process 6220, which would be performed by the MEN, for generating an ad 6221 from a job listing 6250. The first step 6220a of the ad generation process begins with the creation of an ad shell 6221a. Next in step 6220b, the job listing 6250 is input to the process.

The job listing is then parsed to extract the job listing terms 6220*c*. In the parsing step, an advertisement generator module categorizes and tags the information extracted from the job listing. For example, the listing may be parsed to extract one or more of the following: the job tide, company, job location, job category, experience required, level of education, salary, company logo, graphic, etc. The parsing can be implemented in a number of ways. For example, the job listings can be pre-tagged with a mark up language, such as XML, to identify the contents of the job listing. In another embodiment, the relevant data from the job listing could be extracted using data entry personnel. In a further embodiment, the data can be extracted from the job listings using natural language processing software, such as the open source program Mallet (mallet.cs.umass.edu) to identify and categorize the relevant information.

The extracted listing terms are then used to determine the key terms 622*od*. The key terms represent the extracted and categorized portions of the job listings. For example, in the context of job listings key terms might include job title, company, logo, location, full-time/part-time, industry, category, experience, career level, education required, salary, a descriptive tag, and a full description. The key terms can then be used to create the generated ad 6221. Since the detailed job listing is likely to have more key terms than can be reasonably inserted into the ad, only a subset of the key terms might be used in the ad. In one embodiment, for example, the decision of which key terms to use in the ad can be based upon templates implemented as ad generation rule sets. For example, the template might indicate that the job title is used as the title of the ad and company and salary are used as detail for the ad.

In the alternative, the key terms of the ad can be examined on an ad hoc basis to look for unique details or selling points that are used to choose which terms to use in the ad. This could be embodied by various rule based decisions programmed into the ad generation algorithm. One rule, for example, might check if the salary for the type of job listed is higher than average. If so, the system could choose to highlight the salary by referring to it the title of the ad. Another rule might check to determine if the job is in a desirable location. If so, this fact would be highlighted by the generated ad. A further rule might include a graphic or company logo in the ad if one is present in the job listing. A further rule could include a company logo if the company is above a certain size or is otherwise well known because candidates are more likely to apply for a job with a company they are familiar with.

Using either of the described techniques, or a combination of the techniques, one or more of the key terms are selected for the title 622*oe* and inserted into the ad shell 6221*b*. In addition, the details for the body of the ad 622 of are also selected from one or more of the key terms, which are inserted into the ad shell 6221*c* to create a final ad. In adding the title and details into the ad, the ad generation algorithm might add additional language to the inserted key term or the facts provided by the key term might be rewritten. For example, as shown in the FIG. 62B embodiment, the job listing term "Qualification—Two or more years of extensive experience" is rewritten as over 2 years of experience.

Ad Optimization

Figure 63:
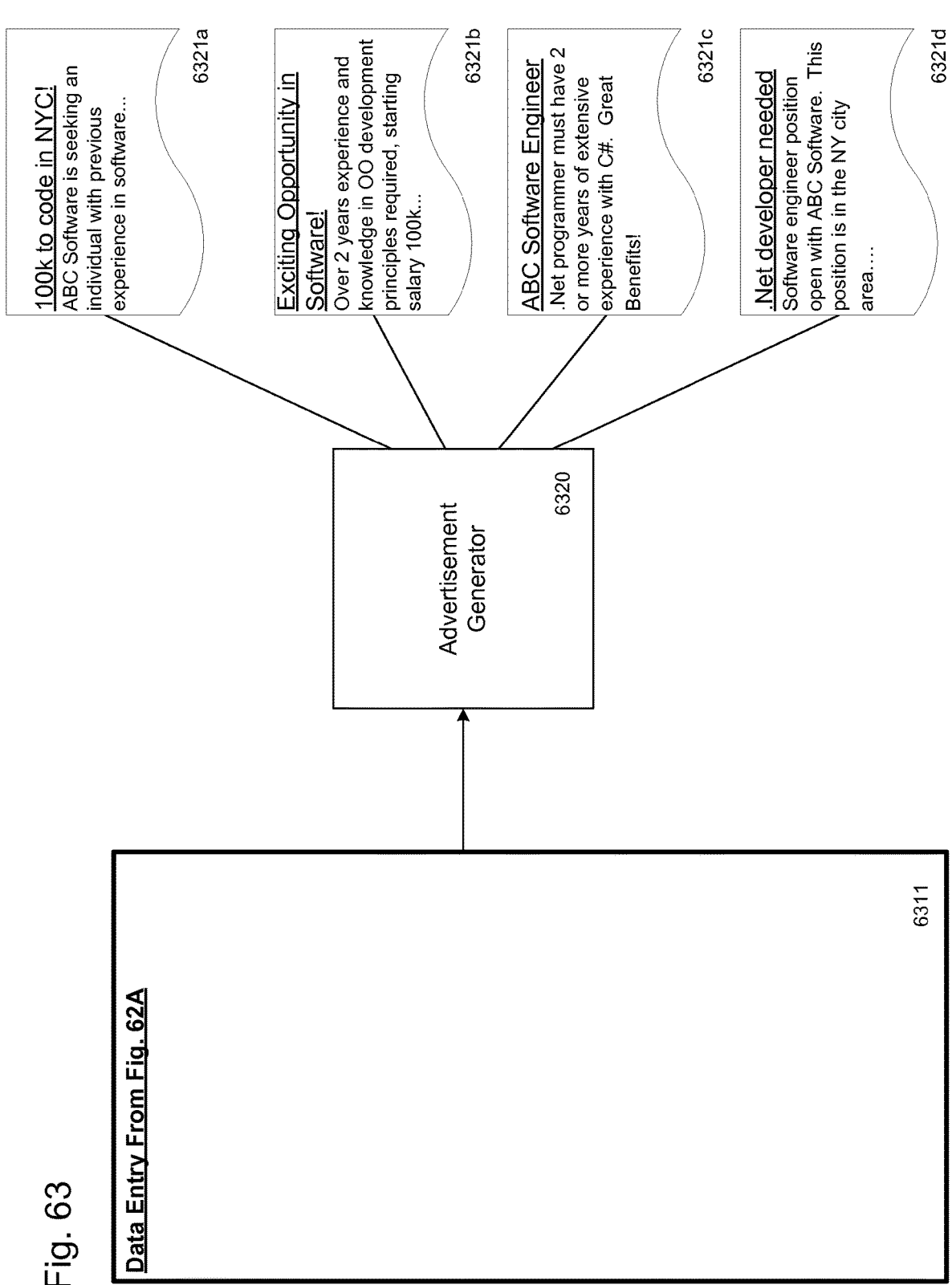
FIG. 63 illustrates aspects of examples advertisement generated by the system, according to an embodiment of the invention.

FIG. 63 shows the generation of multiple ads from a single job listing 6311 (based on full data entry 6250 from FIG. 62A). Generating and distributing multiple ads can based on the same data entry optimizes ad effectiveness. To create multiple ads, the advertisement generator 6320 chooses generation rule sets (different key terms for the title and ad detail) used to generate ads 632*ia-d*. The generated ads 632*ia-d* could be used to optimize the ad placement process by displaying the ads to multiple candidates to determine which of the ads are most effective. Or the ads could be targeted based upon information known about the site visitor to provide the most effective ad for the particular individual that will be viewing the ad.

Figure 64:
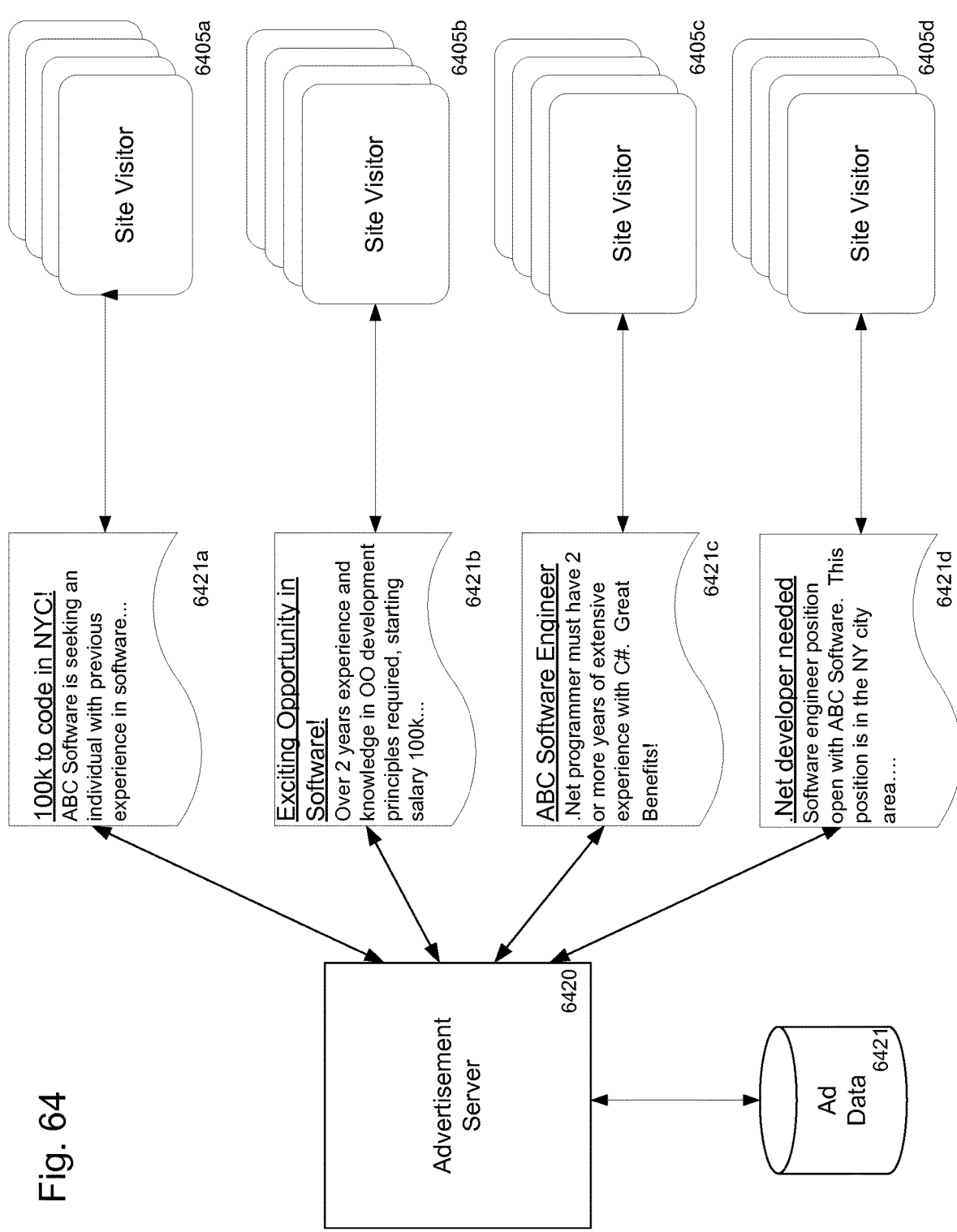
FIG. 64 illustrates aspects of ad evolution, according to an embodiment of the invention.
Figure 65:
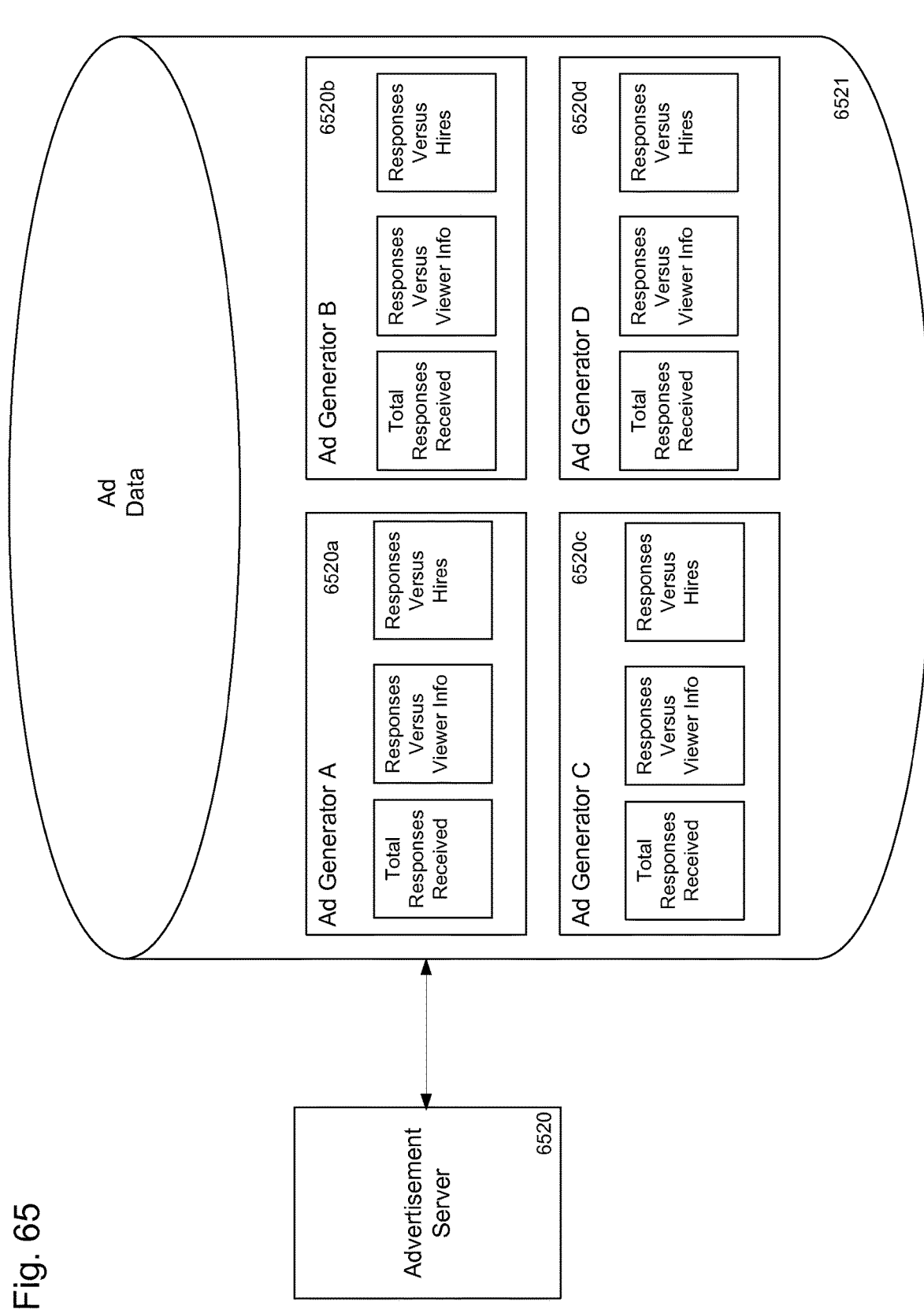
FIG. 65 illustrates aspects of ad generation and distribution, according to an embodiment of the invention.

As shown in FIGS. 64-65, the effectiveness of each of the multiple generated ads can be determined by displaying the ads to various site visitors and recording their responses. The site visitors' reactions to the ads can be gauged in a number of ways. One basic measurement of ad success is click-throughs, i.e., the number of site visitors that click on the ad link for more information. An enhanced measurement of ad effectiveness is the number of site visitors that click on the ad and ultimately submit a job application. This metric is in some ways better than simple click-throughs because a submitted application demonstrates that the site visitor, not only found the ad compelling, but also found the underlying offer relevant enough to submit an application/resume. In contrast, a click-though metric may only indicate that the ad is broadly appealing, without identifying whether the ad is attracting relevant candidates. Another metric of ad effectiveness would track whether the candidates who submitted applications based on clicking through to the ad were ultimately hired. While this information would indicate that the ad brought in a suitable candidate, it may only be useful when there are a relatively large number of offers to be fulfilled. For example, if only one position needs to be filled, the hiring of a candidate ends the need for the ad.

As shown in FIG. 64, to gather the ad effectiveness data the advertisement server displays each of the ads 642*ia-d* to groups of site visitors 6405*a-d*, either directly or indirectly via an affiliate content server. Data about the effectiveness of each of the ads, e.g., click-throughs or applications submitted, is communicated back to the advertisement server. This information is associated with its respective ad and stored in an ad data store. For example, if one of the site visitors 6405*a* responds positively to ad 6421*a*, that fact is recorded in the ad data store. Additionally, meta-data about the site visitor 6405*a*, such as their location, education level, etc., may also be associated with the record indicating ad success. This information can then be used to determine whether the particular ad is effective at reaching a target audience.

Ad Evolution

An alternative to judging the effectiveness of particular ads, would be to judge the effectiveness of the various ad generation techniques used to create the ads. Determining the effectiveness of the ad generator has the advantage of being applicable beyond the limited case of a specific ad. For example, determining that a particular ad generation technique or algorithm is effective allows that ad generator to be used to produce additional effective ads for other listings. A further advantage could be had by associating the ad generator effectiveness with characteristics of the job listing for which the ad is created or with characteristics regarding the site visitors who responded to the ad. For example, measuring ad effectiveness might demonstrate that certain types of candidates value high pay over a flexible work schedule or visa versa. An employer, or the system, could then choose the ad generator that will best attract the most relevant candidates. That ad generator would be used to generate the ad.

FIG. 65 shows an embodiment for optimizing the effectiveness of particular ad generators. As shown in the figure, ad server 6520 communicates with the ad data store 6521 to record the effectiveness of various ad generators 652*oa-d*, rather than the ads themselves. The ad generators 652*oa-d* might represent any of the various ad generation techniques discussed above. For example, each of the ad generators may be a different ad generation template that is applied to the listing to generate the ad. Or, the ad generators may be rule based software algorithms that make ad hoc determinations based on the key terms extracted from the job listing.

Similar to the ad optimization discussed above, information recorded about the effectiveness of the ad generators might include, the total responses received by its generated ads, which could be measured as click-throughs. The responses may also, or alternatively, be recorded with associated data about the responding site visitor, which would enable the system to use ads/ad generators targeted to the site viewer in questions or targeted to the desired candidates. The quality of the ad generator can also be measured by the number of candidates successfully hired after responding to its generated ads. In the context of ad generators, this information is particularly valuable because successful ad generators can be used to produce ads for other employers based on their listings. The ad optimization data recorded might also include details about the job in question, which could then be used to identify whether particular generators work better for certain jobs. For example, a particular ad generator might work better at writing ads compelling to sales people, while another ad generator might write ads compelling to researcher scientists.

Ad Targeting/Distribution

Figure 66:
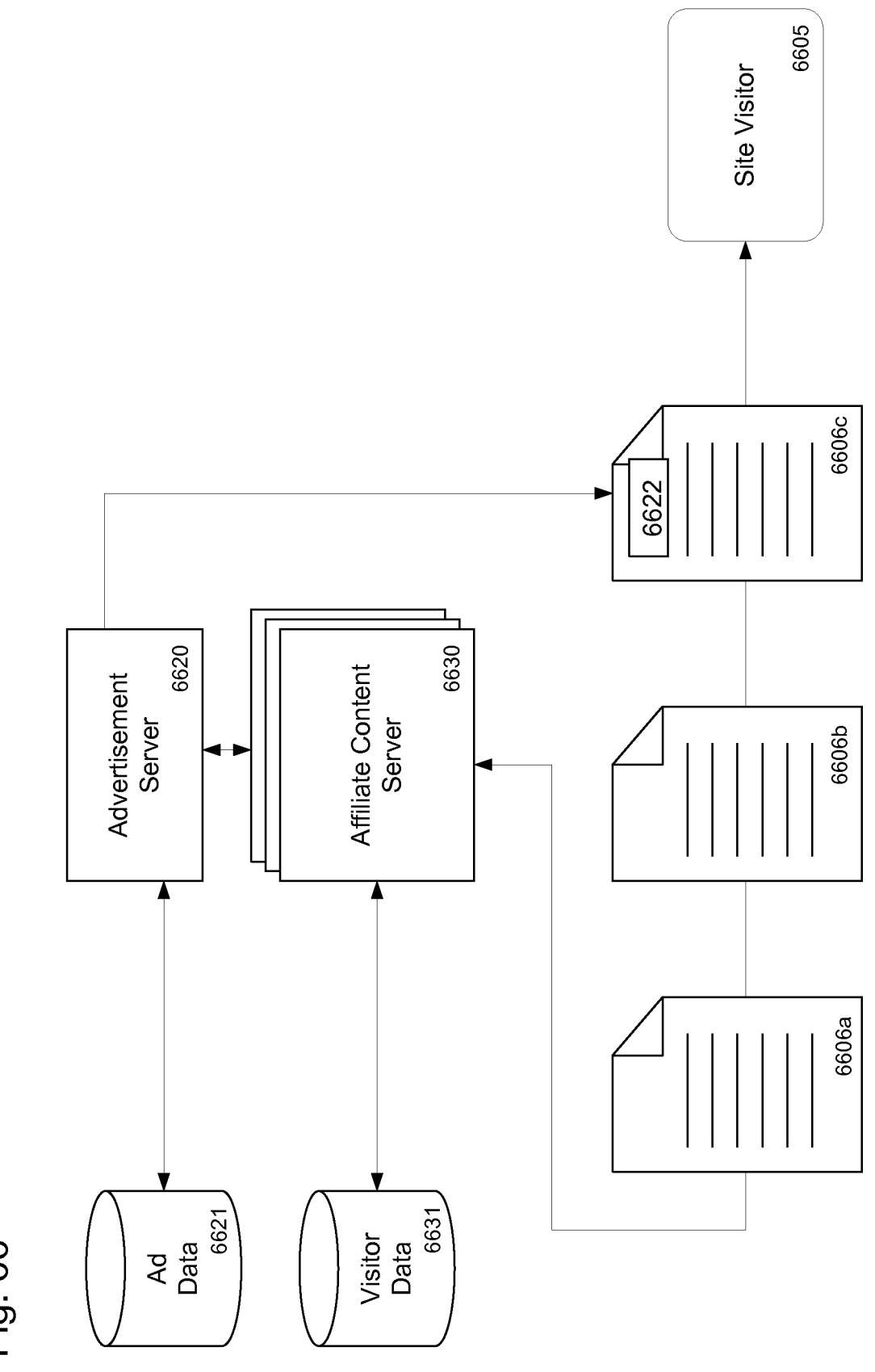
FIG. 66 illustrates aspects of advertisement generation and distribution according to an embodiment of the invention.

FIG. 66 shows the an embodiment for the placement of ads through the interaction of the advertisement server 6620 and an affiliate content server 6630. In this embodiment, one or more affiliate content servers 6630 request ad serving from the advertisement server 6620. The request may include stored or categorical information about the site visitor 6605 from the visitor data store 6631. The information about the site visitor 6605 could have come from a number of sources. For example, the site visitor information could have been derived during the current web content session/interaction between the affiliate content server and the site visitor, such as information derived from the site visitors viewing and interaction with affiliate content pages 6606*a* and 6606*b*. Or, it could come from information received and stored during the site visitor's previous interactions with the affiliate content server. In addition, two or more different affiliate content servers might share or combine their saved site visitor data. Site visitor data might also have been previously stored by the advertisement server. For example, the site visitor data might be associated with a site visitor identifier, e.g., a cookie, the advertisement server might keep data indicating visitor characteristics associated with the identifier. In this way, the advertisement server can correlate information about the site visitor that was previously provided by one or more affiliate content servers and the advertisement server can track which ads were of interest to the site visitor. For example, if the site visitor had previously clicked on ads for java programmers, the advertisement server will have a highly relevant data point to indicate that programming jobs are of interest to that visitor.

In one embodiment, the site visitor's use of the affiliate content server service results in information about the site visitor being provided to the affiliate content server. For example, the affiliate content server may provided personality tests, skills evaluations, I.Q. tests, career recommendations, etc., such as the tests provided at tickle.com. When the site visitor uses the affiliate content server, information about himself or herself is gathered. In another example, the site visitor may have filled out a user profile that provides detailed information about him or herself. In another example, the affiliate content server may provide social or business networking services, such as myspace.com or linkedin.com. In using such a service, the site visitor may create a web page providing details about the users skills and interests. In another example, the affiliate content server may provide career services like monster.com. In using the service the site visitor may have uploaded a resume or created a user profile that indicates the user's skill set, educational background, work experience, interests, etc. In this way, it can be seen that the affiliate content server and the listings server may be one in the same entity.

Regardless of the mechanism in which information about the site visitor is recorded. Some or all of the recorded information is provided by the affiliate content server 6630 to the advertisement server 6620. In addition, information about the site visitor might be added based on context of the affiliate content site or added by categorizing the affiliate content site itself. In other words, a particular affiliate content site might indicate for itself that particular characteristics apply to all of its site visitors, or this determination may be made by the operators of the advertisement server. For example, an affiliate content site directed to semiconductor industry news might set forth that all of its site visitors are involved in the semiconductor industry. Or, the advertisement server might make that determination. In addition, the affiliate content server operator may want to have more control over the companies and types of ads that are displayed on its site and could set characteristics accordingly. For example, an affiliate content site devoted to alternative energy might want to exclude advertisements from oil companies.

Once the characteristics for a particular site visitor are received and gathered by the advertisement server, the advertisement server can use this information to retrieve an ad from the ad data store 6621 and provide an advertisement that is narrowly targeted to suit the site visitor. The search for an ad targeted to the site visitor in question can be accomplished by database searches over the ad data store and associated matching algorithms. For example, if the affiliate content server provides the advertisement server with three facts about the site visitor, the advertisement server can search the ad data store for ads that most closely match the provided criteria. Any discovered ad 6622 can then be inserted into content page 6606*c* and presented to the site visitor by the affiliate content server 6630. If multiple matching ads are discovered, multiple ads can be shown to the site visitor or the ads can be narrowed down based on additional criteria, such as the amount of revenue generated by the ad, the amount of time since the ad was last displayed, etc. The number of ads displayed to the site visitor may be determined by the number of ad positions made available by the affiliate content server. If the number of relevant ads matching the site visitor is less than the number of available ads, the extra ad space can be filled in with broad based ads or ads driving traffic for the system as a whole. For example, ads might drive traffic to the original listing service, e.g., the job listing server.

Figure 67:
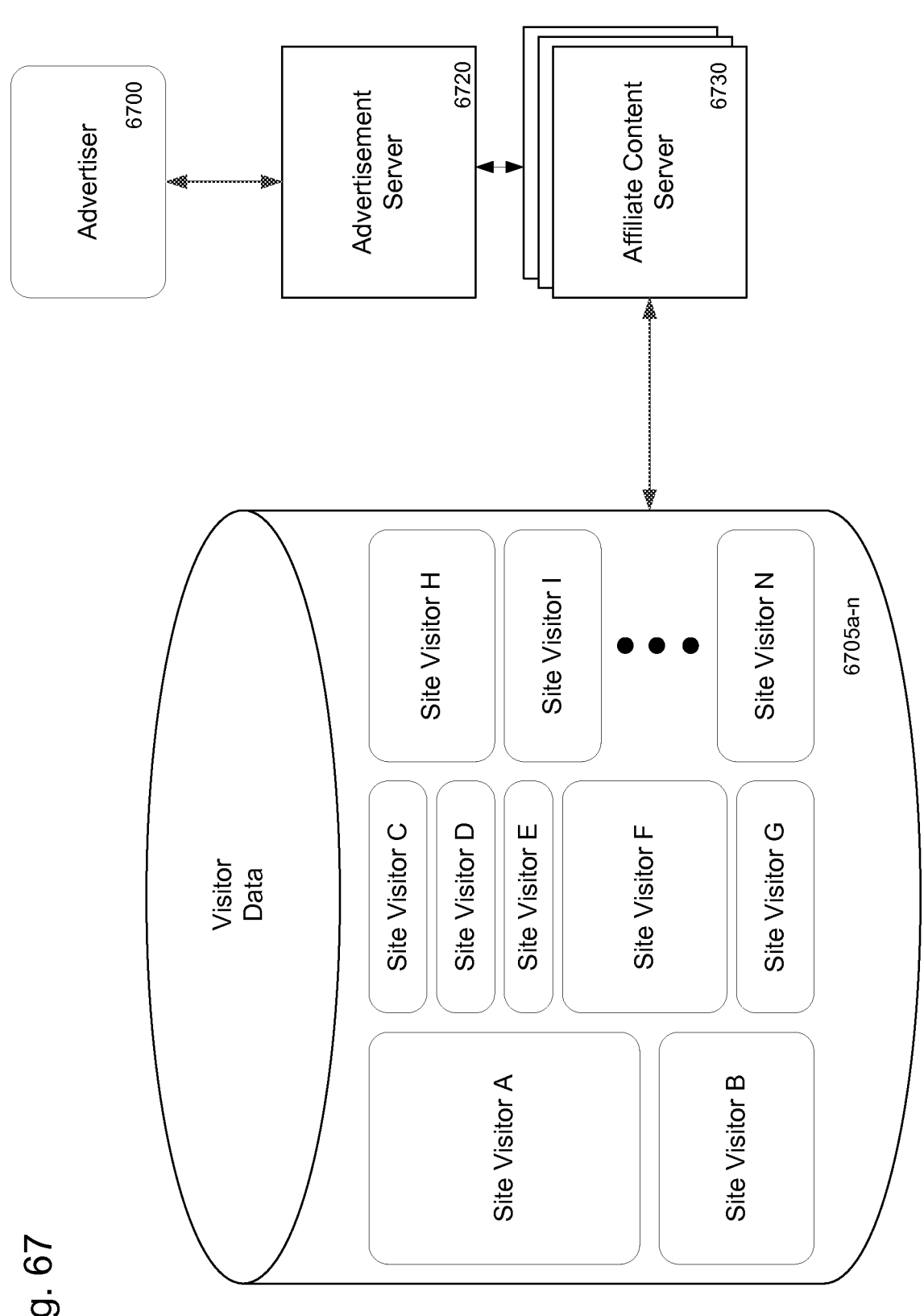
FIG. 67 illustrates aspects of a system database module.

FIG. 67 shows an embodiment of the disclosed system through which the advertisers 6700, e.g., employers with job listings, can have the placement of their ads tailored to the site visitors to which the ads will be presented based on site visitor characteristics. As shown in the figure, site visitor data 6705*a-n* is stored by the affiliate content server 6730. However, the amount of information known about the various site visitors is not uniform, as represented by the different sizes of the site visitor data files. So, for example, more information is known about site visitor 6705*a* than is known about site visitor 6705˜

With this collection of information, an advertiser can choose to only display ads to site visitors with a certain level of known details or with specific known details. For example, an advertiser might only want his ads shown to people working in e information technology and living in or around New York City, or only to known college graduates. The advertisement server can also price the ads based upon the level of details known about the site visitor. For example, an advertiser might buy fewer, more expensive, narrowly targeted ads. Or, the advertiser could buy a larger number of cheaper less targeted ads.

In an alternative addition to the embodiment, the affiliate content provider might choose the amount of site visitor information they would like to provide to the advertisement server. In this way, if a site provider is sensitive about releasing particular information or certain amount of information, it can choose to release less than all of its information to the advertisement server.

Another aspect of the disclosed invention is that the compensation provided to the affiliate content server can be determined based upon the amount of information about the site visitor provided. In this way, affiliate content providers can be rewarded by providing more information, which will result in more effective ad choice and placement. If an affiliate content provider would like to provide reduced information about their site visitors, they can receive broader less profitable ads.

Figure 68:
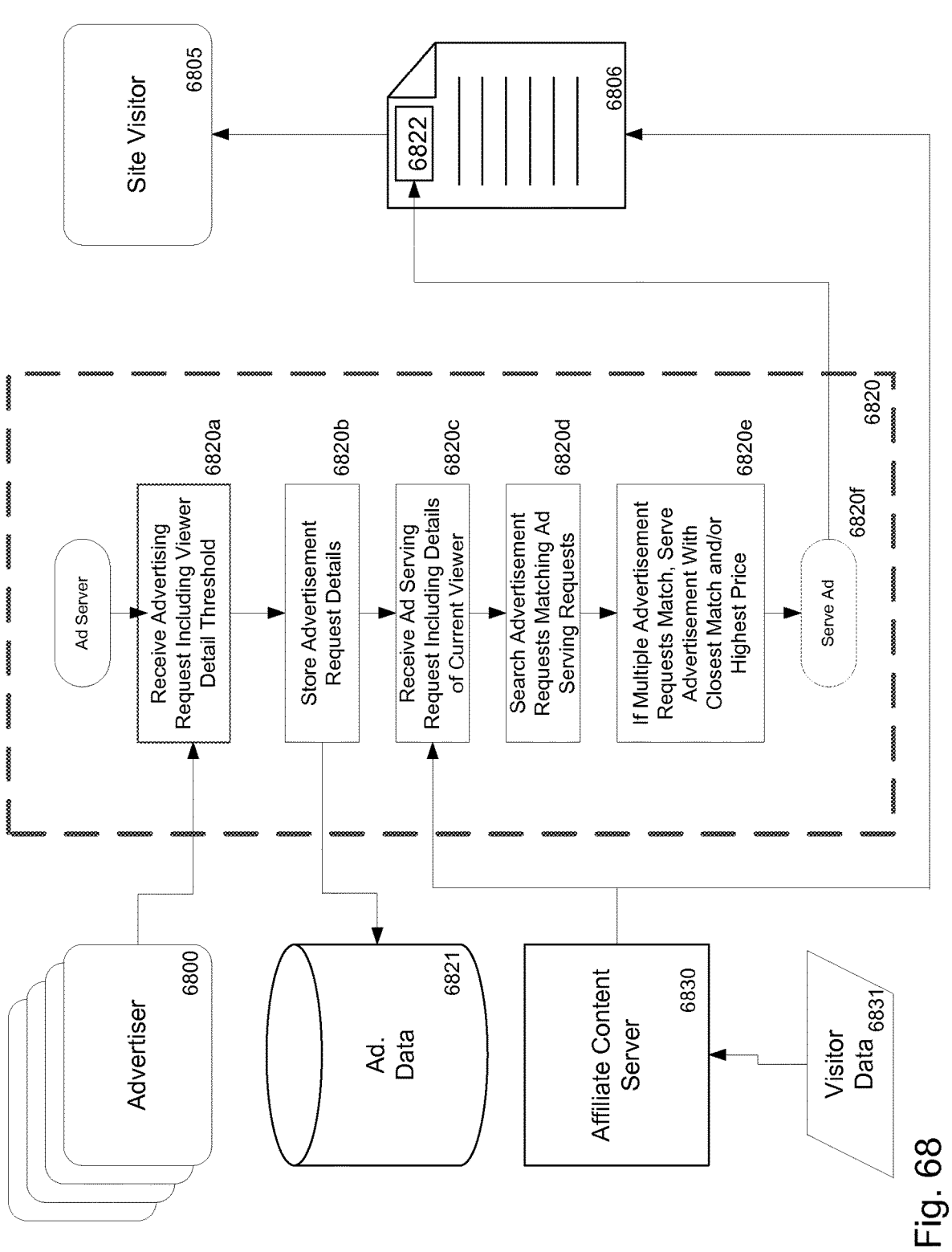
FIG. 68 illustrates an ad distribution module, according to an embodiment of the invention.

FIG. 68 shows an exemplary process and flow diagram for ad serving in accordance with the disclosed system. One or more advertisers 6800 submit a request for advertising, which is received by the ad server 6820*a*. Along with the request, the advertiser may include information indicating the site visitor criteria identifying preferred candidates for the advertisement and the amount the advertiser is willing to pay. In the alternative, the relevant site visitor criteria can be extracted from the content of the listing. The advertiser might also have specific requests. The advertiser, for example, may require that the ad is only shown to site visitors in a particular geographical region or with a specific education level. Or, the advertiser might simply indicate that its ads should only be displayed to site visitors that match a certain number of its listing criteria. For example, the advertiser might choose a level where the ad is only shown to site visitors that match three or more criteria relevant to its offer. The ad server can then store the advertisement request details 6820*b* in the ad data store 6821.

An affiliate content server 6830 will interact with the ad server to request ads to be displayed in the affiliate content server's content pages 6806. The affiliate content server 6830 will display its content to site visitor 6805. In interacting with the site visitor, or through previous interactions with the site visitor, the system develops site visitor data 6831. The site visitor data 6831 may be passed to the ad server along with the request for ad serving. Upon receipt of the ad serving request 6820*c*, the ad server searches 682*od* the ad data 6821 for ads matching the request, including any supplied visitor data. If multiple potentially matching ads are discovered in the search, the ads with the highest price and/or the closest match to the submitted data are served 6820*e*. If only one ad is discovered, that ad is served. The ad to be served 6821 is inserted into the affiliated content server's content page 6806. This can be done directly by the ad server 6820 or the ad could be provided to the affiliate content server for insertion into the content.

In an alternative embodiment, instead of using pre-generated ads stored in the ad data store, the advertisement server may directly search the job listings data store for relevant job listings. If a job listing matching the ad request is discovered, an ad can be automatically generated using the ad generation techniques described above. The ad can then be inserted into the content displayed to the site visitor. In such system the ad data store could either be eliminated or it could be used to store details regarding the advertisers' requests, budgets, criteria, and ad pricing.

Figure 69:
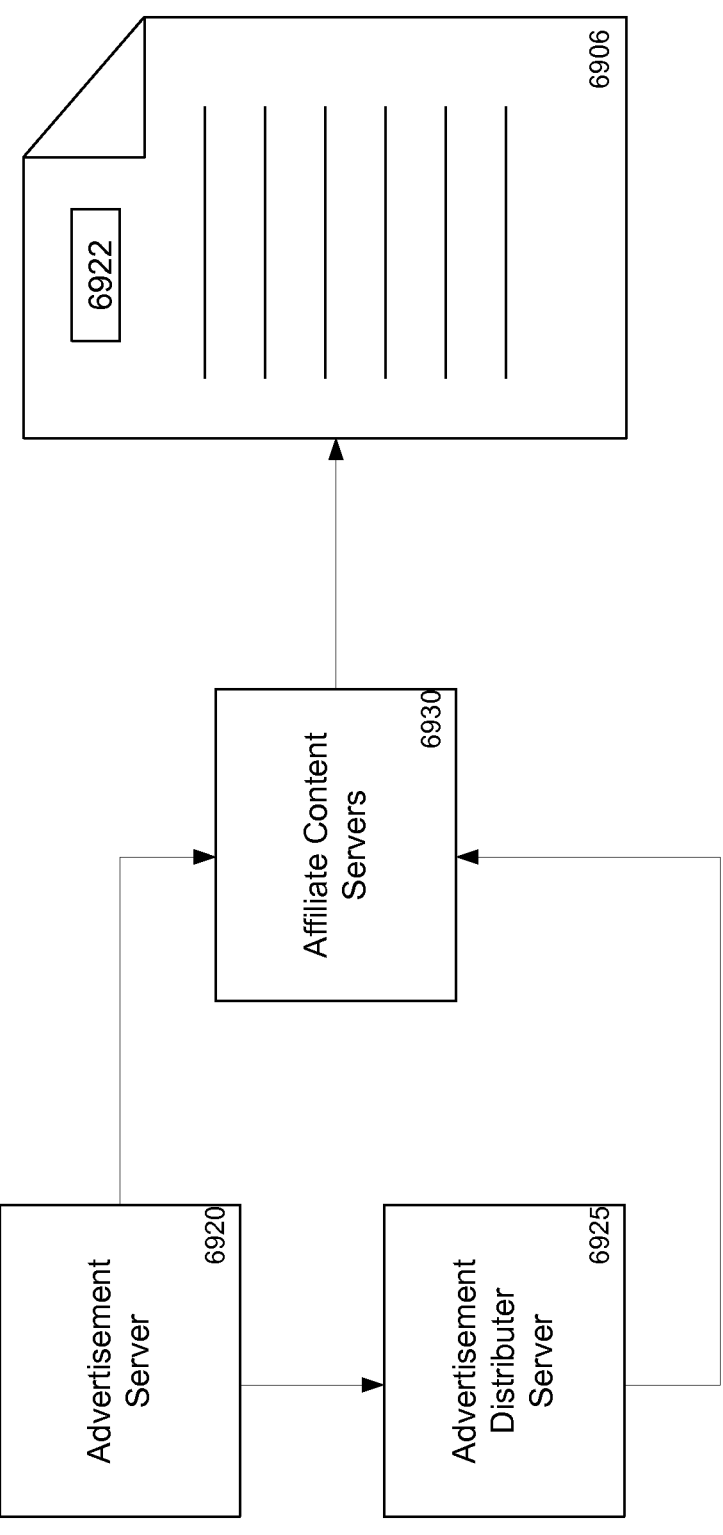
FIG. 69 illustrates another ad distribution module, according to an embodiment of the invention.

FIG. 69 shows an embodiment disclosing advertisement distribution in accordance with another aspect of the disclosed system. As shown in the figure, advertisement server 6920 is in communication with affiliate content servers 6930 and advertisement distribution server 6925. The affiliate content server displays site content pages 6906. The figure demonstrates a number of methods for distributing ads 6922 to the affiliate content server. In one embodiment the advertisement is passed from the advertisement server directly to the affiliate content server. It should be noted that ad could either be delivered as the content of the ad itself or it can be delivered as a symbolic link to the ad content. In another embodiment the ads can be served by a dedicated advertisement distribution server, which might be embodied by an existing commercial ad distribution network. In this way, the advertisement server can take advantage of large commercial distribution networks and have access to affiliate content serves that would like to source their advertisements through such a provider.

Figure 70:
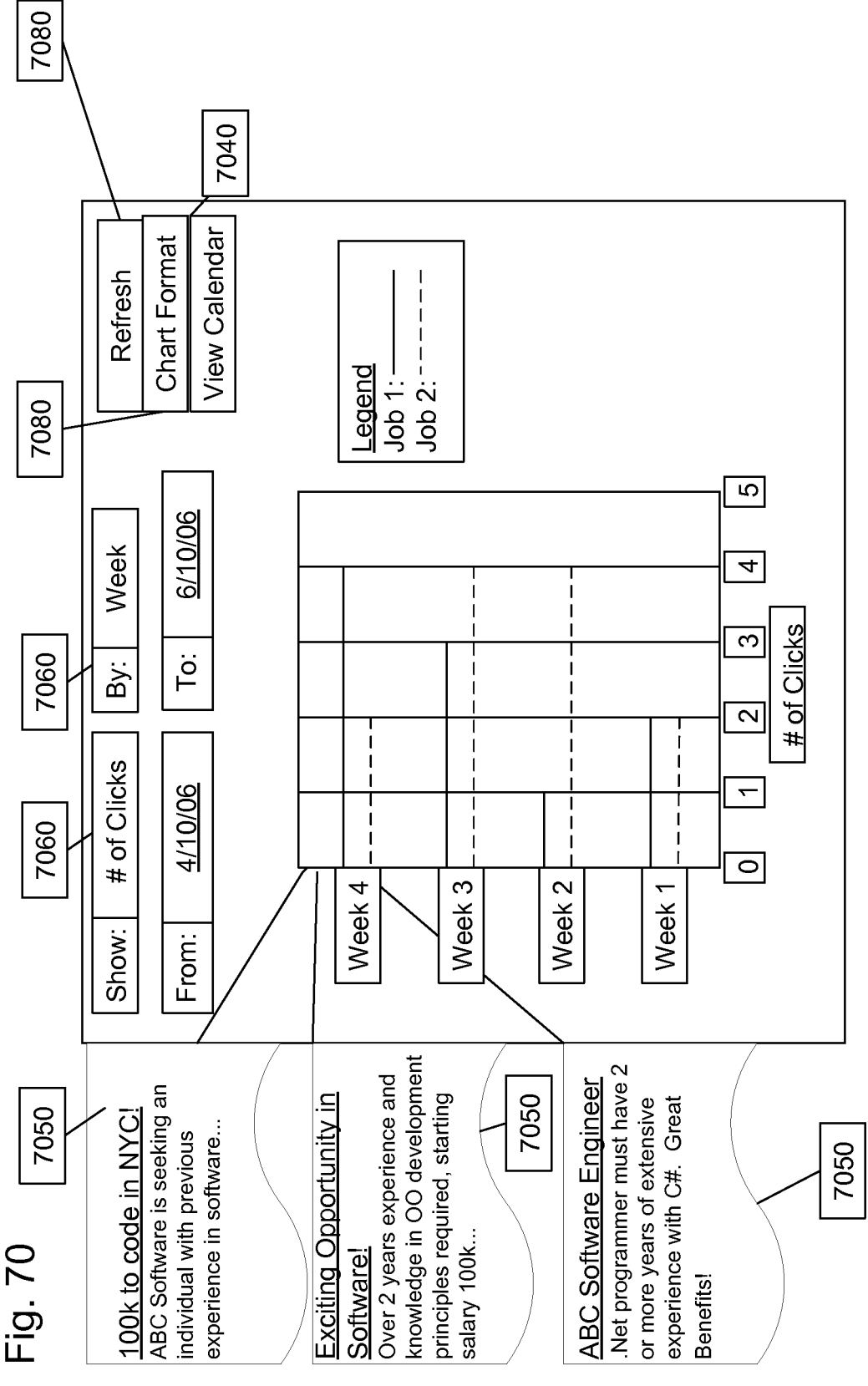
FIG. 70 illustrate aspects of advertisement performance analysis according to an embodiment of the invention.

FIG. 70 illustrates aspects of the management dashboard according to another embodiment of the invention. In this implementation, the performance metrics are displayed directly next to generated advertisements 7050. As illustrated, a system user can manipulate a series of drop-down boxes 7060 in order to view a variety of performance metrics associated with the displayed advertisements 7050.

Figure 71A:
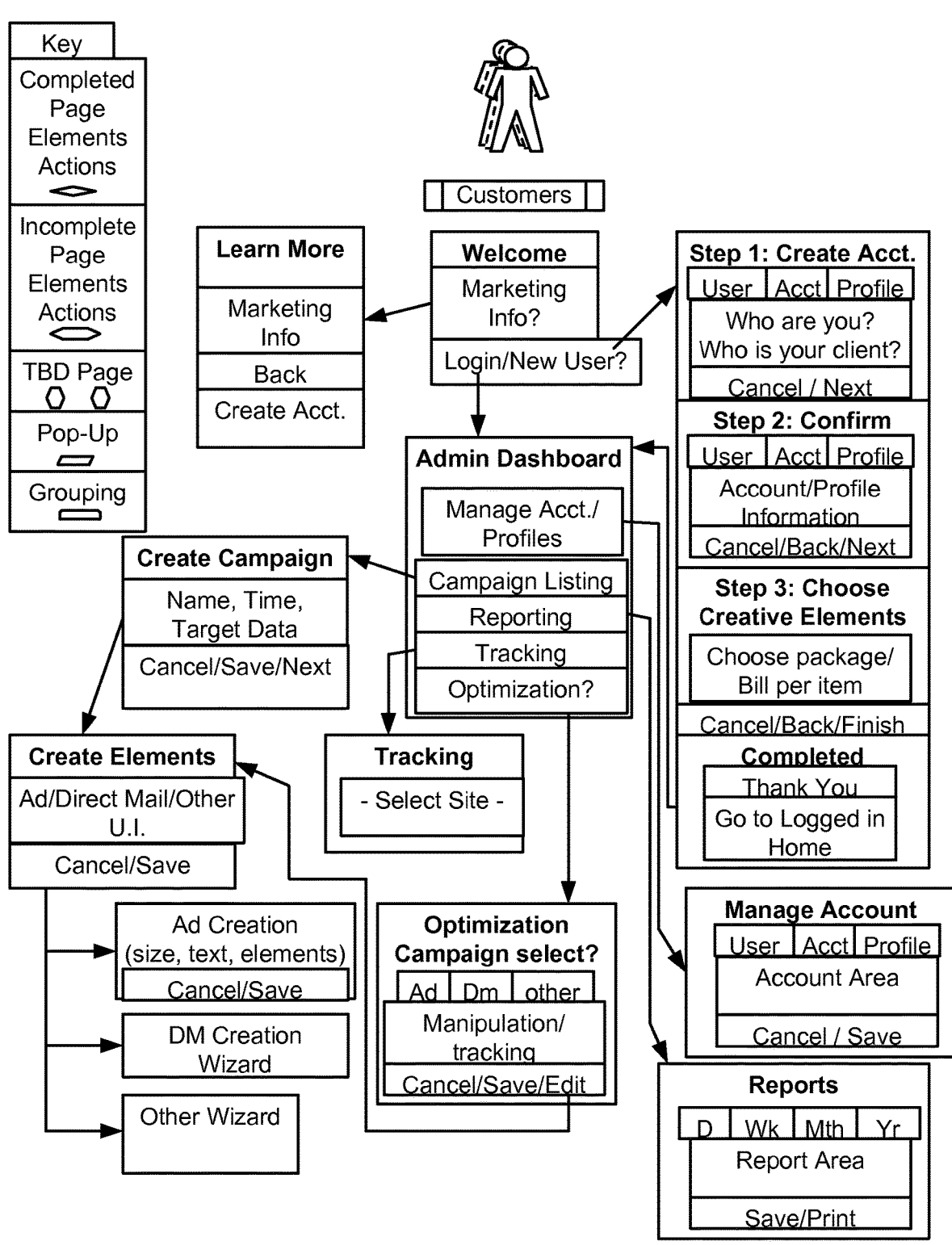
FIGS. 71A-71C illustrate various configurations of the system according to an embodiment of the invention.
Figure 71B:
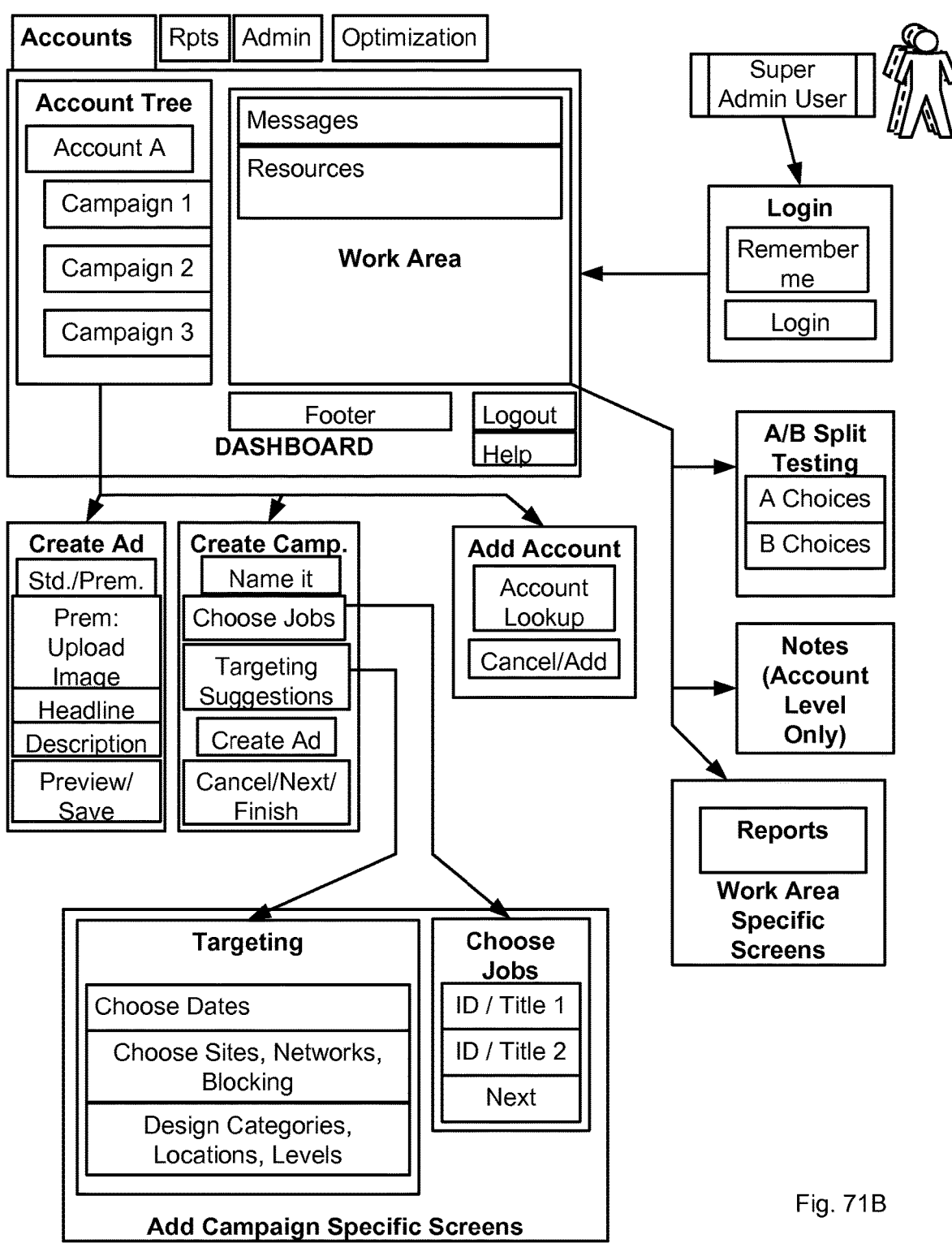
Figure 71C:
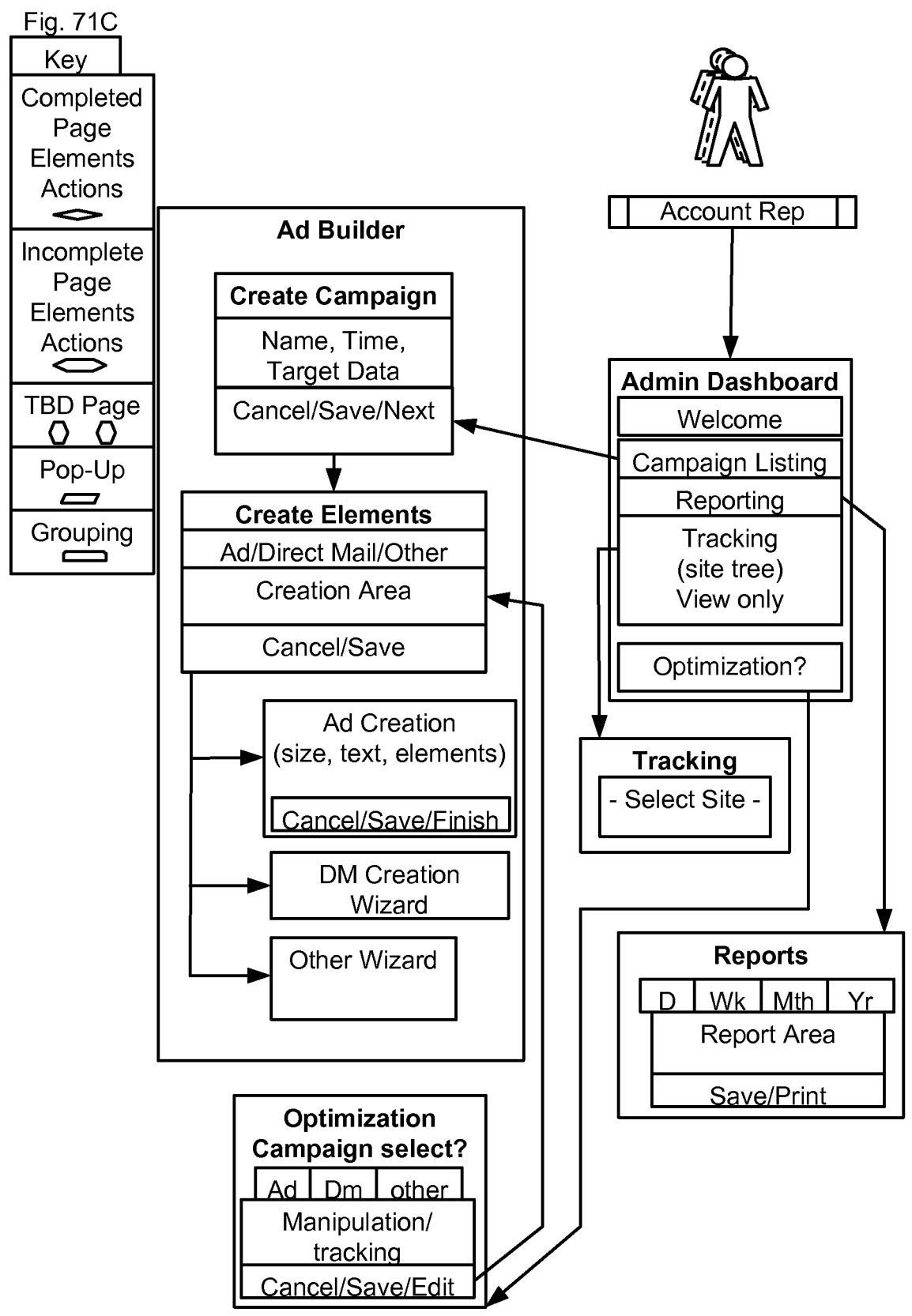

It is to be understood that the system is customizable based on the particular needs of a system user. FIGS. 71A-71C illustrate three different system configurations with functionality that customized for the particular user. The customer system configuration illustrated in FIG. 71A provides enough functionality so that the customer can interact with the system to establish generation/distribution/performance parameters or elect to implement the system default parameters. FIG. 71B illustrates an administrator's system configuration—enabling the administrator full access to all system components. In contrast, FIG. 71C illustrates an account representative system configuration with access to limited generation/distribution/performance metric functionality.

Advertisement Generation

The present disclosure includes a discussion of systems, methods, and apparatuses for generating, managing and distributing advertisements. The disclosed system may be configured to generate advertisements based on a system user's (sponsor's) one or more or narrow listing offers (base data entries), where traditional passive advertising would be ineffective. The disclosed examples are discussed in the context of job placement advertisements, which may be considered as narrow listing offers because they generally are only relevant to a small audience of qualified applicants. Furthermore, job placement advertisements are usually directed to attracting applicants for a limited pool of available positions. It is to be understood that while the system is described in the context of job placement advertisements, the system provides an administrator with significant flexibility and freedom to configure the system for any other number of narrow listing offer or advertisement applications, such as classified product listings including automobiles, personals, real estate, etc.

Figure 72:
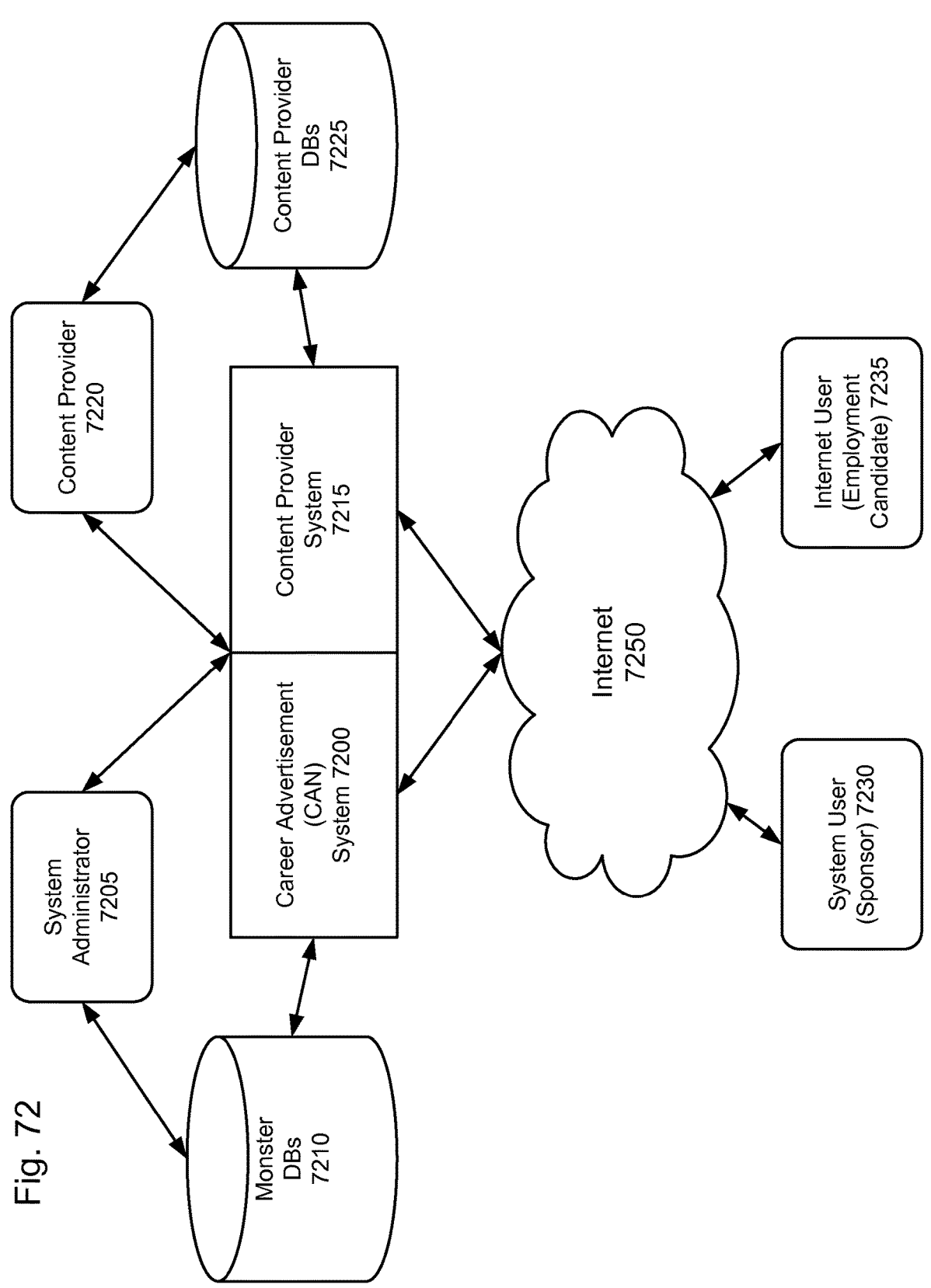
FIG. 72 is a diagram illustrating the entities that interact with the system, according to an embodiment of the system.

FIG. 72 provides an overview of various entities that may interact with the system at various points during system utilization. According to an embodiment of the invention, the Career Advertisement Network ("CAN") 7200 is a central element in the system facilitating the functionality described herein. A system user (e.g., Employer or base data entry sponsor) 7205 connects with the CAN 7200 over the internet 7210 to either create a new advertising campaign or manage an existing advertising campaign. According to an embodiment, the advertisements created and distributed by the CAN 7200 are based on corresponding narrow listings, configured in this example as employment opportunity listings stored within an job listing web site's job listing database (DB) 7215.

The system user 7205 uses the CAN 7200 to create advertisements based on selected job listings stored within the job listing DB 7215. Advantageously, the CAN 7200 incorporates a flexible system user interface, wherein a system user 7205 may determine how much interaction/input they wish to have in the advertisement creation process. Depending on the needs of a particular user, most of functionality associated with the CAN 7200 can be implemented based on automated system processes. Alternately, some system functionality may be may configured so that a system user 7205 can work with a system administrator 7220 or an interactive system module to create/manage an advertisement campaign.

As illustrated in FIG. 72, the CAN 7200 coordinates creating and distributing advertisements with content provider system 7225. In an embodiment, the content provider system 7225 creates and distributes online content from the content provider databases 7235 or other sources. The CAN system creates and distributes advertisements that are incorporated into the content as it is presented to the a web user 7240. Generally, the content provider may be configured as a web site that provides a web user 7240 with online content such as news, entertainment, sports, online media or other types of online content. Furthermore, depending on the actual implementation, the content provider may be an affiliate web site, a partner web site or even hired as an advertisement placement provider.

For example, the content provider 7230 may be configured as a sports news web site. The content provider 7220 distributes various sports news content from the content provider's database 7235. The CAN 7200 may be configured to coordinate incorporating CAN generated advertisements into the content distributed by the content provider's system 7225. The CAN 7200 is configured to create the advertisement based on a variety of factors, some of which may include: a content provider's content, a content provider's advertisement system configuration, web user 7240 characteristics, and/or any variety of other distribution metrics established by the system user 7205 or system administrator 7220. In some embodiments, the CAN 7200 is configured with an advertisement tracking module configured to track and record data associated with a web user's interaction with the displayed advertisement.

Figure 73:
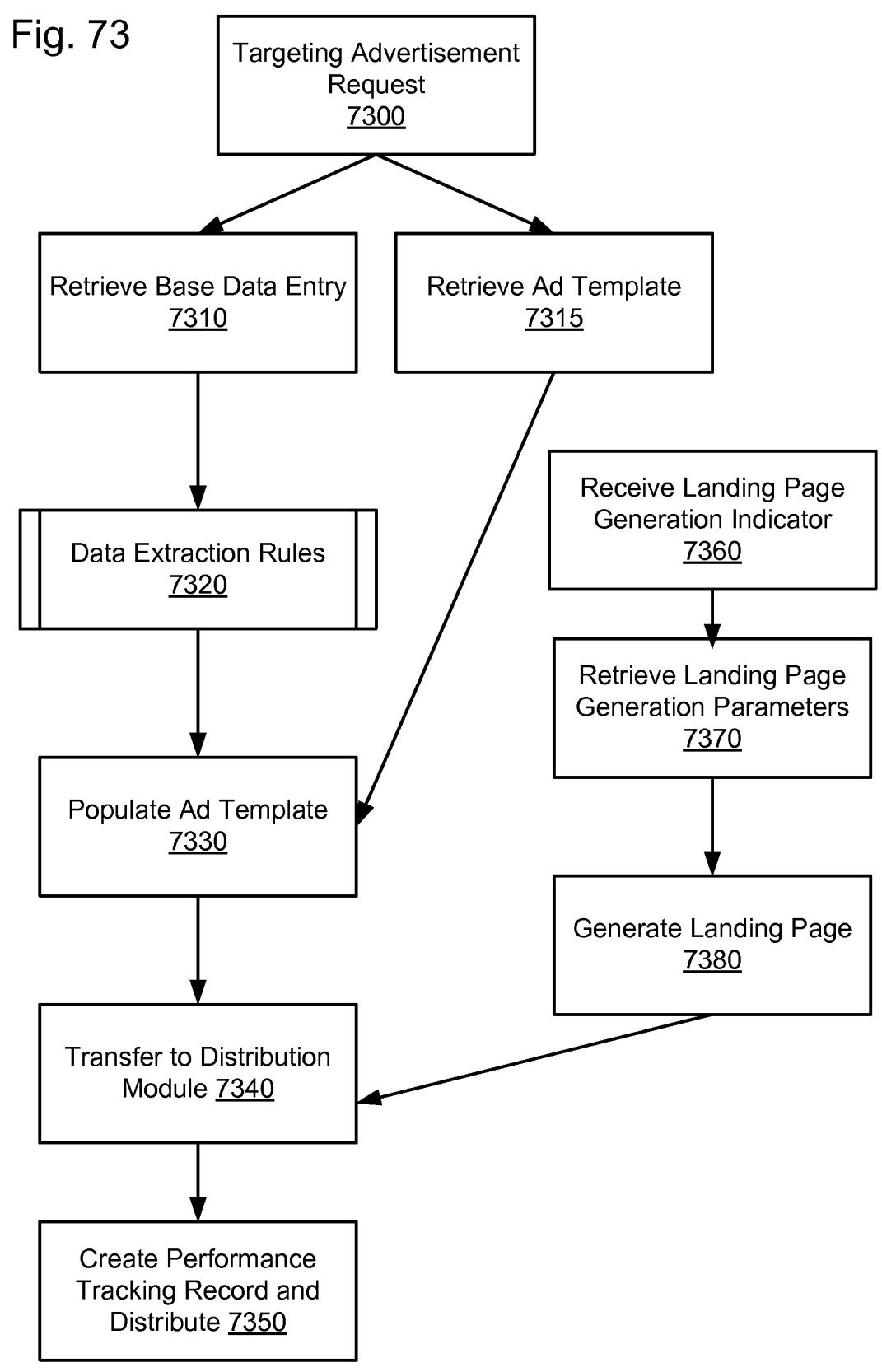
FIG. 73 is an overview flow diagram illustrating aspects of the advertisement generation process, according to an embodiment of the system.

FIG. 73 is a high-level flow diagram illustrating aspects of the advertisement generation process. The system receives an advertisement from content provider/affiliate web site. The advertisement request may specify a variety of advertisement distribution parameters. There are two aspects of the targeting/distribution process that are used during the generation process—content advertisement formatting parameters and the actual content associated with the content provider requesting the advertisement.

The system receives the advertisement request from the targeting/distribution module in step 7300 and the system extracts these parameters from the request. Based on the request content provider parameters, the system retrieves a base data entry 7310 (e.g. If the content provider is a computer engineering news web site, the system may select base data entries directed to software engineering jobs). Further, the system retrieves an advertisement template 7315 based content provider's advertisement request parameters detailing the format parameters associated with the requested advertisement. In step 7320, the system processes the base data entry in accordance with the data extraction rules. As will be described in greater detail below, this process may be driven by a user interacting with a system advertisement generation module or the process may be automated.

The extracted base data entry parameters are used in step 7330 to populate the retrieved advertisement template from step 7315. After populating the template, the generated advertisement is transferred to the system distribution module in step 7340. Before it is actually distributed to the content provider, the system generates an advertisement tracking record in step 7350. As such, the system can maintain a record of performance metrics that detail a web user's interaction with the distributed advertisement.

FIG. 73 also discusses aspects of a landing page generation process, according to an embodiment of the system. Once the advertisement has been distributed to the content provider in step 7350, the system may receive web user interaction data or a landing page generation indicator in step 7360. When a web user clicks on a distributed advertisement, the advertisement transmits a landing page generation indicator back to the system indicating that the web user wants additional information about the advertised employment opportunity. The system retrieves landing generation parameters associated with the base data entry in step 7370.

Depending on the particular implementation, the generated landing page may be the base data entry or the base data entry incorporated into a landing generation template. In step 7380, the system retrieves the base data entry and a corresponding landing template, which is populated with the information from the base data entry. The template may also incorporate additional functionality associated with the host entity associated with the base data entry. For example, in the employment opportunity context, the landing page may be configured with resume building functionality or an application submission module.

FIG. 74A illustrates a flow diagram illustrating aspects of the advertisement retrieval process. In step 7400, the system receives the ad request parameters from the content provider. There are two primary elements that comprise the ad request parameters—ad content parameters 7410 and ad formatting parameters 7420. The base data entry selected for distribution is selected based on the type of content associated with the advertisement request (e.g., a computer software evaluation content provider will likely be matched with a computer related base data entry). Also included in the advertisement request are the advertisement formatting specifications that detail the advertisement requirements associated with a requested advertisement.

The request parameters detail factors including whether an advertisement template should include a title element 7420, a descriptive element 7422, a job type element 7424, a job location element 7426, advertisement size constraints 7430, advertisement text constraints 7432, advertisement image constraints 7434, web user redirection link constraints 7436. Based on these advertisement request parameters, the system determines what type of template to retrieve in step 7440.

FIG. 74B-74E illustrate several examples of advertisement templates that may be implemented by the system. The templates may be organized based on a variety of template element characteristics. For example, FIGS. 74B-74E may be grouped into two main categories: 1. by the number advertisements associated with a template and/or 2. whether the template is based solely on textual data or a combination of image and textual data. FIG. 74B illustrates a premium template 7450 configured for displaying single advertisement. It may be configured to display an advertisement sponsor's image 7452, as well as Key Term 7454 (selected to attract the attention of a web user), Job Description element 7456 (often a brief overview to provide a web user some additional detail beyond the key term), and Job Qualification element 7458 (including a base job requirement helps ensure that only qualified applicants pursue the advertisement).

FIG. 74C illustrates a premium template with an additional data host element incorporated into the template. Web users may be more likely to pursue an advertisement, if they know it is hosted by a reputable data entry host. As illustrated, template 7460 includes a data host element with the Monster.com host brand 7465. The advertisement confidence effect may be even more significant with widely recognized data hosts. Furthermore, the effect may also increase advertisement click-throughs with web users who have already registered with the data host.

FIG. 74D illustrates a dual base data entry template 7470, wherein both advertisements are associated with a single sponsor. This is simply a non-limiting example, multiple advertisement templates do not necessarily have to be associated with the same sponsor. Furthermore, the example 7470 may be configured to incorporate additional advertisements. FIG. 74E illustrates a text-based template 7480. Also, the template 7480 is configured with dual key terms 7485, as well as a user redirection element 7487 (although the other templates do not explicitly illustrate the redirection element, it is to be understood that the key terms or another template element may be configured to effectuate directing a web user to a landing page or the base data entry within the data host if a web user indicates they would like additional information).

Once the advertisement template has been retrieved, the system retrieves and processes the base data entry. FIG. 74A illustrates aspects of the base data entry parameter extraction process. The system retrieves the data extraction rules that are associated with the selected base data entry in step 7500. The data extraction rules detail the parsing process for deriving the elements used to populate the retrieved advertisement template. Depending on the implementation, the extraction rules may be established by the user 7505, based a set of system established extraction rules 7510, or a user-selected variant of the system established rules. The user (advertisement sponsor) may interact with the system to create an example advertisement, that the system will recreate when an advertisement request selects that sponsor's base data entry for distribution as an advertisement.

Alternately, the sponsor may simply correlate base data entry elements with template elements. For example, in a sponsor-driven advertisement generation process, the system may be configured with a user-friendly advertisement creation module. In one implementation, the sponsor may be presented with an interactive image of the base data entry next to the advertisement template. In this embodiment, the sponsor may click, drop and drag base data entry elements into the corresponding element fields in the advertisement template.

Figure 75A:
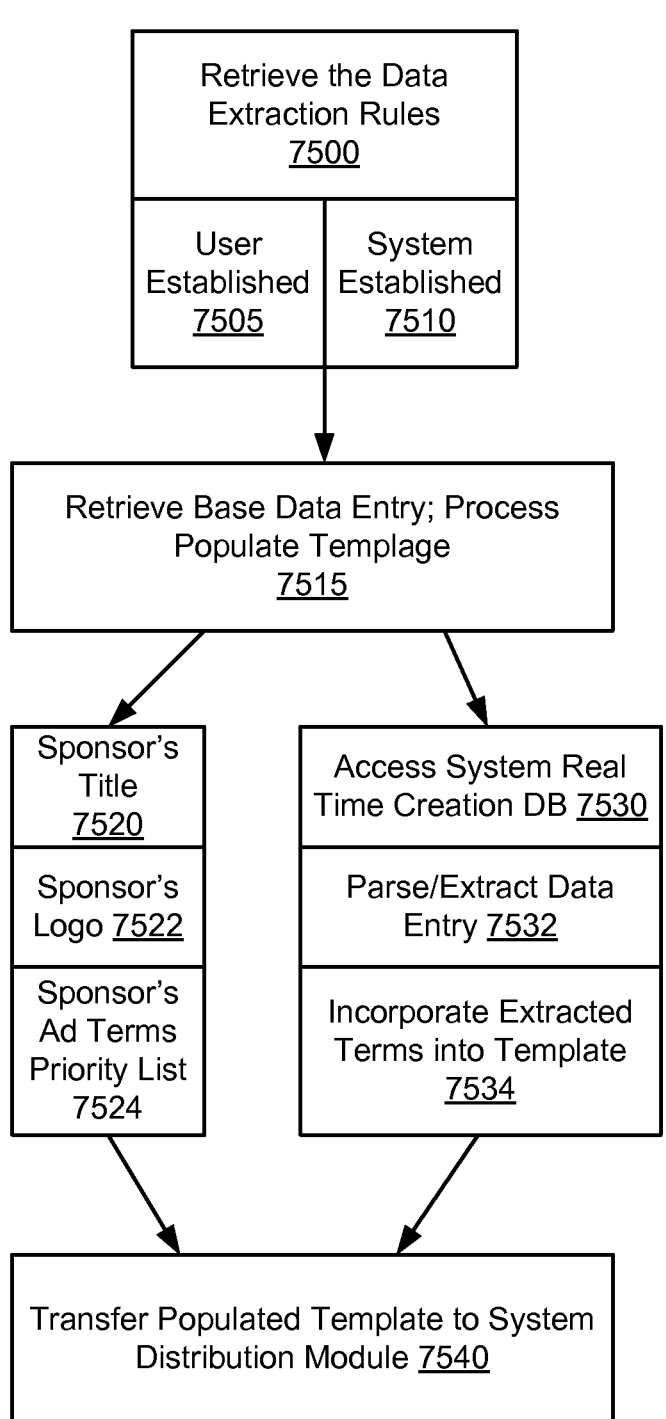
FIG. 75A illustrates a flow diagram of the base data entry data extraction process according to an embodiment of the system.

As illustrated in FIG. 75B, the sponsor may click and drag a "job tide" 7555 element into the "key term" template field. The sponsor may select or modify base data entry elements. If the sponsor wants to establish a "qualification" element field in a template, the sponsor may select the whole qualification element from the base data entry. Alternately, the sponsor may be provided with an editing interface and given the opportunity to edit the element before incorporating it into the template. As illustrated in FIG. 75A, the sponsor may establish the advertisement title 7520, the advertisement logo 7522, and select the additional terms for incorporation into the template 7524. In an implementation, the sponsor may designate base data entry elements for incorporation into the advertisement based on available space (i.e., the sponsor can rank whether they want to include a salary element 7560 before a job location element 7565 based on size/character constraints associated with a particular template).

The system may also be configured to implement an system driven extraction rule set. The system driven rule set is configured as an input into an automated base data entry element extraction process. Advantageously, the system may record and correlate different sets of generation rules with performance and efficacy metrics.

However, with significant resources to draw upon, the system driven generation rule set may provide a higher level of advertisement efficacy. In step 7530, the system retrieves a system default generation rule set selected for the particular base data entry. In step 7532, the system parses the base data entry and extracts the data elements according to the rule set. For example, the system generation rule set may be configured to extract a job title 7555, starting salary 7560, and two qualification requirements 7575 from the base data entry illustrated in FIG. 75B. In step 7534, the system uses the extracted elements to populate the advertisement template. The populated template is transferred to an advertisement distribution module, in step 7540.

Figure 75C:
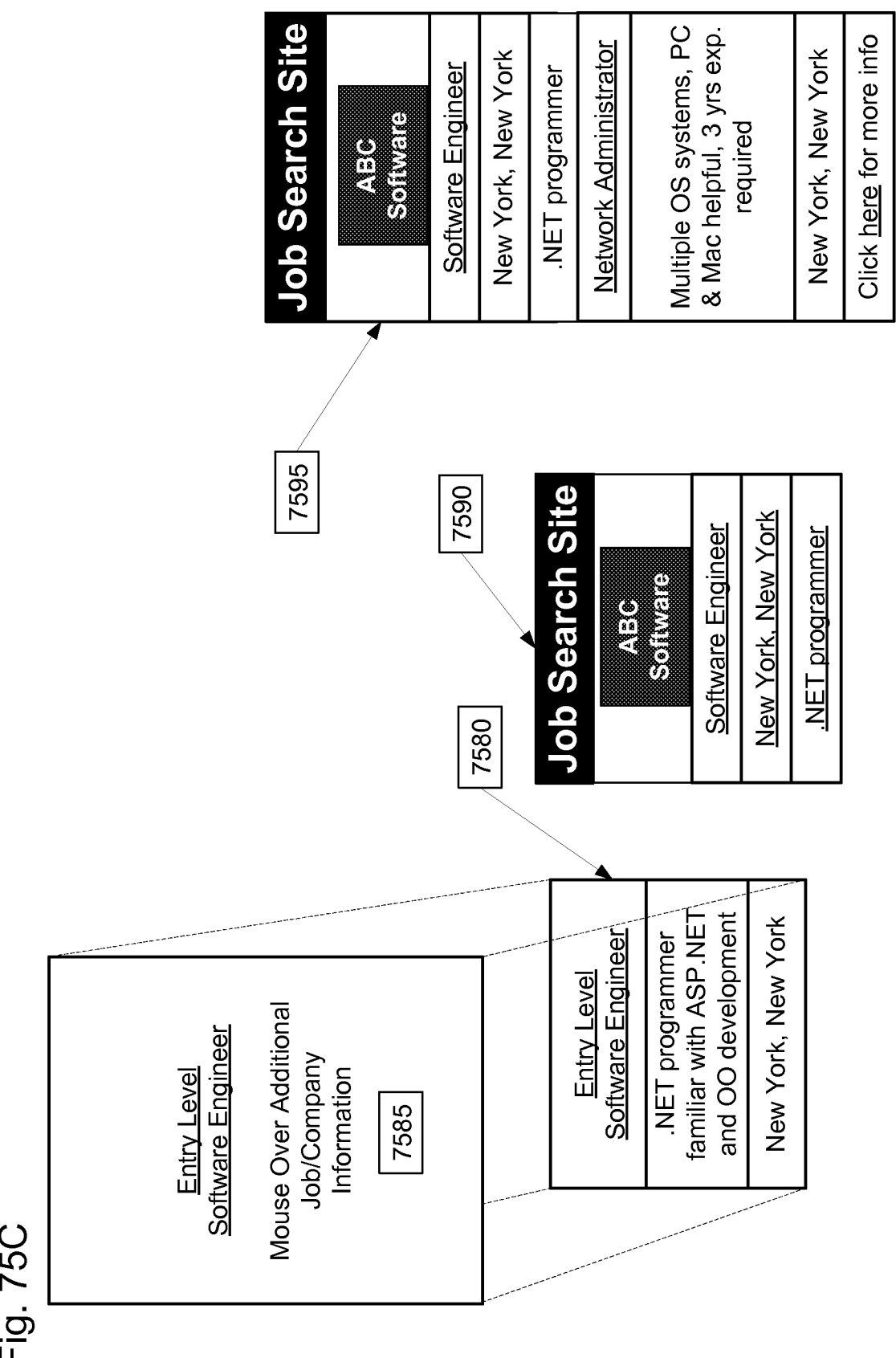
FIG. 75C illustrates examples of generated advertisements, according to an embodiment of the system.

FIG. 75C illustrates several examples of populated advertisement templates. Advertisement 7580 is an example of a text-based advertisement with a job title incorporated as a key term. The advertisement also includes a brief description element and a job location element. The advertisement 7580 also incorporates a mouse-over resource element 7585. When a web user moves the mouse pointer over the advertisement, the distributed advertisement spawns another pop-up window displaying additional job information or information about the advertisement sponsor. As such, the web user is able to ascertain additional detail about the distributed advertisement without leaving the initial advertisement display web page. Advertisement 7590 incorporates both a host data entity element (e.g., Monster.com), as well as an image-based advertisement into the base advertisement template.

Example advertisement 7595 illustrates a multiple advertisement, single sponsor implementation. More specifically, advertisement 7595 includes two sub-advertisements: one for a software engineer and one for a network administrator. Also, the advertisement 7595 includes a host data entity element and a separate redirection element. Certain sponsors may be interested in using the independent redirection element in order to redirect a web user to additional base data entries that they sponsor not included in the distributed advertisement.

Figure 76A:
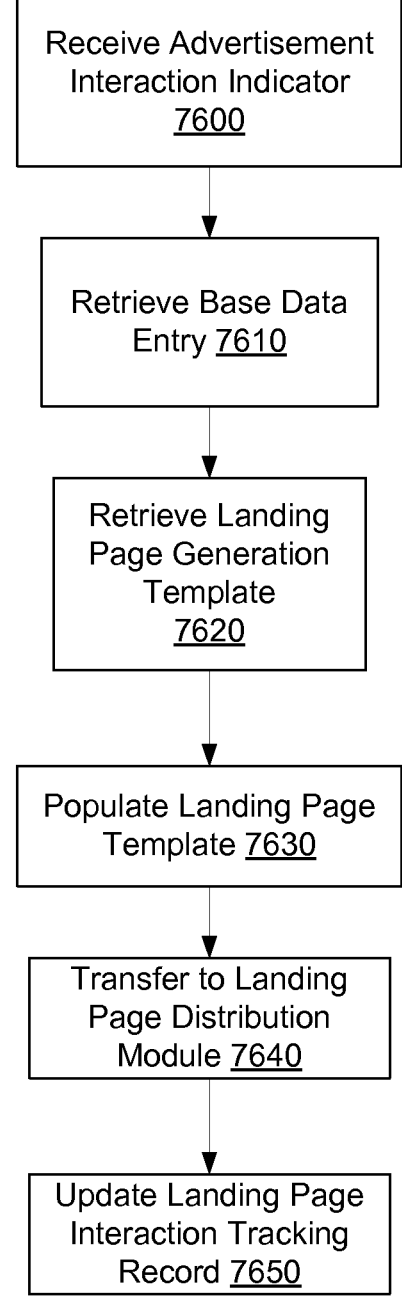
FIG. 76A is a flow diagram illustrating aspects of the landing page generation process, according to another embodiment of the system.

FIG. 76A illustrates aspects of a landing page generation process. The system generates a landing page (landing page), when a web user clicks on a distributed advertisement, thereby indicating they would like additional information about the opportunity. In step 7600, the system receives an advertisement interaction indicator. This is generated and transmitted by the distributed advertisement and effectively signals the system to send additional information about the advertised good, service or opportunity. Upon receipt of the indicator in step 7600, the system identifies the base data entry corresponding to the distributed advertisement in step 7610. This type of advertisement is also extremely useful in the context of the advertisement evolution data analysis process. Two advertisements may be created using different generation rule sets based on the same base data entry. Advantageously, the system may track and analyze the distributed advertisements' respective performance based on being displayed to the same web user, in the same content context.

The system processes the record entry associated with the base data entry to determine if a landing page generation template has been selected by a user. If a template has been selected, the system retrieves the template, otherwise the system implements a system-default landing generation template in step 7620. The system then populates the landing page template with data from the base data entry in accordance with sponsor designated landing page generation rules. This process is similar to the advertisement template population process described above (e.g., it may be user-driven or system driven).

In step 7640, the populated landing page is transferred to a distribution module for transmission back to the same web user IP address as the distributed advertisement. In some implementations, the destination information is included in the interaction indicator and consequently step 7640 may be omitted. In step 7650, the system creates a landing page interaction tracking record. This is used by the system to analyze the efficacy of distributed landing pages and derive performance metrics. The distributed landing page may also transmit web user interaction data back to the system as part of this analysis.

There are a variety of templates available depending on the sponsor's needs. The templates may be configured to provide a copy of the base data entry as the landing page. Alternately, a premium template may incorporate the base data entry into a distributed page that also includes base data entry or data host entity related functionality. An example of the premium template 7660 is illustrated in FIG. 76B within the job application context. As shown, landing page 7660 incorporates data from the base data entry 7665, but it also may incorporate sponsor information 7670 and/or information or functionality associated with the base data entry host entity 7675 (e.g., searching for similar jobs on Monster.com).

FIG. 77 illustrates a sponsor management dashboard 7750 that a sponsor may user to manage various aspects of the advertisement generation process. The management dashboard is an effective tool to help a sponsor coordinate and keep track of advertisement campaigns 7760, 7763, and 7766. The dashboard may be configured to display an advertisement ID 7770, and the date it was distributed 7780 or created. As illustrated in the FIG. 77, the dashboard displays generation metrics associated with the advertisements 7775.

In the implementation illustrated in FIG. 77, the generation metrics include a sponsor advertisement level 7773 (which may be configured as scaled number indicating the user determined type of template/content associated with the advertisement). In this implementation, the dash board also indicates whether a landing page 7776 has been associated with the advertisement, as well as whether the landing page includes premium functionality 7779. The sponsor is also able to see what the current key term element is from the base data entry 7782 (e.g., whether the advertisement will emphasize a job title, salary, location or other element as the advertisement key word).

Advertisement Targeting/Distribution

The present disclosure includes a discussion of systems, methods, and apparatuses for an advertisement targeting/distribution engine (hereafter "Engine"). The Engine may be configured to receive an advertisement request message from a content provider, process a series of distribution parameters, select an underlying base data entry targeted for distribution, and generate an advertisement generated from the underlying base data entry. In one implementation, the Engine processes distribution parameters from a variety of sources, such as the advertisement sponsor, an advertisement affiliate/content provider, a web user, distribution parameters associated with the underlying base data entry, and/or historical distribution parameters.

It is to be understood that, while the system may be described herein primarily in the context of online advertisements (hereafter "Ads"), the system provides an administrator with significant flexibility and freedom to configure the system for any other number of information dissemination applications embodied in a wide array of media, including print, World Wide Web, television and radio, signs and billboards, product placement, postal and e-mail communications, and/or the like. Furthermore, although the system may be described herein processes distribution parameters from a variety of a sources, it is to be understood that, depending on the needs, parameters, specifications, etc. of a particular implementation, the system may be scaled and configured to process distribution parameters from a single source or any number of combinations of sources.

Figure 78:
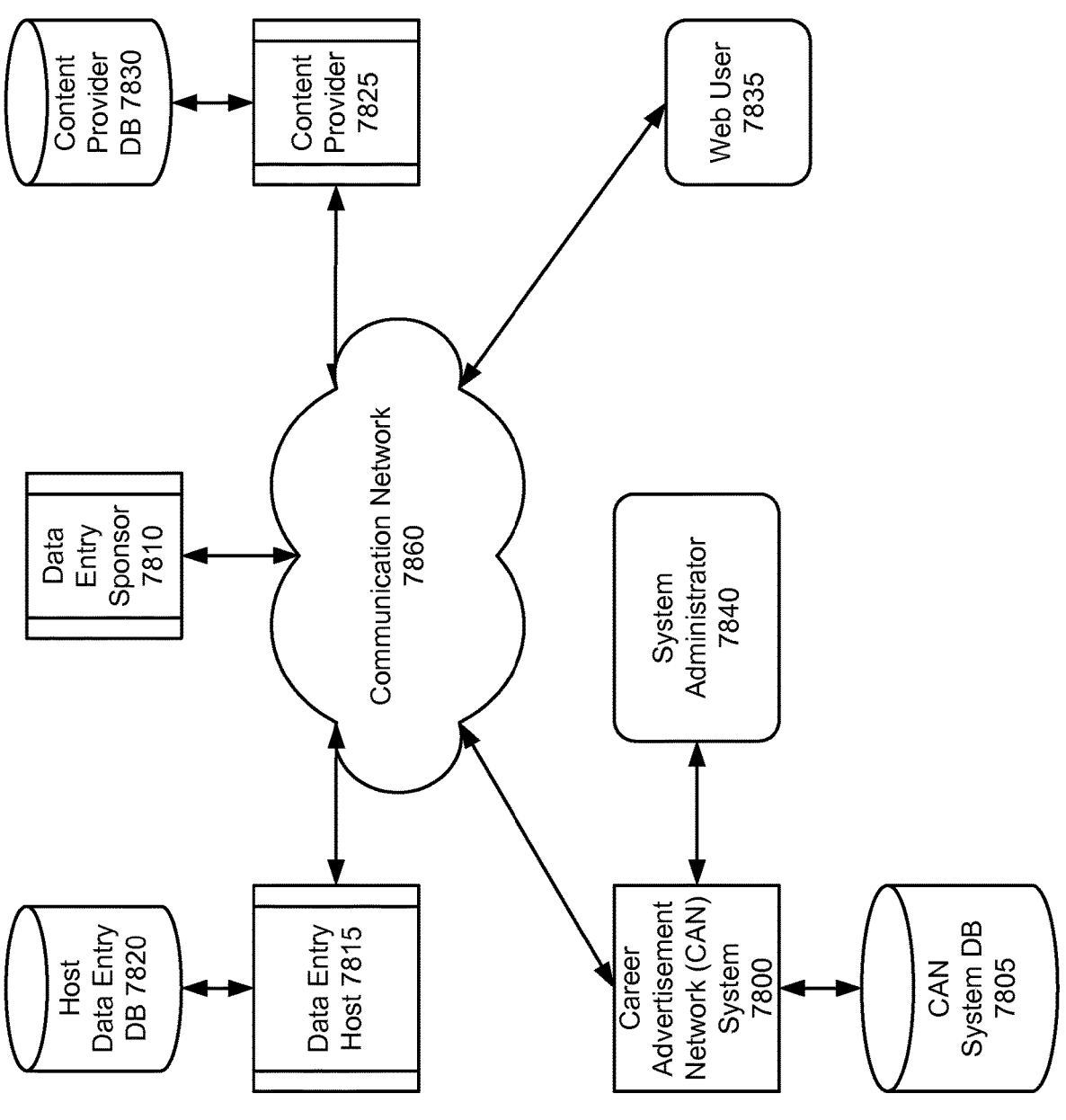
FIG. 78 is an overview of various entities that may interact with the Engine at various points during system utilization.

FIG. 78 illustrates an implementation of the system providing an overview of various entities that may interact with the Engine at various points during system utilization. According to an implementation, the Career Advertisement Network ("CAN") system 7800 is a central element that may be configured to include the Engine and facilitate aspects of the functionality described herein. In the illustrated implementation, the CAN system 7800 communicates with the CAN system database 7805. As will be discussed in greater detail below, the CAN 7800 processes distribution parameters from a variety of sources in order to select an underlying base data entry and generate a distribution advertisement based on the underlying base data entry.

As illustrated in FIG. 78, one of the sources may be a base data entry sponsor 7810. For example, if the advertisement is generated from a base data entry configured as a Monster.com job listing, the sponsor is the entity that sponsors the job listing, whereas, the data entry host 7815 may be analogized with Monster.com. The host entity manages underlying base data entries used to create the distributed advertisements in host base data entry DB 7820 (in some embodiments, the host data entity may also provide parameters that are used to facilitate selection of the underlying base data entry). Although illustrated as independent elements in FIG. 78, in some embodiments, the functionality associated with the host entity 7815 and the CAN system

7800 may be incorporated into a single system. It is also to be understood that system facilitates a significant flexibility and other modifications of the various embodiments discussed herein are also possible.

In an implementation, distribution advertisements are generated based on an ad request message from content provider 7825 that is transmitted to the CAN system as the content provider 7825 prepares content (e.g., a web page) from content provider database 7830 for display to a web user 7835. The CAN system 7800 provides a significant flexibility and scalability to meet the various needs of a number of data entry sponsors 7810. Accordingly, a system administrator 7840 can access and configure the CAN system to provide a variety of functionality customized for individual sponsors, as described below. For example, different CAN system 7800 implementations can be customized to implement a basic or premium targeting/distribution advertisement engine. One difference between basic or premium sponsor subscriptions involves the scope of data processing capabilities of the CAN 7800. In a premium subscription, the CAN 7800 may be configured to target and distribute advertisements at an extremely granular level of detail.

As discussed, the system provides a significant flexibility and a system administrator can select from a variety of system functionality based on the needs of various base data entry sponsors and/or content providers. The following discussion is provided within the context of a sponsor providing a job listing as the base data entry, with an online job placement system such as Monster.com as the data entry host. However, it is to be understood that the system and functionality described herein may be configured to facilitate any number of implementations and/or applications. For example, the system may be configured to facilitate distribution of advertisements for financial products, travel services, real estate properties, classified advertisements, online auction entries and/or any other types of goods, services, or opportunities.

FIG. 79 is a high-level diagram illustrating aspects of the advertisement targeting process according to an implementation of the system. More specifically, the advertisement targeting process involves the process by which the CAN system 7800 selects an underlying base data entry used to create a targeted advertisement for distribution. The advertisement is 'targeted' in the sense that the underlying base data entry is selected based on a number of distribution parameters processed by the CAN system. In FIG. 79, the sponsor can interact with the CAN 7800 to establish a variety of sponsor established distribution parameters. In an implementation, the sponsor distribution parameters 7900 relate to a variety of variables established during sponsor registration or campaign creation processes. The sponsor distribution parameters often relate to parameters that influence the selection of an underlying base data entry for distribution to either a particular web user and/or sponsor requested content provider characteristics.

The sponsor may work with a system administrator (or in some implementations a self-guided setup wizard) during the sponsor registration process to configure the CAN system to designate certain web users, categories of web users and/or content providers as requested targets. For example, a sponsor that has a number of job listings for entry level software engineering positions may request that the CAN system distribute advertisements based on the sponsor's underlying base data entries (BDEs) to a certain target distribution point. In this example, the sponsor may attempt to target individual web users that are accessing computer software related content providers.

Further, the sponsors may request that the distributed advertisements are displayed to web users who have been identified as being between the ages 18-24 or around the age of someone currently in college studying computer technologies or starting a career in a computer related industry. The CAN system 7800 may also be configured to work with the sponsor to categorize a sponsor's underlying base data entries based on BDE content, distributed advertisement specs, and/or any number of sponsor distribution parameters. For example, the sponsor may provide a variety of job listing descriptor tags that are used by the system during the underlying BDE selection process.

As illustrated, the sponsor may pursue various level of scope for job listing descriptors 7905 (the varying level of scope may correspond to the sponsor's subscription type). For example, the sponsor may describe their job listings as falling within broad groups like engineering jobs, computer science or programming jobs. In some implementations, the sponsor may configure the distribution parameters to achieve a greater level of granularity. In such implementations, the sponsor may supplement the broad descriptors with more specific descriptors such as java programmer, applet programmer or other more specific key words that describe the job listing. It is to be understood that a variety of descriptors may be implemented and it is not limited to actual job type characteristics. For example, the sponsor descriptors may be based on salary range, sponsor identity, full-time positions, or other job descriptors. Aspects of the sponsor distribution parameters are discussed in greater detail below with regard to the FIGS. 81A-81C and the sponsor targeting/distribution registration process.

Additional distribution parameters may be incorporated within the content provider's ad request message 7910. For example, in an implementation of the system, the ad request message may be configured with content provider distribution parameters and/or web user distribution parameters. The content provider distribution parameters relate to aspects of the distribution process centralized around content provider.

In an implementation of the system, the content provider data 7915 may include content provider data descriptors 7920. For example, the content provider may include a descriptor of the various types of content they provide. In some implementations, the descriptors may also vary in terms of the breadth of the descriptor. As illustrated in FIG. 79, a content provider 7915 may provide varying descriptors of their content 7920. In the illustrated example, the content descriptors range from very broad to become more focused, example descriptors may include: technology in general, technology news, personal computer news, operating systems for PCs, particular flavors of OS, etc. . . . By varying the descriptor breadth, a sponsor may select a level of scope that meets their needs and is cost effective (i.e., the system may be configured to provide greater levels of targeting granularity as premium services).

In some implementations, the content provider may be a system affiliate. Affiliates or partners of the CAN system may provide data from a historical user databases to the CAN system. In an implementation, partnerships may be formed to exchange historical user data for a portion of the distributed advertisement revenue. As such, the strategic partnerships may lead to a great deal of web user information. As part of the registration process, web users who register with an affiliate partner may agree to allow the affiliate to share certain web user data with partners.

FIG. 79 illustrates aspects of two examples of processing web user data 7925. A first type of web user data may be provided based on a web user's registration with an affiliate web site and include a variety of web user characteristics such as some types of demographic information. A second type of web user data may be maintained by the affiliate web site involves web user/affiliate historical interaction. For example, a web user may authorize an affiliate to maintain records of the web user's surfing/search history within the affiliate web site, in addition to a variety of other interaction characteristics. By way of example only, if the affiliate site is Monster.com, a registered web user may authorize Monster.com to maintain data records regarding whether the registered user has uploaded a resume; what type of job the registered user has searched for within Monster.com; the types of job listings the registered web user has viewed or applied for, or any other number of affiliate/web user interactions.

The system may also incorporate distribution parameters that are determined specified by the base data entry host. In an implementation where the CAN system is incorporated with the base data entry host, the base data entry host manages several distribution parameters 7935 related to attempting to balance selecting the most relevant underlying base data entry, while also satisfying distribution commitments for the various BDE sponsors. The base data entry host distribution parameters 7935 may include distribution selection probabilities that are assigned to underlying BDEs.

In some implementations, various sponsors may establish BDE distribution advertisement campaigns or subscriptions. For example, a sponsor may agree to pay a certain fee in exchange for assurances one or more underlying BDEs will be distributed a certain number of times, over the course of a certain time period, and in some instances to a certain categories of web users. As such, the data entry host parameters may include distribution selection weighting parameters. These data entry host parameters may be called sponsor distribution parameters. As will be described in greater detail below, in some implementations each BDE may be assigned a corresponding weighted selection probability. These weighted probabilities may be used by the CAN system in creating the selection pool of BDEs for distribution or making the final selection of the BDE for distribution as an advertisement (as discussed for example with regard to FIG. 84B).

The probabilities may be used to make distribution more or less likely in order to meet certain sponsor designated distribution goals. In some implementations, a sponsor may pay additional fees for a premium distribution campaign, wherein the selection probabilities associated with the sponsor's BDEs are all increased by a certain factor. The data host distribution parameters are established to correlate BDE selection categories (e.g., computer programming BDEs) with the distribution parameters received from the content provider (e.g., the type of content provided and/or any type of web user characteristics the provider may have). Once the correlations are executed, the selection pool of BDEs may be created for potentially relevant BDEs that the system may select for distribution. The CAN system selects an underlying BDE 7945 and transfers the BDE to a CAN system ad creation module 7950.

Figure 80:
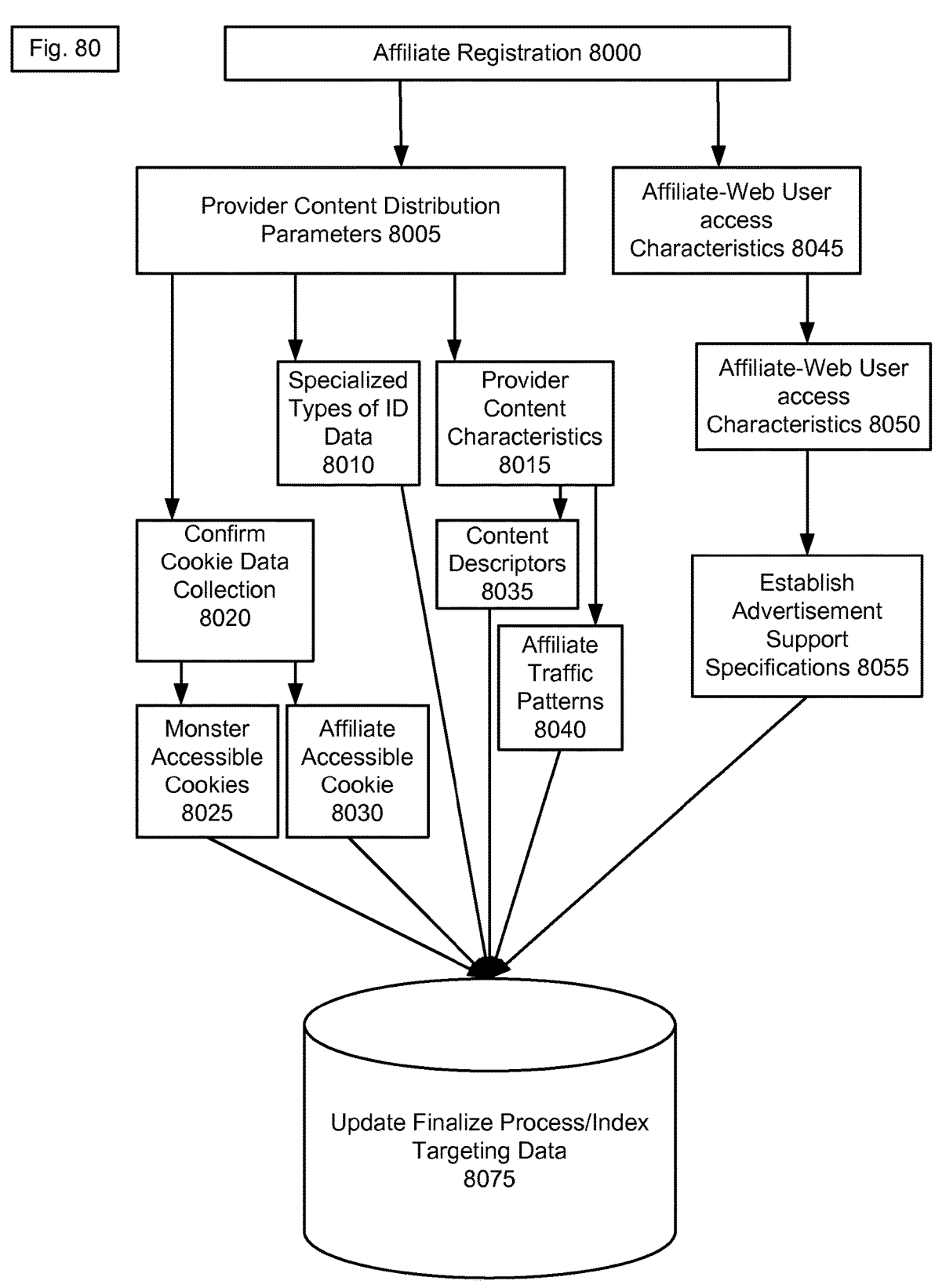
FIG. 80 illustrates aspects of an affiliate registration process according to an implementation of the system.

As discussed above, the BDE selection targeting is based on data provided by the content providers, in combination with sponsor and/or BDE host data. In some implementations, content providers may agree to provide additional web user data and become partners/affiliates of a the CAN system. FIG. 80 illustrates an affiliate registration process

8000. As part of the registration process, an affiliate establishes a series of content provider distribution characteristics 8005, which can be broken down into four types according to one implementation of the system. The first establishes a type of cookie 8020 that can be included with a distributed advertisement, as well as the types of cookie data that can be processed by the system. Depending on the implementation, the affiliate may distribute data host 8025 (e.g., Monster-.com) cookies, as well as affiliate accessible cookies 8030. At this point, the affiliate establishes the types of data that will be collected by affiliate cookies and transferred to the CAN system as part of the partnership.

Depending on the implementation, various affiliates may be configured uniquely positioned to collect specialized web user data 8010. For example, affiliates configured as a employment placement websites may have databases with resume data associated with a particular web user or job search related data. Another example is an affiliate configured as a social networking web site. The social networking web site may utilize surveys to collect web user characteristic data that provides perspective on the likes or dislikes of a particular web user. These specialized data characteristics assist in selecting particularly relevant underlying BDEs for distribution to a web user.

Another type of content provider distribution parameter relates to characteristics associated with the provider's content 8015. For example, the distribution parameters may include content descriptors 8035 (e.g., technology; technology news; personal computer news; etc.). Also, the content provider may provide affiliate web site characteristics 8040 such as values of average/peak affiliate network traffic volume or other affiliate web site characteristics.

Another aspect of the affiliate registration process involves transferring available historical affiliate-web user access characteristics 8045. For example, web users may allow an affiliate to participate in transferring historical web user search/surfing data to help develop the CAN system database. This type of data may relate to previous affiliate-web user access/interaction characteristics (e.g., searching the affiliate web site for data related to computer programming jobs) 8050. Alternately, the affiliate access characteristics may define what types of distributed advertisements are supported by the content provider/affiliate 8055. The various distribution parameters are established and associated with an affiliate/content provider data record within the CAN system database 8075. Accordingly, in an implementation, the CAN system can easily determine which types of data parameters are included with ad request from a particular affiliate/content provider by accessing a data record associated with a content provider ID. Establishing the content provider distribution parameters may be only the first step toward configuring the Engine.

Figure 81A:
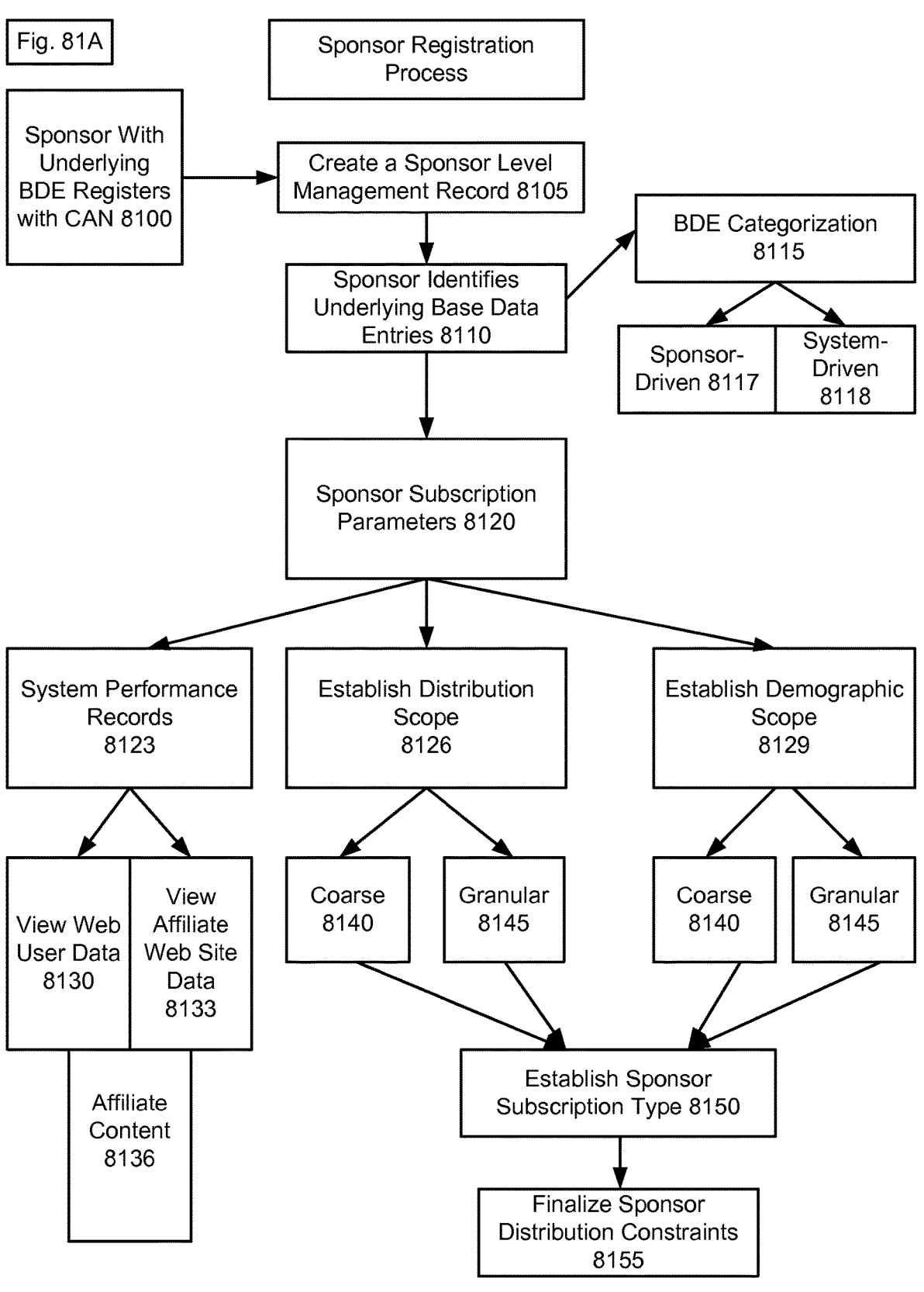
FIGS. 81A-81C illustrate aspects of sponsor system interaction associated with establishing sponsor advertisement targeting/distribution parameters.

FIG. 81A illustrates a flow diagram associated with the sponsor registration process. A base data entry (BDE) sponsor starts the registration process with a CAN system interface or by working with a CAN system administrator host 8100. The system creates a sponsor management record 8105. The sponsor management record includes a listing of sponsor identified BDEs 8110, as well as descriptors related to categorizing a sponsor's BDEs. As discussed above, BDEs may be categorized through a variety of BDE data characteristics, (e.g., job type with various scaling—computer programming, java programming, etc., other characteristics may include salary, income, job requirements or other descriptive job characteristics). Depending on the implementation, the BDE categorization processing may be sponsor driven 8117 (e.g., with the sponsor providing various groupings or tags for BDEs) or system driven 8118 (e.g., the CAN system parses a BDE and generates tags or uploads existing BDE tags from a data entry host entity).

Another step involves establishing the sponsor subscription parameters (which may then be used to correlate one or more advertisement distribution parameters). In an implementation, the sponsor distribution parameters include BDE subscription/campaign parameters 8120. For example, a sponsor is able to designate certain BDEs that are hosted by the data entry host for selection and distribution as advertisements. Sponsors may agree to pay a fee in exchange for assurances that their BDEs will be distributed (and/or displayed) a certain number of times, over a certain period of time. In some embodiments, a sponsor may also establish distribution parameters that affect the selection of underlying BDEs for distribution to target web users.

Figure 81B:
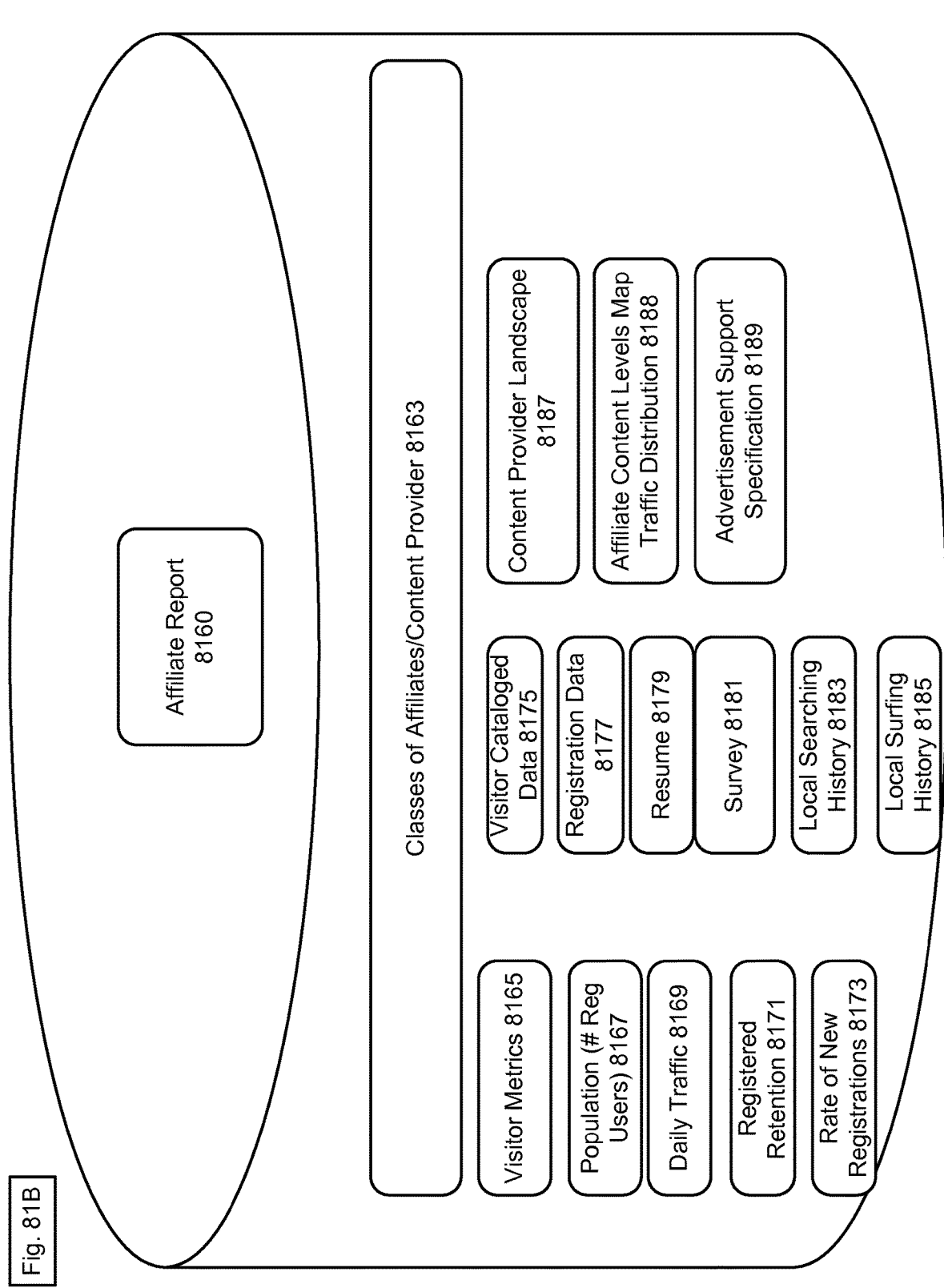
Figure 81C:
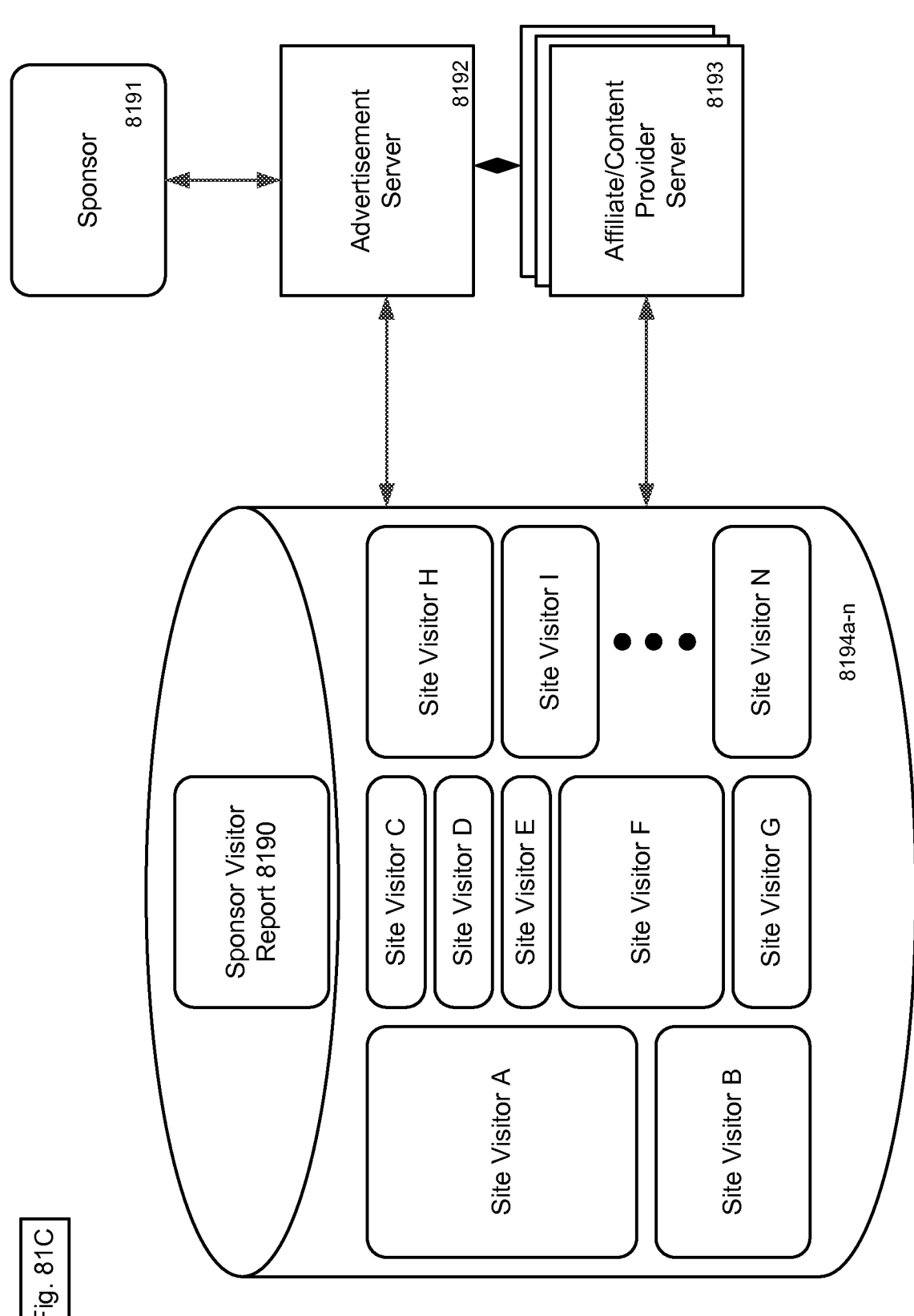

In order to establish subscription parameters, a sponsor may interact with the CAN system (or a system administrator) to view registered affiliate reports 8133 (as illustrated in FIG. 81B), visitor data reports 8130 (as illustrated in FIG. 81C) and/or affiliate web site maps/content characteristics 8136. Advantageously, the sponsor independently or with the assistance of a system administrator may designate certain affiliates as distribution targets for their selected BDEs. In an implementation, the designation process may be supplemented by historical CAN system data analysis.

The sponsor may also establish an ad distribution scope 8126. More specifically, the sponsor can determine how they want to prioritize the level of granularity associated with the target affiliate/content providers. For example, a sponsor may designate a system defined broad collection of computer programming web site content providers/affiliates as for a course ad distribution 8140. Alternately, the sponsor may select a specific Java programming news web site as distribution targets 8145. In a premium campaign, the sponsor may elect to pursue distribution at a granular level. By way of example only, after viewing affiliate data reports, the sponsor may designate whether they want coarse 8140 or granular content provider distribution. Also, by way of example only, the sponsor can indicate they want to distribute their advertisements to a web site that is a forum or weblog for discussions about programming for linux operating systems 8145, as opposed to general computer programming discussions.

Similarly, the sponsor may designate a demographic distribution scope 8129 of a target demographic. In order to try to fill a software engineering job position, a sponsor may elect to fulfill a certain number of distributions/impressions directed to granular targets 8145 instead of coarse targets 8140 (e.g., distributing advertisements to affiliates that have identified a web user whose registration data indicates they have a Master's degree in Computer Science 8145, as opposed to an affiliate identifying a web user as someone who accessed an affiliate web page discussing general personal computer peripherals 8140.

FIG. 81B illustrates aspects of affiliate web site data reports that a sponsor may view in determining sponsor distribution/subscription parameters according to an implementation of the CAN system. By way of example only, the sponsor may view data reports about classes of affiliates and/or content providers 8163, as well as characteristics associated with individual affiliates/content providers. Some of the individual affiliate/content provider characteristics may include various visitor metrics 8165, such as the number of registered users 8167, total/average web site traffic for registered/anonymous users broken down by a periodic duration (e.g., monthly/weekly/daily/hourly visitor traffic data) 8169; a registered user retention rate (e.g., how many times a particular registered user returns over a given period of time) 8171; and/or the rate of new registrations for a given period of time 8173.

Additional affiliate/content provider characteristics may include types of cataloged historical visitor data 8175, as well as individual visitor data records (as illustrated and discussed with regard to FIG. 81C). The affiliate report may include examples of the types of visitor registration data 8177; affiliate specific information derived with the web user's authorization from web user/affiliate interaction such as resume/employment history data 8179; web user survey data 8181; a web user's content provider searching history 8183; and/or a content provider page access history 8185.

In some implementations, the affiliate/content provider may provide a content distribution map 8187 providing an overview of the various types/categories of content associated with their site, as well as how the web site is set up. These maps may be useful to sponsors who are attempting to determine the sponsor distribution scope 8126. A sponsor may visualize how many clicks a web user would need to execute to reach the content that the sponsor is interested in. For example, a sponsor who wants to place software engineering job advertisements may determine that web user takes may access the software engineering discussion forum directly from the content provider's home page. In some implementations, the content distribution maps may be complemented with traffic distribution maps that illustrate average, total periodic, and/or peak traffic flows across the content provider's web site 8188.

Another example, of an affiliate distribution parameter relates to the content provider indicators that specify the types of advertisements that the content provider/affiliate is capable of supporting 8189. For example, a content provider may indicate that they can accommodate pop-up, pop-overs and web banner advertisements. The content provider may also provide display/formatting specifications as part of establishing the content provider distribution parameters.

FIG. 81C illustrates aspects of an affiliate visitor report 8190. These types of reports may be based on data of anonymous web users who have accessed a content provider. Alternately, the report may be based on data that web users have authorized content provider/affiliate 8193 to collect and transfer to the CAN system related to web user interaction data. Accordingly, the system enables a sponsor 8191 to access the reports 8190 through advertisement server 8192. As such, the sponsor 8191 may make distribution decisions based on various types of web user characteristic data 8*i*94*a-n* during the base data entry selection/targeting process. In some implementations, sponsors 8191 (e.g., employers with job listings) can review various categories of content provider's web user characteristics and select a group of web users to designate as target web users. Accordingly, if the web user is identified, the web user. For example, a sponsor searches a content provider's visitor data may be achieved using keywords and a search engine. As shown in the figure, site visitor data 8*i*94*a-n* may be stored by the affiliate content server 8192. However, the amount of information known about the various site visitors is not uniform, as represented by the different sizes of the site visitor data files. So, for example, more information is known about site visitor 8194A than is known about site visitor 8194F. As such, the sponsor's established distribution demographic scope becomes an important aspect of the targeting process that may be customized to meet the needs of the sponsor.

With this collection of information, a sponsor can opt to display ads only to site visitors with a certain level of known characteristic or with particular known characteristic. For example, an advertiser might only want his ads shown to people working in information technology and living in or around Austin, Texas, or only displayed to web users with known levels of education, such as college graduates or PhDs. In some implementations, the CAN system may be configured to price distribution ads based upon the level of details known about a particular web site visitor. For example, a sponsor might buy fewer, more expensive, narrowly targeted ads; alternately, the sponsor could buy a larger number of cheaper less targeted ads.

In another implementation of the system, the affiliate content provider might choose the amount of site visitor information they would like to provide to the advertisement server. In addition to allowing web users to authorize data collection/transfer, this method allows a content provider to address any web user's privacy concerns. Another aspect of system involves providing compensation (e.g., a portion of revenue generated by the sales of distribution advertisements) provided to the affiliate/content provider. In an implementation, the portion of revenue may be based upon the amount of information about the site visitor provided. In this way, affiliate content providers can be rewarded by providing more information, which results in more effective ad selection and placement. If an affiliate content provider would like to provide reduced information about their site visitors, they can receive broader less profitable ads.

In an implementation, the affiliate may create a web user record as a user interacts with the affiliate/content provider web site. The data record may be created at the request of the web user during active web user interaction 8205 or passive web user interaction 8225 (e.g., web site records an anonymous non-registered user's search history and identifies future interaction by placing a cookie on the user's terminal). In an active interaction implementation, the web user may actively provide user-identifying characteristic data during a web site registration process 8210.

Depending on the implementation, the affiliate may limit the availability of certain user data (e.g., associating only zip code, gender, general age group information with an anonymous user id, while maintaining the user's name, mailing address in strict confidence). The system may also be configured to create a web user data record during web user interaction. For example, a web site may be configured to utilize user information extracted during user surveys, or during processing uploaded resumes or other types of user provided data characteristics. In some implementations, the web user may be requested to approve the collection and distribution of the collected data to the CAN system. The Affiliate may upload user data to the CAN after identifying a registered (or non-registered anonymous user) 8220. Depending on the implementation, the data may be uploaded as part of an ad request or at certain intervals after a user visits (or re-visits) the affiliate web site.

Some implementations may be configured to facilitate passive interaction data collection and distribution 8225. Two of the many ways passive data collection and processing may be effectuated through the distribution of cookies 8230. Affiliates may agree to distribute cookies so that if and when a web user with a particular type of content provider cookie accesses the base data entry host 8245 (e.g., a registered user for a new web site visits a job employment site, the job site collects affiliate/web user interaction data 8245). Another example involves collecting web user/content provider interaction data based on a cookie placed on the web user's terminal each time the web user accesses the content provider (e.g., as the web user conducts searches on a content provider, the content provider collects interaction data).

The active/passive interaction data 8220, 8245, 8250 is then transmitted to the CAN system for aggregation into a CAN system database. In the event that the user is a non-registered user, the system may be configured to determine whether the non-registered user data matches any stored anonymous user data records 8260. The CAN system then processes and manages the user data associated with both registered and anonymous non-registered users 8265. Depending on the implementation and the scope of the collected user data, the system may be configured to coordinate a variety of a data management tasks, such as grouping similar user data records together and/or creating varying levels of group descriptors (e.g., technology characteristics, computer characteristics, computer programming characteristics, java programming characteristics, etc..) 8270.

Figure 82B:
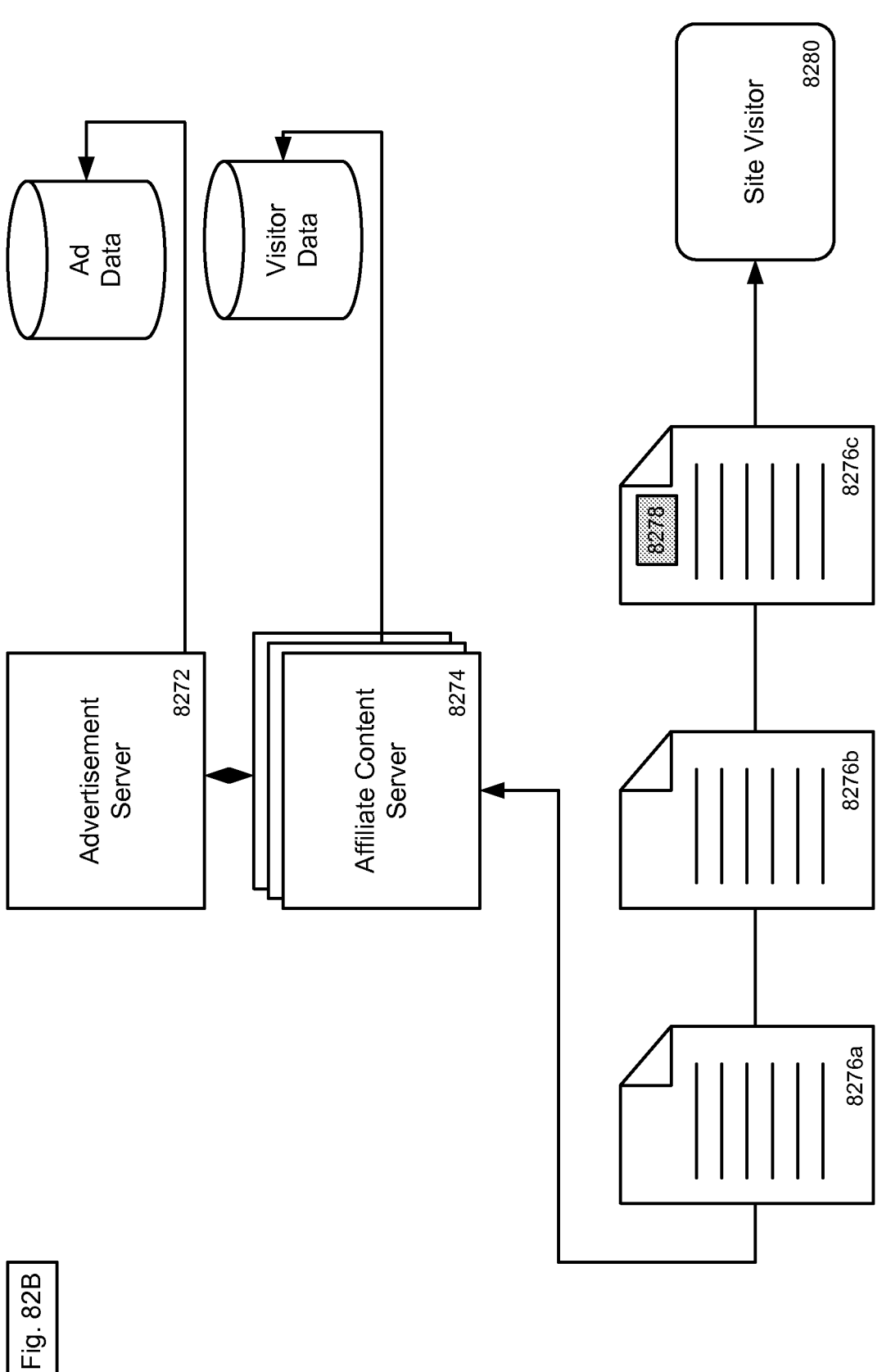

FIG. 82B illustrates an embodiment for the placement of ads through the interaction of the advertisement server 8272 and an affiliate content server 8274. In this embodiment, one or more affiliate content servers 8274 request ad serving from the advertisement server 8272. The request may include stored or categorical information about the site visitor 8280 from the visitor data store 8273. The information about the site visitor 8280 could have come from a number of sources.

For example, the site visitor information could have been derived during the current web content session/interaction between the affiliate content server and the site visitor, such as information derived from the site visitors viewing and interaction with affiliate content pages 8276a and 8276b. Or, it could come from information received and stored during the site visitor's previous interactions with the affiliate content server. In addition, two or more different affiliate content servers might share or combine their saved site visitor data.

Site visitor data might also have been previously stored by the advertisement server. For example, the site visitor data might be associated with a site visitor identifier, e.g., a cookie, the advertisement server might keep data indicating visitor characteristics associated with the identifier. In this way, the advertisement server can correlate information about the site visitor that was previously provided by one or more affiliate content servers and the advertisement server can track which ads were of interest to the site visitor. For example, if the site visitor had previously clicked on ads for java programmers, the advertisement server will have a highly relevant data point to indicate that programming jobs are of interest to that visitor.

In one embodiment, the site visitor's use of the affiliate content server service results in information about the site visitor being provided to the affiliate content server. For example, the affiliate content server may provided personality tests, skills evaluations, I.Q. tests, career recommendations, etc., such as the tests provided at tickle.com. When the site visitor uses the affiliate content server, information about himself or herself is gathered. In another example, the site visitor may have filled out a user profile that provides detailed information about him or herself.

In another example, the affiliate content server may provide social or business networking services, such as myspace.com or linkedin.com. In using such a service, the site visitor may create a web page providing details about the users skills and interests. In another example, the affiliate content server may provide career services like monster-.com. In using the service the site visitor may have uploaded a resume or created a user profile that indicates the user's skill set, educational background, work experience, interests, etc. In this way, it can be seen that the affiliate content server and the listings server may be one in the same entity.

Regardless of the mechanism in which information about the site visitor is recorded. Some or all of the recorded information is provided by the affiliate content server 8274 to the advertisement server 8272. In addition, information about the site visitor might be added based on context of the affiliate content site or added by categorizing the affiliate content site itself. In other words, a particular affiliate content site might indicate for itself that particular characteristics apply to all of its site visitors, or this determination may be made by the operators of the advertisement server. For example, an affiliate content site directed to semiconductor industry news might set forth that all of its site visitors are involved in the semiconductor industry. Or, the advertisement server might make that determination. In addition, the affiliate content server operator may want to have more control over the companies and types of ads that are displayed on its site and could set characteristics accordingly. For example, an affiliate content site devoted to alternative energy might want to exclude advertisements from oil companies.

Once the characteristics for a particular site visitor are received and gathered by the advertisement server, the advertisement server can use this information to retrieve an ad from the ad data store 8273 and provide an advertisement that is narrowly targeted to suit the site visitor. The search for an ad targeted to the site visitor in question can be accomplished by database searches over the ad data store and associated matching algorithms. For example, if the affiliate content server provides the advertisement server with three facts about the site visitor, the advertisement server can search the ad data store for ads that most closely match the provided criteria. Any discovered ad 8278 can then be inserted into content page 8276c and presented to the site visitor by the affiliate content server 8274.

If multiple matching ads are discovered, multiple ads can be shown to the site visitor or the ads can be narrowed down based on additional criteria, such as the amount of revenue generated by the ad, the amount of time since the ad was last displayed, etc. The number of ads displayed to the site visitor may be determined by the number of ad positions made available by the affiliate content server. If the number of relevant ads matching the site visitor is less than the number of available ads, the extra ad space can be filled in with broad based ads or ads driving traffic for the system as a whole. For example, ads might drive traffic to the original listing service, e.g., the job listing server.

Figure 83:
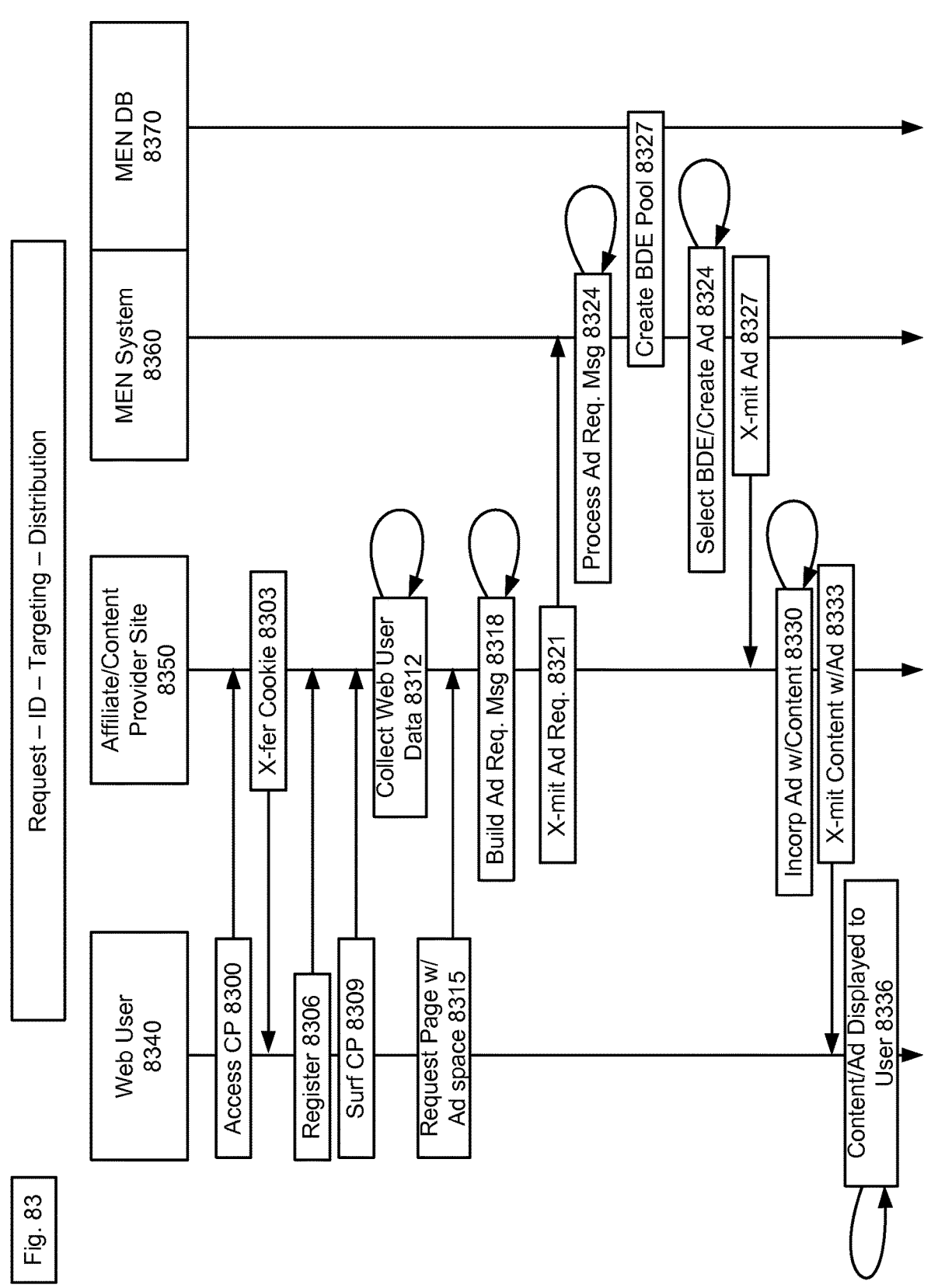
FIG. 83 is a flow diagram illustrating aspects of a process flow associated with advertisement targeting according to an implementation of the system.

FIG. 83 illustrates an flow diagram associated with ad targeting according to another implementation of the system. Web user 8340 attempts to access content provider 8300. In a passive data collection implementation, the content provider 8350 may transfer a cookie 8303 to the web user's terminal 8340. The system may also implement aspects of an active data collection implementation—e.g., the web user 8340 may register with the content provider 8306. After the registration, the web user may navigate through various pages associated with the content provider's web site 8309. As the web user navigates through the various pages, the content provider collects data associated with items of interest, advertisements displayed to the web user, content (and/or categories of content) provided to the web user.

As part of the user's navigation, the user may click a link for a particular page (or type of content) (e.g., requesting a computer programming news front page) 8315. As part of creating the page and responding to the web user, the content provider 8350 accesses content provider databases 8370 to retrieve the requested content, the content provider may then create an ad request message 8318 (described in greater detail with regard to FIG. 84A) and transmit the ad request message 8321 to the CAN system 8360. The CAN System 8360 receives and processes the Ad request message 8324 and creates a potential BDE pool 8327 (described in greater detail with regard to FIG. 84B). The CAN system then selects the underlying BDE from the pool 8324, creates the distribution advertisement and transmits it back to the Content Provider 8327 for incorporation with the web user's requested content 8330. The requested content with the incorporated advertisement is then transmitted from the content provider to the web user 8333, where it is displayed to the web user 8336. In some implementations, the ad request message may include content destination address parameters, as such the advertisement may be created by the CAN system and transmitted to the web user terminal for incorporation with the requested content from the content provider.

FIG. 84A illustrates aspects of an implementation of the distributed advertisement request message generation process. The Content Provider receives a request for certain content from a web user 8400 (e.g., the web user may have clicked on a link at the Content Provider's web site). The content provider (or affiliate) may retrieve their content, as well as create an ad request message that is transmitted to the CAN requesting an distribution advertisement for incorporation with their content. The ad request message is populated differently base on whether the requesting Content Provider/Affiliate is registered with the CAN system 8410.

If the Content Provider is not registered or is implementing in a limited trial version of the CAN System, the Ad creation process may initiate a registration process for the Content Provider 8412. Also, the in this implementation, the Content Provider may be requested to provide a general data descriptor 8414 that provides a high-level description of the types of content that the Content Provide provides to web user. The general data descriptor is used to populate the ad request message, which is then transmitted to the CAN system as a request for a default distribution ad 8416 (e.g., the CAN may determine that requesting entity is a content provider directed to new broadcasting and request an underlying BDE from a related field, such as a journalism job opportunity).

A registered Content Provider (or one implementing a full trial version of the system) populates the ad request message with a variety of Content Provider Distribution Parameters 8415. For example, a registered Content Provider may simply provide a Content Provider ID and/or an ad specification ID 8420 (as described below, these parameters are may be used by the CAN system to correlate various stored Content Provider and/or advertisement characteristics, such as Content Provider descriptors, advertisement specification formats or any other number of CAN system stored content provider characteristics used during the BDE selection and/or Ad creation process). The Content Provider may provide additional content category data 8425 (e.g., a computer news web site, may provide various data related to the general type of content requested by a user, such as—Personal Computer News stories). In some implementations, this data may be further supplemented by a descriptor related to the specific content being requested 8430 (e.g., a specific news story about the latest personal computer CPU).

Once the Content Provider distribution characteristics have been populated, the Content Provider may incorporate web user data about the web user into the ad request message 8435. If no web user data exists the ad request is based primarily on the Content Provider distribution characteristics, as the Content Provider prepares a request for the distribution ad 8440. The Content Provider may have a variety of identified web user data, for example the Content Provider may have active 8442 or passive 8443 web user interaction data. For example, the Content Provider may populate the ad request with the web id 8444 associated with a registered web user collected during a registration process, or during content provider/web user interaction (e.g., an id that the CAN system may use to access a variety of user characteristics that have been previously uploaded to the CAN system). In another example, the Content Provider may populate the ad request message with collected dynamic web user data (e.g., cookie data collected from an anonymous web user during interaction with the Content Provider). In other implementations, the ad request message may be configured to include a wide variety of other distribution parameters that may be used by the CAN in selecting the BDE for distribution as an advertisement. Once the ad request message is populated, the Content Provider finalizes and transmits the Ad Request message to the CAN system.

FIG. 84B illustrates aspects of the CAN system processing an ad request message and selecting an underlying BDE for distribution as an online advertisement. The CAN system receives the ad request message from the Content Provider/Affiliate 18450. The CAN system determines whether the requesting Content Provider is a registered content provider 8455. If the requesting content provider is a registered content provider, the CAN system extracts content provider distribution characteristics 18457. The CAN system may be configured to extract a Content Provider ID, which may be correlated to a wide of a Content Provider distribution characteristics that are stored during a registration process and/or through ongoing data updates.

For example, the Content Provider ID may be correlated with ad formatting specification 8459, Content Provider content descriptors 8461 such as, technology news, computer news, etc., content descriptors related to the specific web user requested content 8463 such as, a descriptor about the requested link or news article. In some implementations, the CAN system may be configured to extract these or other distribution parameters that the Content Provider uses to populate the ad request message (instead of being stored on the CAN system and correlated to the Content Provider ID). These and other distribution parameters may be used to identify a number of potential BDEs that are used to create a BDE distribution pool 8469.

For example, if Content Provider descriptor 8461 indicates the content provider is involved in computer programming news and that the web user requested content is a link to an article discussing a new java programming technique. The BDE distribution pool may be created to contain twenty-five BDEs related to computer programming employment opportunities. In an implementation, the CAN system may implement a scaling module, in which the distribution pool may be sub-divided into granular groups of BDEs, such as Java programming opportunities, AJAX programming opportunities, or other sub-groups.

If the Content Provider is not a registered affiliate 8455, the CAN system may analyze the requesting entity 8465

(e.g., by retrieving content provider characteristics from a CAN maintained content provider database, by extracting a general content provider descriptor from the ad request message or a number of other processes). For the un-registered Content Provider, the CAN system may derive a general distribution pool 8467. For example, if the Content Provider does not have an Content Provider ID with stored characteristics and/or was not able to populate an ad request message, the CAN system may determine that the Content Provider is in a computer related industry by analyzing the requesting address (e.g., www.javacomputemews.com) and create a general distribution pool that includes twenty-five computer industry job opportunities.

Once the BDE distribution pool has been created, the CAN system determines whether the ad request message includes web user data 8471. If the ad request message does not include web user data, the CAN System selects a BDE from the distribution pool base on sponsor subscription characteristics associated with the BDEs in the pool. In contrast, if the CAN system extracts a web user data record 8473, the system retrieves web user characteristics from the CAN system database. The CAN system may analyze a user data record (if one exists) 8475, user data extracted from the ad request message 8477 (web user cookie data) or some combination of the two. The user data is then used to adjust the BDE pool 8479 (e.g., add, delete, or substitute BDEs with BDEs from the pool). In an example, the CAN system may retrieve a data record that indicates an identified web user is (or has been) a Java programmer. This information may be used to delete non-java programming opportunities from the BDE distribution pool. Further, the CAN system may be configured to retrieve additional BDEs that related to Java programming opportunities to supplement the BDE pool.

After the contents of the BDE pool is adjusted, the CAN system may conduct an initial ranking of the BDEs in the distribution pool according to a number of factors 8479. For example, the content provider distribution characteristics, the web user characteristics, or some combination of the two may be used to create a ranking of BDEs based on their relevance to the content provider and/or the web user. Further, the system may utilize BDE sponsor data to refine the initial rankings. If web user data does not exist, the CAN system may derive a ranking based on the content provider's and/or the sponsor's distribution parameters. In an example, the initial system derived BDE ranking 8479 may be reordered to fulfill sponsor distribution specifications 848*i*, (e.g., if a BDE in the distribution pool is designated as a premium weighted BDE, it may be selected for distribution before regular subscription BDEs). In another example, if the BDE pool includes a BDE that must be distributed in order to fulfill a sponsor's distribution or impression quota, it may be selected for distribution over BDEs that may have more relevant subject matter. These implementations facilitate balancing distributing advertisements that are particularly relevant to a content provider, a web user or both, as well as meeting the distribution requirements associated with a particular sponsor's underlying BDEs. Once the balancing is achieved, the CAN system selects the BDE and transfers it to the an Ad creation module associated with the CAN system 8483.

Figure 85:
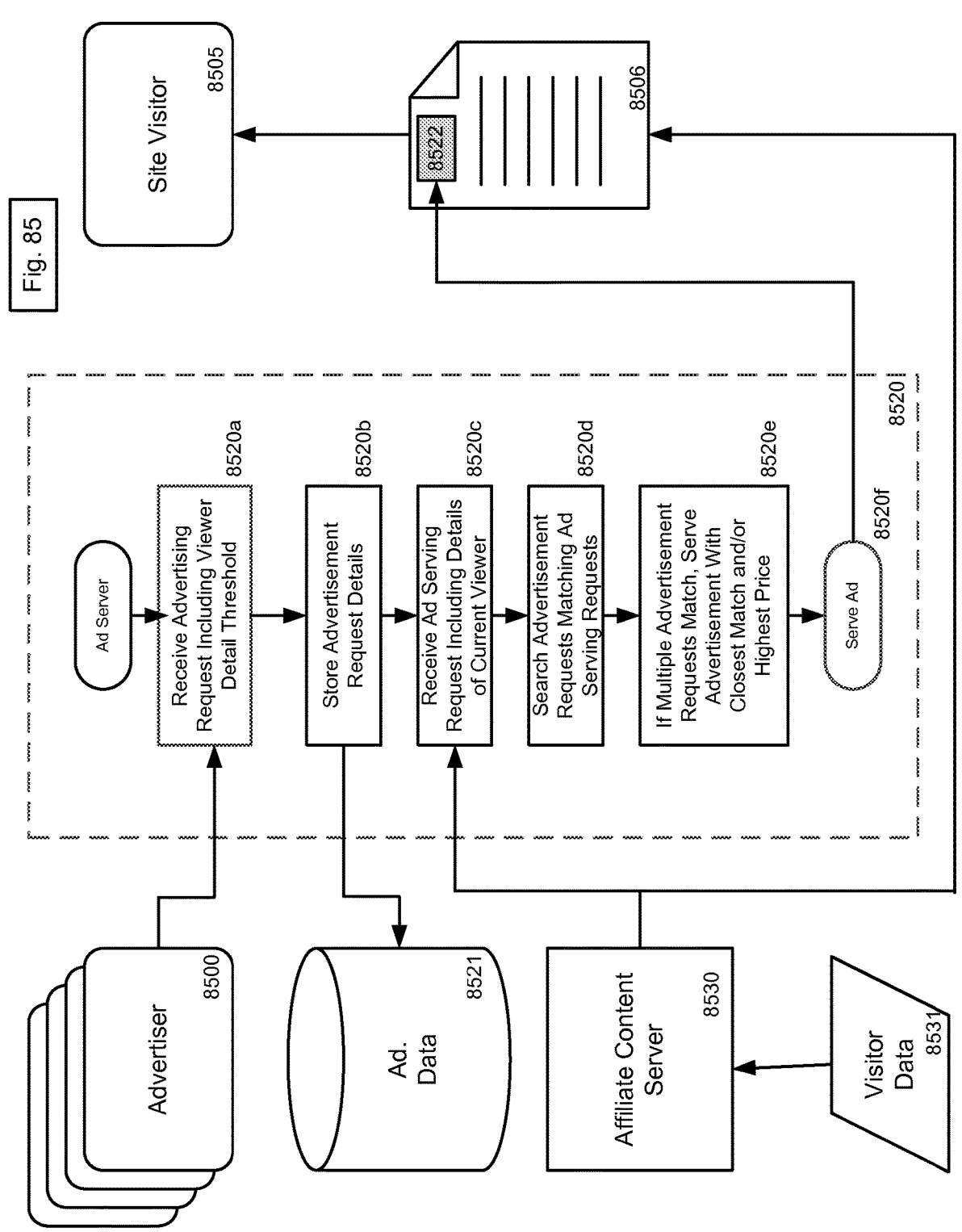
FIG. 85 illustrates a flow diagram of the targeting and distribution process of another implementation of the system.

FIG. 85 shows an exemplary process and flow diagram for ad serving in accordance with the disclosed system. One or more advertisers 8500 submit a request for advertising, which is received by the ad server 8520*a*. Along with the request, the advertiser may include information indicating the site visitor criteria identifying preferred candidates for the advertisement and the amount the advertiser is willing to pay. In the alternative, the relevant site visitor criteria can be extracted from the content of the listing. The advertiser might also have specific requests. The advertiser, for example, may require that the ad is only shown to site visitors in a particular geographical region or with a specific education level. Or, the advertiser might simply indicate that its ads should only be displayed to site visitors that match a certain number of its listing criteria. For example, the advertiser might choose a level where the ad is only shown to site visitors that match three or more criteria relevant to its offer. The ad server can then store the advertisement request details 8520*b* in the ad data store 8521.

An affiliate content server 8530 will interact with the ad server to request ads to be displayed in the affiliate content server's content pages 8506. The affiliate content server 8530 will display its content to site visitor 8505. In interacting with the site visitor, or through previous interactions with the site visitor, the system develops site visitor data 8531. The site visitor data 8531 may be passed to the ad server along with the request for ad serving. Upon receipt of the ad serving request 8520*c*, the ad server searches 852*od* the ad data 8521 for ads matching the request, including any supplied visitor data. If multiple potentially matching ads are discovered in the search, the ads with the highest price and/or the closest match to the submitted data are served 8520*e*. If only one ad is discovered, that ad is served. The ad to be served 8521 is inserted into the affiliated content server's content page 8506. This can be done directly by the ad server 8520 or the ad could be provided to the affiliate content server for insertion into the content.

In an alternative embodiment, instead of using pre-generated ads stored in the ad data store, the advertisement server may directly search the job listings data store for relevant job listings. If a job listing matching the ad request is discovered, an ad can be automatically generated using the ad generation techniques described above. The ad can then be inserted into the content displayed to the site visitor. In such system the ad data store could either be eliminated or it could be used to store details regarding the advertisers' requests, budgets, criteria, and ad pricing.

Figure 86:
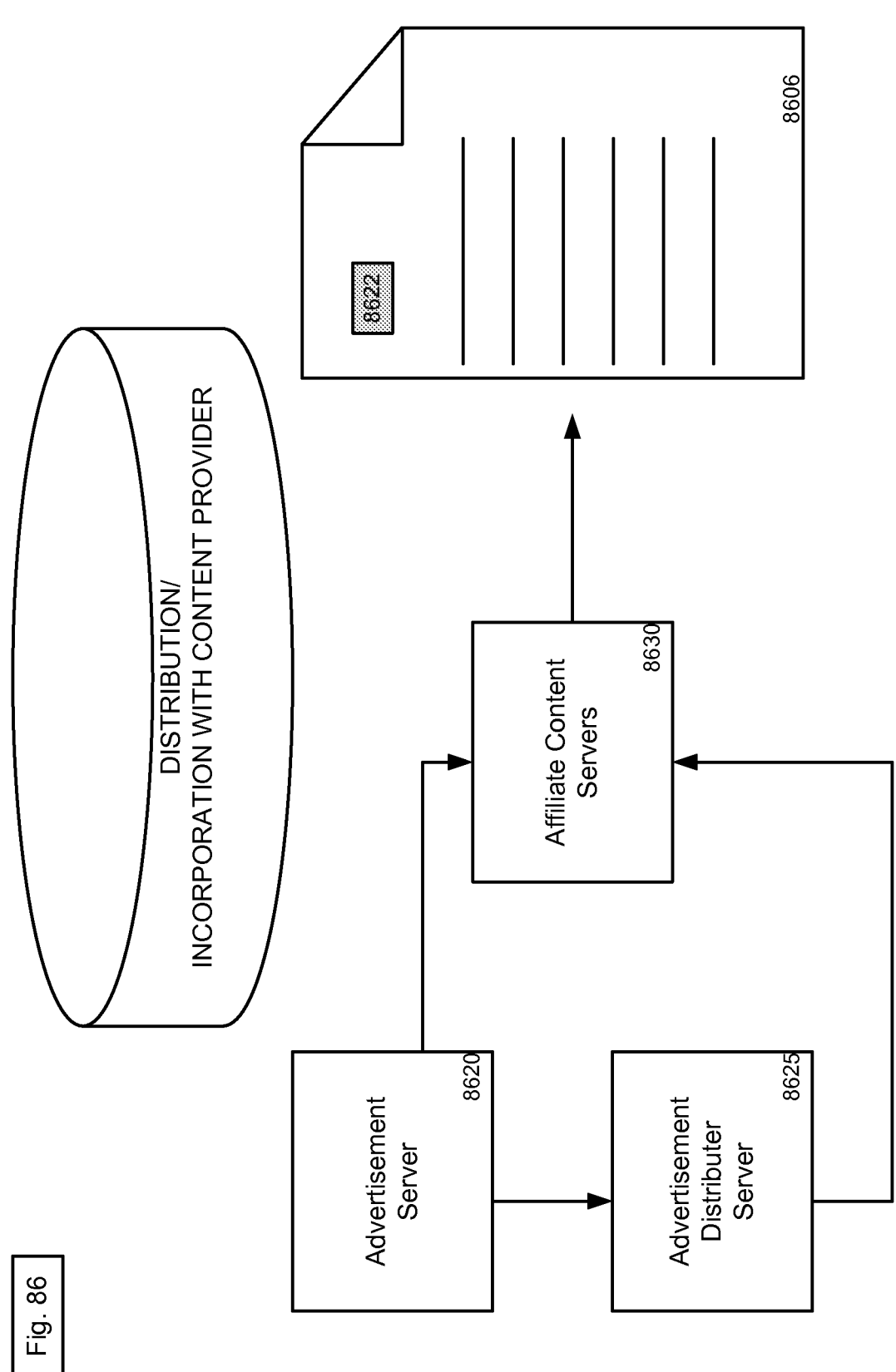
FIG. 86 illustrates aspects of the advertisement distribution process according to an implementation of the system.

FIG. 86 illustrates an embodiment disclosing advertisement distribution in accordance with another aspect of the disclosed system. As shown in the figure, advertisement server 8620 is in communication with affiliate content servers 8630 and advertisement distribution server 8625. The affiliate content server displays site content pages 8606. The figure demonstrates a number of methods for distributing ads 8622 to the affiliate content server. In one embodiment, the advertisement is passed from the advertisement server directly to the affiliate content server. It should be noted that ad could either be delivered as the content of the ad itself or it can be delivered as a symbolic link to the ad content. In another embodiment, the ads can be served by a dedicated advertisement distribution server, which might be embodied by an existing commercial ad distribution network. In this way, the advertisement server can take advantage of large commercial distribution networks and have access to affiliate content serves that would like to source their advertisements through such a provider.

Advertisement Evolution

The present disclosure includes a discussion of systems, methods, and apparatuses for an Advertisement Evolution Engine (hereafter "Engine"). The Engine may be configured to track advertisement performance and generate new advertisements based on performance metrics such as user responses to and/or interactions with existing advertisements. In one embodiment, the disclosed Engine is configured to interact with three entities: each of which is communicatively coupled to the Engine: (i) a content provider capable of transmitting and receiving data to a web user, for example media and advertisement content, (ii) a web user capable of receiving and interacting with displayed advertisements, as well as providing feedback and (iii) an underlying database entry host for generating and/or populating advertisements.

It is to be understood that, while the system may be described herein primarily in the context of web-printed advertisements (hereafter "Ads"), the system provides an administrator with significant flexibility and freedom to configure the system for any other number of information dissemination applications embodied in a wide array of media, including print, World Wide Web, television and radio, signs and billboards, product placement, postal and e-mail communications, and/or the like.

Furthermore, although the system may be described herein primarily in the context of evolving Ad generation templates, it is to be understood that, depending on the needs, parameters, specifications, etc. of a particular implementation, the system may be configured to evolve other advertising system functionality or processes. For example, a system administrator may configure iteratively optimized system modules including: Ad tracking routines, Ad targeting, Ad distribution routines, resume/job seeker profile generation routines, information dissemination/display routines, and/or the like.

Figure 87:
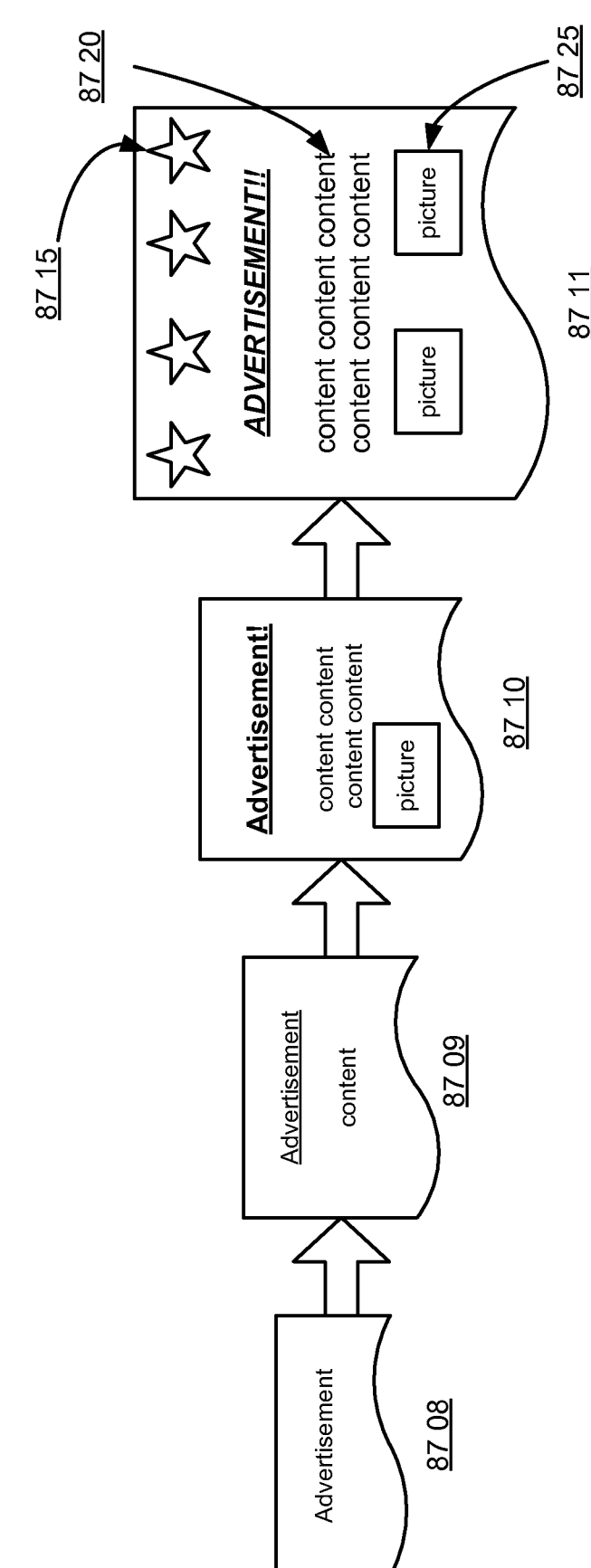
FIG. 87 provides a conceptual illustration of Ad evolution within an embodiment of the present invention.

FIG. 87 provides a conceptual illustration of evolved advertisements according to an embodiment of the present invention. More specifically, the figure illustrates a representation of Ad evolution analogous to the archetypal illustration of organismic evolution. An Ad generation template lineage may begin at primitive and/or untested "ancestral stages" 8708, and proceed through intermediate stages of adaptation (8709, 8710) to a "modern" stage (8711). In the example shown in the figure, the Ad evolves from a simpler form (8708) into one of greater complexity (8711) by incorporating elements of the 'successful' advertisements as determined by the system. The characteristic features and/or elements of an evolving Ad (8715, 8720, 8725) may be selected based on their capacity to make the Ad more effective.

Figure 88:
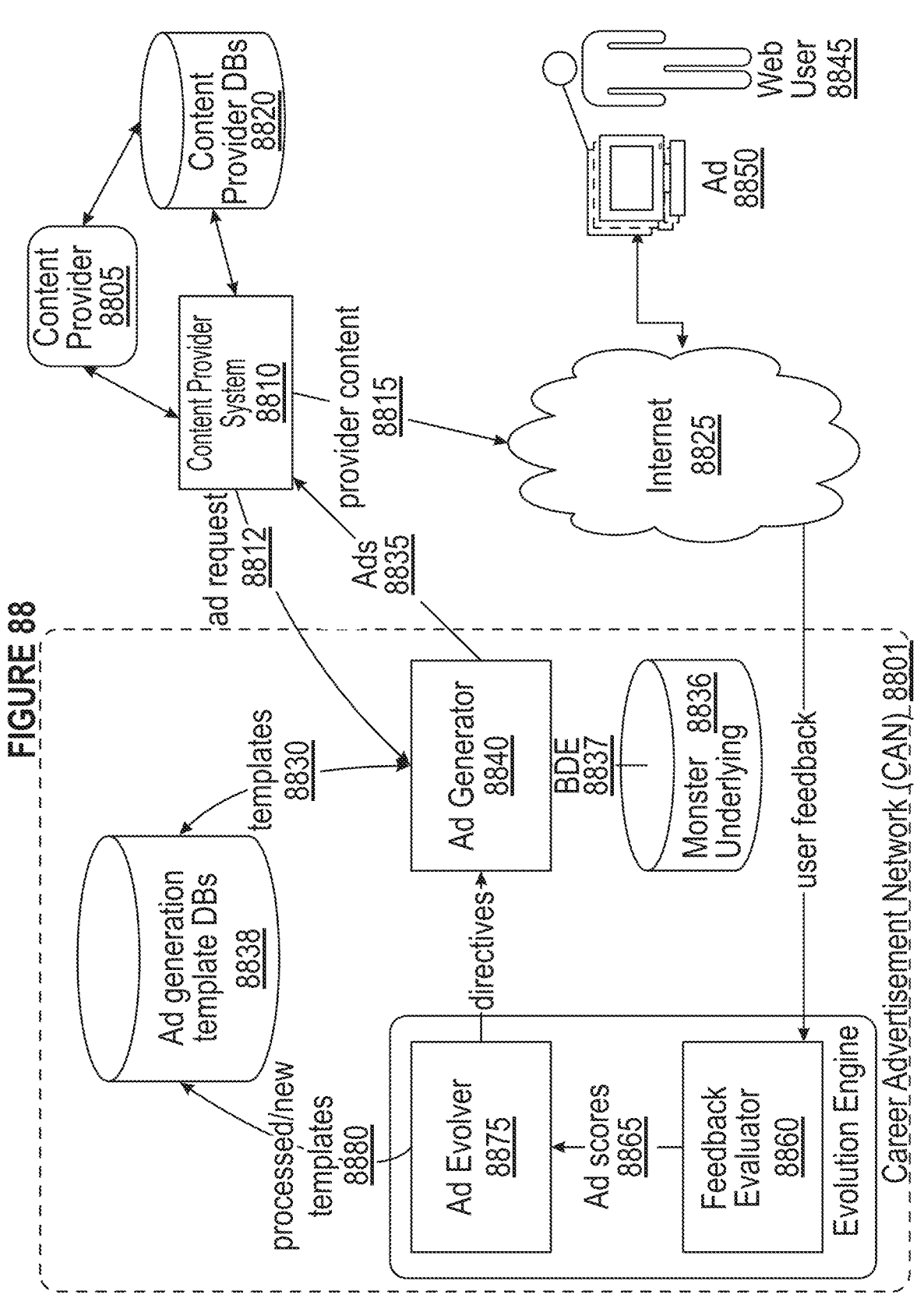
FIG. 88 provides an overview of various entities that may interact with the Engine at various points during system utilization.

FIG. 88 provides an overview of various entities that may interact with the Engine at various points during system utilization. According to an embodiment of the invention, the Career Advancement Network ("CAN") 8801 includes the Engine and facilitates aspects of the functionality described herein. A content provider 8805 connects with the CAN 8801 via a Content Provider System 8810 to request an Ad 8812 from the CAN 8801 for incorporation with provider content from Content Provider Databases 8820. The combined provider content 8815 and generated advertisement are displayed together to web user 8845 on terminal 8850.

Depending on the particular system specifications, the Content Provider System 8810 may connect directly with the Engine as illustrated in FIG. 88. Alternately, the Content Provider System may connect with the Engine via an intermediary CAN module. While in yet another implementation, the Content Provider System 8810 connects with the Engine via an intermediary network such as the internet 8825.

The CAN 8801 retrieves Ad generation templates 8830 from an Ad generation template database 8838 based in part on provider content characteristics included as part of the ad request 8812. The CAN system extracts and incorporates content from base data entries (BDEs) 8837 which are stored on a BDE host entity's underlying data base 8836 (e.g., a database with Monster job listings). The system processes extracted BDE content in accordance within an Ad Generator module 8840 in accordance with a set of generation rules stored in the ad generation template DB 8838. The generated ads 8835 may be sent to the content provider system 8810 for incorporation with the provider content 8815 before final distribution across the internet 8825 to web user 8845.

For example, the content provider 8805 may be configured as a sports news web site. The content provider 8805 distributes various sports news content from the content provider's database 8820. The CAN 8801 may be configured to coordinate incorporating CAN generated advertisements 8835 into the content 8815 distributed by the content provider's system 8810. The CAN 8801 is configured to create the advertisement based on a variety of factors, some of which may include: a content provider's content 8815, a content provider's advertisement system configuration, web user 8845 characteristics, and/or any variety of other distribution metrics.

In one embodiment, the Ad generator selects an Ad generation template based in part on parameters generated in an Ad targeting/distribution process.

Web users 8845 view distributed Ads on terminal computer systems 8850 and provide passive/active feedback 8855 to the CAN. In one embodiment, web users 8845 register responses that are relayed to a feedback evaluator module 8860 within the Engine. The feedback evaluator module 8860 processes user responses 8855 and generates a set of Ad scores 8865 based on the responses. The scores may then be issued to an Ad evolver module 8875, which uses the scores to process Ad generation templates and/or create new templates 8880 for future use. These templates are managed by the Ad generation template databases 8838.

Figure 89:
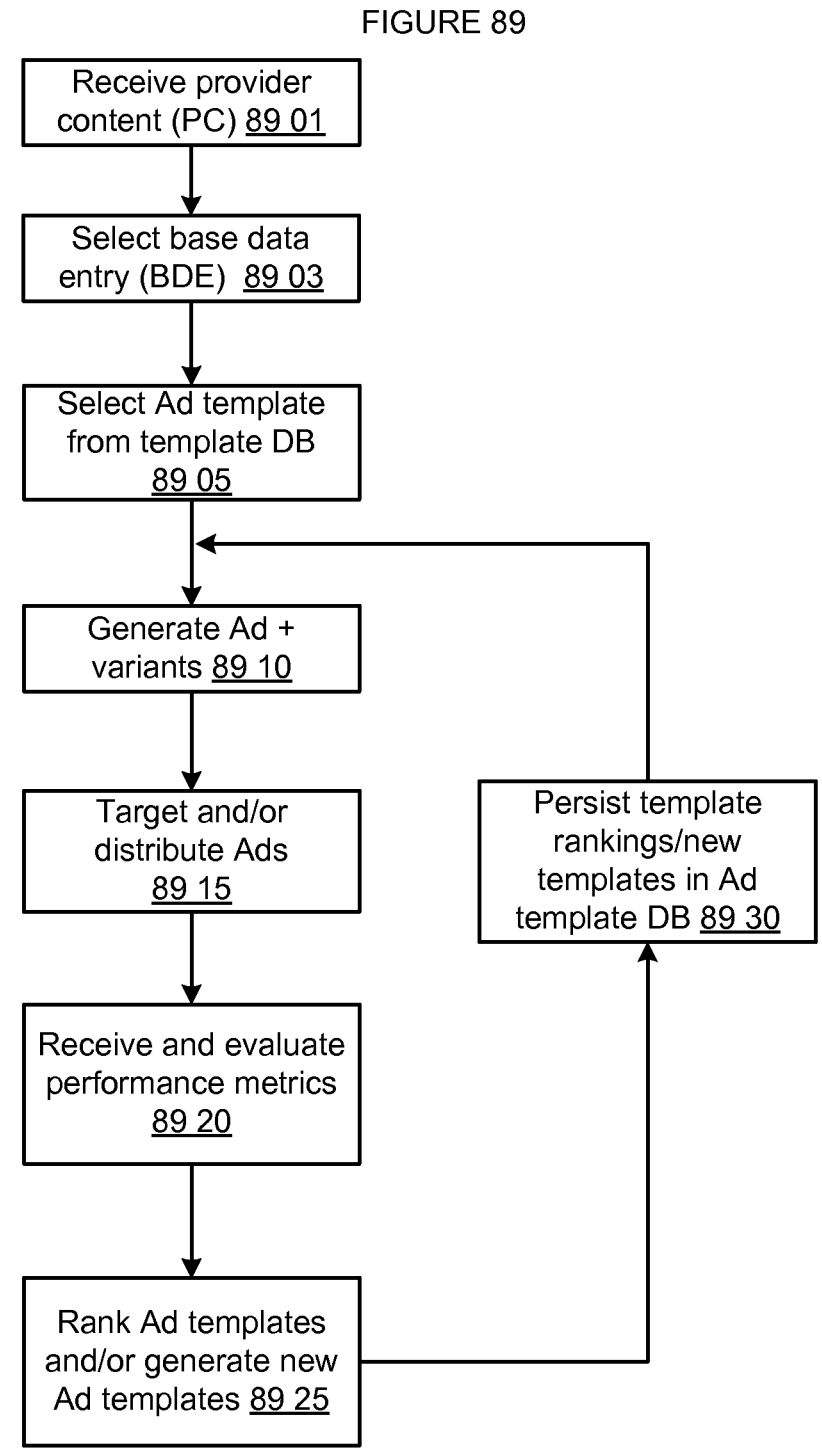
FIG. 89 exhibits a high-level flow diagram illustrating aspects of the advertisement evolution process in one embodiment.

FIG. 89 is a high-level flow diagram illustrating aspects of the advertisement evolution process in one embodiment of the system. The system receives provider content from content provider/system affiliate 8901, selects a BDE 8903, and selects an Ad generation template from Ad generation template database (DB) 8905. Extracted content from a BDE is organized into an Ad or Ads at 8910 in accordance with instructions in the Ad generation template. The extracted content from a single BDE may be incorporated into a variety of different Ads based on BDE organizing instructions contained in various Ad generation templates.

Depending on the system implementation, Ads may be widely distributed and/or targeted to particular web users 8915. After distributing the generated Ads 8915, the system may receive web user feedback in the form of web user-Ad interaction and/or Ad evaluations 8920. The system receives the feedback and derives a series of performance metrics by analyzing web user registered responses interacting with (passive feedback, e.g., click-throughs, mouse-overs, etc.) and/or reacting to (active feedback, e.g., ratings, etc.) the Ads. The system subsequently manages ranking Ad generation templates and/or generating new Ad generation templates 8925 for populating the Ad generation template database 8930 based on derived performance metrics 8920. In managing the ad generation template database, the system is able to incorporate Ad features/elements from successful distributed Ads into future generations of distributed Ads that are expected to elicit particular user responses. The following discussion will discuss aspects of the FIG. 89 flow diagram in greater detail.

Ad generation 8910

FIG. 90 illustrates Ad generation in one embodiment. A content provider requests an Ad from the CAN and may supply provider content characteristics that detail a content provider's content, a content provider's advertisement system configuration, web user 8845 characteristics, and/or any variety of other distribution metrics.

This triggers the CAN to select a BDE 9001 from an underlying Monster BDE database 8838—in this case pertaining to a Monster.com job listing. The system then extracts BDE content such as the listing's job title 9005, sponsor company 9010, location 9015, status 9020, job category 9025, required/desired experience 9030, expected career level 9035, required/desired education level 9040, salary 9045, job tag 9050, and job description 9055 as BDE elements.

In one embodiment, the BDE may be supplied in an XML format with a form such as:

```
<Job_Listing_BDE>
    <ID> 012345 </ID>
    <title> Associate Director Climate Physics </title>
    <company> National Climate Labs (NCL) </com-
        pany>
    <location> Miami, FL </location>
    <status> Full-time, Employee </status>
    <category> Science </category>
    <experience> 8+ years </experience>
    <level> Manager </level>
    <education> Doctorate </education>
    <salary> $200,000/yr </salary>
    <tag> Leadership Opportunity in Climate Physics
        </tag>
    <description>
        NCL is seeking an individual with proven scientific
            accomplishments and leadership qualities to guide
            its Climate Physics Group. This group is com-
            prised of nationally recognized atmospheric
            research scientists and Engineers working toward
            measurable improvements in climate change pre-
            diction.
    </description>
</Job_Listing_BDE>
```

The incorporation of BDE content into an actual distributed Ad is instructed by an Ad generation template 9060. Analogous to the way an organism's genetic sequence determines the expression of many of its traits, the Ad generation template 9060 may determine Ad format, traits, characteristics, and/or elements of an advertisement. There exist a vast array of Ad characteristics that an Ad generation template may control or determine, including which BDE elements are incorporated into/omitted from an advertisements, as well as Advertisement format and characteristics such as layout, arrangement, and/or size of BDE elements and/or other Ad features, colors, fonts, multimedia content (e.g., images, animations, video, audio, etc.).

The generation template may also coordinate Ad themes, background designs, incorporation of and arrangement of interactive elements/widgets. Also, the generation template may be configured to define the Ad size, Ad type (e.g., in an internet-based Ad embodiment, the Ad type may specify pop-up, pop-under, banner, hover, interstitial web page, rich media banner, e-mail solicitation, redirect, and/or the like), Ad combinations, proximities of different Ads, and/or the like. In the embodiment shown in FIG. 90, the template instructing the expression of extracted BDE elements in a particular Ad is encoded in an XML format 9065. The resulting Ad is displayed at 9070.

Figure 91:
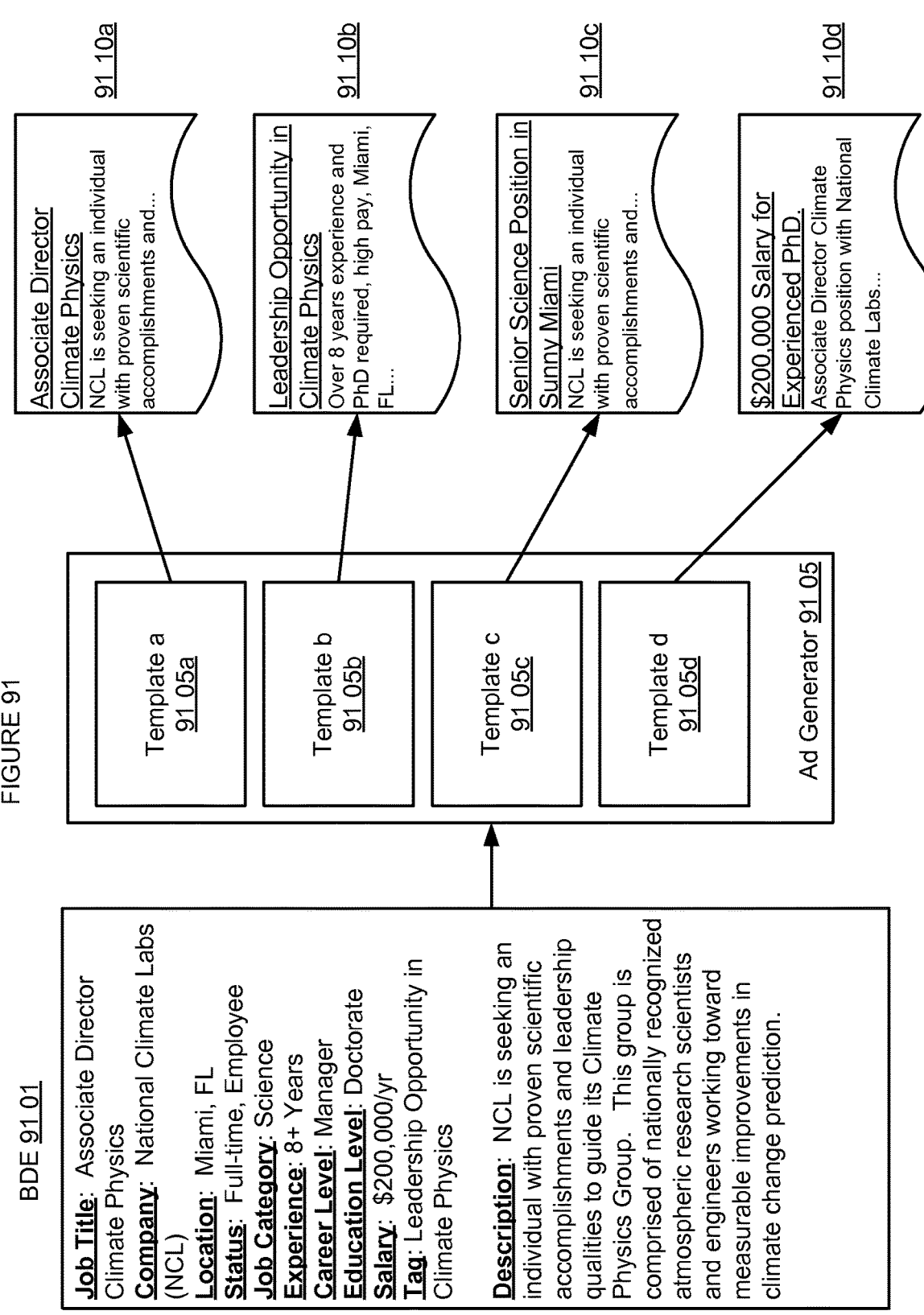
FIG. 91 illustrates one embodiment of the incorporation of the same underlying BDE into different Ads using different Ad generation templates.

A single BDE may be incorporated into a diverse array of different Ads, yielding a sort of Ad biodiversity, via the employment of different Ad generation as templates. FIG. 91 illustrates this principle in one embodiment, wherein a single BDE 9101 (as in FIG. 90) is processed via the Ad generator 9105 module through four generation templates (9105*a*, 9105*b*, 9105*c*, 9*iosd*) to yield four different Ads with different styles and/or designs (9110*a*, 9110*b*, 9110*c*, 9*iiod*). The Ads in this demonstrative embodiment, despite being built from the same BDE 9101, each emphasize a different aspect of the job opportunity listing in the Ad heading (e.g., 9110*a* emphasizes the job tide, while 9*iiod* emphasizes salary and education level requirements). The different manner in which each Ad organizes and displays the BDE elements 9101 may affect users differently and translate into different degrees of Ad performance success.

In one embodiment, two Ads generated from the same BDE using different Ad generation templates may be displayed simultaneously and/or in close proximity to each other. The simultaneous close proximity display facilitates a unique opportunity to obtain feedback for two distributed advertisements. More specifically, this implementation involves displaying the advertisements to a web user with the identical demographic information (because they are each displayed to the same web user). Accordingly, the system is able to obtain premium feedback regarding how distributed advertisements perform and more effectively gage which Ad (and, thus, which underlying Ad generation template) is more successful.

The Engine processes user feedback correlated to existing Ad generation templates to yield new Ad generation templates. In one implementation of the system, an initial pool of Ad generation templates may be set up at the outset of Engine operation, in order to supply a diverse set of Ad types for users to interact with and/or react to. The initial pool of Ad generation templates may reflect a variety of different compositions and be created by a variety of different means in various embodiments within the scope of the present invention. For example, in one embodiment, the initial pool of Ad generation templates may be manually created by a system administrator. In another embodiment, the Engine may analyze a collection of existing Ads to extract Ad generation templates. This may be accomplished, for example, by employing a variety of image, OCR, and/or text recognition and processing tools. In a further embodiment, a system user created generation template may be compared against system generation templates.

Web User Response Registration (8855, 8920)

Evolutionary success from a biological perspective essentially depends on an organism's (or, more fundamentally, a gene's) ability to successfully reproduce. Traits that are genetically determined (i.e., passed from one generation to the next) and promote reproductive success prevail in subsequent generations, while traits that inhibit reproductive success dwindle and die out as the organisms who carry them fall behind in sprouting offspring.

Similarly, an implementation of the system may employ various standards of performance success for evaluating Ad efficacy. The system may be configured to rank the Ads based on one or more performance characteristics. The ranking, in turn may be used to determine the propagation of particular Ad generation templates and/or Ad generation template elements in subsequent generations of Ads. Possible definitions of Ad success are widely varied and may differ depending on particular goals or requirements of different embodiments of the CAN. Some examples of Ad success may include Ad click-through numbers or rates (e.g., Ad click-throughs per impression, Ad click-throughs per day, etc.). Additional Ad performance characteristics may be based on Ad user ratings, Ad consummation numbers or rates (e.g., a purchase made based on an Ad click-through, a job interview/hire based on a job listing click-through, application submissions, new user registrations. Also, Ad performance characteristics may include any other type of post-click response that may be correlated with web user interactions with an Ad), mouse-overs (such as may be detected by an Ajax and/or JavaScript enabled software module), clicking on interactive Ad elements, mouse pointer tracking, head and/or eyeball movement tracking, time spent on an Ad, content provider requests for particular Ad generation templates, and/or the like.

In one implementation, only positive user responses are registered while in another implementation, both positive and negative user responses are registered, while in still another implementation, only negative user responses are registered. An example of a negative user response might be closing a window containing an Ad quicker than a specified minimum time period, a low and/or negative user rating, and/or the like. In one embodiment, only web user interactions with and/or responses to whole Ads are registered by the Engine, while in another embodiment, only web user interactions with and/or responses to elements within an Ad are registered by the Engine, while in yet another embodiment, web user interactions with and/or responses to both the entirety of Ads and to elements within Ads are registered by the Engine.

Figure 92A:
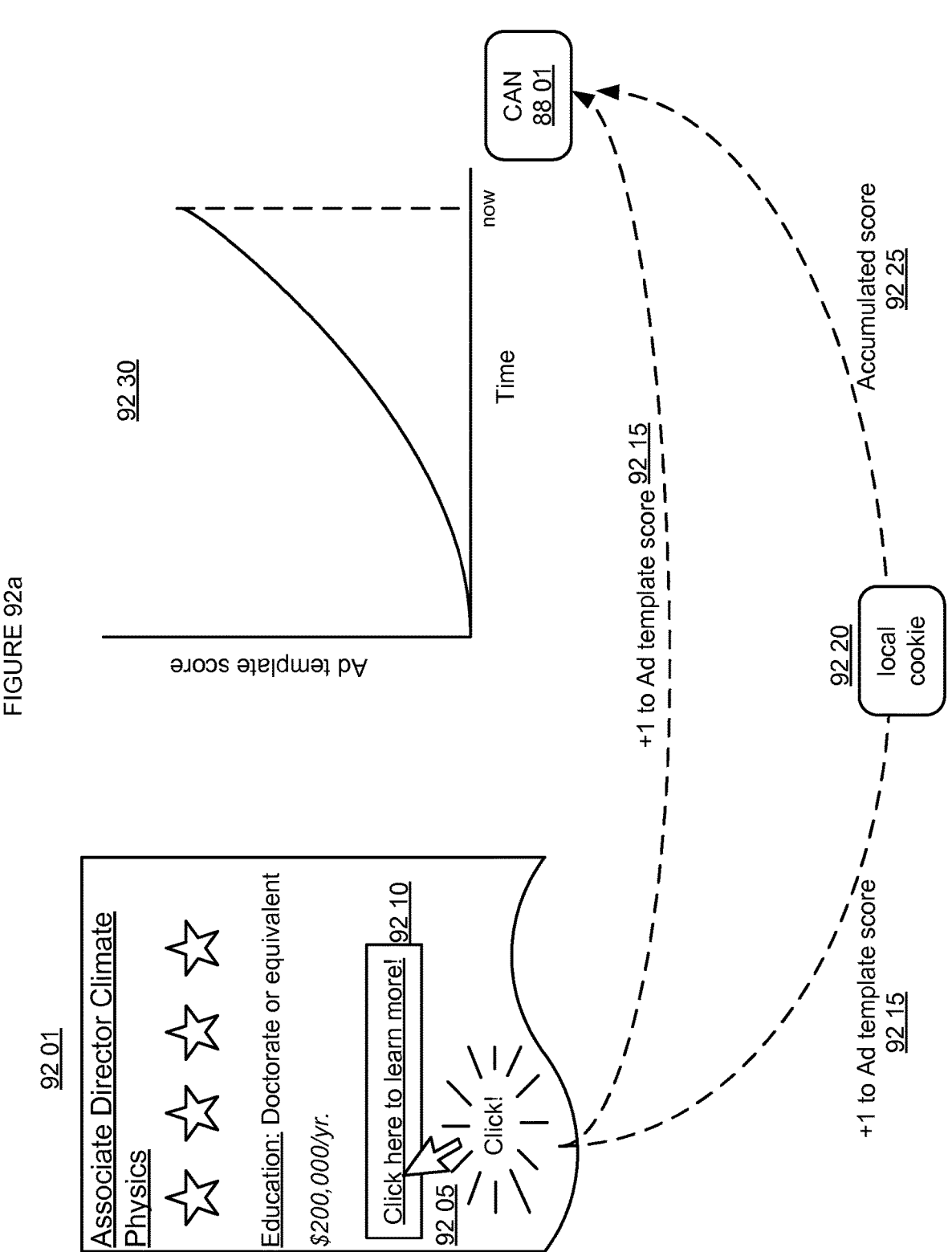

FIG. 92*a* shows an embodiment of an Ad receiving and processing passive performance metric registration based on web user click-throughs. A web user viewing an Ad 9201 may decide to click 9205 an interactive widget 9210 in order to acquire more information. The system may include a feedback module as part of the landing page generation process. The feedback module creates a landing page providing the requested additional information and transmits a feedback indicator back to the system. As illustrated in FIG. 92*a*, the feedback indicator is configured as an increment 9215 to the Ad generation template score 9230 stored in the system. In one embodiment, the increment may initially occur to a record of the Ad generation template score in a cookie 9220 stored locally on the web user's computer; the cookie may then upload an accumulated score 9225 to the system at some later time.

FIGS. 92*b-c* show embodiments of Ads admitting active performance metric registration based on web user ratings of a whole Ad (FIG. 92*b*) or elements within Ads (FIGS. 92*c* and 92*d*). In FIG. 92*b*, a web user may rate their impression of the overall "quality" of the Ad using a radio button widget 9235. A wide variety of other rating interfaces and mechanisms may be employed in different embodiments, including buttons, lists, scrollbars, sliders, text boxes, checkboxes, fields, menus, icons, and/or the like. In FIG. 92*c*, a radio button widget is provided after each Ad element (job title heading 9240, clip art motif 9245, education level requirement 9250, and salary 9255). Since the presence of rating widgets can, themselves, affect the appearance of an Ad, it may be desirable in some embodiments to hide the rating mechanism from immediate view. FIG. 92*d* shows an embodiment wherein the rating widget appears as a pop-up 9260 only when the mouse pointer 9265 is placed over an Ad element (in this case, the star motif).

Web user responses may also be registered for whole Ads or Ad elements within embodiments employing any other performance metrics. Ad element ratings may be considered during creation of new Ad generation templates, whereby collections of highly rated Ad generation template elements are compiled to create new Ad generation templates. Details surrounding creation of new Ad generation templates, including based on compilations of highly rated Ad generation template elements, are discussed below.

In some system implementations, the pop-up rating widget 9260 may be activated on a volunteer's local terminal. The volunteer may be a web user who has agreed to provide feedback to distributed advertisements and identified as a volunteer by processing cookie information stored on their local system. In one embodiment, the Engine may be configured to restrict registration of web user responses and/or interactions for a given, unique web user (e.g., such as may be designated by a unique IP address). For example, the Engine may elect to accept a limited number of web user responses from a particular web user, for a particular Ad, within a particular interval of time, and/or the like.

Feedback evaluation (8860, 8920)

In one embodiment, web user responses and/or interactions registered by the Engine are directed to the Feedback Evaluator module 8860 for subsequent processing. The Feedback Evaluator module may track web user responses/interactions and, in turn, convert them into scores or rankings for Ads and/or Ad elements.

Figure 93A:
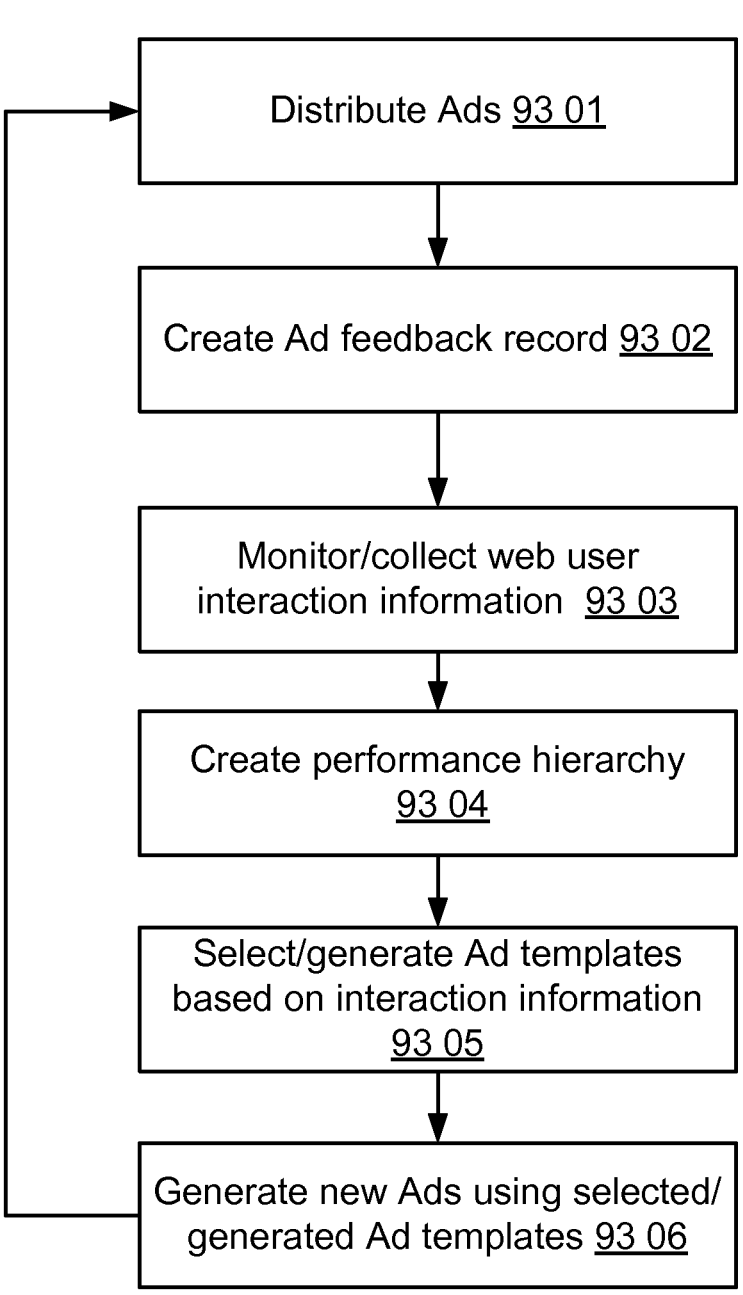
FIGS. 93*a-c* show logic flow for system driven registration of passive performance metrics and web user drive registration of active performance metrics.

FIG. 93*a* shows high-level logic flow for system driven analysis of passive performance metrics. At 9301, Ads are widely distributed and/or targeted to particular web users. At 9302, the system creates Ad feedback records corresponding to the distributed Ads that may be configured to track Ad performance metrics. At 9303, the system monitors web user interactions with Ads and/or collects information regarding web user interactions with Ads that may be stored in corresponding Ad feedback records. In one implementation, the system may install cookies on web user computers that are capable of tracking and/or monitoring web user interactions with Ads and relaying interaction information back to the system. At 9304, the system may create a performance hierarchy of distributed Ads based on performance metrics collected in Ad feedback records. At 9305, the system preferentially selects Ad generation templates and/or generates new Ad generation templates based on collected web user interaction information and/or the performance hierarchy created at 9304. The Ad generation templates selected and/or generated at 9305 are employed at 9306 to create new Ads that are then re-distributed to web users.

Figure 93B:
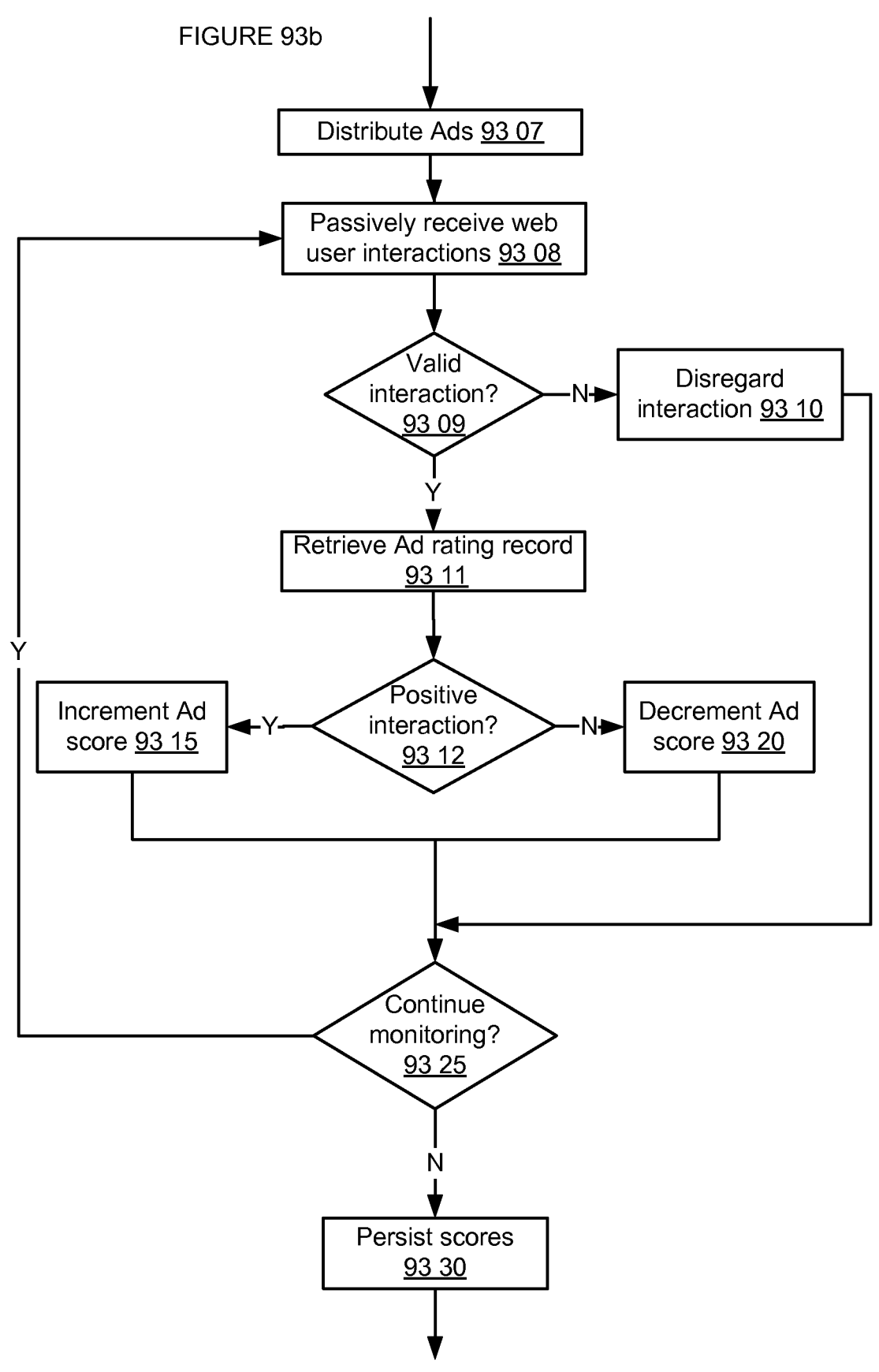

FIG. 93*b* shows detailed logic flow for system driven registration of passive performance metrics in according to an embodiment of the system. Ads are distributed to web users at 9307 and the system passively monitors web user interactions with the Ads 9308. Thereafter, the system may receive a notice of a web user interaction whenever such an interaction occurs or at regular intervals. For example, the system may install a cookie on the web user's computer that collects web user-ad interaction information and periodically uploads the information to the system.

Received interactions are evaluated to determine whether they are valid at 9309. An example of an invalid interaction may be a second click-through indication associated with an Ad for which the same web user has registered a previous click-through within a predetermined duration of time (e.g., the last 10 minutes). Invalid interactions are disregarded at 9310, while Ad rating records are retrieved for valid interactions at 9311. The valid interactions are evaluated to determine whether they are positive or negative 9312 and the corresponding Ad generation template score is incremented 9315 or decremented 9320.

In another embodiment, the received interactions may pertain to elements of the Ad generation template rather than the Ad generation template as a whole. Consequently, Ad generation template elements may be scored separately. The system determines at 9325 if the present round of persistent monitoring should continue. If the system determines the round is complete, the Ad generation template scores are persisted 9330. For example, the system may update and save the performance data associated with the Ad generation template in the Ad generation template database.

Figure 93C:
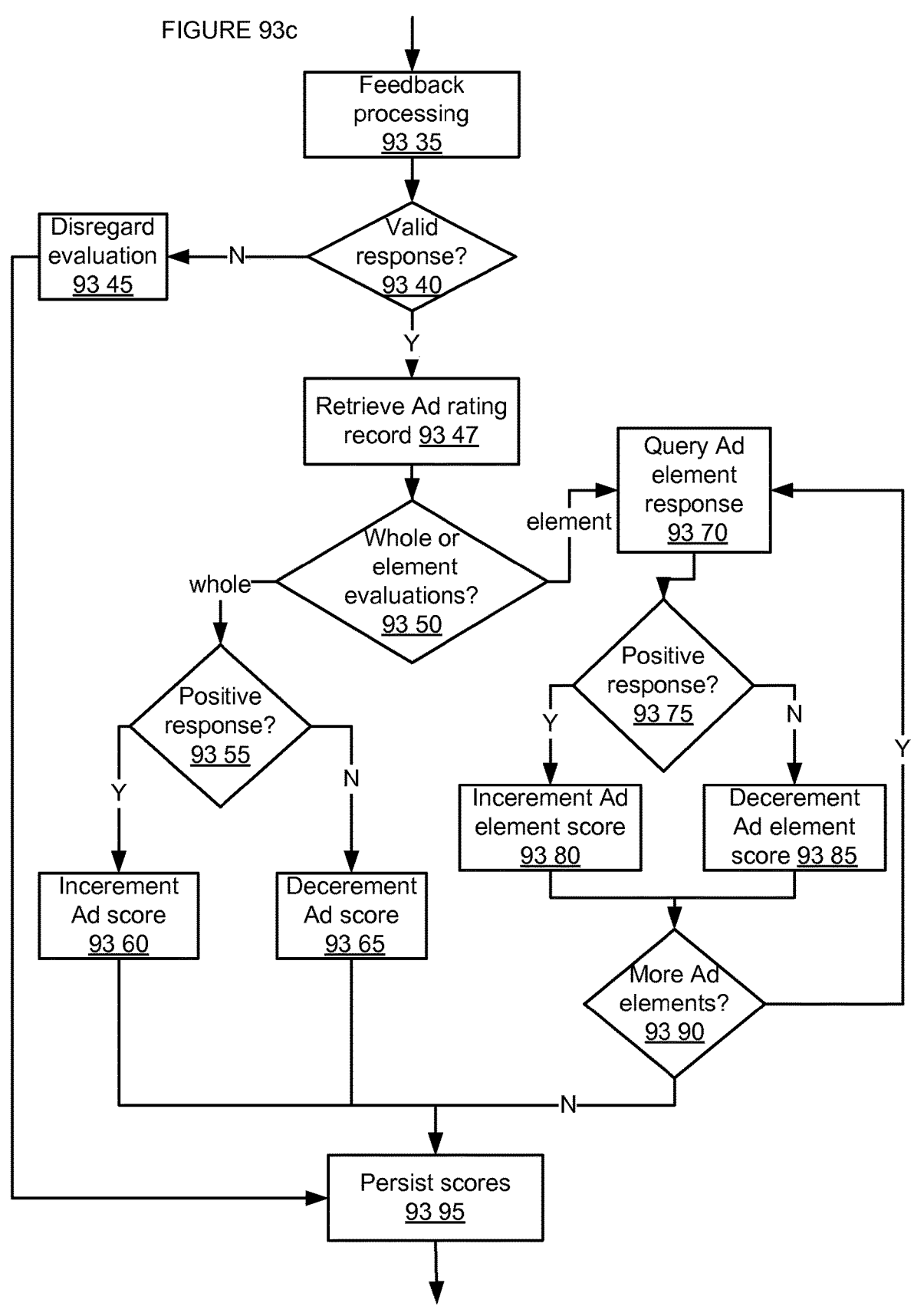

FIG. 93*c* shows detailed logic flow for web user driven registration of active performance metrics in one embodiment that admits evaluation of both whole Ads and Ad elements. Initial processing of web user feedback is performed at 9335, and a determination is made as to whether the response is valid at 9340. An example of an invalid web user response may be the entry of unacceptable characters in a text-box based web user rating interface. Another example of an invalid web user response may be a response from the same web user for the same Ad within a predetermined duration of time.

Invalid web user responses are disregarded 9345, while Ad rating records are retrieved for valid web user responses at 9347. Valid responses are evaluated at 9350 to determine whether they are responses to a whole Ad or to Ad parts/elements. In another embodiment, only whole Ad responses are allowed, while in another embodiment, only Ad element responses are allowed. For a whole Ad response, a determination is made as to whether a positive or negative response has been registered 9355, and the score for the corresponding Ad generation template is incremented 9360 or decremented 9365 depending on whether the response is positive or negative respectively. In another embodiment, only positive Ad responses are registered while, in yet another embodiment, only negative Ad responses are registered. At 9395, the Ad generation template scores are persisted.

In an implementation of the system, the Engine is configured with an Ad scoring management module. The scoring module manages rankings of various generation templates and/or template elements, depending on the implementation. If the Engine determines at 9350 that Ad elements have been evaluated, then the response for a given Ad element is queried at 9370. Depending on whether the score is positive or negative 9375, the score corresponding to the Ad element in question is incremented 9380 or decremented 9385. If there are more Ad element responses, the Engine returns to 9370. If not, then the Ad element scores are persisted at 9395. In one embodiment, new Ad generation template and/or Ad generation template element scores replace older Ad generation template and/or Ad generation template element scores, while in another embodiment, new Ad generation template and/or Ad generation template element scores are appended to a historical record of Ad generation template and/or Ad generation template element scores. It is to be understood that the Ad scoring management module may simply update Ad scores or maintain historical scoring records for whole Ad generation templates as well.

Maintaining historical records of Ad scores enables the Engine to track Ad success over successive Ad generations and through various adjustments and/or variations in Ad style and/or design. Furthermore, Ad success may be resolved over a variety of independent variables, including time, location, Ad style and/or design, Ad characteristic(s) and/or element(s), and/or the like. Success records may be evaluated by Engine administrators, content providers, and/ or BDE providers to determine trends and/or factors affecting the success of Ads and Ad generation templates.

There are a wide variety of possible scoring system implementations for Ad generation templates and/or Ad generation template elements that may be applied within various embodiments of the present invention, depending on specific goals and/or requirements of a specific implementation. In one embodiment, a numerical value associated with particular types of web user responses may be added to or subtracted from the Ad generation template and/or Ad generation template element score. For example, each click-through for a given Ad may increment the corresponding Ad generation template score by +1 (see, e.g., FIG. 92*a*). For another example, values of −2, 1, 0, +1, and +2 may be associated with each of the options between "Hate it!" and "Love it" in the radio button embodiment shown at 9235 in FIG. 92*b*. In another embodiment, a minimum number of responses of a particular type must be registered before an Ad generation template score is adjusted (e.g. each time an Ad click-through is registered).

In another embodiment of Ad generation template and/or template element scoring, a score reflecting a probability (i.e., between 0 and 1) may be assigned to each Ad generation template and/or Ad generation template element and increased or decreased based on web user responses and/or interactions. For example, an initial score of S=0.5 may be assigned to a new Ad generation template. A negative web user response, then, may change the Ad generation template score to $S^N$, where N is some positive real number greater than 1.

For example, for N=1.1, a single negative web user response would change the Ad generation template score from S=0.5 to S=0.467. A positive web user response, then, may change the Ad generation template score to the N-th root of S [or, equivalently, $S^{(i/N)}$]. Thus, for N=1.1, a single positive web user response would change the Ad generation template score from S=0.5 to S=0.533. In the limit of a large number of negative responses, the score will approach 0 while, in the limit of a large number of positive responses, the score will approach 1. The rate at which these limits are approached and that template scores will vary with each response in this embodiment is determined by the exponent N. A particular use for an embodiment with scores reflecting probabilities will be made apparent within embodiments of Ad evolution discussed in the next section.

In one embodiment, a total Ad generation template score may be derived from the scores for the Ad generation template elements of which the Ad generation template is composed, such as by adding up all of the composite Ad generation template element scores. In another embodiment, Ad generation template element scores may be assigned based on the score of the overall Ad generation template of which they are a part. For example, all of the elements of a particular Ad generation template may be assigned the same score as the Ad generation template itself.

Ad Evolution (8875, 8925)

In one embodiment, scores assigned to Ad generation templates and/or Ad generation template elements may be directed to the Ad Evolver module 8875. The Ad Evolver module may be configured to process the scores in order to rank existing Ad generation templates and/or to generate new Ad generation templates. Ad generation templates and/or Ad generation template elements having higher scores may be directed by the Ad Evolver module to be more prevalent in subsequent Ad distribution than those having lower scores. This may be accomplished in a number of different ways within various embodiments of the present invention.

Figure 94:
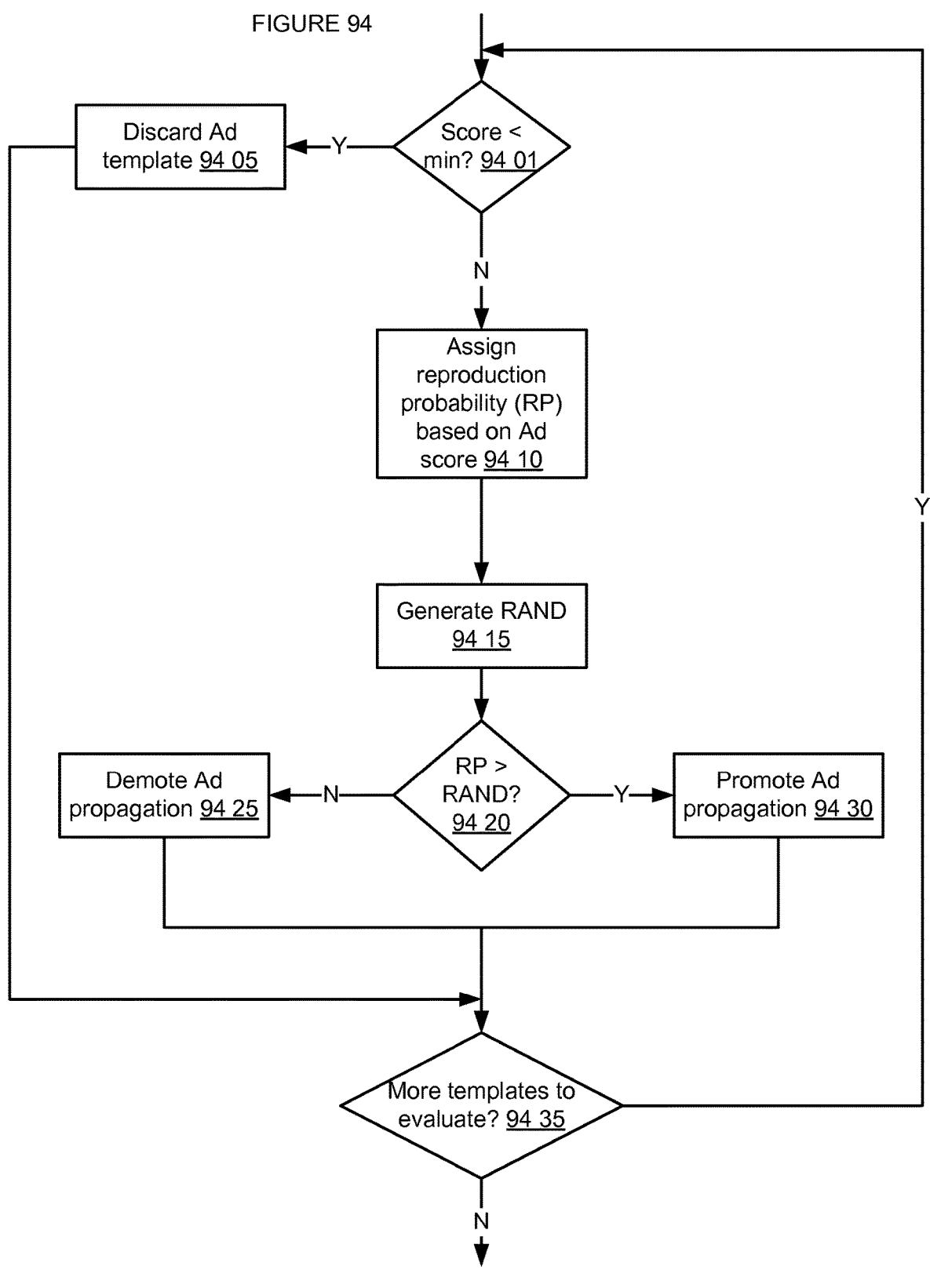
FIG. 94 provides an illustrative example of the logic flow in one embodiment of Ad evolution.

FIG. 94 provides an illustrative example of a logic flow in one embodiment of Ad evolution. In this embodiment, referred to as "Ad duplication", web user responses to whole Ads are registered and processed by the Feedback Evaluator module 8860 and passed to the Ad Evolver module 8875. At 9401, the Ad Evolver checks if the Ad generation template score is less than some minimum value. If so, the particular Ad generation template is discarded from the Ad generation template DB 9405 and consequently disregarded in future distribution generations of Ads. If the Ad generation template score is sufficiently high, a reproductive probability (RP) may be assigned to the Ad generation template based on the score 9410. For example, a score S may be translated to an RP by taking $RP=0.5^{[N^{(-|S|)}]}$, where N is a positive integer greater than 1. In an alternative embodiment, an RP score may be directly computed by and passed from the Feedback Evaluator module to the Ad Evolver module. Once an RP score has been established for the Ad generation template, the Ad Evolver module may stochastically reproduce, duplicate, or copy Ad generation templates with likelihoods based on their respective RP scores.

For example, the Ad Evolver may generate a random number (RAND) uniformly distributed between 0 and 1 at 9415 and check whether the RP for a given Ad generation template is greater than RAND 9420. If not, then the propagation of the Ad generation template may be demoted or inhibited 9425 and, if RP>RAND, the propagation of the Ad generation template may be promoted 9430. The probability that RP>RAND is equal to RP. Accordingly, this condition ties promotion of Ad template propagation to the probability score established at 9410.

In alternative implementations, RAND may be taken to be a random variable with an arbitrary and/or non-uniform distribution in order to further weight the selection of Ad generation templates as desired for particular implementations of the present invention. At 9435, a determination is made as to whether there are additional Ads to evaluate, and if so, the process returns to 9401. In an alternative implementation, a single RAND is selected for comparison with RPs for all Ads under consideration at a given time. In another implementation, a single RAND is selected for all identical or related copies of an Ad generation template in the Ad generation template DB. In another alternate implementation, the selection probabilities may be used in combination with Ad generation template selection weightings. The Ad generation template selection weighting is a system tool used in distributing targeted advertisements to particular web users.

Promotion and/or demotion of Ad propagation may proceed in a number of different ways within various Ad duplication implementations of the present invention. In one implementation, promotion of Ad propagation may entail duplication of the Ad generation template into one or more identical copies in the Ad generation template DB. The existence of multiple, identical copies of a particular Ad generation template in the Ad generation template DB may increase the likelihood that the particular Ad generation template will be selected for future Ad generation. In one implementation, demotion of Ad propagation may entail deletion of one or more copies of an Ad generation template from the Ad generation template DB. In another implementation, the number of duplicate copies made or deleted for a given Ad generation template is affected by the Ad generation template score, RP, and/or the like. In an implementation, a particular Ad generation template score, RP, or difference between RAND and RP entails that the Ad generation template is neither deleted nor duplicated.

In another implementation, Ad generation template duplication and/or deletion is constrained by a requirement that the total number of Ad generation templates in the Ad generation template DB be equal to or within a specific range of a specified quota. In yet another implementation, promotion or demotion of Ad propagation may entail adjustment of a weighting factor associated with the Ad generation template. For example, this may occur in an embodiment wherein selection of an Ad generation template for Ad generation queries the Ad generation template weighting factor and preferentially selects Ad generation templates based on their corresponding weighting factors. In another implementation, the degree of adjustment to the weighting factor made for a given Ad generation template is affected by the Ad generation template score, RP, and/or the like.

Figure 95:
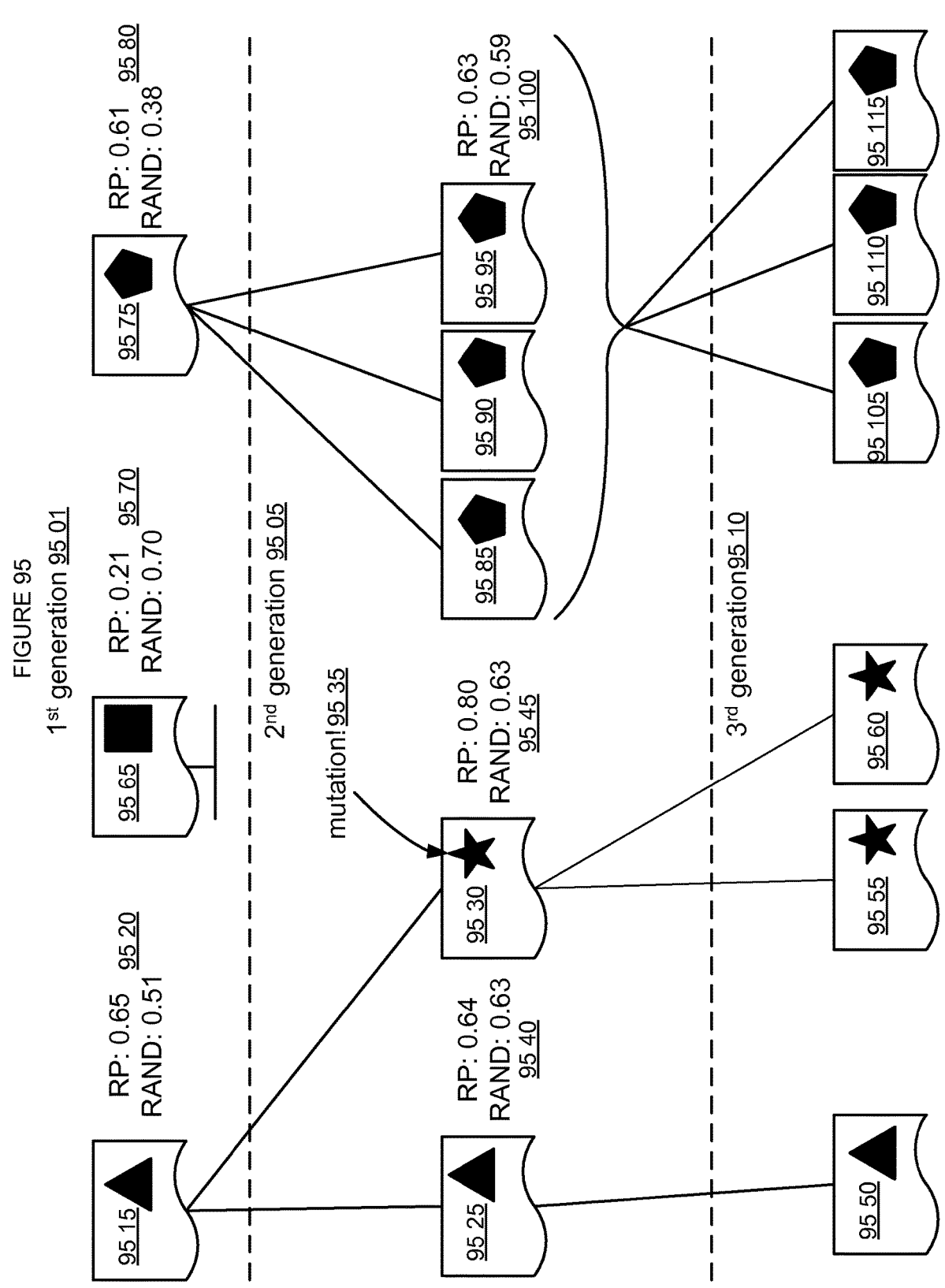
FIG. 95 exhibits a schematic illustration of a three generation evolution of Ad generation templates in one implementation of Ad duplication.

FIG. 95 exhibits a schematic, illustrative example of three generations (9501, 9505, 9510) of Ad generation templates in one implementation of Ad duplication, where each Ad generation template's characterizing features are symbolically represented by a shape. For example, the features of Ad generation template 9515 are represented by a triangle. The RP and RAND for the evolution of 9515 are indicated at 9520. In this illustrative implementation, an RP within 0.1 of RAND results in neither duplication nor deletion, RP<RAND−0.1 results in deletion, RAND+0.1 <RP <RAND+0.2 results in single duplication (i.e., the original Ad generation template plus one copy), RAND+0.2 <RP <RAND+0.3 results in double duplication, and so on. Thus, 9515 is duplicated once, yielding second generation Ad generation templates 9525 and 9530. Ad generation template 9530 has also acquired a "mutation" 9535, or variation, in its characterizing features. Mutations are discussed in greater detail below. The RP and RAND for the evolution of 9525 and 9530 are indicated at 9540 and 9545 respectively (note the mutation 9535 has resulted in a higher RP for 9530 than for the parent template 9515), and the resulting third generation Ad generation templates are exhibited at 9550, 9555, and 9560.

The first generation Ad generation template 9565 (characterizing features represented by a square) dies out in the first evolution stage due to its corresponding RP and RAND values 9570. The first generation Ad generation template 9575 (characterizing features represented by a pentagon) has corresponding RP and RAND values shown at 9580. Consequently, it yields three second generation Ad generation template children (9585, 9590, and 9595) which, collectively, have RP and RAND values shown at 95100 and, therefore, yield third generation children Ad generation templates (95105, 95110, and 95115).

Figure 96:
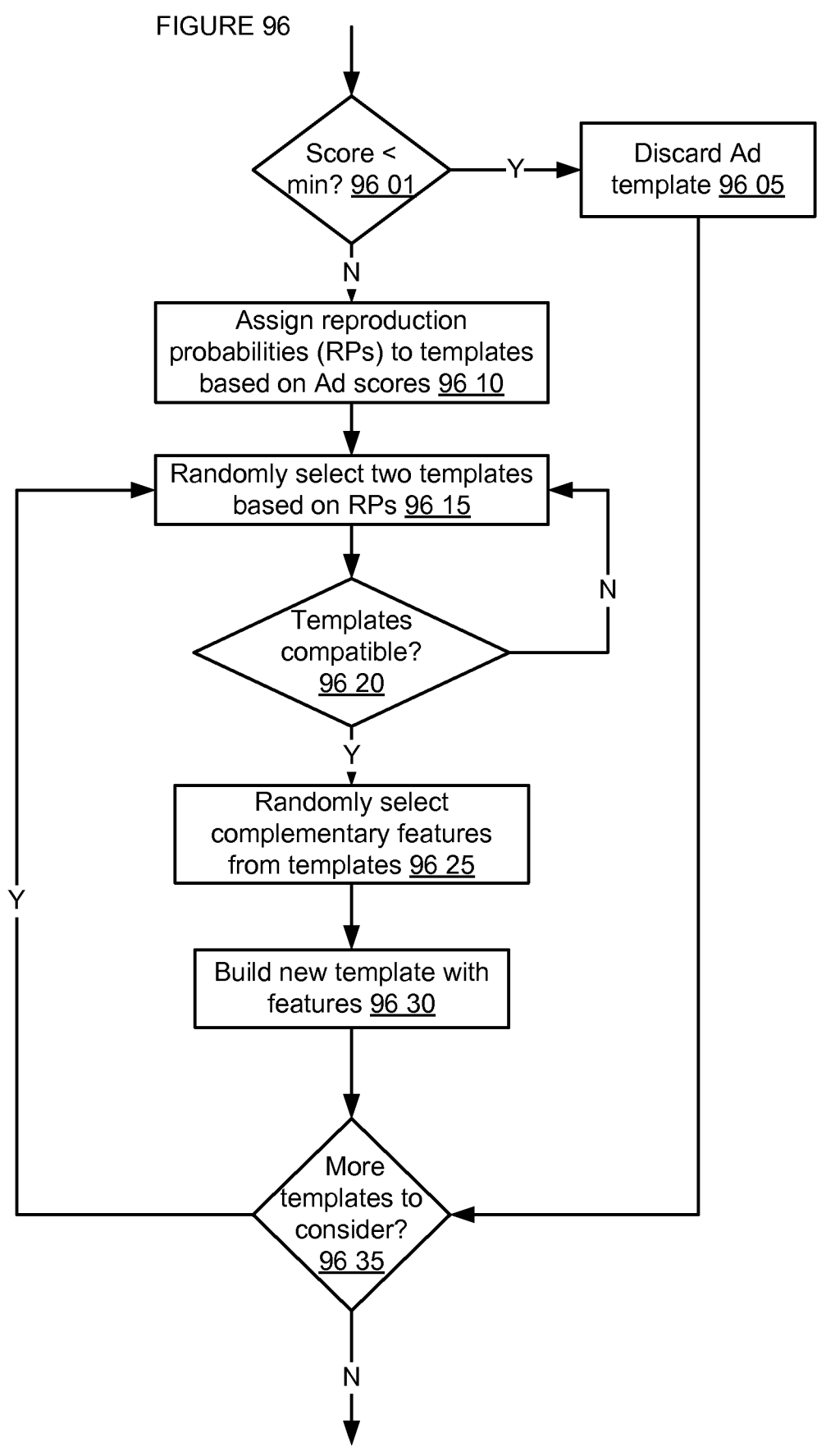
FIG. 96 provides an illustrative example of the logic flow in another embodiment of Ad evolution.

FIG. 96 provides an illustrative example of a logic flow associated with another embodiment of Ad evolution. In this embodiment, referred to as "Ad recombination", web user responses to whole Ads are registered, processed by the Feedback Evaluator module 8860 and passed to the Ad Evolver module 8875. At 9601, the Ad Evolver checks if the Ad generation template score is less than some minimum value. If so, the particular Ad generation template is discarded 9605. Otherwise, the system assigns RPs to Ad generation templates based on the Ad generation template scores 9610. Two Ad generation templates to be recombined by the system are then selected with likelihood based on their RP values 9615. In an alternative implementation, more than two Ad generation templates may be selected for recombination at this stage. Selection of Ad generation templates may be accomplished, in one illustrative example, by generating a value for a uniformly distributed random variable RAND, separating Ad generation templates based on whether RP <RAND or RP>RAND, and selecting any two Ad generation templates randomly from the latter group with all Ad generation templates in this group treated on an equal footing.

At 9620, the system checks whether the Ad generation templates are compatible with each other. In one implementation, this may be accomplished by querying a collection of Ad generation template recombination rules that specify which Ad generation template elements and/or characteristics may render two Ads incompatible (for example, an Ad generation template configured to yield a banner Ad may be incompatible with an Ad generation template configured to yield memory-intensive video content). If the Ad generation templates are incompatible, the system returns to 9615 and selects new Ad generation template(s). Otherwise, complementary features are randomly selected from the two Ad generation templates at 9625.

In one implementation, this may be accomplished by randomly selecting half of the features in each Ad generation template. In another implementation, this may be accomplished by associating similar features in the Ad generation templates (e.g., headings, footings, design templates, size specifications, etc.) and then selecting randomly between matched features with equal probability for the features originating from each Ad generation template. Any leftover, unmatched features may, then, be randomly included or excluded in the final Ad generation template with equal probabilities. At 9630, the new Ad generation template is constructed from the Ad generation template features selected at 9625.

Finally, the system decides whether or not there are further Ad generation templates to consider at 9635. In one implementation, parent Ad generation templates are returned to the Ad generation template DB with the children Ad generation templates, while in another implementation, parent Ad generation templates may be discarded from the Ad generation template DB after a finite lifetime and/or number of generations. In one implementation, child Ad generation templates are made available for display to system administrators who may decide whether they are suitable for inclusion in the Ad generation template DB.

Figure 97:
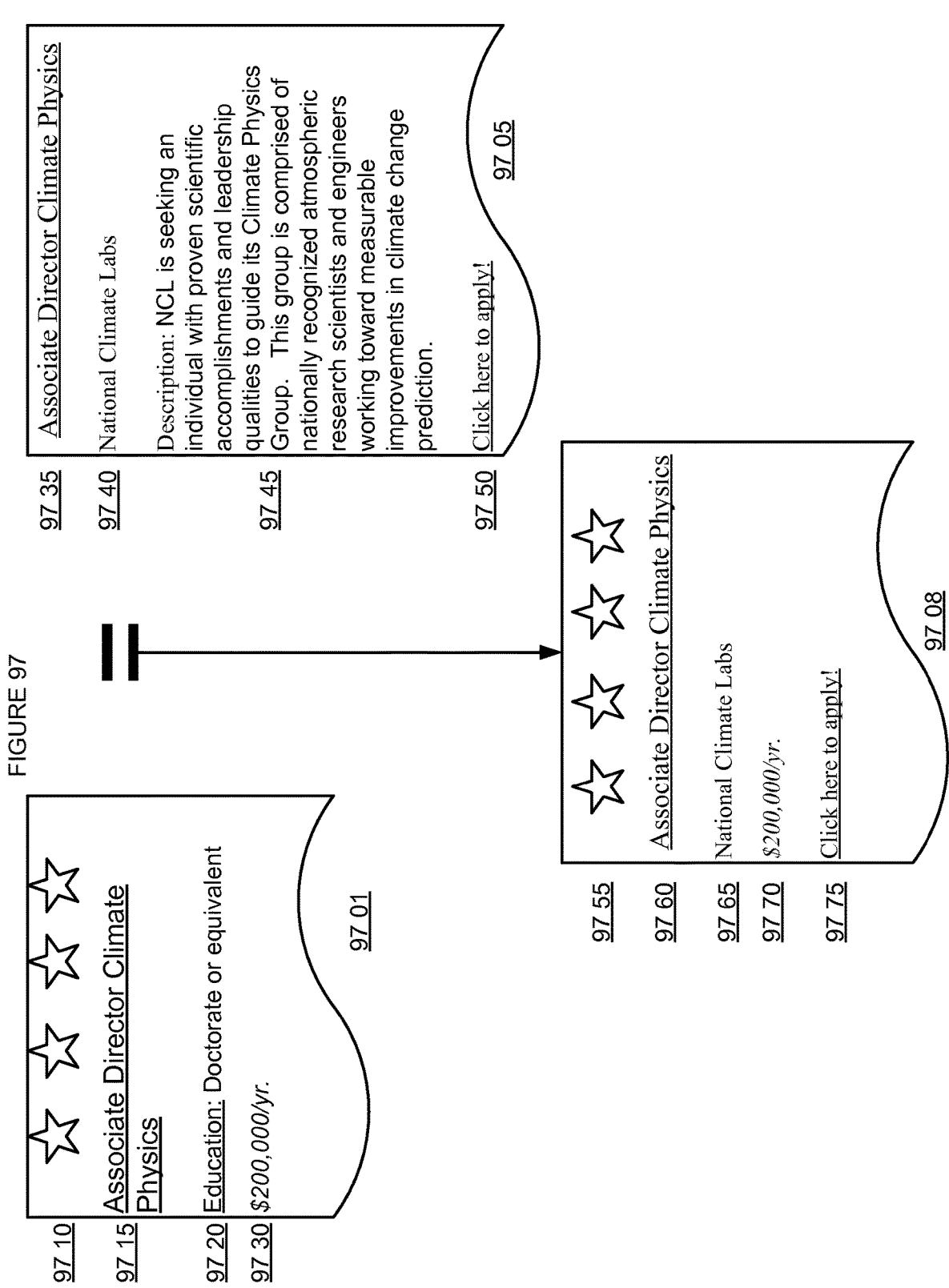
FIG. 97 shows an illustrative example of Ad recombination in one embodiment.

FIG. 97 shows an illustrative example of Ad recombination in one embodiment, whereby two parent Ad generation templates (9701 and 9705) are recombined into a child Ad generation template 9708. Though representations of the Ads themselves are shown in the figure for clarity, it may in fact be the underlying Ad generation templates that are recombined. Each Ad generation template underlying the Ads in FIG. 97 has a number of characterizing elements.

For example, Ad generation template 9701 specifies a star motif 9710; a global Arial font; a left-justified, 14 pt., underlined job title heading 9715; a left-justified, 12 pt. education level with underlined portion 9720; and a 12 pt., italicized salary. Ad generation template 9705, on the other hand, specifies a global Times New Roman font; a center-justified, 14 pt., underlined job title heading; a left-justified, 12 pt. company; a left-justified, 12 pt. job description; and a left-justified, 12 pt., underlined clickable link to more information. The child Ad generation template 9708 takes the star motif 9755 and salary specification 9770 from Ad generation template 9701 and the job title heading, company, and clickable link from Ad generation template 9705.

Figure 98:
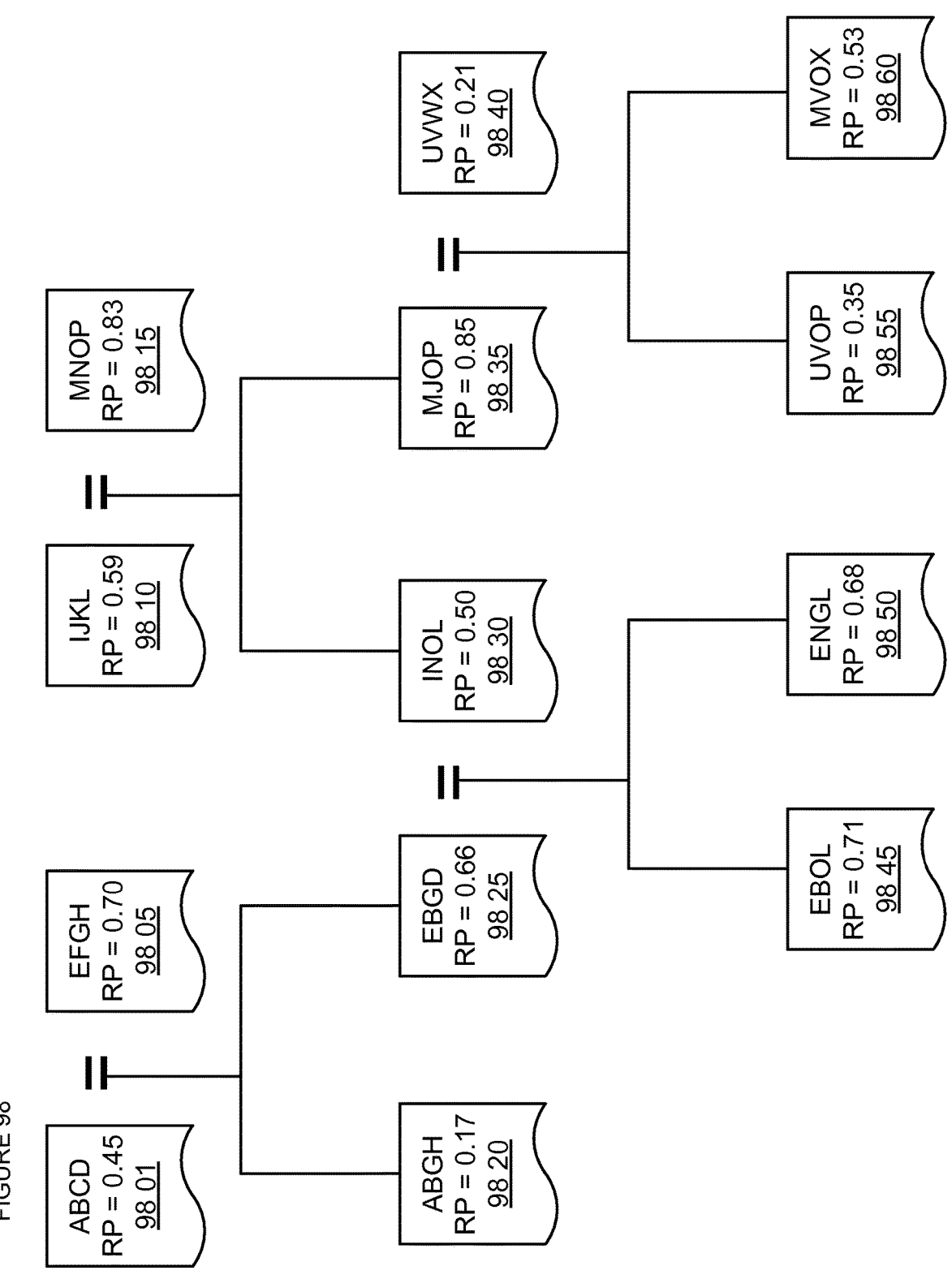
FIG. 98 provides a visualization of three successive Ad generation template generations in an Ad recombination embodiment.

FIG. 98 provides a visualization of three successive Ad generation template generations in an Ad recombination embodiment. In this Ad generation template "family tree", Ad generation template features are symbolized by four letters. For example, Ad generation template 9801 has features ABCD. A hypothetical RP value for each Ad generation template is also indicated (e.g., 9801 has RP=0.45). Parent templates (9801 with 9805 and 9810 with 9815) are recombined to form child templates (respectively 9820/9825 and 9830/9835), each possessing different combinations of parent template features. The combination of features in template 9820 apparently yields poor performance, as its RP=0.17 is low and, consequently, it yields no further children.

Templates 9825 and 9830 recombine to yield child templates 9845 and 9850, and template 9835 recombines with a newly introduced template 9840 to yield child templates 9855 and 9860. Both this family tree and the lineage chart in FIG. 95 provide visualizations of Ad generation template performance and evolution, and thus facilitate Ad performance tracking. In an implementation of the system, system administrators may access these types of evolutionary visualizations to assist in determining system performance and efficacy. Further, the evolutionary visualizations may be based on ad generation templates and/or distributed advertisements (e.g., illustrating ad templates 9060 and/or distributed ads 9070).

In one embodiment, Ad generation template evolution may be directed or restricted by grouping similar, compatible, and/or common-purpose Ad generation templates together based on Ad generation template characteristics and/or other labeling metadata. For example, the system may elect to only recombine Ad generation templates that generate pop-up Ads or to only recombine Ad generation templates marked with a "job listing template" metadata label with each other. This type of strategy respects the possibility that not all Ad types may be best served by the same Ad generation templates (e.g., consumer product Ads may be more effective with one template while job listings may be more effective with another).

In another embodiment, aspects of the Engine may be employed to target Ads to particular web users. For example, the system may monitor and collect web user interactions with a plurality of Ads, collect web user information, parse and/or separate collected interactions based on web user group identifiers (e.g., demographics, consumer behavior and/or shopping patterns, web surfing habits, address, education level, etc.), and serve Ads to each web user group generated using the most successful Ad generation templates and/or Ad generation routines within that group.

In another implementation, the system may elect to evolve Ad generation routines separately for different web user group identifiers. For example, web users with 2 or more children may have a wholly separate Ad evolution process from web users who have less than 2 children, yielding separate Ad generation template databases for each demographic group.

In another embodiment, particular Ad generation template elements and/or characteristics may be tied together or linked in such a way that they tend to carry over together from parent Ad generation templates into child Ad generation templates. For example, if two Ad generation template elements and/or characteristics (e.g., pop-up Ad and prominently featured salary) are correlated with a consistent and/or high-degree of performance success, they may be automatically coalesced into a single Ad generation template characteristic or brought to the attention of a system administrator who may elect to coalesce them.

Ad generation template elements and/or characteristics that are good candidates for coalescing may be identified heuristically by a system administrator using evolutionary visualizations discussed above or may be automatically detected. Automatic detection may proceed in a variety of different ways in various implementations of the present invention. In one implementation, the system may restrict its attention to Ad generation templates exhibiting the best performance (e.g., RP>0.9) in a given generation and then coalescing Ad generation template elements and/or characteristics that occur together most frequently in the set of best performing Ad generation templates. For example, if a large majority of the best performing Ad generation templates are pop-up Ads with a prominently featured salary, then these characteristics may be tied together into a single characteristic in subsequent generations.

In another embodiment, the system may admit restrictions on combinations of Ad generation template characteristics, preventing them from existing within a single Ad generation template in subsequent generations. Such restrictions may be implemented manually by a system administrator or automatically by the system itself. Ad generation template elements and/or characteristics that are good candidates for restriction may be identified heuristically by a system administrator or maybe automatically detected.

Automatic detection may proceed in a variety of different ways in various implementations of the present invention. In one implementation, the system may restrict its attention to Ad generation templates exhibiting the worst performance (e.g., RP<0.1) in a given generation and then restrict Ad generation template elements and/or characteristics that occur together most frequently in the set of worst performing Ad generation templates. For example, if a large majority of worst performing Ad generation templates are banner Ads with a 300×600 size designation, then these characteristics may be restricted from occurring together in subsequent Ad generation templates. In one implementation, restrictions on Ad generation template element and/or characteristic combinations may be stored in a set of Ad generation template recombination rules.

In another embodiment, Ad generation template elements may be spontaneously and/or randomly changed by the system. Such changes, analogous to mutations in biological evolution, may yield novel Ad generation templates that may otherwise not have formed by other Ad evolution processes. In one implementation, child Ad generation templates may be randomly selected with a low probability to have one or more of their Ad generation template elements altered by the Engine. Such altering of Ad generation template elements may be accomplished, in one example, by replacing an Ad generation template element in the mutating Ad generation template with a randomly selected Ad generation template element from another randomly selected Ad generation template. In yet another embodiment, the system may admit manual changes to Ad generation templates and/or Ad generation template elements by a system administrator.

The Engine provides an efficient and effective Ad performance tracking and learning system that may be applied to a wide variety of marketing and information dispensation applications. In one embodiment, the Engine may process advertisements pertaining to job listings and/or opportunities. The same base job listing data entry may be incorporated into a variety of different formats that exhibit varying degrees of "attractiveness" and/or emphasize and/or de-emphasize various job listing elements. The Engine may then monitor the performance of the job listings by any of the means listed above and/or, in particular, by correlating web user applications for jobs, job interviews, or job offers with advertisement interactions and/or impressions. Subsequent job listing advertisements created by the system may be designed to exploit the most effective Ad generation template characteristics.

In another embodiment, the Engine may be employed to improve job seeker profiles and/or resume listings. A job seeker may submit characterizing information, profiles, and/or resumes to the system, which may then parse and/or incorporate the submission into a job seeker listing for display to possible employers. Performance of a job seeker listing may be measured by employer ratings and/or interactions with the listing, such as employer click-throughs, mouse-overs, impressions, interview offers, job offers, and/or the like. The job listings may then be refined based on the performance of various resume and/or job seeker listing generation templates. In one embodiment, analysis of template performance may form the basis for a resume and/or job seeker listing consultation service.

In another embodiment, the Engine may form the basis for a graded advertisement pricing system. In tracking Ad generation template performance, the Engine may determine the degree to which particular Ad generation templates and/or Ad generation template elements contribute to Ad effectiveness. Consequently, a graded advertisement pricing system may be established, whereby a graded premium may be charged to companies supplying base data entries for inclusion in advertisements for the use of Ad generation templates and/or Ad generation template elements proven to be most attractive and/or effective in eliciting desired web user responses. In another embodiment, Ad generation templates and/or Ad generation template elements that yield particularly high performance metric scores may be marked by the system as candidates for intellectual property protection. These marked templates may be brought to the attention of a system administrator or automatically submitted for legal consideration.

SMP Controller

Figure 99:
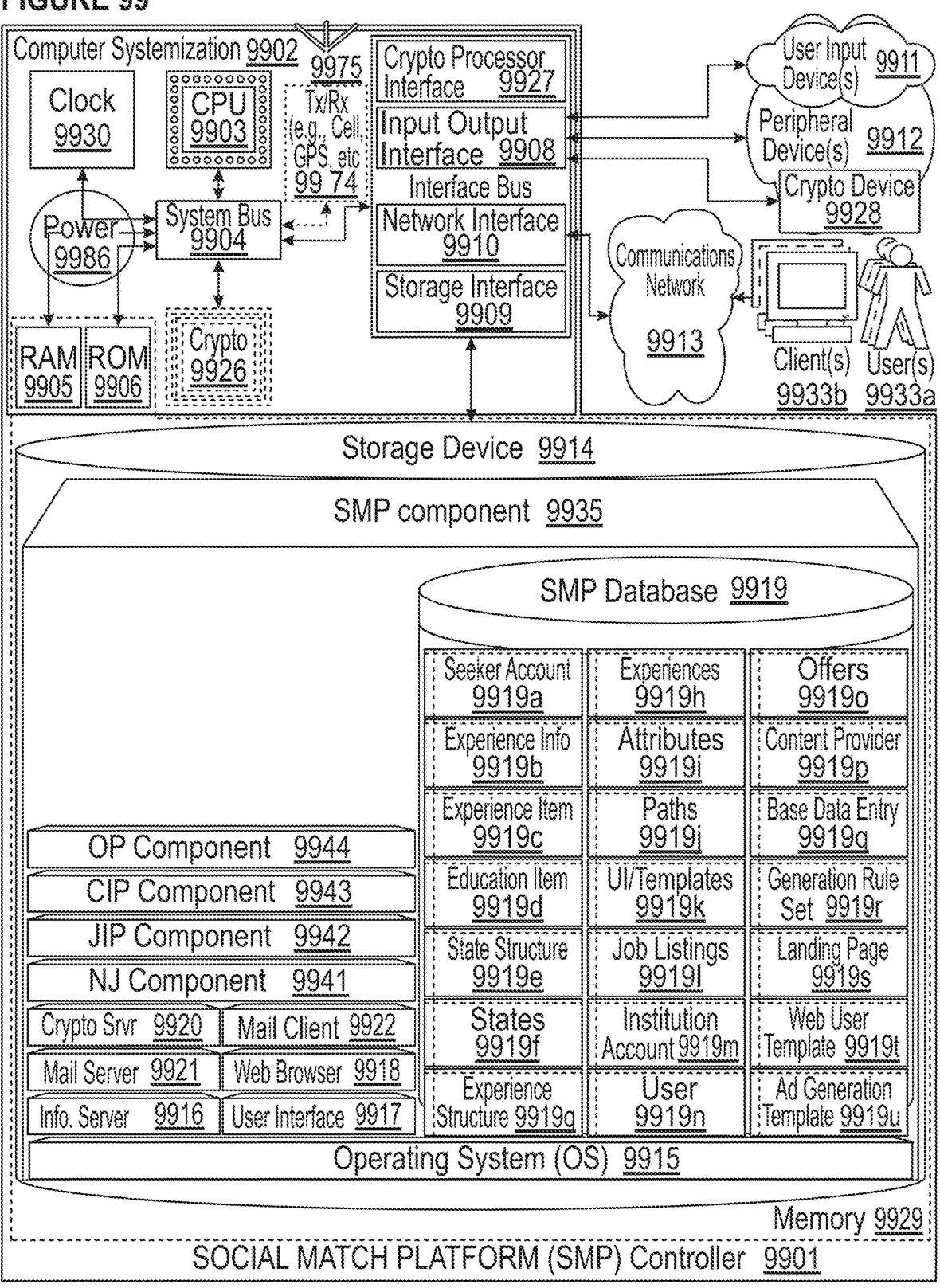
FIG. 99 shows a block diagram illustrating embodiments of a SMP controller.

FIG. 99 shows a block diagram illustrating embodiments of a SMP controller. In this embodiment, the SMP controller 9901 may serve to aggregate, process, store, search, serve, identify, instruct, generate, match, and/or facilitate interactions with a computer through information technologies, and/or other related data.

Typically, users, which may be people and/or other systems, may engage information technology systems (e.g., computers) to facilitate information processing. In turn, computers employ processors to process information; such processors 9903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 9929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SMP controller 9901 may be connected to and/or communicate with entities such as, but not limited to: one or more users from user input devices 9911; peripheral devices 9912; an optional cryptographic processor device 9928; and/or a communications network 9913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SMP controller 9901 may be based on computer systems that may comprise, but are not limited to, components such as: a computer systemization 9902 connected to memory 9929.

Computer Systemization

A computer systemization 9902 may comprise a clock 9930, central processing unit ("CPU(s)" and/or "processor(s)" (these terms are used interchangeable throughout the disclosure unless noted to the contrary)) 9903, a memory 9929 (e.g., a e read only memory (ROM) 9906, a random access memory (RAM) 9905, etc.), and/or an interface bus 9907, and most frequently, although not necessarily, are all interconnected and/or communicating through a system bus 9904 on one or more (mother)board(s) 9902 having conductive and/or otherwise transportive circuit pathways through which instructions (e.g., binary encoded signals) may travel to effectuate communications, operations, storage, etc. The computer systemization may be connected to a power source 9986; e.g., optionally the power source may be internal. Optionally, a cryptographic processor 9926 and/or transceivers (e.g., ICs) 9974 may be connected to the system bus. In another embodiment, the cryptographic processor and/or transceivers may be connected as either internal and/or external peripheral devices 9912 via the interface bus I/O. In turn, the transceivers may be connected to antenna(s) 9975, thereby effectuating wireless transmission and reception of various communication and/or sensor protocols; for example the antenna(s) may connect to: a Texas Instruments WiLink WL1283 transceiver chip (e.g., providing 802.1m, Bluetooth 3.0, FM, global positioning system (GPS) (thereby allowing SMP controller to determine its location)); Broadcom BCM4329FKUBG transceiver chip (e.g., providing 802.1m, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The S clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 9929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor, Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SMP controller and beyond through various interfaces. Should processing requirements dictate a greater amount speed and/or capacity, distributed processors (e.g., Distributed SMP), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the SMP may be achieved by implementing a microcontroller such as CASTS R8051XC2 microcontroller; Intel's MCS 51 (i.e., 8051 microcontroller); and/or the like. Also, to implement certain features of the SMP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SMP component collection (distributed or otherwise) and/or features may be implemented via the microprocessor and/or via embedded components; e.g., via ASIC, coprocessor, DSP, FPGA, and/or the like. Alternately, some implementations of the SMP may be implemented with embedded components that are configured and used to achieve a variety of features or signal processing.

Depending on the particular implementation, the embedded components may include software solutions, hardware solutions, and/or some combination of both hardware/software solutions. For example, SMP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SMP features. A hierarchy of programmable interconnects allow logic blocks to be interconnected as needed by the SMP system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SMP may be developed on regular FPGAs and then migrated into a fixed version that more resembles ASIC implementations. Alternate or coordinating implementations may migrate SMP controller features to a final ASIC instead of or in addition to FPGAs. Depending on the implementation all of the aforementioned embedded components and microprocessors may be considered the "CPU" and/or "processor" for the SMP.

Power Source

The power source 9986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 9986 is connected to at least one of the interconnected subsequent components of the SMP thereby providing an electric current to all subsequent components. In one example, the power source 9986 is connected to the system bus component 9904. In an alternative embodiment, an outside power source 9986 is provided through a connection across the I/O 9908 interface. For example, a USB and/or IEEE 1394 connection carries both data and power across the connection and is therefore a suitable source of power.

Interface Adapters

Interface bus(ses) 9907 may accept, connect, and/or communicate to a number of interface adapters, conventionally although not necessarily in the form of adapter cards, such as but not limited to: input output interfaces (I/O) 9908, storage interfaces 9909, network interfaces 9910, and/or the like. Optionally, cryptographic processor interfaces 9927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 9909 may accept, communicate, and/or connect to a number of storage devices such as, but not limited to: storage devices 9914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 9910 may accept, communicate, and/or connect to a communications network 9913. Through a communications network 9913, the SMP controller is accessible through remote clients 9933*b* (e.g., computers with web browsers) by users 9933*a*. Network interfaces may employ connection protocols such as, but not limited to: direct connect, Ethernet (thick, thin, twisted pair 10/100/1000 Base T, and/or the like), Token Ring, wireless connection such as IEEE 8o2.na-x, and/or the like. Should processing requirements dictate a greater amount speed and/or capacity, distributed network controllers (e.g., Distributed SMP), architectures may similarly be employed to pool, load balance, and/or otherwise increase the communicative bandwidth required by the SMP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 9910 may be used to engage with various communications network types 9913. For example, multiple network interfaces may be employed to allow for the communication over broadcast, multicast, and/or unicast networks.

Input Output interfaces (I/O) 9908 may accept, communicate, and/or connect to user input devices 9911, peripheral devices 9912, cryptographic processor devices 9928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio;

video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.na/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 9911 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 9912 may be connected and/or communicate to I/O and/or other facilities of the like such as network interfaces, storage interfaces, directly to the interface bus, system bus, the CPU, and/or the like. Peripheral devices may be external, internal and/or part of the SMP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the SMP controller may be embodied as an embedded, dedicated, and/or monitor-less (i.e., headless) device, wherein access would be provided over a network interface connection.

Cryptographic units such as, but not limited to, microcontrollers, processors 9926, interfaces 9927, and/or devices 9928 may be attached, and/or communicate with the SMP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 9929. However, memory is a fungible technology and resource, thus, any number of memory embodiments may be employed in lieu of or in concert with one another. It is to be understood that the SMP controller and/or a computer systemization may employ various forms of memory 9929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 9929 will include ROM 9906, RAM 9905, and a storage device 9914. A storage device 9914 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 9929 may contain a collection of program and/or database components and/or data such as, but not limited to: operating system component(s) (operating system); information server component(s) 9916 (information server); user interface component(s) 9917 (user interface); Web browser component(s) 9918 (Web browser); database(s) 9919; mail server component(s) 9921; mail client component(s) 9922; cryptographic server component(s) 9920 (cryptographic server); the SMP component(s) 9935; and/or the like (i.e., collectively a component collection). These components may be stored and accessed from the storage devices and/or from storage devices accessible through an interface bus. Although non-conventional program components such as those in the component collection, typically, are stored in a local storage device 9914, they may also be loaded and/or stored in memory such as: peripheral devices, RAM, remote storage facilities through a communications network, ROM, various forms of memory, and/or the like.

Operating System

The operating system component 9915 is an executable program component facilitating the operation of the SMP controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SMP controller to communicate with other entities through a communications network 9913. Various communication protocols may be used by the SMP controller as a subcarrier transport mechanism for interaction, such as, but not limited to: multicast, TCP/IP, UDP, unicast, and/or the like.

Information Server

An information server component 9916 is a stored program component S that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C#and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETFs) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo!Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SMP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications s across port 21, and/or the like. An information server may communicate to and/or with other components in a component collection, including itself, and/or facilities of the like. Most frequently, the information server communicates with the SMP database 9919, operating systems, other program components, user interfaces, Web browsers, and/or the like.

Access to the SMP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SMP. In e one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SMP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3. i/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo!User Interface, any of which may be used and) provide a baseline and means of accessing and displaying information graphically to users.

A user interface component 9917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 9918 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program e component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SMP enabled nodes. The combined application may be nugatory on systems employing standard Web browsers.

Mail Server

A mail server component 9921 is a stored program component that is executed by a CPU 9903. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C#and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SMP.

Access to the SMP mail may be achieved through a number of APIs offered by the individual Web server components and/or the operating system.

Also, a mail server may contain, communicate, generate, obtain, and/or provide program component, system, user, and/or data communications, requests, information, and/or responses.

Mall Client

A mail client component 9922 is a stored program component that is executed by a CPU 9903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 9920 is a stored program component that is executed by a CPU 9903, cryptographic processor 9926, cryptographic processor interface 9927, cryptographic processor device 9928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SMP may encrypt all incoming and/or outgoing communications and may serve as a node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SMP component to engage in secure transactions if so desired. The cryptographic component facilitates the secure accessing of resources on the SMP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SMP Database

The SMP database component 9919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SMP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SMP database is implemented as a data-structure, the use of the SMP database 9919 may be integrated into another component such as the SMP component 9935. Also, the database may be implemented as a mix of a data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 9919 includes several tables 99i9a-u.

A seeker_profiles table 9919a may include fields such as, but not limited to: user_ID, name, address, contact_info, preferences, friends, status, user_description, attributes, experience_info_ID, path_ID(s), attribute_ID(s), and/or the like.

A seeker_experience table (aka "experience" or "resume" table) 9919b may include fields such as, but not limited to: experience_info_ID, experience_item_ID(s), education_item_ID(s), resume_data, skills, awards, honors, languages, current_salary_prefrences, user ID(s), path_ID(s), and/or the like.

A experience_item table 9919c may include fields such as, but not limited to: experience_item_ID, institution_ID, job_title, job_description, job_dates, job_salary, skills, awards, honors, satisfaction_ratings, state_ID, OC_code(s), attribute_ID(s), and/or the like.

A education_item table 99i9d may include fields such as, but not limited to: education_item_ID, institution_ID, education_degre_subject_matter, education_item_description, education_degree, education_item_dates, skills, awards, honors, satisfaction_ratings, state_ID, attribute_ID(s), and/or the like.

A state_structure table 9919e may include fields such as, but not limited to: state_structure_ID, state_structure_data, state_ID(s), and/or the like.

A states table 99i9f may include fields such as, but not limited to: state_ID, state_name, job_titles, topics, next_states_ID, previous_states_ID, state_transition_probabilities, job_title_count, total_count, topic_count, transition_weights, OC_code(s), attribute_ID(s), user_ID(s), and/or the like.

A experience_structure table 99i9g may include fields such as, but not limited to: experience_structure_ID, experience_structure_data, OC_code(s), and/or the like.

A experiences table (aka "OC" table) 9919I1 may include fields such as, but not limited to: OC_code, parent_OC_code, child_OC_code(s), title(s), job_description(s), educational_requirement(s), experience_equirement(s), salary_range, tasks_work_activities, skills, category, keywords, related occupations, state_ID(s), attribute_ID(s), and/or the like.

An attributes table 9919f may include fields such as, but not limited to: attribute_ID, attribute_name, attribute_type, attribute_weight, attribute_keywords, confidence_value, rating_value, comment, comment_thread_ID(s), salary, geographic_location, hours_of_work, vacation_days, benefits, attribute_transition_value, attribute_transition_weight, education_level, degree, years_of_experience, state_ID(s), OC_code(s), user_ID(s), and/or the like.

A paths table 99i3⁄4% may include fields such as, but not limited to: path_ID, state_path_sequence, state_ID(s), attribute_ID(s), user_ID(s), attribute_key_terms, and/or the like.

A templates table 9919k may include fields such as, but not limited to: template_ID, state_ID, job_ID, employer_ID, attribute_ID, template data, template display name, template category (e.g., cover letter, resume, CV, etc.), template file location, and/or the like.

A job_listing table 9919I may include fields such as, but not limited to: job_listing_ID, institution_ID, job_title, job_description, educational_requirements, experience_requirements, salary_range, tasks_work_activities, skills, category, keywords, related occupations, OC_code, state_ID, attribute_ID(s), user_ID(s), UI_ID(s), recruiter_ID, location, salary, and/or the like.

A institution table (aka "employer" table) 9919m may include fields such as, but not limited to: institution_ID, name, address, contact_info, preferences, status, industry_sector, description, experience_ID(s), template_ID(s), state_ID(s), attributes, attribute_ID(s), and/or the like.

A user table 9919η includes fields such as, but not limited to: a userlD, screenName, address, social security number, e-mail address, education, job experience, skills, references, honors and/or awards, publications, resume and/or CV, and/or the like. The user table may support and/or track multiple entity accounts on a SMP.

An offer table 99190 includes fields such as, but not limited to: offerID, offerDuration, targetDemographics, and/or the like.

A content provider table 9919P includes fields such as, but not limited to: content provider ID, content provider name, AODSA module format restrictions, AODSA module serving conditions, general content descriptors, provider content, web user information, and/or the like.

A base data entry table 99i9q includes fields such as, but not limited to: sponsor ID, preferred content IDs, related base data entries, sponsor distribution and/or advertisement subscription parameters, preferred distribution targets, and/or the like.

A generation rule set table 99i9r includes fields such as, but not limited to: parsing priority, key term elements, location element, salary element, opportunity type element, web user group labels, allowed template characteristic combinations, restricted template characteristic combinations, and/or the like.

A landing page table 9919s includes fields such as, but not limited to: base data entry, redacted base data entry, sponsor information, host data entity, additional landing functionality, and/or the like.

A web user table 99i9t includes fields such as, but not limited to: web user ID, dynamic web user interaction data records, stored web user interaction data records, content provider registration data, salary data, opportunity type element, performance history, and/or the like.

An Ad generation template table 9919U includes fields such as, but not limited to: Ad generation template ID, parsing priority, key term elements, location element, salary element, opportunity type element, performance history, and/or the like.

In one embodiment, the SMP database may interact with other database systems. For example, employing a distributed database system, queries and data access by search SMP component may treat the combination of the SMP database, an integrated data security layer database as a single database entity.

In one embodiment, user programs may contain various user interface primitives, which may serve to update the SMP. Also, various accounts may require custom database tables depending upon the environments and the types of clients the SMP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 99i9a-u. The SMP may be configured to keep track of various settings, inputs, and parameters via database controllers.

The SMP database may communicate to and/or with other components in a component collection, including itself, and/or facilities of the like. Most frequently, the SMP database communicates with the SMP component, other program components, and/or the like. The database may contain, retain, and provide information regarding other nodes and data.

The SMPs

The SMP component 9935 is a stored program component that is executed by a CPU. In one embodiment, the SMP component incorporates any and/or all combinations of the aspects of the SMP that was discussed in the previous figures. As such, the SMP affects accessing, obtaining and the provision of information, services, transactions, and/or the like across various communications networks. The features and embodiments of the SMP discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SMP's features and facilities, and in many cases reduce the costs, energy consumption/ requirements, and extend the life of SMP's underlying infrastructure; this has the added benefit of making the SMP more reliable. Similarly, many of the features and mechanisms are designed to be easier for users to use and access, thereby broadening the audience that may enjoy/employ and exploit the feature sets of the SMP; such ease of use also helps to increase the reliability of the SMP. In addition, the feature sets include heightened security as noted via the Cryptographic components 9920, 9926, 9928 and throughout, making access to the features and data more reliable and secure The SMP transforms platform join requests, social network info, and SMP network info inputs via SMP components NJ, JIP, CIP, OP, CN-SGU and CN-UPSOG into job info, candidate info, offer info, and social meetup info outputs.

The SMP component enabling access of information between nodes may be developed by employing standard development tools and languages such as, but not limited to: Apache components, Assembly, ActiveX, binary executables, (ANSI) (Objective-) C (++), C#and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!User Interface; and/or the like), WebObjects, and/or the like. In one embodiment, the SMP server employs a cryptographic server to encrypt and decrypt communications. The SMP component may communicate to and/or with other components in a component collection, including itself, and/or facilities of the like. Most frequently, the SMP component communicates with the SMP database, operating systems, other program components, and/or the like. The SMP may contain, communicate, generate, obtain, and/or provide program component, system, user, and/or data communications, requests, and/or responses.

Distributed SMPs

The structure and/or operation of any of the SMP node controller components may be combined, consolidated, and/ or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SMP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Valuel where Valuei is discerned as being a parameter because "http://" is part of the grammar syntax, and what follows is considered part of the post value. Similarly, with such a grammar, a variable "Valuei" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SMP controller may be executing a PHP script implementing a Secure Sockets Layer ("SSL") socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.0.100';
Sport=255;
// create a server-side SSL socket, listen for/accept incom-
    ing communication
$sock=socket_create(AF_INET, SOCK_STREAM, 0);
socket_bind($sock, $address, Sport) or die('Could not
    bind to address');
socket_listen($sock);
$client=socket_accept($sock);
// read input data from client device in 1024 byte blocks
    until end of message
do {
    $input=" ";
    $input=socket_read($client, 1024);
    $data.=$input;
} while($input !=" ");
// parse data to extract variables
$obj—json_decode($data, true);
// store input data in a database
mysql_connect    ("201.408.185.132",$DBserver,$pass-
    word); // access database server
mysql_select("CLIENT_DB.SQL"); // select database to
    append
mysql_query("INSERT INTO UserTable (transmission)
VALUES ($data)"); // add data to UserTable table in a
    CLIENT database
mysql_close("CLIENT_DB.SQL"); // close connection to
    database
?>
```

Also, the following resources may be used to provide example embodiments regarding SOAP parser implementation:

http://www.xav. com/perl/site/lib/SOAP/Parser.html
http://publib.boulder.ibm.com/infocenter/tivihelp/v2rl/index. jsp?topic-/com.ibm
.IBMDI.doc/ref erencequide295.htm
and other parser implementations:
http://publib.boulder.ibm.com/infocenter/tivihelp/v2rl/index.jsp?topic-/com.ibm
.IBMDI.doc/referencequide259.htm
all of which are hereby expressly incorporated by reference.

Application Tracking and Semantic Search

Figure 100:
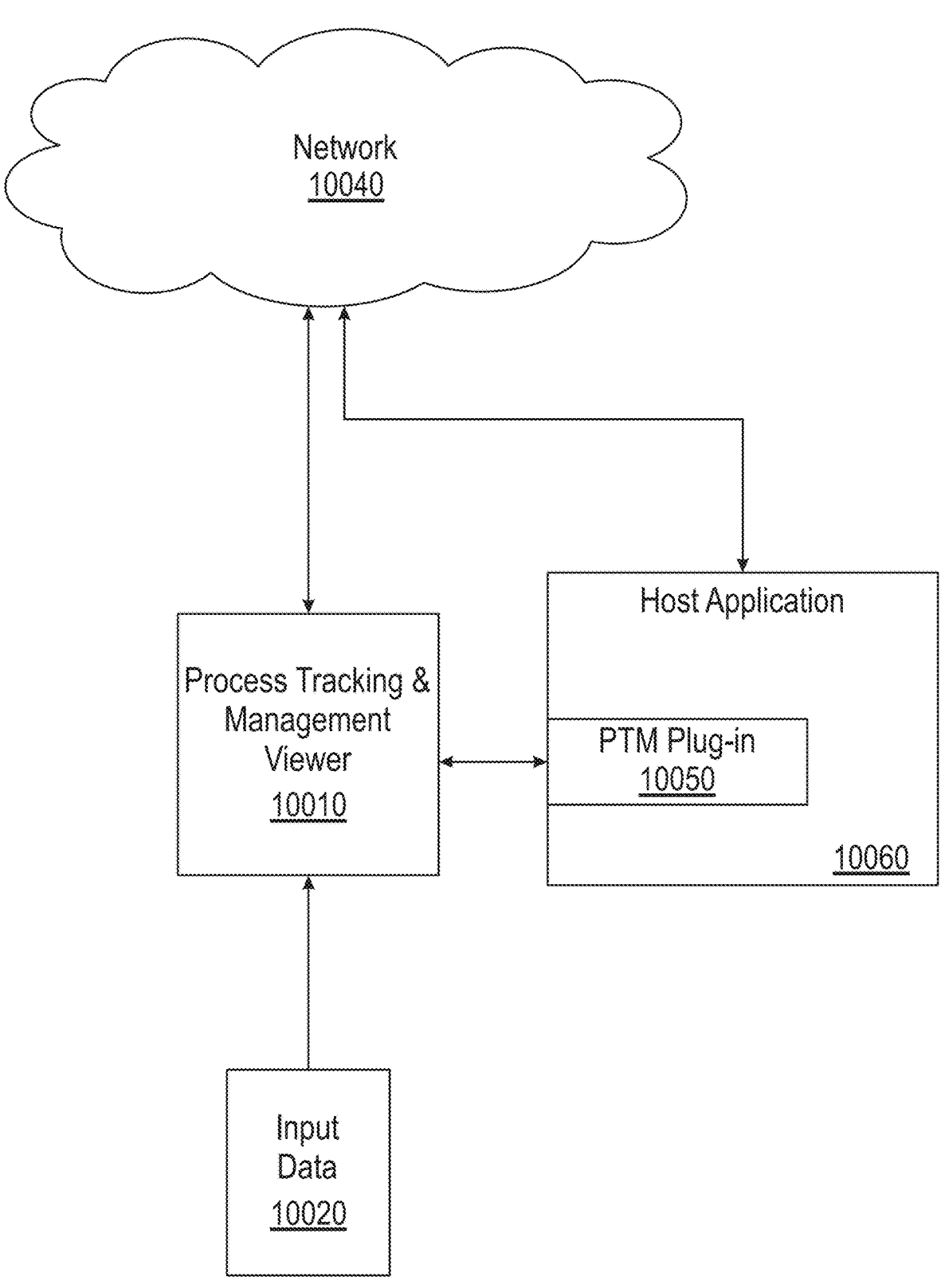
FIG. 100 discloses an embodiment of a process tracking and management environment in accordance with the present disclosure.

FIG. 100 discloses an embodiment of a process tracking and management environment aspect of the disclosure. The Process Tracking and Management ("PTaM") Environment enables an applicant to initiate, manage, and monitor processes of interest to the applicant, for example, via an SMP social network application. The user interface for the PTaM Environment may be a PTaM Viewer 10010. The PTaM Viewer can be implemented using a variety of software development techniques know in the art. For example, the PTaM Viewer can be a stand-alone application, a social network application, a web-based application, a mobile device application, and/or integrated into another piece of software.

The PTaM Viewer allows the applicant to access the functions of the PTaM Environment, such as integrating input data 10020 or conducting process tracking. The PTaM Viewer may connect to a network 10040 to receive information concerning the processes being tracked, such as a status update for a particular process.

The PTaM Viewer also interacts with the PTaM Plug-In 10050. The PTaM Plug-In provides a mechanism for information to be transferred to and from the PTaM Viewer, e.g., via SMP functionality and/or social and/or professional networking systems. For example, a monitored process might be generated through the use of another application (i.e., a host application) with which the PTaM Plug-In is integrated in order to provide added functionality. In this way, when a new process is started in the host application the PTaM Plug-In provides a user interface and communications infrastructure to communicate the relevant information about the new process to the PTaM Plug-In. The PTaM Plug-In can similarly make relevant information from the PTaM Viewer, such as the input data, accessible to the host program.

Figure 101:
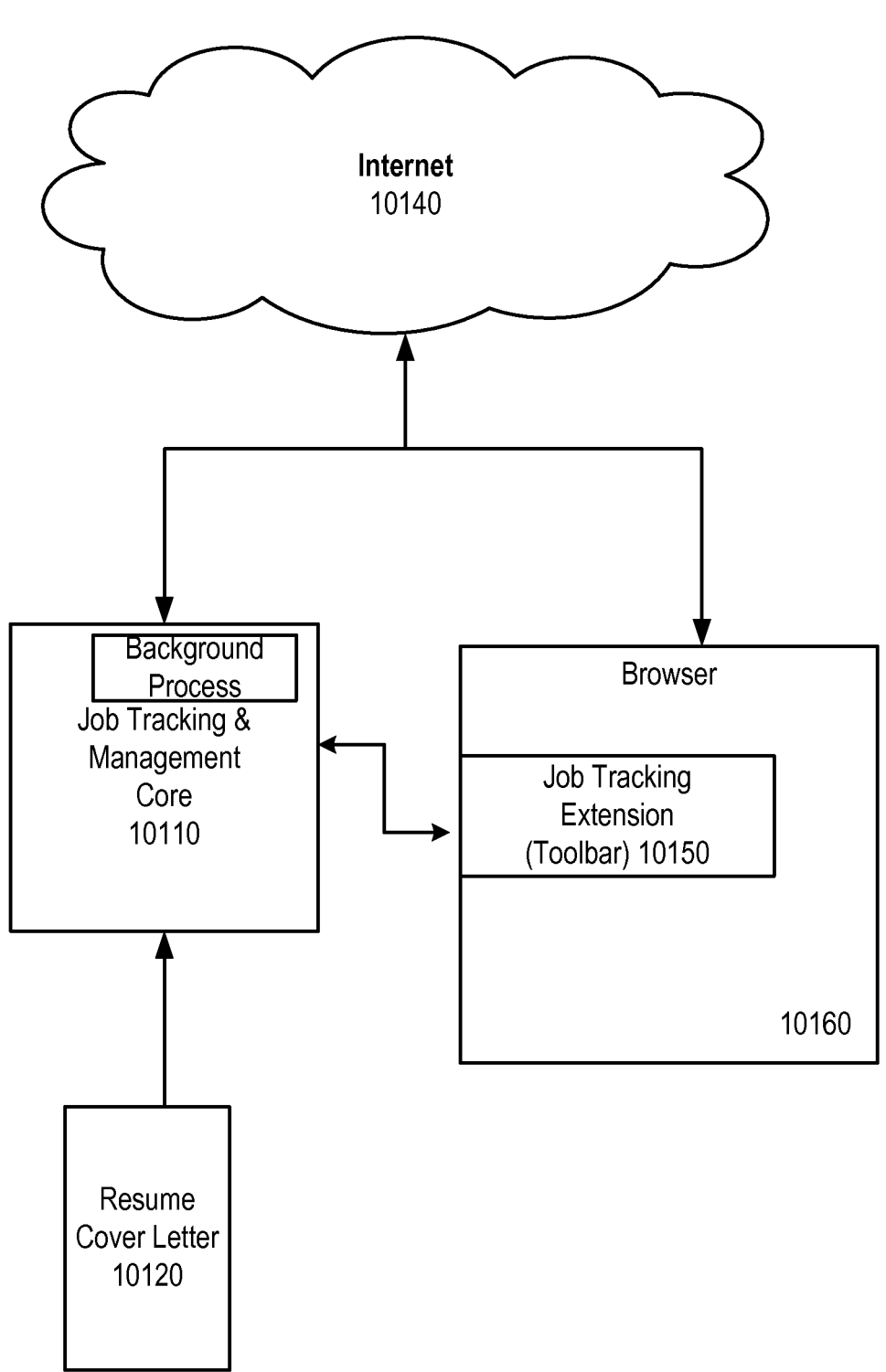
FIG. 101 discloses an embodiment of a job application tracking and management environment in accordance with the present disclosure.

FIG. 101 depicts an embodiment of the disclosed system specifically used to implement a Job Application Tracking and Management ("JATaM") Environment. The JATaM Environment comprises a Job Tracking and Management Core ("JTM Core") 10110 and a Job Listing Tracking Extension 10150. The JTM Core serves to provide a primary user interface and coordination point for an applicant's use of the JATaM Environment. The JATaM Environment can be implemented as an application in a social network environment, as a mobile application, a stand-alone application and/or a web based application. The JATaM Environment may be implemented using a variety of software development techniques as required by the software and/or hardware platform it runs upon, such as, for example, a particular social network, a personal digital assistant or smart phone, tablet computer, etc.

An applicant may have a unique instance of the JATaM Environment for his or her use, such as by having one local version of the JATaM Environment on the applicant's smart phone. Applicants might alternately be provided a unique instance of the JATaM Environment through the use of user accounts with usernames and passwords. A unique instance of the JATaM Environment stores relevant personal information about the applicant and his or her job search. In particular, the JTM Core 10110, for example, might take as input the applicant's resume and/or cover letter 10120, and/or profile data from an applicant's social network profile, job applicant profile, professional network profile, etc. The profile data, resume and/or cover letter can then be made available to aid in filing job applications for the applicant and/or in finding job listings suitable to the interests and abilities of the applicant. The JTM Core may, in some embodiments, keep a copy of the applicant's resume and cover letter or a symbolic link to its location, and/or a set of profile data that could be used to populate a resume and/or job application. In a web application embodiment the resume and cover letter could be up-loaded to the web application's host server.

Once accessed by the JTM Core, the profile, resume and/or cover letter information can be parsed by the JTM Core to extract relevant information about the applicant, such as, the applicant's name, address, phone number, email address, educational background, title, work history, social network data, connection information, etc. This parsed information might be presented to the applicant for confirmation and then used by the JTM Core to create a new profile associated with the applicant. In a further embodiment, the applicant could be prompted to provide additional information to expand the profile created by the JTM Core. Some profile information could be extracted form a social network and used to populate a professional network profile, separate and apart from the social network profile. Alternately, elements of the applicant's profile could be entered by hand or imported from some other source. In some embodiments, key terms associated with the applicant may be extracted from a social network profile and/or resume during the creation/upload process. The key terms may be used for as search terms in a job matching application that will be described in greater detail below.

In the job application process, information about job listings may be derived from multiple sources, e. g., various job listing services and various employer listings. Typically, these job listings will come to the attention of the applicant through searches on the World Wide Web, or a similar information-gathering environment, or they may be provided to the applicant based on cookies, profile information, etc. The Job Listing Tracking Extension can be embodied by social match platform app in a social network, on a mobile device, and/or as a plug-in, for example, with a browser acting as the host application for the Job Listing Tracking Extension. Alternately, it could be a separate utility, a network, e.g. web, interface, or an integrated function of the host application.

In the embodiment of FIG. 101, the Job Listing Tracking Extension 10150 integrates with the applicant's browser 10160 to provide a mechanism to transfer information to and from the JATaM Environment and the browser. In order to allow the JATaM Environment to record and transfer information when the JTM Core 10110 is not actively running, a background process 10111 may be provided to provide the Job Listing Tracking Extension 10150 a connection interface. The background process could be embodied, for example, as a daemon or windows background process. In the alternative, the information used by the system can be stored on a network accessible data storage device that is accessible by both the Job Listing Tracking Extension and the JTM Core. The Job Listing Tracking Extension 10150 integrates with its host application browser 10160, which connects to the internet 10140. One implementation of the Job Listing Tracking Extension 10150 may be a web browser toolbar, while an alternative extension embodiment might incorporate menu commands for implementing Job Listing Tracking Extension functions to the host application browser.

Figure 102A:
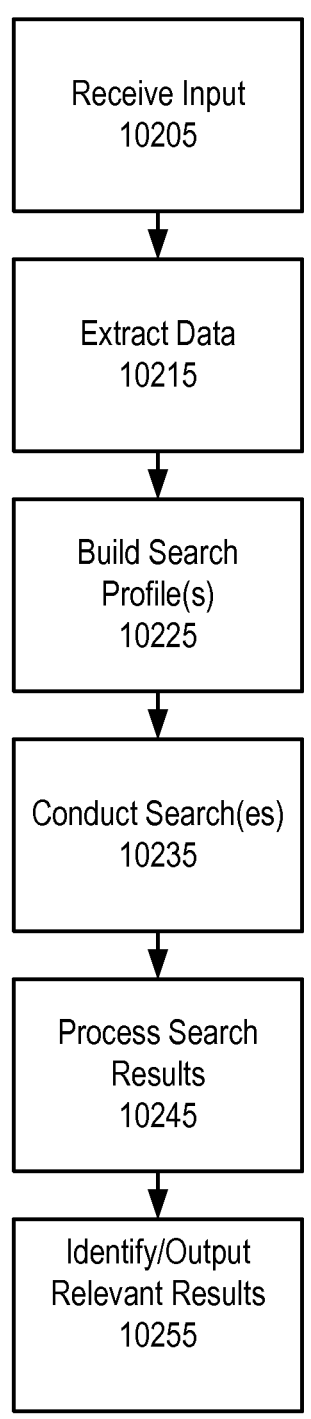
FIG. 102A discloses a flow diagram for a job listing search aspect of one embodiment of the present disclosure.

FIG. 102A discloses a flow diagram for a job listing search aspect of one embodiment of the present disclosure. The method disclosed, which in some embodiments is implemented on a processor and executed by the Job Listing Tracking Extension 10150 and/or the JTM Core 10110, allows for receiving input 10205 relevant to a job listing search such as, by way of non-limiting example, location, skill(s) and/or education, experience level and compensation. In some embodiments, the input 10205 may come directly from an applicant, such as an applicant's entered job parameters, an applicant's response to job related queries, and/or a submitted resume. In another embodiment, the input 10205 could include information not specific to a particular applicant, such as a job description or listing.

Relevant data is extracted 10215 from the received input, for example, if the input were a resume, the extraction could include parsing and analyzing the resume to distill the key data relevant to the job listing search. The relevant data is used to build a search profile 10225 that may then be utilized, either in whole or in part, in generating and conducting a job listing search or searches 10235. The results of the search or searches are processed 10245, which in some embodiments may include a further analysis and/or refinement of the search results, and from the processing, relevant results (i.e., a plurality of job listings corresponding to the input 10205) are identified 10255.

Figure 102B:
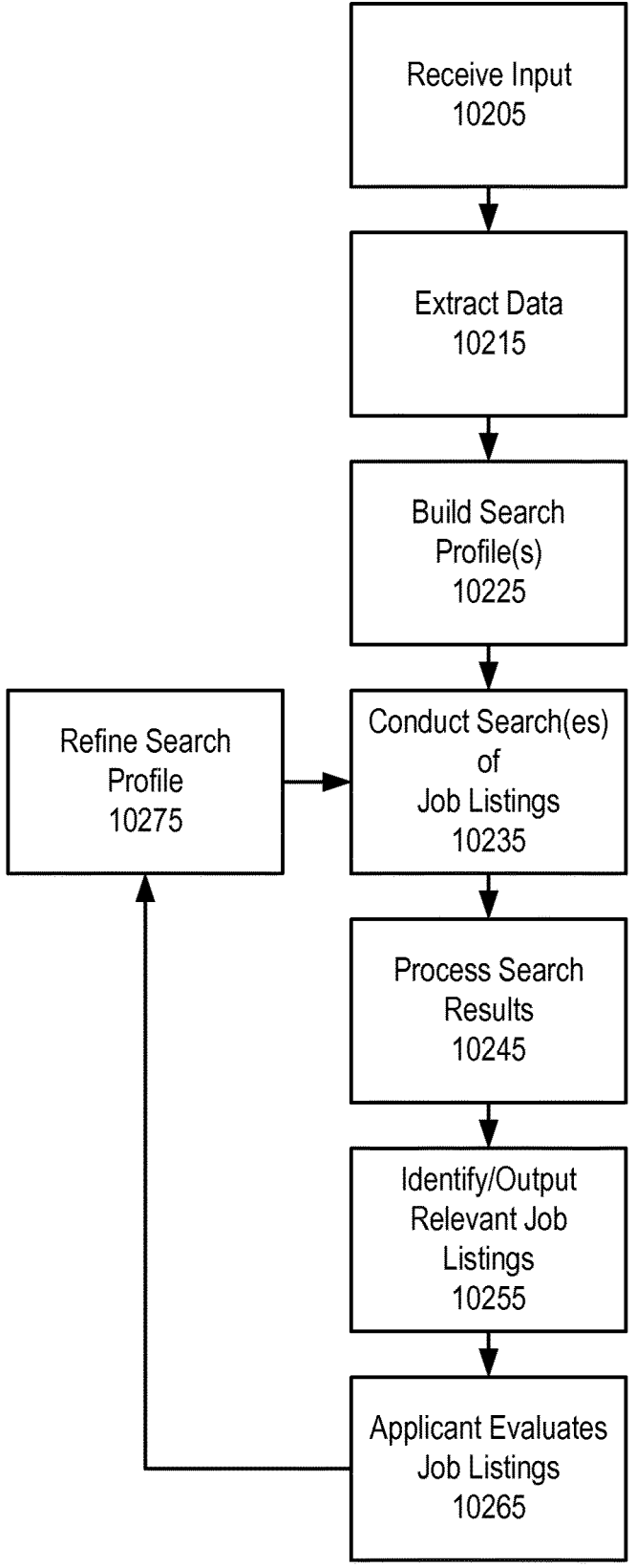
FIG. 102B discloses a flow diagram for a further embodiment of the job listing search aspect of the present disclosure.

In a further embodiment, shown in FIG. 102B, the above method may be iteratively refined. As in the previous figure, an initial search profile 10225 is utilized in conducting job listing searches 10235, the results of the searches are processed 10245, and relevant job listings are identified 10255. The identified job listings are then presented to an applicant who may evaluate 10265 the job listings based on any number of user-rating metrics. For example, the user may rate the job listings according to how well suited the listings are to the applicant's employment interests, the listings meet the applicant's qualifications or desired income goals. The applicant's feedback and/or evaluation 10265 may then be used to refine the search profile 10275, which may be used in place or in addition to the initial search profile 10225 in conducting subsequent searches of job listings 10235. The above method may be iterated multiple times to further refine the job listings identification of job listings relevant to an applicant.

Figure 103A:
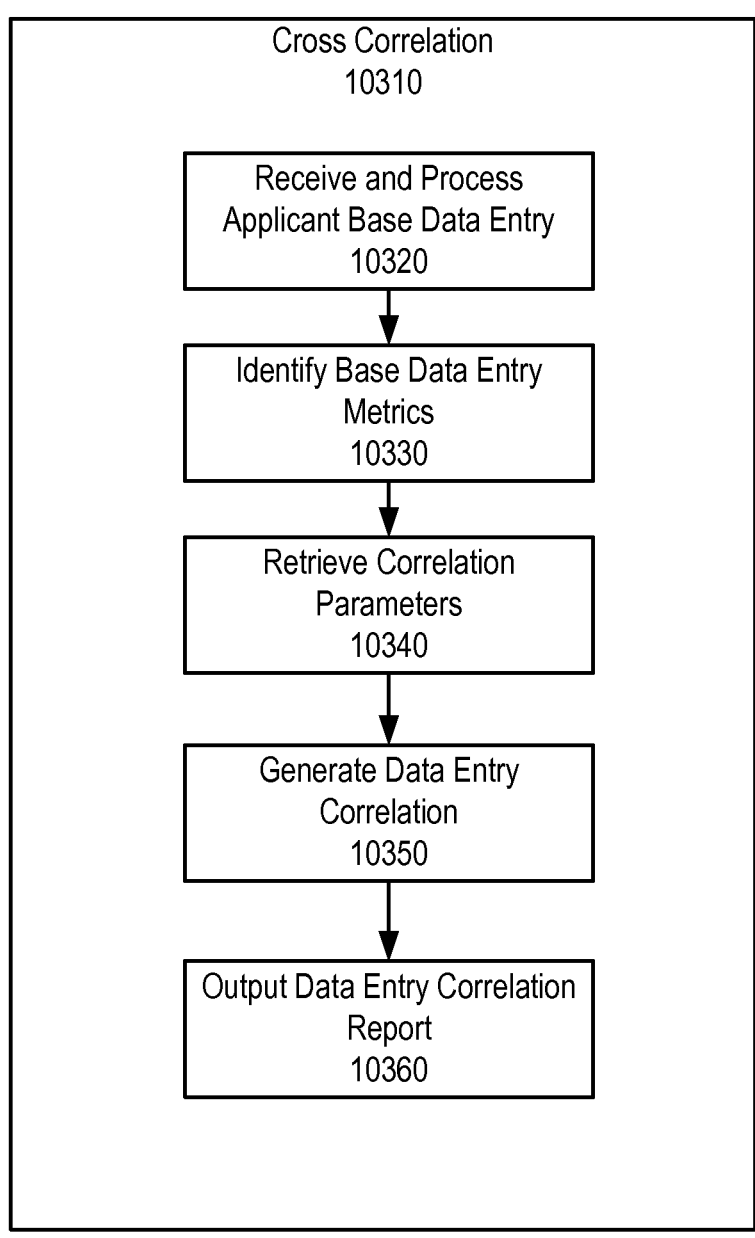
FIG. 103A discloses a flow diagram for a cross correlation search aspect of one embodiment of the present disclosure.

FIG. 103A discloses a flow diagram for data entry correlation according to an embodiment of the disclosure. The method disclosed allows for receiving and processing applicant designated base data entries and correlating the base data entries with supplementary data entries, as well as generating and outputting a data entry correlation report. In some embodiments, the cross correlation process 10310 is implemented on a processor by the Job Listing Tracking Extension 10150 and/or the JTM Core 10110. The data entry correlation report may be utilized in searching and identifying supplemental data entries (e.g., job listings) matching an applicant. An applicant designated base data entry is received and processed 10320 to determine base data entry metrics 10330. User correlation parameters are retrieved 10340 that match the base data entry metrics 10330, wherein matching user correlation parameters correspond to the base data entry metrics 10330. From the retrieved user correlation parameters 10340, a data entry correlation report is generated 10350. Some embodiments may output the data entry correlation report 10360, and in a further embodiment, the data entry correlation report may be associated with the applicant's profile. In some embodiments, user correlation parameters may be retrieved from internal and/or external data bases.

Figure 103B:
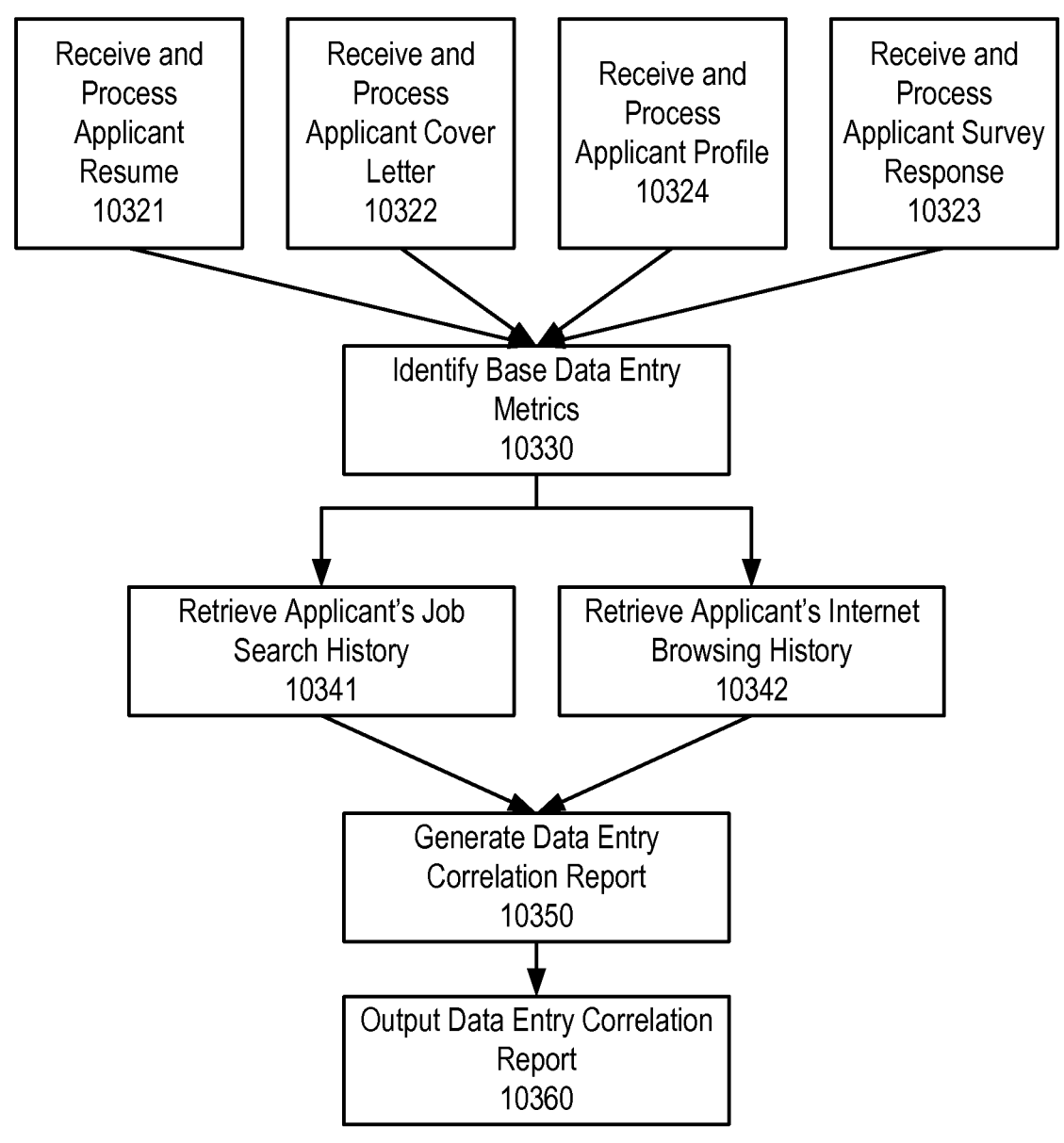
FIG. 103B discloses a flow diagram for the cross correlation search aspect of a particular implementation of the present disclosure.
Figure 103C:
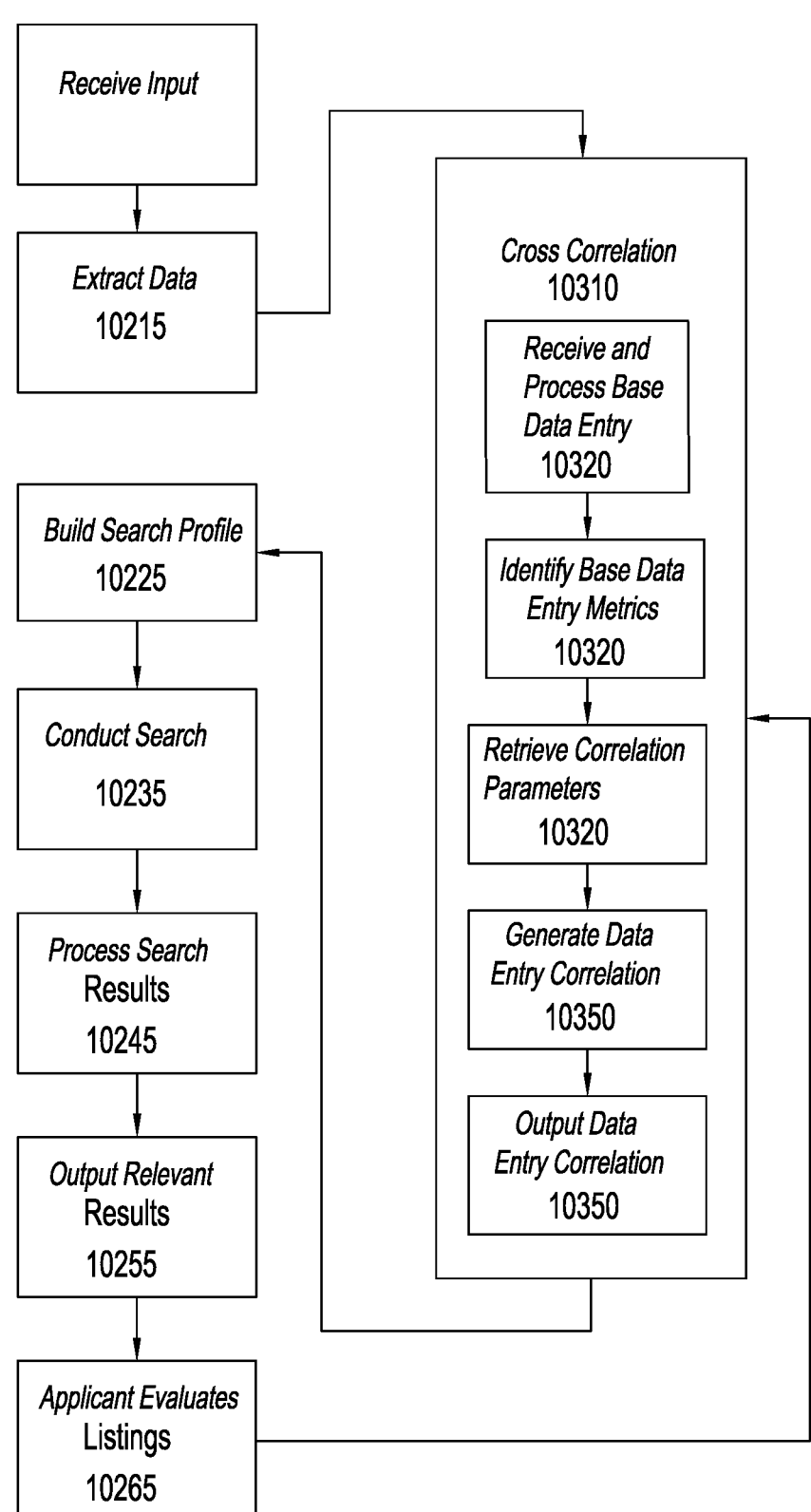
FIG. 103C discloses a flow diagram for a further implementation of the correlation search aspect of the present disclosure.

In some embodiments, the base data entry and/or user correlation parameters may be direct input, such as an applicant's response(s) to one or more brief and/or in-depth surveys as discussed in FIG. 103B. Survey methodologies may include multiple choice, short answer, rating, ranking, free response and/or the like. In one embodiment, the surveys are directly related to job finding. In a further embodiment, the surveys include additional matter (e.g., personality tests) that, after being analyzed, may be useful in finding job listings that are especially well matched to an applicant.

In one embodiment, the relevant user correlation parameters may include an applicant's historical information. In some embodiments, the historical information may include an applicant's search for job listings, viewing of job listings, responses to job listings, aspects of the applicant's profile, application submission to job listings, and/or saved job listings. In another embodiment, the historical information includes the applicant's web site viewing and/or web search history.

In one implementation, shown in FIG. 103B, the applicant designated base data entry or entries may include an applicant's resume 10321, cover letter 10322, survey response(s) 10323 and/or profile 10324. The base data entry or entries are received and processed to extract base data entry metrics 10330. User correlation parameters including the applicant's job search history 10341 and/or internet/web browsing history 10342 are retrieved and correlated with the base data entry metrics 10330 and a data entry correlation report is generated 10350. In a further embodiment, the Job Listing Tracking Extension and/or the JTM Core utilizes a data entry correlation rating module for an applicant to refine and target searches for job listings matching the applicant.

For example, in one embodiment, the analysis of a particular applicant's base data entry (in this case the applicant's resume) may yield base data entry correlation metrics that correspond to skills, education, work history and other details relevant to software engineering. User correlation metrics corresponding to the applicant (in this case the job search terms used by the applicant on a job listing site, such as job locations searched) are retrieved and correlated to the base data entry metrics and a data entry correlation report is generated. In this case, the metrics may indicate that the applicant has a certain level of experience in software engineering and has previously worked in the southwest (from analysis of the base data entry), but has been searching for jobs in the northwest (from the user correlation parameters). This data entry correlation report may then be utilized to better target and serve the applicant's interest by, for example, providing matching software engineering jobs in the northwest.

In another embodiment, the base data entry may be selected by the applicant, but is not necessarily applicant specific, including but not limited to a job listing. For example, if a job listing is the base data entry, the job listing would be processed to extract the relevant base data entry metrics. In some embodiments, the correlation metrics may include the metrics mentioned above, and may be extracted from the base data entries previously listed (e.g., resumes, cover letters, survey responses, profiles). In one embodiment, the data entry correlation report may be useful in finding job listings similar to the job listing used as the base data entry that are especially well suited to an applicant.

For example, for the case where a job listing is the base data entry, the correlation metrics may be based on the applicant's web or internet browsing history. If the job listing selected is for a general software engineer with C/C++ programming experience, and the applicant's browsing history shows indicates an interest in video game development as well as a particular geographic region, the data entry correlation report would reflect the potential correlation. The data entry correlation metrics could then be used in finding and/or evaluating job listings for the applicant, i.e., a job listing for a video game programmer requiring C++ programming abilities in applicant's geographic region of interest would be identified as being a good match for the applicant.

FIG. 3C illustrates one embodiment in which the cross correlation process 10310 is incorporated in the listing search method. As detailed in the above discussions of FIGS. 102A and 102B, the listing search method may receive input 10205 relevant to searching job listings and extract relevant data 10215 from the received input. The extracted data may then be used as the applicant designated base data entry in the cross correlation process 10310 and the resulting data entry correlation report 10350 is utilized in constructing the search profiles 10225 used to conduct job listing searches 10235. As before, the results of the searches are processed 10245, relevant job listings are identified 10255, and the identified job listings are presented to the applicant for evaluation 10265. In some embodiments the applicant's evaluation 10265 may be incorporated into the cross correlation process 10310 to refine the correlation of the base data entry metrics with the supplemental data entries and in a further embodiment, is process is iterated to progressively enhance cross correlation and the job listing search.

Figure 104A:
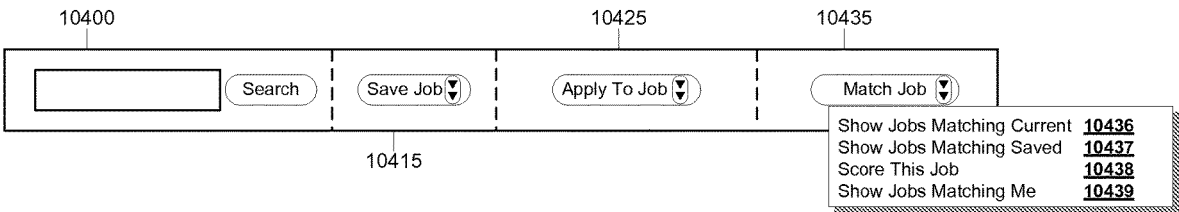
FIG. 104A discloses an embodiment of a job tracking extension in accordance with the present disclosure.
Figure 104B:
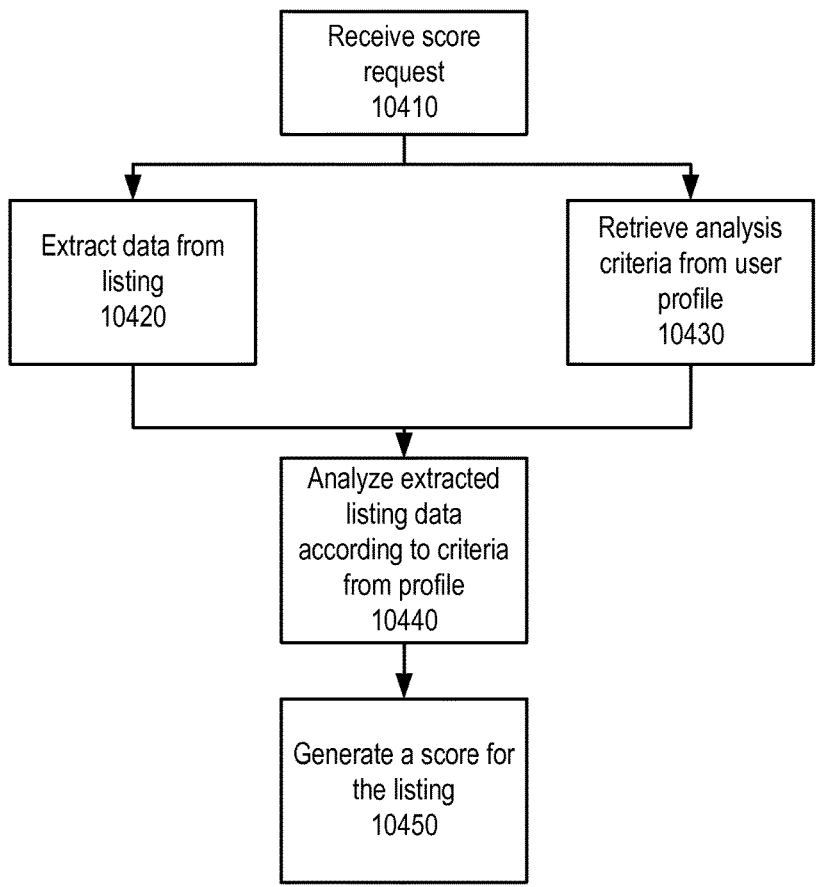
FIG. 104B discloses an overview of a scoring process for one embodiment of the disclosed disclosure.
Figure 104C:
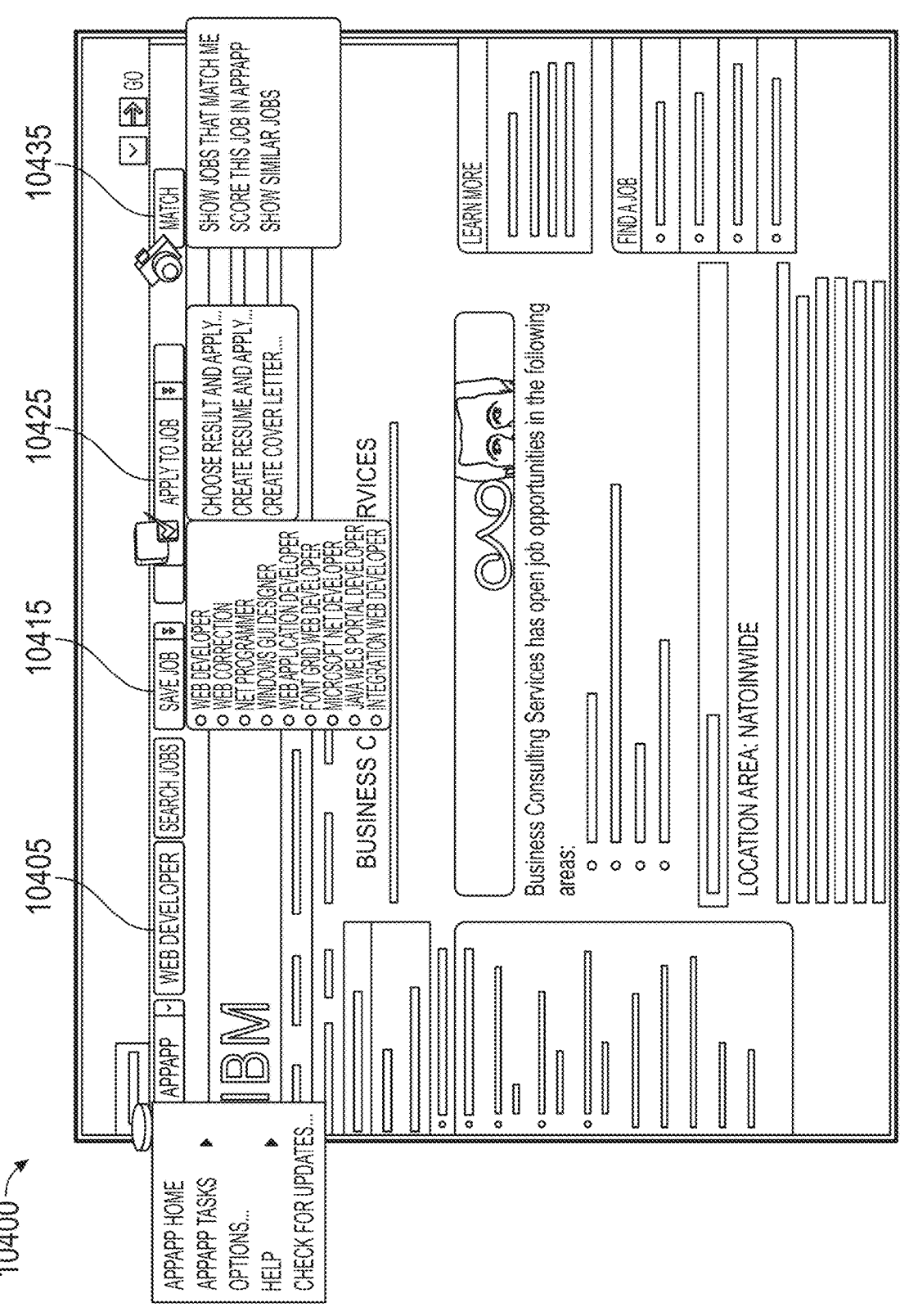
FIG. 104C discloses a particular implementation of a job tracking extension toolbar.

One implementation of the Job Listing Tracking Extension 10150 may be a web browser toolbar. An implementation of a Job Listing Tracking Extension toolbar 10400 is shown in FIG. 104A. In operation, the Job Listing Tracking Extension toolbar of FIG. 104A provides user accessible controls to implement job application tracking functions and retrieve information from the JATaM Environment. For example, if the applicant encounters a web page containing a job listing that the applicant is interested in, the Save Job control 10415 can be activated. Activating the Save Job control will cause the Job Listing Tracking Extension to transfer information about the job listing to the JTM Core where it is stored or to a shared data repository accessible by the JTM Core. In particular, the JTM Core might save the URL of the web page containing the job listing. In the alternative, or in addition, information about the job might be extracted from the web page and saved in a database accessible by JTM Core and the Job Tracking extension.

The Job Listing Tracking Extension can also retrieve information from the JTM Core for use in its host program (e.g., a web browser). For example, if the applicant discovers a listing for a job of interest while browsing, he or she can use the Apply To Job control 10425, to initiate the application process. The Apply To Job control can display a menu with a number of different options for application purposes. For example, if the on-line job application has an on-line web form, selecting the Apply To Job option can use information from the JTM Core to auto-populate the web form. If the job listing provides an email address for application submissions, the Choose Resume And Apply option can open the applicant's email client and format an email with the applicant is cover letter content in the body of the email and the applicant's resume attached to the email. In the alternative, the Apply To Job control might generate a cover letter document for transmission to the prospective employer. The Apply To Job control can also be configured to provide a one-click apply feature. For example, if the applicant has provided sufficient information to the system and the currently viewed job listing is in a known format. The process could by configured to effectuate application with only one user action, such as clicking on an automatic apply button.

In some embodiments, the Job Listing Tracking Extension may also submit information to the JTM Core from its host program. For example, if the applicant is browsing a web site, particularly a web site listing jobs, the Job Listing Tracking Extension can communicate this information to the JTM Core, which may store the information and in a further embodiment, use it to modify the applicant's profile. For example, if an applicant frequently goes to a particular company's job site, that information could be sent from the Job Listing Tracking Extension to the JTM Core, which could indicate the applicant's interest in employment at the particular company.

The FIG. 104A embodiment of the Job Listing Tracking Extension also includes a Match control 10435 that provides job listing search assistance actions. For example, in one embodiment, if the applicant discovers a job listing of interest, the Show Jobs Matching Current 10436 option can be activated. In a further embodiment, the Show Jobs Matching Current may be provided to the user as a one-click function. In one embodiment, the Job Listing Tracking Extension will then activate processes to analyze the current page and extract relevant job description terms. The Job Listing Tracking Extension uses the extracted terms to initiate a search for similar jobs, the results of which are provided to the applicant, for example, jobs from the same employer, same area, same job description, or a combination of these. In a further embodiment, the identification of similar jobs can be enhanced if express categorization information is provided on the current page in a way that is easily manipulated by the Job Listing Tracking Extension. One such mechanism would be to format the data using an XML markup and associated schema that provides tags identifying the relevant information.

Another option provided by the Match control 10435 in some embodiments is Show Jobs Matching Saved 10437 option, which allows the applicant to find jobs similar to jobs previously saved using the Save Job control 10415. The Job Listing Tracking Extension will then activate processes to analyze the plurality of saved jobs and extract the common and relevant job description terms. The Job Listing Tracking Extension uses the extracted terms to initiate a search for similar jobs, the results of which are provided to the appli-cant, by way of non-limiting example, jobs from the same area, jobs with the same skills and/or educational require-ments, same job description, or a combination of these.

In another embodiment the Match control 10435 provides an option to Score This Job 10438, which in some embodi-ments may be provided as a one-click function. In one embodiment, shown in FIG. 4B, when an applicant selects the Score This Job option, the Job Listing Tracking Exten-sion and/or JTM Core receive(s) the score request 10410, parses and extracts the job listing data on the current page 10420 and retrieves analysis criteria from the applicant's profile 10430. The Job Listing Tracking Extension and/or JTM Core analyzes and compares 10440 the extracted job listing data to the criteria from the applicant's profile. For example, in the case of an online job listing, contents of the web page (e.g., HTML page) are parsed and the parsed contents of the job listing are compared to criteria from the applicant's profile and/or resume. The correspondence between the job listing and the applicant's profile can then be used to generate a score 10450 (a number or other indicia) of the job's relative merits. For example, in one embodi-ment, if the job listing and the applicant's profile have matching data elements such as skills, education, location, experience and the like, such correspondence would be reflected in the score.

In one embodiment, the results of selecting Score This Job 10438 option can be provided to the applicant via the Job Listing Tracking Extension toolbar 10400, as a number or some other relative indicia of the job's suitability for the applicant (e.g., the job listing is an 86% match for the applicant). The applicant can score other job listings and use the resulting indicia to compare different jobs and/or further refine the applicant's profile. In some embodiments, the JTM Core may further enhance the process of creating the score by receiving, storing and analyzing the applicant's goals, criteria, and preferences. Some embodiments enhance the scoring process by analyzing aspects of an applicants browsing or surfing history, such as job listings viewed as well as companies sites, news sites and retailer sites visited. In one embodiment, a data entry correlation report related to an applicant may be utilized in the scoring process.

This information could then be provided to the Job Listing Tracking Extension and taken into account when performing the job scoring routine. In one embodiment, the scoring process is iterative and may be refined by receiving addi-tional information and/or feedback from the applicant. For example, based on the applicant's interests, the applicant may raise or lower the provided score of a particular job, and this adjustment may then be incorporated when performing the job scoring routine. In terms of implementation, the actual job scoring processes could reside in the JTM Core with the Job Listing Tracking Extension passing the JTM Core the relevant data and the JTM Core providing the score back to the Job Listing Tracking Extension and/or storing for later reference by the applicant. The function could also be implemented on a remote server that processes the job scoring request.

Another option provided by the Match control 10435 is Show Jobs Matching Me 10439, shown in FIG. 104A. Like the Score This Job option, the Show Jobs Matching Me option uses information about the applicant indeed much of the information used may be identical. However, rather than using the applicant's information to score a pre-determined job listing, the applicant's information is used to find job listings. In other words, this option finds high scoring jobs, and in one embodiment, jobs scoring over a certain threshold (e.g., jobs scoring 90 or more out of 100). The applicant's information is used to create a search query or series of search queries that will locate job listings relevant to the applicant. In one embodiment, the Show Jobs Matching Me option is provided to the user as a one-click function. The Show Jobs Matching Me 10439 option can cause searches to be performed upon multiple different job listing databases and/or via a general internet search. The search function can be implemented by either the Job Listing Tracking Exten-sion or the JTM Core.

The FIG. 104A embodiment of the Job Listing Tracking Extension also includes a Rate Job control 10445 that facilitates user feedback and response actions. For example, if an applicant discovers a job listing of interest, the Rate Job control 10445 option can be activated allowing the applicant to submit feedback in the form of some relative indicia, such as a "star" rating, indicating the applicant's interest in the listing and/or particular aspects of the listing. The applicant can rate multiple job listings and use the resulting indicia to compare different jobs and in a further embodiment, the JTM Core may receive, store and analyze the applicant's ratings of job listings to further refine the applicant's profile. In one embodiment, the job listing ratings provided by an applicant may be incorporated in the generation of an associated data entry correlation report.

FIG. 4C shows a particular implementation of a Job Tracking And Management Extension as a web browser toolbar 10400. This implementation includes a key word search jobs interface 10405, a save jobs interface 10415, an apply to job interface 10425 and a match job interface 10435. As shown in the figure, the save job interface 10415 provides a drop down list of previously saved jobs. Also, the apply to job interface 10425 allows the applicant to choose a resume and apply to a job. The resumes that the applicant chooses could be stored locally on the applicant's machine or could be stored on a network server. The create apply to job interface also includes a create resume and create cover letter options, which allow the applicant to create resumes and cover letters tailored to the job for which they are applying. The match user interface 10435 allows the applicant to perform a search for jobs matching the applicant, score the job currently being viewed and search jobs similar to the current job.

In another embodiment, the Job Listing Tracking Extension and/or the JTM Core may continue to search for matching job listings and notify an applicant if a job listing is found that is especially well matched to the applicant (e.g., the job listing represents the applicant's ideal job). Similarly, an applicant may be notified if a particular listing has an especially high score according to the applicant's profile. In some embodiments the system keeps searching for matching job listings for the applicant even if the applicant has stopped actively looking for a job. In one embodiment, the notification may be provided to an applicant regardless of whether or not the applicant is currently searching for a job. For example, take an applicant who had previously searched for jobs but was unable to find a job listing that was a perfect match. The system could continue searching for matching listings, and if at some future time the system found a job listing that was especially well-suited to the applicant and/or the applicant's profile, the system would notify the applicant that a good match had been found.

Figure 105A:
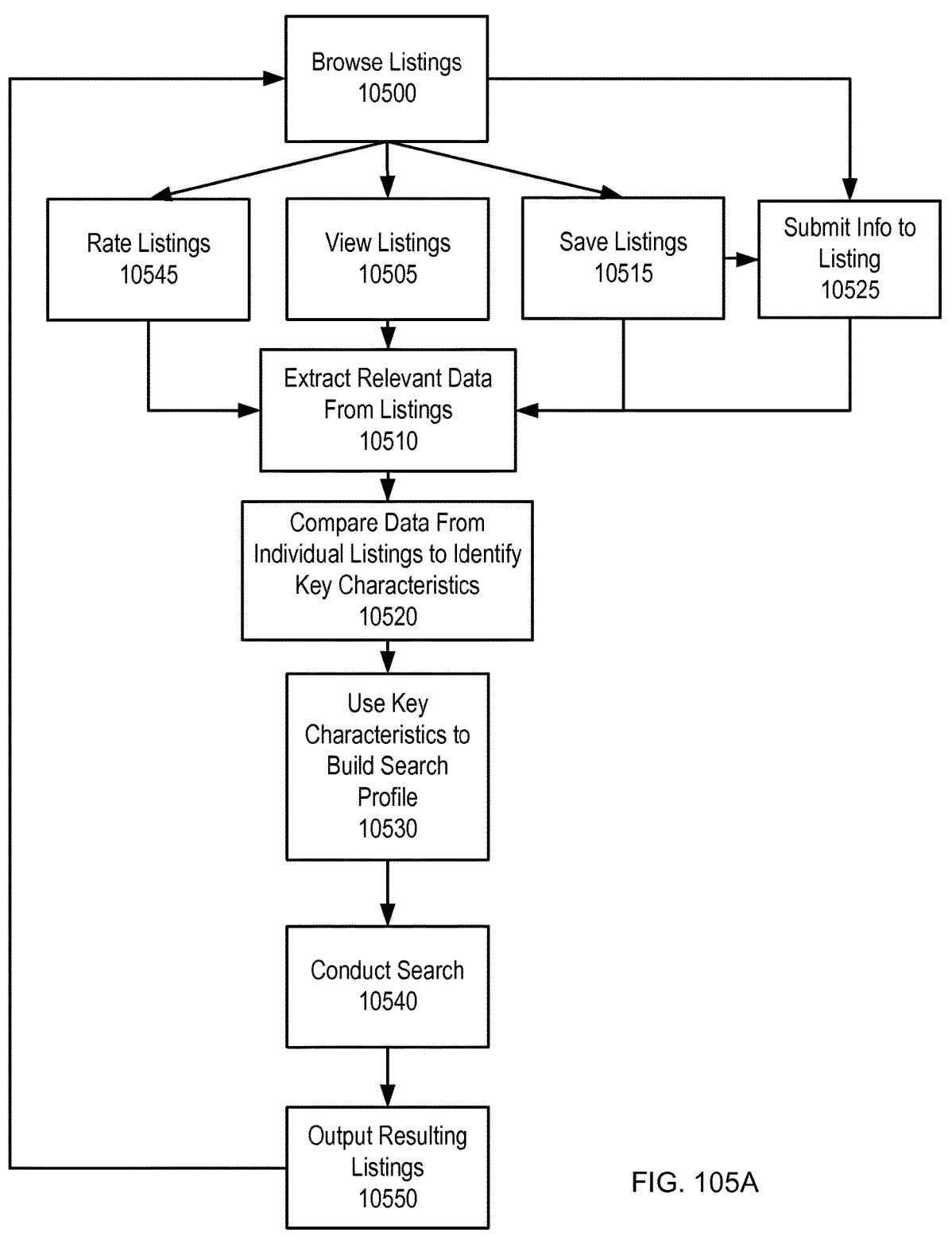
FIG. 105A discloses a flow diagram for the listing match search of one embodiment of the present disclosure.
Figure 105B:
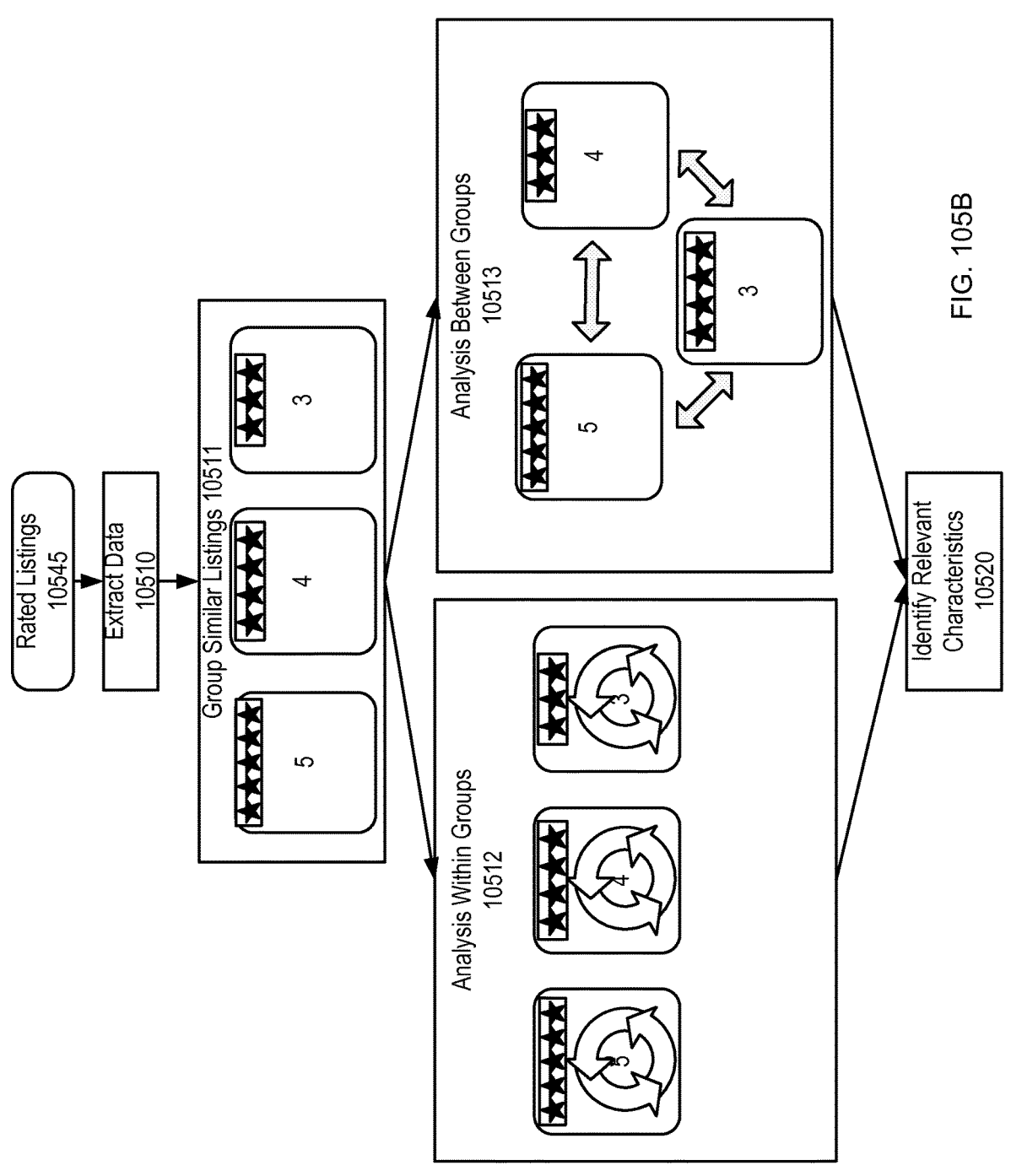
FIG. 105B discloses an overview of an analysis aspect of one embodiment of the disclosed disclosure.

FIGS. 105A-105B provide flow diagrams representing overviews of methods for dynamically providing matched job listings to an applicant in one embodiment. In some embodiments, the methods disclosed may be implemented on a processor by the Job Listing Tracking Extension 10150 and/or the JTM Core 10110, and in further embodiments may utilize the Job Listing Tracking Extension toolbar 10400 as disclosed in the above discussion of FIG. 104A. In one embodiment, shown in FIG. 105A, via the described method an applicant may browse job listings 10500 and view S 10505, save 10515, rate 10545 and/or submit an application 10525 to job listing. When an applicant views a job listing 10505, the listing, key terms from the listing, and the amount of time it was viewed by the applicant are retained. In a further embodiment, when saving 10515, rating 10545 and/or submitting an application 10525 to job listing, the applicant may utilize the Save Job control 10415, Rate Job control 10435, and Apply To Job control 10425 respectively, as disclosed in FIG. 104A.

Each user initiated action yields a respective action group of listings from which relevant data may be extracted 10510. The extracted data from individual listings may be compared with extracted data from other listings in each group and/or, across groups, to identify key common/distinguishing job listing characteristics 10520. In a further embodiment, comparisons within and across sub-groupings, such as rated job listings sub-grouped according to ratings or viewed job listings sub-grouped according to view times, may be utilized in identifying key characteristics. The key characteristics identified may then be used to build a search profile 10530 from which job listings searches are conducted 10540. The job listings resulting from the searches 10550 may then be presented to the applicant for browsing 10500, and in a further embodiment, the process repeated to provide the applicant with progressively more relevant job listings. In a further embodiment, the method disclosed is used to dynamically update the job listings browsed by an applicant.

FIG. 105B provides an overview of the group comparison process for one embodiment. Rated job listings 10545 for an applicant may have the relevant data extracted 10510, wherein the extracted data is associated with the respective individual job listing. The rated job listings and associated data are grouped according to applicant designated rating 10511: Group 5 for job listing the applicant has given a 5 star rating, Group 4 for job listings the applicant has given a 4 star rating, and Group 3 for job listings the applicant has given a 3 star rating. The extracted data from individual listings is then analyzed within each group 10512 and/or between groups 10513 in order to identify key characteristics 10520, which may be used to build a search profile. Other embodiments may use the same or similar method in processing groups and/or subgroups of job listings.

Figure 106A:
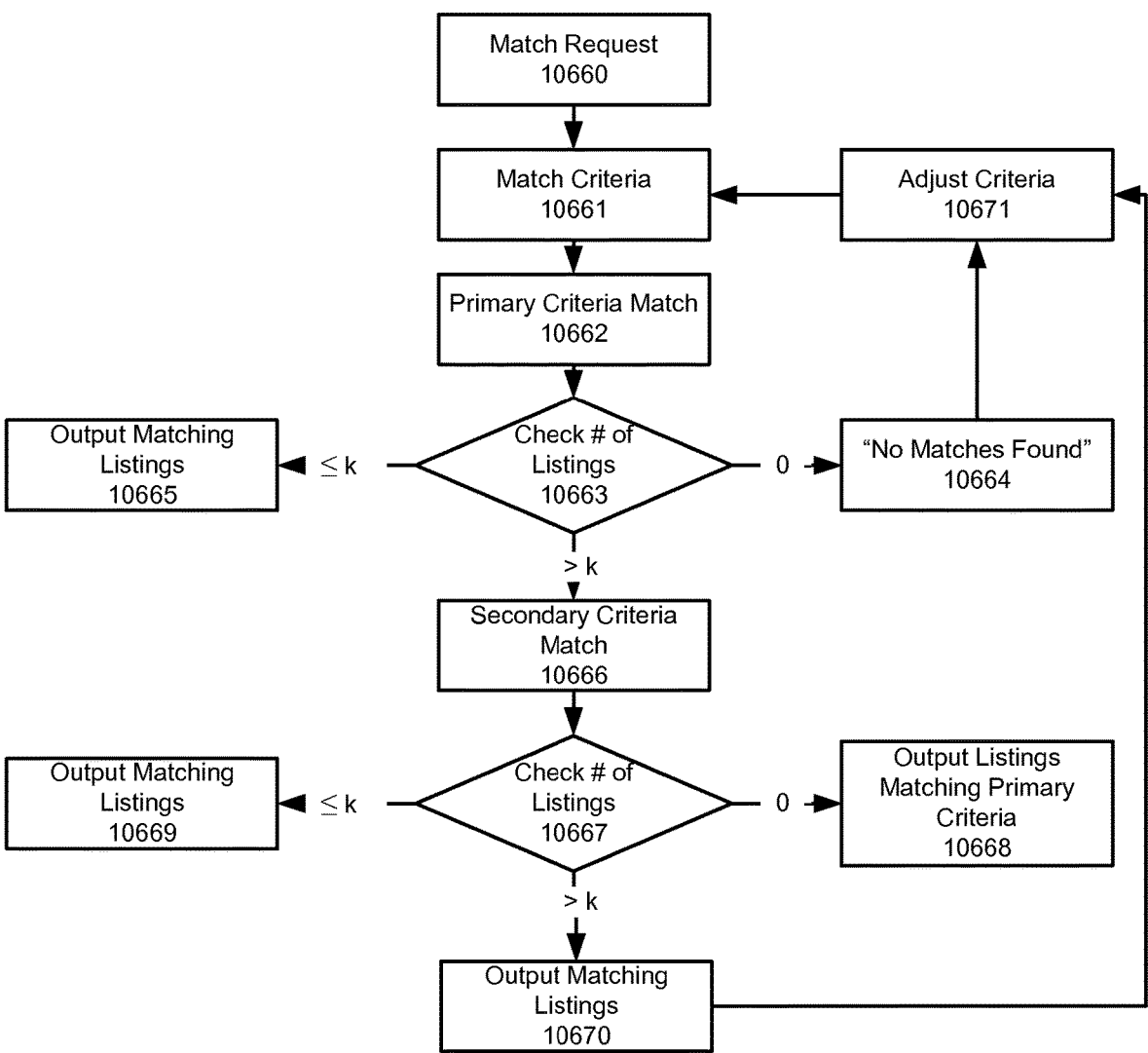
FIGS. 106A, 106B and 106C disclose logic flow diagrams of the results processing match aspect for some embodiments of the present disclosure.
Figure 106B:
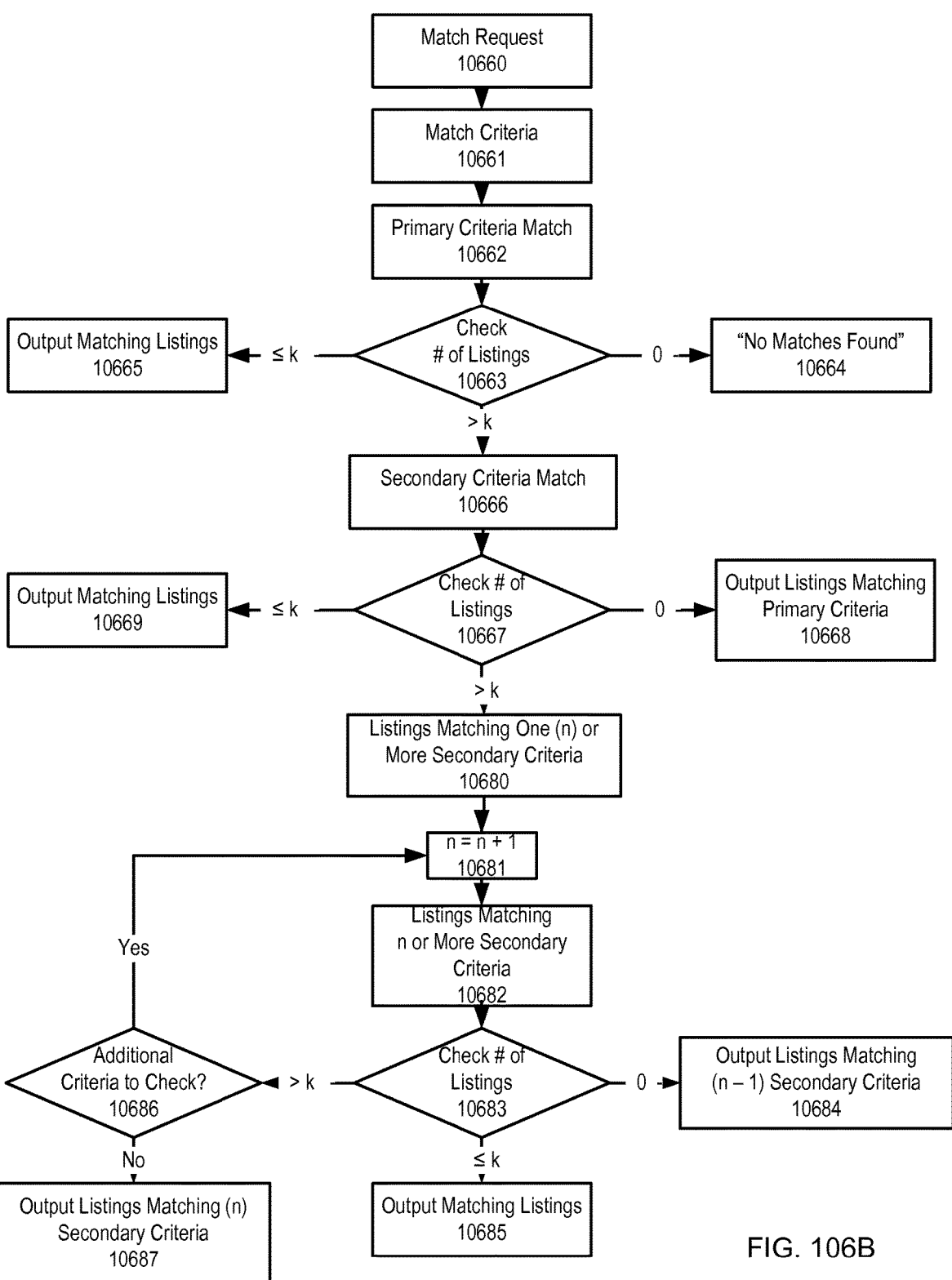
Figure 106C:
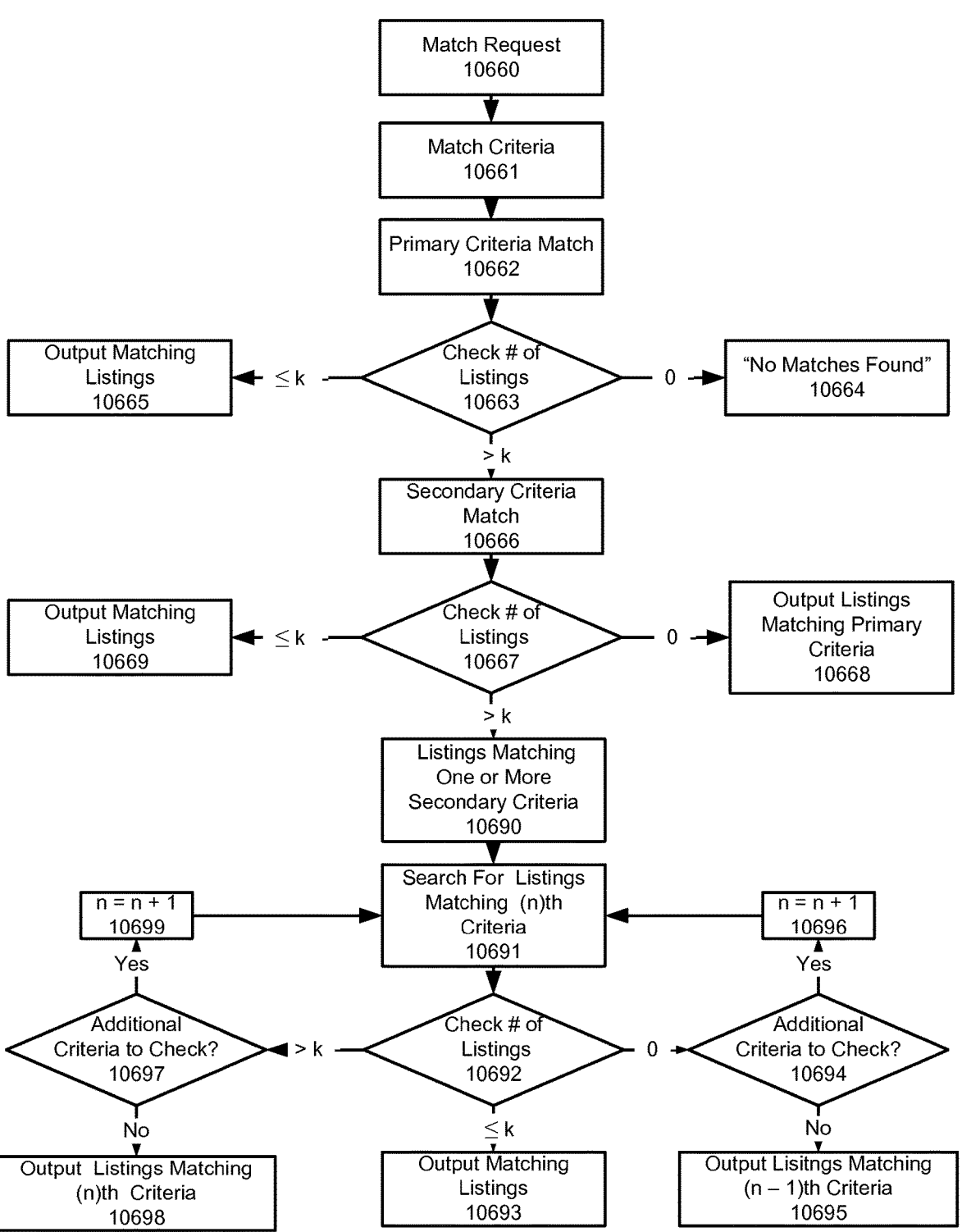

FIGS. 106A, 106B and 106C illustrate flow diagrams for the match screening aspect of the matching process associated with some embodiments of the disclosure. Certain embodiments may use these or similar processes in scoring jobs for an applicant. The input for the match screening process is a Match request 10660 for a plurality of job listings. The Match criteria 10661 for the job search may come from a number of sources including but not limited to the following: analysis of the applicant's profile, applicant's resume 10120, a particular job listing selected by the applicant, a data entry correlation report, analysis of the plurality of job listings saved by the applicant, job listings applied to by the applicant, analysis of the applicants browsing history, applicant feedback and/or the like.

Next an iterative match screening of job listings is performed. The queries discussed can be performed through a variety of methods. In some embodiments, the iterative match screening begins with a primary criteria matching 10662 of the job listings to obtain a first pool of potential matches for the applicant. The primary criteria match screening 10662 uses match criteria that are essential to finding an appropriate match for the applicant, such as skills and/or qualifications required. In some embodiments, required skills and qualifications are fundamental criteria and provide a solution for narrowing down the list of jobs (i.e., the job at least requires skills and qualifications similar to the applicant's skills and qualifications).

In one embodiment, aspects of a data entry correlation report related to an applicant may be included in the primary criteria and/or used in selecting primary criteria. In one embodiment, the applicant may also be allowed to indicate required criteria. For example, if an applicant is interested in finding a job with a particular schedule, salary and/or location, the applicant might designate one of these parameters as required criteria. Any such identified required criteria would be added to the primary criteria matching 10662.

The results of the primary criteria matching 10662 are passed to a decision block 10663 where a check is made to determine if any matching job listings were identified. If no job listings meeting the primary criteria were found, a "no matches found" error 10664 is generated and communicated. The criteria may then be adjusted 10671 to update the primary match criteria 10661 for the screen or start a new Match request 10660, and in a further embodiment, update the search criteria. In a further embodiment, the match screen and/or search criteria may be saved and the search be re-run at a later date when the job listings information may have been supplemented or modified. If the matching job listings are only a small number of entries (i.e., the number of entries is ≤k, where k may be set by the applicant, the system, etc.), the information for those job listings is output 10665 to the applicant. If the matching job listings has many entries (number of entries >k), the process continues on to the secondary criteria match screening.

A screen of the remaining job listings is performed to determine which job listings meet one or more of the secondary criteria 10666. The results of this match screen are passed to a decision block 10667. If none of the jobs meet any of the secondary criteria, the job listings meeting the primary criteria may be reported to the applicant 10668. If only a small number of job listings meet any of the secondary criteria, the information for those job listings is output 10669 to the applicant. If many job listings meet one or more of the secondary criteria further refinement of the screen can be performed as follows.

In one embodiment, all job listings meeting at least a specified number of secondary criteria can then be presented to the applicant for review 10670. This approach works particularly well when the secondary criteria are not ordered in terms of importance. In other words, if there are a number of secondary criteria without an indication that some of those criteria are more preferred than others, it might be best to give the applicant the information for all the job listings that meet their primary criteria plus the specified number of their secondary criteria.

The applicant can then review the job listings to see how each meet their secondary criteria and choose whichever they feel is the best match. In one embodiment, the applicant may rate some or all of the provided job listings and/or select job listings that the applicant feels are a good match and in a further embodiment, the rated and/or selected job listings may be used to refine or adjust criteria 10671 and update the match criteria 10661 used to select job listings for the applicant. For example, if the applicant gives a low rating for a particular employer or type of job, the criteria would be modified to screen against the particular employer or job type. In one embodiment, an applicant's screen criteria and/or modified screen criteria may be reflected in subsequent data entry correlation reports for an applicant.

The approach described above could be refined, as shown in FIG. 106B, by iterating over the job listings meeting one or more criteria to find the jobs meeting the most categories of secondary criteria. This approach begins with the list of jobs meeting one or more of the applicant's secondary criteria 10680. To determine if any of the jobs meet more than one criteria the value n, starting at one, is incremented by adding one to itself 10681. The list of jobs 10680 is screened for jobs that meet n criteria 10682 (i.e., two) during the first iteration of the process. The number of jobs remaining after this matching is checked 10683. If no job listings remain, the list of jobs meeting n–i criteria is output 10684. If only a small number of job listings remain, those jobs' information is output 10685. If more than a small number of job listings remain, a determination is made to decide whether there are still more secondary applicant criteria to check 10686. If there are not, the list of jobs meeting n criteria is output 10687. If there are secondary criteria remaining, the process increments n again 10681 and the filtering process continues.

The process as described above will result in job listings that meet the highest number of the applicant's criteria. In other words, if twenty jobs meet any five of the applicant's criteria, but none of the jobs meet six of the criteria, this match process will identify those twenty job listings. This procedure, however, does not value any of the secondary criteria more than the rest. Accordingly, if some of the applicant's secondary criteria are more important than others a different process might be advisable.

FIG. 106C discloses a flow diagram for matching job listings such that they are identified according to the importance of the secondary criteria. This flow requires the secondary criteria to be ordered as to their importance, with the most important criteria listed first, the second most important second and so on. This ordering can either be identified by the applicant, the Job Listing Tracking Extension 10150, the JTM Core 10110, be inherently programmed into the system, generated using other aspects of the disclosed embodiments, etc. For example, if the criteria for the search were generated by analysis of the job listings saved by the applicant using the save jobs interface 10415, the criteria could be ordered according to the which criteria was most common to the saved job listings (e.g., if all the jobs require a particular skill, that skill would be the first listed criteria; if most of the jobs were in a certain location, that would be a subsequently listed criteria). In another embodiment, the criteria for the search for a particular applicant may be identified and/or ordered according to a data entry correlation report corresponding to the particular applicant.

The process begins with job listings meeting one or more of the secondary criteria 10690. These are screened for job listings matching the (n)th most important secondary criteria 10691, i.e., the first most important criteria in the first iteration of the process, etc. The results derived from the match screen are checked to determine the number of matching job listings 10692. If only a small number of job listings remain after the matching, those job listings are output 10693. If no job listings remain after the matching, a determination is made to discover whether there are other criteria to check 10694. If not, the job listings found after the screen for matches for the (n–i)th criteria are output 10695. If other criteria remain to be screened, the value of n is incremented 10696. The job listings remaining after the previous matching are now screened again at 10691 to determine if any of those job listings match the new (n)th criteria and the iterative process continues. If multiple job listings are found to meet the (n)th criteria at decision 10692, a determination 10697 is made to find whether there are any criteria remaining to be screened. If no criteria remain, the job listings meeting the (n)th criteria are output 10698. If other criteria remain to be screened, the value of n is incremented 10699. The job listings remaining after the previous matching are now screened again at 10691 to determine if any of those job listings match the new (n)th criteria and the iterative process continues.

Alternatively, the matching systems disclosed in FIGS. 106A, 106B and 106C could be combined. For example, a hybrid approach might use the 106B approach to narrow the field of job listings to job listings meeting at least three secondary criteria and then use the 106C approach to test for secondary criteria in a preferred order. In another embodiment, primary criteria are reused as secondary criteria. For example, it might be advisable to use skills and/or responsibilities required as primary criteria to exclude job listings outside the applicant's interest area. Then after narrowing down job listings based upon a number of secondary criteria it might be beneficial to reuse the skills and/or responsibilities required to find the job listings best suited to the applicant.

In addition to screening for matching job listings, in some embodiments the above methods may be similarly utilized in scoring job listings for an applicant. For example, the more criteria a job listing met, the higher the relative score of the job listing would be. As discussed above, the scoring could similarly incorporate different priority levels and/or weights for different criteria in calculating a job listing's score. Also, some level of iterative screening may be implemented as part of the search process.

Job listings saved and/or applied for by the applicant using the Job Listing Tracking Extension are recorded by the JTM Core. The JTM Core allows the applicant to access this information. For example, the JTM Core can provide a history screen listing the applicant's saved and applied for jobs, along with relevant information about each saved job. For example, the embodiment of FIG. 107A lists job title 10701, company 10702, location 10703, the date the job was applied for 10704, the number of correspondence between the applicant and the employer 10705, the status of the application 10706, and the job's score 10707. The date applied for field shows the date applications were provided to the employer note that listings without dates indicate saved job listings that have not yet been applied for. The correspondence field of the history report can act as a control that when activated displays the history of correspondence between the applicant and the employer. The job application history screen might also provide a mechanism for highlighting applications in which some activity has occurred.

In one embodiment, the applicant may rate the stored jobs according to their preferences, as shown in FIG. 107C. In one embodiment, the job ratings may be incorporated into the applicant's profile and/or utilized when matching and/or scoring additional jobs. In a further embodiment, the applicant may rate individual aspects of a stored job, such as the job title 10701, company 10702, and/or location 10703. In some embodiments, the ratings of the individual aspects may be associated with or incorporated into the applicant's profile and utilized when matching and/or scoring additional jobs.

The JTM Core can also provide a Job View screen that provides detailed information about the applicant's saved jobs. This screen could, for example, be accessed by selecting a job from the history screen. One embodiment of a Job View screen is shown in FIG. 108A. The Job View screen provides details about a particular job. The job title 10801 and detailed description of the job 10802 can be provided, as well as, the company 10803, location 10804, job type 10805 (full-time, part-time, freelance, etc.), job category 10806, work experience required 10807, and education level required 10808. The Job View screen might also display meta-data about the job listing 10809, such as, how many times the same job has been posted in the last year or how many days the job listing has been active. The Job View screen may also include a note entry area 10810 for use by the applicant and controls to allow the applicant to access data about the employer and find other similar jobs.

As it is advantageous for the applicant to know whether the same job is listed elsewhere, the Job View screen can also include controls identifying other web sites containing the same job listing 10811, which also allow the applicant to view the job listing as it appears on that site. This could be accomplished by integrating a browser window showing the job listing as it appears on the various listing sites or by retrieving and reformatting the information from the various listing sites. The JTM Core can independently search out these duplicate listings or they can be identified through the applicant's search process, such the JTM Core recognizes when to retrieved jobs are in fact identical.

FIG. 108B shows a particular implementation of a Job View screen. This particular Job View screen is implemented as part of a JTM Core embodied as stand-alone application. As can be seen, other potential features of the toolbar are shown in the Figure.

Additionally, as with the job history screen, in some embodiments the Job View Screen may also allow the applicant to rate aspects of the job displayed on the Job View Screen, as shown in FIG. 108C. Aspects of the job listing such as the detailed description of the job 10802, the company 10803, location 10804, qualifications (including work experience 10807 and education 10808), starting salary 10812 and benefits 10813. In a further embodiment, certain sub-categories of the provided information, such as certain aspects of the detailed description of the job 10802 may also be rated. For example, if a job description includes a list of technical skills desired, an applicant might give one desired technical skill a high rating (indicating that it is a skill the applicant is interested and/or proficient in), but give another desired technical skill desired a low rating (indicating the applicant is not interested in performing and/or lacks proficiency in that skill). The ratings may be associated with and/or incorporated into the applicant's profile and utilized when matching and/or scoring additional jobs.

The JTM Core 10110 can also provide a Company Metrics screen such as is shown in FIG. 109A. The Company Metrics screen will allow the applicant to research employers and, in a further embodiment, allow the applicant to rate employers. The Company Metrics screen can include the company name 10901, the number of jobs posted by the employer in the last year 10902, the average amount of time the employer's job listings stay open 10903, other applicant's reviews of the employer and its hiring process 10904, the top jobs posted by the employer 10905, the most common locations of jobs posted by the employer 10906, links to information about the employer's industry 10907, and seasonal hiring patterns for the employer 10908. Like the Job View the Company Metrics screen might also include an area for entering and saving notes made by the applicant 10909. In some embodiments, the Company Metrics screen may also allow the applicant to rate each company as well as particular aspects of the company. The applicant's ratings may be stored and/or incorporated into the applicant's profile, and may further be utilized when matching and/or scoring additional jobs.

FIG. 109B shows a particular implementation of a company metrics screen. A system user may access the company metrics module of the system in order to conduct research on a company of interest. The module may be populated with additional corporate information supplied by the company, extracted from corporate documents and/or provided by other system users. This particular company metrics screen is implemented as part of a JTM Core embodied as stand-alone application. As can be seen, other potential features of the interface/toolbar are shown in the Figure.

According to some embodiments, applicants are provided with matching job listings by accessing an applicant profile (where the applicant profile comprises applicant specific information, such as information obtained from a social network profile and/or a social match platform that includes professional network information), searching job listings with search parameters based on the applicant profile and applicant designated search input (such as prior search history, professional network attributes, social network attributes, etc.), processing search results corresponding to the search parameters and associating the search results with the applicant profile the outputting the search results (e.g., displaying a job listing or ad to a user). In some embodiments, a resume and/or other profile (social or professional network profile, apart from a social match platform profile)

may be processed to extract applicant-specific information that is associated with the applicant profile. Prior history, including search history, browsing history, social network information, jobs applied to history, jobs saved history, jobs browsed history, may also be determined and/or associated with a profile.

In some embodiments, a social match concept synonym matching engine may be utilized, for example, as a component in a social match platform, to identify and extract specific information from user profile information, for example, information referenced in a selection of text (e.g. a wall post or other profile information), and matches the information to defined concepts. In addition, this identification and matching is performed in the presence of errors and misspellings in the input text or variations in the input text (e.g., use of different words to describe the same entity, variations in writing style and font, language/dialect differences, variations in placement of text on a page, and the like).

As used herein, the term "concept" includes any type of information or representation of an idea, topic, category, classification, group, term, unit of meaning and so forth, expressed in any symbolic, graphical, textual, or other forms. For example, concepts typically included in a profile include university names, companies, terms identifying time (e.g., years), experiences, persons, connection, places, locations, names, contact information, hobbies, publications, miscellaneous information, grade point averages, honors, associations, clubs, teams, any type of entity, etc, or a collection of one or more of these. A concept can also be represented by search terms that might be used in a database search, web search, literature search, a search through statutes or case law, a patent search, and the like.

While the social match concept synonym matching engine described herein is described in relation to a profile/resume analysis application, and the examples provided are those involving searching for concepts in a resume, the engine can also be used for identifying concepts in other applications. For example, the engine can be used in a word/phrase search or comparison search through documents, articles, stories, publications, books, presentations, etc., in a search for court cases, medical cases, etc., in a search for television programs, radio programs, etc., and many other types of searches.

In an exemplary embodiment, the social match concept synonym matching engine (SMCSME) reviews an input string of text from a source (e.g., from a social match profile and/or resume provided by a job applicant, from a website, or any other collection of information). The input string can be composed of letters, numbers, punctuation, words, collections of words or a phrases, sentences, paragraphs, symbols or other characters, any combination of these, etc. The SMCSME also receives the specified concepts to be identified, including concepts which the SMCSME is to identify in the input string. The set of specified concepts can include any information that is being searched for within the input string, such as university attended, degrees attained, skills, companies worked at, titles held, social network posts, interests, information in a publication, on a website, and the like. The SMCSME may identify matches between the specified concepts to be identified and the input string, and translates those matches to one or more matched concepts. The matched concepts are concepts that the SMCSME has identified to be present within the input string (e.g., the SMCSME has found a match between the specified concepts and the text in the input string).

As stated above, a problem in concept matching systems is to identify a particular concept cited in a selection of text (e.g., posts on a profile). There are variants of this problem, for example, in one variant, the selection of text is short (e.g., citing at most one entity or concept from a known domain of concepts, such as in a status update or tweet (microblog)), or such as a search input string entered by a user, or a field in a database.. In this variant, the SMCSME can determine if the text identifies a known concept and, if so, the SMCSME can identify that concept. In another variant, the selection of text is long (e.g., identifying more than one concept from one or more known domains of concepts, such as free form history, personal description, browsed communications/websites, etc.). In this variant, the SMCSME can identify the set of concepts contained in the text, and the SMCSME may identify for each concept the sub-string of the text that corresponds to the concept such that no two sub-selections share the same word in the same location of the text. A correspondence between a concept or a pattern and a sub-string or sub-sequence of text or between two tokens is referred to herein as a matching or a match.

In one embodiment, usage of the SMCSME may be for a job search and/or job serving application (or more general ad serving application, such as is described with respect to Career Advertising Network). In such implementations, the SMCSME identifies concepts referenced in selections of text in profiles and/or resumes which serve as a source text. The SMCSME reviews an input string of text (e.g., "I attended Columbia University from 2003 to 2005") from the profile or resume document for user "Thomas R." In this example, the SMCSME uses a collection of concepts or a collection or list of terms, either of which serve as the specified concepts to be searched in the user's profile. For example, the collection of concepts may include a collection of universities (e.g., Columbia University, Cornell, Fordham, etc.), a collection of skills (e.g. C++), a collection of companies (e.g., Monster.com), and/or the like. Thus, the SMCSME would search in the profiles for each of these specified concepts and try to identify the concepts named or referenced in the profile (e.g., matched concepts). Subsequently, these matched concepts can be used to determine if a user, as represented by his/her profile, is a good match for a job position or a targeted ad. As another example, an input string from a job description (e.g., describing desired features in a candidate for a particular position of employment in a company) can be input into the SMCSME along with the profile, and the SMCSME will match concepts found in both input strings. In some embodiments, the collection of concepts is stored in a knowledge base, and, in some embodiments, this knowledge base is included within the SMCSME.

In one embodiment, the operation of the social match concept synonym matching engine comprises phases, such by way of non-limiting example, the exemplary phases: (a) Lexical Analysis/Tokenization—breaking up the input string into tokens; (b) Token Matching—determining which tokens in the input string match which tokens in a pattern (and how well they match); (c) Pattern Matching—selecting which patterns match which sub-sequences or sub-strings of the input string; (d) Pattern Scoring—evaluating how closely a sub-string of the input string matches a pattern; and (e) Pattern Selection—selecting which patterns are contained in the input string.

The SMCSME may be configured to run on a Social Match Platform server or like system storing and executing the SMCSME. Various modules may be utilized by the SMCSME, including a tokenization module, a representation module, a token matching module, a pattern matching module, a pattern scoring module, and a pattern selection module. Various additional, alternative, and/or different modules may be utilized. Various functionalities may be distributed among the modules in a manner different than as described herein.

Lexical Analysis/Tokenization—In one embodiment, a tokenization module divides the input string into one or more input tokens that represent one or more sub-strings of text within the input string. In identifying concepts located in the input string of text, the module decomposes the text into individual tokens, which are components of the input string that together identify a lexical construct. Examples of tokens are words, integers, real numbers, symbols, punctuation marks, numbers, hyperlinks, email addresses, web addresses, etc. The sub-string of the input string of text can be composed of one token or can be composed of more than one token.

The process of lexical analysis or tokenization (e.g., dividing text into tokens) may be conducted by a standard lexical analyzer. Lexical analyzers may be hand written, or may be automatically generated from a description of the lexical constructs. For example, the Java programming language runtime environment has direct support for a rudimentary form of lexical analysis (e.g., JLex).

In some embodiments, the SMCSME uses lexical constructs, including words, symbols, integers, and real numbers, to represent concepts lexical constructs. These lexical constructs are useful in the job search scenario for identifying of skills, schools, product names, companies, job titles, and the like within profiles for users (e.g., job candidates). As used herein, the term "word" can include any sequence of alphabetic characters, the term "integer" can include any sequence of numbers, the term "real number" can include any sequence or numbers followed by or embedding a period, and the term "symbol" can include any other character in the character set (e.g., the Unicode character set can be used, which provides encodings for practically all written language). To analyze an input string, the SMCSME can employ any type of lexical analyzer generator (e.g., JLex, JFlex, Flex, Lex, etc.).

One example of the tokenization performed by the tokenization module would be an input string such as one that might be found in a social/professional network user profile for a job candidate or in a job description for an employer. For example, the input string might identify the school attended by the job candidate, such as an input string that states that "I attended Columbia University from 2003 to 2005." The module decomposes this input string into tokens as follows:

<I> <attended> <Columbia> <University> <from>
        <2003> <to ><2005>

Thus, the string is broken down into eight separate tokens. A sub-string of this input string could be "Columbia University," which can be decomposed into tokens as follows:

<Columbia> <University >

Thus, the sub-string of text within the input string is broken down into two separate tokens that can then be used in identifying specific concepts within the input string.

The representation module represents the concept to be identified with a pattern that is divided into one or more pattern tokens. A user can choose certain concepts that the user wishes to have the SMCSME identify in a document. For example, a user can specify a collection of concepts that include schools, and degrees, or only schools. The SMCSME can then be used to identify these concepts within profiles for job candidates, or other text input strings. In some embodiments, the SMCSME can also normalize the input string (possibly before tokenization) by mapping characters in the string from one character set into characters in another character set (e.g. mapping diacritic forms into non-diacritic forms, mapping for variations in case, such as lower case or upper case characters, eliminating certain characters, such as punctuation, etc.).

Concepts with one or more patterns can then be decomposed into tokens, according to some embodiments. A number of concepts, such as universities, locations, etc., might be identified by a employer user as desired features in a job candidate. In some embodiments, each of the concepts is represented by a pattern. In some embodiments, the pattern text is the same as the concept text (e.g., the pattern "Cornell University" is the same as the concept "Cornell University). In other embodiments, the pattern differs somewhat from the concept, and can be an abbreviation of the concept or a synonym for the concept. In some embodiments, the pattern is also broken down into one or more tokens. The representation in the form of a pattern and tokens can be used by the SMCSME to identify the associated concepts in the input string of text. The collection of concepts with associated patterns and tokens can be stored in a knowledge base, and the information in the knowledge base can be retrieved when needed to conduct a particular matching.

Token Matching—A token matching module identifies a token match between the one or more input tokens and the one or more pattern tokens. Thus, the token matching module can identify possible correspondences between input tokens in the input string of text and pattern tokens in the textual description of concepts. According to the example above, the input string "I attended Columbia University from 2003 to 2005" is decomposed into tokens as follows:

<I> <attended> <Columbia> <University> <from>
        <2003> <to ><2005>

The token matching module can then identify which patterns of which concepts in a canonical set of concepts have tokens (e.g., pattern tokens) that correspond to tokens in the input string (e.g., input tokens). In the above example, the module might identify a correspondence between the third input token, <Columbia>, and the input token of the pattern "Columbia University." The token matching module might also identify a correspondence between the fourth token, <University>, and the second token of "Columbia University." The module may further identify a match between the input token <University> and pattern "Cornell University," but would not identify a match with the concept "Harvard University" since the textual description or pattern representing this concept does not include the word "University."

In some embodiments, the token matching module is configured to identify an input string that is a synonym of a token by being a subordinate concept to a parent concept represented by the token. For example, the input might include the input string "I attended Radcliff College and Princetn University," where Radcliff is a college within Harvard University and "Princetn" is likely to be a misspelling of "Princeton." In these embodiments, the token matching module is configured to identify the input string "Radcliff College" as a synonym for Harvard University, since Radcliff College can be represented as a child concept of the concept Harvard University in the concept hierarchy and it is possibly represented with pattern "Radcliff College." Thus, when the token <Radcliff> appears in the input string of text, the module can match the text to the input token in the tokenization of "Radcliff College." In this example, child concepts inherit characteristics or attributes of the parent concept, hence, in this case, are "part-of the parent concept. As another example, since the concepts represented by the representation module can have one or more patterns or synonyms, "Radcliff College" can be included as a pattern or synonym of concept Harvard University.

In addition, in the example above, the token matching module can be configured to identify misspellings, such as "Princetn" as a likely misspelling of "Princeton." This allows token matches between input tokens and pattern tokens that are not exact. In some embodiments, this is accomplished by measuring the distance between input tokens and pattern tokens using a string similarity metric (e.g., the Jaro-Winkler metric or any other similarity metric). In some embodiments, the similarity metric is scaled to provide a real number in the range 0.0 to 1.0, where 0.0 is perfect mismatch between input and pattern tokens (e.g., no tokens are matched) and 1.0 represents a perfect match (e.g., all tokens are matched).

The token matching module can compute for each input token a set of matching pattern tokens (e.g., pattern tokens that are either identical to or are similar enough to the input tokens to be considered equivalent to the input tokens). In some embodiments, the module does this by employing a token evaluation function (e.g., tokenCloseness(InputToken ti, PatternToken t2)) that evaluates the closeness of a input token to a pattern token, producing a value in the range [0.0, 1.01 with 1.0 being a perfect match and 0.0 being a perfect mismatch. The token matching module preferably employs a thresholding function (e.g., tokenMatch (InputToken ti, PatternToken t2)) that returns values (e.g., TRUE (the tokens match), FALSE (the tokens do not match), INDETERMI-NANT (cannot determine whether the tokens match of do not match)). This function can be used to determine whether an input token in the input string should be treated as a match for a pattern token in a pattern.

In addition, a number of modifiers can be employed in the SMCSME for usage in matching tokens. One example is the "class modifier" that is used to modify a particular class of lexical constructs. For example, to match the concept "Oracle Database System" or "Oracle 8i," a pattern such as "Oracle #8 i" could be used, which can be decomposed into tokens to form the following token sequence: <Oracle> <#8><i>

In this example, the class modifier is represented by the pound sign, or "#," but the modifier can be represented by any symbol, letter, number, character, sequence of characters, etc. The modifier signifies that any input term that is of the same class as the token following the pound sign (e.g., an integer) matches the pattern. In the Oracle example, the pound sign is actually a modifier for the term "8" that follows it. Thus, the token matching module would also identify text "Oracle 71" as a match for the pattern "Oracle #8 i," since "7" is an integer and in the same class as "8." This class modifier can also be used with words, real numbers, symbols, and the like.

An "exact modifier" is another example of a modifier that can be used, and is here denoted as a single quote mark or "'", but can be denoted by another character. This modifier may appear in front of any word or associated with any token. For example, when the exact modifier is used in front of a word, only input words that exactly match the spelling of the token following the modifier are acknowledged as matches. For example, the pattern "Oracle 8 i" would only be matched by text "Oracle 8 i" and not by "Oracel 8 i" or any other spelling. The exact modifier can be used to override any default behavior that allows word tokens to match closely spelled words.

As still another example, a "stem modifier" can be used, and can be denoted by a tilde symbol or "{tilde over ( )}," or any other character. When matching words, it can be beneficial to match all morphological variants of the verb in some cases. In some embodiments, when this modifier appears in front of any pattern or pattern token that is a word, input words or tokens whose stem matches the stem of the word will be considered matches for the token. For example, the phrase "I {tilde over ( )} attend Columbia University" would be matched by "I attended Columbia University." The SMCSME can thus support a number of patterns, including some involving a specific word, integer, symbol or real number, a class of words, integers, symbols, or real numbers, a stemmed word, an exact word, and the like.

In some embodiments, the token matching module com-pares each input token to each and every pattern token associated with a pattern of every concept when performing a token match. In other embodiments, the token matching module creates a hash table for each pattern type used by the SMCSME. A hash module can apply one or more hash functions to each pattern of each concept, placing the resulting hash value/concept combination in the appropriate hash table. To perform token matching, the hash module can then hash each token using the same hash functions. The matching module can then look up the hash values in the corresponding hash tables. When a match or collision is found, it is possible to identify a token match, and thus identify the pattern and the concept that contains that pattern using the hash table. In the case of misspelled words, in some embodiments the token matching module measures the similarity of the input token to the word in the pattern using a similarity metric (e.g., the Jaro-Winkler similarity metric). In some embodiments, the input tokens or sequences of tokens are mapped to other input tokens or sequences (e.g., mapping related terms, such as "Software Developer" to "Software Engineer"). In this manner, it is possible to account for possible variations in the different tokens.

When selecting a hash function to use for a pattern type, the hash module can use numerous different types of func-tions. For example, for a "stemmed word" pattern type, the hash function can be the morphological stem of the word, and a stemming algorithm can be used for these hash functions (e.g., the Porter stemming algorithm). As another example, for the patterns that are constructed from a class modifier, it is possible to maintain a separate hash table for each pattern type. However, in some embodiments, a single hash table is maintained for all class modifier pattern types. For example, if there were only four basic patterns types, the hash function produces one of four values, corresponding to the four basic pattern types. In this way, all input tokens of a particular class can be matched to all patterns of that class.

In addition, other hash functions can be used in cases in which the hash function will produce multiple values from a single pattern (e.g., in the case of the potentially misspelled word). In some embodiments, to capture words that sound the same when pronounced, the hash module hashes each word into a metaphone (e.g., Lawrence Philips' Metaphone Algorithm). Further, to capture input words that have omit-ted a single character or phoneme, transposed a single character or phoneme, or included an extraneous character or phoneme, the hash module can compute from the meta-phone every sub-string that is missing at most one character. This can result in a set of strings that can be used as hash values for matching misspelled words.

Pattern Matching—A pattern matching module identifies a pattern match between one of the one or more sub-strings and the pattern based on the token match. In some embodiments, the pattern matching module receives patterns for matching from the representation module or directly from the knowledge base. It is possible to define two classes of evidence with regard to a match. Positive evidence can include actual letters, numbers, words, and symbols in the input that are also contained exactly 18 in the pattern (e.g. letters of an input word that also occur in a particular pattern word or words in an input string that also occur in a pattern). Negative evidence can include actual letters, numbers, words, and symbols in the input that are not contained in the pattern (e.g. extra letters in a misspelled word or words in an input string that match no word in a pattern).

In some embodiments, the module identifies which concepts have patterns that are likely to be matched and evaluates how closely various sub-strings of the input string match the pattern. For example, with the input string "I attended Columbia University from 2003 to 2005," there is a correspondence between the third token in the string <Columbia>and the first token on the pattern "Columbia University," and between the fourth token "University" and the second token on the pattern "Columbia University." Therefore, based on these token matches, the module can identify the sub-string "Columbia University" in the input string as a perfect match to the pattern "Columbia University."

In some embodiments, the sub-string of the input string is composed of a number of words, symbols, integers, real numbers etc., as shown in the example above. However, in some embodiments, the sub-string being matched is composed of one word, and the input token formed from this one word is matched with a pattern token of a pattern. For example, in "I attended Harvard University," the token <Harvard> matches with the token on the pattern "Harvard," so the sub-string "Harvard" matches the pattern "Harvard."

The SMCSME can support a number of basic patterns that can be the fundamental building block for token matching. In some embodiments, a basic pattern 1o is composed of just one word, character, number, symbol, etc. (e.g., "Harvard") or a simple sequence (e.g., "Columbia University"). In some embodiments, a basic pattern matches only a single token of an input string. Beyond these basic patterns, it is also possible for a pattern to be composed of more than one word, a more complex sequence of words, or a number of sub-patterns to form a compound pattern. A compound pattern can include numerous words, characters, etc. In some embodiments, it is possible for a compound pattern to match a sequence of tokens or a substring of text in an input string.

The SMCSME can support a number of compound pattern types. For example, a "set compound pattern" can be a composition of other patterns that is matched if zero or more of its component patterns or sub-patterns (e.g., basic patterns) is matched. An example of a compound pattern is the pattern comprising the basic pattern "Princeton" and the basic pattern "University." However, in some embodiments, the general definition of the set pattern is recursive. Thus, sub-patterns may be any other pattern, including other set patterns. In some embodiments, the only constraint on matching the set pattern is that no two basic patterns match the same input token.

Another example of a compound pattern is the "sequence compound pattern," which is also a composition of other sub-patterns. In some embodiments, the sequence pattern is identical to the set compound pattern, except that an additional constraint is imposed where the sequence compound pattern is matched only if, for all pairs of matched basic patterns, the order of appearance of the input tokens is the same as the order of the appearance of the basic patterns in the target pattern. This pattern can be used for distinguishing cases where word order is extremely important, such as the case of "University of Texas" and "Texas University," two distinct institutions. Still another example of a compound pattern is the "alternative compound pattern." In some embodiments, this pattern is matched if and only if one of more of its sub-patterns is matched. The alternative compound pattern can be useful for capturing lexical e synonyms, abbreviations, and acronyms, such as "Microsoft Windows" or "Windows" or "WinXP" or Windows XP."

As yet another example, it is also possible to use a concatenation constraint, where a sequence of concatenated patterns is applied. Multiple adjacent tokens can be concatenated in the input string and still be matched. In addition, it can be required that the matched tokens follow the order of the patterns.

The pattern matching module can also determine whether a particular matching of input tokens to basic patterns satisfies all of the constraints on the pattern. For example, if every input token is assigned to at most one basic pattern, the module can evaluate whether the assignment matches the pattern in time linear in the number of basic patterns. In some embodiments, the module constructs all valid assignments of input tokens to basic patterns simultaneously, using a recursive algorithm on the pattern. For example, the module can be used in an attempt to match the sequence pattern "Texas A&M University." To determine possible matches of "I went to the University of Texas in Austin, Tex.," the tokenization module would tokenize the input string into:

<I> <went> <to > <the> <University> <of > <Texas>
      <in > <Austin> <,><Texas>

Both tokens matching "Texas" can be assigned to the basic pattern "Texas," and the token <University> can be assigned to the basic pattern "University." In some embodiments, the sub-patterns of the input string are recursively evaluated, and a set of correspondences between input tokens and basic patterns is produced. For the sequence pattern, the module can compute all possible sub-sets of the correspondences to the sub-patterns that may appear in the input string sequentially. In this example, it would be possible to generate four possible matchings: 1) the empty matching, 2) the matching of the seventh input token, <Texas>, to the first basic pattern "Texas," 3) the matching of the $11^{th}$ input token, <Texas>, to the first basic pattern "Texas," and, 4) the matching of the $5^{th}$ input token, <University>, to the fifth basic pattern, "University." While each of these matches is valid, intuitively none of the matches is correct, thus indicating the value of scoring the quality of a matching.

Pattern Scoring—A pattern scoring module scores the pattern match based on the token match. In some embodiments, a pattern evaluation or scoring function is used in scoring the match. The scoring function can take a matching (e.g., a correspondence between an input token and a basic pattern), and compute a score. In some embodiments, the higher the score received for a match, the more closely the input string matches the pattern. In some embodiments, this input is taken under the constraint that no matching may use the same token in the input or in the pattern (e.g., there can be no overlapped matchings among input tokens on the input string or among pattern tokens on the pattern).

As one example, a scoring function could be used that produces a real number in the range of 0.0 (for perfect mismatch) to 1.0 (for perfect match), analogous to the token matching similarity metric. However, the output of the scoring function can be represented in other manners, as well (e.g., as an integer). In the example described above with the input string "I attended Columbia University from 2003 to 2005" that resulted in identifying the sub-string "Columbia University" in the input string as perfect match to the pattern "Columbia University," the scoring function might return a value of 1.0.

There are a number of different manners in which a score for a pattern matching can be determined. In some embodiments, the pattern scoring module assigns each basic pattern a weight. The weight assigned is drawn from a weight table that is stored independently of the pattern. Weights in the weight table can be set by the user, but a set of weights can also be pre-set by default in the system (e.g., all basic patterns given a weight a 1). In some embodiments, the user can modify the weights as desired (e.g., the employer can modify the weights associated with different desired features for a job applicant to experiment with different weights to find an arrangement that produces the best candidates).

As one example, a selection of text, "I went to Princeton University" can be scored against two patterns "Harvard University" and "Princeton University." If the first pattern is scored on the input string, the module would return a positive score because the input token "University" matches the basic word pattern "University." In this example, the contribution to the score of the input token "University" on the pattern "Harvard University" is determined by the weight of "University" in the weight table. If all of the basic patterns were given a weight of 1, then each of the three basic patterns, "Harvard," "University," and "Princeton" would each get a weight of 1, affecting how each basic pattern would contribute to the overall score for the matching. It is also possible to use weights of patterns to distinguish more important patterns over less important patterns, which is discussed in more detail below.

Examples of Scoring Functions—One example of a scoring function that could be used would involve defining the score of a given matching (e.g., a set of correspondences between an input token and a basic pattern) on a particular pattern as the sum of the weights of the matched basic patterns divided by the sum of the weights of all the basic patterns in the pattern. Thus, in the example above regarding Harvard and Princeton, this scoring function would score the matching of the input token "University" to the basic pattern "University" in the pattern "Harvard University" as 0.5, since only one of two basic patterns is matched. For the pattern "Princeton University," the scoring function would return a score of 1.0, since all basic patterns were matched.

While the example of a scoring function described above did properly give a higher score to the input string on the pattern representing Princeton University than to the pattern representing Harvard University, this scoring function may not work as well with some other input strings. For example, with the input string "I lived in Princeton, N.J. while I attended Rutgers University," the fourth input token, <Princeton>, might be matched to the basic pattern of "Princeton University," and the eleventh input token <University>to the basic pattern of "Princeton University." Evaluating this matching using the scoring function described above might return a perfect score of 1.0, but this matching would not be valid.

As another example, a different scoring function is used that takes into consideration the input tokens that are not matched, particularly those that lie between the first matched input token and the last matched input token. In the example above regarding Rutgers University, there are six input tokens that are not matched (e.g., <,><NJ> <while> <I> <attended> <Rutgers>). Conceptually, the scoring function can score the sub-sequence of input tokens between the leftmost matched token in the input string and the rightmost matched token in the input string versus the pattern. The scoring function can involve two parts: a factor determined by which tokens in the input string are matched and not matched, and a factor determined by which basic patterns in the pattern are matched and not matched. This scoring function can construct a score as the product of a) the ratio of the weights of the matched input tokens to all tokens in the input string between and including the leftmost and rightmost matched input tokens, and b) the ratio of the weights of the matched basic patterns to all the basic patterns. When applied to the input string "I lived in Princeton, N.J. while I attended Rutgers University" on the pattern "Princeton University," the result is the following: $(2/8)*(2/2)=0.25$.

Thus, this scoring function properly returns a much lower score for the match on the "Princeton University" pattern than the scoring function described in the previous example. In addition, distance constraints can be used to put a limit on the number of unmatched tokens between the first matched token and the last matched token. Handling Mis-Ordered Words In many scenarios, token order is also important. The scoring function can be optionally modified or augmented in a number of ways to account for ordering of tokens As one example, the scoring function can be augmented with a penalty function if tokens are out of order. In any compound pattern used by the SMCSME that allows the input tokens to be presented in an order distinct from the order of basic patterns only in a single construct (e.g., the set compound pattern in the examples described above), this penalty function example can be useful for application to the portion of the score attributed to basic tokens contained in such a pattern when those basic tokens appear out of order. For example, the number of inversions present among the sub-patterns of a set compound pattern can be computed. If no inversions are present (e.g., none of the sub-patterns are out of order), then the penalty function returns a value of 0.0. If the sub-patterns in the set compound pattern are matched to input tokens that appear in exactly the opposite order, then the penalty function returns a value of 1.0. Thus, in this example, the score can be reduced by the product of the penalty function and a constant penalty value. In some embodiments, this value ranges from i % to 50% of the score.

Distinguishing Important Sub-Patterns—In some embodiments, it is possible to distinguish that certain sub-patterns forming a compound pattern are more or less important than other sub-patterns. In some embodiments, the scoring function applied by the pattern scoring module assigns a higher score to important patterns that are matched than to similar, but less important patterns that are matched. Conversely, a lower score can be assigned to important patterns that are not matched compared to similar, but less important patterns that are not matched.

In some embodiments, sub-pattern importance is conveyed by the pattern scoring module using a weight function. The weight function can be computed by the module using a representative sample of the texts that are likely to be input into the system. From that sample (e.g., possibly matching thousands of concepts), it is possible to construct the weight table based on the inverse of the frequencies of the occurrence of the basic patterns in the sample set. This can be the same weight table as previously described or it can be a separate weight table for storing weights based on the inverse of frequencies of occurrence of patterns. For example, in an input consisting of a set of 10,000 names of schools of higher education, the importance of the basic pattern "University" would be very low, since its frequency would be very high, whereas the importance of the basic pattern "Princeton" would be very high, since very few schools are named Princeton.

Distinguishing Optional and Required Patterns—In some embodiments, certain basic patterns are entirely optional or absolutely required for the pattern to be considered matched. In these embodiments, optional patterns contribute to the score of a pattern match only when the contribution would be positive. Similarly, required patterns are considered matched only when the score of the required sub-pattern exceeds a minimum score threshold, in these embodiments. A "required" or an "optional" constraint can be used with a pattern to designate that a particular pattern or term is required or optional for a match to be found.

Pattern Selection—The pattern selection module determines whether the concept is present in the input string based on the score, wherein which one of the one or more sub-strings of text in the input string naming the concept is identified based on the token match. In some embodiments, the pattern selection module selects from the likely matches a set of non-conflicting matches (e.g., matches that do not overlap). The module can select the pattern match with the total weight that is highest and that does not overlap any other pattern matches for the input string. For example, the input string "I went to Princeton, University of Southern California, and State University of New York," likely matches may include input substring "Princeton, University" for concept Princeton University and input substring "California, and State University" for concept California State University. However, this type of match would be taking the terms matched out of context. Thus, the scoring function can seek select an optimal set of concepts matches by maximizing the sum of the scores of the matched sub-strings under the constraint that no two sub-strings overlap. In some embodiments, a dynamic programming technique can be employed to perform the selection.

In some embodiments, a matching between input tokens and basic patterns within a single pattern can be classified using a threshold function. The score assigned to a matching can encode how well the matching fits the pattern. One method of classifying whether the matching is a reasonable fit for the pattern is to compare the score to a fixed threshold score. Matchings with scores exceeding the threshold value can be considered plausible matches. Those with scores that do not meet the threshold value can be considered implausible matches. For example, if the score is below a given value, the input sub-string spanned by the first term in the matching (e.g., "Princeton" in the above example) and the last term in the matching (e.g., "University") according to the order of input tokens is deemed to be an implausible match for the pattern (e.g., the pattern "Princeton University").

In one example, let $c[i]$ be the i-th character of the input text. For a plausible match P, let interval(P) be the smallest closed integer interval that contains the indices of all characters in matched input tokens in P. In this example, two matches P and Q are non-conflicting if and only if interval (P) does not intersect interval(Q). Intuitively, P and Q are non-conflicting if and only if P and Q match different sub-sequences of the input text. A weight for a matching P can be defined as weight(P) or the product of the square of the score of P and the sum of the weights of the basic patterns in P. The pattern selection module can identify (e.g., using dynamic programming) a set of mutually non-conflicting matches whose total weight (e.g., maximum weight) is maximized. When selecting between two conflicting matchings, P and Q, the module can e select the one whose weight is larger. When combining non-conflicting matchings, the weight of the combined set of matchings can be set as a) the sum of the weights of the matchings where multiple matchings are sought, or b) the maximum of the weights of the two sets of matchings where only a single matching is sought.

Importance Indexing—As discussed above, in some embodiments, for a matching to be considered, its score must exceed a given threshold value. It is also possible to eliminate a large number of patterns without scoring them. For example, when trying to find schools in the text "I went to university at Princeton," conceivably the fourth token of this text <university> matches every instance of the basic pattern "University" in the collection of basic patterns in the knowledge base. Following the algorithm described above, each one of those patterns would be scored, though it may be discovered that the scores were too low to be used for the vast majority of concepts in the knowledge base.

In some embodiments, to reduce the scoring effort, the pattern selection module computes an importance value for each basic pattern within a pattern. In these embodiments, if the importance value exceeds the scoring threshold value, then the pattern is scored. The module maintains an importance index that includes, for each basic pattern, the list of patterns that contain the basic pattern and the corresponding importance values. The list can be sorted by importance values. The importance index can be used to find an input token that corresponds to a basic pattern and to identify all patterns whose importance value exceeds the threshold value. These patterns exceeding the threshold can be added to a list of patterns that will be completely scored. Thus, this importance indexing technique can dramatically reduce the number of patterns that need be scored, and, consequently can result in a much faster SMCSME.

There are a number of ways to compute the importance values of the basic patterns within a pattern. For example, the module can construct a total order on the set of distinct basic patterns. The module can construct an input text whose score is maximal (e.g., 1.0) and then for each basic pattern, the module can remove all instances of that basic pattern from the input text. The module can also score the resulting input text. The basic pattern that achieves the lowest score can be assigned the highest score achieved when including that basic pattern. Then, that basic pattern can be removed and the second step can be repeated until there are no basic patterns remaining.

Measure of Effectiveness—To measure the effectiveness of a method for solving the problem of identifying concepts in a selection of text, it is possible to define a measure of the accuracy of a solution in correctly identifying concepts. When given a fixed set of concepts or a canonical set of concepts to be identified and an input string or selection of text, T, it is possible to enumerate all the matchings, M, of sub-selections or sub-strings of text with concepts in the canonical set. For example, given a set of matchings H(T) that might be made manually by a human reviewing a string of text, it is possible to measure the precision, recall, and accuracy of another method, C(T) (e.g., the method used by the system), for generating matchings on T relative to M as follows:

Precision: The number of concepts matched in both H(T) and C(T) divided by the number of concepts matched in C(T).

Recall: The number of concepts matched in both H(T) and C(T) divided by the number of concepts matched in H(T).

Accuracy: The average of precision and recall.

F-Measure: (2*Precision*Recall)/(Precision+Recall)

The system can be configured to achieve the highest F-Measure or Accuracy possible. To obtain this outcome, it is useful to define a measure of goodness relating a sub-selection of text and a concept (e.g., how good or accurate the identified match made by system is in comparison to the match a human might make through a manual matching). The measure of goodness can correspond well to intuition that a human being would apply when measuring goodness. For example, in a selection of text assumed to name a single city or school, e.g. "Stanford," a resident of Northern California may recognize this as an abbreviation of "Leland Stanford Jr. University," while a resident of Connecticut may recognize this as a misspelling of the city of Stamford, Conn. Without further contextual information, it may be difficult to make a determination of which concept is a closer or better match. Thus, a reasonable measure of goodness or closeness can allow for abbreviations and allow for spelling errors.

In addition to abbreviations and spelling errors, a goodness measure can also recognize synonyms of concepts, including both single word synonyms, e.g. e "taught" and "instructed" and multi-word synonyms, e.g. "developed software" and "wrote code." Other relationships between words can also be used to construct a goodness measure, including the various relationships represented in the electronic lexical database called WordNet. The system provides a class of methods for measuring goodness that can be constructed using one or more hierarchies of concepts defined with words and/or word synonyms, and it is possible to achieve very high levels of accuracy when using methods of goodness constructed from such concept hierarchies.

In one embodiment, the SMCSME first receives an input string of text (e.g., from a profile, resume, from a job description, etc.) and a defined set of concepts (e.g., from a knowledgebase of concepts). In some embodiments, the input string is normalized by mapping characters from one character set into characters in another character set. The SMCSME tokenizes the input string, dividing the input string into one or more input tokens, as described above. The SMCSME also represents a concept with one or more patterns that can be divided into tokens. This representation is preferably created in advance and lists a number of concepts to be identified in selections of text or input strings. In some embodiments, the input tokens or token sequences are mapped to other input tokens or sequences. The SMCSME applies hash functions to each pattern of each concept and places the resulting hash value/concept combination in a hash table. The SMCSME can also apply the hash functions to each input token to be matched to get a resultant hash value. After applying the hash functions, the SMCSME can then look up the hash value in the hash table to find a match in the hash table. Thus, SMCSME identifies a token match between one or more input tokens and one or more pattern tokens using the information stored in the hash table.

The SMCSME can also identify a pattern match between a sub-string (e.g., one or more of the input tokens) of the input string and a pattern associated with the concept to be identified. The SMCSME then assigns a weight to the match that can be used in the computation of a score for the match. The SMCSME can assign weights to each basic pattern within a pattern that together equal the total weight for the pattern, and the user can modify the weights as desired. The SMCSME can assign a lower weight to less important of the basic patterns, and a higher weight to more important of the basic patterns. Similarly, the SMCSME can assign a lower weight to more frequently used patterns (e.g., University) and can assign a higher weight to less frequent patterns (e.g., Harvard).

In some embodiments, the SMCSME provides pattern scoring and determining whether a concept is present in a selection of text. The SMCSME retrieves an importance value for each basic pattern within a pattern from an importance index (e.g., containing, for each basic pattern, a list of patterns that contain the basic pattern and the corresponding importance values). The importance index can be used to find an input token that corresponds to a basic pattern and to identify all patterns whose importance value exceeds the threshold value for a likely or plausible match (as described above). The SMCSME next determines if the importance value exceeds the threshold value. If the importance value does not exceed the threshold, the SMCSME does not score the pattern match. If the value does exceed the threshold, the SMCSME does score the pattern match. In some embodiments, the SMCSME conducts some scoring of the pattern match before the retrieval of the importance value, but the SMCSME completes the scoring 706 once the importance value is retrieved and is determined to exceed the threshold. The SMCSME scores the pattern match based the weights assigned to basic patterns making up the pattern that together equal the total weight for the pattern.

The SMCSME next determines whether the concept is present in the input string based on the score. In some embodiments, the SMCSME selects from the likely matches a set of optimal, non-conflicting matches (e.g., matches that do not overlap). Again, the SMCSME can compare the score to a threshold score to determine how plausible or likely the match is and select the optimal match. The SMCSME selects the pattern match with the total weight that is highest (e.g., the maximal total weight) and where the pattern match does not overlap any other pattern matches for the input string. The SMCSME can apply dynamic programming techniques or other methods to select the matches that are non-conflicting or that include sub-strings that do not overlap. Thus, using these methods, the SMCSME ultimately can automatically identify from a potentially unstructured input string of text one or more specific concepts, where the input string may include errors and/or variations in the text.

aaa

In order to address various issues and advance the art, the entirety of this application for SOCIAL MATCH PLATFORM APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SMP individual and/or enterprise user, database configuration and/or relational model, data type, data transmission and/or network framework, syntax structure, and/or the like, various embodiments of the SMP, may be implemented that enable a great deal of flexibility and customization. For example, aspects of the SMP may be adapted for connecting players in multiplayer online games. While various embodiments and discussions of the SMP have been directed to connecting job candidates and recruiters using a social platform, however, it is to be understood that the embodiments described herein may be readily configured and/or customized for a wide variety of other applications and/or implementations.

What is claimed is:

1. A cross-network social search apparatus, comprising:
at least one memory;
a component collection stored in the at least one memory;
any of at least one processor disposed in communication with the at least one memory, the any of at least one processor executing processor-executable instructions from the component collection, wherein the processor-executable instructions, when executed by any of the at least one processor, are configured to cause the apparatus to:
obtain user external social network data and user internal social network data;
store the obtained user internal and external social network data in a separate database;

obtain a cross-network job search trigger;
search the user internal and external social network data based on the cross-network job search trigger;
obtain initial query results including a plurality of information types;
generate, via a career statistical engine structured as processing state model paths in a directed state graph topology, additional cross-network search results using the initial query results;
aggregate the initial query results and the additional cross-network search results; and
provide the aggregated results.

2. The apparatus of claim 1, wherein the processor-executable instructions, when executed by any of the at least one processor, are further configured in cause the apparatus to:
rank the aggregated results according to weights assigned to the plurality of information types; and
provide the ranked initial query results and ranked additional cross-network search results to a requestor.

3. The apparatus of claim 1, in which the cross-network job search trigger is any of:
a user search request; a jobseeker search request; a recruiter search request; an employer search request; a web service request; and an advertisement service request.

4. The apparatus of claim 1, wherein a set of job search parameters for the search of the user internal and external social network data comprises any of: a job type; a job location; a business entity; a salary range; an employment term or condition; and an employee identification.

5. The apparatus of claim 2, in which the plurality of information types includes
a social graph; a person at a business entity; a job type; and a user interest.

6. The apparatus of claim 5, in which the weights assigned to the plurality of information types are all distinct from each other.

7. The apparatus of claim 2, in which the requestor is any of: a job seeker; a recruiter;
a business entity; a web server; and an advertisement server.

8. The apparatus of claim 1, in which the aggregated results are sorted by whether
they are initial search results or additional cross-network search results.

9. The apparatus of claim 8, in which the additional cross-network search results are
prioritized over the initial search results.

10. The apparatus of claim 8, in which the initial search results are prioritized over the additional cross-network search results.

11. The apparatus of claim 1, wherein the processor-executable instructions, when executed by any of the at least one processor, are further configured to cause the apparatus to:
generate an updated graph pathing graph based on the additional cross-network search results.

12. The apparatus of claim 1, wherein the processor-executable instructions, when executed by any of the at least one processor, are further configured to cause the apparatus to:
modify the user internal social network data using the user external social network data.

13. The apparatus of claim 12, wherein the processor-executable instructions, when executed by any of the at least one processor, are further configured to cause the apparatus to:

store user internal social network data in an internal social network database, using user internal social network access credentials, after the modification of the user internal social network data using the user external social network data.

14. The apparatus of claim 1, wherein the processor-executable instructions, when executed by any of the at least one processor, are further configured to cause the apparatus to:

generate a plurality of advertisements based on the aggregated results; and distribute the plurality of advertisement to an at least one content provider.

15. A cross-network social search processor-readable, non-transient medium, the medium storing a component collection, storage of the component collection structured with instructions executable by one or more processors to perform a method comprising:

obtaining user external social network data and user internal social network data;

storing the obtained user internal and external social network data in a separate database;

obtaining a cross-network job search trigger;

searching the user internal and external social network data based on the cross-network job search trigger;

obtaining initial query results including a plurality of information types;

generating, via a career statistical engine structured as processing state model paths in a directed state graph topology, additional cross-network search results using the initial query results;

aggregating the initial query results and the additional cross-network search results; and providing the aggregated results.

16. The medium of claim 15, wherein the instructions, when executed by the one or more processors, further cause the one or more processors to:

rank the aggregated initial query results according to weights assigned to the plurality of information types; and provide the ranked initial query results and ranked additional cross-network search results to a requestor.

17. The medium of claim 15, in which the cross-network job search trigger is any of: a user search request; a job-seeker search request; a recruiter search request; an employer search request; a web service request; and an advertisement service request.

18. The medium of claim 15, where a set of job search parameters for the search of the user internal and external social network data comprises any of: a job type; a job location; a business entity; a salary range; an employment term or condition; and an employee identification.

19. The medium of claim 16, in which the plurality of information types includes a social graph; a person at a business entity; a job type; and a user interest.

20. The medium of claim 19, in which the weights assigned to the plurality of information types are all distinct from each other.

21. The medium of claim 16, in which the requestor is any of: a job seeker; a recruiter;

a business entity; a web server; and an advertisement server.

22. The medium of claim 15, in which the aggregated results are sorted by whether they are initial search results or additional cross-network search results.

23. The medium of claim 22, in which the additional cross-network search results are prioritized over the initial search results.

24. The medium of claim 22, in which the initial search results are prioritized over the additional cross-network search results.

25. The medium of claim 15, wherein the instructions, when executed by the one or more processors, further cause the one or more processors to:

generate an updated graph pathing graph based on the additional cross-network search results.

26. The medium of claim 15, wherein the instructions, when executed by the one or more processors, further cause the one or more processors to:

modify the user internal social network data using the user external social network data.

27. The medium of claim 26, wherein the instructions, when executed by the one or more processors, further cause the one or more processors to:

store user internal social network data in an internal social network database, using user internal social network access credentials, after the modification of the user internal social network data using the user external social network data.

28. The medium of claim 15, wherein the instructions, when executed by the one or more processors, further cause the one or more processors to:

generate a plurality of advertisements based on the aggregated results; and distribute the plurality of advertisement to an at least one content provider.

29. A cross-network social search processor-implemented system, comprising:

means to store a component collection; and means to process processor-executable instructions from the component collection, wherein the processor-executable instructions are configured to cause the system to:

obtain user external social network data and user internal social network data;

store the obtained user internal and external social network data in a separate database;

obtain a cross-network job search trigger;

search the user internal and external social network data based on the cross-network job search trigger;

obtain initial query results including a plurality of information types;

generate, via a career statistical engine structured as processing state model paths in a directed state graph topology, additional cross-network search results using the initial query results;

aggregate the initial query results and the additional cross-network search results; and provide the aggregated results.

30. The system of claim 29, wherein the processor-executable instructions are further configured to cause the system to:

rank the aggregated results according to weights assigned to the plurality of information types; and provide the ranked initial query results and ranked additional cross-network search results to a requestor.

31. The system of claim 29, in which the cross-network job search trigger is any of:

a user search request; a jobseeker search request; a recruiter search request; an employer search request; a web service request; and an advertisement service request.

32. The system of claim 29, wherein a set of job search parameters for the search of the user internal and external social network data comprises any of: a job type; a job location; a business entity; a salary range; an employment term or condition; and an employee identification.

33. The system of claim 30, in which the plurality of information types includes a social graph; a person at a business entity; a job type; and a user interest.

34. The system of claim 33, in which the weights assigned to the plurality of information types are all distinct from each other.

35. The system of claim 30, in which the requestor is any of: a job seeker; a recruiter;

a business entity; a web server; and an advertisement server.

36. The system of claim 29, in which the aggregated results are sorted by whether they are initial search results or additional cross-network search results.

37. The system of claim 36, in which the additional cross-network search results are prioritized over the initial search results.

38. The system of claim 36, in which the initial search results are prioritized over the additional cross-network search results.

39. The system of claim 29, wherein the processor-executable instructions are further configured to cause the system to:

generate an updated graph pathing graph based on the additional cross-network search results.

40. The system of claim 29, wherein the processor-executable instructions are further configured to cause the system to:

modify the user internal social network data using the user external social network data.

41. The system of claim 40, wherein the processor-executable instructions are further configured to cause the system to:

store user internal social network data in an internal social network database, using user internal social network access credentials, after the modification of the user internal social network data using the user external social network data.

42. The system of claim 29, wherein the processor-executable instructions are further configured to cause the system to:

generate a plurality of advertisements based on the aggregated results; and distribute the plurality of advertisement to an at least one content provider.

43. A cross-network social search process, including processing processor-executable instructions via any of at least one processor from a component collection stored in at least one memory, wherein the processor-executable instructions comprise instructions for:

obtaining user external social network data and user internal social network data;

storing the user obtained internal and external social network data in a separate database;

obtaining a cross-network job search trigger;

searching the user internal and external social network data based on the cross-network job search trigger;

obtaining initial query results including a plurality of information types;

generating, via a career statistical engine structured as processing state model paths in a directed state graph topology, additional cross-network search results using the initial query results;

aggregating the initial query results and the additional cross-network search results; and providing the aggregated results.

44. The process of claim 43, wherein the processor-executable instructions comprise instructions for:

ranking the aggregated results according to weights assigned to the plurality of information types; and providing the ranked initial query results and ranked additional cross-network search results to a requestor.

45. The process of claim 43, in which the cross-network job search trigger is any of:

a user search request; a jobseeker search request; a recruiter search request; an employer search request; a web service request; and an advertisement service request.

46. The process of claim 43, where a set of job search parameters for the search of the user internal and external social network data comprises any of: a job type; a job location; a business entity; a salary range; an employment term or condition; and an employee identification.

47. The process of claim 44, in which the plurality of information types includes a social graph; a person at a business entity; a job type; and a user interest.

48. The process of claim 47, in which the weights assigned to the plurality of information types are all distinct from each other.

49. The process of claim 44, in which the requestor is any of: a job seeker; a recruiter;

a business entity; a web server; and an advertisement server.

50. The process of claim 43, in which the aggregated results are sorted by whether they are initial search results or additional cross-network search results.

51. The process of claim 50, in which the additional cross-network search results are prioritized over the initial search results.

52. The process of claim 50, in which the initial search results are prioritized over the additional cross-network search results.

53. The process of claim 43, wherein the processor-executable instructions further comprise instructions for:

generating an updated graph pathing graph based on the additional cross-network search results.

54. The process of claim 43, wherein the processor-executable instructions comprise instructions for:

modifying the user internal social network data using the user external social network data.

55. The process of claim 54, wherein the processor-executable instructions comprise instructions for:

storing user internal social network data in an internal social network database, using user internal social network access credentials, after the modification of the user internal social network data using the user external social network data.

56. The process of claim 43, wherein the processor-executable instructions comprise instructions for:

generating a plurality of advertisements based on the aggregated results; and distributing the plurality of advertisement to an at least one content provider.

\* \* \* \* \*